(12) United States Patent
Mennie et al.

(10) Patent No.: US 8,437,530 B1
(45) Date of Patent: May 7, 2013

(54) APPARATUS AND SYSTEM FOR IMAGING CURRENCY BILLS AND FINANCIAL DOCUMENTS AND METHOD FOR USING THE SAME

(75) Inventors: Douglas U. Mennie, Barrington, IL (US); William J. Jones, Barrington, IL (US); Frank M. Csulits, Gurnee, IL (US); Matthew L. Anderson, Salem, WI (US); Robert J. Klein, Chicago, IL (US); Ralf H. Jaeger, Kildeer, IL (US); David R. Badalamenti, Arlington Heights, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 361 days.

(21) Appl. No.: 12/758,968

(22) Filed: Apr. 13, 2010

Related U.S. Application Data

(60) Continuation-in-part of application No. 12/544,052, filed on Aug. 19, 2009, now Pat. No. 8,041,098, which is a continuation of application No. 11/199,511, filed on Aug. 8, 2005, now Pat. No. 7,599,543, which is a division of application No. 09/965,428, filed on Sep. 27, 2001, now Pat. No. 7,187,795, application No. 12/758,968, which is a continuation-in-part of application No. 10/638,231, filed on Aug. 7, 2003, now Pat. No. 7,903,863, which is a continuation-in-part of application No. 09/965,428.

(60) Provisional application No. 61/169,690, filed on Apr. 15, 2009, provisional application No. 61/242,668, filed on Sep. 15, 2009, provisional application No. 61/259,018, filed on Nov. 6, 2009, provisional application No. 61/323,213, filed on Apr. 12, 2010.

(51) Int. Cl.
*G06K 9/00* (2006.01)

(52) U.S. Cl.
USPC ............. 382/135; 209/534; 235/379; 356/71; 902/7

(58) Field of Classification Search .................. 382/100, 382/135, 136, 137, 138, 139; 209/534; 235/379; 356/71; 902/7
See application file for complete search history.

(56) References Cited

U.S. PATENT DOCUMENTS

| 2,669,998 A | 2/1954 | Buchholz |
| 2,750,949 A | 6/1956 | Kulo et al. |

(Continued)

FOREIGN PATENT DOCUMENTS

| CA | 2 624 638 A1 | 12/2007 |
| CA | 2 684 159 A1 | 4/2010 |

(Continued)

OTHER PUBLICATIONS

BARS: 5000 Currency Sorter, 6 pages (estimated prior to Aug. 13, 2003).

(Continued)

*Primary Examiner* — Anand Bhatnagar
(74) *Attorney, Agent, or Firm* — Nixon Peabody LLP

(57) ABSTRACT

A stack of a stack of currency bills is received, transported, and imaged. Image data reproducible as a visually readable image of one or more portions of at least one side of each currency bill in the stack is obtained. A serial number and at least one or more additional characters are extracted from the image data for each currency bill. A processor compares the extracted serial number and corresponding extracted one or more additional characters with stored serial number information and corresponding stored additional character information associated with the serial number information of genuine currency bills. The stored serial number information and corresponding stored additional character information uniquely identify a genuine currency bill. Any currency bill that does not have one or more extracted additional characters matching the stored serial number information and corresponding stored additional character information is flagged.

50 Claims, 58 Drawing Sheets

U.S. PATENT DOCUMENTS

| | | | |
|---|---|---|---|
| 2,835,260 A | 5/1958 | Buchholz | |
| 2,936,684 A | 5/1960 | Simjian | |
| 3,104,314 A | 9/1963 | Simjian | |
| 3,148,932 A | 9/1964 | Simjian | |
| 3,150,912 A | 9/1964 | Simjian | |
| 3,246,295 A | 4/1966 | DeClaris et al. | |
| 3,280,974 A | 10/1966 | Riddle et al. | |
| 3,443,107 A | 5/1969 | Modglin | |
| 3,480,785 A | 11/1969 | Aufderheide | |
| 3,496,370 A | 2/1970 | Haville et al. | |
| 3,509,535 A | 4/1970 | Berube | |
| 3,612,835 A | 10/1971 | Andrews et al. | |
| 3,618,765 A | 11/1971 | Syosset et al. | |
| 3,656,615 A | 4/1972 | Ptacek | |
| 3,679,314 A | 7/1972 | Mustert | |
| 3,715,031 A | 2/1973 | Okkonen | |
| 3,725,667 A | 4/1973 | Schwartz | |
| 3,764,899 A | 10/1973 | Peterson | |
| 3,778,628 A | 12/1973 | Novak et al. | |
| 3,782,543 A | 1/1974 | Martelli et al. | |
| 3,798,603 A | 3/1974 | Wahlberg | |
| 3,800,078 A | 3/1974 | Cochran et al. | |
| 3,806,710 A | 4/1974 | Shigemori et al. | |
| 3,815,021 A | 6/1974 | Kerr | |
| 3,842,281 A | 10/1974 | Goodrich | |
| 3,870,629 A | 3/1975 | Carter et al. | |
| 3,906,449 A | 9/1975 | Marchak | |
| 3,930,582 A | 1/1976 | Gartner et al. | |
| 3,966,047 A | 6/1976 | Steiner | |
| 3,976,198 A | 8/1976 | Carnes, Jr. et al. | |
| 4,023,011 A | 5/1977 | Nakajima et al. | |
| 4,027,142 A | 5/1977 | Paup et al. | |
| 4,040,010 A | 8/1977 | Crane | |
| 4,041,456 A | 8/1977 | Ott et al. | |
| 4,096,991 A | 6/1978 | Iguchi | |
| 4,109,238 A | 8/1978 | Creekmore | |
| 4,114,027 A | 9/1978 | Slater | |
| 4,114,804 A | 9/1978 | Jones et al. | |
| 4,147,430 A | 4/1979 | Gorgone et al. | |
| 4,166,945 A | 9/1979 | Inoyama et al. | |
| 4,179,685 A | 12/1979 | O'Maley | |
| 4,180,798 A | 12/1979 | Komori et al. | |
| 4,187,463 A | 2/1980 | Kivenson | |
| 4,187,498 A | 2/1980 | Creekmore | |
| 4,197,986 A | 4/1980 | Nagata | |
| 4,201,978 A | 5/1980 | Nally | |
| 4,205,780 A | 6/1980 | Burns et al. | |
| 4,231,014 A | 10/1980 | Ponzio | |
| 4,231,561 A | 11/1980 | Kaneko et al. | |
| 4,237,378 A | 12/1980 | Jones | |
| 4,250,806 A | 2/1981 | Boyson et al. | |
| 4,255,651 A | 3/1981 | Phillips | |
| 4,264,808 A | 4/1981 | Owens et al. | |
| 4,275,874 A | 6/1981 | DiBlasio | |
| 4,277,774 A | 7/1981 | Fujii et al. | |
| 4,283,708 A | 8/1981 | Lee | |
| 4,288,781 A | 9/1981 | Sellner et al. | |
| 4,302,781 A | 11/1981 | Ikeda et al. | |
| 4,310,885 A | 1/1982 | Azcua et al. | |
| 4,311,914 A | 1/1982 | Huber | |
| 4,313,598 A | 2/1982 | DiBlasio | |
| 4,321,672 A | 3/1982 | Braun et al. | |
| 4,326,636 A | 4/1982 | Kawakami | |
| 4,334,619 A | 6/1982 | Horino et al. | |
| 4,337,864 A | 7/1982 | McLean | |
| 4,348,656 A | 9/1982 | Gorgone et al. | |
| 4,349,111 A | 9/1982 | Shah et al. | |
| 4,352,988 A | 10/1982 | Ishida | |
| 4,355,300 A | 10/1982 | Weber | |
| 4,355,369 A | 10/1982 | Garvin | |
| 4,356,473 A | 10/1982 | Freudenthal | |
| 4,360,034 A | 11/1982 | Davila et al. | |
| 4,381,447 A | 4/1983 | Horvath et al. | |
| 4,383,540 A | 5/1983 | DeMeyer et al. | |
| 4,386,432 A | 5/1983 | Nakamura et al. | |
| 4,396,902 A | 8/1983 | Warthan et al. | |
| 4,416,299 A | 11/1983 | Bergman | |
| 4,420,153 A | 12/1983 | Winkler et al. | |
| 4,435,834 A | 3/1984 | Pauli et al. | |
| 4,441,205 A | 4/1984 | Berkin et al. | |
| 4,442,541 A | 4/1984 | Finkel et al. | |
| 4,449,240 A | 5/1984 | Yoshida | |
| 4,461,028 A | 7/1984 | Okubo | |
| 4,464,786 A | 8/1984 | Nishito et al. | |
| 4,464,787 A | 8/1984 | Fish et al. | |
| RE31,692 E | 10/1984 | Tyburski et al. | |
| 4,479,049 A | 10/1984 | Hirose | 235/379 |
| 4,480,177 A | 10/1984 | Allen | |
| 4,482,058 A | 11/1984 | Steiner | |
| 4,487,306 A | 12/1984 | Nao et al. | |
| 4,490,846 A | 12/1984 | Ishida et al. | |
| 4,513,439 A | 4/1985 | Gorgone et al. | |
| 4,521,008 A | 6/1985 | Granzow et al. | |
| 4,523,330 A | 6/1985 | Cain | |
| 4,530,067 A | 7/1985 | Dorr | |
| 4,538,719 A | 9/1985 | Gray et al. | |
| 4,539,702 A | 9/1985 | Oka | |
| 4,542,829 A | 9/1985 | Emery et al. | |
| 4,543,969 A | 10/1985 | Rasmussen | |
| 4,544,266 A | 10/1985 | Antes | |
| 4,547,896 A | 10/1985 | Ohtombe et al. | |
| 4,553,222 A | 11/1985 | Kurland et al. | |
| 4,553,846 A | 11/1985 | Hilton et al. | |
| 4,556,140 A | 12/1985 | Okada | |
| 4,558,224 A | 12/1985 | Gober | |
| 4,559,451 A | 12/1985 | Curl | |
| 4,563,771 A | 1/1986 | Gorgone et al. | |
| 4,567,370 A | 1/1986 | Falls | |
| 4,569,421 A | 2/1986 | Sandstedt | |
| 4,582,172 A | 4/1986 | Takeuchi et al. | |
| 4,584,529 A | 4/1986 | Aoyama | |
| 4,587,412 A | 5/1986 | Apisdorf | |
| 4,587,434 A | 5/1986 | Roes et al. | |
| 4,590,606 A | 5/1986 | Rohrer | |
| 4,592,090 A | 5/1986 | Curl et al. | |
| 4,593,184 A | 6/1986 | Bryce | |
| 4,594,664 A | 6/1986 | Hashimoto | |
| 4,602,332 A | 7/1986 | Hirose et al. | |
| 4,605,926 A | 8/1986 | Onishi et al. | |
| 4,611,345 A | 9/1986 | Ohnishi et al. | |
| 4,617,457 A | 10/1986 | Granzow et al. | |
| 4,617,458 A | 10/1986 | Bryce | |
| 4,628,194 A | 12/1986 | Dobbins et al. | |
| 4,630,813 A | 12/1986 | Watanabe et al. | 271/227 |
| 4,645,936 A | 2/1987 | Gorgone | |
| 4,653,647 A | 3/1987 | Hashimoto | |
| 4,658,289 A | 4/1987 | Nagano et al. | |
| 4,676,343 A | 6/1987 | Humble et al. | |
| 4,677,682 A | 6/1987 | Miyagawa et al. | |
| 4,678,072 A | 7/1987 | Kobayashi et al. | |
| 4,680,803 A | 7/1987 | Delella | |
| 4,685,141 A | 8/1987 | Hoque et al. | |
| 4,686,357 A | 8/1987 | Douno et al. | |
| 4,694,963 A | 9/1987 | Takesako | |
| 4,697,071 A | 9/1987 | Hiraoka et al. | |
| 4,700,368 A | 10/1987 | Munn et al. | |
| 4,716,456 A | 12/1987 | Hosaka | |
| 4,733,308 A | 3/1988 | Nakamura et al. | |
| 4,735,289 A | 4/1988 | Kenyon | |
| 4,743,743 A | 5/1988 | Fukatsu | |
| 4,743,974 A | 5/1988 | Lockwood | |
| 4,748,679 A | 5/1988 | Gold et al. | |
| 4,749,087 A | 6/1988 | Buttifant | |
| 4,753,625 A | 6/1988 | Okada | |
| 4,764,725 A | 8/1988 | Bryce | |
| 4,764,976 A | 8/1988 | Kallin et al. | |
| 4,768,100 A | 8/1988 | Kunishima et al. | |
| 4,774,663 A | 9/1988 | Musmanno et al. | |
| 4,782,328 A | 11/1988 | Denlinger | |
| 4,784,274 A | 11/1988 | Mori et al. | |
| 4,803,347 A | 2/1989 | Sugahara et al. | |
| 4,806,709 A | 2/1989 | Evans | |
| 4,811,004 A | 3/1989 | Person et al. | |
| 4,817,176 A | 3/1989 | Marshall et al. | |
| 4,821,332 A | 4/1989 | Durham | |
| 4,823,393 A | 4/1989 | Kawakami | |
| 4,825,246 A | 4/1989 | Fukuchi et al. | |

| | | | | | | |
|---|---|---|---|---|---|---|
| 4,827,531 A | 5/1989 | Milford | | 5,239,593 A | 8/1993 | Wittner et al. |
| 4,837,842 A | 6/1989 | Holt | | 5,251,273 A | 10/1993 | Betts et al. ............... 382/311 |
| 4,841,358 A | 6/1989 | Kammoto et al. | | 5,251,738 A | 10/1993 | Dabrowski |
| 4,843,219 A | 6/1989 | Franchi .................. 235/379 | | 5,252,811 A | 10/1993 | Henochowicz et al. |
| 4,851,616 A | 7/1989 | Wales et al. | | 5,258,855 A | 11/1993 | Lech et al. ............... 358/462 |
| 4,877,230 A | 10/1989 | Winkler et al. | | 5,261,518 A | 11/1993 | Bryce |
| 4,880,096 A | 11/1989 | Kobayashi et al. | | 5,265,008 A | 11/1993 | Benton et al. |
| 4,881,268 A | 11/1989 | Uchida et al. | | 5,272,641 A | 12/1993 | Ford et al. |
| 4,883,181 A | 11/1989 | Yoshikawa | | 5,274,641 A | 12/1993 | Shobalake et al. |
| 4,888,812 A | 12/1989 | Dinan et al. | | 5,279,403 A | 1/1994 | Harbaugh et al. |
| 4,903,953 A | 2/1990 | Winkler et al. | | 5,286,954 A | 2/1994 | Sato et al. |
| 4,905,839 A | 3/1990 | Yuge et al. | | 5,295,196 A | 3/1994 | Raterman et al. ............ 382/135 |
| 4,905,840 A | 3/1990 | Yuge et al. | | 5,297,030 A | 3/1994 | Vassigh et al. |
| 4,908,516 A | 3/1990 | West | | 5,304,813 A | 4/1994 | DeMan |
| 4,922,109 A | 5/1990 | Bercovitz et al. | | 5,308,992 A | 5/1994 | Crane et al. |
| 4,928,094 A | 5/1990 | Smith | | 5,309,515 A | 5/1994 | Troung et al. |
| 4,931,782 A | 6/1990 | Jackson | | 5,317,140 A | 5/1994 | Dunthorn |
| 4,947,441 A | 8/1990 | Hara et al. | | 5,321,238 A | 6/1994 | Kamata et al. |
| 4,948,174 A | 8/1990 | Thomson et al. | | 5,335,292 A | 8/1994 | Lovelady et al. |
| 4,954,697 A | 9/1990 | Kokubun et al. | | 5,341,408 A | 8/1994 | Melcher et al. |
| 4,958,235 A | 9/1990 | Sims et al. | | 5,342,165 A | 8/1994 | Graef et al. |
| 4,960,981 A | 10/1990 | Benton et al. | | 5,363,949 A | 11/1994 | Matsubayashi |
| 4,970,655 A | 11/1990 | Winn et al. | | 5,367,577 A | 11/1994 | Gotaas |
| 4,973,851 A | 11/1990 | Lee | | 5,368,147 A | 11/1994 | Menke et al. |
| 4,980,543 A | 12/1990 | Hara et al. | | 5,371,345 A | 12/1994 | LeStrange et al. |
| 4,984,280 A | 1/1991 | Abe | | 5,371,798 A | 12/1994 | McWhortor |
| 4,992,860 A | 2/1991 | Hamaguchi et al. | | 5,373,550 A | 12/1994 | Campbell et al. |
| 4,996,604 A | 2/1991 | Ogawa et al. | | 5,379,344 A | 1/1995 | Larsson et al. |
| 5,001,766 A | 3/1991 | Baird ..................... 382/290 | | 5,381,019 A | 1/1995 | Sato |
| 5,010,238 A | 4/1991 | Kadono et al. | | 5,383,754 A | 1/1995 | Sumida et al. |
| 5,023,782 A | 6/1991 | Lutz et al. | | 5,394,969 A | 3/1995 | Harbaugh |
| 5,025,483 A | 6/1991 | Dinan et al. .............. 382/58 | | 5,399,874 A | 3/1995 | Gonsalves et al. |
| 5,027,415 A | 6/1991 | Hara et al. | | 5,402,895 A | 4/1995 | Mikkelsen et al. |
| 5,040,226 A | 8/1991 | Elischer et al. | | 5,416,307 A | 5/1995 | Danek et al. |
| 5,047,871 A | 9/1991 | Meyer et al. | | 5,417,316 A | 5/1995 | Harbaugh |
| 5,053,607 A | 10/1991 | Carlson et al. .............. 705/18 | | 5,418,458 A | 5/1995 | Jeffers |
| 5,054,621 A | 10/1991 | Murphy et al. | | 5,419,424 A | 5/1995 | Harbaugh |
| 5,055,834 A | 10/1991 | Chiba | | 5,421,443 A | 6/1995 | Hatamachi et al. |
| 5,063,599 A | 11/1991 | Concannon et al. | | 5,422,467 A | 6/1995 | Graef et al. ................ 235/379 |
| 5,064,999 A | 11/1991 | Okamoto et al. | | 5,430,664 A | 7/1995 | Cargill et al. |
| 5,068,519 A | 11/1991 | Bryce | | 5,434,427 A | 7/1995 | Crane et al. |
| 5,076,441 A | 12/1991 | Gerlier | | 5,437,357 A | 8/1995 | Ota et al. |
| 5,091,961 A | 2/1992 | Baus, Jr. | | 5,438,184 A | 8/1995 | Roberts et al. |
| 5,097,517 A | 3/1992 | Holt | | 5,442,162 A | 8/1995 | Armel |
| 5,105,364 A | 4/1992 | Kawamura et al. | | 5,444,793 A | 8/1995 | Kelland |
| 5,105,601 A | 4/1992 | Horiguchi et al. | | 5,444,794 A | 8/1995 | Uhland, Sr. |
| 5,114,381 A | 5/1992 | Ueda et al. | | 5,453,601 A | 9/1995 | Rosen ..................... 235/379 |
| 5,119,433 A | 6/1992 | Will | | 5,459,304 A | 10/1995 | Eisenmann |
| 5,120,944 A | 6/1992 | Kern et al. | | 5,465,301 A | 11/1995 | Jotcham et al. |
| 5,122,754 A | 6/1992 | Gotaas | | 5,465,821 A | 11/1995 | Akioka |
| 5,134,663 A | 7/1992 | Kozlowski | | 5,467,405 A | 11/1995 | Raterman et al. ............ 382/135 |
| 5,135,115 A | 8/1992 | Miller et al. | | 5,467,406 A | 11/1995 | Graves et al. .............. 382/135 |
| 5,144,115 A | 9/1992 | Yoshida | | 5,468,941 A | 11/1995 | Sasaki |
| 5,146,067 A | 9/1992 | Sloan et al. | | 5,468,971 A | 11/1995 | Ebstein et al. |
| 5,146,512 A | 9/1992 | Weideman et al. | | 5,469,241 A | 11/1995 | Takahashi et al. |
| 5,151,607 A | 9/1992 | Crane et al. | | 5,471,039 A | 11/1995 | Irwin et al. ................. 235/441 |
| 5,154,272 A | 10/1992 | Nishiumi et al. | | 5,476,169 A | 12/1995 | Takarada et al. |
| 5,159,548 A | 10/1992 | Caslavka | | 5,481,377 A | 1/1996 | Udagawa et al. |
| 5,163,672 A | 11/1992 | Mennie .................. 271/187 | | 5,488,671 A | 1/1996 | Kern |
| 5,163,868 A | 11/1992 | Adams et al. | | 5,491,325 A | 2/1996 | Huang et al. |
| 5,167,313 A | 12/1992 | Dobbins et al. | | 5,504,822 A | 4/1996 | Holt |
| 5,179,517 A | 1/1993 | Sarbin et al. | | 5,506,691 A | 4/1996 | Bednar et al. |
| 5,183,142 A | 2/1993 | Latchinian et al. | | 5,509,692 A | 4/1996 | Oz |
| 5,184,115 A | 2/1993 | Black et al. | | D369,984 S | 5/1996 | Larsen ..................... D10/97 |
| 5,184,709 A | 2/1993 | Nishiumi et al. | | 5,523,575 A | 6/1996 | Machida et al. |
| 5,186,334 A | 2/1993 | Fukudome et al. | | 5,530,772 A | 6/1996 | Storey |
| 5,187,750 A | 2/1993 | Behera | | 5,530,773 A | 6/1996 | Thompson |
| 5,191,525 A | 3/1993 | LeBrun et al. | | 5,537,486 A | 7/1996 | Stratigos et al. |
| 5,193,121 A | 3/1993 | Elischer et al. | | 5,544,043 A | 8/1996 | Miki et al. |
| 5,198,976 A | 3/1993 | Form et al. | | 5,544,086 A | 8/1996 | Davis et al. |
| 5,199,543 A | 4/1993 | Kamagami et al. | | 5,545,885 A | 8/1996 | Jagielinski |
| 5,201,395 A | 4/1993 | Takizawa et al. | | 5,564,546 A | 10/1996 | Molbak et al. |
| 5,204,811 A | 4/1993 | Bednar et al. ............... 705/45 | | 5,586,036 A | 12/1996 | Pintsov |
| 5,206,915 A | 4/1993 | Kern et al. .................. 382/7 | | 5,590,196 A | 12/1996 | Moreau |
| 5,207,788 A | 5/1993 | Geib ..................... 271/122 | | 5,592,377 A | 1/1997 | Lipkin |
| 5,220,501 A | 6/1993 | Lawlor et al. | | 5,592,561 A | 1/1997 | Moore |
| 5,231,381 A | 7/1993 | Duwaer | | 5,594,225 A | 1/1997 | Botvin |
| 5,237,158 A | 8/1993 | Kern et al. | | 5,600,704 A | 2/1997 | Ahlberg et al. |
| 5,237,159 A | 8/1993 | Stephens et al. | | 5,600,732 A | 2/1997 | Ott et al. |

| | | | | | | |
|---|---|---|---|---|---|---|
| 5,602,933 A | 2/1997 | Blackwell et al. | | 6,074,334 A | 6/2000 | Mennie et al. ............... 493/438 |
| 5,602,936 A | 2/1997 | Green et al. | | 6,076,826 A | 6/2000 | Gerlier et al. |
| 5,607,040 A | 3/1997 | Mathurin, Sr. | | 6,078,683 A | 6/2000 | Denison et al. |
| 5,615,280 A | 3/1997 | Izawa et al. | | D427,623 S | 7/2000 | Kuwanda |
| 5,616,902 A | 4/1997 | Cooley | | 6,097,834 A | 8/2000 | Krouse et al. |
| 5,620,079 A | 4/1997 | Molbak | | 6,101,266 A | 8/2000 | Laskowski et al. |
| 5,633,949 A | 5/1997 | Graves et al. ............... 382/135 | | 6,105,007 A | 8/2000 | Norris |
| 5,640,463 A | 6/1997 | Csulits ...................... 382/135 | | 6,119,946 A | 9/2000 | Teicher |
| 5,652,802 A | 7/1997 | Graves et al. ............... 382/135 | | 6,128,402 A | 10/2000 | Jones et al. ............... 382/135 |
| 5,657,846 A | 8/1997 | Schwartz | | 6,131,718 A * | 10/2000 | Witschorik .................. 194/206 |
| 5,671,282 A | 9/1997 | Wolff et al. | | 6,141,438 A | 10/2000 | Blanchester |
| 5,678,046 A | 10/1997 | Cahill et al. | | 6,144,459 A | 11/2000 | Satou ........................ 358/1.15 |
| 5,680,472 A | 10/1997 | Conant | | 6,145,738 A | 11/2000 | Stinson et al. |
| 5,687,963 A | 11/1997 | Mennie ...................... 271/119 | | 6,181,837 B1 | 1/2001 | Cahill et al. |
| 5,692,067 A | 11/1997 | Raterman et al. ........... 382/135 | | 6,220,419 B1 | 4/2001 | Mennie ...................... 194/207 |
| 5,703,344 A | 12/1997 | Bezy et al. .................. 235/379 | | 6,237,739 B1 | 5/2001 | Mazur et al. ............... 194/207 |
| 5,704,491 A | 1/1998 | Graves ....................... 209/534 | | 6,241,069 B1 | 6/2001 | Mazur et al. ............... 194/207 |
| 5,708,810 A | 1/1998 | Kern et al. ................... 395/712 | | 6,256,407 B1 | 7/2001 | Mennie et al. ............... 382/135 |
| 5,719,948 A | 2/1998 | Liang | | 6,264,101 B1 | 7/2001 | Ryan et al. .................. 235/379 |
| 5,724,438 A | 3/1998 | Graves ....................... 382/135 | | 6,278,795 B1 | 8/2001 | Anderson et al. ........... 382/135 |
| 5,727,667 A | 3/1998 | Nye | | 6,282,523 B1 | 8/2001 | Tedesco et al. |
| 5,729,623 A | 3/1998 | Omatu et al. | | 6,283,366 B1 | 9/2001 | Hills et al. |
| 5,751,840 A | 5/1998 | Raterman et al. ........... 382/135 | | 6,311,819 B1 | 11/2001 | Stromme et al. ............. 194/207 |
| 5,751,842 A | 5/1998 | Riach et al. | | 6,318,537 B1 | 11/2001 | Jones et al. .................. 194/346 |
| 5,754,673 A | 5/1998 | Brooks et al. | | 6,351,551 B1 | 2/2002 | Munro et al. ................ 382/135 |
| 5,761,089 A | 6/1998 | McInerny | | 6,351,552 B1 | 2/2002 | Weaver et al. ............... 382/135 |
| 5,768,416 A | 6/1998 | Lech et al. ................... 382/180 | | 6,354,491 B2 | 3/2002 | Nichols et al. |
| 5,781,654 A | 7/1998 | Carney | | 6,363,164 B1 | 3/2002 | Jones et al. ................... 382/135 |
| 5,790,693 A | 8/1998 | Graves et al. ............... 382/135 | | 6,363,362 B1 | 3/2002 | Burfield ....................... 705/40 |
| 5,790,697 A | 8/1998 | Munro et al. ................ 382/135 | | 6,371,303 B1 | 4/2002 | Klein et al. .................. 209/534 |
| 5,799,767 A | 9/1998 | Molbak | | 6,373,965 B1 | 4/2002 | Liang |
| 5,806,650 A | 9/1998 | Mennie et al. ............... 194/206 | | 6,378,683 B2 | 4/2002 | Mennie ........................ 194/207 |
| 5,813,510 A | 9/1998 | Rademacher | | 6,381,354 B1 | 4/2002 | Mennie et al. ............... 382/135 |
| 5,815,592 A | 9/1998 | Mennie et al. ............... 382/135 | | 6,398,000 B1 | 6/2002 | Jenrick et al. ................ 194/200 |
| 5,822,448 A | 10/1998 | Graves et al. ............... 382/135 | | 6,415,983 B1 | 7/2002 | Ulvr et al. |
| 5,830,054 A | 11/1998 | Petri | | 6,430,320 B1 | 8/2002 | Jia et al. ...................... 382/289 |
| 5,832,104 A | 11/1998 | Graves et al. ............... 382/135 | | 6,459,806 B1 | 10/2002 | Raterman et al. ............ 382/135 |
| 5,832,463 A | 11/1998 | Funk | | 6,460,705 B1 | 10/2002 | Hallowell ..................... 209/534 |
| 5,842,188 A | 11/1998 | Ramsey et al. | | 6,473,519 B1 | 10/2002 | Pidhirny et al. |
| 5,852,811 A | 12/1998 | Atkins | | 6,493,461 B1 | 12/2002 | Mennie et al. ............... 382/135 |
| 5,867,589 A | 2/1999 | Graves et al. ............... 382/135 | | 6,516,078 B1 | 2/2003 | Yang et al. |
| 5,870,487 A | 2/1999 | Graves et al. ............... 382/135 | | 6,539,104 B1 | 3/2003 | Raterman et al. ............ 382/135 |
| 5,870,725 A | 2/1999 | Bellinger et al. | | 6,540,090 B1 | 4/2003 | Sakai et al. .................. 209/534 |
| 5,874,717 A | 2/1999 | Kern et al. ................... 235/379 | | 6,546,351 B1 | 4/2003 | Haycock et al. |
| 5,875,259 A | 2/1999 | Mennie et al. ............... 382/135 | | 6,550,671 B1 | 4/2003 | Brown et al. |
| 5,892,211 A | 4/1999 | Davis et al. | | 6,560,355 B2 | 5/2003 | Graves et al. ............... 382/135 |
| 5,894,937 A | 4/1999 | Schmidt | | 6,573,983 B1 | 6/2003 | Laskowski |
| 5,905,810 A | 5/1999 | Jones et al. ................... 382/135 | | 6,574,377 B1 | 6/2003 | Cahill et al. .................. 382/305 |
| 5,909,502 A | 6/1999 | Mazur ......................... 382/135 | | 6,588,569 B1 | 7/2003 | Jenrick et al. ................ 194/206 |
| 5,909,503 A | 6/1999 | Graves et al. ............... 382/135 | | 6,601,687 B1 | 8/2003 | Jenrick et al. ................ 194/206 |
| 5,912,982 A | 6/1999 | Munro et al. ................ 382/135 | | 6,603,872 B2 | 8/2003 | Jones et al. ................... 382/135 |
| 5,917,930 A | 6/1999 | Kayani et al. | | 6,611,351 B1 | 8/2003 | Simonoff .................... 358/1.18 |
| 5,918,748 A | 7/1999 | Clark et al. | | 6,621,919 B2 | 9/2003 | Mennie et al. ............... 382/135 |
| 5,923,413 A | 7/1999 | Laskowski | | 6,628,816 B2 | 9/2003 | Mennie et al. ............... 382/135 |
| 5,926,392 A | 7/1999 | York et al. | | 6,636,624 B2 | 10/2003 | Raterman et al. ............ 382/135 |
| 5,926,550 A | 7/1999 | Davis | | 6,637,576 B1 | 10/2003 | Jones et al. |
| 5,930,778 A | 7/1999 | Geer | | 6,647,136 B2 | 11/2003 | Jones et al. ................... 382/137 |
| 5,936,219 A | 8/1999 | Yoshida et al. | | 6,650,767 B2 | 11/2003 | Jones et al. ................... 382/135 |
| 5,938,044 A | 8/1999 | Weggesser .................. 209/534 | | 6,654,149 B1 | 11/2003 | Sheng .......................... 358/474 |
| 5,940,623 A | 8/1999 | Watts et al. | | 6,654,486 B2 | 11/2003 | Jones et al. ................... 382/135 |
| 5,940,844 A | 8/1999 | Cahill et al. | | 6,661,910 B2 | 12/2003 | Jones et al. ................... 382/135 |
| 5,943,655 A | 8/1999 | Jacobsen ..................... 705/30 | | 6,665,431 B2 | 12/2003 | Jones et al. ................... 382/135 |
| 5,947,255 A | 9/1999 | Shimada et al. | | 6,678,401 B2 | 1/2004 | Jones et al. ................... 382/135 |
| 5,960,103 A | 9/1999 | Graves et al. ............... 382/135 | | 6,678,402 B2 | 1/2004 | Jones et al. ................... 382/135 |
| 5,966,456 A | 10/1999 | Jones et al. ................... 382/135 | | 6,697,511 B1 | 2/2004 | Haycock |
| 5,982,918 A | 11/1999 | Mennie et al. ............... 382/135 | | 6,705,470 B2 | 3/2004 | Klein et al. .................. 209/534 |
| 5,992,601 A | 11/1999 | Mennie et al. ............... 194/207 | | 6,721,442 B2 | 4/2004 | Mennie et al. ............... 382/135 |
| 6,012,565 A | 1/2000 | Mazur ......................... 194/207 | | 6,724,926 B2 | 4/2004 | Jones et al. ................... 382/135 |
| 6,021,883 A | 2/2000 | Casanova et al. ............ 194/217 | | 6,724,927 B2 | 4/2004 | Jones et al. ................... 382/135 |
| 6,023,684 A | 2/2000 | Pearson | | 6,731,785 B1 | 5/2004 | Mennie et al. ............... 382/135 |
| 6,026,175 A | 2/2000 | Munro et al. ................ 382/135 | | 6,731,786 B2 | 5/2004 | Jones et al. ................... 382/135 |
| 6,028,951 A | 2/2000 | Raterman et al. ............ 382/135 | | 6,748,101 B1 | 6/2004 | Jones et al. ................... 382/135 |
| 6,036,344 A | 3/2000 | Goldenberg ................ 364/408 | | 6,778,693 B2 | 8/2004 | Jones et al. ................... 382/135 |
| 6,038,553 A | 3/2000 | Hyde, Jr. | | 6,785,405 B2 | 8/2004 | Tuttle et al. .................. 382/112 |
| 6,045,039 A | 4/2000 | Stinson et al. ............... 235/379 | | 6,786,398 B1 | 9/2004 | Stinson et al. |
| 6,065,672 A | 5/2000 | Haycock | | 6,798,899 B2 | 9/2004 | Mennie et al. ............... 382/135 |
| 6,068,194 A | 5/2000 | Mazur ......................... 235/492 | | 6,810,137 B2 | 10/2004 | Jones et al. ................... 382/135 |
| 6,072,896 A | 6/2000 | Graves et al. ............... 382/135 | | 6,843,418 B2 | 1/2005 | Jones et al. ................ 235/462.01 |
| 6,073,744 A | 6/2000 | Raterman et al. ............ 194/207 | | 6,860,375 B2 | 3/2005 | Hallowell et al. ............ 194/328 |

| | | | | | |
|---|---|---|---|---|---|
| 6,863,214 B2 | 3/2005 | Garner et al. ............... 235/379 | 7,762,380 B2 | 7/2010 | Freeman et al. ............. 194/210 |
| 6,866,134 B2 | 3/2005 | Stromme et al. ............. 194/207 | 7,778,456 B2 | 8/2010 | Jones et al. ................. 382/135 |
| 6,868,954 B2 | 3/2005 | Stromme et al. ............. 194/207 | 7,779,982 B2 | 8/2010 | Fitzgerald et al. ........... 194/206 |
| 6,880,692 B1 | 4/2005 | Mazur et al. ................. 194/207 | 7,806,317 B2 | 10/2010 | Laskowski ................. 235/379 |
| 6,883,707 B2 | 4/2005 | Nagasaka et al. ............ 235/379 | 7,817,842 B2 | 10/2010 | Mennie ...................... 382/137 |
| 6,913,130 B1 | 7/2005 | Mazur et al. ................. 194/207 | 7,849,994 B2 | 12/2010 | Klein et al. ................. 194/206 |
| 6,913,260 B2 | 7/2005 | Maier et al. .............. 271/265.04 | 7,873,576 B2 | 1/2011 | Jones et al. .................. 705/43 |
| 6,915,893 B2 | 7/2005 | Mennie ....................... 194/207 | 7,881,519 B2 | 2/2011 | Jones et al. ................. 382/135 |
| 6,929,109 B1 | 8/2005 | Klein et al. ................. 194/206 | 7,882,000 B2 | 2/2011 | Jones ........................... 705/35 |
| 6,955,253 B1 | 10/2005 | Mazur et al. ................. 194/207 | 7,885,880 B1 | 2/2011 | Prasad et al. .................. 705/35 |
| 6,957,733 B2 | 10/2005 | Mazur et al. ................. 194/215 | 7,900,829 B1 | 3/2011 | Folk et al. .................. 235/380 |
| 6,959,800 B1 | 11/2005 | Mazur et al. ................. 194/207 | 7,903,863 B2 | 3/2011 | Jones et al. ................. 382/135 |
| 6,962,247 B2 | 11/2005 | Maier et al. ................. 194/207 | 7,929,749 B1 | 4/2011 | Jones et al. ................. 382/135 |
| 6,980,684 B1 | 12/2005 | Munro et al. ................ 382/135 | 7,938,245 B2 | 5/2011 | Jenrick et al. ............... 194/206 |
| 6,994,200 B2 | 2/2006 | Jenrick et al. ............... 194/206 | 7,949,582 B2 | 5/2011 | Mennie et al. ................ 705/35 |
| 6,996,263 B2 | 2/2006 | Jones et al. ................. 382/135 | 7,962,411 B2 | 6/2011 | Prasad et al. .................. 705/45 |
| 7,000,828 B2 | 2/2006 | Jones .......................... 235/379 | 7,974,899 B1 | 7/2011 | Prasad et al. .................. 705/35 |
| 7,006,664 B2 | 2/2006 | Paraskevakos | 8,011,581 B1 | 9/2011 | Folk et al. .................. 235/385 |
| 7,016,767 B2 | 3/2006 | Jones et al. .................. 700/224 | 8,023,715 B2 | 9/2011 | Jones et al. ................. 382/135 |
| 7,028,888 B2 | 4/2006 | Laskowski ................. 235/379 | 8,041,098 B2 | 10/2011 | Jones et al. ................. 382/137 |
| 7,034,324 B2 | 4/2006 | Voser | 8,103,084 B2 | 1/2012 | Jones et al. ................. 382/140 |
| 7,036,651 B2 | 5/2006 | Tam et al. ................... 194/217 | 8,125,624 B2 | 2/2012 | Jones et al. .................. 356/71 |
| 7,082,216 B2 | 7/2006 | Jones et al. ................. 382/137 | 8,126,793 B2 | 2/2012 | Jones ........................... 705/35 |
| 7,092,560 B2 | 8/2006 | Jones et al. ................. 382/135 | 8,141,772 B1 | 3/2012 | Folk et al. .................. 235/379 |
| 7,103,206 B2 | 9/2006 | Graves et al. ............... 382/135 | 8,162,125 B1 * | 4/2012 | Csulits et al. ............... 194/206 |
| 7,103,438 B2 | 9/2006 | Hallowell et al. ........... 700/116 | 8,169,602 B2 | 5/2012 | Jones et al. .................. 356/71 |
| 7,113,615 B2 | 9/2006 | Rhoads et al. ............... 382/100 | 8,171,567 B1 * | 5/2012 | Fraser et al. .................. 726/32 |
| 7,113,925 B2 | 9/2006 | Waserstein et al. ........... 705/50 | 8,204,293 B2 | 6/2012 | Csulits et al. ............... 382/135 |
| 7,124,113 B1 | 10/2006 | Fairclough ..................... 705/50 | 2001/0006557 A1 | 7/2001 | Mennie et al. .............. 382/135 |
| 7,146,245 B2 | 12/2006 | Jones et al. .................. 700/224 | 2001/0015311 A1 | 8/2001 | Mennie ...................... 194/207 |
| 7,149,336 B2 | 12/2006 | Jones et al. ................. 382/135 | 2001/0018739 A1 | 8/2001 | Anderson et al. |
| 7,158,662 B2 | 1/2007 | Chiles ........................ 382/135 | 2001/0019624 A1 | 9/2001 | Raterman et al. ............ 382/135 |
| 7,171,032 B2 | 1/2007 | Jones et al. ................. 382/135 | 2001/0035603 A1 | 11/2001 | Graves et al. ........... 271/265.01 |
| 7,187,795 B2 | 3/2007 | Jones et al. ................. 382/135 | 2001/0053241 A1 | 12/2001 | Haycock |
| 7,191,657 B2 | 3/2007 | Maier et al. .................... 73/587 | 2002/0001393 A1 | 1/2002 | Jones et al. ................. 382/100 |
| 7,197,173 B2 | 3/2007 | Jones et al. ................. 382/135 | 2002/0020603 A1 | 2/2002 | Jones et al. ................. 194/346 |
| 7,200,255 B2 | 4/2007 | Jones et al. ................. 382/135 | 2002/0037097 A1 | 3/2002 | Hoyos et al. ................ 382/137 |
| 7,201,320 B2 | 4/2007 | Csulits et al. ............ 235/462.01 | 2002/0056605 A1 | 5/2002 | Mazur et al. ................ 194/207 |
| 7,201,340 B2 | 4/2007 | Dietrich et al. ............. 241/101.2 | 2002/0082993 A1 | 6/2002 | Hoyos et al. |
| 7,216,106 B1 | 5/2007 | Buchanan et al. | 2002/0085245 A1 | 7/2002 | Mennie et al. .............. 358/498 |
| 7,232,024 B2 | 6/2007 | Mazur et al. ................. 194/207 | 2002/0085745 A1 | 7/2002 | Jones et al. ................. 382/135 |
| 7,243,773 B2 | 7/2007 | Bochonok et al. | 2002/0100660 A1 | 8/2002 | Stieber et al. ............... 194/215 |
| 7,248,730 B2 | 7/2007 | Matsui et al. | 2002/0103757 A1 | 8/2002 | Jones et al. ................... 705/45 |
| 7,248,731 B2 | 7/2007 | Raterman et al. ............ 382/135 | 2002/0104785 A1 | 8/2002 | Klein et al. ................. 209/534 |
| 7,256,874 B2 | 8/2007 | Csulits et al. .................. 356/71 | 2002/0107801 A1 | 8/2002 | Jones et al. ................... 705/45 |
| 7,269,279 B2 | 9/2007 | Chiles ........................ 382/135 | 2002/0118871 A1 | 8/2002 | Jones et al. ................. 382/137 |
| 7,312,902 B2 | 12/2007 | Mastie et al. ................ 358/3.28 | 2002/0120572 A1 | 8/2002 | Bellucci et al. ............... 705/43 |
| 7,349,566 B2 | 3/2008 | Jones et al. ................. 382/139 | 2002/0122580 A1 | 9/2002 | Jones et al. ................. 382/137 |
| 7,362,891 B2 | 4/2008 | Jones et al. ................. 382/135 | 2002/0126885 A1 | 9/2002 | Mennie et al. .............. 382/135 |
| 7,366,338 B2 | 4/2008 | Jones et al. ................. 382/135 | 2002/0126886 A1 | 9/2002 | Jones et al. ................. 382/135 |
| 7,391,897 B2 | 6/2008 | Jones et al. ................. 382/135 | 2002/0131630 A1 | 9/2002 | Jones et al. ................. 382/137 |
| 7,419,088 B2 * | 9/2008 | Zhao et al. .................. 235/379 | 2002/0136442 A1 | 9/2002 | Jones et al. ................. 382/135 |
| 7,441,712 B2 | 10/2008 | Silverbrook et al. ......... 235/494 | 2002/0145035 A1 | 10/2002 | Jones ........................... 235/379 |
| 7,494,052 B1 | 2/2009 | Carpentar et al. ............ 235/379 | 2002/0154804 A1 | 10/2002 | Jones et al. ................. 382/135 |
| 7,505,831 B2 | 3/2009 | Jones et al. ................. 700/224 | 2002/0154805 A1 | 10/2002 | Jones et al. ................. 382/135 |
| 7,506,168 B2 | 3/2009 | Silverbrook et al. ......... 713/176 | 2002/0154806 A1 | 10/2002 | Jones et al. ................. 382/135 |
| 7,513,413 B2 * | 4/2009 | Graef et al. ................. 235/379 | 2002/0154807 A1 | 10/2002 | Jones et al. ................. 382/135 |
| 7,536,046 B2 | 5/2009 | Raterman et al. ............ 382/135 | 2002/0154808 A1 | 10/2002 | Jones et al. ................. 382/135 |
| 7,542,598 B2 | 6/2009 | Jones et al. ................. 382/135 | 2002/0181805 A1 | 12/2002 | Loeb et al. .................. 382/317 |
| 7,551,764 B2 | 6/2009 | Chiles et al. ................ 382/135 | 2002/0186876 A1 | 12/2002 | Jones et al. ................. 382/135 |
| 7,567,698 B2 | 7/2009 | Paraskevakos ............... 382/135 | 2003/0005303 A1 | 1/2003 | Auslander et al. ........... 713/176 |
| 7,574,377 B2 | 8/2009 | Carapelli ....................... 705/26 | 2003/0006278 A1 | 1/2003 | Maskatiya et al. |
| 7,590,274 B2 | 9/2009 | Raterman et al. ............ 382/135 | 2003/0009420 A1 | 1/2003 | Jones ........................... 705/39 |
| 7,591,428 B2 | 9/2009 | Freeman et al. ............. 235/449 | 2003/0015395 A1 | 1/2003 | Hallowell et al. ........... 194/206 |
| 7,599,543 B2 | 10/2009 | Jones et al. ................. 382/137 | 2003/0015396 A1 | 1/2003 | Mennie ...................... 194/206 |
| 7,600,626 B2 | 10/2009 | Hallowell et al. ........... 194/206 | 2003/0023557 A1 | 1/2003 | Moore .......................... 705/50 |
| 7,602,956 B2 | 10/2009 | Jones et al. ................. 382/135 | 2003/0059098 A1 | 3/2003 | Jones et al. ................. 382/135 |
| 7,619,721 B2 | 11/2009 | Jones et al. .................. 356/71 | 2003/0062242 A1 | 4/2003 | Hallowell et al. ........... 194/302 |
| 7,620,231 B2 | 11/2009 | Jones et al. ................. 382/137 | 2003/0080032 A1 | 5/2003 | Heidi et al. |
| 7,628,326 B2 | 12/2009 | Freeman et al. ............. 235/450 | 2003/0081824 A1 | 5/2003 | Mennie et al. .............. 382/135 |
| 7,635,082 B2 | 12/2009 | Jones .......................... 235/379 | 2003/0099379 A1 | 5/2003 | Monk et al. |
| 7,647,275 B2 | 1/2010 | Jones ........................... 705/40 | 2003/0108233 A1 | 6/2003 | Raterman et al. ............ 382/135 |
| 7,650,980 B2 | 1/2010 | Jenrick et al. ............... 194/206 | 2003/0121752 A1 | 7/2003 | Stromme et al. ............. 194/207 |
| 7,672,499 B2 | 3/2010 | Raterman et al. ............ 382/135 | 2003/0121753 A1 | 7/2003 | Stromme et al. ............. 194/207 |
| 7,686,151 B2 | 3/2010 | Renz et al. ................. 194/206 | 2003/0128240 A1 | 7/2003 | Martinez et al. ............. 345/764 |
| 7,724,938 B2 | 5/2010 | Paraskevakos | 2003/0132281 A1 | 7/2003 | Jones et al. ................. 235/379 |
| 7,726,457 B2 | 6/2010 | Maier et al. ................. 194/206 | 2003/0139994 A1 | 7/2003 | Jones ........................... 705/36 |
| 7,735,621 B2 | 6/2010 | Hallowell et al. ........... 194/206 | 2003/0168308 A1 | 9/2003 | Maier et al. ................. 194/207 |
| 7,753,189 B2 | 7/2010 | Maier et al. ................. 194/206 | 2003/0174874 A1 | 9/2003 | Raterman et al. ............ 382/135 |

| Pub. No. | Date | Inventor | Class |
|---|---|---|---|
| 2003/0182217 A1 | 9/2003 | Chiles | 705/35 |
| 2003/0183685 A1 | 10/2003 | Steele Moore et al. | 235/379 |
| 2003/0198373 A1 | 10/2003 | Raterman et al. | 382/135 |
| 2003/0202690 A1 | 10/2003 | Jones et al. | 382/139 |
| 2003/0233317 A1 | 12/2003 | Judd | 705/39 |
| 2004/0003980 A1 | 1/2004 | Hallowell et al. | 194/206 |
| 2004/0016621 A1 | 1/2004 | Jenrick et al. | 194/206 |
| 2004/0016797 A1 | 1/2004 | Jones et al. | 235/379 |
| 2004/0028266 A1 | 2/2004 | Jones et al. | 382/135 |
| 2004/0037456 A1 | 2/2004 | Haycock | 382/135 |
| 2004/0083149 A1 | 4/2004 | Jones | 705/35 |
| 2004/0131230 A1 | 7/2004 | Paraskevakos | |
| 2004/0145726 A1 | 7/2004 | Csulits et al. | 356/71 |
| 2004/0149538 A1 | 8/2004 | Sakowski | 194/207 |
| 2004/0153408 A1 | 8/2004 | Jones et al. | 705/43 |
| 2004/0154964 A1* | 8/2004 | Jones | 209/534 |
| 2004/0173432 A1 | 9/2004 | Jones | 194/216 |
| 2004/0182675 A1 | 9/2004 | Long et al. | 194/206 |
| 2004/0238619 A1 | 12/2004 | Nagasaka et al. | 235/379 |
| 2004/0251110 A1 | 12/2004 | Jenrick et al. | 194/207 |
| 2005/0029168 A1 | 2/2005 | Jones et al. | 209/534 |
| 2005/0035034 A1 | 2/2005 | Long et al. | 209/534 |
| 2005/0040225 A1 | 2/2005 | Csulits et al. | 235/379 |
| 2005/0045448 A1 | 3/2005 | Sugano et al. | 194/207 |
| 2005/0047642 A1 | 3/2005 | Jones et al. | 382/135 |
| 2005/0060055 A1 | 3/2005 | Hallowell et al. | 700/95 |
| 2005/0060059 A1 | 3/2005 | Klein et al. | 700/213 |
| 2005/0060061 A1 | 3/2005 | Jones | 700/226 |
| 2005/0077142 A1 | 4/2005 | Tam et al. | 194/217 |
| 2005/0086271 A1 | 4/2005 | Jones et al. | 707/200 |
| 2005/0087422 A1 | 4/2005 | Maier et al. | 194/207 |
| 2005/0108165 A1 | 5/2005 | Jones et al. | 705/43 |
| 2005/0117791 A2 | 6/2005 | Raterman et al. | 382/135 |
| 2005/0117792 A2 | 6/2005 | Graves et al. | 382/135 |
| 2005/0150738 A1 | 7/2005 | Hallowell et al. | 194/206 |
| 2005/0151995 A1 | 7/2005 | Hauser et al. | 358/1.15 |
| 2005/0163361 A1 | 7/2005 | Jones et al. | 382/135 |
| 2005/0163362 A1 | 7/2005 | Jones et al. | 382/137 |
| 2005/0169511 A1 | 8/2005 | Jones | 382/135 |
| 2005/0173221 A1 | 8/2005 | Maier et al. | 194/207 |
| 2005/0183928 A1 | 8/2005 | Jones et al. | 194/207 |
| 2005/0207634 A1 | 9/2005 | Jones et al. | 382/135 |
| 2005/0213803 A1 | 9/2005 | Mennie et al. | 382/135 |
| 2005/0241909 A1 | 11/2005 | Mazur et al. | 194/207 |
| 2005/0249394 A1 | 11/2005 | Jones et al. | 382/135 |
| 2005/0258235 A1 | 11/2005 | Silverbrook et al. | 235/379 |
| 2005/0265591 A1 | 12/2005 | Jones et al. | 382/135 |
| 2005/0267843 A1 | 12/2005 | Acharya et al. | 705/42 |
| 2005/0276458 A1 | 12/2005 | Jones et al. | 382/135 |
| 2005/0278239 A1 | 12/2005 | Jones et al. | 705/35 |
| 2005/0281450 A1 | 12/2005 | Richardson | 382/139 |
| 2005/0289030 A1 | 12/2005 | Smith | 705/35 |
| 2006/0010071 A1 | 1/2006 | Jones et al. | 705/42 |
| 2006/0054454 A1 | 3/2006 | Oh | |
| 2006/0078186 A1 | 4/2006 | Freeman et al. | 382/135 |
| 2006/0106717 A1 | 5/2006 | Randle et al. | 705/45 |
| 2006/0124724 A1 | 6/2006 | Kotovich et al. | 235/379 |
| 2006/0182330 A1 | 8/2006 | Chiles | 382/135 |
| 2006/0195567 A1 | 8/2006 | Mody et al. | 709/224 |
| 2006/0210137 A1 | 9/2006 | Raterman et al. | 382/135 |
| 2006/0274929 A1 | 12/2006 | Jones et al. | 382/135 |
| 2007/0040014 A1 | 2/2007 | Zhao et al. | 235/379 |
| 2007/0064991 A1 | 3/2007 | Douglas et al. | 382/137 |
| 2007/0071302 A1 | 3/2007 | Jones et al. | 382/135 |
| 2007/0076939 A1 | 4/2007 | Jones et al. | 382/135 |
| 2007/0078560 A1 | 4/2007 | Jones et al. | 700/224 |
| 2007/0095630 A1 | 5/2007 | Mennie et al. | 194/206 |
| 2007/0102863 A1 | 5/2007 | Burns et al. | 271/3.01 |
| 2007/0112674 A1 | 5/2007 | Jones et al. | 705/45 |
| 2007/0122023 A1 | 5/2007 | Jenrick et al. | 382/135 |
| 2007/0172106 A1 | 7/2007 | Paraskevakos | 382/135 |
| 2007/0172107 A1 | 7/2007 | Jones et al. | 382/135 |
| 2007/0209904 A1 | 9/2007 | Freeman et al. | 194/210 |
| 2007/0221470 A1 | 9/2007 | Mennie et al. | 194/216 |
| 2007/0237381 A1 | 10/2007 | Mennie et al. | 382/135 |
| 2007/0258633 A1 | 11/2007 | Jones et al. | 382/135 |
| 2007/0269097 A1 | 11/2007 | Chiles et al. | 382/135 |
| 2007/0278064 A1 | 12/2007 | Hallowell et al. | 194/206 |
| 2007/0288382 A1 | 12/2007 | Narayanan et al. | 705/45 |
| 2008/0006505 A1 | 1/2008 | Renz et al. | 194/206 |
| 2008/0033829 A1 | 2/2008 | Mennie et al. | 705/16 |
| 2008/0037856 A1 | 2/2008 | Paraskevakos | 382/140 |
| 2008/0044077 A1 | 2/2008 | Mennie et al. | 382/135 |
| 2008/0052189 A1 | 2/2008 | Walker et al. | 705/26 |
| 2008/0060906 A1 | 3/2008 | Fitzgerald et al. | 194/207 |
| 2008/0123932 A1 | 5/2008 | Jones et al. | 382/135 |
| 2008/0133411 A1 | 6/2008 | Jones et al. | 705/42 |
| 2008/0177420 A1 | 7/2008 | Klein et al. | 700/224 |
| 2008/0219543 A1 | 9/2008 | Csultis et al. | 382/135 |
| 2008/0285838 A1 | 11/2008 | Jones et al. | 382/135 |
| 2009/0001661 A1 | 1/2009 | Klein et al. | 271/258.01 |
| 2009/0013653 A1 | 1/2009 | Sekiguchi | |
| 2009/0022390 A1 | 1/2009 | Yacoubian et al. | 382/135 |
| 2009/0087076 A1 | 4/2009 | Jenrick | 382/135 |
| 2009/0090773 A1 | 4/2009 | Freeman | 235/450 |
| 2009/0148025 A1 | 6/2009 | Calman | 382/135 |
| 2009/0148027 A1 | 6/2009 | Paraskevakos | |
| 2009/0183967 A1 | 7/2009 | Hamasaki | |
| 2009/0236200 A1 | 9/2009 | Hallowell et al. | |
| 2009/0310188 A1 | 12/2009 | Jones et al. | 358/448 |
| 2009/0313159 A1 | 12/2009 | Jones et al. | 705/35 |
| 2010/0034454 A1 | 2/2010 | Jones et al. | 382/137 |
| 2010/0051687 A1 | 3/2010 | Jones et al. | 235/379 |
| 2010/0057617 A1 | 3/2010 | Jones et al. | 705/44 |
| 2010/0063916 A1 | 3/2010 | Jones et al. | 705/35 |
| 2010/0092065 A1 | 4/2010 | Jones et al. | 382/135 |
| 2010/0108463 A1 | 5/2010 | Renz et al. | 194/206 |
| 2010/0116619 A1 | 5/2010 | Jones | 194/217 |
| 2010/0163366 A1 | 7/2010 | Jenrick et al. | 194/206 |
| 2010/0236892 A1 | 9/2010 | Jones et al. | 194/206 |
| 2010/0263984 A1 | 10/2010 | Freeman et al. | 194/206 |
| 2010/0276485 A1 | 11/2010 | Jones et al. | 235/379 |
| 2010/0303111 A1 | 12/2010 | Kupershmidt | 372/25 |
| 2011/0035316 A2 | 2/2011 | Morgan et al. | 705/39 |
| 2011/0042178 A1 | 2/2011 | Luecking | 194/302 |
| 2011/0087599 A1 | 4/2011 | Jones | 705/45 |
| 2011/0099105 A1 | 4/2011 | Mennie et al. | 705/41 |
| 2011/0206267 A1 | 8/2011 | Jones et al. | 382/139 |
| 2011/0215034 A1 | 9/2011 | Mennie et al. | 209/534 |
| 2011/0220717 A1 | 9/2011 | Jones et al. | 235/380 |
| 2011/0255767 A1 | 10/2011 | Jenrick et al. | 382/135 |
| 2011/0258113 A1 | 10/2011 | Jones et al. | 705/39 |
| 2012/0008131 A1 | 1/2012 | Jones et al. | 356/71 |
| 2012/0008850 A1 | 1/2012 | Jones et al. | 382/135 |
| 2012/0013891 A1 | 1/2012 | Jones et al. | 356/71 |
| 2012/0013892 A1 | 1/2012 | Jones et al. | 356/71 |
| 2012/0077476 A1* | 3/2012 | Paraskevakos et al. | 455/414.2 |
| 2012/0150745 A1 | 6/2012 | Csulits et al. | 705/45 |
| 2012/0185083 A1 | 7/2012 | Klein et al. | 700/223 |
| 2012/0189186 A1 | 7/2012 | Csulits et al. | 382/135 |
| 2012/0215689 A1 | 8/2012 | Jones | 705/40 |

FOREIGN PATENT DOCUMENTS

| | | |
|---|---|---|
| DE | 28 24 849 A1 | 12/1979 |
| EP | 0 030 413 A1 | 6/1981 |
| EP | 0 071 421 A2 | 2/1983 |
| EP | 0 077 464 A2 | 4/1983 |
| EP | 0 083 062 A2 | 7/1983 |
| EP | 0 101 115 A1 | 2/1984 |
| EP | 0 109 743 A2 | 5/1984 |
| EP | 0 185 200 A2 | 6/1986 |
| EP | 0 253 935 A2 | 1/1988 |
| EP | 0 314 312 A2 | 5/1989 |
| EP | 0 325 364 A2 | 7/1989 |
| EP | 0 338 123 A2 | 10/1989 |
| EP | 0 342 647 A2 | 11/1989 |
| EP | 0 402 627 A1 | 12/1990 |
| EP | 0 416 916 A2 | 3/1991 |
| EP | 0 416 960 A1 | 3/1991 |
| EP | 0 473 106 A2 | 3/1992 |
| EP | 0 548 142 A1 | 6/1993 |
| EP | 0 578 875 A1 | 1/1994 |
| EP | 0 583 526 A1 | 2/1994 |
| EP | 0 583 723 A1 | 2/1994 |
| EP | 0 593 209 A2 | 4/1994 |
| EP | 0 612 042 A2 | 8/1994 |
| EP | 0 613 107 A1 | 8/1994 |
| EP | 0 616 296 A2 | 9/1994 |

| | | |
|---|---|---|
| EP | 0 632 415 A1 | 1/1995 |
| EP | 0 633 533 A2 | 1/1995 |
| EP | 0 633 552 A2 | 1/1995 |
| EP | 0 633 553 A1 | 1/1995 |
| EP | 0 661 654 A2 | 7/1995 |
| EP | 0 671 696 A1 | 9/1995 |
| EP | 0 718 809 A2 | 6/1996 |
| EP | 0 708 419 A1 | 1/2000 |
| EP | 0 824 736 A1 | 3/2000 |
| EP | 0 984 410 A1 | 3/2000 |
| EP | 0 686 292 A1 | 7/2000 |
| EP | 1 028 359 A1 | 8/2000 |
| EP | 0 760 987 A1 | 9/2000 |
| EP | 1 041 523 A2 | 10/2000 |
| EP | 1 134 704 A1 | 9/2001 |
| EP | 1 160 737 A1 | 12/2001 |
| EP | 1 437 692 A1 | 7/2004 |
| EP | 1 019 869 A1 | 10/2006 |
| EP | 1 004 089 A1 | 10/2007 |
| EP | 1 480 177 B1 | 11/2007 |
| EP | 1 008 096 A2 | 1/2008 |
| FR | 2 539 898 A1 | 7/1984 |
| FR | 2 722 316 A1 | 1/1996 |
| GB | 2 038 063 A | 7/1980 |
| GB | 2 190 996 A | 12/1987 |
| GB | 2 204 166 A | 11/1988 |
| GB | 2 272 762 A | 5/1994 |
| GB | 2 355 522 A | 4/2001 |
| GB | 2 464 826 A | 5/2010 |
| JP | 62-220843 A | 9/1987 |
| JP | 63-73497 A | 4/1988 |
| JP | 2-12492 A | 1/1990 |
| JP | 4-131986 A | 5/1992 |
| JP | 4-243497 A | 8/1992 |
| JP | 6-203248 A | 7/1994 |
| JP | 7-168857 A | 7/1995 |
| WO | WO 85/02148 A1 | 5/1985 |
| WO | WO 87/06041 A1 | 10/1987 |
| WO | WO 90/07165 A1 | 6/1990 |
| WO | WO 91/11778 | 8/1991 |
| WO | WO 92/04692 A1 | 3/1992 |
| WO | WO 92/14221 A1 | 8/1992 |
| WO | WO 92/16931 A2 | 10/1992 |
| WO | WO 92/17394 | 10/1992 |
| WO | WO 93/23824 | 11/1993 |
| WO | WO 94/06102 A1 | 3/1994 |
| WO | WO 94/16412 A1 | 7/1994 |
| WO | WO 94/19773 A1 | 9/1994 |
| WO | WO 95/10088 A1 | 4/1995 |
| WO | WO 95/19019 A2 | 7/1995 |
| WO | WO 95/24691 | 9/1995 |
| WO | WO 95/24691 A1 | 9/1995 |
| WO | WO 96/03719 A1 | 2/1996 |
| WO | WO 96/10800 | 4/1996 |
| WO | WO 96/29683 A1 | 9/1996 |
| WO | WO 96/36021 A1 | 11/1996 |
| WO | WO 96/36933 | 11/1996 |
| WO | WO 97/05583 A1 | 2/1997 |
| WO | WO 97/29459 A1 | 8/1997 |
| WO | WO 97/30422 | 8/1997 |
| WO | WO 97/30422 A1 | 8/1997 |
| WO | WO 97/43734 | 11/1997 |
| WO | WO 97/45810 | 12/1997 |
| WO | WO 98/12662 | 3/1998 |
| WO | WO 98/13785 | 4/1998 |
| WO | WO 98/24041 A1 | 6/1998 |
| WO | WO 98/24052 | 6/1998 |
| WO | WO 98/24052 A1 | 6/1998 |
| WO | WO 98/24067 | 6/1998 |
| WO | WO 98/26364 A1 | 6/1998 |
| WO | WO 98/35323 | 8/1998 |
| WO | WO 98/40839 | 9/1998 |
| WO | WO 98/40839 A2 | 9/1998 |
| WO | WO 98/47100 | 10/1998 |
| WO | WO 98/47100 A1 | 10/1998 |
| WO | WO 98/50892 | 11/1998 |
| WO | WO 98/51082 A1 | 11/1998 |
| WO | WO 99/00776 A1 | 1/1999 |
| WO | WO 99/09511 | 2/1999 |
| WO | WO 99/14668 | 3/1999 |
| WO | WO 99/23601 | 5/1999 |
| WO | WO 99/41695 | 8/1999 |
| WO | WO 99/48040 | 9/1999 |
| WO | WO 99/48042 | 9/1999 |
| WO | WO 99/50795 A1 | 10/1999 |
| WO | WO 99/50796 A1 | 10/1999 |
| WO | WO 00/24572 | 5/2000 |
| WO | WO 00/58876 A1 | 10/2000 |
| WO | WO 00/65546 | 11/2000 |
| WO | WO 01/08108 | 2/2001 |
| WO | WO 01/59685 | 8/2001 |
| WO | WO 01/59723 | 8/2001 |
| WO | WO 02/29735 | 4/2002 |
| WO | WO 02/054360 | 7/2002 |
| WO | WO 03/005312 | 1/2003 |
| WO | WO 03/028361 | 4/2003 |
| WO | WO 03/029913 | 4/2003 |
| WO | WO 03/030113 | 4/2003 |
| WO | WO 03/067532 | 8/2003 |
| WO | WO 03/107282 | 12/2003 |
| WO | WO 2004/010367 | 1/2004 |
| WO | WO 2004/027717 | 4/2004 |
| WO | WO 2004/036508 | 4/2004 |
| WO | WO 2004/038631 | 5/2004 |
| WO | WO 2004/068422 | 8/2004 |
| WO | WO 2005/013209 A2 | 2/2005 |
| WO | WO 2005/017842 A1 | 2/2005 |
| WO | WO 2005/028348 A2 | 3/2005 |
| WO | WO 2005/029240 A2 | 3/2005 |
| WO | WO 2005/036445 A1 | 4/2005 |
| WO | WO 2005/041134 A2 | 5/2005 |
| WO | WO 2005/076229 A1 | 8/2005 |
| WO | WO 2006/039439 A2 | 4/2006 |
| WO | WO 2006/076289 A2 | 7/2006 |
| WO | WO 2006/076634 A2 | 7/2006 |
| WO | WO 2007/044570 A2 | 4/2007 |
| WO | WO 2007/120825 A2 | 10/2007 |
| WO | WO 2007/143128 A2 | 12/2007 |
| WO | WO 2008/030356 A1 | 3/2008 |
| WO | WO 2008/112132 A1 | 9/2008 |
| WO | WO 2009/081085 A1 | 7/2009 |
| WO | WO 2011/109569 A1 | 9/2011 |

OTHER PUBLICATIONS

BARS: 5600 Currency Sorter, 6 pages (estimated prior to Aug. 12, 2003).
BARS: 6000 Single Note Inspection System, 6 pages (estimated prior to Aug. 12, 2003).
De La Rue: 2700 Currency Counting Machine—User Guide, Revision 1, 53 pages (Aug. 26, 1999).
Document Solutions Inc.: Image Solution, DialogWeb, "Bank Gets Big Response to Image Statements", Electronic Imaging Report, vol. 2, No. 9, 3 pages (May 6, 1992).
Glory: GFF-8CF and GFF-8 Desktop Currency and Check Counter, 4 pages (date estimated Jan. 1994).
Hayosh, Thomas D, "The History of the Check and Standardization Efforts," 5 pages, dated Sep. 26, 1995, available at http://home.comcast.net/~hayosh/HISTMICR.pdf (visited Sep. 22, 2011).
Litton Integrated Automation: Proceedings, SPIE—International Society for Optical Engineering, Optical Security and Anticounterfeiting Systems (vol. 1210), "High Speed Print Quality Inspection and Verification," by Cynthia Ott and Nagesh Chowla re MAVIS, 9 pages (Jan. 1990) [GL 010713-21].
NCR: NCR 5685 ATM Deposit Processing Module, DialogWeb, "NCR's ATM Captures Images at the Point of Deposit. (NCR Corp.'s New Automated Teller Machine)", Financial Services Report, vol. 10, No. 2, p. 8(1), 2 pages (Jan. 20, 1993).
NCR: Intelligent Deposit ATM's, "Mixes of cash, checks no problem with Regions Bank ATMs," article, 2 pages (Jun. 10, 2009).
Vector: Miscellaneous meeting notes and communications between Cummins Allison Corp. and Vector Co. Ltd regarding Vector imager, 65 pages (Apr. 1, 1996 to Jun. 15, 1997).
Vector Co. Ltd regarding Vector imager, 65 pages (Apr. 1, 1996 to Jun. 15, 1997).

Applied Communications Inc.: BASE24 software, "Applied Communications Announces Joint Venture," Business Wire, 3 ppages (Jan. 6, 1989).
AFB: AFB Currency Recognition System, 1 page (1982).
ATM Cardpay Corp: "ATM Cardpay Introduces New Bill Payment Idea," Retail Delivery Systems New, vol. 3, Iss. 1, p. 1; 2 pages (Jan. 16, 1998).
ATM Cardpay Corp: "The Next Generation of ATM Network Survival." ATM Cardpay Shows Switches How to Win Bill Presentment/Payment Market, vol. 20, Iss. 17; 3 pages (date Aug. 27, 1997.
AUI: Coinverter—"No More Lines . . . Self-Serve Cash-Out," by Cassius Elston, 1995 World Games Congress/Exposition Converter, 1 page (dated prior to 1995).
Barton, Louis L., "Check Processing Operations"—A Hands-On Guide to Developing and Managing a State-of-the-Art Check Processing Operation, Chp. 8 and App. 2, 31 pages (1994).
Brandt: Mach 7 High-Speed Coin Sorter/Counter, 2 pages (1992).
Brandt: Model 8904 Upfeed—"High Speed 4-Denomination Currency Dispenser," 2 pages (1989).
Cummins: JetScan™ Model 4060, Currency Scanner/Counter, Operator's Manual, 43 pages (Aug. 1991).
Cummins: JetScan™ Model 4060, Sale of JetScan Currency Scanner/Counter, 1 page (Aug. 1991).
Cummins: JetScan™ Model 4061, Currency Scanner/Counter—Operating Instructions, 47 pages (Apr. 20, 1993).
Cummins: JetScan™ Model 4061, Sale of JetScan Currency Scanner/Counter, 1 page (Apr. 20, 1993).
Cummins: JetScan™ Model 4062, Currency Scanner/Counter—Operating Instructions, 53 pages (Nov. 28, 1994).
Cummins: JetScan™ Model 4062, Sale of JetScan Currency Scanner/Counter, Model 4062, 1 page (Nov. 28, 1994).
Cummins: JetSort® High Speed Sorter/Counter Kits I & J—Operating Instructions (Form 022-7123-00) 12 pages (1994).
Currency Systems International: CPS 300 Currency Processing System, 4 pages (© 1992).
Currency Systems International: CPS 600/900, Description of CSI CPS 600 and CPS 900 devices, 1 page (date: estimated 1994).
Currency Systems International: CPS 600/900, Medium Speed Currency Sorting Family, CPS 600 and CPS 900, 4 pages (© 1994).
Currency Systems International: Mr. W. Kranister in Conversation with Richard Haycock, 5 pages. (estimated 1994).
EP App. No. 04 020 193.1 [claiming priority to U.S. Appl. No. 60/043,516], European Patent Office, Communication pursuant to Article 96(2), Discussion of FR 2 722 316, 4 pages (Jul. 18, 2005).
Elcom International Inc: PECOS Internet Procurement Manager, "Elcom.com and Visa Announce Systems Link to Offer B2B Ecommerce Solutions," PRNewsire, 4 pages (Nov. 29, 1999).
Glory: CRS-8000 Cash Redemption System, 2 pages (1996).
Glory: GFB-200/210/220/230 DeskTop Bank Note Counter brochure, 2 pages (estimated before Aug. 9, 1994).
Glory: GSA-500 Sortmaster brochure, 2 pages (estimated Jan. 14, 1994).
Glory: System 8000 Recycle Currency Processing Teller System, page 5 of General Catalogue of Glory Products, 2 pages (1995).
Glory: UF-1D brochure and translation, 2 pages (estimated before Aug. 9, 1994).
ISH Electronic: ISH 12005/500 Coin Counter (with translation), 4 pages (date unknown, prior to Aug. 1996).
ISH Electronic: ISH 12005/501 Self-Service Unit (with translation), 4 pages (date unknown, prior to Aug. 96).
J&B Software Inc.: "J&B Software Announces New Successes for TMS Image™ Remittance," 2 pages (date Mar. 23, 1998).
Perconta: Cassomat A.C.S. Automated Cash System Types I and II, 6 pages (1998).
Perconta: Contomat Coin Settlement Machine for Customer Self Service, 2 pages (date unknown, prior to Apr. 2003).
Prema GmbH: Prema 405 (RE) Self Service Coin Deposit Facility, 2 pages (date unknown, prior to Apr. 2003).
Reis Eurosystems: CRS 6501/CRS 6510 Cash Receipt Systems for Self-Service Area, 3 pages (date unknown, prior to Apr. 2003).
Scan Coin: CDS 600 Cash Deposit System, 2 pages (date unknown, maybe 1994).
Scan Coin: CDS 640 Cash Deposit System, "With Scan Coin's customer operated coin deposit system . . . ," 2 pages (date unknown, prior to Apr. 2003).

ShieldSpec LLC: Currency Manager for Law Enforcement, 1 page (downloaded from www.shieldspec.com/product.html on Aug. 18, 2010).
ShieldSpec LLC: Presentation on Currency Manager for Law Enforcement, 10 pages (downloaded from www.shieldspec.com/documents/CurrencyManagerLawEnforcement.pdf on Aug. 18, 2010), © 2005.
Toshiba/(Mosler): CF-400 Series Fitness Sorter, 6 pages (estimated 1989 or earlier).
(Toshiba)/Mosler: CF-420 Cash Management System—Operator's Manual, 137 pages (© 1989).
Toshiba/Mosler: CF-420—Description of Toshiba/Mosler CF-420 Device, 1 page (date estimated 1989).
Toshiba/Mosler: CF-420—Revised drawings of portions of Mosler CF-420 Cash Management System (Figs. A-C) and description of the same, 4 pages (1989).
Vector Tech.: Document Imaging Product Demonstration video on CD in .wmv format (Jun. 1996).
Andy Pargh, "Vending Machines Dispense New Tricks It's a Breeze. Just Drop in Your Money and Create a Card, Buy a Ticket or Even Pose for a Photo on the Moon.; [3 Star Editiion]." Orlando Sentinel, Orlando, Fla., Nov. 1, 1993, p. D2, ProQuest Oct. 19, 2010, 2 pages.
Cummins: JetScanTM iFX i100 Series Currency Scanner brochure (Form 023-1789), 6 pages (May 2009).
Cummins: JetScanTM iFX i100 Series Currency Scanner brochure (Form 023-1789, Rev. 1), 6 pages (Sep. 2009).
Cummins: JetScanTM iFX i100 Series Currency Scanner brochure (Form 023-1789, Rev. 2), 6 pages (© 2010).
Cummins: JetScanTM iFX Series i100 shell, "The Next Generation JetScan," (Form 023-1792), 2 pages (May 2009).
Cummins: JetScanTM iFX i100 Series Currency Scanner brochure, "Ideal for Law Enforcement Applications," (Form 023-1798), 1 page (Sep. 2009).
Cummins: JetScanTM iFX i100 Series Currency Scanner mailer, "Don't Let the Evidence Get Away!," (Form 023-1799), 2 pages (Sep. 2009).
Cummins: JetScanTM iFX i100 Series Currency Scanner mailer, "Two departments just made large drug busts . . . ," (Form 023-1820), 3 pages (Jun. 2010).
Cummins: JetScanTM iFX i100 Series Currency Scanner, Operating Instructions (Form 022-7614-00), 108 pages (Oct. 2010).
Cummins: JetScanTM iFX i100 Series Currency Scanner brochure, "Advanced Evidence Processing for Law Enforcement," (Form 023-1816), 6 pages (© 2010).
Cummins: JetScanTM iFX Series i100 brochure, "The Next Generation JetScan," (Form 023-1792 Rev. 1), 2 pages (Mar. 2011).
Cummins: JetScanTM iFX i100 Series, Quick Reference (022-7631-00), 28 pages (Mar. 2011).
Cummins: JetScanTM iFX i100 Currency and Check Processor website, "Revolutionizing the way you process currency and checks," (http://ifx.cumminsallison.com/models/i100), 2 pages (Jul. 2011).
Cummins: JetScanTM iFX Series i100 Currency and Check Solution brochure, "Never process a check or bill the same way again," (Form 023-1858), 6 pages (© 2011).
Cummins: JetScanTM iFX Series i100 Currency and Check Scanner brochure, "Never process a check or bill the same way again," (Form 023-1858), 6 pages (© 2011) [downloaded Jul. 20, 2011].
Cummins: JetScanTM iFX Series i100 Currency Scanner brochure, "Never Photocopy a Bill Again," (Form 023-1863), 4 pages (© 2011).
Cummins: JetScanTM iFX Series i200 Currency Scanner brochure, "20%, 60% Fewer Rejects," (Form 023-1859), 6 pages (© 2011).
Cummins: JetScanTM iFX i400 Series, Quick Reference (022-7669-00), 20 pages (May 2011).
Cummins: JetScanTM iFX i400 Series Currency Scanner, Operating Instructions (Form 022-7666-00), 87 pages (May 2011).
Cummins: JetScanTM iFX Series i400 Multi-Pocket Sorter brochure, "Smallest, fastest, most flexible multi-pocket sorter," (Form 023-1860), 6 pages (© 2011).
Cummins: JetScanTM iFX Image-Management Software, Operating Instructions (022-7615-00), 58 pages (Jul. 2011).
ASCOM: Cashflow Emerald, 2 pages, (date unknown, prior to Jan. 15, 2001).
De La Rue: CDS 5700 and CDS 5800 Cash Deponier System (German) and translation, 7 pages (date unknown, prior to Aug. 13, 1996).
NGZ Geldzahlmaschinengesellschaft: NGZ 2100 Automated Coin Depository, 4 pages (date unknown, prior to Sep. 1996).

* cited by examiner

FIG. 3E

| DOCUMENT | FULL IMAGE | SNIPPET IMAGE | EXTRACTED DATA | VALUE |
|---|---|---|---|---|
| | | | ACCOUNT #: 1237300 DESCRIPTION: DEPOSIT | |
| | | | TOTAL DEPOSIT: $100.00 TRANSACTION ID: ABC 0001 | |
| | | | NUMBER OF DOCUMENTS: 8 | |
| 1 | | CK 69860277A | CK69860277A | 20 |
| 2 | | CF 24421712C | CF24421712C | 20 |
| 3 | | AB 05953504A | AB05953504A | 20 |
| 4 | | CK 84783908B | CK84783908B | 10 |
| 5 | | CG 82996497C | CG82996497C | 10 |
| 6 | | DG 88733518A | DG88733518A | 10 |
| 7 | | DB 82975532A | DB82975532A | 5 |
| 8 | | DG 83511963A | DG83511963A | 5 |

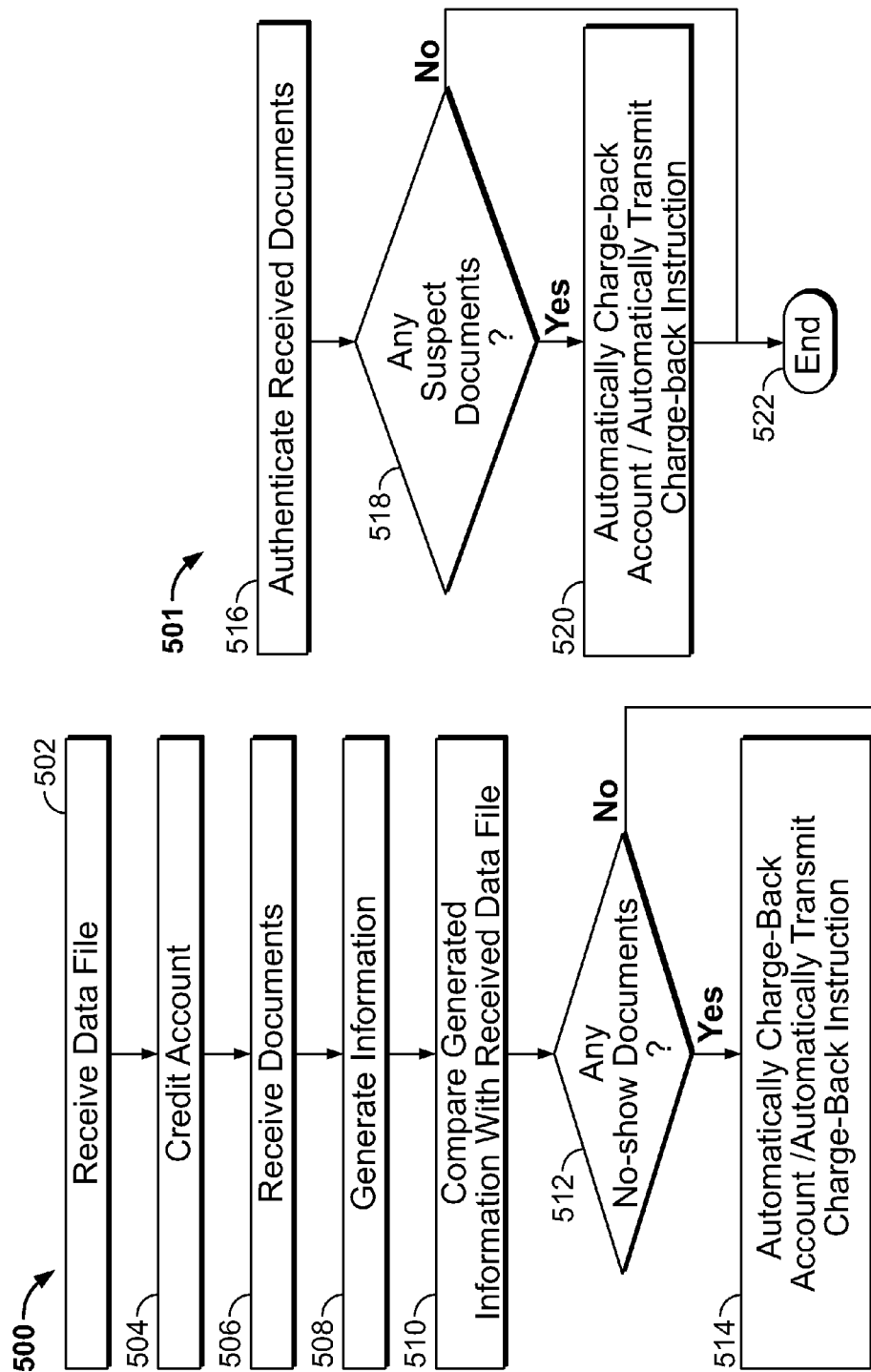

| Document ID 1210b | Snippet Image 1230b | Extracted Value 1240b | Document Type 1285 |
|---|---|---|---|
| 9493 | G48976304I | -G48976304I | Currency Bill |
| 9494 | L17737228G | -L17737228? | Currency Bill |
| 9495 | IC07946340A | I?07946340A | Currency Bill |
| 9496 | IH70821525C | IH70821525C | Currency Bill |
| 9497 | G09261392I | -G09261392 I | Currency Bill |

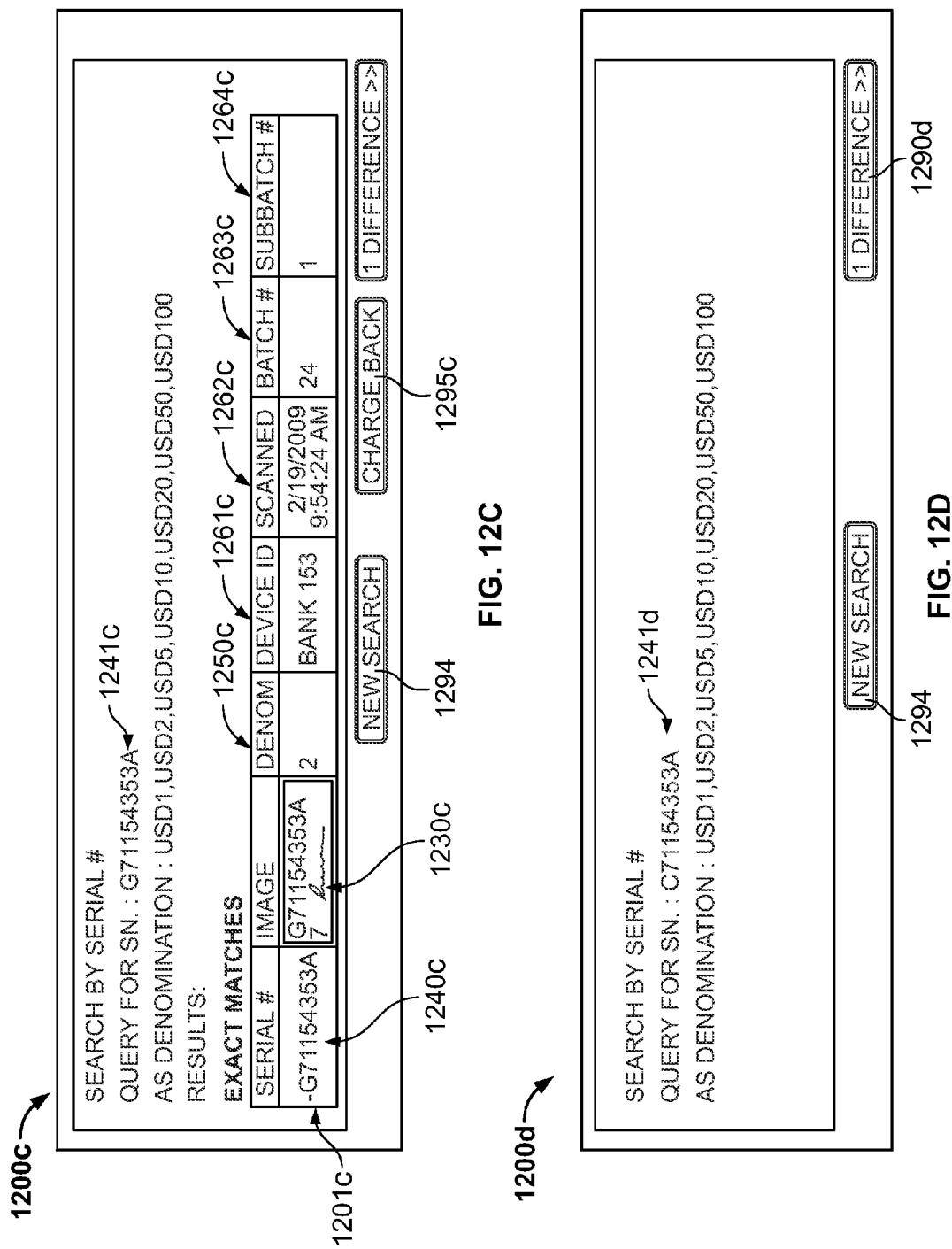

SEARCH BY SERIAL #
QUERY FOR SN.: C71154353A ← 1241d
AS DENOMINATION: USD1,USD2,USD5,USD10,USD20,USD50,USD100
RESULTS:

1 DIFFERENCE

| SERIAL # | IMAGE | DENOM | DEVICE ID | SCANNED | BATCH # | SUBBATCH # |
|---|---|---|---|---|---|---|
| -G71154353A | C71154353A | 2 | BANK 153 | 2/19/2009 9:54:24 AM | 24 | 1 |
| -?71154353A | G71154353A | 1 | BANK 303 | 11/19/2009 11:58:33 AM | 3 | 1 |

2 DIFFERENCES

| SERIAL # | IMAGE | DENOM | DEVICE ID | SCANNED | BATCH # | SUBBATCH # |
|---|---|---|---|---|---|---|
| -G71154351A | G71154351A | 5 | BANK 102 | 2/19/2009 9:00:05 AM | 1 | 1 |
| -G71154355A | G71154355A | 10 | BANK 175 | 4/14/2009 6:00:08 PM | 5 | 2 |
| -G71154357A | G71154357A | 20 | BANK 163 | 4/13/2009 10:30:00 AM | 3 | 5 |
| -G71154373A | G71154373A | 20 | BANK 057 | 12/12/2008 11:05:09 AM | 20 | 3 |
| -G71154358A | G71154358A | 100 | BANK 002 | 1/15/2009 7:00:53 PM | 30 | 2 |
| -?71154357A | G71154356A | 50 | BANK 190 | 2/14/2009 6:00:30 PM | 2 | 1 |
| -?71154354A | G71154354A | 1 | BANK 153 | 3/9/2009 1:43:00 PM | 7 | 1 |

[<< 1 DIFFERENCE]  [NEW SEARCH]  [CHARGE BACK]  [3 DIFFERENCES >>]

FIG. 12F

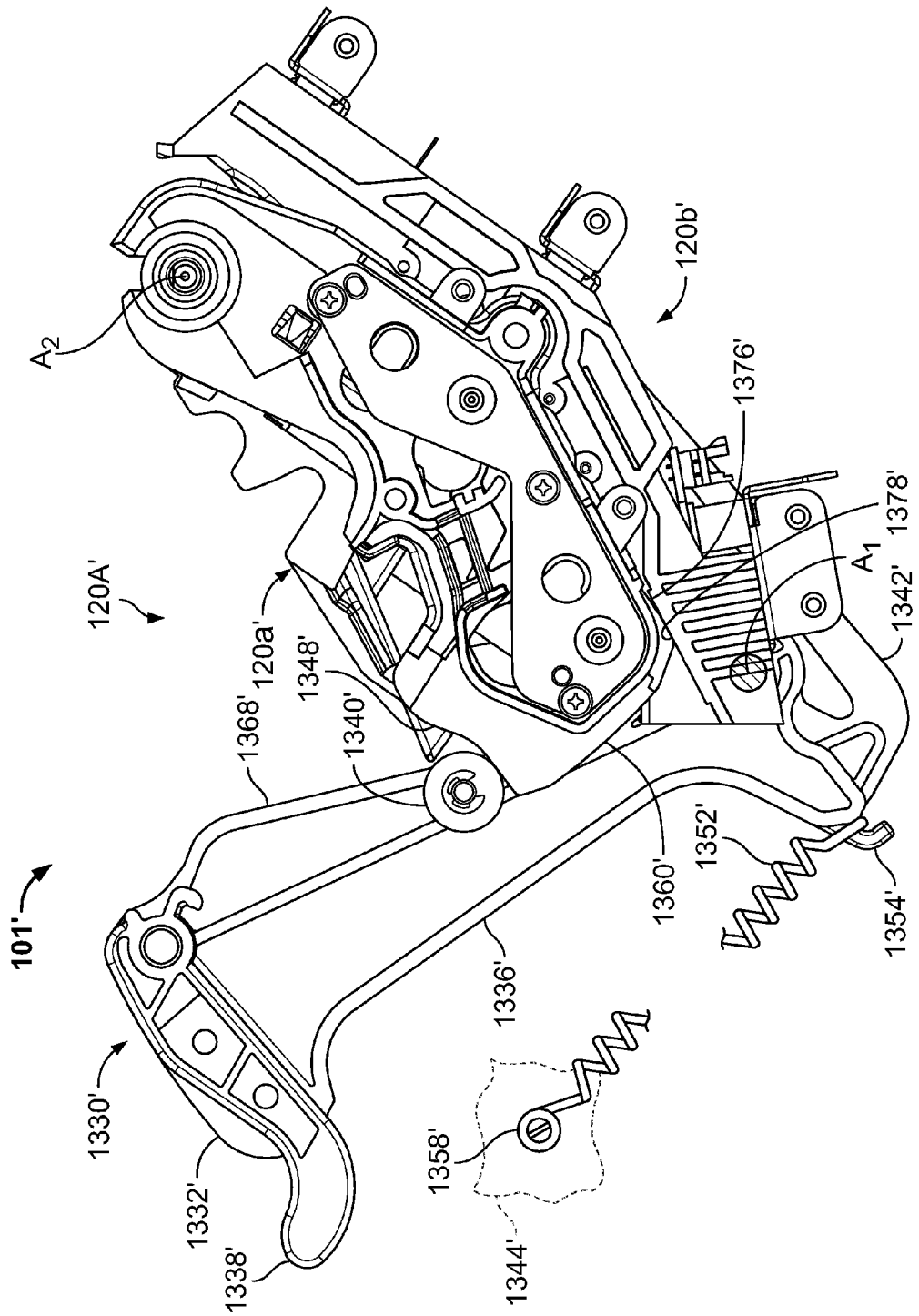

APPARATUS AND SYSTEM FOR IMAGING CURRENCY BILLS AND FINANCIAL DOCUMENTS AND METHOD FOR USING THE SAME

CROSS REFERENCE TO RELATED APPLICATIONS

This application claims the benefits of U.S. Provisional Application No. 61/169,690, filed Apr. 15, 2009, U.S. Provisional Application No. 61/242,668, filed Sep. 15, 2009, U.S. Provisional Application No. 61/259,018, filed Nov. 6, 2009, and U.S. Provisional Application No. 61/323,213, filed Apr. 12, 2010; this application is a continuation-in-part of prior U.S. patent application Ser. No. 12/544,052, filed Aug. 19, 2009, which is a continuation of prior U.S. patent application Ser. No. 11/199,511, filed Aug. 8, 2005, now U.S. Pat. No. 7,599,543, which is a divisional of prior U.S. patent application Ser. No. 09/965,428, filed Sep. 27, 2001, now U.S. Pat. No. 7,187,795; this application is a continuation-in-part of prior U.S. patent application Ser. No. 10/638,231, filed Aug. 7, 2003, which is a continuation-in-part of prior U.S. patent application Ser. No. 09/965,428, filed Sep. 27, 2001, now U.S. Pat. No. 7,187,795; all of the foregoing applications are hereby incorporated by reference herein in their entireties.

FIELD OF THE INVENTION

The field of the invention relates generally to imaging currency bills and financial documents and apparatuses, systems, and methods for doing the same.

BACKGROUND

Previous document processing devices for financial documents have various shortcomings.

SUMMARY

According to some embodiments, a system for processing currency bills includes an input receptacle, an image scanning system, a transport mechanism, a memory, a processor, and a display. The input receptacle is configured to receive a stack of currency bills. The image scanning system is configured to obtain image data that is reproducible as a visually-readable image of one or more portions of at least one side of each currency bill. The image scanning system is configured to extract a serial number and at least one or more additional characters from the image data for the currency bill. The transport mechanism is configured to transport each of the currency bills in the stack, in a serial fashion, from the at least one input receptacle, past the image scanning system, to at least one output receptacle. The memory is configured to store serial number information and corresponding additional character information associated with serial numbers of genuine currency bills. The serial number information and corresponding additional character information uniquely identify a genuine currency bill. The processor is configured to compare the extracted serial number and corresponding extracted one or more additional characters with the stored serial number information and the corresponding additional character information associated with serial numbers of genuine currency bills. The processor, or another processor, is further configured to identify as a suspect currency bill any currency bill from the stack with extracted serial numbers that do not have one or more extracted additional characters matching the serial number information and corresponding additional character information stored in the memory. The display is configured to display an image of at least a portion of the image data associated with the suspect currency bill and one or more of the extracted serial number, additional characters, or any combination thereof.

According to some embodiments, a method of processing currency bills includes receiving a stack of a stack of currency bills in an input receptacle of a document processing device. The currency bills are transported from the input receptacle, past an image scanner, and to an output receptacle. Image data reproducible as a visually readable image of one or more portions of at least one side of each currency bill in the stack is obtained via the image scanner. A serial number and at least one or more additional characters are extracted from the image data for each currency bill. A processor compares the extracted serial number and corresponding extracted one or more additional characters with stored serial number information and corresponding stored additional character information associated with the serial number information of genuine currency bills, the stored serial number information and corresponding stored additional character information stored in a memory, the stored serial number information and corresponding stored additional character information uniquely identifying a genuine currency bill. Any currency bill that does not have the extracted serial number and corresponding one or more extracted additional characters matching the stored serial number information and corresponding stored additional character information is flagged.

According to some embodiments, a method of processing currency bills includes receiving a stack of currency bills in an input receptacle of a document processing device. Image data reproducible as a visually readable image of one or more portions of at least one side of each of a plurality of currency bills is obtained. A serial number and additional character information is extracted from a predetermined field of the image data for each currency bill. A processor compares the extracted serial number and corresponding additional character information with master serial number information for genuine currency bills and master corresponding additional character information associated with the master serial number information. The master serial number information and master corresponding additional character information uniquely identifies a genuine currency bill. Any currency bill that does not have an extracted serial number and extracted additional character information matching the master serial number information and master corresponding additional character information is flagged.

According to some embodiments, a system for processing currency bills includes an input receptacle, an image scanning system, a transport mechanism, a memory, a processor, and a display. The input receptacle is configured to receive a stack of currency bills. The image scanning system is configured to obtain image data that is reproducible as a visually readable image of one or more portions of at least one side of each currency bill. The image scanning system is configured to extract a serial number and at least one or more additional characters from the image data for the currency bill. The transport mechanism is configured to transport each of the currency bills in the stack, in a serial fashion, from the input receptacle, past the image scanning system, to at least one output receptacle. The memory is configured to store serial number information and corresponding additional character information associated with serial numbers for currency bills of interest. The serial number information and corresponding additional character information uniquely identifies a currency bill of interest. The processor is configured to compare the extracted serial number and corresponding extracted one or more additional characters with the stored serial number information and the corresponding stored additional character information associated with serial numbers of currency bills of interest. The processor, or another processor, is further configured to identify as target currency bills any currency bill from the stack with extracted serial numbers that match the serial number information and corresponding additional character information stored in the memory. The display is configured to display an image associated with at least a portion of the image data obtained from a target currency bill.

According to some embodiments, a method of processing currency bills includes receiving a stack of currency bills in an input receptacle of a document processing device. The stack of currency bills has an associated depositor identifier. Image data reproducible as a visually readable image of one or more portions of at least one side of each of a plurality of currency bills is obtained. A serial number and additional characters are extracted from respective predetermined fields of the image data for each currency bill. A processor compares the extracted serial number and corresponding additional characters from the predetermined fields with stored serial number information and corresponding stored additional character information of the currency bills of interest, the stored additional character information associated with the stored serial number information of currency bills of interest, the stored serial number information and corresponding stored additional character information uniquely identifying a currency bill of interest. Any currency bill that has an extracted serial number and extracted additional predetermined character field matching the serial number information and corresponding additional character information received into the memory is flagged.

Additional aspects of the present disclosure will be apparent to those of ordinary skill in the art in view of the detailed description of various embodiments, which is made with reference to the drawings, a brief description of which is provided below.

BRIEF DESCRIPTION OF THE DRAWINGS

FIG. 3E is a representation of a data file including a plurality of records of a plurality of currency bills according to some embodiments of the present disclosure;

FIG. 5A is a flowchart describing the operation of a financial institution system according to some embodiments of the present disclosure;

FIG. 5B is a flowchart describing an authentication operation of some embodiments of the financial institution system of FIG. 5A;

FIG. 12B is a representation of a database of records according to some embodiments of the present disclosure;

FIG. 12C is a representation of a search result summary of a search according to some embodiments of the present disclosure;

FIG. 12D is a representation of a search result summary of another search according to some embodiments of the present disclosure;

FIG. 12F is a representation of a third search of the another search of FIG. 12D according to a modified set of parameters;

FIG. 13C is a side view of the document processing device of FIG. 2A with the housing and other selected components removed to illustrate a latch mechanism retaining the transport mechanism in the closed position according to some embodiments;

FIGS. 23A-B represent a report with fields automatically populated with selected information extracted from a currency bill according to certain embodiments of the present disclosure;

Figure 1:
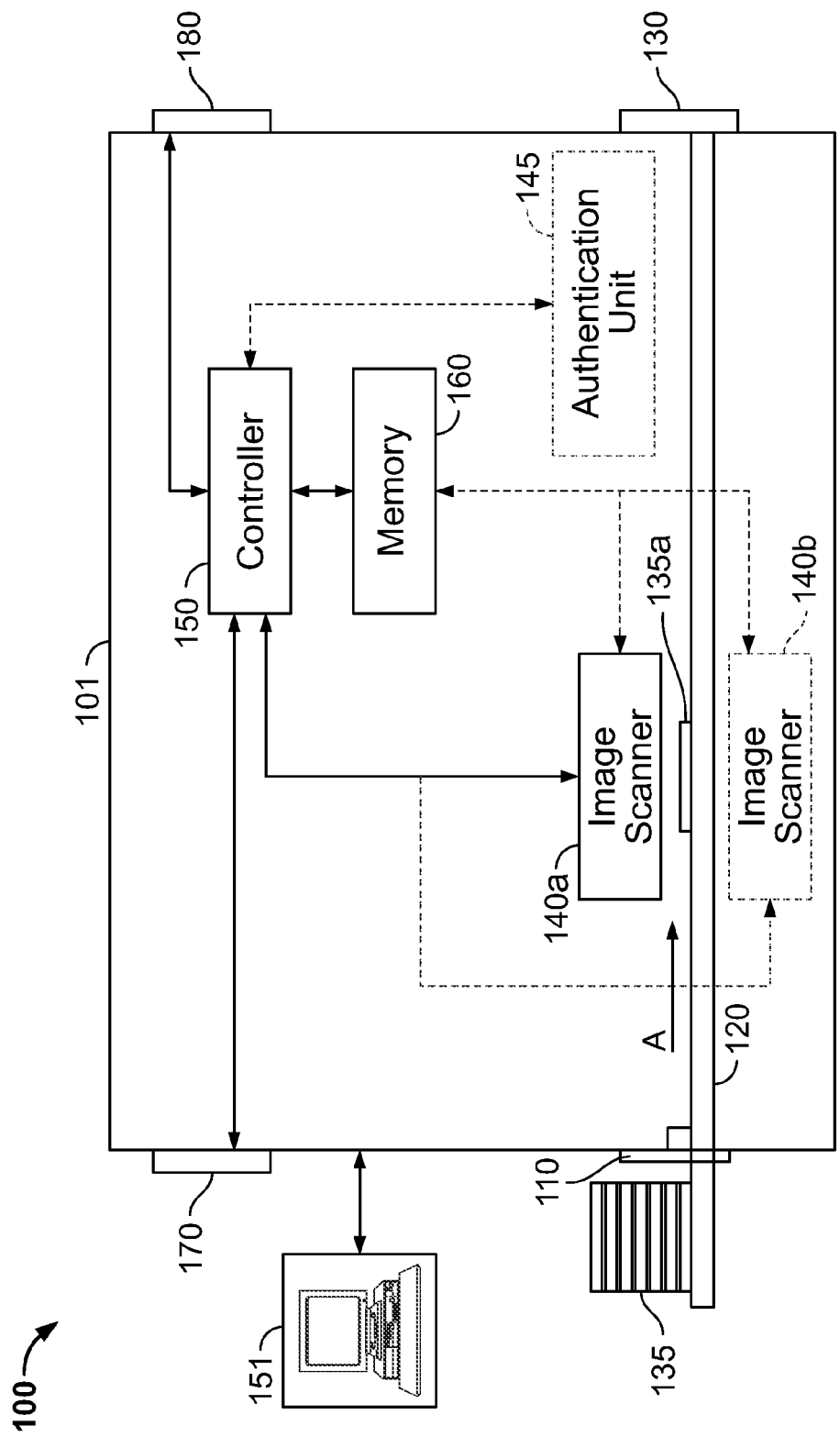
FIG. 1 is a block diagram of a document processing system according to some embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF ILLUSTRATIVE EMBODIMENTS

All of the following listed U.S. patent applications and U.S. patents are hereby incorporated by reference herein in their entireties:

U.S. patent application Ser. No. 08/664,262, filed May 13, 1996, now U.S. Pat. No. 5,982,918, entitled "Automatic Funds Processing System";

U.S. patent application Ser. No. 08/864,423, filed May 28, 1997, now U.S. Pat. No. 6,311,819, entitled "Method and Apparatus for Document Processing";

U.S. patent application Ser. No. 09/059,813, filed Apr. 14, 1998, now U.S. Pat. No. 6,661,910, entitled "Network For Transporting and Processing Images in Real Time";

U.S. patent application Ser. No. 08/814,978, filed Mar. 11, 1997, now U.S. Pat. No. 6,363,164, entitled "Automated Document Processing System Using Full Image Scanning";

U.S. patent application Ser. No. 09/635,967, filed Aug. 10, 2000, now U.S. Pat. No. 6,929,109, entitled "Method and Apparatus for Document Processing";

U.S. patent application Ser. No. 09/965,428, filed Sep. 27, 2001, now U.S. Pat. No. 7,187,795, entitled "Document Processing System Using Full Image Scanning";

U.S. patent application Ser. No. 10/981,315, filed Nov. 2, 2004, now allowed, entitled "Multiple Pocket Currency Bill Processing Device and Method";

U.S. patent application Ser. No. 10/068,977, filed Feb. 8, 2002, now U.S. Pat. No. 6,860,375, entitled "Multiple Pocket Currency Bill Processing Device and Method";

U.S. patent application Ser. No. 10/638,231, filed Aug. 7, 2003, entitled "Currency Bill Tracking System";

U.S. patent application Ser. No. 10/903,745, filed Jul. 30, 2004, now allowed, entitled "Currency Processing Device, Method and System";

U.S. patent application Ser. No. 11/036,686, filed Jan. 14, 2005, now allowed, entitled "Currency Processing Device, Method and System";

U.S. patent application Ser. No. 11/048,296, filed Feb. 1, 2005, entitled "Automated Document Processing System and Method Using Image Scanning";

As stated above, all of the above mentioned U.S. patent applications and U.S. patents are hereby incorporated by reference herein in their entireties.

DEFINITIONS

When describing various embodiments, the term "currency bills" refers to official currency bills including both U.S. currency bills, such as a $1, $2, $5, $10, $20, $50, or $100 bills, and foreign currency bills. Foreign currency bills are notes issued by a non-U.S. governmental agency as legal tender, such as a euro, Japanese yen, pound sterling (e.g., British pound), Canadian dollar, Australian dollar bill, Mexican Peso, or Turkish lira.

The term "brick U.S. currency bills" generally refers to U.S. currency bills in mint or near mint condition having the highest fitness level. Brick U.S. currency can also refer to non-circulated U.S. currency bills, such as, for example, new bills shipped by the U.S. Federal Reserve to commercial banks. Brick U.S. currency bills are crisp, free of holes, free of tears, free of wrinkles, free of stray markings (pen and/or pencil marks), etc.

The term "general circulation U.S. currency bills" refers to random U.S. currency bills having a variety of different fitness levels (e.g., some mint bills, some near mint bills, some heavily worn bills, some bills with holes, some bills with tears, some soiled bills, or combinations thereof). For example, general circulation U.S. currency bills would include currency bills scheduled to be deposited by a retail store in a bank for a given workday and/or work week that were collected from customers. For another example, general circulation U.S. currency bills include all of or a portion of the bills in a bank vault. For another example, general circulation U.S. currency bills do not only include heavily worn bills and/or torn bills.

The term "star note" refers to a U.S. currency bill that has an asterisk (*), or star, after the serial number. A U.S. currency bill that is discovered to have been printed incorrectly (such as having the serial numbers upside down, etc.) can be replaced with a star note because no two bills within a certain series can be produced with the same serial number in the U.S. According to some embodiments, star note serial numbers including an asterisk can be extracted and processed in the same, or similar, manner as non-star notes described herein.

The term "wildcard character" refers to a character that matches zero or more other characters, such as "a-z" or "0-9," during a comparison operation. That is, a wildcard character can be used to substitute for or represent any other character or characters in a string of characters. There are two types of wildcard characters disclosed herein, which include "a single wildcard character" and "a multiple wildcard character." A single wildcard character represents exactly one character. The exactly one represented character can be any character, such as, for example, any letter "a" through "z" irrespective of case, any single digit number "0" through "9," or any symbol. As described in detail in the Modes of Operation—Searching/Master Database Section, single wildcard characters can be substituted for and/or used to represent individual identifier characters that were not determined during character extraction. A common single wildcard character is a question mark "?" symbol. That is, according to some embodiments, the "?" can serve as a placeholder for a single unknown character. A multiple wildcard character represents zero or more characters. The zero or more represented characters can be any combination of characters, such as, for example, letters "a" through "z" irrespective of case, numbers "0" through "9," and/or symbols. As described in detail in the Modes of Operation—Searching/Master Database Section, target identifiers, such as a target serial number or a portion thereof, can include one or more multiple wildcard characters to perform many types of searches. A common multiple wildcard character is a percent symbol "%."

"Substitute currency notes" are sheet-like documents similar to currency bills, but are issued by non-governmental agencies such as casinos and amusement parks and include, for example, casino script and Disney Dollars. Substitute currency notes each have a denomination and an issuing entity associated therewith such as, for example, a $5 Disney Dollar, a $10 Disney Dollar, a $20 ABC Casino note, and a $100 ABC Casino note.

"Currency notes" consist of currency bills and substitute currency notes.

"Substitute currency media" are documents that represent a value by some marking or characteristic such as a bar code, color, size, graphic, or text. Examples of "substitute currency media" include without limitation: casino cashout tickets (also variously called cashout vouchers or coupons) such as, for example, "EZ Pay" tickets issued by International Gaming Technology or "Quicket" tickets issued by Casino Data Systems; casino script; promotional media such as, for example, Disney Dollars or Toys 'R Us "Geoffrey Dollars"; or retailer coupons, gift certificates, gift cards, or food stamps. Accordingly, substitute currency media includes, but is not limited to, substitute currency notes. Substitute currency media may or may not be issued by a governmental body.

The term "currency documents" includes both currency bills and "substitute currency media." The term "non-currency documents" includes any type of document except currency documents. For example, non-currency documents include personal checks, commercial checks, deposit slips, loan payment documents, cash credit or cash debit tickets, etc. The terms "financial documents" and "documents" are used throughout the specification to generally refer to any of currency bills, substitute currency notes, currency notes, substitute currency media, currency documents, and non-currency documents. According to some embodiments, the term document can also refer to full sheets of letter sized (e.g., 8½"×11") and/or A4 sized documents. According to some such embodiments, a document processing system or device of the present disclosure can be configured to run in a scan-only mode that scans documents, including full sheets of letter and/or A4 sized documents, to generate a visually readable image of the document.

The term "deposit document" includes deposit slips, cash-in tickets, and cash-out tickets. A deposit document is generally associated with a deposit of currency bills and/or checks into, for example, a bank by a bank customer. A deposit slip can include information such as, for example, a customer financial account number, a total deposit amount, a total currency bill deposit amount, a number of deposited currency bills broken down by denomination, a total check deposit amount, a number of deposited checks broken down by on-us checks and transit checks, a total on-us check deposit amount, a total transit check deposit amount, a total cashout amount, or combinations thereof.

Everyday, businesses and people unknowingly accept counterfeit currency documents as genuine. A counterfeit currency document is a currency document which is not issued by an authorized maker and/or a currency document which has been altered, for example, a $1 bill which has been altered to appear to be a $20 bill. For example, in the case of U.S. currency bills, a counterfeit currency bill would be a document printed to look like a genuine U.S. bill but not printed by the U.S. Treasury Department's Bureau of Engraving and Printing or one that has been tampered with or altered. As another example, in the case of casino script, a counterfeit currency document would be a script that is not issued by the corresponding casino or one that has been tampered with or altered.

The term "financial institution" as used herein includes, but is not limited to, banks, such as, brick and mortar banks, internet/online banks, casinos, brokers, investment banks, and armored carriers. Armored carriers can be stand alone financial institutions and/or agents of another financial institution.

Throughout this disclosure, the terms "Store" and "Bank" are used for ease of description to describe parties involved in typical document transactions according to some embodiments of the present disclosure. It should be understood, however, that this disclosure also applies to people, companies, corporations, financial institutions, and any other entity that receives and/or transmits documents and/or visually readable images of documents. For example, the term Bank can also be used to refer to a financial institution. Additionally, the term Store can be used to refer to any financial institution customer or bank customer that retains an account at a bank, such as, for example, a casino, an armored carrier, a supermarket, a toy store, an amusement park, a school district, a municipality, a law firm, a restaurant, or other enterprise. The term Store can also include individual consumers and/or self employed enterprises.

Throughout this disclosure, the term "operator" is used to refer to a person or persons operating a document processing device or system under normal operating conditions such as, for example, a store clerk, a store manager, a bank employee, a bank teller, or a bank customer.

Throughout this disclosure, the term "teller" is used to refer to a person or persons that processes deposits of documents at a bank branch, a bank vault, an ATM, an armored carrier, etc.

Throughout this disclosure, the term "batch" is used to refer to a set of documents that is associated with a transaction. A batch of documents can include one or more deposit documents, one or more currency bills, one or more checks, a header card, a trailer card, or any combination thereof. For example, a batch of documents associated with a first transaction between a store and a bank can include ten documents, the ten documents including one deposit slip, eight currency bills, and one check. For another example, a batch of documents associated with a second transaction between an individual and a bank can include twenty-five documents, the twenty-five documents including one deposit slip, twenty currency bills, and four checks.

The disclosure refers to at least two types of batches of documents, which include a "sorted batch of documents" and an "intermingled or commingled batch of documents." A sorted batch of documents is a batch of documents wherein the order of different types of documents, such as, for example, currency bills, checks, and deposit documents, is arranged by groups, wherein each batch consists of at most only one group for each type of document. For example, for a batch consisting of ten checks and ten currency bills, a sorted batch of documents would include one group of the ten checks preceding or following a group of the ten currency bills. For another example, for a batch consisting of one deposit slip, five checks, and five currency bills, a sorted batch of documents would include the deposit slip and one group of the five checks preceding or following a group of the five currency bills. It is contemplated that the deposit slip can precede or follow either of the two groups of documents.

An intermingled batch of documents is a batch of documents wherein the order of different types of documents, such as, for example, currency bills, checks, and deposit documents, is mixed or random. For example, a batch consisting of ten checks and ten currency bills would be an intermingled batch of documents if the batch consisted of, in order, two bills, then three checks, then one bill, then seven checks, and finally seven bills. For another example, a batch consisting of one deposit slip, one cash-out ticket, ten currency bills, and twenty checks would be an intermingled batch of documents if the batch consisted of, in order, the deposit slip, five currency bills, ten checks, the cash-out ticket, five checks, five currency bills, and finally five checks.

A batch of documents including currency bills, checks, and/or deposit documents can be processed in a document processing device or system according to several modes of operation, such as, for example, a sorted-group mode, an ordered-batch mode, and an intermingled-batch mode. According to some embodiments, sorted batches of documents can be processed according to the sorted-group mode or the ordered-batch mode. According to some embodiments, intermingled batches of documents can be processed according to the intermingled-batch mode.

In the sorted-group mode, the currency bills are processed in separate groups from the checks. For example, for a batch of documents that includes one hundred currency bills and twenty-five checks, the one hundred currency bills are input into an input receptacle of the document processing device and processed as a first group of documents. Subsequently, the twenty-five checks are input into an input receptacle of the document processing device and processed separately as a second group of documents. That is, the currency bills and the checks of the batch of documents are processed in separate groups of documents by the same device.

In the ordered-batch mode, the currency bills are sorted from the checks into separate groups of documents, but the currency bills and the checks are input into an input receptacle of the document processing device together as a single batch of documents such that the document processing device can process the currency bills and then process the checks as a batch of documents associated with a transaction. For example, for a batch of documents that includes three hundred and fifty-five currency bills and six hundred checks, according to some embodiments, the three hundred and fifty-five currency bills are input into the input receptacle of the document processing device and the six hundred checks are positioned on top of the currency bills such that the currency bills are transported and processed first, and then the checks are transported and processed second. That is, the currency bills and the checks of the batch of documents are processed together, one after the other. For another example, for a sorted batch of documents that includes five currency bills and ten checks, according to some embodiments, the ten checks are input into the input receptacle of the document processing device and the five currency bills are positioned on top of the checks such that the checks are transported and processed first, and then the currency bills are transported and processed second.

In the intermingled-batch mode, the currency bills are mixed with the checks and input into the input receptacle of the document processing device together as a single intermingled or commingled batch of documents. For example, for a batch of documents that includes ten currency bills and ten checks, where the documents are ordered from one to twenty, the batch can be ordered such that the first five documents in the batch are currency bills, the second five documents in the batch are checks, then three currency bills, then two checks, then two currency bills, followed by three checks. In the intermingled-batch mode, the document processing device is configured to process the mixed currency bills and checks of the intermingled or commingled batch of documents together. Furthermore, in the intermingled-batch mode, the order of the documents does not matter and the processing device does not expect or require the documents in a batch to be in any particular order. Thus, a sorted batch of documents can be processed in the intermingled-batch mode.

Throughout this disclosure, the term "stack" or stack of documents is used to refer to a set of documents that is received in an input receptacle of a document processing device or system. A stack of documents can include a group of currency bills only; a group of checks only; a batch of documents including currency bills, checks, and/or other documents, such as deposit documents; one or more batches of documents; one or more subbatches of documents, one or more ordered batches of documents; an intermingled batch of documents; one or more deposit documents; one or more header cards and/or trailer cards; or any combination thereof.

Throughout this disclosure, the term "visually readable image," as would be understood by one of ordinary skill in the art, refers to image data or a portion of image data obtained for a document, that image data or portion thereof being reproducible as a visually readable image—that is, a visually readable image is reproducible from or using image data. For example, one of ordinary skill in the art would understand a visually readable image would be reproduced on a display device, or otherwise, for viewing by a human user of the devices and systems described herein. The visually readable image reproduced on the display device is associated with image data or a portion of image data obtained from a physical document (for example, currency bill, check, deposit slip). Therefore, one of ordinary skill in the art would understand the phrases "image data" and "visually readable image," as either individually or in some combination, to generally refer to and include image data or a portion of image data from which a visually readable image may be produced. In some contexts, reference may be made to, for example, the electronic storage or transmittal of image data that is reproducible as a visually readable image. In other contexts, reference may be made to, for example, the electronic storage or transmittal of a visually readable image. In both contexts, one of ordinary skill in the art would understand both phrases to generally be the same or similar, that is, image data, or a portion thereof, from which a visually readable image may be produced. The image data and/or visually readable images of the present disclosure can be in any of a variety of file formats, such as, for example, JPEG, JFIF, Exif, TIFF, RAW, PNG, GIF, BMP, etc.

Document Processing Device and System

To reduce costs associated with receiving counterfeit currency bills and/or fraudulent checks, to prevent Stores and/or Banks from having to assume all of the risks and costs from accepting such documents, and to increase document processing efficiency, a document processing device and/or system according to the present disclosure may be used.

Turning now to FIG. 1, a block diagram of a document processing system 100 according to some embodiments of the present disclosure is illustrated. The document processing system 100 is also known as a document scanning system for scanning a plurality of documents. According to some embodiments, as illustrated, the document processing system 100 includes a document processing device 101 communicatively connected to a computer 151 (e.g., a customer computer, a store computer, a bank computer, a financial institution computer, a processor(s) etc.). Alternatively, the document processing system 100 can include a document processing device and a computer and/or a processor in a single housing.

According to some embodiments, the document processing device 101 includes an input receptacle 110, a transport mechanism 120, and an output receptacle 130. Only one input receptacle 110 and one or more output receptacles 130 are shown in FIG. 1 for simplicity. According to other embodiments, however, the document processing device 101 may include a plurality of input receptacles 110 and a plurality of output receptacles 130. For example, according to some embodiments, the document processing device 101 may have two input receptacles 110, one for currency bills and one for checks, or simply to accommodate a greater number of documents. As another example, the document processing device 101 can have a single input receptacle 110 capable of accommodating both sorted batches of documents and intermingled batches of documents including, for example, currency bills and checks, within the input receptacle 110 and one or more output receptacles 130. According to some embodiments, the document processing device 101 can include one or more input receptacles 110 and a plurality of output receptacles 130, such as, for example, an imaging multiple pocket document processing device or an imaging MPS—where an imaging MPS is a multiple pocket document processing device that includes image scanners configured to image documents. According to some embodiments, the document processing device 101 can include one or more input receptacles 110 and a plurality of output receptacles 130, such as, for example, a non-imaging multiple pocket document processing device—where a non-imaging MPS is a document processing device that does not include image scanners and is not configured to image documents. According to some embodiments, the document processing device 101 is configured to receive a one or more intermingled batches of documents, such as, for example, an intermingled batch of currency bill and checks, in the input receptacle 110 and to process the one or more intermingled batches of documents according to an intermingled-batch mode of operation as described herein in the Definitions Section, and in other sections of the present disclosure. According to other embodiments, the document processing device 101 is configured to receive a sorted batch of documents including currency bills and checks in the input receptacle 110 and to process the currency bills and the checks according to a sorted-group mode of operation or an ordered-batch mode of operation as described herein in the Definitions Section, and in other sections of the present disclosure.

Details of multiple output receptacles and systems/devices (MPS) are described in International Publication No. WO 97/45810 and U.S. Pat. No. 6,311,819, entitled "Method and Apparatus for Document Processing"; U.S. Pat. No. 7,600,626, entitled "Currency Processing and Strapping Systems and Methods"; U.S. Patent Application No. 2008/0060906 A1, entitled "Currency Processing and Strapping System and Methods"; U.S. Pat. No. 6,860,375, entitled "Multiple Pocket Currency Processing Device and Method"; U.S. Pat. No. 6,588,569, entitled "Currency Handling System Having Multiple Output Receptacles"; U.S. Pat. No. 6,601,687, entitled "Currency Handling System Having Multiple Output Receptacles"; and U.S. Patent Application No. 2008/0006505 A1, entitled "Angled Currency Processing System", all of which are incorporated by reference herein in their entireties. Additional details of imaging multiple output receptacle systems/devices (imaging MPS) are described in U.S. Patent Application No. 2005/0029168 A1, entitled "Currency Processing Device, Method and System" and U.S. Patent Application No. 2005/0183928 A1, entitled "Currency Processing Device, Method and System", both of which are incorporated by reference herein in their entireties. It is contemplated that any of the MPS devices/systems described in the aforementioned patent applications can be modified or otherwise altered to include image scanners, such as, for example, image scanners 140a and/or 140b, for imaging documents as described in reference to FIG. 1 and throughout the present disclosure and otherwise can be modified to operate in the various manners described in the present disclosure.

According to some embodiments, an operator inserts a plurality of documents 135 into the input receptacle 110. According to some embodiments, the document processing device 101 is configured to receive only one document at a time. According to other embodiments, the document processing device 101 is configured to receive a stack of documents in the input receptacle 110. The transport mechanism 120 is coupled to the input receptacle 110 and is configured to transport the plurality of documents 135, one at a time, along a transport path in the direction of arrow A, through the document processing device 101, past one or more image scanner(s) 140a and/or 140b, and to one or more output receptacles 130. By "one at a time" it is meant that the documents are transported serially in a non-overlapping fashion along the transport path. That is, according to some embodiments, multiple ones of the documents 135 can be transported serially by the transport mechanism 120 simultaneously. According to some embodiments, each of the documents 135 is removed from the input receptacle 110 one at a time by the transport mechanism 120, and transported along the transport path in the direction of arrow A in a serial non-overlapping fashion such that each document can be individually imaged using the one or more image scanner(s) 140a and/or 140b. According to some embodiments, the documents 135 are transported continuously past the one or more image scanner(s) 140a and/or 140b without stopping the documents to image the documents. According to some embodiments, the transport mechanism 120 is configured to stop transportation of documents such that the documents are located in a variety of positions along the transport path. For example, according to some embodiments, the transport mechanism 120 is configured to halt transportation of documents such that desired documents are located upstream from, downstream from, and/or under the image scanner(s) (e.g., image scanners 140a and/or 140b).

According to some embodiments, the document processing device 101 includes a single image scanner 140a to image one or both sides of each passing document. According to other embodiments, the document processing device 101 includes a first image scanner 140a to image a first side of each passing document and a second scanner 140b to image a second opposing side of each respective passing document. The second image scanner 140b is positioned on an opposing side of the transport path as compared with the position of the first image scanner 140a. According to some embodiments, the second image scanner 140b is opposite or off-set up or downstream from the first image scanner 140a. According to some embodiments, the imaging of both sides of currency bills enables the device 101 to denominate bills and/or extract a serial number from image data associated with bills regardless of the orientation of the currency bill during transportation and/or imaging (e.g., face up/down, forward/reverse). Additional details of image sensors are described in U.S. patent application Ser. No. 12/553,296, entitled "Optical Imaging Sensor For A Document Processing Device", which is hereby incorporated by reference herein in its entirety.

According to some embodiments, the input receptacle 110 is configured to receive the plurality of documents 135 with a wide edge or a longer edge of the plurality of documents 135 being initially fed into the document processing device 101. That is, according to some embodiments, the wide edge of the plurality of documents 135 is perpendicular to the direction of document transport (e.g., the direction of arrow A) along the transport path. According to some embodiments, transporting the plurality of documents 135 with the wide edge leading can increase the overall processing speed of the document processing device 101, which is further described below in the Document Processing Speeds Section, and in other sections of the present disclosure. According to some embodiments, the input receptacle 110 includes two slidable guides that are adjustable such that the input receptacle 110 can receive the plurality of documents 135 with the wide edge leading or a narrow edge or shorter edge of the plurality of documents 135 leading. That is, according to some embodiments, the narrow edge of the plurality of documents 135 is perpendicular to the direction of document transport (e.g., the direction of arrow A) along the transport path.

According to some embodiments, for currency bills transported in a wide edge lead manner having a narrow dimension of about 2.6 inches, the transport mechanism 120 is configured to transport the currency bills from the input receptacle with about a 2.6 inch gap between the bills at a 50% duty cycle at about 5200 inches per minute, or about 87 inches per second. According to some such embodiments, for a feed inefficiency of about 13 percent, the transport mechanism is configured to transport the currency bills at about 100 inches per second.

According to some embodiments, the document processing device 100 is configured to denominate currency bills independent of the currency bill's orientation in the input receptacle 110 of the device 101 (e.g., forward/backward, face up/down, shifted left/right). According to some such embodiments, the device 101 is configured to denominate bills from image data associated with the bills. According to some embodiments, the image data is reproducible as visually readable images of at least a portion of the bills, yet according to other embodiments, the image data is down-sampled to non-visually readable images for denomination purposes. According to some embodiments, the device 101 can denominate bills in a forward and/or reverse manner. That is, according to some embodiments, the device 101 can denominate a bill regardless of whether the bill is fed in a top-edge leading manner or a bottom-edge leading manner as the bill is transported along the transport path. According to some embodiments, a forward/reverse algorithm is executed on the image data to denominate the associated bill. It is contemplated that the forward/reverse algorithm can be executed on raw image data and/or down-sampled image data.

It is contemplated that the device 101 can process a variety of different sized documents in a single stack of documents, such as, for example, the device 101 can denominate a stack of documents that includes U.S. bills and Euros. According to some embodiments, in the absence of input receptacle guides to align currency bills therein prior to being transported, bills can be shifted left and/or right. It is contemplated that the device 101 is configured to denominate such shifted bills by cropping appropriate portions of generated image data.

According to some embodiments, the device 101 is configured to detect a leading edge of each bill and/or to detect a trailing edge of each bill. According to some embodiments, the document processing device and/or systems of the present disclosure execute a leading/trailing edge detection algorithm to determine a location of the leading and/or trailing edges. By detecting both the leading edge of a bill (and/or leading edge of print or fine line on a bill) and/or a trailing edge (and/or trailing edge of print or fine line on a bill), the device is able to denominate bills that have one distorted edge and/or distorted fine line (such as the fine line found on some U.S. bills). According to some embodiments, the device 101 is configured to determine a leading edge and/or a trailing edge of image data that is reproducible as a visually readable image associated with a bill by taking several readings along the lead edge and/or trailing edge. According to some embodiments, in response to determining the lead edge and/or the trailing edge, the device 101 determines the appropriate area(s) on the image data from the determined lead and/or trailing edge to sample/crop to accurately denominate the bill. According to some embodiments, such edge detection techniques are referred to as leading/trailing edge detection.

According to some embodiments, a controller or processor 150 is coupled to the image scanner(s) 140a and/or 140b, the transport mechanism 120, a memory 160, an operator interface or control panel 170, and a communications port or network device 180. The controller 150 is configured to control the operation of the transport mechanism 120 and the image scanner(s) 140a and/or 140b. The controller 150 is also configured to communicate information to and from the memory 160, the control panel 170, and the communications port 180. For example, the controller 150 may send information to and receive operator input from the control panel 170. The control panel 170 can be configured to display information regarding the documents 135 and/or status information concerning the operation of the document processing system 100. For example, according to some embodiments, the control panel 170 is configured to display an image or a partial image (e.g., snippet image) of a document of concern, such as a currency bill that may be identified as a possible counterfeit currency bill (e.g., a suspect currency bill). According to some embodiments, the controller 150 is one or more computers. According to some embodiments, the controller 150 can replace the computer 151 such that the document processing system 100 only includes the document processing device 101 configured to perform the same operations as the document processing system 100. In these embodiments, the controller 150 can include a plurality of memory devices (e.g., RAM, ROM, Hard Drive, etc.), processor(s), etc. necessary to perform a plurality of document processing operations within the document processing device 101. Some examples of document processing operations, which are described in detail below, include, but are not limited to, facing (front/back), orienting (forward/reverse), cropping, deskewing, compressing, down-sampling, denominating (forward/reverse), extracting, comparing, determining, storing, transmitting, etc.

According to some embodiments, the operator can initiate document processing via use of the control panel 170. According to some embodiments, the operator can initiate document processing via use of the computer 151. According to some embodiments, the control panel 170 is a full graphics color touch screen display with various soft touch keys used to operate the document processing system 100. Alternatively or additionally, the control panel 170 may contain physical keys or buttons and/or another type of display such as an LED display. For example, a QWERTY keyboard and/or a ten key numerical keypad may be utilized. According to some embodiments, the control panel 170 displays soft keys or touch keys when appropriate. According to some embodiments, the control panel 170 is integrated within a single housing of the document processing device 101. Alternatively, the control panel 170 can be remotely positioned from the document processing device 101, but communicatively connected therewith via a wired connection (e.g., electronic, optical, other direct connection), a wireless connection, a Bluetooth connection, a WI-FI connection, etc. For example, according to some embodiments, the control panel 170 is a component of the computer 151. For another example, the document processing system 100 is located at a first financial institution branch location and a control panel 170 is located at a second financial institution headquarter location. According to some embodiments, the control panel 170 is a Sharp® display such as a 4.3 inch touchscreen display unit manufactured by Sharp® Corporation.

In response to the operator initiating document processing, the transport mechanism 120 transports the plurality of documents in the direction of arrow A in a non-overlapping serial fashion, one at a time, one after the other. As one of the plurality of document 135a is transported a record and/or a data file (e.g., records 300a-d of FIGS. 3A-D and/or data file 301 of FIG. 3E) associated with the document 135a is generated using, for example, the image scanner(s) 140a and/or 140b and/or controller 150. According to some embodiments, the image scanner(s) 140a and/or 140b generate the record. Yet, according to other embodiments, the image scanner(s) 140a and/or 140b generate data used by the document processing system 100 to generate the records. According to some embodiments, the record at least includes image data that is reproducible as a visually readable image or a human readable image of substantially the entire document 135a (a "full image") and/or of selected portions of the document 135a (a "snippet image"). In some embodiments, the record can include a full image, one or more snippet images, or a combination thereof. According to some embodiments, a visually readable and/or human readable image is defined based on a number of dots or pixels per inch ("DPI") that form the image. For purposes of the present disclosure, a visually readable image is an image having a resolution of at least 50 DPI×50 DPI—that is, the image includes 2500 dots or pixels per square inch. According to some embodiments, the visually readable image is formed with a resolution of at least 100 DPI×100 DPI. According to some embodiments, the visually readable image is formed with a resolution of at least 200 DPI×100 DPI. According to some embodiments, the visually readable image is formed with a resolution of at least 200 DPI×200 DPI. As the DPI increase, the amount of data generated by the image scanner(s) 140a and/or 140b increases, which may be a factor in causing relatively slower processing speeds in some embodiments. According to some embodiments, the resolution of an image is defined as P DPI×Q DPI, where P is the resolution in the x-direction or the direction perpendicular to the direction of document transport (e.g., perpendicular to the direction of arrow A), and Q is the resolution in the y-direction or the direction parallel to the direction of transport (e.g., the direction of arrow A).

According to some embodiments, the image scanner(s) 140*a* and/or 140*b*, the controller 150, and/or the memory 160 includes data extraction software such as optical character recognition (OCR) software for identifying characters contained in one or more fields of the image data and/or the visually readable images of the plurality of documents 135 and extracting the characters as extracted data. It is contemplated that according to some embodiments, other software can be used to extract character or symbol information from the image data and/or the visually readable images. According to some embodiments, the document processing system 100 uses the OCR software to obtain or extract identifying information from each of the visually readable images. For example, the OCR software may implement a search of image data that is reproducible as a visually readable image of a currency bill for a serial number data field and extract a serial number of the currency bill once the data field is located. According to some embodiments, the OCR software can obtain or extract both serial numbers in a visually readable image of a currency bill regardless of the face orientation of the currency bill during transportation via the transport mechanism 120. The OCR or other software can be implemented to extract a variety of other types of information, such as, for example, transactional information. Exemplary data extraction software such as OCR software is described in more detail below in the Optical Character Recognition Section, and in other sections of the present disclosure.

According to some embodiments, the visually readable image is formed with a resolution of 300 DPI×200 DPI, 300 DPI×300 DPI, 400 DPI×200 DPI, or 400 DPI×400 DPI. Such elevated resolutions can be desirable when using OCR software to extract relatively small characters from an image. For example, when trying to extract small characters on a currency bill, such as, for example, back plate numbers, check letter and quadrant numbers, check letter and face plate numbers, etc., the image scanner(s) 140*a* and/or 140*b* can be configured to generate image data that is reproducible as visually readable images having elevated resolutions (e.g., 400 DPI×200 DPI).

According to some embodiments, the extracted data can be tagged to the record in one or more data fields (e.g., data fields 330*a*, 360*a*, 380 of FIGS. 3A-D). The term "tag" or "tagging" generally refers to the document processing system 100 associating alphanumeric characters or symbols with a record and/or a data file or with image data that is reproducible as a visually readable image in a record and/or a data file. For example, the record can include the identifying information extracted from the visually readable image. If the document 135*a* is a currency bill, the identifying information can include a serial number, a denomination, a type of note, a federal reserve letter/number, a series, a check letter and quadrant number, a check letter and face plate number, a back plate number, or combinations thereof. If the document 135*a* is a check, the identifying information can include a checking account number, a routing and transit number, a check number, a check amount, a drawer name, a drawer address, a payee name, or combinations thereof. If the document is a deposit slip, the identifying information can include a customer financial account number, a total deposit amount, a total currency bill deposit amount, a number of deposited currency bills broken down by denomination, a total check deposit amount, a number of deposited checks broken down by on-us checks and transit checks, a total on-us check deposit amount, a total transit check deposit amount, or combinations thereof.

According to some embodiments, the data tagged to the record includes transactional information such as, for example, a transaction identifier number, a customer name or customer identification number, a teller name or identification number, an employee identification number, a bank account number, a store or customer number, a batch number, a subbatch number, a batch start time, a batch end time, a subbatch start time, a subbatch end time, a device identifier, or any combination thereof. The transactional information can be obtained based on operator input directly or indirectly into the document processing system 100. According to some embodiments, the operator inputs the transactional information into the document processing device 101 using the control panel 170. In these embodiments, the manually entered transactional information is automatically associated with the visually readable images generated using the image scanner(s) 140*a* and/or 140*b* and/or the records for each of the subsequently processed documents 135 associated with the same transactional information. For example, the employee identification number associated with an employee or operator of the document processing system 100 can be automatically tagged to all records generated while the employee operates the document processing system 100.

According to some embodiments, the transaction information (e.g., transaction identifier number, batch number, subbatch number, bank account number, etc.) is obtained and/or extracted from a header card and/or a trailer card. In some such embodiments, prior to inserting the stack of documents 135 into the input receptacle 110, the operator puts a header card and/or a trailer card onto the stack of documents 135, or otherwise associates the header/trailer card with the plurality of documents 135. According to some embodiments, the header/trailer card includes an indicia representing the transactional information. For example, the header/trailer card can be a barcoded ticket including a barcode indicia that encodes a bank account number of a customer associated with the documents 135. In response to initiating the document processing, the document processing device 101, via the image scanner(s) 140*a* and/or 140*b*, scans the header/trailer card and accompanying stack of documents 135 to generate a data file including a record for the header/trailer card and a record for each of the documents 135. According to some embodiments, the record of the header/trailer card includes a visually readable image of the header/trailer card and the records of the documents 135 include respective visually readable images. The document processing system 100 is configured to use software to decode the generated image of the barcode indicia to extract the transaction information. According to some embodiments, the extracted transactional information can be automatically associated with the records of the documents 135 within the data file. According to some embodiments, the document processing system 100 includes a barcode scanner to scan and decode the barcode indicia as is commonly known in the art and the document processing system 100 associates data obtained from the barcode scanner with the appropriate records. According to some embodiments, missing or incomplete transactional information can be corrected or entered in the same, or similar, manner as the identifying information described below in the Modes of Operation—Flagging Section, and in other sections of the present disclosure. Details of barcode scanners are described in U.S. Patent Publication No. 2002-0020603, entitled "System and Method for Processing Currency Bills and Substitute Currency Media in a Single Device," which is incorporated herein by reference in its entirety. Details of header/trailer cards are described in U.S. Pat. No. 7,016,767, entitled "System and Method for Processing Currency and Identification Cards in a Document Processing Device," and U.S. Pat. No. 7,146,245, entitled "System and Method for Processing Currency and Identification Cards in a Document Processing Device,", which are both incorporated herein by reference in their entireties.

According to other such embodiments, prior to inserting the stack of documents 135 into the input receptacle 110, the operator puts a deposit slip onto the stack of documents 135, or otherwise associates the deposit slip with the plurality of documents 135. According to some embodiments, the deposit slip includes a MICR encoded customer financial account number and one or more handwritten totals (e.g., total declared deposit, total currency bill deposit, total check deposit, etc.). According to other embodiments, the deposit slip is machine generated and/or printed to include a customer financial account number and one or more printed totals (e.g., total declared deposit, total currency bill deposit, total check deposit, etc.). According to some embodiments, a customer making a deposit transaction includes the deposit slip with the documents being deposited. The deposit slip is a summary of the documents being deposited. As discussed above, the deposit slip can include transaction information such as, for example, a customer financial account number, a total deposit amount, a total currency bill deposit amount, a number of deposited currency bills broken down by denomination, a total check deposit amount, a number of deposited checks broken down by on-us checks and transit checks, a total on-us check deposit amount, and a total transit check deposit amount. According to some embodiments, in response to initiating the document processing, the document processing device 101, via the image scanner(s) 140a and/or 140b, images the deposit slip and accompanying stack of documents 135 to generate a data file including a record for the deposit slip and a record for each of the documents 135. According to some embodiments, the record of the deposit slip includes image data that is reproducible as a visually readable image of the deposit slip and the records of the documents 135 include image data that is reproducible as respective visually readable images. The document processing system 100 is configured to use OCR or other software (e.g., CAR/LAR software, handwriting extraction software, etc.) to extract some or all of the transaction information on the generated image of the deposit slip. According to some embodiments, the extracted transactional information can be automatically associated with the records of the documents 135 within the data file. According to some alternative embodiments, the document processing system 100 includes a MICR reader to read the MICR encoded customer financial account number from the deposit slip.

According to some embodiments, the device 101 and/or system 100 is configured to perform a check cashing transaction such as in a bank or other financial institution. For example, a bank customer enters a bank with a deposit slip and 5 checks having a total value of $3000.00. The customer desires to deposit the $3000.00 of checks and to withdraw $1000.00 of the $3000.00 deposit. According to some embodiments, a bank teller places the deposit slip and checks into the input receptacle of the device 101 and images the documents to generate a data file associated with the deposit transaction, similar to the data files described in the Document Records and Data Files Section and in connection with FIG. 3E, and in other sections of the present disclosure. According to some embodiments, the device 101 is configured to generate a cash-out ticket associated with the $1000.00 being withdrawn. According to other embodiments, the teller and/or the customer manually fills out a cash-out ticket. According to some embodiments, the manually generated cash-out ticket is imaged along with the other documents. According to some embodiments, the data file includes a record for each check, the deposit slip, and the cash-out ticket. The data file can be transmitted or otherwise made available to an item processing system, such as the item processing system described in the Electronic Portion of Deposit Transaction Section, and in other sections of the present disclosure, to further processing the check cashing transaction, such as, for example, to update an account of the customer to reflect the deposit/withdrawal, to proof the checks, and/or to clear the checks.

Referring back to FIG. 1, according to some embodiments, the memory 160 is configured to store and/or buffer the record associated with the document 135a and/or other records associated with other documents for the same deposit transaction. According to some embodiments, the memory 160 is configured to store and/or buffer a record including a full image of the processed document 135a or other information from the processed documents (e.g., data associated with a picture or visually readable image of the document 135a). According to some embodiments, the memory 160 is configured to only store and/or buffer a record including a visually readable image of a portion of the document 135a. For example, for a particular application it may be that the memory 160 only needs to store an image of half of the document 135a or a snippet image of the document 135a. According to some embodiments, the memory 160 is configured to store and/or buffer the extracted data, such as, for example, the identifying information and/or the transactional information associated with one or more batches of processed documents, such as, for example, serial numbers, denominations, checking account numbers, routing numbers, bank account numbers, batch/deposit identification numbers, etc.

According to some embodiments, the document processing system 100 is configured to store and/or buffer a plurality of records associated with a single deposit transaction of a plurality of documents. In some such embodiments, in response to the document processing system 100 generating a record for each of the plurality of documents, the document processing system 100 generates a data file that includes the plurality of stored and/or buffered records. The data file can include a plurality of additional information, such as, for example, an financial institution account number, a transaction identifier, a customer name, address, phone number, a total deposit amount, a total currency bill deposit amount, a number of deposited currency bills broken down by denomination, a total check deposit amount, a number of deposited checks broken down by on-us checks and transit checks, a total on-us check deposit amount, and a total transit check deposit amount. According to some embodiments, the data file can be transmitted from the document processing system 100 to a financial institution for a credit based on the total deposit amount associated with the deposit transaction. Further details on transmitting a data file for a credit is described below in reference to FIGS. 4A-B, 5A, 6, and 8A-B.

According to some embodiments, the memory 160 is configured to store a database or a suspect database. The database can include a variety information associated with known and/or suspected counterfeit currency bills. For example, the database can include a list of serial numbers of known or suspected counterfeit currency bills. For another example, the database can include a list of known combinations of identifying information used on counterfeit currency bills. Due to the difficulty in producing, for example, counterfeit U.S. currency bills that each have completely unique identifying information (e.g., denomination, serial number, federal reserve letter/number, series, check letter and quadrant number, check letter and face plate number, back plate number, etc.), such known combinations of identifying information are useful in detecting counterfeit currency bills that have varying or unique serial numbers. Such counterfeit currency bills would be unique but for other small constant numbers or letters on the currency bills that remain the same from currency bill to currency bill. Additionally or alternatively, the database can include a variety of information (e.g., checking account numbers, routing numbers, etc.) associated with checking accounts tied to fraudulent activity (e.g., check kiting schemes). According to some embodiments, the memory 160 stores a database, such as, for example, database 1200*a,b* shown in FIGS. 12A-B and described in the Modes of Operation—Searching/Master Database Section, and in other sections of the present disclosure.

According to some embodiments, the document processing device 101 includes an authentication sensor or authentication unit 145. Yet according to other embodiments, the document processing device 101 does not include an authentication sensor 145. In some such embodiments, the lack of the authentication sensor 145 reduces the overall weight, size, and cost of the document processing device 101. Authentication can be accomplished using the authentication sensor 145 and/or by using a database of serial numbers for known or suspected counterfeit currency bills and a database of checking account numbers for known or suspected checks associated with fraudulent activity. The authentication sensor 145 is optionally positioned adjacent to the transport path in a similar fashion as the image scanner(s) 140*a* and/or 140*b*. The authentication sensor 145 is configured to authenticate the documents 135 based on one or more criteria and/or authentication tests as is commonly known in the art. Some examples of authentication sensors and authentication tests are described in U.S. Pat. No. 5,640,463, issued on Jun. 17, 1997, entitled "Method and Apparatus For Authenticating Documents Including Currency"; U.S. Pat. No. 5,790,693, issued on Aug. 4, 1998, entitled "Currency Discriminator and Authenticator"; U.S. Pat. No. 5,992,601, issued on Nov. 30, 1999, entitled "Method and Apparatus for Document Identification and Authentication"; and U.S. Pat. No. 5,960,103, issued on Sep. 28, 1999, entitled "Method and Apparatus for Authenticating Currency"; all of which are incorporated by reference herein in their entireties.

Authentication by use of the database is accomplished by comparing the identifying information (e.g., currency bill serial number, at least a portion of a check MICR line) in the records with data or information in the database. Such authentication using the database does not require the presence of the authentication sensor 145. According to some embodiments, the database is stored in the memory 160 of the document processing device 101. Alternatively, the database can be stored in a memory of the computer 151 and/or a memory of a server communicatively connected to the document processing system 100. The computer 151 and/or the server can be configured to compare the identifying information in the records with the data or information in the database stored on the computer 151 and/or the server. In some such embodiments, the document processing system 100 is configured to transmit and/or upload the extracted identifying information and/or records associated with one or more batches of processed documents to the server for comparison with the database. Thus, the document processing device 101 is free to continue to process additional batches of documents without bogging down the controller 150 and/or other components by performing the comparison in real-time and/or on-board of the document processing device 101. In the case of the server determining a match, that is, a suspect document, the sever can be configured to transmit a notice and/or a charge-back instruction and/or signal to the document processing system 100 indicating the determination. In the case of the server not determining a match, the server can be configured to transmit a notice and/or signal clearing all of the processed documents associated with the transmitted or uploaded identifying information and/or records. According to some embodiments, the server is configured to compare uploaded records for a stack of documents with data in the database and to determine if a match exists within about two minutes. According to some embodiments, the server is configured to compare uploaded records for a stack of documents with data in the database and to determine if a match exists within about ten minutes.

According to some embodiments, the controller 150 compares an extracted serial number tagged to a record associated with a currency bill against serial numbers in the database. If a complete match or, in some embodiments, a partial match is found, the controller 150 may send a signal or an instruction to the operator control panel 170 to indicate that a suspect currency bill has been found (e.g., a currency bill suspected of being counterfeit). In some embodiments, the record of the suspect currency bill may be flagged electronically and/or visually. According to some embodiments, the flagged record can be stored in the memory 160 with a visual notation (e.g., flag code field 333' in FIG. 3A and flag code field 363' in FIG. 3B) or electronic marking (e.g., an asterisk "*" or an exclamation point "!") that indicates to a person reviewing the record such as the operator that the record is associated with a suspect currency bill. According to some embodiments, the flagged record is stored in the memory 160 with a bit set configured to indicate that the flagged record is associated with a suspect document. In some embodiments, the flagged record can be transmitted to and stored in a memory of the computer 151 and/or a server within or communicatively connect to the document processing system 100.

According to some embodiments, a number of types of data can be used to assess whether a currency bill is a suspect currency bill, including serial number, denomination, series, federal reserve letter/number, check letter and quadrant number, check letter and face plate number, back plate number, signatories, image quality, infrared characteristics, magnetic characteristics, ultraviolet characteristics, color shifting ink, watermarks, metallic threads, holograms, etc., or some combination thereof. According to some embodiments, all or a portion of these types of data can be derived from and/or extracted form the currency bill and/or the image data that is reproducible as a visually readable image of the currency bill and may be used for cross-referencing the serial number of the currency bill for purposes of determining suspect currency bills. For example, the serial number of the currency bill may be related to an extracted series. Thus, for a particular currency bill having a serial number and a series that do not correspond, then the currency bill is a suspect currency bill.

As described above, according to some embodiments, the controller 150 is configured to communicate information to and from the communications port 180. The communications port 180 is configured to be communicatively connected to a network (e.g., Internet, private network, customer network, financial institution network, LAN, WAN, secured network, etc.) to permit information to be transmitted to and from the document processing device 101. For example, according to some embodiments, the document processing device 101 comprises an Ethernet card comprising the communications port 180 that is communicatively connected to the network (e.g., the customer network). It is contemplated that according to some embodiments, the document processing device 101 includes two or more communications ports 180 to increase the flow and/or transfer of data to and from the document processing device 101. As described above, the controller 150 can transmit a data file including a plurality of records associated with a deposit transaction from the document processing device 101. According to some embodiments, the data file is communicated via the communications port 180 from the document processing device 101 over a customer network to the customer computer 151. According to some embodiments, the data files are communicated from the document processing device 101 and/or the customer computer 151 over the network to a financial institution system associated with a customer financial institution account. According to some embodiments, the financial institution is configured to apply a provisional credit to the customer financial institution account based on information in the data file.

As described below in the Deposit Transaction Section and/or the Electronic Portion of Electronic Transaction Section, and in other sections of the present disclosure, according to some embodiments, the financial institution is configured to apply a provisional credit for a complete deposit or a percentage of the deposit, such as, for example, the provisional credit can be given for 80% or 90% of a deposit. According to some embodiments, the financial institution is configured to apply a final credit for all of or a percentage of a deposit. According to some embodiments, the transmitted data file may include information relating to a plurality of documents including a deposit slip, currency bills, checks, identifying information, and transactional information.

According to some embodiments, the document processing device 101 and/or system 100 can provide an operator a receipt and/or a printed record providing details of a transaction such as copies of the imaged documents and/or portions thereof, such as copies of image snippets. The record can also include identifying information for the transaction such as operator information, processing device information, unique transaction identifiers, etc. The record can be printed by a printer integral with and/or communicatively connected to the document processing device 101 and/or system 100. Alternatively, the receipt can be sent electronically such as by an e-mail or an entry into a log. According to some embodiments, the operator can download and/or upload records to a printer. It is contemplated that the records can be stored in a memory of the printer and/or printed upon receipt of the records in memory and/or at a later time.

According to some embodiments, an operator of a document processing device and/or system can print a deposit transaction receipt for a bank customer/depositor that includes visually readable images of all documents or a portion of the documents included in the deposit. For example, for a bank customer that deposits five $20 bills and three checks, the deposit transaction receipt can include images of each of the five $20 bills, images of each of the three checks, or any combination thereof. According to some embodiments, a deposit transaction receipt only includes images of checks included in a deposit. According to some embodiments, a deposit transaction receipt only includes images of currency bills included in a deposit. According to some embodiments, a deposit transaction receipt includes images of checks included in a deposit and currency bill denominations for currency bills included in the deposit. According to some embodiments, a deposit transaction receipt includes images of checks included in a deposit and currency bill denominations and serial numbers for currency bills included in the deposit.

It is contemplated that according to some embodiments, a bank keeps a receipt or internal record in electronic form and/or printed form for each transaction. The receipts can be printed and kept in a printed journal and/or electronically stored in a memory of the device and/or system, and/or in a memory communicatively connected thereto.

According to some embodiments, printing a deposit transaction receipt for each bank customer allows the bank to terminate the physical document paper trail for checks at the point of interacting with the bank customer and taking/recording the deposit as the receipt provides the bank customer with instant proof of deposit and the bank can further process and/or proof the checks via the electronic images of the checks. That is, the bank can destroy the deposited checks because the bank can process the checks via image data that is reproducible as a visually readable image of the checks and the bank customer has a printed receipt including a visually readable image of at least a portion of the checks.

For example, after receiving one or more checks for deposit from a customer, according to some embodiments, the bank physically destroys (e.g., shreds) the checks after they have been processed and imaged by the document processing device 101 and/or system 100. According to some embodiments, the checks are destroyed at the point of deposit after they have been processed and imaged by the document processing device 101 and/or system 100. For example, according to some embodiments, the document processing device 101 and/or system 100 is coupled to a document destruction device such as a shredder or granulator and checks are automatically routed to the document destruction device after each check has been properly imaged and/or after the deposit transaction involving the checks has been accepted by the customer and/or operator of the document processing device 101 and/or system 100.

According to some embodiments, the document processing system 100 and/or device 101 is configured to process casino cashout tickets bearing one or more respective barcodes thereon. According to such embodiments, the device 101 is configured to operate in an imaging mode and/or a casino ticket mode to image tickets and create a record for each ticket processed. The records can include a variety of information and or images, such as, for example, an image or snippet image of the ticket, an extracted barcode number, a time of processing, a teller identifier, a casino identifier, etc. Additional details on imaging and/or processing casino tickets can be found in U.S. Patent Application No. 2009/0087076 A1, entitled "System and Method For Processing Currency Bills and Tickets".

Figure 2A:
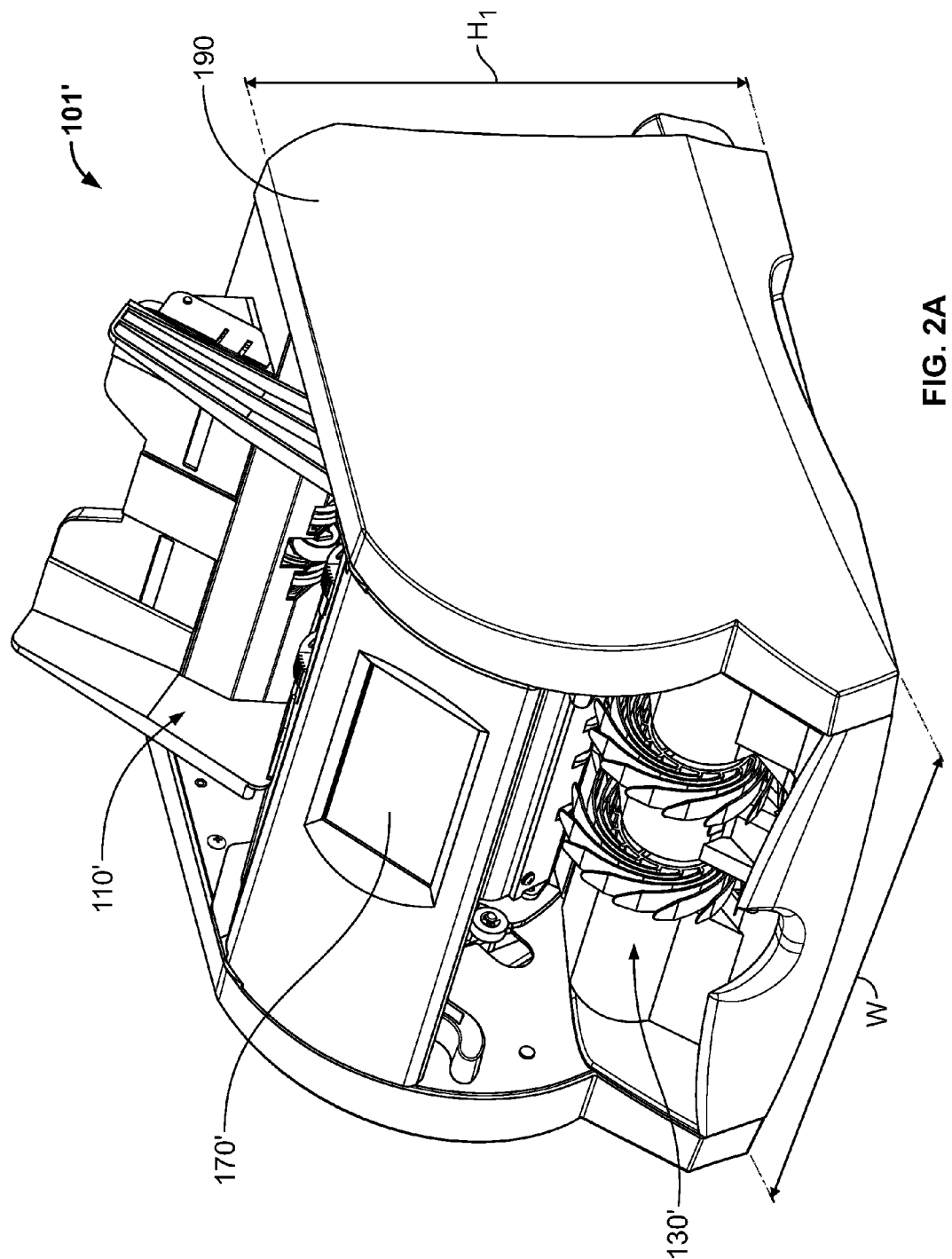
FIG. 2A is a perspective view of a document processing device according to some embodiments of the present disclosure.
Figure 2B:
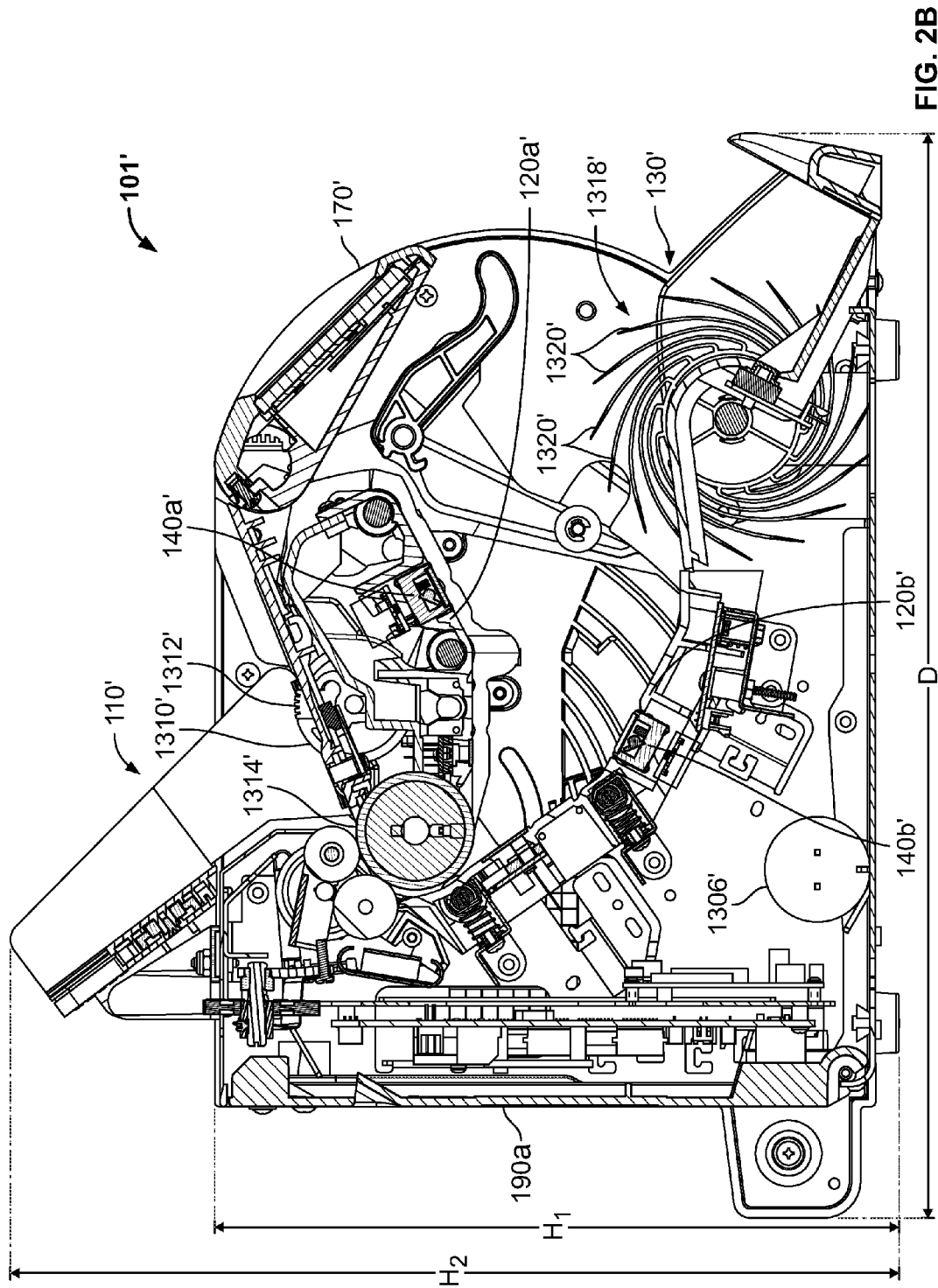
FIG. 2B is a cross-sectional view of the document processing device of FIG. 2A having a transport mechanism in an open position.
Figure 2C:
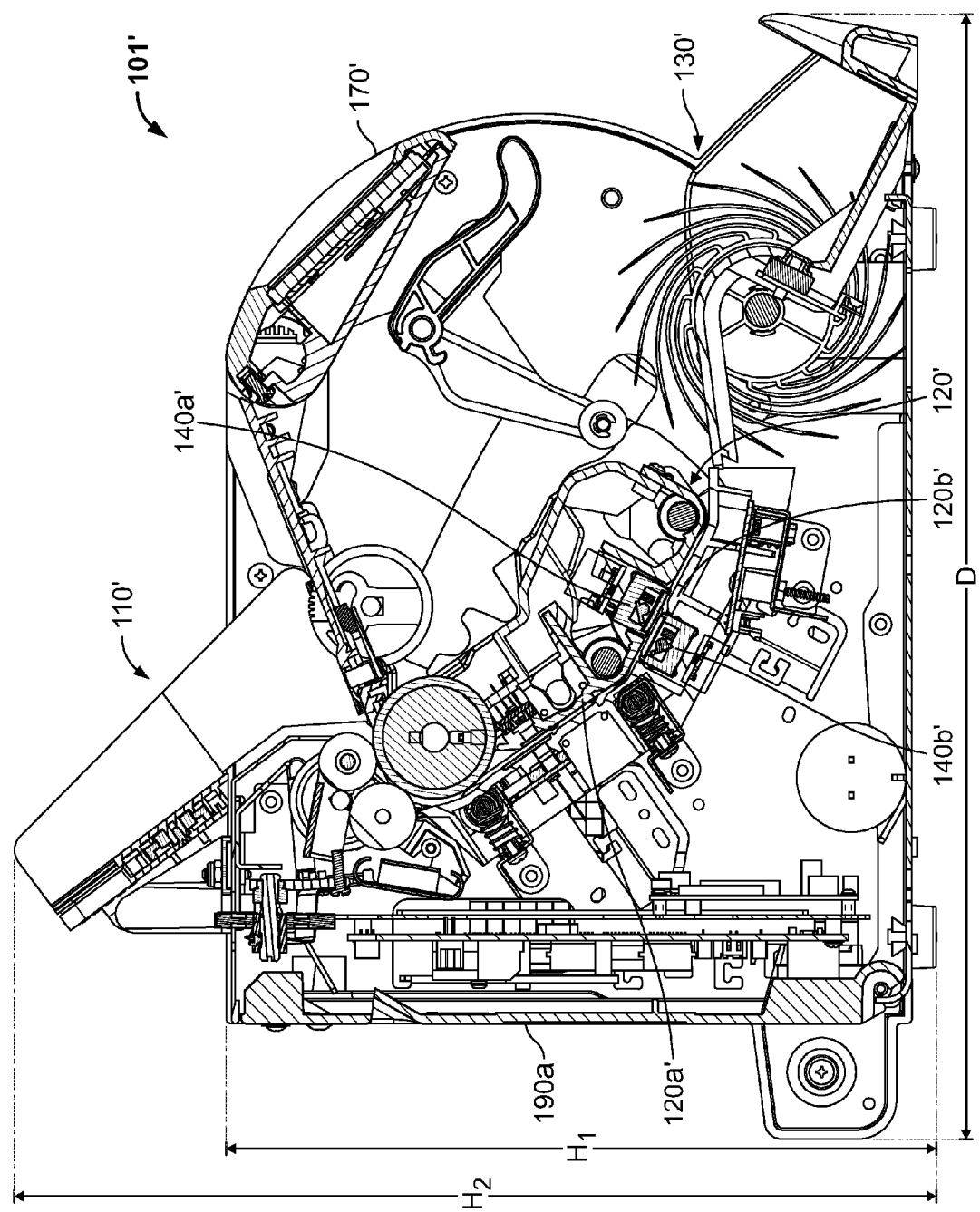
FIG. 2C is a cross-sectional view of the document processing device of FIG. 2A having the transport mechanism in a closed position.

Referring now to FIGS. 2A-2C, a document processing device 101' is shown according to some embodiments of the present disclosure. FIG. 2A is a perspective view of the document processing device 101' and FIGS. 2B and 2C are cross-sectional views of the document processing device 101'. According to some embodiments, the document processing device 101' reflects an exemplary physical embodiment of the document processing device 101 described above in relation to FIG. 1 and throughout this disclosure. According to some embodiments, the document processing device 101' includes an input receptacle 110', a transport mechanism 120', an output receptacle 130', and a housing 190. According to some embodiments, the input receptacle 110', the transport mechanism 120', and the output receptacle 130' are the same as, or similar to, the input receptacle 110, the transport mechanism 120, and the output receptacle 130, respectively, as described above in relation to the FIG. 1. According to some embodiments, the input receptacle 110' is configured to receive a plurality of documents with a wide edge or a longer edge of the plurality of documents being initially fed into the document processing device 101' in the same, or similar, manner as described above in reference to the input receptacle of the document processing device 101, that is, the device 101' is adapted to transport documents in a wide-edge leading manner.

According to some embodiments, an operator interface or control panel 170' is coupled to the housing 190. The control panel 170' can be the same as, or similar to, the control panel 170 described above in relation to FIG. 1. The control panel 170' is shown in a closed or down position. According to some embodiments, the control panel 170' can be rotationally or movably coupled to the housing 190, such that, the control panel 170' can be rotated with respect to the housing 190 to change a viewing angle of the control panel 170'. In some embodiments, the control panel 170' can also be repositioned to increase access to the transport mechanism 120' such as in response to a document jam. In some embodiments, the control panel 170' is a full graphics color touch screen configured to display operational instructions, configuration menus/screens, warnings, visually readable images of documents and/or snippet images, softkey buttons, etc. to an operator of the document processing device 101'. According to other embodiments, the control panel 170' is positioned away from or detached from the housing 190, yet communicatively connected to the document processing device 101' via a wired (e.g., electrical, optic, other direct connection) or wireless connection.

According to some embodiments, the transport mechanism 120' includes an upper transport plate assembly 120a' and a lower transport plate assembly 120b'. As shown in FIG. 2B, the upper transport plate assembly 120a' is in an open position. The open position of the transport mechanism 120' allows for easy removal of jammed documents, cleaning, and maintenance, all from the front of the document processing device 101', which will be described in greater detail below in reference to FIGS. 13A-E. FIG. 2C illustrates the upper and lower transport plate assemblies 120a' and 120b' in a closed position or operating/processing position. The upper and lower transport plate assemblies 120a' and 120b' can each include a plurality of mechanical and/or electrical components, such as, for example, UV sensors, IR sensors, magnetic sensors, imaging sensors, hold-down wheels, drive wheels, spring wheels, LEDs and/or other light sources. According to some embodiments, the upper transport plate assembly 120a' includes a first image scanner 140a' and the lower transport plate assembly 120b' includes a second image scanner 140b'. The first and the second image scanners 140a' and 140b' are the same as, or similar to, the image scanner(s) 140a and/or 140b described above in relation to FIG. 1. According to some embodiments, the first and the second image scanners 140a' and 140b' and/or the image scanner(s) 140a and/or 140b are at least about 9.1 inches wide. That is, the dimension of the image scanners that is perpendicular to the direction of transport of documents is at least about 9.1 inches. According to some embodiments, the first and the second image scanners 140a' and 140b' and/or the image scanner(s) 140a and/or 140b are about 9.1 inches wide. According to some embodiments, the first and the second image scanners 140a' and 140b' and/or the image scanner(s) 140a and/or 140b are wide enough to scan and/or image business or commercial checks in a wide edge leading feed and standard and A4 sheets of paper with a narrow edge leading feed.

According to some embodiments, the document processing device 101' is communicatively connected to a computer or a processor (e.g., computer 151) to form a document processing system, such as the document processing system 100. Alternatively, the computer or processor is integral within the housing 190 such that the document processing device 101' corresponds to a singly housed document processing system.

According to some embodiments, the document processing device 101' has a height $H_2$ of less than about twelve inches, a width W of less than about fourteen inches, and a depth D of less than about fifteen inches. According to some embodiments, the document processing device 101' has a height $H_1$ of less than about nine and a half inches, a width W of less than about fourteen inches, and a depth D of less than about thirteen and a half inches.

According to some embodiments, the document processing device 101' has a footprint of less than about two square feet. According to some embodiments, the document processing device 101' has a footprint of less than about one and a half square feet. According to some embodiments, the document processing device 101' has a footprint of less than one and a quarter square feet.

According to some embodiments, the document processing device 101' weighs less than about 35 lbs. According to some embodiments, the document processing device 101' weighs less than about 25 lbs. According to some embodiments, the document processing device 101' weighs about twenty lbs. According to some embodiments, the document processing device 101' is compact and configured to be rested on a tabletop or countertop.

According to some embodiments, the document processing device 101' is configured to be placed on a surface and be opened to be permit removal or clearing of a document jam, cleaning, and/or maintenance without having to be moved or otherwise repositioned and without consuming additional footprint space while being in the open position. That is, as illustrated in FIGS. 2B and 2C, the footprint associated with the device 101' in its open state (permitting access to its interior transport path) is the same as the footprint of the device 101' in its closed operational state. Likewise, as illustrated in FIGS. 2B and 2C, according to some embodiments, the volume occupied the device 101' in its open state (permitting access to its interior transport path) is the same as the volume of the device 101' in its closed operational state. In some such embodiments, the housing 190 of the document processing device 101' can be positioned with a back side 190a adjacent to a wall and does not need to be moved away from the wall when the device is opened as illustrated in FIG. 2B.

According to some embodiments, the document processing device 101' can be a part of a larger document processing system such as, for example, systems used for currency bill sorting and/or other types of document sorting.

According to some embodiments, the document processing device 101' is configured to operate in a strapping mode and is coupled with a strapping unit. According to some embodiments, in the strapping mode of operation, the document processing device is configured to process a predetermined number of documents, such as, for example, 100 currency bills having the same denomination (e.g., one hundred $5's), and to transport the documents to the strapping unit to be physically strapped. According to some such embodiments, each strap is associated with a strap number that can be associated with each of the documents in the strap. For example, the strap number can be tagged to a record associated with each of the documents and stored in a memory device. According to some embodiments, the records associated with the documents in a particular strap can be stored in the memory together. Additional details on strapping units are in U.S. Pat. No. 7,600,626, entitled "Currency Processing and Strapping Systems and Methods" and U.S. Patent Application No. 2008/0060906 A1, entitled "Currency Processing and Strapping System and Methods", both of which were previously incorporated by reference in their entireties herein.

Optical Character Recognition

As described herein, the document processing devices and systems of the present disclosure are configured to process documents. According to some embodiments, processing documents includes imaging the documents to produce image data that is reproducible as a visually readable image of at least a portion of each document—that is, a visually readable image is reproducible from or using image data. According to some embodiments, the document processing devices and systems are further configured to run or execute one or more OCR algorithms to extract one or more sets of characters from the image data for one or more documents.

According to some embodiments, the document processing device 101' executes an OCR algorithm to extract a serial number from image data associated with a currency bill processed by the document processing device 101'. The currency bill bears the serial number for which the image data is generated. According to some embodiments, the OCR algorithms of the present disclosure are run or executed on-board of the document processing device in real-time. That is, the document processing device extracts characters from image data as documents are being processed using on-board processor(s) and/or controller(s). The document processing device can execute the OCR algorithms to extract data from a stack of documents at a variety of document processing speeds, such as, for example, those speeds described herein in the Document Processing Speed Section, and in other sections of the present disclosure.

For example, the document processing device 101' includes one or more processors and/or controllers within the housing 190 configured to execute one or more OCR algorithms to extract serial numbers from image data being generated as documents are being transported by the document processing device 101'. According to some embodiments, the on-board, real-time processing of the image data associated with documents being transported allows the document processing device 101' to determine if a serial number can be completely extracted from the image data for a particular currency bill within a predetermined confidence level prior to transporting a second currency bill from the input receptacle 110' to the output receptacle 130'. According to some such embodiments, the document processing device 101' can flag a data extraction error document by stopping the transport of documents such that a currency bill associated with image data that cannot be completely and accurately OCRed to produce an acceptable extracted serial number is the last document delivered to the output receptacle 130'.

According to some embodiments, in response to a data extraction error or in response to a document processing device of the present disclosure failing to completely extract desired information (e.g., currency bill serial number or check MICR line) from a document (e.g., currency bill or check), it is contemplated that the device is configured to reprocess the image data associated with that document with a second OCR algorithm. According to some embodiments, the second OCR algorithm is a more robust OCR algorithm that requires additional processing power and/or additional memory/RAM to run or execute. According to some embodiments, the execution of the secondary OCR algorithms is a slower process than the initial execution of the first OCR algorithm. According to some embodiments, the device is configured to post-process the image data that causes the data extraction error by running the more robust algorithm to attempt to extract the desired information from the image data. According to other embodiments, the device executes the secondary more robust OCR algorithm while the device continues to transport and/or process other documents in a stack of documents being processed. According to some embodiments, in response to a data extraction error, the device transmits the image data associated with the data extraction error document to another device and/or system to reprocess the image data with a secondary OCR algorithm.

According to some embodiments, the document processing devices and systems of the present disclosure are configured to run or execute one or more OCR algorithms that are programmed to detect image skew, to crop and rotate snippet images, to locate characters, to remove background data from the snippet image, to segment characters in the snippet image, to trim segmented characters in the snippet image, to compare characters with one or more sets of templates, and finally identify each character. According to some embodiments, the one or more OCR algorithms are configured to make use of facing and orienting information such as each image's front/back orientation and forward/reverse orientation. Such facing and orienting information is implemented by the one or more OCR algorithms to determine expected locations of data of interest for extraction, such as, for example, the expected location of a serial number in an image of a front of a currency bill oriented in a forward manner.

According to some embodiments, the one or more OCR algorithms are configured to detect image skew. That is, the OCR algorithms are executed to detect if image data that is reproducible as a visually readable image of a document, such as a currency bill, is skewed. The one or more OCR algorithms are programmed to find top and side edges of an image and compute two skew angles. One of the skew angles is determined from a left side of the image and the other skew angle is determined from a right side of the image. The two skew angles are necessary to handle images of currency bills that are torn down the center and imaged in a "V" like shape. According to some embodiments, calculating the two skew angles allows the OCR algorithm to extract a serial number from each half of the bill such as for U.S. currency bills that include two identical serial numbers, one serial number from each half of each bill. The two skew angles can be used to rotate the regions including the serial number to deskew the respective regions of interest prior to extracting. In the case of an un-torn document, the two skew angles are substantially equal.

According to some embodiments, the one or more OCR algorithms are programmed to determine a location of the top two corners of the image. The location of the top two corners is used in conjunction with the two skew angles to crop and rotate smaller windows referred to herein as snippet images. For images of currency bills, according to some embodiments, the snippet image contains the serial number portion of the image.

According to some embodiments, the snippet images are rotated by the determined skew angle with respect to one or both of the determined corners of the image such that the characters contained within the snippet image, such as, for example, a serial number of a currency bill, are aligned horizontally/parallel with the top edge of the snippet image. According to some embodiments, the one or more OCR algorithms are programmed to employ an orthogonal transform of the form:

$$R(\theta) = \begin{bmatrix} \cos(\theta) & \sin(\theta) \\ -\sin(\theta) & \cos(\theta) \end{bmatrix}$$

The orthogonal transform can be executed on one or more pixels within the snippet image to calculate a trigonometrically derived constant that is used to determine a path for translating each pixel within the snippet image to deskew the snippet image. According to some embodiments, the orthogonal transform is not calculated for each pixel within the snippet image, but rather, to save time on performing such deskewing computations, the orthogonal transform is only computed once per snippet image. In certain embodiments, the trigonometrically derived constant is used to slide from pixel to pixel within the snippet image, thereby rotating each pixel, one at a time, with respect to one or both of the determined corners of the image.

According to some embodiments, the one or more OCR algorithms are programmed to assume that characters of interest, such as a serial number, are contained within the image snippet. According to some embodiments, the snippet image is large enough to ensure the serial number is contained within the snippet image, but it is too large to execute a background removal algorithm in a predetermined time frame. According to some embodiments, to shorten the processing time, the top of the serial number is located within the snippet image without detecting other text, numbers, and pictures that are included within the snippet image along with the serial number.

According to some embodiments, a bimodal distribution algorithm is executed to separate background pixels (e.g., unwanted pixels, artifacts, etc.) from foreground pixels (e.g., pixels of interest, serial number pixels) in a snippet image. A pixel intensity histogram can be computed for all the pixels in the snippet image. According to some embodiments, the pixel intensity histogram includes two local maxima or two separate peaks. One peak corresponds to the background pixels and the other peak corresponds to the foreground pixels (pixels of interest). The foreground distribution in the histogram and the background distribution in the histogram have different means or averages. According to some such embodiments, an intensity threshold value between the foreground mean and the background mean is determined. According to some embodiments, any pixel having an intensity value lower than the determined intensity threshold is considered a foreground pixel (pixel of interest), which is part of the serial number, and any pixel having an intensity value higher than the determined intensity threshold is considered a background pixel (non-pixels of interest). According to some embodiments, such a separation of foreground pixels and background pixels undesirably classifies non-pixels of interest, such as, for example, artifacts like words, numbers, symbols, and pictures also contained in the snippet image, as foreground pixels.

According to some embodiments, the one or more OCR algorithms are programmed to locate a top edge of a serial number in a snippet image by evaluating a waveform. The waveform is created by totaling a number of pixels determined to be below the intensity threshold for each row of the snippet image. Each sample in the waveform corresponds to the number of foreground pixels in a corresponding row of pixels in the snippet image. According to some embodiments, the one or more OCR algorithms are programmed to process the waveform for certain events such as a sharp rise in the waveform corresponding to a top of a serial number contained in the snippet image or for a sharp drop in the waveform corresponding to a bottom of the serial number. That is, the one or more OCR algorithms process the waveform from, for example, left to right looking for a first instance that the waveform crosses a threshold from low to high.

According to some embodiments, to determine a top and bottom edge of a serial number in a snippet image, the one or more OCR algorithms must locate a portion of the waveform that remains above a threshold without dropping below the threshold for a predetermined number of rows, the drop indicating a location of the bottom edge. The range of samples or number of rows the waveform must remain above the threshold corresponds to the height of the characters contained in the serial number. If the one or more OCR algorithms do not locate the top and the bottom of the serial number after evaluating all of the rows, then the threshold can be adjusted higher and the one or more OCR algorithms are re-executed to attempt to locate the top and bottom again. According to some embodiments, in response to several iterations of re-executing the one or more OCR algorithms that have failed to determine the top and the bottom of the serial number, the waveform can be computed again with a lower intensity threshold that separates the foreground pixels from the background pixels. For example, if the initial intensity threshold was selected as 100, the adjusted intensity threshold can be selected as a predetermined percentage, such as, for example, 90, 85, or 75, etc. According to some embodiments, in response to the one or more OCR algorithms failing to locate a top and a bottom of a serial number within a snippet image after a predetermined number of iterations or a predetermined time, the algorithms time out and the serial number is no-called for the snippet image.

The one or more OCR algorithms of the present disclosure can be programmed to remove background information, which can also be referred to as binarization of a snippet image. According to some embodiments, background removal transforms the rows of a gray-scale snippet image between the top and bottom of the serial number into a binary image by setting dark pixels to a foreground value, such as 1, and all other pixels to a background value, such as 0. According to some such embodiments, the one or more OCR algorithms are programmed to execute an adaptive thresholding algorithm that can accommodate wide varieties of background intensities and seek to remove large dark pictures that conventional adaptive thresholding would ordinarily place in the foreground.

According to some embodiments, for a snippet image having a resolution of about 200 DPI×100 DPI the algorithms employ adaptive means or averages computed from a sliding window for average background and foreground intensities. According to some embodiments, the adaptive means or averages are initialized using the calculated background mean and the calculated foreground mean described above in reference to the bimodal distribution algorithm.

According to some embodiments, the intensity of each pixel in the snippet image is compared to an adaptive threshold that is calculated from a current contrast range in the area of that pixel. The contrast range is calculated as a difference from a running average of background pixel intensity to a running average of foreground pixel intensity. According to some embodiments, in response to a pixel having an intensity that is below the adaptive threshold, the pixel is binarized as foreground information or black. Alternatively, the pixel is binarized as background or white. According to some embodiments, in response to a pixel being determined to be foreground information or black, the average of foreground pixel intensity is updated. Alternatively, the average of background pixel intensity is updated.

According to some embodiments, the one or more OCR algorithms are programmed to execute a gradient edge detector algorithm to determine if a pixel is a portion of a character of interest, such as a serial number character, or a portion of an unwanted artifact. According to some embodiments, the gradient edge detector evaluates two pixels in each direction from a pixel of interest. That is, the gradient edge detector evaluates two pixels above, below, to the left, and to the right of each pixel of interest, thereby evaluating 8 surrounding pixels. The gradient edge detector algorithm makes use of known information such as a serial number character dimension. For example, if the gradient edge detector algorithm determines that a pixel of interest, that is a pixel set as foreground information or black, is surrounded by foreground information or black pixels for two pixels in all directions, then the gradient edge detector algorithm can determine that the pixel being evaluated is not a pixel of a serial number character, but rather is a portion of an unwanted artifact within the snippet image because no character in the character set includes a pixel without an edge in at least 1 horizontal or vertical direction for a snippet image having a resolution of 200 DPI×100 DPI.

According to some embodiments, the one or more OCR algorithms of the present disclosure are programmed to segment or separate each individual character within a snippet image. For example, for a serial number snippet image, the algorithms separate the serial number into separate characters by finding edges of the determined foreground pixel groupings. According to some embodiments, each edge (top, bottom, left and right) is determined for each character. The segmentation of characters may come across artifacts that are present within the snippet image. According to some embodiments, if artifacts were detected and binarized as foreground information or black, the algorithm then discards such pixels as a non-character pixels. According to some embodiments, the algorithms employ pre-programmed information of character spacing and character size to segment the characters. For example, the algorithms make use of pre-programmed information such as information that some serial numbers on certain currency bills have larger character spacing at specific areas of the character sequence. According to some embodiments, the extra spacing is programmed into, or available to, the algorithms to determine if any unwanted artifacts were identified as being a character pixel.

Another challenge of segmentation is identifying artifacts such as graffiti, soil, or residual background information within a snippet image. According to some embodiments, the algorithms employ pre-programmed information of character spacing and character size to accurately assume a location of the edges of a character when no edge is actually present due to unwanted foreground information connecting characters together.

According to some embodiments, the one or more OCR algorithms of the present disclosure are programmed to trim unwanted artifacts from segmented characters. The unwanted artifacts can interfere with segmentation or the contrast of a snippet image can be very low or blurry, which results in inexact character edges. In some embodiments, extra pixels surrounding a segmented character are determined to be foreground information when in fact the pixel is not part of the actual character. According to some embodiments, the unwanted foreground pixels are trimmed away from the segmented character using known heights and widths of each character to match the height and width of a known character template. According to some embodiments, the algorithms locate a side of the segmented character with the least number of foreground pixels and eliminate that row or column. It is contemplated that, according to some embodiments, such trimming allows for a more accurate call or determination of segmented characters.

According to some embodiments, in response to the one or more OCR algorithms of the present disclosure trimming and/or segmenting characters within a snippet image, the algorithms are further programmed to compare the characters with a plurality of character templates. According to some embodiments, the algorithms employ a probabilistic scoring technique. Probabilistic templates are created and stored in an accessible memory of a document processing device or system for each potential character within a snippet image of interest. Each pixel within each template is given a weight based on the uniqueness of that pixel's location across all potential characters in a character set. For example, a pixel location can be given a weight between −10 and +10, where −10 indicates that the pixel location is very highly probable to be OFF or white or a background pixel for a template that matches the character and where +10 indicates that the pixel location is very highly probable to be ON or black or a foreground pixel for a matching template. Put another way, the probability templates indicate that certain pixels are weighted more heavily based on the uniqueness of that pixel in a particular character as compared to other characters in the character set.

According to some embodiments, segmented characters are scored against each probabilistic template in a character set. The foreground pixel and background pixel probabilities are summed and normalized to a maximum possible score for each probabilistic template. According to some embodiments, the template yielding the highest probability score is set as the initial call of the segmented character. According to some embodiments, probability scoring can be improved by emphasizing the top or the bottom portion of certain probabilistic templates because that region includes more information or more pixels than the other portion.

According to some embodiments, in addition to comparing the segmented characters with probabilistic templates, in response to that comparison resulting in a called character, a secondary set of uniqueness templates can be used to further verify the call of the character. For example, certain characters are statistically similar, such as, for example, C and G, or D and O. In these examples, particular areas of the character can be re-examined with a smaller window that possibly will result in the algorithm changing the initial character decision. The area(s) examined is generally a small area that is unique between the two characters in question. For example, the lower right tip of the G is unique from the C. For another example, the rounded left corners of the O are unique from the D. According to some embodiments, re-executing the algorithm to look at these smaller windows can provide more accurate calling results. According to some embodiments, the algorithms further examine the smaller window portion of the original, unbinarized gray-scale image to determine a call of the character.

According to some embodiments, the one or more OCR algorithms of the present disclosure are programmed to extract both serial numbers from image data associated with a currency bill. It is contemplated that comparing each independently extracted serial number can improve an overall call accuracy of the document processing device or system. According to some embodiments, in response to both serial numbers being called, the two extracted serial numbers are compared. In response to corresponding characters from both extracted serial numbers matching, that character is reported as long as the character confidence score is greater than the minimum confidence threshold. Alternatively, if the character does not meet a minimum confidence threshold, the character is no-called.

According to some embodiments, a character from both serial numbers are mismatched, that is the corresponding characters from the two extracted serial numbers do not match. In such embodiments, the algorithms are programmed to determine if either serial number character was overturned during execution of a secondary uniqueness template algorithm. In the case that a secondary uniqueness template was used to alter an original character call from the probability templates for either of the two mismatched characters, the character is automatically no-called. In the case that a secondary uniqueness template was not used to alter the probability template results, and the characters are still mismatched, the algorithms are programmed to determine a separation or gap between the first and second best probability scoring templates. The serial number that has the largest separation or gap between the first and the second scoring templates is used as the final character call. According to some embodiments, the serial number that has the largest separation or gap between the first and the second scoring template is only used if the separation is larger than a predetermined percentage, such as, for example, about 10%. In such embodiments, in response to the separation being less than 10%, the serial number character is no-called.

Document Records and Data Files

Figure 3A:
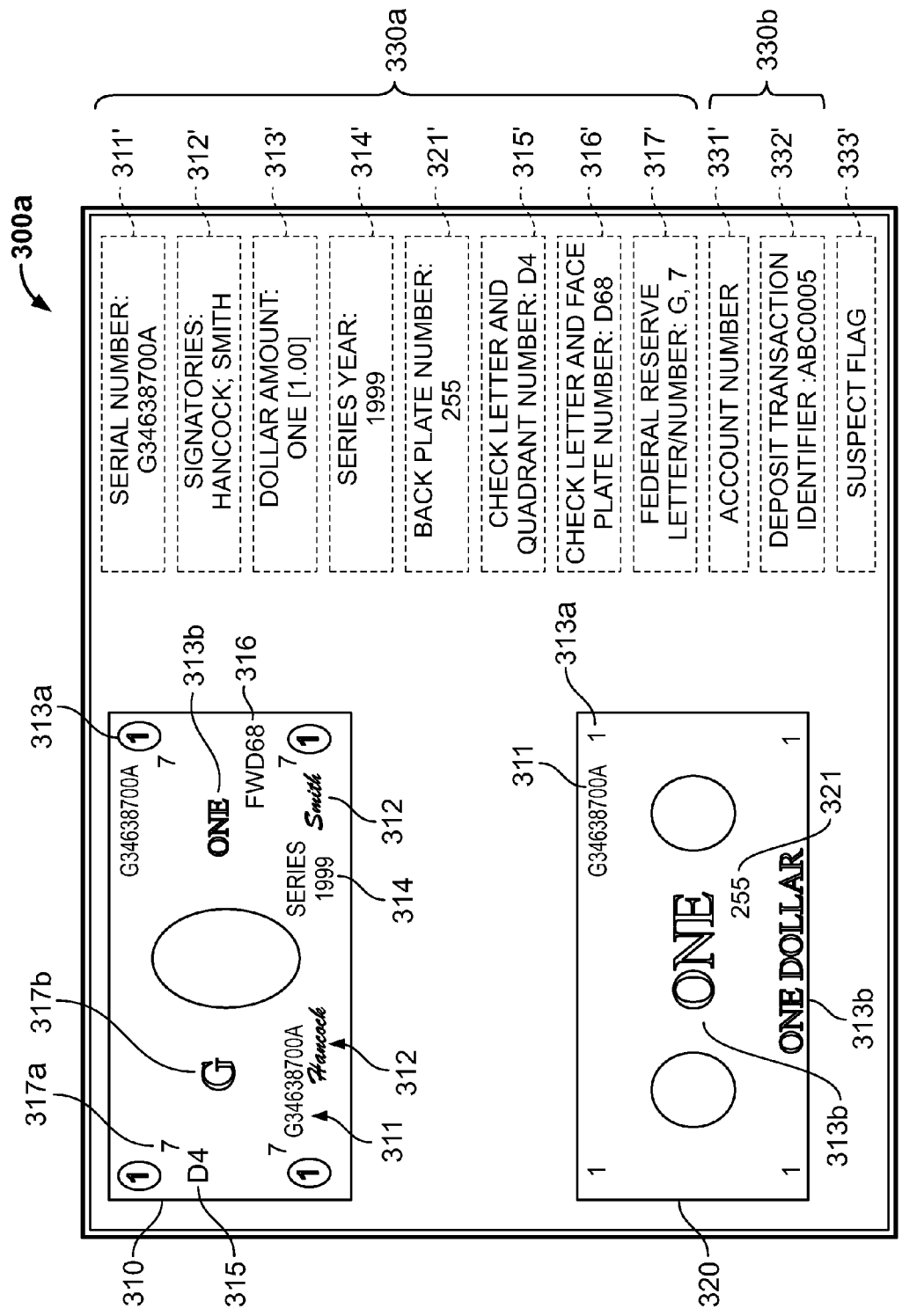
FIG. 3A is a representation for a record for a currency bill according to some embodiments of the present disclosure.

Referring now to FIG. 3A, an exemplary record 300a for a currency bill is illustrated according to some embodiments of the present disclosure. According to some embodiments, the record 300a comprises several parts including, but not limited to, one or more image sections 310, 320 and a plurality of currency bill identifying information data fields 330a. While the record 300a is shown according to a non-limiting example, it is contemplated that the record 300a can include any number, size, shape, type, and orientation of image sections and/or data fields. The first image section 310 includes a visually readable image of a first side of the currency bill. Similarly, the second image section 320 includes a visually readable image of a reverse side of the currency bill. The visually readable images can be reproduced by a display device such as a computer monitor or by a printer device. According to some embodiments, the visually readable image sections 310, 320 can include one or more snippet images in lieu of or in addition to the full images as shown in FIG. 3A. In both the first and the second image sections 310, 320 there is identifying information that can be extracted using OCR software and/or other extraction software and tagged into one or more of the identifying information or extracted data fields 330a. For example, the front side of the one dollar currency bill illustrated in the first image section 310 includes a serial number 311 and the back side of the currency bill illustrated in the second image section 320 includes a back plate number 321. Both of these pieces of identifying information may be extracted using OCR software and tagged to data fields 311' and 321', respectively, for use during subsequent analysis and/or processing of the currency bill.

According to some embodiments, the currency bill identifying information data fields 330a can include: a serial number data field 311', a signatories data field 312', a denomination data field 313', a series data field 314', a back plate number data field 321', a check letter and quadrant number data field 315', a check letter and face plate number data field 316', and/or a federal reserve letter/number data field 317'. To better understand these various data fields, reference is made to the image fields 310 and 320, which include images of a $1 currency bill having a variety of identifying information. For example, the $1 currency bill shown has a serial number 311, two signatories 312 (Treasurer's signature and signature of the Secretary of Treasury), a numeric denomination 313a in addition to one or more written denominations 313b, series 314, a back plate number 321, a check letter and quadrant number 315, a check letter and face plate number 316, a federal reserve number 317a, and a federal reserve letter 317b. The various corresponding currency bill identifying information data fields 330a include data, such as, for example, alphanumeric data or characters extracted from the visually readable images of the $1 currency bill in the image sections 310, 320. For example, the serial number 311 is extracted from the image data that is reproducible as a visually readable currency bill image and tagged or recorded into the serial number data field 311'.

According to some embodiments, the record 300a includes a flag code field 333' such as a suspect flag. The flag code field 333' can be used to visually and/or electronically flag the record 300a as a suspect, a no-show, unexpected, etc. According to some embodiments, the flag code field 333' includes characters and/or symbols that can be the word "suspect" or any other term or phrase or bit or bit-sequence to indicate a condition or flag status associated with the record 300a. For example, a "1" in a suspect field may indicate the record has been tagged to indicate it is associated with a suspect document and a "0" may indicate that the record has not been tagged which would indicate that the record is not associated with a suspect document. Likewise, the flag code field 333' may comprise different portions or codes associated with one or more flagging conditions such no-call, find document, etc.

According to some embodiments, the flag code field 333' can be used to visually and/or electronically include a reason associated with why a document was flagged. For example, for a currency bill, the document processing device may identify the currency bill as suspect based on any of a number of attributes, such as, for example, a serial number extracted from the currency bill matching a serial number in a suspect or blacklist database, non-conforming magnetic properties, non-conforming infrared characteristics, non-conforming UV characteristics, non-conforming iridescence characteristics, non-conforming thread characteristics, non-conforming watermark characteristics, non-conforming paper characteristics, and other types of security characteristics known in the art. That is, according to some embodiments, an operator of a document processing device and/or system reviewing and/or searching records, such as described below in the Modes of Operation—Searching/Master Database Section, and in other sections of the present disclosure, can determine the reason that a particular record was tagged as being associated with a suspect document by looking up the reason contained in the flag code field 333'.

According to some alternative embodiments, a record including a determined suspect attribute and image data associated with a document can be created and stored in a suspect database for later evaluation. According to some such embodiments, a serial number of the determined suspect document, for currency bills, can further be included in the record and the records can be stored in a memory of a document processing device such that subsequent identification of currency bills including the serial number and/or the same counterfeit attributes can be readily identified.

In addition to the image sections 310, 320 and the currency bill identifying information data fields 330a, the record 300a may also include transaction information data fields 330b, such as, for example, alphanumeric or biometric data associated with a person or a bank account associated with the processed documents. For example, the record 300a may also include an account number data field 331' that is associated with a financial institution account that the currency bill was deposited into for a credit. The account number 331' can be the financial institution account number (e.g., bank account number) of a customer, such as a store, depositing the currency bill associated with the record 300a into its financial institution account. According to some embodiments, the deposit of the currency bill is associated with a deposit transaction, where the deposit transaction involves the depositing of a plurality of documents into the financial institution account along with the currency bill associated with the record 300a. According to some embodiments, the deposit transaction can be identified with a deposit transaction identifier 332' and/or batch identifier. According to some embodiments, the deposit transaction identifier is a unique identifier. The deposit transaction identifier 332' can be an alphanumeric string of characters (e.g., ABC0005) that identifies a deposit and/or financial transaction at least involving the currency bill. According to some embodiments, the deposit transaction identifier 332' identifies the customer (e.g., store ABC) and/or a number of the transaction between the customer and the financial institution (e.g., 5th transaction between the store ABC and the financial institution). The transaction information may be tagged to the record 300a by the document processing device 101, 101', or a processor, and/or a computer (e.g., the computer 151) coupled thereto. According to some embodiments, the transaction information can be obtained from an operator, a deposit slip (e.g., virtually created deposit slip or MICR encoded deposit slip), a header/trailer card, a networked bank computer, and/or teller software. According to some embodiments, the record 300a may also include an operator or teller field (not shown). The operator field can be used to provide the identity of the operator of the device 101, 101' for a transaction. For example, the operator field provides the identity of a bank teller or cashier associated with a transaction. According to some embodiments, a personnel field could be included in the record to identify the individual from whom processed documents were obtained (e.g., individual cashier or bank teller) and an operator field could be included to identify the operator of the device which may be beneficial where the operator of the device 101, 101' differs from the individual providing a stack of documents to be processed by the device 101, 101'. As will be described in more detail below, such fields may be useful in subsequently identifying a teller or an operator and/or other personnel associated with a particular document, for example, where a currency bill is later determined to be counterfeit and/or determined to be missing.

According to some embodiments, other image sections and/or data fields may also be included for a currency bill, such as, a data field relating to the issuing federal reserve bank, the country of origin (if multiple country currencies are accepted), and others. It is also contemplated that foreign currency may have other useful information on the bill, such as, other security measures which it may be useful to extract from the image of the bill. One example would be a data field identifying the size of the currency document. In many foreign countries, the size of the currency bill varies with denomination.

According to some embodiments, the record 300a only includes a snippet image of a serial number and a serial number data field. According to some embodiments, the record 300a only includes a snippet image of a serial number, a serial number data field, and a transaction identifier. According to some such embodiments, the transaction identifier can be associated with the customer's financial institution account number to enable a post-processing lookup or query if necessary to perform a charge-back, which is described in detail below in the Modes of Operation—Searching/Master Database Section, and in other sections of the present disclosure. According to some embodiments, the record 300a includes one or more of the above data fields, but does not include any of the image sections 310, 320.

Figure 3B:
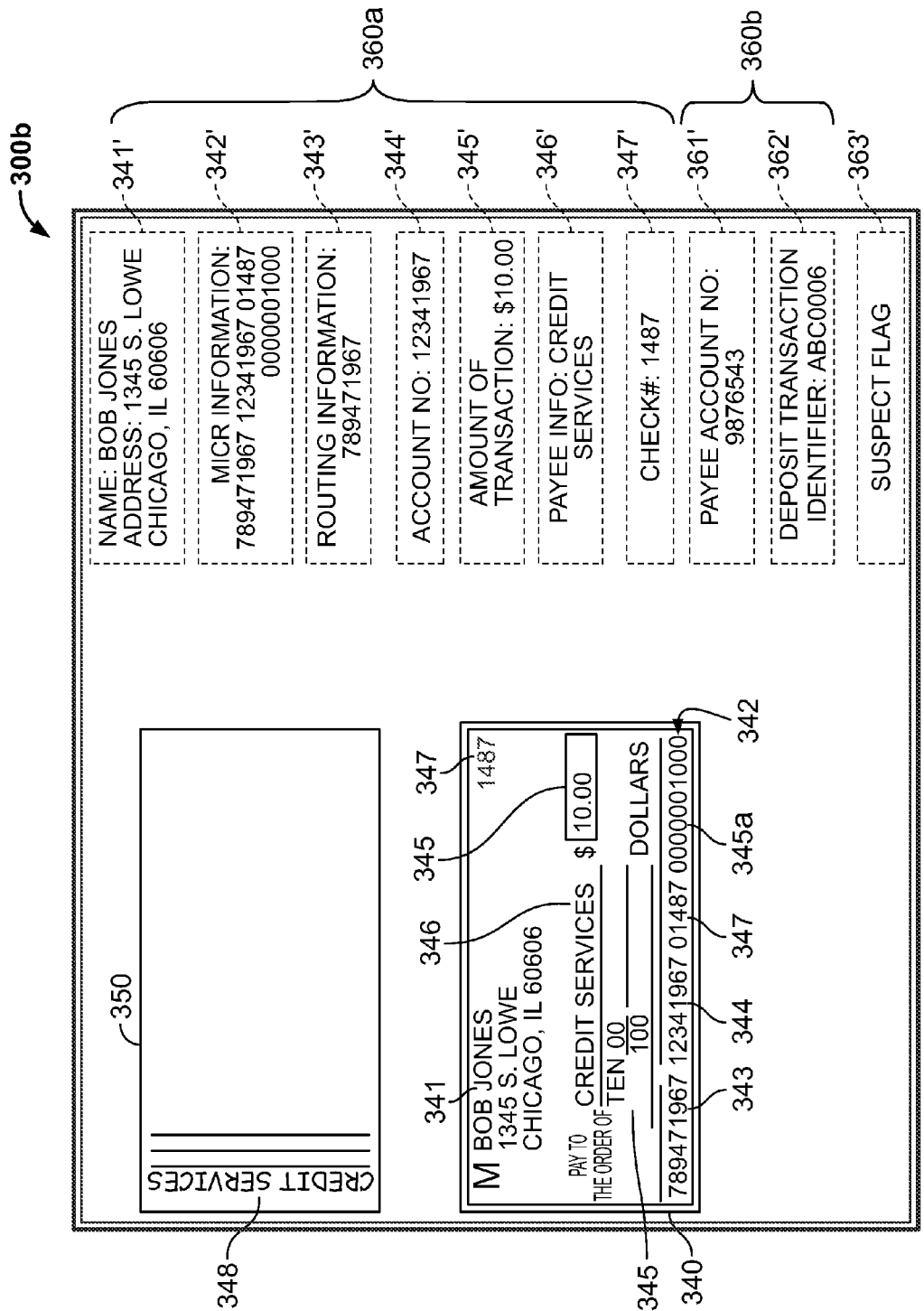
FIG. 3B is a representation for a record of a check according to some embodiments of the present disclosure.

Turning now to FIG. 3B, an exemplary record 300b for a check is illustrated according to some embodiments of the present disclosure. According to some embodiments, the record 300b comprises several parts including, but not limited to, one or more image sections 340, 350 and a plurality of check identifying information data fields 360a. While the record 300b is shown according to a non-limiting example, it is contemplated that the record 300b can include any number, size, shape, type, and orientation of image sections and/or data fields. In the illustrated check example, both sides of the check have been scanned and imaged. In other embodiments, it may be desirable to scan and/or image only one side of the check. Yet in other embodiments, it may be desired to scan and produce a snippet image of, for example, a MICR section of the check, a courtesy amount section (CAR), a legal amount section (LAR), or a combination thereof. In the embodiment illustrated, the first image section 340 includes a visually readable image of a first side of the check. Similarly, the second image section 350 includes a visually readable image of a reverse side of the check. The visually readable images can be reproduced by a display device such as a computer monitor or by a printer device. In both the first and second image sections 340, 350 there is identifying information that can be extracted from the visually readable images using OCR software and/or other extraction software and tagged to one or more of the identifying information data fields 360b.

According to some embodiments, the check identifying information data fields 360a can include: a drawer data field 341', a MICR data field 342', a routing data filed 343', an account number data field 344', a transaction amount data field 345', a payee data field 346', and a check number data field 347'. To better understand these various data fields, reference is made to the first and the second image sections 340 and 350. In the image sections 340 and 350, the visually readable image of the check reveals that the check includes a variety of identifying information. For example, the check shown has drawer identification information 341, MICR data 342, an ABA number 343 (that is a routing and transit number), a bank account number 344, a check amount 345 (courtesy amount and/or legal amount), a MICR encoded check amount 345a, a payee name 346, a check number 347, and an endorser signature 348 (back surface of the check). The various check identifying information data fields include data such as, for example, alphanumeric data or characters extracted from the image data that is reproducible as the visually readable images of the check in the image sections 340, 350. For example, the MICR data 342 is extracted using OCR software and/or other extraction software and tagged into the data portion 342', such as described in, for example, the Optical Character Recognition Section, and in other sections of the present disclosure. According to some alternative embodiments, the transaction amount 345 is extracted and printed on the check as the MICR encoded check amount 345a such that a MICR reader can obtain the check amount.

In addition to the image sections 340, 350 and the check identifying information data fields 360a, the record 300b may also include transaction information data fields 360b, such as, for example, alphanumeric or biometric data associated with a person or a bank account associated with the processed documents. For example, the record 300b may also include a payee account number data field 361' that is associated with a financial institution account of a person or company endorsing and/or depositing the check for a credit. The payee account number 361' can be the financial institution account number (e.g., bank account number) of a customer, such as a store, depositing the check associated with the record 300b into its financial institution account. According to some embodiments, the deposit of the check is associated with a deposit transaction, where the deposit transaction involves the depositing of a plurality of documents into the financial institution account along with the check associated with the record 300b. According to some embodiments, the deposit transaction can be identified with a deposit transaction identifier 362'. According to some embodiments, the deposit transaction identifier is a unique identifier. The deposit transaction identifier 362' can be an alphanumeric string of characters (e.g., ABC0006) that identifies a deposit and/or financial transaction at least involving the check. According to some embodiments, the deposit transaction identifier 362' identifies the customer (e.g., store ABC) and/or a number of the transaction between the customer and the financial institution (e.g., 6th transaction between the store ABC and the financial institution). Thus, as compared to the deposit transaction identifier 332' associated with the record 300a, the deposit transaction identifier 362' indicates that the record 300b is associated with the 6th deposit transaction between Store ABC and the financial institution, which occurred after the deposit transaction associated with the record 300a. According to some embodiments, the transaction information may be tagged to the record 300b by the document processing device 101, 101' or a processor, and/or a computer (e.g., the computer 151) coupled thereto. According to some embodiments, the transaction information in the transaction information data fields 360b can be obtained from an operator, a deposit slip (e.g., virtually created deposit slip or MICR encoded deposit slip), a header/trailer card, a networked bank computer, and/or teller software.

It should be recognized that the data fields 360a,b are not inclusive of all possible data fields and types of information that can be tagged to the record 300b. For example, in some cases, it may also be useful to extract characters corresponding to the memo line of the check. In addition, it is contemplated that in some embodiments the operator may fill in and/or correct one or more of the data fields. According to some embodiments, the record 300b includes one or more of the above data fields, but does not include any of the image sections 340, 350. According to some embodiments, the record 300b may also include an operator field and/or a personnel field (not shown) as described above in connection with record 300a.

According to some embodiments, the record 300b includes a flag code field 363', such as a suspect flag. The flag code field 363' can be used to visually and/or electronically flag the record 300b as a suspect, a no-show, and/or unexpected. According to some embodiments, the flag code field 363' includes characters and/or symbols that can be the word "suspect" or any other term or phrase to indicate a condition or status associated with the record 300b or otherwise indicate various flag code information similar to the flag code field 333' described above.

According to some embodiments, the flag code field 363' can be used to visually and/or electronically include a reason associated with why a document was flagged. For example, for a check, the document processing device may identify the check as suspect based on any of a number of attributes, such as, for example, a MICR line or a portion thereof extracted from the check matching a MICR line information or a portion thereof in a suspect or blacklist database, non-conforming magnetic properties, non-conforming infrared characteristics, non-conforming UV characteristics, non-conforming iridescence characteristics, non-conforming thread characteristics, non-conforming watermark characteristics, non-conforming paper characteristics, and other types of security characteristics known in the art. That is, according to some embodiments, an operator of a document processing device and/or system reviewing and/or searching records, such as described below in the Modes of Operation—Searching/Master Database Section, and in other sections of the present disclosure, can determine the reason that a particular record was tagged as being associated with a suspect document by looking up the reason contained in the flag code field 363'.

According to some embodiments, the data fields 330a,b and 360a,b include characters such as alphanumeric data as opposed to images of the corresponding data to facilitate processing of the imaged document and/or forwarding of the record 300a,b or portions thereof and/or searching or querying of a database containing a plurality of records or portions thereof such as a database containing the data (non-image) portions of the records 300a,b. Yet, according to other embodiments, the image fields can include snippet images of the corresponding data and/or the alphanumeric data. In these embodiments, the snippet images allow an operator to check the accuracy of the OCR or other extraction software at a later time.

Figure 3C:
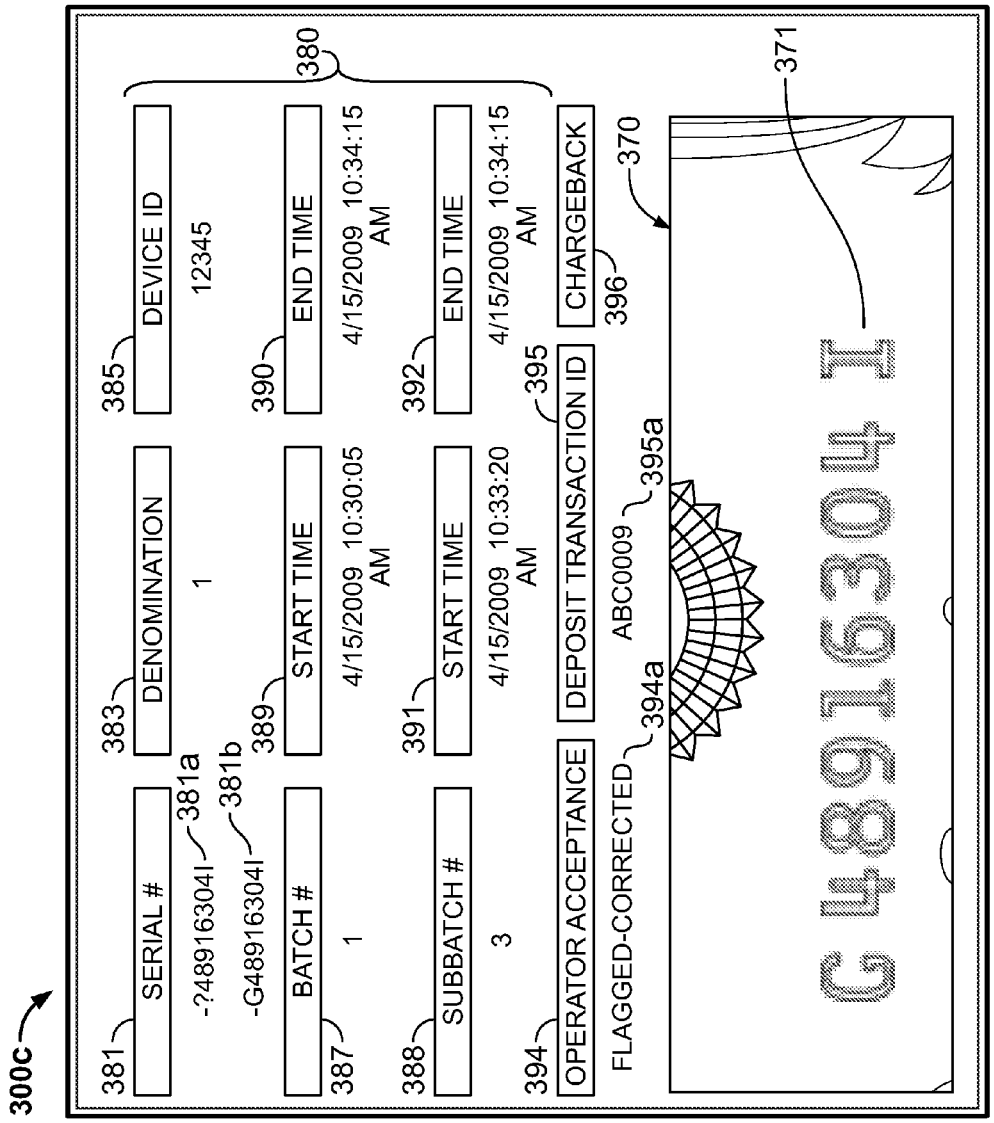
FIG. 3C is a representation for a record of a currency bill according to some embodiments of the present disclosure.
Figure 3D:
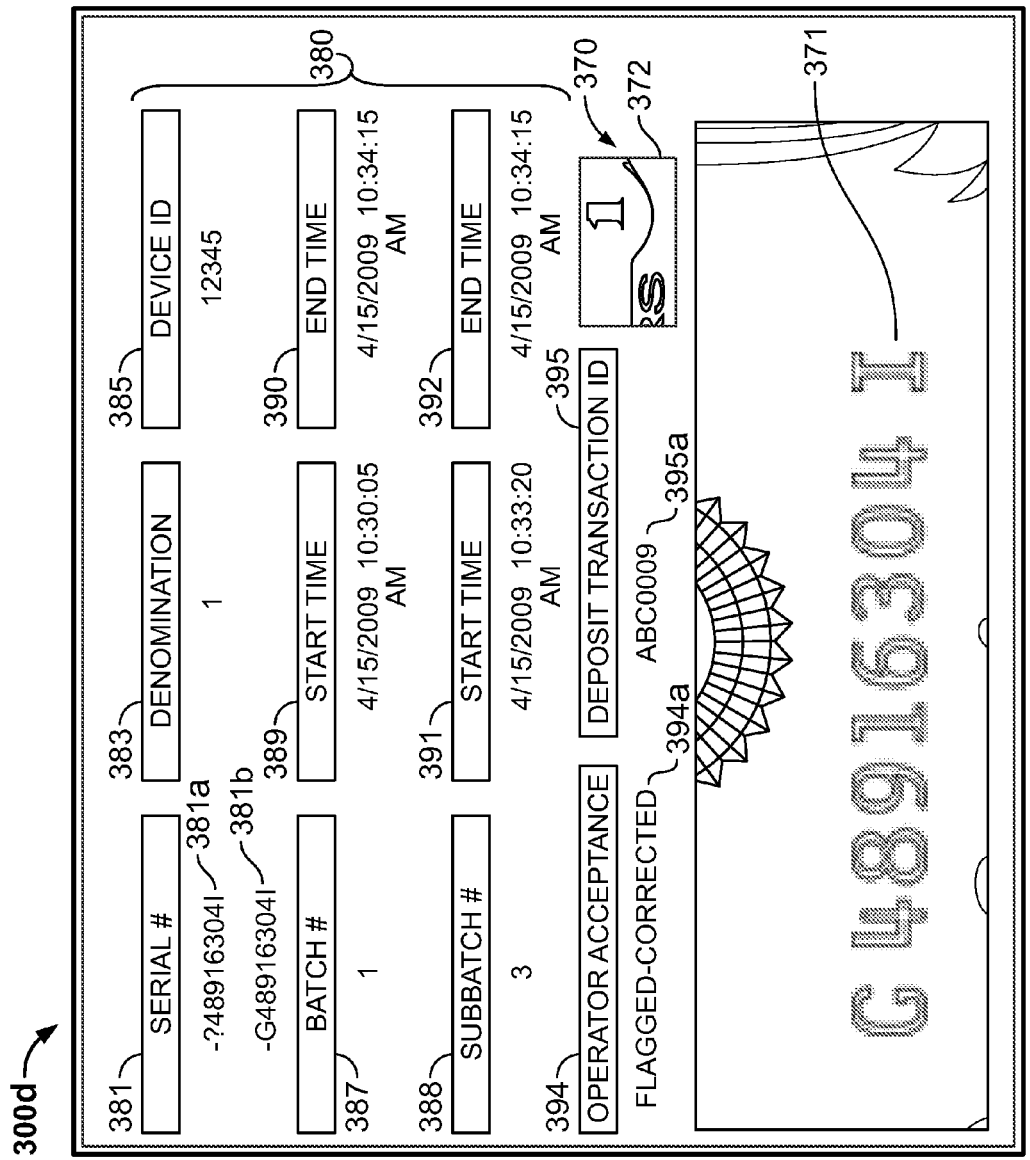
FIG. 3D is a representation for a record of a currency bill according to some embodiments of the present disclosure.

Now turning to FIGS. 3C and 3D, exemplary records 300c and 300d for a currency bill are illustrated according to some embodiments of the present disclosure. According to some embodiments, the records 300c,d each comprise several parts including, but not limited to, one or more image sections 370, and a plurality of data fields 380. While the records 300c and 300d are shown according to a non-limiting example, it is contemplated that the records 300c and 300d can include any number, size, shape, type, and orientation of image sections and/or data fields. For example, the image section 370 of the record 300c includes a visually readable image of a currency bill serial number snippet. For another example, the image section 370 of the record 300d includes a visually readable image of a currency bill serial number snippet and a currency bill denomination or corner snippet. The currency bill denomination or corner snippet includes a visual representation of a denomination 372 associated with the record 300d. The visually readable snippet images can be reproduced by a display device such as a computer monitor or by a printer device. In the image section 370 there is identifying information that can be extracted from the visually readable images using OCR software and/or other extraction software and tagged into one or more of the data fields 380. For example, the serial number snippet of the currency bill illustrated in the image section 370 includes a serial number 371. This serial number 371 may be extracted using OCR software and tagged to serial number data field 381 for use during subsequent analysis and/or processing of the currency bill.

According to some embodiments, for an eleven character serial number, the OCR or other software accurately extracts ten or eleven of the eleven alphanumeric characters in the serial number. According to some embodiments, the OCR or other software accurately extracts ten of the ten alphanumeric characters in the serial number 371. According to some embodiments, the OCR or other software accurately extracts nine of the ten alphanumeric characters in the serial number 371, as shown in FIG. 3C. Put another way, the document processing device 101, 101' that runs the OCR or other software cannot determine one or more of the characters with a confidence equal to or greater than a predetermined confidence level. In the example shown in FIGS. 3C and 3D, the document processing device 101, 101' was unable to determine the first character of the serial number 371. Thus, the initial serial number extraction 381a contains a "?" as the first of the ten characters. According to some embodiments, the document processing system 100 is configured to provide a means (e.g., keyboard, softkeys, mouse, touch screen, etc.) for an operator to enter the missing character (e.g., "G"), which is described below in the Modes of Operation—Flagging Section, and in other sections of the present disclosure. The corrected or manually completed serial number 381b is shown below the initial serial number extraction 381a in the serial number data field 381.

According to some embodiments, the data fields 380 may further include a denomination data field 383, a device ID data field 385, a batch number data field 387, a subbatch number data field 388, a batch start time data field 389, a batch end time data field 390, a subbatch start time data field 391, a subbatch end time data field 392, an operator acceptance data field 394, a deposit transaction ID data field 395, an operator field (not shown), a personnel field (not shown) or any combination thereof. The serial number snippet image of the currency bill partially depicted in the image section 370 is associated with a denomination. As described above, the document processing system 100 or device 101, 101' is configured to determine the denomination of the currency bill and tag the determined denomination to the record 300c,d in the denomination data field 383. As shown, the associated denomination of the currency bill is a one dollar currency bill. The device ID can be any name, reference, or serial number of the document processing system 100 or device 110, 101' being used to generate the record 300c. In the illustrated embodiment, the device ID is 12345, which is included in the device ID data field 385.

A batch number and subbatch number correspond to primary and sub-sessions of processing documents with the document processing system 100 or device 101, 101'. In the illustrated embodiment, the record 300c,d was generated by the document processing system 100 or device 101, 101' during a third subbatch of a first primary session. For example, an operator is processing seven hundred and fifty documents deposited by a Store in a Bank. The operator turns on the document processing system 100 or device 101, 101' that prepares to receive documents of a first batch. The operator inputs two hundred and fifty documents into the input receptacle 110 of the document processing system 100. These two hundred and fifty documents comprise a first subbatch of the first batch. After the first subbatch is processed, the operator can remove the documents from the output receptacle 130 and insert an additional three hundred of the seven hundred and fifty documents as a second subbatch. Similarly, after the second subbatch is processed, the operator can remove the documents from the output receptacle 130 and insert the remaining two hundred documents as the third and final subbatch of the first batch of documents. Thus, each individual run or processing of batches or subbatches of documents can be identified using by the batch data field 387 and/or by the subbatch data field 388.

According to some embodiments, the batch start time data field 389, the batch end time data field 390, the subbatch start time data field 391, and the subbatch end time data field 392 can further be used to identify the batch and subbatch of the document associated with the record 300c,d. As shown in the illustrated embodiment, the processing of the first batch started on Apr. 15, 2009 at 10:30:05 AM and ended on Apr. 15, 2009 at 10:34:15 AM. Additionally, as shown in the subbatch start and end time data fields 391 and 392, the processing of the third subbatch started on Apr. 15, 2009 at 10:33:20 AM and ended on Apr. 15, 2009 at 10:34:15 AM.

According to some embodiments, as described above, the record 300c,d can also include the operator acceptance data field 394. The operator acceptance data field 394 can be used to visually and/or electronically flag the record 300c as being associated with a suspect document, a no-show document, an unexpected document, a manually corrected document, an automatically corrected document, and/or an accepted document. According to some embodiments, the operator acceptance data field 394 includes information associated with one or more flag conditions or flag criteria and a related outcome. The flag criteria can include, but are not limited to, no-call denomination, extraction error-currency bill, extraction error-check or extraction error MICR line, suspect, fitness, soil, no-show, unexpected, serial number location, and bill characteristic location. As shown in FIGS. 3C and 3D, the operator acceptance data field 394 includes a flagged—corrected outcome 394a. According to some embodiments, the flagged—corrected outcome 394a indicates that the currency bill associated with the record 300c,d was flagged by the document processing system 100 or device 101, 101' as missing data. In some embodiments, the missing data can be a missing denomination, a missing alphanumeric character from a currency bill serial number or from a check MICR line. The missing data can be caused by a failure to completely OCR image data. Other flagged—outcomes include, but are not limited to, flagged—corrected denomination, flagged—corrected serial number, flagged—corrected MICR line, flagged—suspect, flagged—accepted, flagged—no-show, flagged—unexpected, and not flagged. The flag criteria and related outcomes are further described below in the Modes of Operation—Flagging Section, and in other sections of the present disclosure.

According to some embodiments, the deposit transaction ID data field 395 includes a transaction identifier 395a. The transaction identifier 395a may be the same as, or similar to, the deposit transaction identifiers 332' and 362' described above in reference to FIGS. 3A and 3B. According to some embodiments, an operator of the document processing system 100 can use the transaction identifier 395a to identify a customer financial account number that the currency bill associated with the record 300c,d is to be or was deposited into for a credit. In the case of the currency bill being a suspect, the operator can then initiate a charge-back if credit was already given for the deposit of the currency bill via the document processing system 100 and/or teller software communicatively connected with a banking system (e.g., the banking system 460 for FIGS. 4A-B) that maintains the customer financial institution account.

Now turning to FIG. 3E, a data file 301 including transaction information 303 and a plurality of records 305 is shown according to some embodiments. According to some embodiments, each of the plurality of records 305 corresponds with one of a plurality of documents associated with a deposit transaction. According to some embodiments, the deposit transaction is between a customer (e.g., the Store) and a financial institution (e.g., the Bank). According to some such embodiments, the customer desires to deposit the plurality of documents into the financial institution for a credit to the customer's financial institution account, which is maintained at the financial institution. The document processing system 100 is configured to receive the plurality of documents associated with the deposit transaction and to process the plurality of documents, as described above in reference to FIGS. 1 and 2A-C, to generate the data file 301. According to some embodiments, as described in detail below in reference to FIGS. 4A-B, the data file 301 can be transmitted electronically over a network from the customer to the financial institution for a provisional and/or a final credit to the customer's financial institution account for all of or a portion of the plurality of documents. According to some embodiments, issuing a final credit makes the credit available for immediate withdrawal by the customer.

According to some embodiments, the transaction information 303 can include a financial institution account number field 303a, a declared deposit amount or a total deposit amount field 303b, a number of documents field 303c, a description of a type of financial transaction field 303d, a transaction identifier field 303e, an operator field (not shown), a personnel field or a combination thereof. According to some embodiments, an operator of the document processing system 100 inputs some or all of the transaction information 303 into the document processing system 100, which is configured to automatically populate and/or insert the inputted transaction information into the data file 301. According to some embodiments, the transaction information 303 forms a virtual deposit slip. According to some embodiments, the document processing system 100 can be configured to, and/or communicatively connected to a printer to, print the virtual deposit slip for forwarding with the physical documents associated with the deposit transaction to be deposited.

Alternatively or additionally, the transaction information 303 is displayed as a visually readable image of a preprinted deposit slip within the data file 301. In some such alternative embodiments, the customer can fill out the preprinted deposit slip with hand-written data (e.g., a total deposit amount, a total number of documents, etc.) and the document processing system 100 can be configured to include a visually readable image of the preprinted deposit slip including the hand-written data in the data file 301. Additionally, in some embodiments, the document processing system 100 can be configured to use OCR and/or other software (e.g., CAR/LAR software) to extract the hand-written data on the preprinted deposit slip and populate and/or insert the extracted data in one of the corresponding transaction information fields 303 of the virtual deposit slip.

The financial institution account number field 303a includes a financial account number (e.g., 1237300) of, for example, the customer conducting the deposit transaction with the financial institution (e.g., the Bank) into which funds associated with the deposit transaction are to be deposited, e.g., the value of the plurality of documents deposited. According to some embodiments, the financial account number indicates to the Bank which customer transmitted the data file 301 for the credit. The total deposit amount and/or a value of the plurality of documents is included in the total deposit amount field 303b. The total deposit amount field 303b includes a value, for example, $100.00, as shown, associated with a sum of values associated with each of the documents associated with the deposit transaction to be deposited. The total number of documents field 303c includes the number of documents, for example, 8, as shown, in the plurality of documents that is associated with the deposit transaction to be deposited. The description of a type of financial transaction field 303d indicates that the data file 301 is associated with a deposit transaction between, for example, the customer and the financial institution. The transaction identifier field 303e includes a transaction identifier, for example, ABC 0001, as shown, that can be used to uniquely identify the deposit transaction involving the data file 301. Put another way, the transaction identifier can be used to reference the deposit of the plurality of documents into the customer's financial account.

As discussed above, the data file 301 includes the plurality of records 305, where each of the plurality of records 305 corresponds with one of the plurality of documents associated with the deposit transaction. According to some embodiments, the records 305 are organized into a plurality of data columns 306a-e. For example, according to some embodiments, the data file 301 includes a document number or document ID column 306a, a full visually readable document image column 306b, a visually readable snippet image column 306c, an extracted data (e.g., extracted serial number, extracted MICR line, or any other data extracted from a currency bill or a check) column 306d, a document value column 306e, or any combination thereof and each record includes a field corresponding to each column, such as, for example, a document number or ID field, a full image field, etc. It is contemplated that according to some embodiments, the data file 301 can include more or less data columns. For example, according to some such embodiments, the data file 301 can include a financial account number data column, a device ID column, a batch number column, a subbatch number column, start and end batch and/or subbatch processing time column(s), an operator acceptance column, or any combination thereof. According to some embodiments, some or all of the transaction information 303 may instead be included in corresponding columns and the data file 301 need not include a separate transactional section in the data file. Rather, the records associated with a particular transaction can be identified from the information in the transactional columns or fields.

According to some alternative embodiments, the data file 301 is a teller drawer file. The teller drawer file includes a plurality of records, like records 305. Further details of the teller drawer file as discussed below in the Document Auditing and Tracking Section, and in other sections of the present disclosure.

As shown in FIG. 3E, the document ID column 306a includes a document identifier for each of the records 305. According to some embodiments, the document ID indicates an order that the plurality of documents were processed in the document processing system 100. For example, as shown, the plurality of documents includes 8 currency bills (e.g., documents 1-8) to be deposited into the financial institution. The first record 305a is associated with a first of the documents to be processed and the eighth record 305h is associated with a last of the documents to be processed that are associated with the deposit transaction identified by the transaction ID ABC 0001.

According to some embodiments, the data file 301 includes the full visually readable document image column 306b. The full visually readable document image column 306b can include a full visually readable image of one or both sides of each respective document. For example, the third record 305c includes a full visually readable image of the third document associated with the deposit transaction. Alternatively or additionally, the data file 301 includes the visually readable snippet image column 306c. The visually readable snippet image column 306c can include one or more visually readable snippet images of each respective document. For example, the fifth record 305e includes a visually readable serial number snippet image of the fifth document associated with the deposit transaction. According to some embodiments, the visually readable snippet image column 306c can include a denomination and/or corner snippet image in lieu of or in addition to the serial number snippet images shown in FIG. 3E.

According to some embodiments, the data file 301 includes the extracted data column 306d. According to some embodiments, for currency bills, the extracted data column 306d includes serial numbers extracted from each respective document. According to some embodiments, the serial number is extracted from a respective full visually readable image and/or a respective serial number snippet image. For checks, the extracted data column 306d can include MICR characters extracted from either a full visually readable image and/or a MICR snippet image (not shown).

According to some embodiments, the data file 301 includes the document value column 306e. The document value column 306e includes a denomination and/or value for each of the records 305 associated with respective ones of the documents to be deposited. For example, the first, second, and third records 305a-c are associated with twenty dollar currency bills to be deposited. Thus, the document value column 306e includes a value of "20" for the records 305a-c. Similarly, the fourth, fifth, and sixth records 305d-f are associated with ten dollar currency bills to be deposited. Thus, the document value column 306e includes a value of "10" for the records 305d-f. Similarly, the seventh and eighth records 305g-h are associated with five dollar currency bills to be deposited. Thus, the document value column 306e includes a value of "5" for the records 305g-h.

Deposit Transaction

Currently, banks and stores (e.g., retail store) lack real-time visibility of on hand currency, which limits the efficient use of the on hand currency. For example, a typical retail store does not currently have visibility or current data relative to checks, currency, and/or other mediums of payment about to be deposited at its bank. The larger the retail store, the greater the amount of currency in process and in transit between the store and the bank of deposit. It is contemplated that knowledge of on hand currency and knowledge of currency and checks in transit to the bank enables a store to better forecast currency requirements for the store's clerk drawers for the following day of business.

Similarly, banks currently lack real-time visibility relative to incoming deposits for the bank's various commercial customers until the deposits arrive at the bank or at one of the bank's vaults for processing. It is contemplated that visibility of deposits at the time the deposits are being created at the store and prior to transport to the bank and/or bank vault can enable a bank to better anticipate and plan for expected currency receipts in a given day. With such information banks would be better equipped to manage the bank's overall currency inventory, accelerate accounting of currency balances, and in turn reduce the amount of currency inventory on hand required to effectively service the bank's commercial customers.

According to some embodiments, the document processing devices and systems of the present disclosure can be implemented to enable stores to better manage their respective currency balances and increase velocity or turn over of cash flow. Similarly, according to some embodiments, the document processing devices and systems of the present disclosure can be implemented to enable banks to provide their commercial customers credit for deposits even before the deposits physically reach the bank or the bank's vault. Such apparatuses, systems, and methods are described herein.

According to some embodiments, a bank customer (e.g., a grocery store, a hardware store, a clothing store, etc.) receives documents including, currency bills and checks, throughout a workday from patrons purchasing products and/or services. These currency bills and checks are temporarily stored in a plurality of cash registers or cash tills. At the end of the workday, or at one or more periods throughout the day (e.g., shift changes), the plurality of currency bills and checks in the cash tills is removed for processing in one or more document processing devices. Alternatively, only an excess portion of the currency bills in the cash tills is removed with the checks.

According to some embodiments, a store employee (e.g., a clerk or manager of the bank customer) inserts one or more stacks or batches of currency bills and checks into an input receptacle of a document processing system, such as, for example, the document processing system 100. The document processing system at least includes a document processing device, such as, for example, the document processing device 101. In some embodiments, the document processing system also includes a computer communicatively connected to the document processing device. Yet, in other embodiments, the document processing system includes a document processing device with a built-in processor or controller with enough computing power to perform a plurality of document processing operations on-board. The document processing system transports the currency bills and checks one at a time along a transport path such that each of the currency bills and checks is scanned and imaged by one or more image scanners to generate image data and/or records associated with the currency bills and checks. According to some embodiments, the records each include image data that can be reproduced as a visually readable image of one of the currency bills or checks. A record can include a visually readable image of one or more sides of a document, a portion of the document, a snippet image of the document, or a combination thereof. According to some embodiments, the records include extracted identifying information, which corresponds to the visually readable image(s) included in the respective record. For example, a currency bill serial number or a checking account number can be extracted from image data and included in a data field of a respective record. According to some embodiments, each record includes a store employee identifier associated with the store employee that received the respective document throughout the store employee's shift. According to some embodiments, the generated records include all of or a portion of the information/data and/or images in the records 300a-d described in the Document Records and Data Files Section and in connection with FIGS. 3A-3D, and in other sections of the present disclosure.

According to other embodiments, the store employee inserts a plurality of currency bills and a plurality of checks into the input receptacle. According to some such embodiments, the plurality of currency bills is a first group of documents processed separately from the plurality of checks, which is a second group of documents. The two groups of documents can be related via a transaction identifier, a customer identifier, and/or a batch identifier. According to some embodiments, processing the currency bills separately from the checks as different groups increases overall processing efficiencies and decreases the overall document processing time. According to some embodiments, the store employee inserts a plurality of currency bills and a plurality of checks into the input receptacle as a sorted batch of documents to be processed according to an order-batch mode of operation as defined herein in the Definitions Section.

According to some embodiments, one or more store employees can review and/or analyze the records to obtain real time information associated with the currency bills and/or checks to be deposited into the store's bank that day.

According to some embodiments, the document processing system is configured to generate one or more reports including information associated with the processed documents to be deposited, such as, for example, check totals and currency bill totals, which can give one or more store employees overall visibility of the size of the store's deposit at the bank. The generated report can be printed on a communicatively connected printing device and/or displayed on one or more communicatively connected displays, such as, for example, control panel 170.

According to some embodiments, after the groups of currency bills and checks are processed by the document processing system, a data file including the records associated with those documents are transmitted over a network to a bank for a provisional deposit credit. It is contemplated that according to some embodiments, the store may decide to send a data file to its bank several times a day (e.g., at the end of each shift) in order to obtain credit at an earlier time for excess cash on hand. The bank receives the data file and records over the network in a financial institution system which includes a bank document processing system (e.g., one or more bank computers and one or more bank document processing devices) and an accounting and/or banking system. According to some embodiments, based on the electronic data file and records alone, the financial institution system is configured to automatically issue a credit (e.g., provisional credit and/or final credit) to the store's bank account. According to some such embodiments, the crediting of a customer account based on a data file including records associated with documents to be physically delivered to a bank at a later time gives the bank the benefit of having cash on hand and on the bank's books before the cash is physically delivered to the bank or the bank's vault.

According to some embodiments, in response to receiving a data file including records associated with checks, the bank starts to proof the checks based on the records alone. It is contemplated that such advanced proofing can enable the store to obtain deposit credit for the checks earlier in the day and before certain cut off time deadlines set by the bank. Similarly, the bank obtains the value of these deposits via the checks earlier in the day and may capture significant value and deposits prior to the day's cut off. In the past, such checks would be received after the cut off time for a given date and therefore, the bank would not have received the benefit of recording the checks on its books until the following day.

Typically, banks have a deadline for receiving deposits to be credited on that business day. For example, some banks require all deposits to be received prior to 3 PM in order for the customer to receive a same day credit. According to some embodiments, banks may give a customer an extended period of time to deliver physical documents associated with a batch of documents being deposited at the bank if the customer previously transmitted a data file as described herein. For example, a bank might give a customer until 5 PM or even later to transport a physical batch of documents to the bank in order to receive a same day credit.

According to some embodiments, the bank receives the data file and records over the network in one or more memory/storage devices of one of the bank computers (e.g., an item processing system) and based on the records alone, the bank computer automatically transmits a credit instruction to an accounting system. In these embodiments, in response to receiving the credit instruction, the accounting system can be configured to automatically issue a provisional credit. It is contemplated that, according to some embodiments, such a deposit system, such as described above and below in reference to FIGS. 4A and 4B, can reduce the time involved to obtain deposit credit from anywhere of a minimum of six hours to as much as a 12 to 24 hour improvement.

Figure 4A:
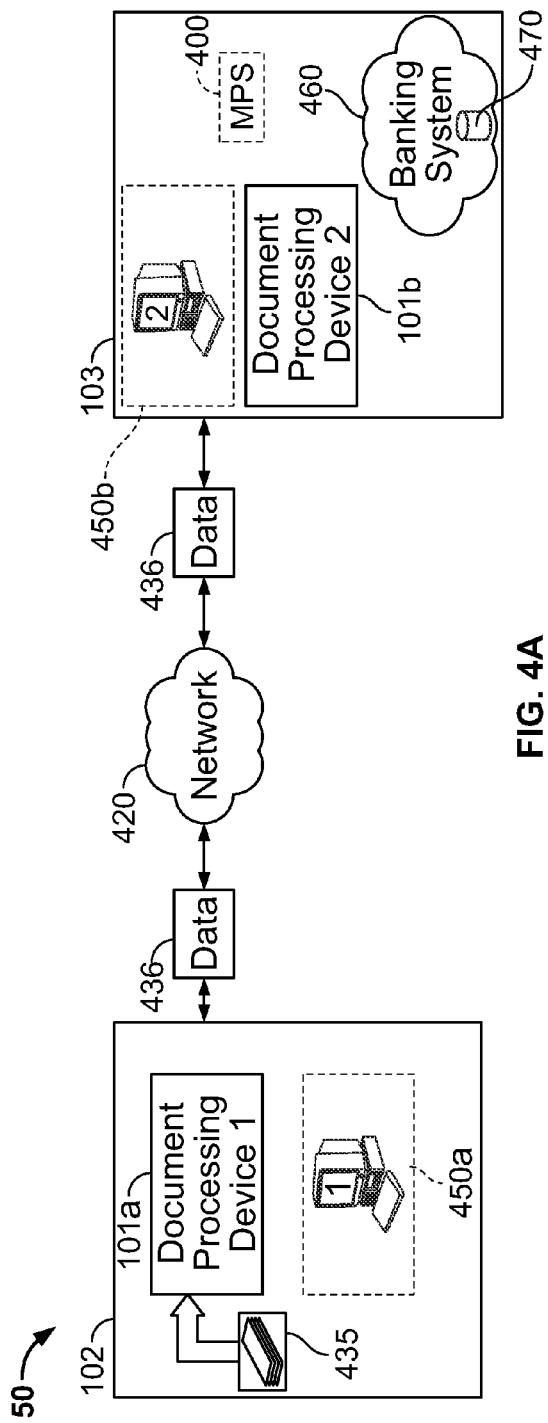
FIG. 4A is a block diagram of a financial transaction system according to some embodiments of the present disclosure.

According to some embodiments, a store is communicatively connected to its bank such as described below and in connection with FIGS. 4A and 4B. According to some such embodiments, a store employee via one or more store computers communicatively connected with one or more bank computers can monitor which ones of the store's deposit transactions have cleared the bank and been accepted. The bank acceptance can be either through the physical processing of the currency and checks once received at the bank (FIG. 4B) or the bank accepting electronically transmitted data files including records associated with currency bills and checks for deposit credit even before the physical documents arrive at the bank (FIG. 4A).

In response to the records being transmitted over the network, a store employee can gather all of the processed physical currency bills and physical checks as a batch of documents for pickup by an armored carrier or for drop-off at the bank. Alternatively, only the processed physical currency bills, and not any of the physical checks are physically transported to the bank such that the bank can verify received records against corresponding received physical documents.

According to some embodiments, in response to receiving the physical batch of documents, a bank employee or teller inserts the batch of received documents into an input receptacle of a bank document processing system located at the bank. The bank document processing system can include one or more input receptacles and/or one or more output receptacles. The bank document processing system scans and images the documents in the same, or similar, manner as the document processing system located at the store to produce bank records. The bank document processing system compares the bank records with the records transmitted by the store to determine if any expected documents are missing (e.g., no-show documents). If the bank document processing system determines that one or more documents are missing, then the bank document processing system can instruct the accounting system to automatically charge-back the store's bank account for an amount equal to a value of the missing document(s).

It is contemplated that, according to some embodiments, the bank document processing system is a single output receptacle device (e.g., document processing device 101') used to rerun the batch of documents to verify the store's deposit. In response to the batch of documents being verified, the batch of documents can be put into a tray of documents including a multitude of batches of documents to be sorted using a non-imaging MPS or an imaging MPS.

Alternatively, the bank document processing device can be an imaging MPS configured to verify the batch of documents and to sort the batch of documents by denominations and/or type of document (e.g., bills sorted from checks). According to some such embodiments, the batch of documents is immediately placed in a tray for processing in the imaging MPS without first being rerun on the single output receptacle device. It is contemplated that such an alternative method can reduce processing of commercial deposits.

According to some embodiments, the batch of documents is placed into a tray of documents associated with the same bank customer—that is, each tray only includes documents associated with a single bank customer for processing in the imaging MPS. It is contemplated that grouping all of a customer's deposits into one or more associated trays can increase overall document processing efficiency in the bank. For example, a store includes 35 locations in a city. All 35 locations prepare and transport a respective batch of documents to a bank for deposit into the same customer account. The 35 batches of documents are placed into, for example, 5 bulk currency trays for processing. The 5 trays of documents (including the 35 batches of documents only) are then processed in an imaging MPS as described above. In response to the imaging MPS determining any variances (e.g., no-show documents, unexpected documents, suspect documents), the imaging MPS can be configured to automatically attribute the variance(s) to the store's customer account, as all documents in the 5 trays are associated with the store. Thus, processing all of the 35 batches of documents as described permits the bank to bypass individually processing each of the 35 batches of documents on a first pass on a single output receptacle device and then sending the 35 batches of documents via bulk currency trays on a second pass through an MPS or imaging MPS.

According to some embodiments, the bank document processing system can also be configured to authenticate the currency bills, the checks, or a combination of intermingled currency bills and checks. According to some embodiments, the bank document processing system can also automatically charge-back the store's bank account or generate a charge-back instruction for any currency bills determined to be suspect currency bills and any checks determined to be associated with/or suspected of being associated with fraudulent activity.

According to some embodiments, a bank receives records associated with physical documents from a store over a network in a bank document processing system. Prior to receiving the physical documents at the bank, the bank document processing system automatically compares the received records associated with the physical documents with data in a suspect database to determine if any of the records are associated with a suspect document. The comparison determines if any of the physical documents to be deposited are suspect or associated with fraudulent activity. If the bank document processing system determines that one or more of the records are associated with suspect documents, a notice is automatically transmitted from the bank document processing system over the network to one of the customer's computers. The notice indicates that the bank via the bank document processing system determined that one or more of the records is associated with a suspect and/or fraudulent document. In these embodiments, after detecting a suspect and/or fraudulent document to be deposited, the provisional credit applied to the store's bank account may be reduced accordingly by the bank document processing system in communication with the accounting system.

According to some embodiments, a bank contracts with one or more third parties to receive and process documents, such as, for example, currency bills, checks, or both. The third party can be an armored carrier that generally performs all operations of a bank vault on behalf of the bank. That is, according to some embodiments, a third party such as an armored carrier counts, discriminates, and totals all currency bill deposits and/or proofs, clears, and totals all check deposits. All of the calculated totals can be transmitted to the bank at one or more times throughout the day such that the bank can maintain visibility of its incoming currency bills and/or overall deposits. Based on the calculated totals and/or other deposit related information generated by the third party and transmitted or otherwise made available to the bank, the bank can update financial records in the bank's accounting system, such as the accounting system described in the Document Processing Device Operations in a Financial Institution System Section and in connection with FIGS. 14-17, and in other sections of the present disclosure.

According to some embodiments, under the third party agreements, the third party (e.g., armored carrier) maintains physical custody of the currency bills and sometimes checks such that the physical documents are never transported to the bank's own vault. According to some embodiments, the third party keeps track of all currency that belongs to the bank, arranges for the sale of excess currency from the third party's vault to the United States Federal Reserve, arranges for delivery of currency to one or more of the bank's branches, and arranges for delivery of currency and/or coin to customers of the bank.

According to some embodiments, the third party is the same as, or similar to, the financial institution system 103 described in connection with FIGS. 4A and 4B. Thus, the third party can include one or more document processing devices and/or systems, such as, for example, one or more devices 101, 101', one or more imaging MPS(s) and/or non-imaging MPS(s). According to some embodiments, the devices and/or systems of the third party is/are configured to electronically communicate with one or more bank accounting systems in order to update financial records for each customer or account in a similar manner as described herein in connection with FIGS. 4A and 4B.

Figure 4B:
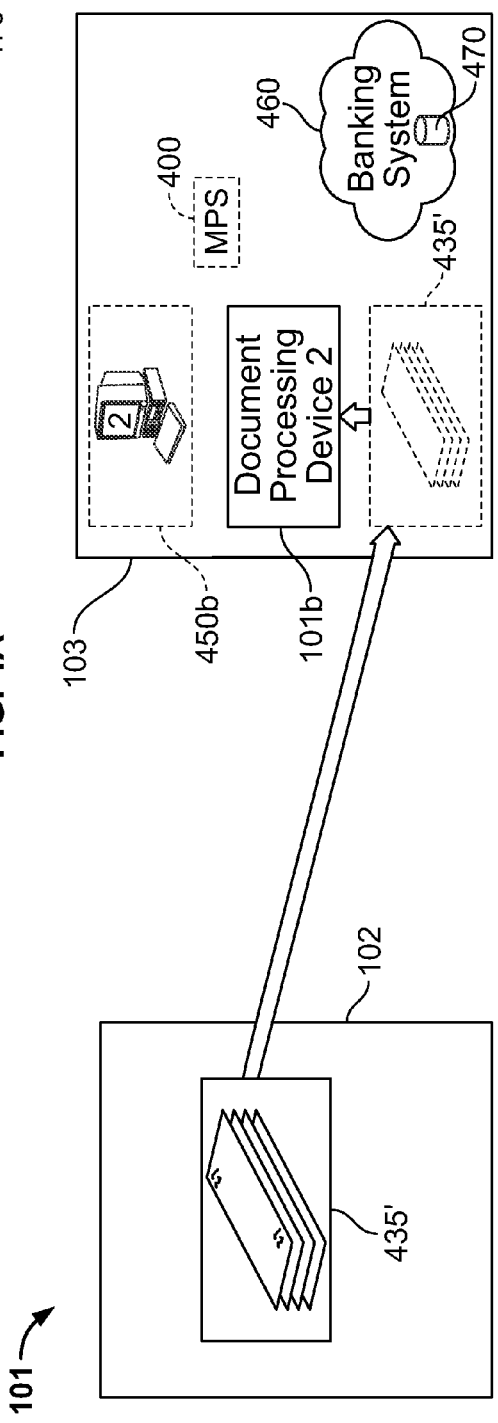
FIG. 4B is a block diagram illustrating a transportation of physical documents in the financial transaction system of FIG. 4A.

According to some embodiments, a store can transmit records and/or data files directly to a bank for processing as described in reference to FIGS. 4A and 4B. According to some embodiments, the store transmits the records and/or data files to the bank and/or to a third party, such as an armored carrier, for processing. Alternately, according to some embodiments, the store only transmits records and/or data files directly to the third party for processing. As such, the third party acts as an agent of the bank and receives and processes all records and/or data files associated with deposit transactions. According to some embodiments, the one or more devices and/or systems of the third party can be configured to forward or otherwise make available the records and/or data files to the bank according to rules and/or guidelines developed between the bank and the third party. According to some embodiments, the one or more devices and/or systems of the third party are configured to communicate with one or more devices and/or systems of the bank regarding no-show documents, unexpected documents, and/or suspect documents.

Now turning to FIGS. 4A and 4B, a block diagram of a financial transaction system 50 is described according to some embodiments of the present disclosure. FIGS. 4A and 4B illustrate non-limiting examples suitable for describing an electronic portion and a physical portion of a deposit transaction between a customer, such as a Store, and a financial institution, such as a Bank, according to some embodiments of the present disclosure. As discussed above, according to some embodiments, the Store can be a person, a casino, a department store, etc. Similarly, the Bank can be any financial institution including, but not limited to, a bank, an internet bank, an armored carrier, etc. Thus, the following use of the terms "Store" and "Bank" in this description should not be limited to the literal definition of such words, but are merely non-limiting examples for ease of description.

The financial transaction system 50 includes a customer document processing system 102 and a financial institution system 103. A network 420 communicatively connects the customer document processing system 102 and the financial institution system 103. The customer document processing system 102 includes a customer document processing device 101a. Although the customer document processing device 101a may provide processing capability, the customer document processing system 102 in some embodiments may also include a customer computer 450*a* communicatively connected to the customer document processing device 101*a* via a wired (e.g., electrical, optic) or wireless connection. According to some embodiments, the customer document processing device 101*a* and the customer computer 450*a* may share a single housing (e.g., the housing 190 of the document processing device 101') or may be separately housed. Although FIG. 4A may illustrate a single customer computer 450*a* connected to a single customer document processing device 101*a*, it is understood that one or more customer computers 450*a* may be connected to one or more customer document processing devices 101*a* in any number of combinations. In general, processing may be distributed between any or all of the customer document processing devices 101*a* and the customer computers 450*a* in the customer document processing system 102. In some embodiments, aspects of the customer document processing system 102 may be the same as, or similar to, the document processing system 100 described above.

The financial institution system 103 includes a second document processing device 101*b* or a financial institution or bank document processing device 101*b* and a banking system 460. Although the financial institution document processing device 101*b* may provide processing capability, the financial institution system 103 may include a second computer or a financial institution/bank computer 450*b* communicatively connected to the financial institution document processing device 101*b* via a wired (e.g., electrical, optic) or wireless connection. The financial institution document processing device 101*b* and the bank computer 450*b* may share a single housing or may be separately housed. Although FIG. 4A may illustrate a single financial institution computer 450*b* connected to a single financial institution document processing device 101*b*, it is understood that one or more bank computers 450*b* may be connected to one or more financial institution document processing devices 101*b* in any number of combinations. In some embodiments, aspects of the financial institution document processing device 101*b* may be the same as, or similar to, the document processing device 101, 101' described above. According to some embodiments, the financial institution system 103 also includes a multiple pocket document processing device 400 in addition to the second document processing device 101*b*.

Figure 18A:
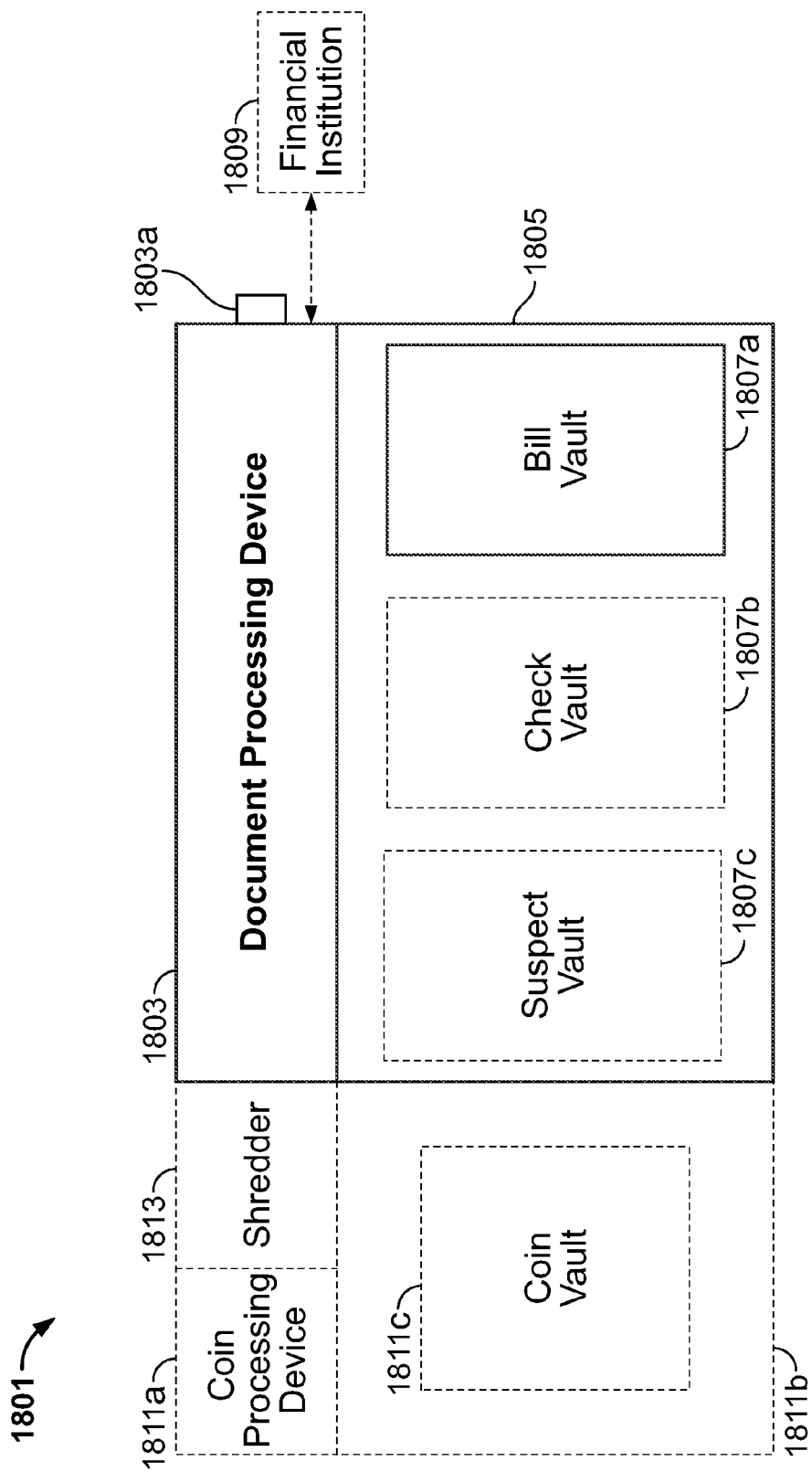
FIG. 18A is a block diagram of a document processing vault system according to some embodiments of the present disclosure.
Figure 18B:
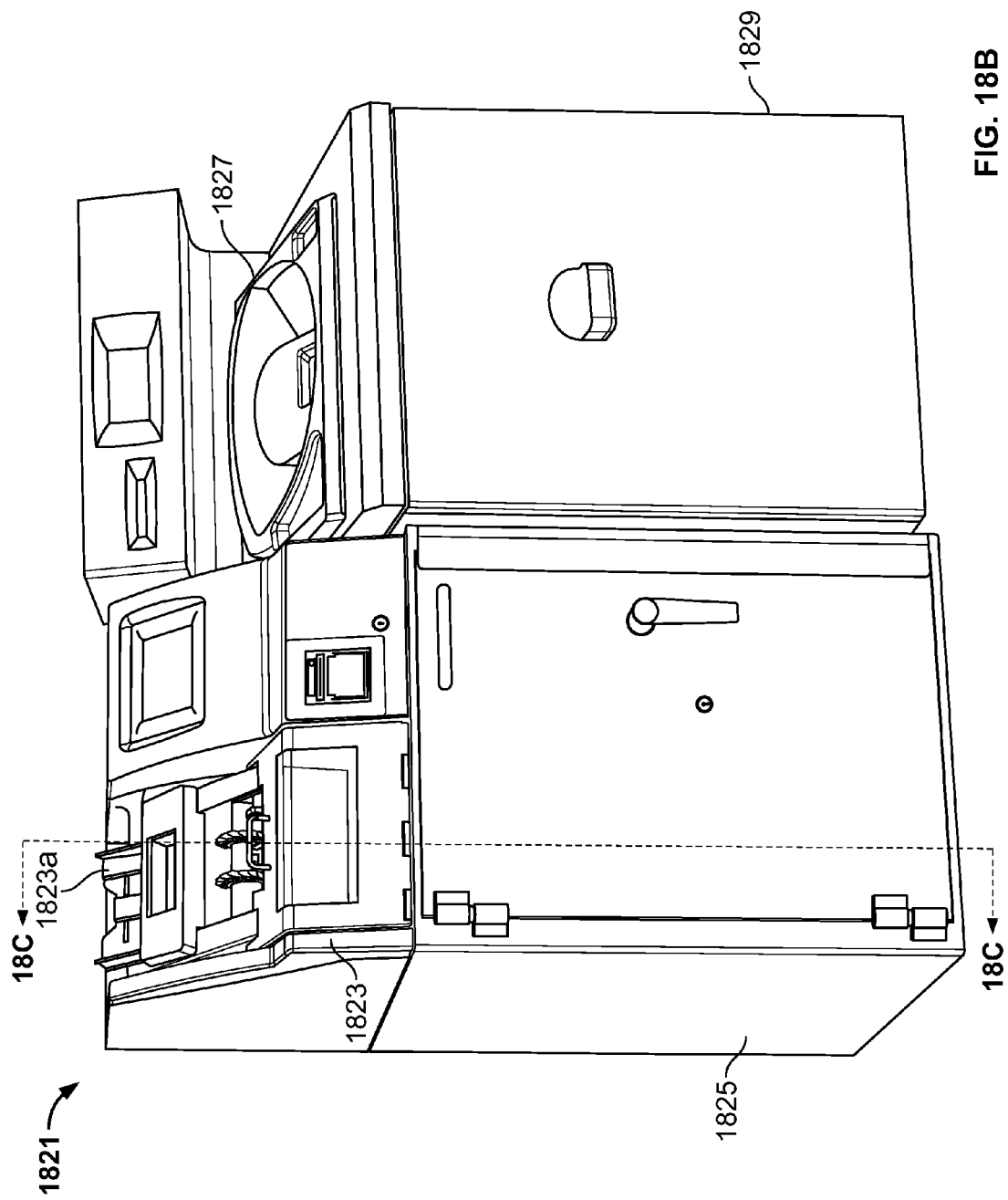
FIG. 18B is a perspective view of a document processing vault system according to some embodiments of the present disclosure.
Figure 18C:
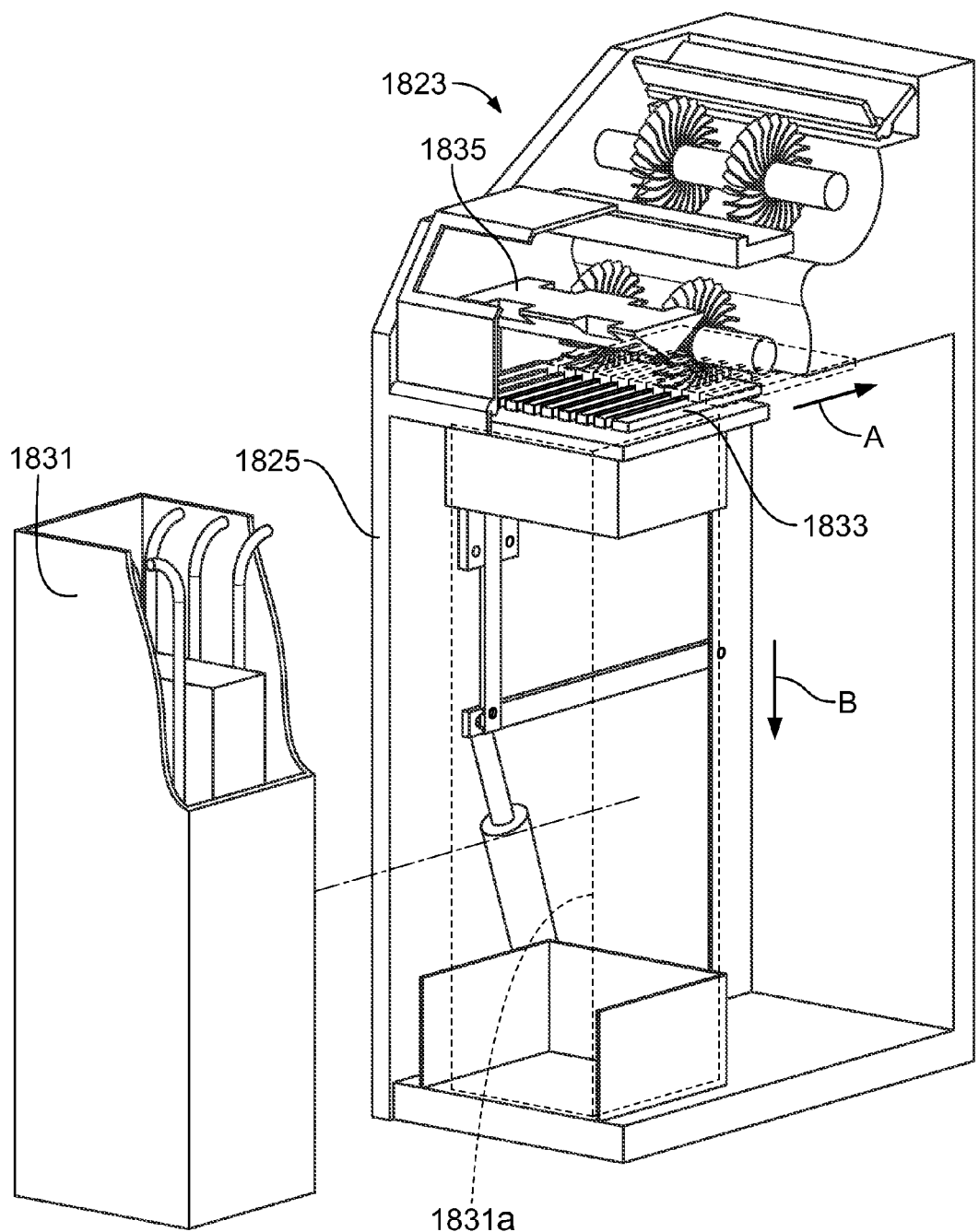
FIG. 18C is a partial cross-sectional perspective view of the document processing vault system of FIG. 18B.

According to some embodiments, the customer document processing device 101*a* and/or the financial institution document processing device 101*b* is a document processing vault system, such as document processing vault system 1801, 1821, described in the Document Processing Vault System Section in connection with FIGS. 18A-18C, and in other sections of the present disclosure. According to some embodiments, the customer document processing device 101*a* and/or the financial institution document processing device 101*b* is a document processing recycler system, such as document processing recycler system 1901, described in the Document Processing Recycler System Section in connection with FIG. 19A, and in other sections of the present disclosure.

Electronic Portion of Deposit Transaction

According to some embodiments, a store operator, such as, a store employee or manager, initiates an electronic portion of a deposit transaction in the Store by gathering a plurality of documents 435 to be deposited in the Bank for a credit to the Store's financial institution account. As similarly described in relation to the document processing device 101 of FIG. 1, the document processing device 101*a* is configured to receive the plurality of documents 435 as one or more batches and/or subbatches of documents in an input receptacle. The plurality of documents 435 are then processed by the customer document processing system 102 to generate an electronic data file or data file 436 (e.g., data file 301) that provides information on the one or more batches and/or subbatches processed by the customer document processing device 101*a*. The document processing device 101*a* and/or the customer computer 450*a* may generate the data file 436. In general, the data file 436 provides deposit or transaction information (e.g., transaction information 303) relating to the Store's deposit with the Bank. For example, the transaction information may include a customer financial account number, a declared deposit amount or a total deposit amount, a total number of documents to be deposited, a total currency bill deposit amount, a number of deposited currency bills broken down by denomination, a total check deposit amount, a number of deposited checks broken down by on-us checks and transit checks, a total on-us check deposit amount, a total transit check deposit amount, a description of a type of financial transaction, or any combination thereof.

The data file 436 may have any format that is readable by the financial institution system 103. For example, the data file 436 may be a plain text file, a binary file, or a mixed text and binary file. Additionally, the data file 436 may be encrypted or otherwise encoded to be readable only by the financial institution system 103, especially to ensure the security of the data in the data file 436.

The data file 436 may present the data as one or more store records (e.g., records 300*a-d*, 305*a-h*), which are associated with the documents 435 to be deposited. In some embodiments, one store record corresponds directly to one document 435, but in other embodiments, one store record may correspond to a plurality of documents 435, which have been consolidated. For example, the data file 436 may be organized, in the same, or similar, manner as described above in reference to the data file 301 shown in FIG. 3E. In another example, the data file 436 may include delimited or fixed length fields which correspond to the categories of transaction information associated with each store record. In a further example, the data file 436 may be specially encoded as a database table that is compatible with database software employed by the financial institution system 103.

According to some embodiments, each of the store records includes data configured to visually represent one or both sides of a document in the plurality of documents 435 and/or one or more snippet images from one or both sides of a document. Put another way, each of the store records in the data file 436 includes a visually readable or human readable image of a document, such as, for example, a currency bill, a check, or in some embodiments a deposit slip. According to some embodiments, the store records solely contain the visually readable image of one or both sides of a document. According to other embodiments, the store records include a visually readable image of both sides of a document, identifying information (e.g., currency bill serial number, denomination, checking account number, check amount, routing number, etc.) and transactional information (e.g., bank account number, depositor ID and/or depositor contact information, etc.). According to other embodiments, the store records only include identifying information and transaction information without any images.

In addition to providing store records corresponding to the documents 435, the data file 436 may also include other data, such as header data, that applies to the more than one store record. For example, header data may include the date and time stamp for the transaction, Store's financial institution account number, and the like. In general, by providing the transaction information as described previously, the generated data file 436 may act as a virtual deposit slip. Additionally or alternatively, a visually readable image of a preprinted deposit slip may be provided by the data file 436. Thus, according to some embodiments, the transaction information included in the data file 436 may be contained within and/or formatted as a virtual deposit slip and/or a visually readable image of a preprinted deposit slip associated with the deposit transaction between the Store and the Bank.

According to some embodiments, the store operator can input all of, or a portion of, the transaction information and/or data included in the data file 436 into the customer document processing system 102. To facilitate the entry of data for the data file 436, the customer document processing system 102 may provide graphical user interface (GUI) utility (e.g., the control panel 170) via the document processing device 101a and/or the computer 450a.

Alternatively or additionally, according to some embodiments, the document processing system 102 is configured to automatically populate all of, or a portion of, the transaction information and/or data included in the data file 436. For example, the customer document processing system 102 can be preprogrammed with the Store's financial institution account number and/or the description of the type of financial transaction (and/or a document processing system ID and/or document processing device ID) such that the financial institution account number and the description of the type of financial transaction (and/or the document processing system ID and/or document processing device ID) are automatically included in any data file generated by the document processing system 102. For another example, the customer document processing system 102 can be configured to count and denominate the plurality of documents such that the declared deposit amount, the total number of documents to be deposited, the total currency bill deposit amount, the number of deposited currency bills broken down by denomination, the total check deposit amount, the number of deposited checks broken down by on-us checks and transit checks, the total on-us check deposit amount, and the total transit check deposit amount are automatically included in any data file generated by the customer document processing system 102. Alternatively or additionally, according to some embodiments, the customer document processing system 102 can be configured to display one or more drop down menus and/or other data entry GUI utility to facilitate the completion of transaction information and/or data included in the data file.

According to some embodiments, the customer document processing system 102 is configured to save the store data file 436 in a storage medium or memory device (e.g., a memory of the first computer 450a and/or a memory of the first document processing device 101a) such that a store personnel such as a store operator can view and/or print the store record associated with each of the processed documents 435 to be deposited.

According to some embodiments, the data file is stored in a database and at least includes serial numbers of bills associated with a store customer transaction, a transaction date and/or time, and images or partial images (snippet images) of each document associated with the store customer transaction. According to some such embodiments, the customer document processing system 102 is configured to transmit and/or otherwise make available the database and/or data contained within the database to the store's customer associated with the store customer transaction. For example, a store customer purchases a television from the store and gives the store $1000 in U.S. currency bills for the television. The customer document processing system 102 is configured to process the $1000 transaction, generate a database including a record for each bill in the $1000 transaction, and to transmit or send the database and/or data contained within the database to the store customer such that the store customer has a complete electronic record of each bill used to purchase the television from the store. It is contemplated that according to some embodiments, data contained within the database can be printed and physically given to the store customer by the operator of the customer document processing system 102. According to such embodiments, if one of the bills turns out to be a counterfeit, the store and the store's customer has a record of the transaction and can identify the bills by serial number such that the store can chargeback the store customer if so desired.

As described previously, processing may be distributed between the customer document processing device 101a and the customer computer 450a in the customer document processing system 102. In some embodiments, the customer document processing device 101a may write raw data to a data file 436 and transmit the data file 436 to the customer computer 450a, which may further process and/or sort the store records. For example, the customer computer 450a can be configured to calculate a total deposit value equal to the value of a sum total of values of the documents 435 associated with the deposit transaction.

According to some embodiments, in response to generating the data file 436, the store operator may use a control panel (e.g., the control panel 170) or other software operations of the customer document processing system 102 to electrically transmit the generated store data file 436 over the network 420 to the financial institution system 103. Alternatively, the customer document processing system 102 automatically transmits the data file 436 over the network 420 to the financial institution system 103 as an electronic transmission without further input from the store operator. In general, the data file 436 may be electrically transmitted from the customer document processing device 101a, the customer computer 450a, and/or another device or computer within the customer document processing system 102 to the financial institution system 102.

Although the customer document processing system 102 may initiate a push-based file transfer, the financial institution system 103 may alternatively initiate a pull-based file transfer. For example, the customer document processing system 102 may make the data file 436 available at a specific location within the customer document processing system 102, e.g., the storage medium of the customer computer 450a. The financial institution system 103 may then be responsible for initiating a download of the data file 436 from the customer document processing system 102.

In some embodiments, the data file 436 may be transmitted, for example, via any file transfer protocol, to a specific location on a file system on the network of the financial institution system 103, thus, providing any subsystems of the financial institution system 103 with access to the data file 436, for example, via the local area network (LAN). In other embodiments, the data file 436 may be transmitted to a storage medium on the financial institution computer 450b which is connected to the network 420. After the financial institution system 103 receives the data file 436, the financial institution document processing device 101b, the financial institution computer 450b, the banking system 460, and/or one or more other aspects of the financial institution system 103 may access the data file 436.

The handling of the data file 436 by both the customer document processing system 102 and the financial institution system 103 may include aspects of a deposit processing system, such as a deposit aggregator system. In general, a deposit aggregator system may receive and/or send data files associated with one or more deposit transactions between one or more customers and one or more financial institutions. According to some embodiments, the customer document processing system 102 is configured to transmit or upload the store data file 436 to the deposit aggregator via the network 420. The deposit aggregator then receives and sends the data file to one or more financial institutions. For example, the deposit aggregator system can be configured to received the store data file 436 associated with the deposit transaction between the Store and the Bank. According to some embodiments, the store data file 436 is stored on one or more storage devices of the deposit aggregator system until the Bank downloads the store data file 436 in a pull-based transfer. Thus, the customer document processing system 102 uploads the store data file 436 onto the deposit aggregator system and the Bank downloads the store data file 436 from the deposit aggregator system. Alternatively or additionally, the deposit aggregator system may automatically upload or pull one or more store data files from the customer document processing system 102 and/or automatically transmit or push the one or more uploaded store data files to one or more financial institutions associated with the respective data files.

According to some embodiments, the deposit aggregator system can read at least a portion of the store data files (e.g., transaction identifier, customer account number, etc.) to determine a proper destination for each data file 436. According to some embodiments, the deposit aggregator system may automatically upload (pull) and/or transmit (push) the data files at one or more predetermined times (e.g., at 3 PM everyday or every business day, at 3 AM on predetermined days, etc.). According to other embodiments, the customer document processing system 102 and/or the financial institution system 103 automatically upload (push) and/or download (pull) data files at one or more predetermined times (e.g., at 3 PM everyday or every business day; pull at 3:15 PM everyday and push at 9:30 AM everyday, etc.).

In other embodiments, the deposit aggregator may read the records in the data files 436 to determine the types of deposits, for example, cash deposits, on-us checks, transit checks, etc., in the records. As such, the deposit aggregator may organize the records in the data file 436 according to deposit type and route the records according to deposit type. In other words, the deposit aggregator may create new one or more new data files, each of which contains records of a particular deposit type from the original data file 436. For example, the deposit aggregator may determine that the data file 436 includes records for cash deposits and transit checks and may process each set of records according to a different procedure. On the one hand, the deposit aggregator may send the cash deposit records in a new data file to the customer's financial institution to credit the customer's account. On the other hand, the deposit aggregator may send the transit check records to the one or more financial institutions corresponding to the drawee of each check. As there may be more than one financial institution corresponding to the transit checks, the deposit aggregator may create one or more data files for each institution and divide the transit check records appropriately among these data files. Each of these data files indicates the customer's financial institution for appropriate crediting. Advantageously, processing of the checks at the drawees' financial institution and appropriate crediting of the customer's account at the customer's financial institution can occur more quickly. Moreover, this approach reduces the administrative burden associated with the processing of transit checks by the customer's financial institution.

According to some embodiments, an item processing system that resides within and/or is an integral component of the banking system receives the store data file 436 for processing. Such processing may be conducted in real-time, near real-time, or in batch at scheduled times of the day. According to some embodiments, the item processing system analyzes and/or reviews the data and information (e.g., store records, virtual deposit slip, etc.) included in the store data file 436 and compares the values associated with each of the store records in the data file 436 with the various declared totals (e.g., total declared deposit, total declared currency bill deposit, total declared check deposit, etc.) to balance the deposit transaction. In the case of a discrepancy, the item processing system can be configured to modify the data file 436, one or more of the store records in the store data file 436, and/or the virtual deposit slip. Alternatively or additionally, in the case of a discrepancy, the item processing system can be configured to create a credit/debit memo and/or an offsetting record or an offsetting data file associated with the deposit transaction such that the store data file 436 and the offsetting data file balance. That is, the store data file 436 plus the offsetting data file balance the deposit transaction. According to some embodiments, a discrepancy between the values of the store records and the declared totals of the deposit slip can occur due to an error in generating the virtual deposit slip. For example, the operator of the customer document processing system 102 can erroneously input incorrect data via, for example, the control panel, the first computer 450a, and/or one of the dropdown windows. For another example, in the case of a preprinted deposit slip being imaged and included in the data file, the operator can erroneously record or write data on the preprinted deposit slip and/or the customer document processing system 102 can erroneously extract the data via OCR and/or CAR/LAR software.

According to some embodiments, the store data file 436 includes a plurality of records associated with currency bills and a plurality of records associated with checks. According to some such embodiments, the item processing system is configured to process and/or proof the store records included in the data file 436 associated with checks based on the data (e.g., the visually readable image of one or both sides of the respective check) included in the respective store record. That is, according to some embodiments, the item processing system can fully process the store records associated with checks without further processing and/or examination of the corresponding physical check. According to some embodiments, the item processing system includes a proof of deposit system (POD), which is described in greater detail below in the Document Processing Device Operations in a Financial Institution System Section, and in other sections of the present disclosure.

According to some embodiments, the item processing system is configured to transmit a credit instruction to cause the banking system to credit the financial institution account of the customer in response to receiving the store data file 436. According to some embodiments, the item processing system is configured to transmit a credit instruction to cause the banking system to credit the financial institution account of the customer in response to a determination that the store records included in the store data file 436 balance with the declared totals of the virtual deposit slip. According to some such embodiments, the credit can be a provisional credit (e.g., funds available subject to review and/or additional processing or funds temporarily available) or a final credit (e.g., funds are immediately available for withdrawal). The credit can be for an amount based on the total declared deposit amount, the total declared currency bill deposit amount, the total declared check deposit amount, the total declared on-us check deposit amount, and/or the total declared transit check deposit amount. For example, the credit can be a percentage of the total declared deposit amount. According to some embodiments, the credit can be a provisional credit for an amount based on the total declared currency bill deposit amount and a final credit for an amount based on the total declared check deposit amount. According to some embodiments, the credit can be a provisional credit for an amount equal to the total declared currency bill deposit amount and a final credit for an amount equal to the total declared check deposit amount.

The banking system 460 can be any financial institution computer, system, network, and/or any combination thereof. According to some embodiments, the banking system 460 includes a plurality of communicatively connected computers, servers, storage devices, and/or processors configured to at least run teller software. According to some embodiments, the teller software can be operated automatically via software instructions. Alternatively, the teller software is operated via software instructions and/or operator control. In these embodiments, the financial institution operator, such as a bank teller, can manually manipulate the teller software using one or more computers to perform a variety of financial institution operations, such as, for example, debiting/crediting financial institution accounts, creating offsetting records and/or offsetting data files, etc.

According to some embodiments, the banking system 460 includes a database 470. According to some embodiments, the database 470 includes a plurality of individual databases that are stored on one or more memory devices. For example, according to some embodiments, the database 470 can include a separate customer information database, a deposit database, a loan account database, and a transaction history database. The customer information database can include information about the Bank's customers, such as, for example, names, addresses, phone numbers, etc. The deposit database can include customer financial account numbers (e.g., the Store's bank account) for all of the Bank's customers and the balances of each account. Alternatively, the database 470 is a single database that includes all customer information, deposit information, transaction history, etc. The database 470 can be located within the banking system 460, within the financial institution system 103, or external to one or both. According to some embodiments, the database 470 is stored on a plurality of different memory devices, which can be physically located in a plurality of different locations (e.g., different computers with the same or different financial institutions). According to some embodiments, the database 470 has one or more memory back-ups located in a plurality of locations (e.g., online server back-up).

According to some embodiments, the financial institution system 103 is configured to provisionally credit the Store's bank account in response to receiving the store data file 436 associated with the deposit transaction. According to some embodiments, in response to the financial institution 103 receiving the store data file 436 over the network 420, the financial institution 103 automatically issues an immediate provisional credit to the Store's bank account, which is stored within the database 470 in the banking system 460. In some of these embodiments, the financial institution 103 issues a provisional credit in an amount equal to the total deposit value calculated by the first computer 450*a*. In other embodiments, the financial institution 103 issues a provisional credit in an amount equal to a total deposit value calculated by the second computer 450*b* or other financial institution computer. Yet in other embodiments, the financial institution 103 issues a provisional credit in an amount equal to a predetermined percentage of a total deposit value. The predetermined percentage can be determined by the financial institution 103 based on previous dealings with the Store, based on the amount of the total deposit value, and/or various other factors.

According to some embodiments, the second computer 450*b* is configured to receive the store data file 436 either directly or indirectly from the customer-side financial transaction system 102. In these embodiments, in response to receiving the data file 436, the second computer 450*b* can be configured to automatically transmit a credit instruction to the banking system 460. In some of these embodiments, the teller software running on the banking system 460 can be configured to receive the credit instruction and automatically apply a provisional credit to the Store's bank account based on the credit instruction. Alternatively, the teller software running on the banking system 460 can further require operator input from a bank employee or teller to complete the provisional credit. Such operator input can include an operator credit command directly received by the banking system 460 via the teller software.

Early Suspect Detection

According to some embodiments, prior to the financial institution system 103 issuing a credit to the Store's financial institution account for the deposit transaction, the financial institution system 103 is configured to detect or determine if one or more of the store records in the store data file 436 are associated with a suspect document. For example, according to some embodiments, the financial institution system 103 determines if each record associated with a currency bill has a serial number or denomination/serial number combination associated with a suspect currency bill and if each record associated with a check has MICR data associated with a checking account tied to fraudulent activity. Such an authentication process is referred to as early or advanced suspect detection.

According to some embodiments, early suspect detection allows the Bank to deduct the value of any determined suspect documents from the total deposit value used in calculating the credit applied to the financial institution account of the Store in association with the deposit transaction. The early suspect detection also allows the Bank to make preparations for receiving the suspect document before the document physically arrives at the Bank. For example, the Bank can flag a data field (e.g., flag code field 333' of FIG. 3A and flag code field 363' of FIG. 3B) or a visually readable image included in a store data file associated with the determined suspect document. Such flags can be information or data included in a data field or overlaying the visually readable image of the document in an image section (e.g., image sections 310, 320, 340, and 350 of FIGS. 3A and 3B) of a record. Additionally, according to some embodiments, the Bank can immediately or promptly notify the Store of the detected suspect document, sometimes even prior to the store transporting the physical documents to the Bank. For example, upon the determination that a store record is associated with a suspect document, the financial institution system 103 can electronically transmit a notice to the Store. Such advanced notification of suspect documents provides the Store with an advantage when attempting to determine how the suspect document was obtained by the Store—that is, who provided the suspect document to the Store and for what good(s) or service(s). Such an advanced suspect detection also decreases the Bank's and/or the Store's risk of being stuck with a loss associated with suspect documents.

According to some embodiments, the financial institution system 103 automatically performs the early suspect detection by first determining if any of the store records included in the store data file 436 are associated with suspect currency bills, associated with checks or checking accounts linked to fraudulent activity, or otherwise suspected of being tied to an invalid or improper deposit transaction or suspect document. According to some embodiments, the financial institution system 103 determines if any of the store records associated with the deposit transaction are associated with suspect documents such as suspect counterfeit currency bills by comparing identifying information associated with each of the store records associated with the deposit transaction with information in a database (e.g., suspect database). For example, according to some embodiments, the second computer 450*b* and/or the second document processing device 101*b* is configured to compare extracted serial numbers or denomination/serial number combinations from each store record associated with a currency bill against a database of serial numbers or denomination/serial number combinations of known or suspected counterfeit currency bills. According to some embodiments, the financial institution system 103 determines if any of the store records associated with the deposit transaction are associated with fraudulent checks or activity by comparing identifying information associated with each of the store records associated with the deposit transaction with information in the same database and/or in a second database. For example, according to some embodiments, the second computer 450*b* and/or the second document processing device 101*b* is configured to compare extracted checking account numbers from each store record associated with a check against the second database of known or suspected checking account numbers tied to fraudulent activity.

As previously discussed, the identifying information can be extracted using OCR software and/or other extraction software included in the customer document processing system 102 and tagged to the respective store records included in the store data file 436. Alternatively or additionally, in response to receiving the store data file 436, the financial institution system 103 can be configured to use OCR software and/or other extraction software to extract the identifying information from document images received in the store data file 436 and tag to the respective store records in the store data file 436. Such action by the financial institution system 103 may be desirable if the Store merely transmitted a data file 436 including records of documents with visually readable images of documents without any or only limited tagged information. Furthermore, in circumstances where the store records include tagged information, the Bank may nonetheless desire to use its own OCR software and/or other extraction software to verify the tagged information included in each of the store records.

In response to the financial institution system 103 determining that one or more of the store records in the store data file 436 is associated with either a suspect currency bill or a checking account associated with fraudulent activity, the financial institution system 103 can flag one or more store records as associated with a counterfeit and/or suspect document. The store record can be flagged as described above and stored in a memory of the second computer 450*b*, a memory of the second document processing device 101*b*, a memory of the imaging MPS 400, and/or a memory of the banking system 460. Thus, the flagging provides the Bank with an electronic record of suspect documents expected to physically arrive for deposit that are associated with the deposit transaction.

According to some embodiments, each bank maintains a suspect or blacklist database including records associated with suspect bills and/or records associated with checks tied to fraudulent activity. According to some embodiments, in response to a financial institution system determining a document is a suspect document, the system can be configured to transmit or otherwise make available such information to all of the bank's branches. It is contemplated that such a method would make it very difficult for an individual attempting to kite checks from one store location to another (or one bank branch to another) over a series of days and to successfully pass the checks. According to some embodiments, the system can further be configured to transmit or otherwise make the suspect or blacklist database available to other banks and/or financial institutions. For example, if Bank A identifies a problem with a checking account or currency bill, this information could be transmitted to Bank B. Bank B could then notify Bank B's entire branch network. In a like manner Store A could share with Store B. According to some embodiments, Store A, Store B and Bank A and Bank B can all enter into agreement to share their respective suspect and/or blacklist databases or pay a third party provider to develop a master database, such as the databases described in the Searching/Master Database Section and in connection with FIGS. 12A and 12B, and in other sections of the present disclosure. According to some embodiments, the master database contains information submitted by all participating banks and/or stores, armored carriers, casinos, etc. It is contemplated that such a master database is a citywide, statewide, national and/or international database. According to some such embodiments, all participating entities can have real time visibility for any suspect currency bills or checks associated with fraudulent activities found in the participating network the very same day the document is originally flagged as a suspect document by one of the participating entities.

According to some embodiments, the second computer 450*b* and/or the second document processing device 101*b* (e.g., the bank document processing system) is configured to transmit data to and/or update a database (e.g., suspect database or blacklist database) within the banking system 460 to reflect that a particular flagged currency bill having an identified serial number and/or a particular flagged check having an identified checking account number is expected to arrive. The database can be the database 470 that stores and/or maintains the financial institutional accounts or a different database. Such an update can be downloaded or uploaded onto all document processing devices (e.g., the second document processing device 101*b*, the multiple pocket document processing device 400) networked within the financial institution system 103 such that the flagged documents are immediately off-sorted and/or presented for review by document processing device(s) that physically encounter the flagged document during processing at the Bank.

According to some embodiments, bank employees can view a suspect database of all flagged documents. The database can be viewed on the second computer 450*b*, a computer or server within the banking system 460, or another computer within or communicatively connected with the financial institution system 103. According to some embodiments, the suspect database is configured to organize and illustrate data (e.g., extracted data) and/or visually readable images associated with flagged documents in a table summary. According to some embodiments, the suspect database is configured to organize and illustrate data and/or visually readable images associated with flagged documents by record. According to some embodiments, the suspect database is configured to organize and illustrate data and/or visually readable images associated with flagged documents that are expected to arrive at the Bank. According to some embodiments, the suspect database is configured to organize and illustrate data and/or visually readable images associated with flagged documents that have physically arrived at the Bank. In these embodiments, the database can also include information regarding a disposition of the flagged documents, such as, for example, off-sorted and transported to the Federal Reserve or transported back to the Store.

Suspect Notice

According to some embodiments, in response to the financial institution system 103 determining that one or more of the store records in the data file 436 is associated with a suspect document such as, for example, a suspect currency bill or a checking account associated with fraudulent activity, the financial institution system 103 can automatically transmit and/or otherwise make available a notice to the Store. According to some embodiments, the notice can be referred to as a suspect notice, a fraud notice, or transaction notice. According to some embodiments, the notice can be communicated to a store document processing system (e.g., system 102) or employee of the store the same day that the store data file was transmitted to and/or received by the financial institution system 103. It is contemplated that the determining suspect document as described herein can enable banks and law enforcement authorities to work with stores to more efficiently deal with counterfeit documents.

The notice can be transmitted from the second computer 450*b*, the second document processing device 101*b*, the banking system 460, or any other computer associated with the financial institution system 103. The notice can be received by the first computer 450*a*, the first document processing device 101*a*, or any other computer within or communicatively connected to the customer document processing system 102 and/or the Store. The notice can be transmitted as an e-mail, a letter, a facsimile, electronic packets, data, encrypted information, etc.

The notice can include the store record and/or the store data file associated with the suspect document, one or more visually readable images of the suspect document, and/or identifying information associated with the suspect document. The notice can include an explanation that the Bank received the electronic portion of the deposit transaction and determined that one or more of the store records included in the store data file 436 are associated with suspect documents. The notice can further indicate that the value of the suspect document(s) have been deducted from any credit applied to the Store's bank account and/or indicate the value of the suspect document(s).

According to some embodiments, the notice can be automatically transmitted to one or more other banks or third parties such as, for example, government entities, bank executives, bank tellers, etc. According to some embodiments, the customer can create a customer-suspect database based on a plurality of the notices transmitted from the financial institution system 103. The customer-suspect database can include identifying information of currency bills and checks associated with suspect documents. The customer-suspect database can be stored in a memory of the customer document processing system 102 and/or a memory of a computer or server communicatively connected to the customer document processing system 102. According to some embodiments, the customer-suspect database can be stored in a memory of the store's point of sale (POS) system, such that store employees can determine at the POS system whether a particular check being presented for payment is associated with fraudulent activities and can thus make a determination not to accept the check. According to some embodiments, a plurality of customer document processing systems can be communicatively connected to the memory storing the customer-suspect database to share and/or pool identifying information contained therein. According to some embodiments, the customer-suspect database can aid customers in cooperating with financial institutions when suspect documents are detected in a deposit transaction. According to some embodiments, the customer document processing system 102 is configured to transmit identifying information and/or records (e.g., store records) associated with a deposit transaction of a plurality of documents to the server for comparison with the customer-suspect database. In some such embodiments, the server is configured to compare the transmitted identifying information and/or records with the identifying information stored in the customer-suspect database to determine if any of the records are associated with a suspect document. According to some embodiments, the customer document processing system 102 can flag one or more records as being associated with suspect documents such that the first document processing device 101*a* is configured to off-sort or stop-and-present the suspect documents when encountered by the first document processing device 101*a* during processing.

According to some embodiments, the financial institution system 103 automatically transmits the notice in response to a total value of detected suspect documents exceeding a predetermined threshold. For example, for a threshold of $500.00, if the second computer 450*b* determines that five records associated with two checks and three currency bills are associated with suspect documents and the total value of the two checks and the three currency bills is over $500.00, then according to some embodiments, the second computer 450*b* is configured to automatically transmit the notice to the Store. If however, the total value of the two checks and the three currency bills is less than $500.00, then the second computer 450*b* is configured to not transmit the notice. However, according to some embodiments, the second computer 450*b* may nonetheless flag the records associated with the suspect documents and optionally be configured to transmit the notice to the banking system 460, a bank employee, or other person or entity. According to some embodiments, the predetermined threshold can be entered by an operator into the teller software running on the banking system 460 and/or into the second computer 450*b* and/or the second document processing device 101*b* to set the threshold at any value or amount (e.g., one thousand dollars).

According to some embodiments, in response to the financial institution system 103 determining that one or more of the store records included in the store data file 436 is associated with either a suspect currency bill or a checking account associated with fraudulent activity, the financial institution system 103 automatically deducts a value of each suspect document from any credit (e.g., provisional credit or final credit) applied to the Store's bank account. For example, it is contemplated that customer document processing system 102 transmits a store data file over the network 420; the store data file includes a plurality of store records associated with a plurality of documents 435; each of the documents is associated with a value; the financial institution system 103 determines that one or more the store records is associated with a suspect document; the financial institution system 103 automatically calculates a provisional credit amount for the store data file, which automatically deducts the value of each suspect document prior to automatically issuing or entering the provisional credit for the Store's bank account.

According to some embodiments, the second computer 450*b* and/or the second document processing device 101*b* (e.g., the bank document processing system) automatically calculates a provisional credit amount for the store data file 436 and automatically deducts the value of each suspect document from the calculated amount prior to transmitting a credit instruction or notice to the banking system 460, which is configured to automatically issue or enter the provisional credit for the Store's bank account without an operator input. Alternatively, the second document processing device 101*b* and/or the second computer 450*b* (e.g., the bank document processing system) transmits a credit instruction or notice to the banking system 460, which requires one or more additional operator instructions. In these embodiments, prior to the banking system 460 updating or entering a credit for the Store's bank account, the banking system 460 requires an operator input or operator instruction prior to applying a provisional credit to the Store's bank account.

According to some embodiments, when a particular document becomes a document of interest, such as when a document is identified as suspect/counterfeit or identified as missing/no-show, individuals associated with the receipt and/or processing of the document can be identified through use of the operator and/or personnel fields. Thus, for example, according to some embodiments, when system 100 or devices 101, 101' are employed in a bank customer environment such as a retail store environment and a bank declines to credit or issues a charge-back in the amount of a suspect/counterfeit bill, the bank customer (e.g., store) can determine which cashier accepted the suspect/counterfeit bill (such as by searching a database containing the relevant records and/or receiving that information from the bank along with a charge-back notice). According to some embodiments, the bank customer charges the amount of the suspect/counterfeit bill back to the individual cashier who accepted the suspect/counterfeit bill and/or otherwise takes some appropriate action—such as investigating whether the identified cashier is following store currency screening policy, such as, for example, performing one or more authentication tests on currency bills prior to accepting them. Similarly, according to some embodiments, when a bill is identified as suspect/counterfeit, a bank can determine which teller accepted the suspect/counterfeit bill (such as by searching a database containing the relevant records) and take some appropriate action such as charging the teller for the amount of the suspect/counterfeit bill and/or investigating whether the identified teller is following bank currency screening policy such as performing one or more authentication tests on currency bills prior to accepting them and/or whether the document processing device(s) 101, 101', 400 which processed the bill in question are operating properly. Similarly, for another example, according to some embodiments, when a document to be deposited is determined to be a no-show document at a bank, the bank and or store can determine who was the last person that processed the physical document and take appropriate action such as charging the cashier or teller for the amount of the missing/no-show document and/or investigating whether the identified cashier/teller followed the store's document handling policies, such as, for example, transferring documents from the output receptacle of the device directly to a lockbox and/or lockable deposit bag.

Physical Portion of Deposit Transaction

Referring to FIG. 4B, after the store data file 436 is transmitted to the financial institution system 103, the store operator or other personal initiates the physical portion of the deposit transaction by gathering a plurality of physical documents 435' associated with the deposit transaction. Alternatively or additionally, the store operator can gather a plurality of documents associated with a plurality of electronic portions of a plurality of deposit transactions for physical transportation to the Bank. For example, during the course of a typical business day at the Store, one or more store representatives may gather physical documents from each store clerk's cash till prior to each shift change to balance the cash tills and/or otherwise manage the Store's cash registers. After each shift change the one or more store operators process the gathered documents (e.g., documents 435) in the first document processing device 101*a* as described above. However, after the first document processing device 101*a* completes the processing, the physical documents are held in a safe or secured place prior to physically transporting the documents to the Bank. Thus, according to some such embodiments, the Store accumulates a plurality of physical documents associated with a plurality of deposit transactions throughout the workday or work-week.

According to some embodiments, the plurality of physical documents 435' associated with the deposit transaction includes a deposit slip, a plurality of currency bills, and a plurality of checks. According to some such embodiments, the store operator gathers the deposit slip and the plurality of currency bills for transportation to the financial institution 103. It is contemplated that according to some embodiments, the physical checks do not need to be transported to the financial institution system 103. As described above in reference to FIG. 4A, the data file 436, which includes store records associated with checks that include visually readable images of the respective checks, were transmitted electronically to the financial institution system 103. As described above, in some such embodiments, the financial institution system 103 can process the visually readable images of the checks without having to physically review and/or process the physical check documents. According to some embodiments, under Check 21 laws in the United States, visually readable images of checks can be used in lieu of physical checks for check processing operations such as check settlement and clearing. Thus, the Store can withhold the actual physical checks from being transported to the Bank in some embodiments. According to some embodiments, the Store can destroy the physical checks after a predetermined time as agreed on between the Store and the Bank.

The plurality of physical documents 435' can be transported to the Bank such as via an armored carrier, a store employee, a courier, a bank employee, or other trusted person. As illustrated in the FIG. 4B, the plurality of physical documents 435' arrive at the financial institution system 103 (e.g., Bank) for processing in the second document processing device 101*b*. A bank teller or employee loads the plurality of physical documents 435' as one or more stacks into an input receptacle of the second document processing device 101*b* for processing, as described above in relation to the document processing system 100 of FIG. 1. According to some embodiments, the second document processing device 101*b* initiates document processing by transporting the documents 435' one at a time past an image scanner to one or more output receptacles. The image scanner in the second document processing device 101*b* is used to generate a bank record and/or a bank data file for each of the documents 435' in a similar manner as the first document processing device 101*a* is used to generate the store records and/or the store data file 436. According to some embodiments, the bank records include a visually readable image of the respective documents, identifying information, transactional information, or any combination thereof.

According to some embodiments, a teller inputs the Store's bank account number and/or a transaction identifier into the financial institution system 103. In these embodiments, the financial institution system 103 automatically associates the inputted Store bank account number and/or the transaction identifier with the generated bank records. According to some such embodiments, the teller can retrieve such information from the deposit slip included in the plurality of physical documents 435'. According to some embodiments, the bank document processing system is configured to extract the Store's bank account number and/or the transaction identifier from the deposit slip included in the plurality of physical documents 435'. According to other embodiments, prior to initiating the document processing, the teller places a header and/or trailer card with the stack of documents 435'. According to some embodiments, the header/trailer card includes an indicia associated with the store's bank account number and/or the transaction identifier. In some of these embodiments, the second document processing device 101*b* is configured to scan the header/trailer card to obtain the Store's bank account number and/or the transaction identifier and to automatically associate the Store bank account number and/or the transaction identifier with the bank records associated with the stack of physical documents 435'. In some embodiments, the Store bank account number and/or the transaction identifier is tagged to each of the generated bank records.

According to some embodiments, prior to initiating document processing, a teller receives a plurality of batches of documents and places a header and/or trailer card with each batch of documents to separate each batch form the other and to identify each batch as being associated with a respective customer account. That is, the header/trailer cards can identify a store number and appropriate customer account to be credited for each batch of documents. According to some embodiments, the separated batches of documents are placed in bulk cash trays one batch being adjacent to another batch. It is contemplated that according to such embodiments, each cash tray would not have to contain batches of documents associated with just one bank customer. Rather, each cash tray could contain batches of documents associated with multiple bank customers.

According to some embodiments, the financial institution system 103 compares the generated bank records associated with the physical documents 435' of the deposit transaction with the store records included in the store data file 436 associated with the deposit transaction to determine if any documents associated with any of the store records are no-show documents. For example, the customer document processing system 102 transmits a store data file over the network 420. The store data file includes a plurality of store records associated with a plurality of physical documents for deposit at the Bank. The Store then transports the physical documents associated with the store records to the financial institution system 103 for verification against the store data file. The financial institution system 103 processes the received physical documents in the second document processing device 101*b* to generate bank records. The financial institution system 103 then compares the bank records with the store records to determine if any of the physical documents are missing or no-show documents. It is contemplated that based on the received store records, the Bank expects to receive physical documents that correspond to each respective store record, or in some embodiments in which checks are not physical delivered to the Bank, the Bank expects to receive physical documents that correspond to each store record associated with a currency bill and/or deposit slip. According to some embodiments, in the case that the financial institution system 103 determines one or more of the documents are no-show documents (e.g., the document was not transported to the Bank) the financial institution system 103 and/or bank document processing system or the document processing device 101*b* or 400 can automatically charge-back the Store's bank account an amount equal to a value of the missing document(s) and/or generate an appropriate charge-back/debit instruction such as by automatically generating a charge-back instruction reflecting the value of each no-show document and/or the total value of all no-show documents.

According to some embodiments, the financial institution system 103 compares the generated bank records associated with the physical documents 435' of the deposit transaction with the store records included in the store data file 436 associated with the deposit transaction to determine if one or more of the bank records is associated with an unexpected document. For example, the customer document processing system 102 transmits a store data file over the network 420. The store data file includes a plurality of store records associated with a plurality of physical documents for deposit at the Bank. The Store then transports physical documents associated with the store records and one or more additional physical documents not associated with one of the store records, that is, unexpected documents, to the financial institution system 103 for verification. The financial institution system 103 processes the received physical documents in the second document processing device 101*b* to generate bank records. The financial institution system 103 then compares the bank records with the store records to determine if any of the bank records are associated with unexpected documents. That is, the financial institution system 103 determines if one or more of the bank records does not correspond with any of the store records. According to some embodiments, in the case that the financial institution system 103 determines that the physical documents included one or more unexpected documents, the financial institution system 103 and/or bank document processing system or the document processing device 101*b* or 400 can automatically credit the Store's bank account an amount equal to a value of the unexpected document(s) and/or generate an appropriate credit instruction.

According to some embodiments, in response to the financial institution system 103 determining that one or more of the physical documents are no-show documents, the second document processing device 101*b* and/or the second computer 450*b* (e.g., the bank document processing system) can be configured to automatically transmit a charge-back instruction to the banking system 460. In some of these embodiments, the teller software running on the banking system 460 can be configured to receive the charge-back signal and automatically apply a charge-back or debit to the Store's bank account based on the charge-back instruction. For example, the bank document processing system can transmit a charge-back instruction to the banking system 460 that instructs the banking system 460 to automatically charge-back or debit the Store's bank account an amount equal to a value associated with the determined no-show document(s). Alternatively, the teller software running on the banking system 460 can further require operator input from a bank employee or teller to complete the charge-back or debit operation. Such operator input can include an operator charge-back command directly received by the banking system 460.

A non-limiting example involving an automatic charge-back for no-show documents associated with a deposit transaction provides that the customer document processing system 102 transmits a data file including a plurality of store records associated with currency bills and checks totaling, for example, $9,000.00. The financial institution system 103 receives the store records associated with the deposit transaction and automatically applies a credit (e.g., a provisional credit) to the Store's bank account for $9,000.00. The Bank then receives the physical documents associated with the deposit transaction that correspond with the store records and the second document processing device 101*b* processes the physical documents and separate bank records are created.

After processing the physical documents, the financial institution system 103 determines that store records associated with a $10 currency bill and a $50.00 check do not correspond with any of the bank records. That is, the $10 currency bill and the $50.00 check are no-show documents. In response to the determination of the no-show documents, the second document processing device 101*b* and/or the second computer 450*b* can be configured to automatically transmit a charge-back instruction to the banking system 460. In some of these embodiments, the banking system 460 can be configured to receive the charge-back instruction and automatically apply a charge-back or debit to the Store's bank account for sixty dollars based on the charge-back instruction for the two no-show documents. Alternatively, the banking system 460 can further require operator input from a bank employee or teller to complete the charge-back for the sixty dollars.

According to some embodiments, the financial institution system 103 can be configured to automatically transmit a notice to the Store indicating the detection of the no-show documents. According to some embodiments, the notice sent to the store can include information identifying the no-show document(s) such as by including the store records and/or the store data file associated with the no-show document(s).

According to some embodiments, the second document processing device 101*b* generates the bank records and automatically transmits the bank records to the second computer 450*b*. In these embodiments, the second computer 450*b* or other bank computer communicatively connected to or forming part of the banking system 460 performs the comparison of the bank records with the store records to determine if any expected documents are no-show documents for a particular deposit transaction. According to some such embodiments, the item processing system received the bank records and performs the comparison of the bank records with the store records to determine if any expected documents are no-show documents for a particular deposit transaction. According to some embodiments, the second document processing device 101*b* and/or the second computer 450*b* are part of a single device or apparatus—that is, the second document processing device 101*b* and/or the second computer 450*b* are contained within the same housing (e.g., housing 190 of the document processing device 101').

According to some embodiments, the Store transports unexpected documents to the Bank that do not correspond with a previously transmitted store data file or record. Such a scenario may occur due to a malfunction or error in the first document processing device 101*a* or the first computer 450*a*, occur on accident, or occur on purpose, for example, where some transported documents were never processed by the first document processing device 101*a*. According to some embodiments, the financial institution system 103 is configured to automatically credit the Store's bank account for the value of the unexpected document(s). For example, the second computer 450*b* transmits a credit instruction to the banking system 460 to automatically credit the Store's bank account an amount equal to a value associated with the unexpected document(s). Alternatively, the banking system 460 can further require operator input from a bank employee or teller to complete the credit for the unexpected document(s). According to some embodiments, the credit instruction can include identifying information, transaction information, credit/value amount, etc.

According to some embodiments, the financial institution system 103 can be configured to automatically transmit a notice to the Store indicating the receipt of the unexpected document(s). According to some embodiments, the notice sent to the store can include information identifying the unexpected document(s) such as by including the bank record and/or bank data file associated with the unexpected document(s).

According to some embodiments, the second document processing device 101*b* includes an authentication unit. In these embodiments, the second document processing device 101*b* authenticates the physical documents 435' as described above in reference to the document processing system 100 of FIG. 1. In these embodiments, the second document processing device 101*b* in communication with the second computer 450*b* and/or the banking system 460 can be configured to automatically charge-back the Store's bank account for any detected suspect documents or generate an appropriate charge-back instruction and/or transmit the same to the banking system 460. For example, the authentication unit in the second document processing device 101*b* may detect a suspect $100.00 currency bill in the plurality of documents 435' transported to the Bank. In these embodiments, the financial institution system 103 can be configured to automatically charge-back the Store's bank account one hundred dollars for the suspect $100 currency bill.

According to some embodiments, the financial institution system 103 can be configured to automatically charge-back the Store's bank account only if the total value of all detected suspect documents exceeds a predetermined threshold (e.g., $100.00). According to some embodiments, in the case of detecting a suspect document, the second document processing device 101*b* and/or the second computer 450*b* in communication with the banking system 460 can be configured to automatically transmit a notice to the Store indicating the detection of a suspect document and the automatic charge-back. According to some embodiments, the notice sent to the store can include information identifying the suspect document(s) such as by including the bank record and/or the store record associated with the suspect document(s) in the notice.

According to some embodiments, in response to detecting one or more suspect documents, the bank document processing system can be configured to automatically transmit a charge-back instruction or notice to the banking system 460. In these embodiments, the banking system 460 can further require operator input in addition to the charge-back instruction from a bank employee or teller to complete the charge-back for the detected suspect document(s).

According to some embodiments, the second document processing device 101*b* includes at least two output receptacles. According to some embodiments, one of the at least two output receptacles is a reject or off-sort receptacle. In these embodiments, the second document processing device 101*b* is configured to send documents determined to be counterfeit, suspect, or non-authentic by the financial institution system 103 to the reject or off-sort receptacle. According to some embodiments, the second document processing device 101*b* is configured to automatically send documents associated with flagged records to the reject receptacle or a different reject receptacle. For example, according to some embodiments, the bank document processing system is configured to receive a plurality of store records. The bank document processing system is configured to determine if one or more of the store records is associated with a suspect document by comparing the store records with data in one or more databases. In response to the bank document processing system determining that one or more of the store records is associated with a suspect document, the bank document processing system flags the specific store record as suspect and causes the second document processing device 101*b* to automatically off-sort the suspect document if, or when, encountered.

According to some embodiments, the bank document processing system is configured to update a database of identifying information, such as, for example, currency bill serial numbers and/or checking account numbers, associated with suspect documents. According to some embodiments, the database is stored in a memory of the second document processing device 101*b*. In these embodiments, the second document processing device 101*b* is configured to receive documents in the input receptacle and automatically transport/off-sort documents into a reject receptacle when the documents correspond with the identifying information stored in the database.

According to some embodiments, the second document processing device 101*b* includes a plurality of output receptacles for sorting the plurality of physical documents 435'. In these embodiments, the second document processing device 101*b* is configured to receive the physical documents 435' in an input receptacle and transport the documents 435' one at a time along a transport path past one or more image scanners as described above in relation to FIG. 1. The second document processing device 101*b* is configured to sort the checks and the currency bills into separate output receptacles. According to some embodiments, the second document processing device 101*b* is configured to sort each denomination of currency bill into separate ones of the plurality of output receptacles. According to some embodiments, the second document processing device 101*b* is configured to sort on-us checks into one of the plurality of output receptacles and to sort transit checks into a different one of the plurality of output receptacles. It is contemplated that various numbers and types of output receptacles maybe included in the second document processing device 101*b* for sorting suspect documents, flagged documents, documents unreadable using OCR or other software, etc. into separate output receptacles.

According to some embodiments, the imaging MPS and/or device is (are) configured to operate in a Deposit Track Mode of Operation and/or a Deposit Verification Mode of Operation to track currency bills throughout a bank including a bank vault. According to some embodiments, the financial institution system 103 processes the physical documents 435' using the second document processing device 101*b* and a multiple pocket document processing device 400 ("MPS") as shown in FIGS. 4A and 4B. In some such embodiments, the second document processing device 101*b* includes a single input receptacle for receiving the physical documents 435' and a single output receptacle for returning the physical documents 435' to an operator after processing. Thus, the second document processing device 101*b* does not sort the documents into separate receptacles based on the type of document and/or the denomination or value of the documents 435'.

According to some embodiments, the second document processing device 101*b* does not include any authentication sensors such that the second document processing device 101*b* does not determine and/or stop on or off-sort suspect documents. According to some alternative embodiments, the second document processing device 101*b* includes authentication sensors such that the second document processing device 101*b* can determine whether a document is suspect, but in response to determining that a document is a suspect document, the second document processing device 101*b* does not stop on or off-sort the suspect document. According to some such embodiments, the second document processing device 101*b* only records the document as a suspect in an associated record. According to some embodiments, the MPS 400 is configured to off-soft suspect documents for further processing. According to such embodiments, the off-sorting of suspect documents in the MPS 400 only, can increase document processing efficiency in the financial institution system 103 as the second document processing device 101*b* is permitted to continually process documents without having to stop on or off-sort suspect documents.

According to some embodiments, the second document processing device 101*b* is located at a teller window or station for verifying Store deposits in relatively small batches. In these embodiments, a teller receives a plurality of deposits from one or more customers (e.g., Stores, casinos, etc.) and verifies the deposits using the second document processing device 101*b* in conjunction with the second computer 450*b*. After the teller receives a predetermined total amount of documents (e.g., one or more trays full of documents) or at a predetermine time (e.g., a shift change) the documents are physically transported to the imaging MPS 400 for further processing.

According to some embodiments, the imaging MPS 400 is a large scale document processing device that may be located in a backroom or vault of a financial institution, such as, for example, the Bank. According to some embodiments, the imaging MPS 400 sorts the documents by type of document (e.g., checks and currency) and by denomination or value. According to some embodiments, the imaging MPS 400 authenticates the documents using an authentication unit. According to some embodiments, the imaging MPS 400 scans the documents with one or more image scanners to generate a bank record for each of the documents in the same, or similar, manner discussed above in relation to document processing system 100, customer document processing system 102, and bank document processing system. In these embodiments, the imaging MPS 400 can save the bank records in a memory in the imaging MPS 400, in a memory communicatively connected to the imaging MPS 400, and/or in a memory within the banking system 460 for permanent or short-term storage.

According to some embodiments, the imaging MPS 400 is configured to compare the bank records generated using the imaging MPS with the bank records generated using the second document processing device 101*b* and/or the store records. A comparison of the bank records generated using the imaging MPS 400 with the bank records generated using the second document processing device 101*b* can indicate if any documents went missing during transit of the documents from the teller window or station to the backroom or vault of the Bank. In these embodiments, the imaging MPS 400 can be configured to automatically generate and/or transmit a notice or instruction regarding the missing document(s). According to some embodiments, the notice is automatically printed on a printer communicatively linked to the imaging MPS 400 and/or the banking system 460 or is automatically transmitted to one or more bank employees including the teller, a bank manager, etc.

According to some embodiments, the MPS 400 is configured to determine a fitness of each document being processed. For example, the MPS 400 can employ one or more fitness sensors to determine if a currency bill is worn, torn, soiled, etc. According to some such embodiments, unfit documents can be off-sorted for further processing by an operator of the MPS 400. For example, the operator of the MPS can search a database of records in the same, or similar, manner as described in the Modes of Operation—Searching/Master Database Section, and in other sections of the present disclosure, to determine which bank customer deposited the unfit bills. According to some embodiments, the MPS 400 is configured to automatically access the database and update records contained therein with fitness information of the bills being processed. It is contemplated that such fitness information can be used by financial institutions to better understand the cost of processing the documents from the financial institution's various customers. Additional disclosure on determining fitness of a document can be found in U.S. Pat. No. 6,913,260, entitled "Currency Processing System with Fitness Detection" and U.S. Patent Application No. 2007/0122023 A1, entitled "Currency Processing System with Fitness Detection".

According to some embodiments, a Store can use a document processing system or device according to the present disclosure to avoid having to process check documents using an Automated Clearing House ("ACH")—that is, the store can contract with a third party ACH in a similar manner as described in the Deposit Transaction Section, and in other sections of the present disclosure, to process on-us and/or transit checks. For example, the Store can process all checks written by Store patrons for goods and/or services using the customer document processing system 102. Thus, a record including a visually readable image of a check is generated for all of the checks as described herein. According to some embodiments, the visually readable image of the check in a specific record is referred to as an Image Replacement Document ("IRD"), that serves as a substitute check under Check 21 laws in the United States. Thus, according to some embodiments, the Store can transmit or send a plurality of records and/or data files including respective IRDs for each check to the third party ACH and/or bank for a credit in a similar manner as described above in reference to FIG. 4A. According to some such embodiments, one or more devices and/or systems of the ACH can be configured to transmit and/or otherwise make available check deposit information such that the bank's accounting system can be updated to reflect the check transactions.

According to some embodiments, processing checks according to the methods described herein that generate visually readable images of the checks or IRDs, decreases the Store's risk of being stuck with a loss associated with a bad check (e.g., a check that bounces, insufficient funds, fraudulent check, etc.). For example, according to some embodiments, an ACH transaction scans a check and converts the check into electronic data that is forwarded to a bank or third party to initiate payment in a similar fashion as a debit card or credit card transaction. Thus, no image is created in connection with the ACH transaction. As compared to some of the methods of the present disclosure, where the document processing system, such as the customer document processing system 102, generates a record associated with each check such that the store can review the records in the case of a bad check and determine who gave the Store the bad check, when it was given, etc. For example, as described above, the records can include one or more visually readable images of one or both sides of the check, extracted MICR characters, etc. Thus, according to some embodiments, the Store searches a database of records to locate the record associated with a bad check. The Store can review the record to obtain various information to help determine the source of the bad check and take appropriate steps to locate the person responsible for payment.

Document Processing Speeds

For the following document processing speeds disclosure, the document processing device 101, the document processing device 101', the multiple pocket document processing device 400, the document processing system 100, the document processing devices 101a,b, the customer document processing system 102, and the financial institution document processing system, which are all discussed in detail above with respect to FIGS. 1, 2A-C, 4A, and 4B, are collectively referred to herein as the document processing devices and systems of the present disclosure. Thus, specific reference to any of the elements or components of the document processing device 101, such as, for example, the input receptacle 110, the transport mechanism 120, the output receptacle 130, the image scanner(s) 140a and/or 140b, the authentication unit 145, the controller 150, the memory 160, the control panel 170, and/or the communications port 180, are by way of example and is not intended to limit the following disclosure to the document processing device 101.

Referring generally to FIGS. 1, 2A-C, 4A, and 4B, according to some embodiments, the image scanner(s) 140a and/or 140b have a pixel capture scan rate up to about twenty Megapixels per second. According to some such embodiments, for documents having dimensions smaller than about 10 inches× about 5 inches, the image scanner(s) 140a and/or 140b can capture at least about 1200 documents per minute at a resolution of about 200 DPI×100 DPI or less (e.g., 100 DPI×100 DPI) and at a pixel capture rate of about twenty Megapixels per second. According to some such embodiments, for documents having dimensions smaller than about 9.1 inches×five inches, the image scanner(s) 140a and/or 140b can capture at least about 1200 documents per minute at a resolution of about 200 DPI×100 DPI and at a pixel capture rate of about twenty Megapixels per second. According to some such embodiments, for documents having dimensions smaller than about 9.1 inches×five inches, the image scanner(s) 140a and/or 140b can capture at least about 600 documents per minute at a resolution of about 200 DPI×200 DPI and at a pixel capture rate of about twenty Megapixels per second. The image scanner(s) 140a and/or 140b include a proportionate number of output data channels to transmit scanned data captured by the image scanner(s) 140a and/or 140b to the controller 150 and/or the memory 160 as visually readable images for processing (e.g., denomination, OCR, authentication, etc.). According to some such embodiments, the image scanner(s) 140a and/or 140b include about 4 output data channels, although other numbers of output data channels are contemplated. According to some embodiments, each of the output data channels can output or be read at about five Megapixels per second in parallel, that is, at the same time.

According to some embodiments, the image scanner(s) 140a and/or 140b have a pixel capture scan rate up to about forty Megapixels per second. According to some such embodiments, for documents having dimensions smaller than about 10 inches×about 5 inches, the image scanner(s) 140a and/or 140b can capture at least about 1200 documents per minute at a resolution of about 200 DPI×100 DPI and at a pixel capture rate of about twenty Megapixels per second. According to some such embodiments, for documents having dimensions smaller than about 9.1 inches×five inches, the image scanner(s) 140a and/or 140b can capture at least about 1200 documents per minute at a resolution of about 200 DPI×100 DPI and at a pixel capture rate of about twenty Megapixels per second. According to some such embodiments, for documents having dimensions smaller than about 9.1 inches×five inches, the image scanner(s) 140a and/or 140b can capture at least about 1200 documents per minute at a resolution of about 200 DPI×200 DPI and at a pixel capture rate of about forty Megapixels per second. According to some such embodiments, for documents having dimensions smaller than about 9.1 inches×five inches, the image scanner(s) 140a and/or 140b can capture at least about 2400 documents per minute at a resolution of about 200 DPI×100 DPI and at a pixel capture rate of about forty Megapixels per second. The image scanner(s) 140a and/or 140b include a proportionate number of output data channels to transmit the scanned data captured by the image scanner(s) 140*a* and/or 140*b* to the controller 150 and/or the memory 160 as visually readable images for processing (e.g., denomination, OCR, authentication, etc.). According to some such embodiments, the image scanner(s) 140*a* and/or 140*b* include about 8 output data channels, although other numbers of output data channels are contemplated. According to some embodiments, each of the output data channels can output or be read at about five Megapixels per second in parallel, that is, at the same time.

According to some embodiments, for a check transportation speed and/or processing speed of about 150 checks per minute (about 12.5 inches per second), the controller 150 and/or memory 160 have about 157.5 milliseconds to receive the scanned data from the image scanner(s) 140*a* and/or 140*b*, crop each visually readable image, deskew each cropped visually readable image, and/or OCR one or more portions of the cropped and deskewed visually readable image and are configured to perform all these operations in less than about 157.5 milliseconds. According to some embodiments, the document processing devices and systems of the present disclosure are configured to process commercial checks at a rate of at least about 150 checks per minute. According to some embodiments, for a check transportation speed and/or processing speed of about 250 checks per minute (about 21 inches per second), the controller 150 and/or memory 160 have about 87.5 milliseconds to receive the scanned data from the image scanner(s) 140*a* and/or 140*b*, crop each visually readable image, deskew each cropped visually readable image, and/or OCR one or more portions of the cropped and deskewed visually readable image and are configured to perform all these operations in less than about 87.5 milliseconds. According to some embodiments, the document processing devices and systems of the present disclosure are configured to process personal checks at a rate of at least about 250 checks per minute. According to some embodiments, the larger physical dimensions of commercial checks require additional processing time as compared to personal checks to perform the above described processing operations.

According to some embodiments, for a document transportation speed and/or processing speed of about 300 documents per minute (about 25 inches per second), the controller 150 and/or memory 160 have about 70 milliseconds to receive the scanned data from the image scanner(s) 140*a* and/or 140*b*, crop each visually readable image, deskew each cropped visually readable image, denominate each visually readable image for currency bills, OCR one or more portions of the cropped and deskewed visually readable image for currency bills and checks, and/or authenticate the visually readable image for currency bills and checks and are configured to perform all these operations in less than about 70 milliseconds. According to some embodiments, for a document transportation speed and/or processing speed of about 600 documents per minute (about 50 inches per second), the controller 150 and/or memory 160 have about 35 milliseconds to receive the scanned data from the image scanner(s) 140*a* and/or 140*b*, crop each visually readable image, deskew each cropped visually readable image, denominate each visually readable image for currency bills, OCR one or more portions of the cropped and deskewed visually readable image for currency bills and checks, and/or authenticate the visually readable image for currency bills and checks and are configured to perform all these operations in less than about 35 milliseconds. According to some embodiments, for a document transportation speed and/or processing speed of about 1200 documents per minute (about 100 inches per second), the controller 150 and/or memory 160 have about 17.5 milliseconds to receive the scanned data from the image scanner(s) 140*a* and/or 140*b*, crop each visually readable image, deskew each cropped visually readable image, denominate each visually readable image for currency bills, OCR one or more portions of the cropped and deskewed visually readable image for currency bills and checks, and/or authenticate the visually readable image for currency bills and checks and are configured to perform all these operations in less than about 17.5 milliseconds. According to some embodiments, for a document transportation speed and/or processing speed of about 2000 documents per minute (about 167 inches per second), the controller 150 and/or memory 160 have about 10.5 milliseconds to receive the scanned data from the image scanner(s) 140*a* and/or 140*b*, crop each visually readable image, deskew each cropped visually readable image, denominate each visually readable image for currency bills, OCR one or more portions of the cropped and deskewed visually readable image for currency bills and checks, and/or authenticate the visually readable image for currency bills and checks and are configured to perform all these operations in less than about 10.5 milliseconds.

According to some embodiments, the document processing devices and systems of the present disclosure are each configured to perform the following processing operations: transport a plurality of currency bills one at a time, past one or more image scanners, such as image scanner(s) 140*a* and/or 140*b*, scan each currency bill at a pixel capture rate of about twenty Megapixels per second to produce a visually readable image having a resolution of about 200 DPI×80 DPI, and denominate each of the currency bills based on the produced visually readable images at a rate of at least about 1500 currency bills per minute. According to some embodiments, the document processing devices and systems of the present disclosure can perform the above stated processing operations at a rate of at least about 400 currency bills per minute. According to some embodiments, the document processing devices and systems of the present disclosure can perform the above stated processing operations at a rate of at least about 800 currency bills per minute. According to some embodiments, the document processing devices and systems of the present disclosure can perform the above stated processing operations at a rate of at least about 1000 currency bills per minute. According to some embodiments, the document processing devices and systems of the present disclosure can perform the above stated processing operations at a rate of at least about 1200 currency bills per minute. According to some embodiments, the document processing devices and systems of the present disclosure can perform the above stated processing operations at a resolution of 200 DPI×100 DPI at a rate of at least about 1600 currency bills per minute by employing one or more image scanners, such as image scanner(s) 140*a* and/or 140*b*, capable of scanning each currency bill at a pixel capture rate of about forty Megapixels per second. According to some embodiments, the document processing device 101, 101', 101*a,b* can perform the above stated processing operations at any of the above stated rates for the plurality of currency bills, where the plurality of currency bills are U.S. currency bills transported with a wide edge leading. According to some such embodiments, the document processing device 101, 101', 101*a,b* can perform the above stated processing operations at any of the above stated rates where the document processing device 101, 101', 101*a,b* has a footprint of less than about two square feet and/or a weight of less than about 30 pounds. According to some such embodiments, the weight is about 21 pounds including an external power supply and about 19 pounds without including the external power supply.

According to some embodiments, the document processing devices and systems of the present disclosure are each configured to perform the following processing operations: transport a plurality of currency bills one at a time, past one or more image scanners, such as image scanner(s) 140a and/or 140b, image each currency bill at a pixel capture rate of about twenty Megapixels per second to produce image data that is reproducible as a visually readable image having a resolution of about 200 DPI×200 DPI, 200 DPI×100 DPI, or 200 DPI× 80 DPI of that currency bill, down-sample the image data to about 64 DPI×about 1 DPI, and denominate each of the currency bills based on the down-sampled image data at a rate of at least about 1500 currency bills per minute. According to some embodiments, the document processing devices and systems of the present disclosure can perform the above stated processing operations at a rate of at least about 600 currency bills per minute. According to some embodiments, the document processing devices and systems of the present disclosure can perform the above stated processing operations at a rate of at least about 800 currency bills per minute. According to some embodiments, the document processing devices and systems of the present disclosure can perform the above stated processing operations at a rate of at least about 1000 currency bills per minute. According to some embodiments, the document processing devices and systems of the present disclosure can perform the above stated processing operations at a rate of at least about 1150 currency bills per minute. According to some embodiments, the document processing devices and systems of the present disclosure can perform the above stated processing operations at a rate of at least about 1200 currency bills per minute. According to some embodiments, the document processing devices and systems of the present disclosure can perform the above stated processing operations at a resolution of 200 DPI×100 DPI at a rate of at least about 1600 currency bills per minute by employing one or more image scanners, such as image scanner(s) 140a and/or 140b, capable of scanning each currency bill at a pixel capture rate of about forty Megapixels per second. According to some embodiments, the document processing device 101, 101', 101a,b can perform the above stated processing operations at any of the above stated rates for the plurality of currency bills, where the plurality of currency bills are U.S. currency bills transported with a wide edge leading. According to some such embodiments, the document processing device 101, 101', 101a,b can perform the above stated processing operations at any of the above stated rates where the document processing device 101, 101', 101a,b has a footprint of less than about two square feet and/or a weight of less than about 30 pounds.

According to some embodiments, the document processing devices and systems of the present disclosure are each configured to perform the following processing operations: transport a plurality of currency bills one at a time, past one or more image scanners, such as image scanner(s) 140a, and/or 140b, scan each currency bill at a pixel capture rate of about twenty Megapixels per second to produce a visually readable image having a resolution of about 200 DPI×100 DPI, denominate each of the currency bills based on the produced visually readable images, crop and deskew a serial number snippet image for each currency bill, extract a serial number from each serial number snippet image, tag the extracted serial number to a record (e.g., records 300a-d, 305a-h) including the respective serial number snippet image, and transmit the record to an external storage device, such as, for example, a memory in the computer 151, a memory in the first computer 450a, or a memory in the second computer 450b, at a rate of at least about 1200 currency bills per minute. According to some embodiments, the records are transmitted from the document processing device, such as document processing device 101 via an Ethernet communications port. According to some embodiments, the document processing devices and systems of the present disclosure are configured to compress the records prior to transmitting the records. According to some embodiments, the document processing devices and systems of the present disclosure can perform the above stated processing operations at a rate of at least about 400 currency bills per minute. According to some embodiments, the document processing devices and systems of the present disclosure can perform the above stated processing operations at a rate of at least about 800 currency bills per minute. According to some embodiments, the document processing devices and systems of the present disclosure can perform the above stated processing operations at a rate of at least about 1000 currency bills per minute. According to some embodiments, the document processing devices and systems of the present disclosure can perform the above stated processing operations at a rate of at least about 1200 currency bills per minute. According to some embodiments, the document processing devices and systems of the present disclosure can perform the above stated processing operations at a rate of at least about 2400 currency bills per minute by employing one or more image scanners, such as image scanner(s) 140a and/ or 140b, capable of scanning each currency bill at a pixel capture rate of about forty Megapixels per second. According to some embodiments, the document processing device 101, 101', 101a,b can perform the above stated processing operations at any of the above stated rates for the plurality of currency bills, where the plurality of currency bills are U.S. currency bills transported with a wide edge leading. According to some such embodiments, the document processing device 101, 101', 101a,b can perform the above stated processing operations at any of the above stated rates where the document processing device 101, 101', 101a,b has a footprint of less than about two square feet and/or a weight of less than about 30 pounds and/or satisfies the other dimensional and weight limitations mentioned in the present disclosure in connection with the document processing device 101'.

According to some embodiments, the document processing device 101, the document processing device 101', and the document processing devices 101a,b are each configured to perform the following processing operations: transport a plurality of currency bills one at a time, with a wide edge leading, past one or more image scanners, such as image scanner(s) 140a, and/or 140b, scan each currency bill at a pixel capture rate of about twenty Megapixels per second to produce a visually readable image having a resolution of about 200 DPI×100 DPI, denominate each of the currency bills based on the produced visually readable images, crop and deskew a serial number snippet image for each currency bill, extract a serial number from each serial number snippet image to produce respective extracted serial number data, and transmit each of the respective serial number snippet images and respective extracted serial number data to an external storage device (e.g., a memory in the computer 151) to generate a record (e.g., records 300a-d, 305a-h) for each of the currency bills at a rate of at least about 800 currency bills per minute. According to some embodiments, the document processing devices and systems of the present disclosure can perform the above stated processing operations at a rate of at least about 400 currency bills per minute. According to some embodiments, the document processing devices and systems of the present disclosure can perform the above stated processing operations at a rate of at least about 600 currency bills per minute. According to some embodiments, the document processing devices and systems of the present disclosure can perform the above stated processing operations at a rate of at least about 1000 currency bills per minute. According to some embodiments, the document processing device 101, the document processing device 101', and the document processing devices 101a,b can perform the above stated processing operations at a rate of at least about 1000 currency bills per minute. According to some embodiments, the document processing device 101, the document processing device 101', and the document processing devices 101a,b can perform the above stated processing operations at a rate of at least about 1200 currency bills per minute. According to some embodiments, the document processing device 101, the document processing device 101', and the document processing devices 101a,b can perform the above stated processing operations at a rate of at least about 2400 currency bills per minute by employing one or more image scanners, such as image scanner(s) 140a and/or 140b, capable of scanning each currency bill at a pixel capture rate of about forty Megapixels per second. According to some embodiments, the document processing device 101, the document processing device 101', and the document processing devices 101a,b can each perform the above stated processing operations at any of the above stated rates for the plurality of currency bills, where the plurality of currency bills are U.S. currency bills. According to some such embodiments, the document processing device 101, the document processing device 101', and the document processing devices 101a,b can each perform the above stated processing operations at any of the above stated rates where the document processing device 101, the document processing device 101', and the document processing devices 101a,b each has a footprint of less than about two square feet and/or a weight of less than about 30 pounds and/or satisfies the other dimensional and weight limitations mentioned in the present disclosure in connection with the document processing device 101'.

According to some embodiments, the document processing devices and systems of the present disclosure are each configured to perform the following processing operations: transport a plurality of currency bills one at a time, past one or more image scanners, such as the image scanner(s) 140a and/or 140b, scan each currency bill at a pixel capture rate of about twenty Megapixels per second to produce a visually readable image of both sides of each currency bill having a resolution of about 200 DPI×100 DPI, denominate each of the currency bills based on the produced visually readable images, crop and deskew the visually readable images of both sides of each currency bill, extract one or more serial numbers from the visually readable images for each of the currency bills to produce respective extracted serial number data, and transmit each of the respective visually readable images of both sides of each currency bill and respective extracted serial number data to an external storage device (e.g., a memory in the computer 151) to generate a record (e.g., records 300a-d, 305a-h) for each of the currency bills at a rate of at least about 1200 currency bills per minute. According to some embodiments, the document processing devices and systems of the present disclosure can perform the above stated processing operations at a rate of at least about 400 currency bills per minute. According to some embodiments, the document processing devices and systems of the present disclosure can perform the above stated processing operations at a rate of at least about 800 currency bills per minute. According to some embodiments, the document processing devices and systems of the present disclosure can perform the above stated processing operations at a rate of at least about 1000 currency bills per minute. According to some embodiments, the document processing device 101, 101', 101a,b can perform the above stated processing operations at any of the above stated rates for the plurality of currency bills, where the plurality of currency bills are U.S. currency bills transported with a wide edge leading. According to some such embodiments, the document processing device 101, 101', 101a,b can perform the above stated processing operations at any of the above stated rates where the document processing device 101, 101', 101a,b has a footprint of less than about two square feet and/or a weight of less than about 30 pounds and/or satisfies the other dimensional and weight limitations mentioned in the present disclosure in connection with the document processing device 101'.

According to some embodiments, the document processing devices and systems of the present disclosure are each configured to perform the following processing operations: transport a plurality of currency bills one at a time, past one or more image scanners, such as the image scanner(s) 140a and/or 140b, scan each currency bill at a pixel capture rate of about twenty Megapixels per second to produce a visually readable image of both sides of each currency bill having a resolution of about 200 DPI×200 DPI, denominate each of the currency bills based on the produced visually readable images, crop and deskew the visually readable images of both sides of each currency bill, extract one or more serial numbers from the visually readable images for each of the currency bills to produce respective extracted serial number data, and transmit each of the respective visually readable images of both sides of each currency bill and respective extracted serial number data to an external storage device (e.g., a memory in the computer 151) to generate a record (e.g., records 300a-d, 305a-h) for each of the currency bills at a rate of at least about 600 currency bills per minute. According to some embodiments, the document processing devices and systems of the present disclosure can perform the above stated processing operations at a rate of at least about 200 currency bills per minute. According to some embodiments, the document processing devices and systems of the present disclosure can perform the above stated processing operations at a rate of at least about 400 currency bills per minute. According to some embodiments, the document processing devices and systems of the present disclosure can perform the above stated processing operations at a rate of at least about 600 currency bills per minute. According to some embodiments, the document processing devices and systems of the present disclosure can perform the above stated processing operations at a rate of at least about 800 currency bills per minute. According to some embodiments, the document processing devices and systems of the present disclosure can perform the above stated processing operations at a rate of at least about 1150 currency bills per minute by employing one or more image scanners, such as image scanner(s) 140a and/or 140b, capable of scanning each currency bill at a pixel capture rate of about forty Megapixels per second. According to some embodiments, the document processing devices and systems of the present disclosure can perform the above stated processing operations at a rate of at least about 1200 currency bills per minute by employing one or more image scanners, such as image scanner(s) 140a and/or 140b, capable of scanning each currency bill at a pixel capture rate of about forty Megapixels per second. According to some embodiments, the document processing device 101, 101', 101a,b can perform the above stated processing operations at any of the above stated rates for the plurality of currency bills, where the plurality of currency bills are U.S. currency bills transported with a wide edge leading. According to some such embodiments, the document processing device 101, 101', 101a,b can perform the above stated processing operations at any of the above stated rates where the document processing device 101, 101', 101a,b has a footprint of less than about two square feet and/or a weight of less than about 30 pounds and/or satisfies the other dimensional and weight limitations mentioned in the present disclosure in connection with the device 101'.

According to some embodiments, the document processing devices and systems of the present disclosure are each configured to perform the following processing operations: transport a plurality of checks one at a time, past one or more image scanners, such as the image scanner(s) 140a and/or 140b, scan each check at a pixel capture rate of about twenty Megapixels per second to produce a visually readable image of both sides of each check having a resolution of about 200 DPI×200 DPI, crop and deskew the visually readable images of both sides of each check, extract MICR characters from the visually readable images for each of the checks to produce respective extracted MICR character data, and transmit each of the respective visually readable images of both sides of each check and respective extracted MICR character data to an external storage device (e.g., a memory in the computer 151) to generate a record (e.g., records 300a-d, 305a-h) for each of the checks at a rate of at least about 600 checks per minute. According to some embodiments, the checks are personal or standard size checks, commercial checks, or a combination of both. The MICR characters can include a checking account number, a routing number, a check number, or any combination thereof. According to some embodiments, the one or more image scanners produce the visually readable image of both sides of each of the checks having a resolution of about 200 DPI×100 DPI. According to some embodiments, the one or more image scanners produce the visually readable image of both sides of each of the checks having a resolution of about 200 DPI×300 DPI. According to some embodiments, the one or more image scanners produce the visually readable image of both sides of each of the checks having a resolution of about 300 DPI×300 DPI. According to some embodiments, the document processing devices and systems of the present disclosure can perform the above stated processing operations at a rate of at least about 100 checks per minute. According to some embodiments, the document processing devices and systems of the present disclosure can perform the above stated processing operations at a rate of at least about 150 checks per minute. According to some embodiments, the document processing devices and systems of the present disclosure can perform the above stated processing operations at a rate of at least about 200 checks per minute. According to some embodiments, the document processing devices and systems of the present disclosure can perform the above stated processing operations at a rate of at least about 300 checks per minute. According to some embodiments, the document processing devices and systems of the present disclosure can perform the above stated processing operations at a rate of at least about 400 checks per minute. According to some embodiments, the document processing devices and systems of the present disclosure can perform the above stated processing operations at a rate of at least about 800 checks per minute at a resolution of about 200 DPI×200 DPI. According to some embodiments, the document processing devices and systems of the present disclosure can perform the above stated processing operations at a rate of at least about 1000 checks per minute at a resolution of about 200 DPI×200 DPI. According to some embodiments, the document processing devices and systems of the present disclosure can perform the above stated processing operations at a rate of at least about 1200 checks per minute at a resolution of about 200 DPI×200 DPI by employing one or more image scanners, such as image scanner(s) 140a and/or 140b, capable of scanning each check at a pixel capture rate of about forty Megapixels per second. According to some embodiments, the document processing device 101, 101', 101a,b can perform the above stated processing operations at any of the above stated rates for the plurality of checks, where the plurality of checks are transported with a wide edge leading. According to some such embodiments, the document processing device 101, 101', 101a,b can perform the above stated processing operations at any of the above stated rates where the document processing device 101, 101', 101a,b has a footprint of less than about two square feet and/or a weight of less than about 30 pounds and/or satisfies the other dimensional and weight limitations mentioned in the present disclosure in connection with the device 101'.

According to some embodiments, the document processing devices and systems of the present disclosure are each configured to perform the following processing operations: transport a plurality of documents including intermixed currency bills and checks one at a time, past one or more image scanners, such as the image scanner(s) 140a and/or 140b, scan each document at a pixel capture rate of about twenty Megapixels per second to produce a visually readable image of both sides of each document having a resolution of about 200 DPI×200 DPI, crop and deskew the visually readable images of both sides of each document, for currency bills denominate each of the currency bills based on the produced visually readable images and extract one or more serial numbers from the visually readable images for each of the currency bills to produce respective extracted serial number data and transmit each of the respective visually readable images of both sides of each currency bill and respective extracted serial number data to an external storage device (e.g., a memory in the computer 151) to generate a currency bill record (e.g., records 300a,c,d, 305a-h) for each of the currency bills, for checks extract MICR characters from the visually readable images for each of the checks to produce respective extracted MICR character data and transmit each of the respective visually readable images of both sides of each check and respective extracted MICR character data to the external storage device to generate a check record (e.g., record 300b) for each of the checks, all at a rate of at least about 600 documents per minute. According to some embodiments, the document processing devices and systems of the present disclosure can perform the above stated processing operations at a rate of at least about 200 documents per minute. According to some embodiments, the document processing devices and systems of the present disclosure can perform the above stated processing operations at a rate of at least about 400 documents per minute. According to some embodiments, the document processing devices and systems of the present disclosure can perform the above stated processing operations at a rate of at least about 600 documents per minute. According to some embodiments, the document processing devices and systems of the present disclosure can perform the above stated processing operations at a rate of at least about 800 documents per minute. According to some embodiments, the document processing devices and systems of the present disclosure can perform the above stated processing operations at a rate of at least about 1000 documents per minute. According to some embodiments, the document processing devices and systems of the present disclosure can perform the above stated processing operations at a rate of at least about 1200 documents per minute by employing one or more image scanners, such as image scanner(s) 140a and/or 140b, capable of scanning each document at a pixel capture rate of about forty Megapixels per second. According to some embodiments, the document processing device 101, 101', 101*a,b* can perform the above stated processing operations at any of the above stated rates for the plurality of documents, where the intermixed currency bills are U.S. currency bills and the documents are transported with a wide edge leading. According to some such embodiments, the document processing device 101, 101', 101*a,b* can perform the above stated processing operations at any of the above stated rates where the document processing device 101, 101', 101*a,b* has a footprint of less than about two square feet and/or a weight of less than about 30 pounds and/or satisfies the other dimensional and weight limitations mentioned in the present disclosure in connection with the device 101'.

According to some embodiments, the document processing devices 101, 101', 101*a,b* are each configured to perform the following processing operations: (1) transport documents, one at a time, past two image scanners, (2) scan the documents with the two image scanners at a pixel capture rate of at least about forty Megapixels per second to produce a record for each document including a visually readable image of both sides of each document having a resolution of at least 200 dpi×200 dpi, (3) deskew and crop the visually readable images, for records associated with currency bills (4)(i) denominate currency bills including U.S. currency bills based on one or both of the visually readable images in an associated record, (ii) extract identifying information from one or both of the visually readable images, and (iii) tag the extracted identifying information to one or more data fields included in the record, for records associated with checks (5)(i) extract identifying information from one or both of the visually readable images and (ii) tag the extracted identifying information to one or more data fields included in the record, and (6) buffer the records in an internal memory of the document processing device 101, 101', 101*a,b* at a rate of at least about 1200 documents per minute. In these embodiments, the document processing device 101, 101', 101*a,b* can further transmit the buffered records via a communications port, such as the communications port 180, to an external memory, such as a memory in the computer 151, at a rate of at least about 1100 documents per minute. According to some embodiments, the document processing device 101, 101', 101*a,b* can perform the above stated processing operations at a rate of at least about 250 documents per minute. According to some embodiments, the document processing device 101, 101', 101*a,b* can perform the above stated processing operations at a rate of at least about 500 documents per minute. According to some embodiments, the document processing device 101, 101', 101*a,b* can perform the above stated processing operations at a rate of at least about 750 documents per minute. According to some embodiments, the document processing device 101, 101', 101*a,b* can perform the above stated processing operations at a rate of at least about 1170 documents per minute. According to some embodiments, the document processing device 101, 101', 101*a,b* can perform the above stated processing operations at any of the above stated rates for the plurality of documents, where the currency bills are U.S. currency bills and the documents are transported with a wide edge leading. According to some such embodiments, the document processing device 101, 101', 101*a,b* can perform the above stated processing operations at any of the above stated rates where the document processing device 101, 101', 101*a,b* has a footprint of less than about two square feet and/or a weight of less than about 30 pounds and/or satisfies the other dimensional and weight limitations mentioned in the present disclosure in connection with the device 101'.

According to some embodiments, the document processing devices and systems of the present disclosure are each configured to perform the following processing operations: transport a plurality of documents including, currency bills, personal checks, commercial checks, and full sheets of letter and/or A4 sized documents, one at a time, past one or more image scanners, such as image scanner(s) 140*a* and/or 140*b*, scan each document at a pixel capture rate of at least about twenty Megapixels per second to produce a visually readable image having a resolution of about 200 DPI×100 DPI at a rate of at least about 300 documents per minute. According to some embodiments, the document processing device 101, 101', 101*a,b* can perform the above stated processing operations at any of the above stated rates where the document processing device 101, 101', 101*a,b* has a footprint of less than about two square feet and/or a weight of less than about 30 pounds.

According to some embodiments, the document processing devices and systems of the present disclosure are each configured to perform the following processing operations: transport a plurality of full sheets of letter and/or A4 sized documents, one at a time, past one or more image scanners, such as image scanner(s) 140*a* and/or 140*b*, scan each document at a pixel capture rate of at least about twenty Megapixels per second to produce a visually readable image having a resolution of about 200 DPI×100 DPI at a rate of at least about 300 documents per minute. According to some embodiments, the document processing device 101, 101', 101*a,b* can perform the above stated processing operations at any of the above stated rates where the document processing device 101, 101', 101*a,b* has a footprint of less than about two square feet and/or a weight of less than about 30 pounds.

According to some embodiments, the document processing devices and systems of the present disclosure are each configured to receive a plurality of currency bills, transport the currency bills one at a time, past one or more image scanners, scan each currency bill at a pixel capture rate of at least about twenty Megapixels per second to produce image data that is reproducible as a visually readable image having a resolution of about 200 DPI×100 DPI of that currency bill, and denominate each of the currency bills. According to some embodiments, denominating the currency bills includes determining a series of each of the currency bills. In these embodiments, the series information can be used to determine a coordinate location of one or more serial numbers in the visually readable image for the currency bill. According to some embodiments, each currency bill includes two identical serial numbers in two distinct locations (e.g., upper left corner and lower right corner or upper right corner and lower left corner). According to some embodiments, determining the series of a currency bill reduces the processing time needed for the document processing devices and systems of the present disclosure to locate, crop, deskew, and extract the serial number from the visually readable image. Reducing the processing time to extract the serial number can allow for overall faster document processing. For example, the processing time according to some embodiments can be seventeen milliseconds for each currency bill. Thus, in these embodiments, the document processing devices and systems of the present disclosure could process at least about 1200 currency bills every minute. According to some such embodiments, the document processing devices and systems of the present disclosure each has about 17 milliseconds to determine if the currency bill being processed should be flagged by halting or stopping the transportation of the currency bills such that the flagged currency bill is the last currency bill presented in an output receptacle, such as the output receptacle 130 of the document processing device 101. According to some embodiments, determining the series of a currency bill can reduce the processing time needed for the document processing devices and systems of the present disclosure to determine a fitness of a currency bill.

According to some embodiments, international currency bills, such as, for example, the Euro, have varying sizes (e.g., length×width dimensions) based on denomination. Thus, a coordinate location of one or more serial numbers on a visually readable image of a Euro currency bill will vary for each of the different Euro denominations. Thus, in these embodiments, denominating the Euro currency bills provides a coordinate location of one or more serial numbers for a particular Euro denomination, which, as described above, can reduce the processing time for extracting the serial number.

According to some embodiments, the rate that the document processing devices and systems of the present disclosure can perform any of the above stated processing operations within the Document Processing Speeds Section is a function of a processor clock speed and/or a system clock speed. According to some embodiments, the processor clock speed is the clock speed of a controller or digital signal processor (DSP), such as the controller 150 of the document processing device 101. According to some embodiments, the processor clock speed is a function or weighted average of a variety of component clock speeds used to process currency bills and/or checks. For example, the processor clock speed can be a weighted average of a clock speed of the processor, cache memory, SDRAM memory, and image scanner. According to some embodiments, the document processing devices and systems of the present disclosure each has a ratio of the processing operation rate to the processor clock speed of two (e.g., processing operation rate/processor clock speed=2). According to some embodiments, the document processing device 101, 101', 110*a,b* has a ratio of processing operation rate to processor clock speed of two. For example, in some embodiments, the processing operation rate is about 1200 documents/min and the processor clock speed is about 600 megahertz (MHz), which is a ratio of two documents/minute per each megahertz of clock speed. For another example, the processing operation rate is about 2400 documents/min and the processor clock speed is about 1200 megahertz, which is a ratio of two documents/minute per each megahertz of clock speed. According to some embodiments, a ten percent increase in processor clock speed provides about a ten percent increase in document processing speed. For example, for a document processing device or system operating at about twenty microseconds to OCR a serial number from a visually readable image, a ten percent (10%) increase in that document processing device or system's clock speed can reduce the time to process and OCR the serial number from about twenty microseconds to about eighteen microseconds. According to some embodiments, the document processing device 101, 101', 101*a,b* includes the ratio of two while maintaining a footprint of less than about two square feet and/or a weight of less than about 30 pounds and/or satisfies the other dimensional and weight limitations mentioned in the present disclosure in connection with the device 101'.

According to some embodiments, the document processing devices and systems of the present disclosure can each transport a plurality of general circulation U.S. currency bills at a rate of at least about 1200 currency bills per minute and denominate the plurality of U.S. currency bills with a no-call denomination percentage of less than about 0.01 percent. That is, the document processing devices and systems of the present disclosure can each accurately call the denomination of U.S. currency bills at least about 9,999 times out of 10,000 general circulation U.S. currency bills. Thus, according to some embodiments, the document processing devices and systems of the present disclosure flag a U.S. currency bill as a no-call denomination currency bill less than about once out of about every 10,000 U.S. currency bills that are processed. According to some embodiments, the document processing devices and systems of the present disclosure can each transport a plurality of general circulation U.S. currency bills at a rate of at least about 800 currency bills per minute and denominate the plurality of U.S. currency bills with a no-call denomination percentage of less than about 0.01 percent. According to some embodiments, the document processing devices and systems of the present disclosure can each transport a plurality of general circulation U.S. currency bills at a rate of at least about 1000 currency bills per minute and denominate the plurality of U.S. currency bills with a no-call denomination percentage of less than about 0.01 percent. According to some embodiments, the document processing devices and systems of the present disclosure can each transport a plurality of general circulation U.S. currency bills at a rate of at least about 1200 currency bills per minute and denominate the plurality of U.S. currency bills with a no-call denomination percentage of less than about 0.05 percent. According to some embodiments, the document processing devices and/or systems of the present disclosure employ the leading/trailing edge detection techniques and the forward/reverse denomination algorithms described herein in the Document Processing Device and System Section to denominate general circulation U.S. currency bills with such no-call denomination rates (0.01% and 0.05%).

According to some embodiments, the document processing device 101, the document processing device 101', and the document processing devices 101*a,b* each have a single input receptacle, such as input receptacle 110', and a single output receptacle, such as output receptacle 130'. In these embodiments, the document processing device 101, the document processing device 101', and the document processing devices 101*a,b* each has a height of less than about fourteen inches, a width of less than about sixteen inches, and a depth of less than about seventeen inches. According to some embodiments, the document processing device 101, the document processing device 101', and the document processing devices 101*a,b* each has a footprint of less than two square feet. According to some embodiments, the document processing device 101, the document processing device 101', and the document processing devices 101*a,b* each has a footprint of less than one and a half square feet. According to some embodiments, the document processing device 101, the document processing device 101', and the document processing devices 101*a,b* each has a footprint of less than one square foot.

According to some embodiments, the document processing device 101, the document processing device 101', and the document processing devices 101*a,b* each weighs less than about 35 lbs. According to some embodiments, the document processing device 101, the document processing device 101', and the document processing devices 101*a,b* each weighs less than about 25 lbs. According to some embodiments, the document processing device 101, the document processing device 101', and the document processing devices 101*a,b* each weighs about twenty lbs. According to some embodiments, the document processing device 101, the document processing device 101', and the document processing devices 101*a,b* are each compact and adapted to be rested on a tabletop or countertop. According to some embodiments, the document processing device 101, the document processing device 101', and the document processing devices 101*a,b* can each be a part of a larger document processing device or system such as, for example, systems used for currency bill sorting and/or other types of document sorting.

It is contemplated that in certain embodiments the device 101, 101' is configured to operate at the various speeds, resolutions, etc. described in this Section, and in other sections of the present disclosure, and is configured to have its operating settings to be automatically and/or manually adjusted. Thus, according to some embodiments, the resolution at which images of documents are obtained can be varied depending on the document type and/or the type of information desired for extraction from the image of the document. For example, a document processing device, similar to the embodiments described in FIGS. 1 and 2A-C and elsewhere herein, is configured to permit the resolution and document processing speed to be adjusted based on the type of document being imaged. According to some embodiments, the device 101, 101' automatically adjusts the resolution and document processing speed based on the type of document being imaged. For example, the document processing device is configured to detect the type of document in an input receptacle or within the transport mechanism. According to some embodiments, a controller of the device then adjusts the image sensor to obtain an image at a finer resolution to obtain and extract finer features from the image of the document, such as, for example, a plate number from a currency bill, or the controller adjusts the image sensor to a coarser resolution for, for example, a commercial check which can have larger character features. According to some embodiments, the document handling speed of a transport mechanism for the document processing device is configured to simultaneously be adjusted to speed up or slow down to account for the different documents types and resolutions. It is also contemplated that a user of a document processing device can visually identify the type of document to be imaged and then input the document type into the device via an interface (e.g., control panel 170, 170') configured to receive a document type to be imaged. Based on the user's identification of the type of documents to be imaged/processed input to the device 101, 101' via the interface, the device 101, 101' automatically adjusts the resolutions and document handling speed for the imaging and processing of the documents. It is further contemplated that according to some embodiments, the device 101, 101' automatically adjusts the document handling speed based on the resolution of a document. For example, if the desired resolution for a particular document increases, the document handling speed is decreased to allow the higher (i.e., slower) resolution to occur. According to some embodiments, the device 101, 101' automatically adjusts the document handling speed based on the resolution at which a document is to be imaged. For example, according to some embodiments, if it is desired to image a particular document at a higher resolution, the device 101, 101' is configured to decrease the document handling speed to allow the document to be imaged at a higher resolution. Similarly, conversely, if it is desired to image a particular document at a lower resolution, according to some embodiments, the device 101, 101' is configured to increase the document handling speed and image the document at a lower resolution.

According to some embodiments, a device 101, 101' has an interface such as interface 170, 170' which is configured to allow an operator to manually adjust the resolution setting among a plurality of settings, for example, high, medium, and low; or 50 DPI×50 DPI, 100 DPI×100 DPI, 200 DPI×200 DPI, 400 DPI×400 DPI; or "U.S. currency serial number extraction," "U.S. currency small character extraction." According to some embodiments, "U.S. currency small character extraction" is a resolution setting sufficient to permit small characters on U.S. bills (e.g., back plate numbers, check letter and quadrant numbers, check letter and face plate numbers) to be extracted from images of U.S. currency bills. The device 101, 101' is configured to adjust the resolution based on the resolution setting selected. Furthermore, according to some embodiments, the device 101, 101' is configured to automatically adjust the document transport speed based on the selected resolution setting.

According to some embodiments, a document processing device and/or system, such as, for example, the document processing device 101, 101' and/or the document processing system 100 shown in FIGS. 1 and 2A-2C, is configured to obtain identifying information (e.g., currency bill serial number) based on data extracted from image data that is reproducible as visually readable images of documents. According to some such embodiments, sometimes a complete serial number cannot be extracted using one or more OCR algorithms, such as those described above in the Optical Character Recognition Section, and in other sections of the present disclosure, when a currency bill has been subjected to wear. According to some embodiments, the document processing device 101, 101' is configured to extract eleven out of eleven serial number characters, from image data that is reproducible as a visually readable image of at least a portion of a general circulation U.S. currency bill, using OCR software with at least about a 98.00% accuracy—that is, on at least about 98.00% of the general circulation U.S. currency bills, the document processing device 101, 101' will extract eleven out of eleven serial number characters. According to some embodiments, the document processing device 101, 101' is configured to extract eleven out of eleven serial number characters, from image data that is reproducible as a visually readable image of at least a portion of a general circulation U.S. currency bill, using OCR software with at least about a 99.50% accuracy—that is, on at least about 99.50% of the general circulation U.S. currency bills, the document processing device 101, 101' will extract eleven out of eleven serial number characters. According to some embodiments, the document processing device 101, 101' is configured to extract ten out of eleven serial number characters, from image data that is reproducible as a visually readable image of at least a portion of a general circulation U.S. currency bill, using OCR software with at least about a 99.00% accuracy—that is, on at least about 99.00% of the general circulation U.S. currency bills, the document processing device 101, 101' will extract ten out of eleven serial number characters. According to some embodiments, the document processing device 101, 101' is configured to extract ten out of eleven serial number characters, from image data that is reproducible as a visually readable image of at least a portion of a general circulation U.S. currency bill, using OCR software with at least about a 99.50% accuracy—that is, on at least about 99.50% of the general circulation U.S. currency bills, the document processing device 101, 101' will extract ten out of eleven serial number characters. According to some embodiments, the document processing device 101, 101' is configured to extract ten out of eleven serial number characters, from image data that is reproducible as a visually readable image of at least a portion of a general circulation U.S. currency bill, using OCR software with at least about a 99.90% accuracy—that is, on at least about 99.90% of the general circulation U.S. currency bills, the document processing device 101, 101' will extract ten out of eleven serial number characters.

According to some embodiments, the document processing device 101,101' and/or system 101 is configured to extract characters, such as, for example, serial number characters, from image data with any of the above described accuracies at a document processing rate of at least about 100 documents per minute. According to some embodiments, the document processing device 101,101' and/or system 101 is configured to extract characters, such as, for example, serial number characters, from image data with any of the above described accuracies at a document processing rate of at least about 500 documents per minute. According to some embodiments, the document processing device 101,101' and/or system 101 is configured to extract characters, such as, for example, serial number characters, from image data with any of the above described accuracies at a document processing rate of at least about 800 documents per minute. According to some embodiments, the document processing device 101,101' and/or system 101 is configured to extract characters, such as, for example, serial number characters, from image data with any of the above described accuracies at a document processing rate of at least about 1000 documents per minute. According to some embodiments, the document processing device 101, 101' and/or system 101 is configured to extract characters, such as, for example, serial number characters, from image data with any of the above described accuracies at a document processing rate of at least about 1200 documents per minute.

According to some embodiments, in response to an extraction error occurring (e.g., an incomplete set of data or characters has been extracted), such as when extracting a serial number from image data that is reproducible as a visually readable image of at least a portion of a currency bill, the currency bill can be flagged to the operator by displaying the incomplete extracted serial number character(s) adjacent to the visually readable image (e.g., full currency bill image and/or serial number snippet image), for example, on the control panel 170 of the document processing device 101. Additional details and embodiments associated with flagging currency bills and checks are described in the Modes of Operation—Flagging Section, and in other sections of the present disclosure.

Methods of Processing Documents

Now turning to FIG. 5A, a method of processing documents 500 in a financial institution system, such as the financial institution system 103, according to some embodiments of the present disclosure is shown. According to some embodiments, the method 500 can also be referred to as a method of reconciling a deposit transaction between a customer (e.g., a Store, a casino, etc.) and a financial institution (e.g., a Bank). At block 502 a data file (e.g., the data file 436) including a plurality of records (e.g., records 300a-d, 305a-h) associated with the deposit transaction is received in the financial institution system from a customer document processing system, such as the customer document processing system 102, over a communications link and/or network, such as the network 420. As discussed above in reference to FIGS. 4A and 4B, according to some embodiments, the financial institution system can include a financial institution or bank document processing system and a banking system, wherein the bank document processing system includes a financial institution or bank document processing device and a financial institution or bank computer.

The data file can be received by the bank document processing device, the bank computer, and/or the banking system. Each of the records included in the data file can include one or more visually readable images (e.g., data configured to visually represent one or more documents) of a document, such as a currency bill or a check, for deposit into a customer financial account. According to some embodiments, each of the of records includes one or more snippet images associated with a respective document being deposited. For example, a snippet image of a currency bill serial number such as the serial number snippet of the currency bill illustrated in the image section 370 as shown in FIG. 3C, or a corner of a currency bill indicating its denomination, as shown in FIG. 3D, etc. Each of the records in the data file is associated with a value (e.g., 10 for a $10 currency bill or 50 for a $50 dollar check). According to some embodiments, the bank expects the customer to physically deposit a document for each corresponding record in the data file. According to other embodiments, the bank only expects to receive a physical document for currency bills that correspond with the records in the data file. In these embodiments, the records including visually readable images of respective checks are sufficient for further processing (e.g., clearing, proofing, paying, etc.) of the associated check documents. At block 504, according to some embodiments, the financial institution system provisionally credits the customer's bank account some amount, such as an amount equal to a sum total of the values of the documents associated with the records in the data file associated with the deposit transaction.

According to some alternative embodiments, the financial institution system provisionally credits the customer's bank account for records associated with currency bills and finally credits the customer's bank account for records associated with checks. According to some such embodiments, the financial institution system holds-off or waits until the physical checks and/or the visually readable images of the checks associated with the deposit transaction are received and processed prior to issuing the final credit for the records associated with checks. According to some other alternative embodiments, the financial institution system does not provisionally credit the customer's bank account for any of the records included in the data file. Rather, the financial institution system holds-off or waits until the physical documents associated with the deposit transaction are received to verify the records and/or data in the data file against the physical documents prior to issuing a credit. According to some other alternative embodiments, the financial institution system provisionally credits the customer's bank account for records associated with checks included in the data file, but not for records associated with currency bills. According to some such embodiments, the financial institution system holds-off or waits until the physical currency bills associated with the deposit transaction are received to verify the records associated with currency bills against the physical currency bills prior to issuing a credit for the records associated with currency bills.

At block 506 the Bank receives physical documents from the customer associated with the deposit transaction. The physical documents are associated with the data file received from the customer over the network. According to some embodiments, each of the physical documents is associated with one of the records in the data file. According to other embodiments, one or more of the physical documents is not associated with any of the records in the data file. These documents are called unexpected documents because based on the records in the data file, the Bank was not expecting to receive these physical documents from the customer. According to yet other embodiments, one or more of the records in the data file is not associated with any of the physical documents received by the Bank. These documents are called no-show documents because based on the records in the data file the Bank expected to receive corresponding physical documents for each record, but for one reason or another, all of the physical documents were not received at the Bank.

At block 508 the financial institution system processes the received physical documents in the bank document processing system to generate information, such as a bank data file and/or bank records. The information generated can include one or more visually readable images of each physical document, one or more visually readable snippet images for each physical document, identifying information extracted from the images, and/or transactional information. At block 510, the financial institution system compares the generated information, such as the bank records, with the records included in the received data file from block 502 to determine if any no-show documents 512 are detected. At block 510, the financial institution system can also determine if any unexpected documents are detected. If the financial institution system determines that one or more documents are no-show documents, then according to some embodiments, at block 514, the financial institution system automatically charges-back the customer's bank account an amount equal to a value of the no-show document(s). If the financial institution system does not find a no-show document (e.g., each visually readable image in the received data file has a corresponding received physical document), then the method 500 ends at block 515.

According to other embodiments, at block 514 if the financial institution system determines or detects one or more no-show documents, then the bank document processing system automatically transmits a charge-back instruction or notice to the banking system. The charge-back instruction or notice informs one or more financial institution employees of the no-show document(s). In some such embodiments, the banking system 460 can further require operator input from a bank employee or teller to complete a charge-back or debit of the customer's bank account for an amount equal to the value of the no-show document(s). According to some embodiments, the charge-back instruction is transmitted to an item processing system, such as the item processing system described above in reference to FIGS. 4A and 4B. In some such embodiments, the item processing system is configured to process the charge-back instruction by debiting the customer's bank account.

According to some embodiments, if the financial institution system determines that one or more documents are unexpected documents, then according to some embodiments, the financial institution system automatically credits the customer's bank account an amount equal to a value of the unexpected document(s). According to other embodiments, if the financial institution system determines or detects one or more unexpected documents, then the bank document processing system automatically transmits a credit instruction or notice to the banking system. The credit instruction or notice informs one or more financial institution employees of the unexpected document(s). In some such embodiments, the banking system 460 can further require operator input from a bank employee or teller to complete a credit of the customer's bank account for an amount equal to the value of the unexpected document(s). According to some embodiments, the credit instruction is transmitted to the item processing system, which is configured to process the credit instruction by debiting the customer's bank account.

Now turning to FIG. 5B, an authentication operation 501 of some embodiments of the financial institution system of FIG. 5A is described. The authentication operation 501 can be inserted after block 506 at any position in the method 500 of FIG. 5A. At block 516 the bank document processing system also authenticates the received documents. As discussed above in reference to FIG. 1, authentication can include authentication by use of the authentication unit 145, which performs one or more authentication tests, and/or by use of a suspect database by comparing the identifying information in the records with data in the suspect database. At block 518 the financial institution system determines if any of the documents are suspect documents. If the financial institution system determines one or more of the received physical documents are suspect, then, according to some embodiments, the financial institution system automatically charges-back the customer bank account an amount equal to a value of the determined suspect document(s) at block 520. If the financial institution system does not determine that any documents are suspect (e.g., each document passes the authentication tests and/or comparison tests), then the method ends at block 522.

According to other embodiments, at block 520 if the financial institution system determines or detects one or more suspect documents, then the bank document processing system automatically transmits a charge-back instruction or suspect notice to the banking system. The charge-back instruction or notice informs one or more financial institution employees of the suspect document(s). In some such embodiments, the banking system further requires operator input from a bank employee or teller to complete a charge-back or debit of the customer's bank account for an amount equal to the value of the suspect document(s). According to some embodiments, the charge-back instruction or suspect notice is transmitted to the item processing system, which is configured to process the charge-back instruction or suspect notice by debiting the customer's bank account the amount equal to the value of the suspect document(s).

Figure 6:
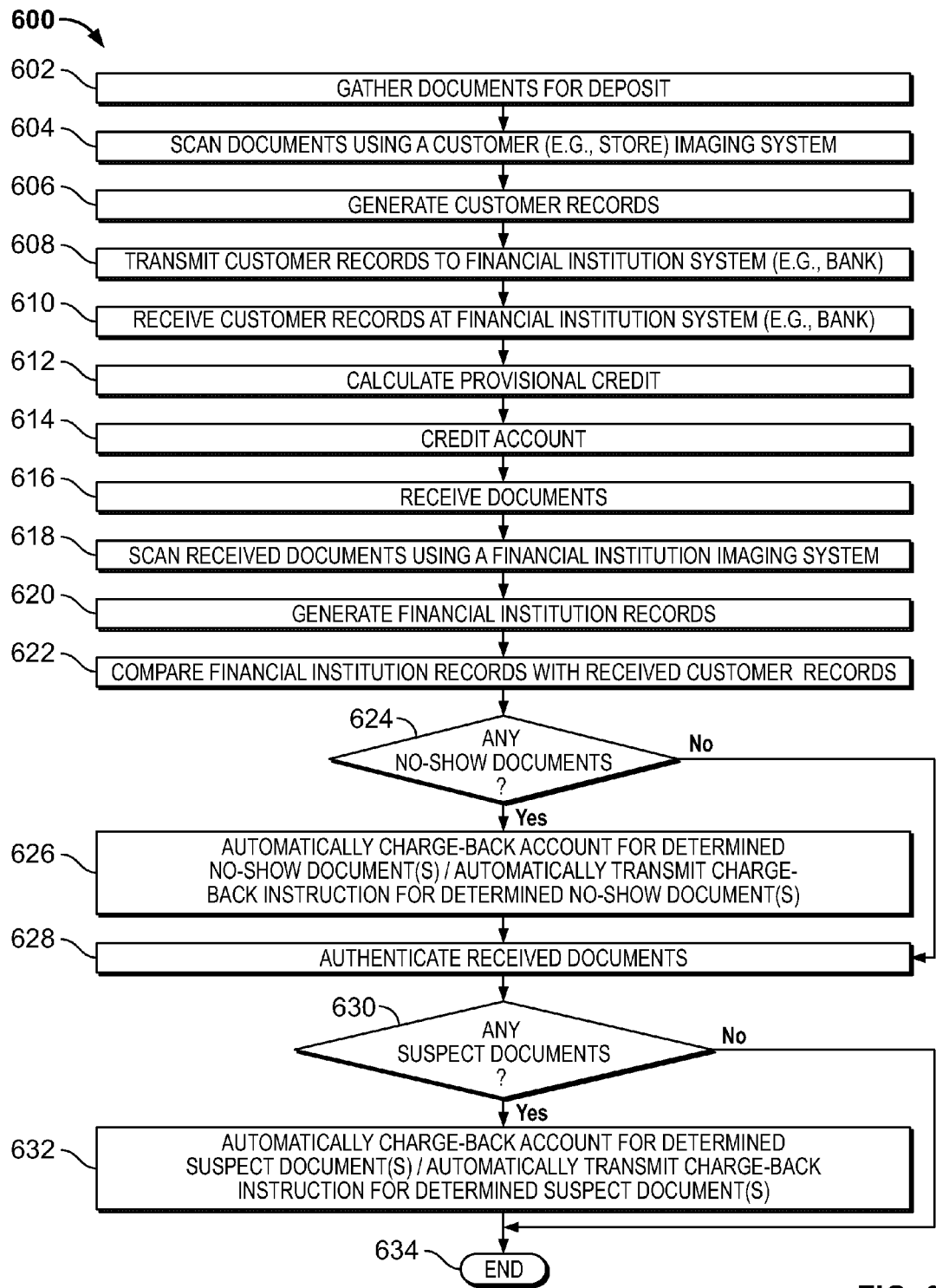
FIG. 6 is a flowchart describing the operation of a financial transaction system according to some embodiments of the present disclosure.

Now turning to FIG. 6, a method of processing documents 600 in a financial transaction system according to some embodiments of the present disclosure is shown. At block 602 a bank customer, for example, a Store or a casino, gathers a plurality of physical documents associated with a deposit transaction for deposit into the Store's bank account at a Bank. At block 604 the Store scans the plurality of physical documents using a store document processing system, such as document processing system 100, residing at the Store's facility (which is remotely located relative to the Bank). According to some embodiments, the store document processing system includes a store document processing device and/or a store computer, such as the document processing device 101 and the computer 151. The store document processing device is configured to transport the documents one at a time past an image scanner to generate store or customer records 606. Each of the store records can include a visually readable image of a document, identifying information, and/or transactional information. The store records associated with the deposit transaction are transmitted to the Bank at block 608 to obtain a credit (e.g., a provisional credit and/or a final credit). The store records can be transmitted from the store document processing device and/or the store computer communicatively connected with or networked with the store document processing device. According to some embodiments, the store records are transmitted from the store document processing system to the Bank over a network (e.g., the internet, LAN, WAN, private network, public network, Ethernet, etc.), such as the network 420. At block 610, the Bank receives the store records associated with the deposit transaction in a financial institution system, such as the financial institution system 103.

According to some embodiments, prior to transmitting the store records, the store document processing system calculates a total deposit value associated with all of the physical documents associated with the deposit transaction. In some embodiments, the store document processing system automatically calculates the total deposit value and transmits the total deposit value in a virtual deposit slip, as described above in reference to FIGS. 3E and 4A, with the associated store records to the financial institution system over the network.

According to some embodiments, the store document processing system is configured to calculate a plurality of additional totals automatically and/or in conjunction with operator input. According to some alternative embodiments, the store document processing system is configured to transmit a visually readable image of a virtual and/or a preprinted deposit slip as described above in reference to FIGS. 3E and 4A.

According to some embodiments, the plurality of additional totals included in the virtual and/or preprinted deposit slip include, for example, a total value of currency bills associated with the deposit transaction, a total value of checks associated with the deposit transaction, and/or a total value of other documents associated with the deposit transaction. The store document processing system can be configured to calculate the total value of each denomination of currency bills associated with the deposit transaction and the quantity of each denomination. According to some embodiments, the quantity of checks associated with the deposit transaction, the total value of on-us checks, and the total value of transit checks can also be calculated. According to some embodiments, the store document processing device can be configured to calculate a total number of suspect documents, a total value of suspect currency bills, a number of suspect currency bills, a total value of suspect checks, and/or a number of suspect checks to be transported to the Bank. According to some embodiments, some or all of the above described calculated totals and/or number of each type of document, denomination, check, etc. can be transmitted as a virtual and/or preprinted deposit slip and/or data included in one or more of the store records. According to some embodiments, such information can be used by the Bank to process and/or balance the deposit transaction and/or aid the Bank in preparing its inventory for the following workday.

At block 612, the financial institution system calculates a credit (e.g., a provisional credit and/or a final credit) to be applied to the Store's bank account for the deposit transaction. According to some embodiments, the credit is equal to a sum total of values associated with the records included in the data file. Alternatively, the credit can be a percentage of the sum total of values or some other amount based on a variety of factors. According to other embodiments, the credit is equal to or a percentage of the total deposit value included in the deposit slip. At block 614, the bank document processing system in communication with the banking system automatically credits the Store's bank account for an amount equal to the calculated credit. According to some embodiments, the credit can be provisional and/or final. For example, the credit can be provisional for values in records associated with currency bills and final for values associated with checks. According to some such embodiments, the final credit can be withheld until the physical checks and/or the visually readable images of the checks associated with the deposit transaction are received and finally processed. According to some other alternative embodiments, the credit is zero because the financial institution system holds-off or waits until the physical documents associated with the deposit transaction are received to verify all of the records in the data file against the physical documents prior to issuing a credit. According to some other alternative embodiments, a provisional credit is only issued for values in records associated with checks, but not for records associated with currency bills. According to some such embodiments, the financial institution system holds-off or waits until the physical currency bills associated with the deposit transaction are received to verify the records associated with currency bills against the physical currency bills prior to issuing a credit for the records associated with currency bills.

According to some embodiments, the bank document processing system transmits a credit instruction or notice to the banking system and/or an item processing system as described above. In some such embodiments, teller software running on the banking system can be configured to receive the credit instruction and automatically apply a credit to the Store's bank account based on the credit instruction. Alternatively, the teller software running on the banking system can further require operator input from a bank employee or teller to complete the credit. Such operator input can include an operator credit command directly received by the banking system and/or the item processing system.

At block 616 the Bank receives a plurality of physical documents associated with the deposit transaction. The received plurality of physical documents are related to and/or correspond with the plurality of documents gathered by the Store for the deposit transaction. In some embodiments, the two pluralities of documents are identical. Yet, in some embodiments the two pluralities of documents are slightly different. For example, in some embodiments, the plurality of physical documents received at the Bank includes one or more additional documents, that is, unexpected documents. For another example, the plurality of physical documents received at the Bank is missing one or more documents, that is, no-show documents. For yet another example, the plurality of documents received at the Bank includes one or more unexpected document(s) and one or more no-show document(s).

At block 618 the plurality of physical documents received at the Bank for the deposit transaction are scanned using the bank document processing device to generate bank records and/or a bank data files 620 associated with the deposit transaction. Each one of the bank records can include a respective visually readable image of one of the plurality of physical documents, identifying information, and/or transactional information. At block 622 the financial institution system compares the bank records with the store records to determine if there are any no-show documents 624 and/or to determine if there are any unexpected documents. According to some embodiments, if the financial institution system determines there are one or more no-show documents, then the bank document processing system in communication with the banking system automatically charges-back the Store's bank account 626 an amount equal to a value of the no-show document(s).

According to some embodiments, if the financial institution system determines there are one or more no-show documents, then the bank document processing system automatically transmits a charge-back instruction or notice to the banking system and/or the item processing system. In some such embodiments, teller software running on the banking system can be configured to receive the charge-back instruction and automatically apply a charge-back or debit to the Store's bank account based on the charge-back instruction. Alternatively, the teller software running on the banking system can further require operator input from a bank employee or teller to complete the charge-back. Such operator input can include an operator charge-back command directly received by the banking system. According to some embodiments, the charge-back instruction is transmitted to the item processing system to process the charge-back instruction by debiting the customer's bank account.

According to some embodiments, if the financial institution system determines that one or more documents are unexpected documents, then according to some embodiments, the financial institution system automatically credits the customer's bank account an amount equal to a value of the unexpected document(s). According to other embodiments, if the financial institution system determines or detects one or more unexpected documents, then the bank document processing system automatically transmits a credit instruction or notice to the banking system and/or the item processing system. In some such embodiments, the banking system 460 can further require operator input from a bank employee or teller to complete a credit of the customer's bank account for an amount equal to the value of the unexpected document(s). According to some such embodiments, the credit instruction is transmitted to the item processing system, which is configured to process the credit instruction by debiting the customer's bank account.

After the charge-back 626 or if the financial institution system fails to determine a no-show document, the bank document processing system authenticates the received plurality of physical documents at block 628. As discussed above, authentication can include authentication by use of an authentication unit 145 and/or by use of a suspect database by comparing the identifying information in the records with data in the suspect database. According to some embodiments, at block 630, if the bank document processing system determines that one or more of the received documents are suspect, then the financial institution system automatically charges-back the customer bank account an amount equal to a value of the suspect document at block 632. If no documents are determined to be suspect (e.g., each document passes the tests of the authentication unit and/or comparison tests), then the method ends at block 634.

According to some embodiments, if the bank document processing system detects or determines a suspect document, then the bank document processing system automatically transmits a charge-back instruction or notice to the banking system. In some such embodiments, teller software running on the banking system can be configured to receive the charge-back instruction and automatically apply a charge-back or debit to the Store's bank account based on the charge-back instruction for the determined suspect document(s). Alternatively, the teller software running on the banking system can further require operator input from a bank employee or teller to complete the charge-back for the suspect document(s). Such operator input can include an operator charge-back command directly received by the banking system. According to some embodiments, the charge-back instruction or suspect notice is transmitted to the item processing system, which is configured to process the charge-back instruction or notice by debiting the customer's bank account the amount equal to the value of the suspect document(s).

Figure 7A:
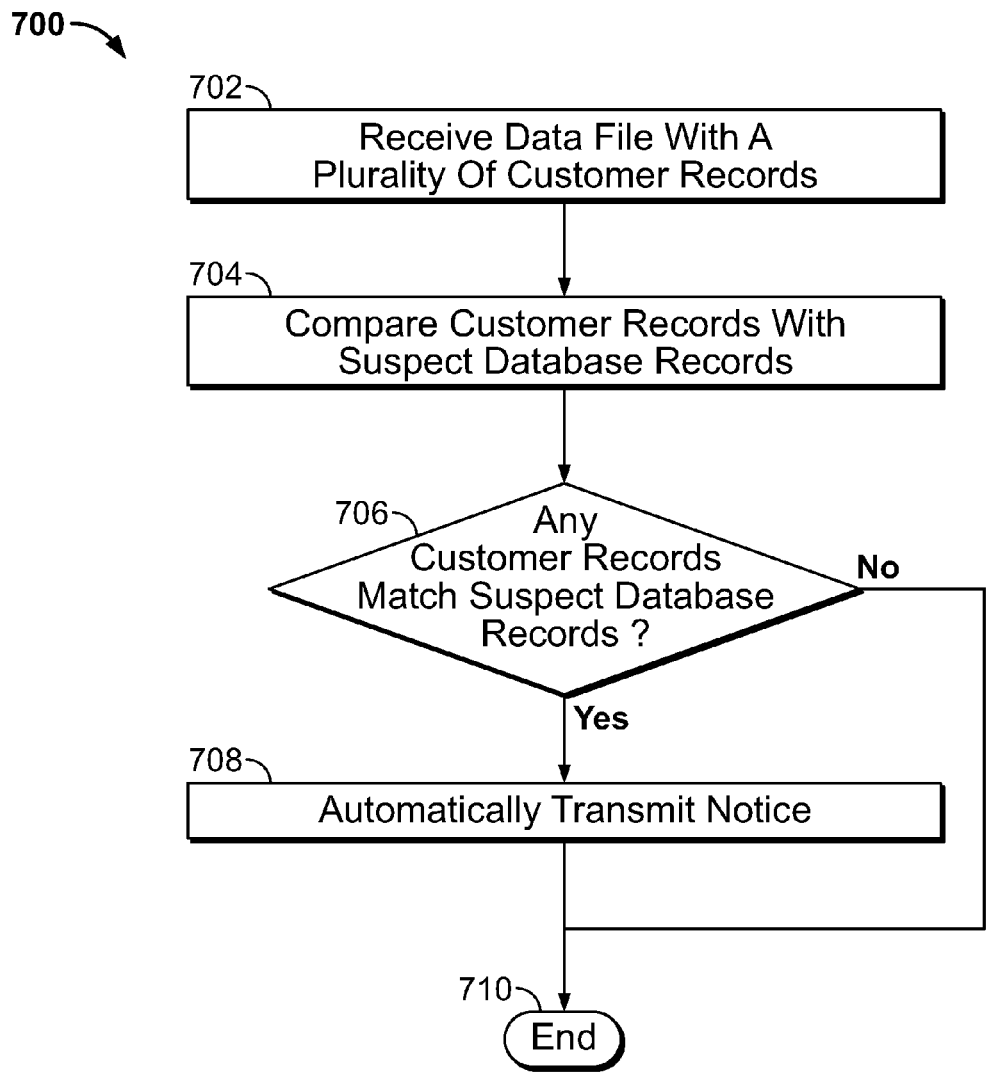
FIG. 7A is a flowchart describing the operation of a financial institution system according to some embodiments of the present disclosure.

Now turning to FIG. 7A, a method of processing documents 700 in a financial institution system according to some embodiments of the present disclosure is shown. At block 702, a financial institution system including a bank document processing system and a banking system, receives a data file (e.g., data file 301) including a plurality of records (e.g., records 300*a-d*, 305*a-h*) or customer records associated with a deposit transaction over a network from a customer, for example, a Store or a casino. According to some embodiments, the bank document processing system includes a bank document processing device and a bank computer communicatively connected thereto. According to other embodiments, the bank document processing system includes a bank document processing device.

Each of the records in the data file includes identifying information (e.g., a serial number, MICR characters) associated with a document such as, for example, a currency bill and/or a check. In some embodiments, each of the records includes a visually readable image of a document, one or more visually readable snippet images, or both. According to some embodiments, each record further includes a value, wherein the value corresponds to the respective visually readable image included in the same record. At block 704, according to some embodiments, the financial institution system compares the records against suspect database records to determine if one or more of the records is associated with a suspect record and/or a suspect document. According to some such embodiments, the financial institution system compares identifying information included in each record against data or information included in a suspect database. If the financial institution system determines that the identifying information included in one of the records matches or corresponds with data in the suspect database at block 706, then the bank document processing system (e.g., financial institution system 103) automatically transmits a notice to the Store (e.g., customer document processing system 102) at block 708, such as through network 420 shown in FIG. 4A. The notice may be called a suspect notice, a fraud notice, a charge-back notice, etc. The notice can be transmitted over the network to a Store document processing system, a Store document processing device, and/or a Store computer. According to some embodiments, the notice is made electronically available to the customer such that the customer can retrieve the notice if and/or when desired. According to some embodiments, the notice can include the record that matched the suspect record, information or data contained in the record, such as, identifying information, a visually readable image or a snippet image, etc., a deposit transaction identifier or a unique identifier, or any combination thereof. According to some embodiments, the notice is transmitted or otherwise made available to one or more third parties via a communicatively connected computer configured to store notices and/or related information. For example, the notices can be transmitted to the U.S. Federal Reserve and/or U.S. Secret Service for tracking purposes. If none of the identifying information associated with the records matches data or information in the suspect database at block 706, then the method 700 ends at block 710.

Figure 7B:
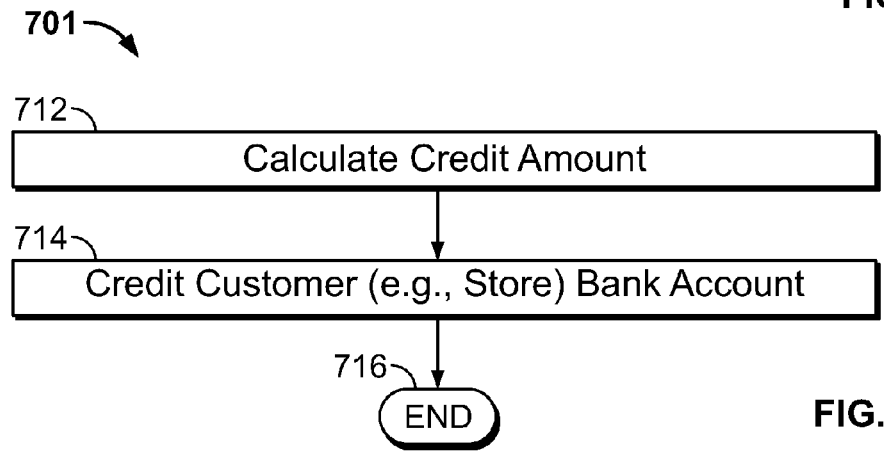
FIG. 7B is a flowchart describing a credit operation of some embodiments of the financial institution system of FIG. 7A.

Now turning to FIG. 7B, a credit operation 701 of some embodiments of the financial institution system of FIG. 7A is described. The credit operation 701 can be inserted after block 708 in the method 700 of FIG. 7A. At block 712, the financial institution system including the bank document processing system and the banking system, calculates a credit amount associated with the deposit transaction. According to some embodiments, the data file includes a virtual deposit slip and/or a visually readable image of a deposit slip, such as a preprinted deposit slip. In some such embodiments, the deposit slip includes one or more values, such as a total declared deposit value. According to some embodiments, the total declared value equals a sum of the values included in each record associated with the deposit transaction. According to some embodiments, the calculated credit is equal to the declared deposit amount included on the deposit slip. Alternatively, the calculated credit can be a percentage of and/or based on the declared deposit amount. According to some embodiments, the calculated credit is equal to the declared deposit amount minus the value included in any record determined to be associated with a suspect record and/or a suspect document. At block 714, according to some embodiments, the financial institution system automatically credits the Store's bank account for the calculated credit amount. After crediting the Store's bank account, the credit operation 701 ends at block 716.

According to some embodiments, at block 714, the bank document processing system automatically transmits a credit instruction or notice to the banking system and/or an item processing system. The credit instruction includes sufficient information or data to permit the banking system to appropriately credit the customer's bank account. For example, the credit instruction can include the data file, one or more of the records in the data file, the deposit slip or a visually readable image if the deposit slip, information regarding the deposit transaction, such as a transaction identifier, etc. In some such embodiments, teller software running on the banking system can be configured to receive the credit instruction and automatically apply a credit (e.g., a provisional credit and/or a final credit) to the customer's bank account based on the credit instruction. Alternatively, teller software running on the banking system can further require operator input from a bank employee or teller to complete the credit. Such operator input can include an operator credit command directly received by the banking system. According to some embodiments, the credit instruction is transmitted to an item processing system, such as the item processing system described above in reference to FIGS. 4A and 4B. In some such embodiments, the item processing system is configured to process the credit instruction by crediting the customer's bank account.

Figure 8A:
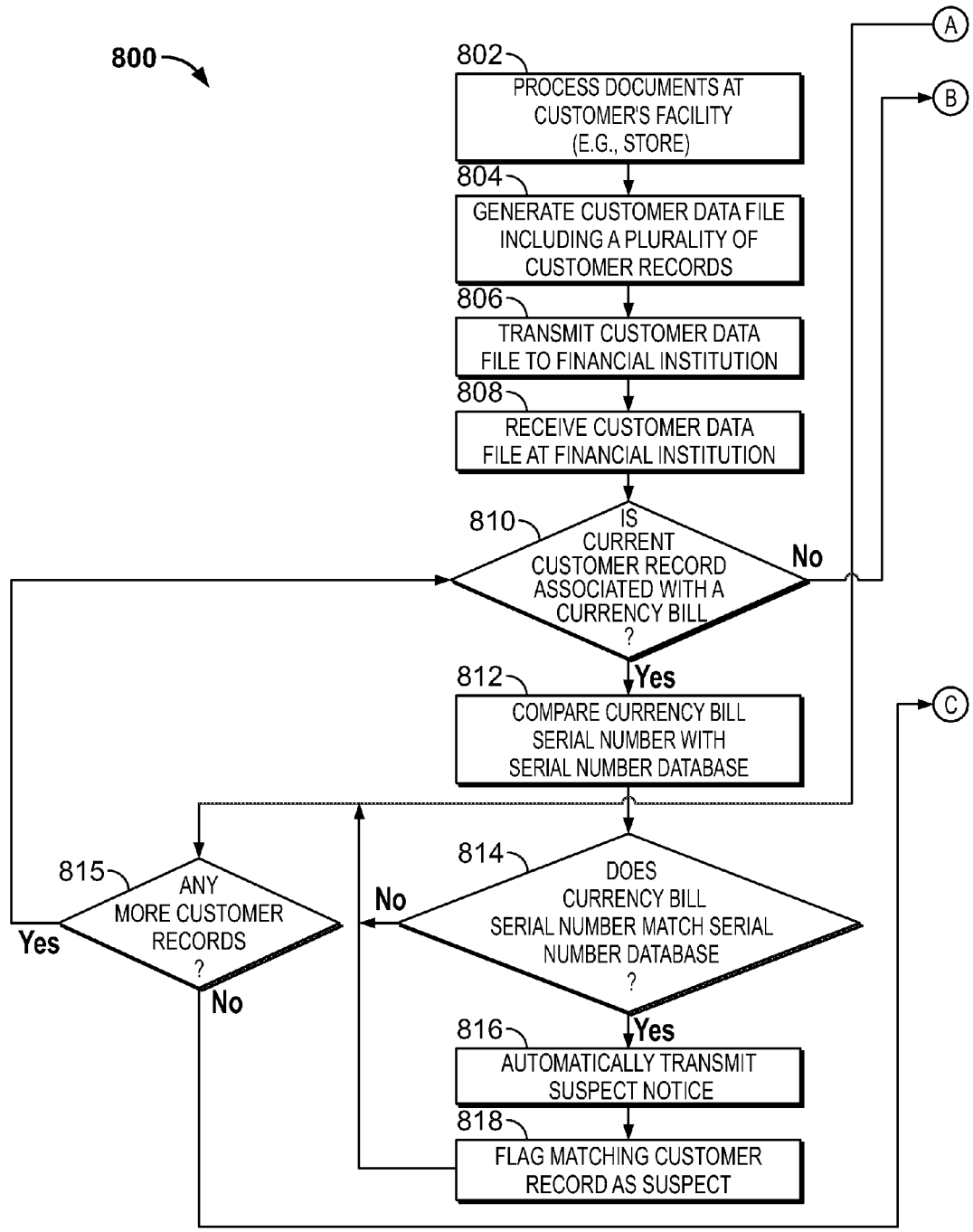
FIG. 8A is a flowchart describing the operation of a financial transaction system according to some embodiments of the present disclosure.
Figure 8B:
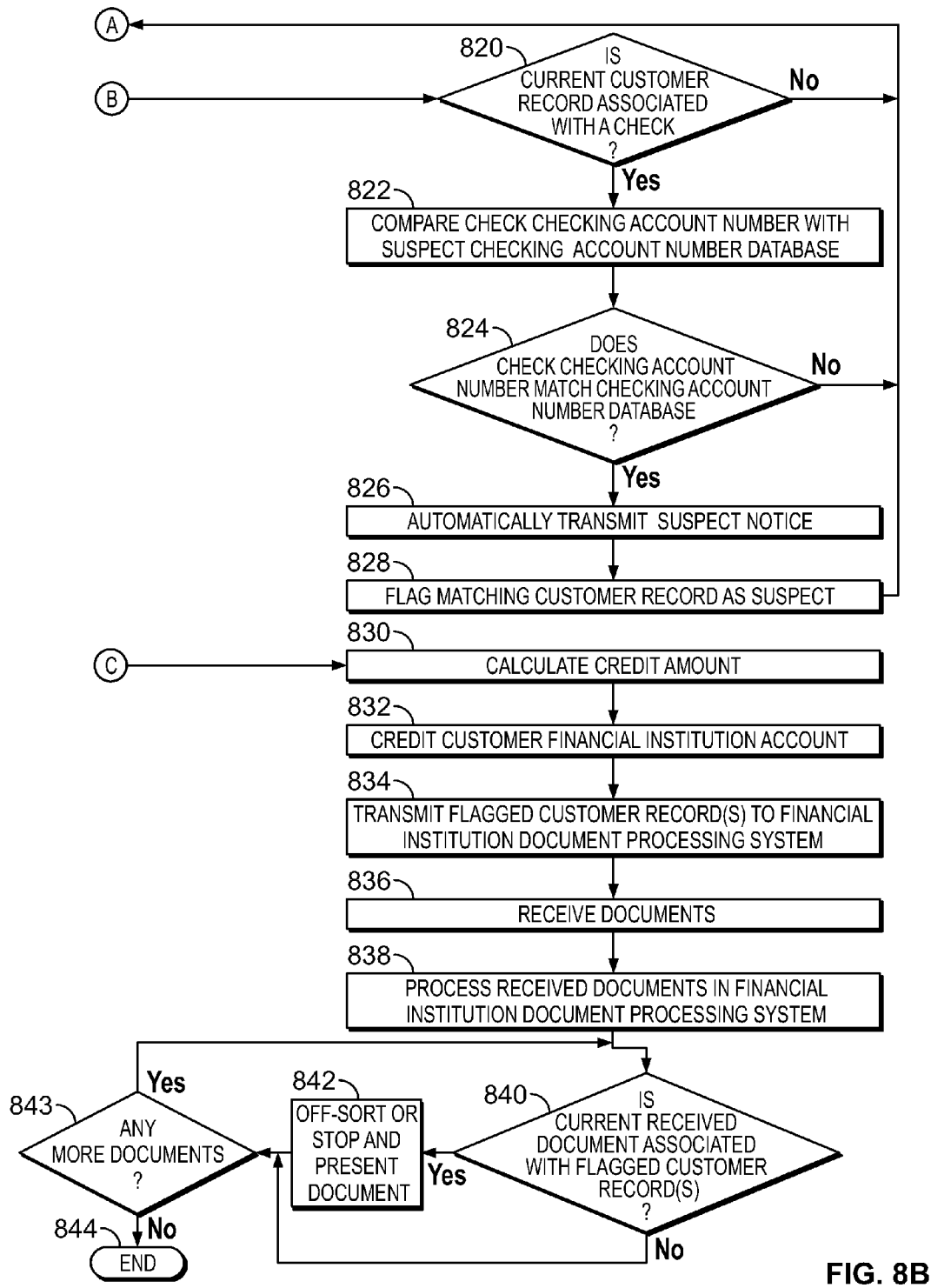
FIG. 8B is a continuation of the flowchart describing the operation of the financial transaction system of FIG. 8A.

Now turning to FIGS. 8A and 8B, a method 800 of processing documents in a financial transaction system, such as the financial transaction system 50, according to some embodiments of the present disclosure is shown. The financial transaction system includes a customer document processing system, such as the customer document processing system 102, a financial institution system, such as the financial institution system 103, and a network, such as the network 420. According to some embodiments, the customer document processing system includes a customer computer (e.g., the first computer 450a) and/or a customer document processing device (e.g., the document processing device 101a). According to some embodiments, the financial institution system includes a financial institution or bank document processing system and a banking system and/or accounting system (e.g., the banking system 460). According to some embodiments, the bank document processing system includes a bank document processing device (e.g., the bank document processing device 101b) communicatively connected to a bank computer (e.g., the bank computer 450b). According to some embodiments, the customer document processing system and the financial institution system are located remotely from each other, such as, for example, being in different buildings, different states, different countries, etc.

At block 802, a plurality of documents associated with a deposit transaction for deposit at a financial institution (e.g., the Bank) are processed by the customer document processing device at the Store. At block 804, a customer data file (e.g., the data file 436) associated with the deposit transaction is generated using the customer document processing system. The customer data file includes a plurality of customer records (e.g., the records 300a-d, 305a-h), wherein each customer record is associated with one of the documents. According to some embodiments, each of the customer records includes one or more visually readable images and/or visually readable snippet images and/or identifying information, such as described above in reference to FIGS. 3A-E. At block 806, the customer data file is transmitted from the customer document processing system over the network to the financial institution system 808 in a similar manner as described above in relation to FIGS. 4A and 7A. The customer data file is received and/or stored in a memory of the financial institution system, the bank computer, the banking system, and/or in an item processing system, which is communicatively connected to and/or resides within the banking system.

According to some embodiments, the financial institution system processes the received customer data file and determines which of the included customer records are associated with currency bills and which are associated with checks. For example, at block 810, the financial institution system determines if a current or specific customer record is associated with a currency bill. If the customer record is associated with a currency bill, then, at block 812, the financial institution system compares a serial number of the currency bill, that is included in the current customer record, against a suspect serial number database. The suspect serial number database can include a list of serial numbers known to be associated with counterfeit currency bills and/or other related information. According to some embodiments, a record including a serial number that matches one of the serial numbers in the suspect serial number database is referred to a suspect record.

If the financial institution system determines that the serial number of the currency bill matches one of the serial numbers in the suspect serial number database at block 814, then the financial institution system can automatically transmit a suspect notice to the Store at block 816, such as the notice described above in reference to FIG. 7A. That is, the financial institution system determined that one of the plurality of customer records is a suspect record and transmitted a notice to the customer to inform the customer of that determination. According to some embodiments, the bank document processing system and/or the banking system can be configured to transmit the suspect notice over the network to the customer document processing system. According to some embodiments, the suspect notice at least indicates to the Store that the financial institution system determined that the currency bill to be deposited is a suspect currency bill and that no credit will be applied to the Store's bank account for the currency bill. According to some embodiments, the financial institution system may only send suspect notices to the Store on a batch basis. For example, if the financial institution system determines a data file associated with a deposit transaction includes two or more records that are suspect records, then the financial institution system can be configured to send a single notice to the Store that indicates the determination of the two or more suspect records for the deposit transaction as described above.

According to some embodiment, in response to the financial institution system determining that a customer record is associated with a suspect currency bill, the financial institution system flags the current customer record as suspect at block 818. For example, the flagging can include visually marking an image of the currency bill determined to be suspect (e.g., overlaying graphics) in the customer record or otherwise indicating digitally, visually, or both that the customer record is associated with a suspect currency bill, such as, for example, by including a suspect notation or indication in an associated data field in the customer record. According to some embodiments, the current customer record is stored in the bank computer. Thus, according to some embodiments, flagged records can be stored in a memory of the bank computer. According to some embodiments, flagged records can be transmitted from the bank computer to any device or system within the financial institution system for processing and/or storage. If the financial institution system determines that the serial number of the currency bill does not match one of the serial numbers in the suspect serial number database at block 814 or after flagging a suspect customer record at block 818, the financial institution system determines if there are any more customer records in the customer data file associated with the deposit transaction at block 815. If there is another customer record, then the financial institution system determines if the next customer record is associated with a currency bill at block 810.

If the financial institution system determines that the next current or specific customer record is not associated with a currency bill at block 810, then at block 820, the financial institution system determines if the customer record is associated with a check. If the current customer record is associated with a check, then, at block 822, the financial institution system compares identifying information included in the customer record against data and/or information included in a suspect database. The identifying information can include a check account number, a check routing number, a check number, a drawer name, a drawee name, an endorser name, an address, a payee name, a legal amount, a courtesy amount, etc. The data included in the suspect database can correspond to any one of or any combination of the aforementioned identifying information included in the customer record. For example, the suspect database can include checking account numbers, routing numbers, and/or drawer names known to be tied to checking accounts associated with fraudulent activity. According to some embodiments, if the financial institution system determines that the identifying information included in the current record matches some of the data in the suspect database at block 824, then the financial institution system automatically transmits a fraud notice to the Store at block 826. According to some embodiments, the fraud notice at least indicates to the Store that the financial institution system determined that the check to be deposited is associated with fraudulent activity and no credit will be applied to the Store's bank account for the check.

According to some embodiment, in response to the financial institution system determining that a customer record is associated with a suspect check, the financial institution system flags the customer record as suspect or fraudulent at block 828 in the same or similar manner as described above. For example, the flagging can include visually marking an image of the check determined to be suspect (e.g., overlaying graphics) in the customer record or otherwise indicating digitally, visually, or both that the customer record is associated with a suspect check, such as, for example, by including a suspect notation or indication in an associated data field in the current record. According to some embodiments, the current record is stored in the bank computer. Thus, according to some embodiments, flagged records can be stored in a memory of the bank computer. According to some embodiments, flagged records can be transmitted from the bank computer to any device or system within the financial institution system for processing and/or storage.

If the financial institution system (1) determines that the current record is not associated with a check at block 820; (2) determines that the identifying information included in the currency record does not match data in the suspect database at block 824; or (3) after flagging a suspect customer record at block 828, then the financial institution system determines if there are any more customer records in the customer data file associated with the deposit transaction at block 815. If there is another customer record, then the financial institution system determines if the next current customer record is associated with a currency bill at block 810. If there are not anymore customer records, then the financial institution system calculates a deposit transaction credit amount at block 830.

According to some embodiments, the customer data file includes a deposit slip, such as the deposit slip described above, which at least includes a total declared deposit amount. According to some such embodiments, the deposit transaction credit amount is based on the total declared deposit amount. According to some embodiments, the deposit transaction credit amount is based on a sum of the values included in the customer records associated with the deposit transaction. According to some embodiments, the total declared deposit value equals the sum of the values included in the customer records, such as, when the deposit transaction is not associated with any suspect documents, any no-show documents, and/or any unexpected documents. In the case of a suspect document, a no-show document, and/or an unexpected document being included in the deposit transaction, values associated with each of such documents are included in the calculation of the credit amount. For example, the value associated with a suspect document and the value associated with a no-show document can each be subtracted from the total declared deposit amount and the value associated with an unexpected document can be added to the total declared deposit amount when calculating the deposit transaction credit amount.

For example, a deposit transaction includes a single data file that includes 100 records, where each record includes a value associated with a currency bill or a check to be deposited in to a bank account for a credit. The data file also includes a deposit slip that has a total declared deposit amount of $1000.00. If the sum of the values included in the records balances with the total declared deposit amount (e.g., a banking system and/or an item processing system determines that the total declared deposit amount is correct and does not need any offsetting credits and/or debits) and if one of the documents associated with the deposit transaction is a suspect check having a value of $250.00 and one of the documents associated with the deposit transaction is a no-show currency bill having a value of $50.00 and one of the documents associated with the deposit transaction is an unexpected currency bill having a value of $100.00, then the calculated credit is $1000.00−$250−$50.00+$100.00=$800.00. That is, the values of the suspect check and the no-show currency bill are subtracted and the value of the unexpected currency bill is added to the declared deposit amount to balance the deposit transaction.

According to some embodiments, the financial institution system automatically credits the Store's bank account in an amount equal to or a percentage of the calculated deposit transaction credit amount at block 832. According to other embodiments, the bank document processing system transmits a credit instruction or notice to the banking system. In some such embodiments, the banking system receives the credit instruction and automatically credits the Store's bank account based on the credit instruction. In other embodiments, the banking system requires additional operator input prior to crediting the Store's bank account. According to some embodiments, the financial institution system can credit the Store's bank account upon intervention by bank personnel, such as, by bank personnel providing a credit approval instruction to the banking system and/or teller software. According to some embodiments, the credit can be provisional and/or final. For example, the credit can be provisional for values in records associated with currency bills and final for values associated with checks. According to some embodiments, the credit instruction is transmitted to an item processing system, such as the item processing system described above in reference to FIGS. 4A and 4B. In some such embodiments, the item processing system is configured to process the credit instruction by crediting the customer's bank account.

At block 834 the flagged records are transmitted to and/or stored in a memory of the bank document processing system. At block 836 the bank document processing system receives a plurality of physical documents associated with the deposit transaction and processes the documents at block 838. The bank document processing system is configured to determine if a current one of the received documents is associated with one or more flagged records at block 840 by comparing records generated from the processed documents with the flagged records stored in the memory of the bank document processing system. If the bank document processing system finds a match, the corresponding document can be flagged such as by off-sorting the flagged document. Alternatively or additionally, the bank document processing system can flag the corresponding document by halting or stopping the transportation of documents and present the matching document (e.g., such as according to the stop-and-present mode of operation discussed herein) in an output receptacle of the bank document processing device for review by bank personnel such as the operator of the bank document processing system at block 842. According to some such embodiments, the document processing system can be configured to resume operation and/or transportation of additional documents after the flagged document has been handled such as by an operator of the bank document processing system such as by removing the flagged document from the output receptacle. After finding a match, the bank document processing system determines if there are any more documents associated with the deposit transaction to process at block 843. If there is another document, the bank document processing system determines if a next current received document is associated with one or more flagged records at block 840. If the bank document processing system does not match the document with a flagged record then the bank document processing system determines if there are any more documents associated with the deposit transaction to process at block 843. If no more documents are present, then the method ends at block 844.

Modes of Operation—Flagging

The document processing devices 101, 101' and the document processing devices 101*a,b* may be selectively programmed to operate in any of several operating modes and/or detect a plurality of error conditions as described in more detail in U.S. Pat. No. 6,311,819, which is hereby incorporated by reference herein in its entirety. Additionally as described in more detail in U.S. Pat. No. 6,311,819, the document processing devices 101, 101' and the document processing devices 101*a,b* may have set-up software designed to enable the operator to customize various operating parameters and engage or disengage various features of the discrimination system. The operating parameters may include, for example, default settings, stopping conditions, off-sort modes, pocket settings, denomination keys, stranger records or communications port settings. For example, a set-up mode may permit the user to identify which pocket is to receive no-calls, suspect documents, mis-faced and mis-oriented documents, strangers, denomination changes, doubles, and chains or other bills or documents causing other types of minor or major errors. This information may be retrieved from the user via a routing interface having a data retrieval device such as a touch-screen. Alternatively, the data retrieval device may be some other kind of input or input/output device such as a keypad, buttons, or switches Likewise, the set-up mode may permit the user to define which pockets are to receive which kinds of documents and whether the system should stop upon the occurrence of various events, for example, various minor errors. Information concerning whether the system should stop upon the occurrence of one or more of the above conditions may be retrieved from the user via a flagging control interface having a flagging data retrieval device such as a touch-screen. Alternatively, the flagging data retrieval device may be some other kind of input or input/output device such as a keypad, buttons, or switches. The flagging control interface may be combined with the routing interface Likewise the same touch-screen or input device may be used both to retrieve data concerning to which pockets various bills are to be directed as well as whether the system should stop upon the occurrence of one or more events such as the occurrence of one or more types of minor errors. The features of the discrimination system which may be engaged or disengaged in the set-up mode include operating modes, operating keys, subbatching, suspect document authentication tests, stranger records, separate series discrimination, and/or audio alarms.

As described above, according to embodiments of the present disclosure, the system permits the user or operator to customize the operation of the machine in a number of ways. For example, the user may be permitted to designate into which pocket or output receptacle certain bills are delivered and whether the machine should stop, for example, deliver any no calls into pocket number two and stop the machine after each no call is delivered to pocket number two. Additional examples of how the user may customize a system according to the present disclosure are described in connection with FIGS. 35-40 of U.S. Pat. No. 6,311,819 and FIG. 10 of the present disclosure. FIGS. 35-40 of U.S. Pat. No. 6,311,819 and FIG. 10 of the present disclosure illustrate examples of displays designed to aid the operator in tailoring the operation of the machine according to the operator's preferences. These figures illustrate displays that may be used to aid in retrieval of routing and flagging information from a user such as via a routing interface having a data retrieval device such as a touch-screen. Alternatively, the data retrieval device may be some other kind of input or input/output device such as a keypad. Additionally or alternatively, information concerning whether the system should stop upon the occurrence of one or more conditions may be retrieved from the user via a flagging control interface having a flagging data retrieval device such as a touch-screen. Alternatively, the flagging data retrieval device may be some other kind of input or input/output device such as a keypad. The flagging control interface may be combined with the routing interface into a single interface system.

Additionally, for strangers, strap limits, denomination changes, and separate series, the operator is also given the option of having the transport mechanism stopped with the flagged bill being maintained within the transport mechanism (ST) as described in connection with U.S. Pat. No. 6,311,819.

According to some embodiments, the document processing devices and/or systems of the present disclosure include a stranger record feature or stranger record mode. In response to the stranger record mode being ON, the device is configured to count strangers in a batch total. In response to the stranger record mode being OFF, the device is configured to not count strangers in a batch total. For example, a device processes a strap that supposedly includes one hundred U.S. five dollar bills. In fact, the strap includes ninety-nine U.S. five dollar bills and one U.S. twenty dollar bill. In response to the stranger record mode being ON, the device will return a strap amount of $515 (99×$5+1×$20). In response to the stranger record mode being OFF, the device will return a strap amount of $495 (99×$5).

According to some embodiments, a document processing device of the present disclosure flags documents and transports the flagged documents to an escrow holding receptacle. According to some embodiments, the escrowed documents can be re-run in the document processing device at a slower transporting speed and/or at a higher resolution. Additionally or alternatively, the escrowed documents can be re-run in the document processing device using different and/or more advanced OCR algorithms, denomination algorithms, etc. According to some embodiments, the escrow holding receptacle is a mid-stream holding area positioned adjacent a transport path of the document processing device and between an input receptacle and one or more output receptacles.

According to some embodiments, the document processing devices 101, 101' and the document processing devices 101a,b are each configured to permit an operator to choose to flag one or more types of error conditions according to a stop-and-present mode of operation, a run-and-present mode of operation, a tag only mode of operation, or a combination thereof. The following discussion regarding flagging of documents is described in reference to the document processing device 101; however, it is understood that the same description applies to the document processing device 101' and/or the document processing devices 101a,b, 400. According to some embodiments, the term "flagging" refers to the document processing device 101 recording or making an indication that a document has been flagged and/or causing a flagged document and/or image data that is reproducible as a visually readable image of a flagged document to be handled differently than documents and/or visually readable images of documents which have not been flagged. For example, according to some embodiments, the document processing device is configured to communicate the detection of a flagged document such as by alerting and/or notifying an operator of the document processing device 101 that a document satisfying one or more flag criteria has been detected. According to some embodiments, the document processing device is configured to notify an operator in real time that a flagged document has been detected via presentation of a visually readable image of a flagged document and/or a flag code on a display or input/output device such as the control panel 170 of the document processing device 101 and/or on a display remote from the document processing device (e.g., a display of a communicatively connected computer in a different room and/or location). According to other embodiments, the document processing device is configured, alternatively or additionally, to stop the transport mechanism 120 of the document processing device 101 in real time when a flagged document is detected and to physically present the flagged document in an output receptacle, such as output receptacle 130. According to some embodiments, the document processing device is configured, alternatively or additionally, to tag a data file or record (e.g., the data file 301 or the records 300a-d, 305a-h) associated with the flagged document such as by causing an appropriate flag code or other notation or marking to be tagged to and/or stored within a data file or record such as described above in reference to FIGS. 3A-E. For example, the document processing device may insert an appropriate code in flag code field 333' or 363'.

According to some embodiments, the document processing device includes a temporary holding area for receiving no call bills. According to some such embodiments, no call bills are held in the temporary holding area until an operator calls the denomination of the no call bills in the same, or similar, manner as described herein in connection with FIGS. 9A and 9B. According to some embodiments, in response to the operator calling the denomination of a bill in the temporary holding area, the transport mechanism transports the bill from the temporary holding area to an output receptacle of the document processing device.

According to some embodiments, the flag criteria can include, but are not limited to, a no-call denomination criterion (described in reference to FIGS. 9A and 9B), an extraction error-currency bill criterion such as a serial number extraction error criterion (described in reference to FIGS. 9C and 9D), an extraction error-check criterion such as a MICR line extraction error criterion, a suspect criterion (such as described in reference to FIGS. 11A and 11B in the Modes of Operation—Blacklist Section, and in other sections of the present disclosure), a doubles criterion, a stranger criterion, an overlap criterion, a fitness criterion, a soil criterion, and/or a serial number location criterion. Thus, according to some embodiments, satisfaction of one of these flag criteria can cause the document processing system 100 and/or device 101 to flag a document (e.g., currency bill, check) according to the stop-and-present mode of operation, the run-and-present mode of operation, or the tag only mode of operation.

According to some embodiments, documents that cannot be denominated with a predetermined level of confidence satisfy the no-call denomination criterion and can be flagged as a no-call error. According to some embodiments, currency bills with serial numbers that cannot be completely extracted with a predetermined level of confidence and/or currency bills with serial numbers in which an insufficient number of serial number characters can be extracted with a predetermined level of confidence (e.g., 9 or more of 11 serial number characters) satisfy the serial number extraction error criterion and can be flagged as a data extraction error. According to some embodiments, checks with MICR lines that cannot be completely extracted with a predetermined level of confidence and/or checks with MICR lines in which an insufficient number of MICR characters can be extracted with a predetermined level of confidence (e.g., 40 or more of 45 MICR characters) satisfy the MICR line extraction error criterion and can be flagged as a data extraction error. According to some embodiments, documents determined to be suspect satisfy the suspect error criterion and can be flagged as a suspect document. According to some embodiments, two or more documents stacked documents being transported on top of each other satisfy the doubles criterion and can be flagged as a doubles error. According to some embodiments, a document having a different denomination in a stack of documents expected to all have the same denomination satisfies the stranger criterion and can be flagged as a stranger. According to some embodiments, a document overlapping another document during transport satisfies the overlap criterion and can be flagged as an overlap error. According to some embodiments, the overlap criterion can be referred to as a chain error criterion. According to some embodiments, a document that fails a fitness test satisfies the fitness criterion and can be flagged as an unfit document. According to some embodiments, a document that fails a soil test satisfies the soil criterion and can be flagged as a soiled document. According to some embodiments, currency bills with serial numbers that cannot be located during OCR satisfy the serial number location criterion and can be flagged as a serial number location error. According to some embodiments, a one-half document satisfies the half-document criterion and can be flagged as a half document error. According to some such embodiments, one-half documents can be counted as legal tender. Alternatively, the document processing device can be configured to not count one-half documents.

According to some embodiments, a flag code is associated with a reason that a document was flagged. For example, for a document satisfying the no-call denomination criterion, the flag code can be "no-call denomination," which can be displayed adjacent to the visually readable image of the flagged document. For another example, for a document satisfying the extraction error-currency bill criterion, the flag code can be "extraction error" or "extraction error-currency bill."

According to some embodiments, a processor or controller, such as controller 150 of the document processing device 101, flags a document according to a stop-and-present mode or stop-and-present-physical-document mode by stopping or halting the transport mechanism 120 after the flagged document has been transported and delivered into an output receptacle, such as the output receptacle 130, that is, the flagged document is delivered to an output receptacle and the transport mechanism is stopped. According to some embodiments, the transport mechanism is stopped before documents following the flagged bill are transported into the output receptacle such that the flagged document is the last document transported into the output receptacle when the transport mechanism stops. According to some embodiments, a processor/controller, such as the controller 150, is configured to cause at least a portion of a visually readable image of the flagged document to be displayed on a display, such as the control panel 170 or other display device communicatively connected to the document processing system 100, as shown in FIGS. 9A-E.

According to some embodiments, a processor or controller of the document processing system flags a document according to a run-and-present mode or run-and-present-image mode by displaying at least a portion of a visually readable image of the flagged document on a display, such as the control panel 170 or other display device communicatively connected to the document processing system 100, without halting the transport mechanism 120 in response to the detection of the flagged document. Accordingly, in some embodiments of the run-and-present mode, the document processing system is configured to display at least a portion of a visually readable image of a flagged document on a display while simultaneously continuing the operation of the transport mechanism 120 allowing the document processing system to continue transporting and processing other documents from the input receptacle 110. That is, the transport mechanism 120 does not stop transporting documents upon the detection of a flagged document. According to some embodiments, flagging according to a run-and-present mode can increase document processing efficiency by minimizing and/or reducing the amount of time that the document processing system 100 is not transporting and/or processing documents. When a flagged document is detected, a visually readable image associated with the document is displayed on a display while the document processing system continues to process and transport subsequent documents.

Alternatively, according to some embodiments of the run-and-present mode, the transport mechanism 120 does not stop transporting documents upon the detection of a flagged document, but the document processing system does not display images associated with flagged documents until the document processing system has no more documents to process and has stopped for that reason. In such alternative embodiments, a stack of documents are placed in the input receptacle of the document processing system and the system transports all the documents in the stack to the one or more output receptacles of the system. Having no more documents to transport, the operation of the transport mechanism is suspended and the images associated with any flagged documents encountered in the stack are then displayed on a display, such as the control panel 170 of the document processing device 101.

According to some embodiments, when multiple flagged documents are detected within a batch and/or stack of documents being processed by a document processing system or device, visually readable images associated with the flagged documents are queued in a buffer or memory for sequential display on the display and/or the system may be configured to display visually readable images associated with multiple flagged documents simultaneously on the display. For example, the multiple flagged documents can be displayed as an array of thumbnail images.

According to some embodiments, a processor/controller such as the controller 150 of the document processing system 100 flags a document according to the tag only mode by tagging a data file or record associated with the flagged document such as by causing an appropriate flag code or other notation or marking to be tagged to and/or stored within a data file or record associated with the flagged document. Otherwise the document processing system continues to process subsequent documents and does not either halt the transport mechanism or display in real time a visually readable image associated with the flagged document. For example, when processing a plurality of currency bills using the document processing system 100 an operator might not desire to be notified in real time of each document and/or visually readable image of the document that satisfies a soil criterion. When a document satisfying a soil criteria is detected, the record or data file associated with that document may be tagged as described above such as by entering an appropriate indication in the record or data file such as by setting a soiled bit in a flag code field. By storing such information in the records or data files of documents, the records or data files can be later utilized as described elsewhere in the present disclosure. For example, the records or data files can be later searched for documents satisfying various criteria. Additionally or alternatively, previously processed documents can be re-run on the same or different document processing systems or devices which are configured to cull out (e.g., off-sort) documents based on information previously stored in the document records or data files.

According to some embodiments, data files or records associated with flagged documents may be tagged in a run-and-present mode and/or a stop-and-present mode in a manner similar to the tag only mode. For example, when a flagged document is detected, an appropriate flag code may be written into a data file or record associated with the flagged document and the document processing system can monitor the contents of one or more flag fields associated with the documents it is processing to decide how to handle each document. For example, if a suspect code or flag is associated with the data file or record for a document, the document processing system can handle the document according to how the system has been configured to handle suspect documents.

The above modes can be utilized with document processing systems and devices of the present disclosure having a single output receptacle or a plurality of output receptacles. When utilized with document processing systems and devices having a plurality of output receptacles, the document processing systems and devices can be configured to additionally sort documents into the plurality of output receptacles based on a variety of criteria including flagging criteria. For example, in a run-and-present mode or a tag only mode, the document processing system may be configured to off-sort or route a particular type of flagged document to a particular output receptacle while the document processing system continues to process subsequent documents without halting the transport mechanism. In a stop-and-present mode, the document processing system may be configured to off-sort or route a particular type of flagged document to a particular output receptacle and then halt the transport mechanism. Additional details about flagging, sorting, flagging interfaces, and routing interfaces can be found in U.S. Pat. No. 6,311,819, which is hereby incorporated by reference herein in its entirety.

According to some embodiments, in response to the document processing devices and/or systems of the present disclosure determining that a document fails a fitness criterion (e.g., an unfit bill)—that is, for example, a device determines that a document is unfit—the device and/or system is configured to flag the document according to the stop-and-present mode of operation. That is, the device/system displays a visually readable image of the unfit bill on, for example, the control panel 170 or other display device communicatively connected to the document processing system 100, and stops the transportation of documents such that the unfit bill is located at a predetermined location such as the last bill delivered to the output receptacle. According to some embodiments, in response to receiving a fitness determination (confirmation or rejection) input from an operator to either confirm or reject the device's fitness determination of the unfit bill, the device is configured to restart and/or resume the transportation of documents. According to some embodiments, prior to resuming operation, the device/system prompts the operator to remove the document from the output receptacle if the operator indicated that he/she agreed with the device's unfit determination.

According to some embodiments, the document processing system is configured to display at least a portion of a visually readable image of select-types of flagged documents on a display while simultaneously continuing the operation of the transport mechanism 120 allowing the document processing system to continue transporting and processing other documents from the input receptacle 110. According to some such embodiments, the unselected-types of flagged documents are flagged according to the stop-and-present mode. Such flagging of select-types of flagged documents according to the run-and-present mode and flagging of unselected-types of flagged documents according to the stop-and-present mode can be referred to as a modified-continuous-run mode. For example, in a device operating in a modified-continuous-run mode, documents satisfying a no-call denomination criterion and a data extraction error criterion are flagged according to the run-and-present mode and document satisfying a doubles criterion are flagged according to the stop-and-present mode.

Figure 9A:
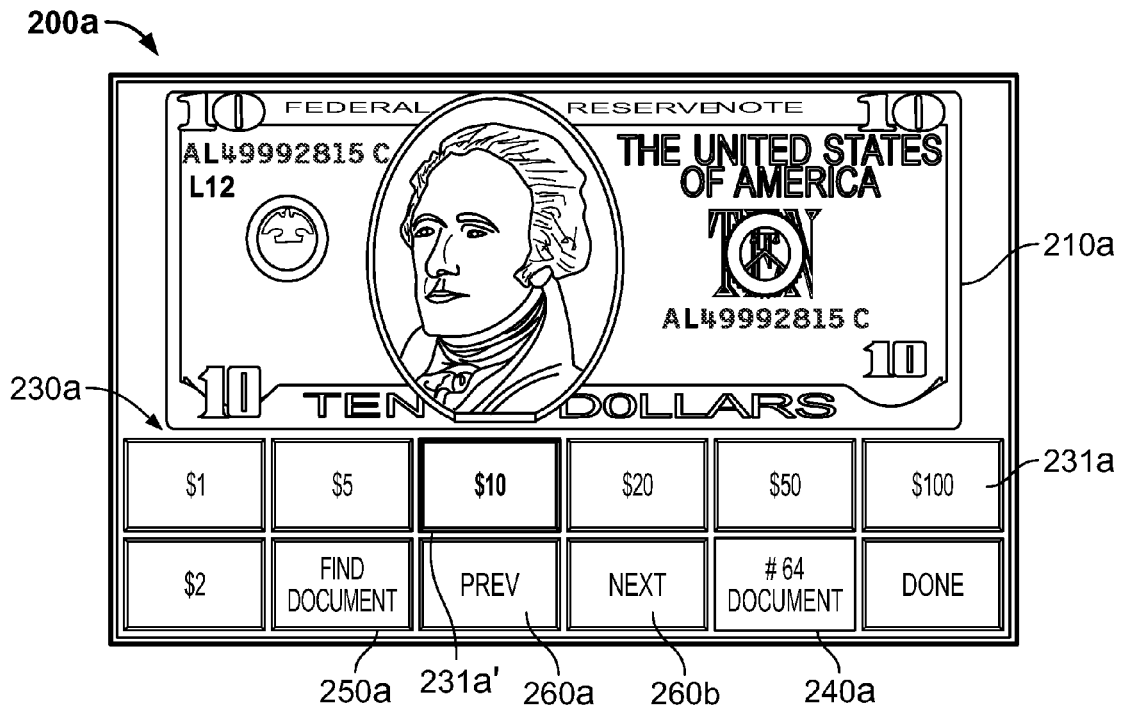
FIG. 9A is a representation of an interface for entering denomination information for a flagged document according to some embodiments of the present disclosure.

Now referring to FIG. 9A, a representation of an interface 200a for entering denomination information of a flagged no-call denomination document is shown according to some embodiments. According to some embodiments, a no-call denomination document is a currency bill (as shown in FIG. 9A) that the document processing system 100 failed to denominate (e.g., a currency bill whose denomination could not be called or determined by the controller 150). In some such embodiments, the controller 150 is configured to flag a no-call denomination currency bill to an operator of the document processing system 100 according to a designated mode of operation, such as, for example, the run-and-present mode or the stop-and-present mode. As described above, according to the run-and-present mode and/or the stop-and-present mode, the document processing system 100 can be configured to display a visually readable image 210a of the flagged no-call denomination document on the interface 200a to indicate to the operator that the controller 150 could not call or determine the denomination of the currency bill. According to some embodiments, the document processing system 100 can be configured to display the visually readable image 210a to flag the currency bill as satisfying any one or more other flag criteria, such as, for example, the extraction error-currency bill criterion such as a serial number extraction error criterion (described in reference to FIGS. 9C-9E), the extraction error-check criterion such as a MICR line extraction error criterion, the suspect criterion (described in reference to FIGS. 11A and 11B in the Modes of Operation—Blacklist Section, and in other sections of the present disclosure), the doubles criterion, the overlap criterion, the fitness criterion, and/or the soil criterion. According to some embodiments, the interface 200a is the control panel 170 or a local display device, such as, for example, a touch screen display of the document processing system 100. According to some embodiments, the interface 200a is a remote display device communicatively connected to the document processing system 100.

For some of the embodiments, flagging the currency bill as a no-call denomination currency bill, as shown in FIG. 9A, the interface 200a further includes a plurality of denomination keys or denomination elements or denomination selection elements 230a that are each associated with a distinct denomination. For example, a $100 denomination element 231a is associated with the $100 denomination, etc. In the illustrated embodiment, the denomination selection elements 230a are touch screen buttons or softkeys configured to be activated by touch and/or selection by an operator. According to some embodiments, these denomination selection elements 230a are employed in conjunction with different operating modes such as the stop-and-present mode and the run-and-present mode.

According to some embodiments, the operator reviews the visually readable image 210a via the interface 200a and determines the proper denomination selection element to activate. The operator can then activate one of the plurality of denomination selection elements 230a to cause the controller 150 to associate the distinct denomination of the activated or selected denomination selection element (e.g., $10 denomination selection element 231a') with the visually readable image 210a displayed on the interface 200a and/or the corresponding data file or record. For example, the operator could activate or select the $10 denomination selection element 231a' to call the flagged no-call denomination currency bill as a ten dollar currency bill. According to some embodiments, such a selection causes the controller 150 to update and/or edit a record associated with the no-call denomination currency bill to indicate the denomination as a ten dollar denomination. According to some embodiments, the activation and/or selection of the $10 denomination element 231a' causes the document processing system 100 to store the visually readable image 210a and the associated distinct denomination in the memory 160 and/or a memory communicatively connected to the document processing system 100. According to some alternative embodiments, the document processing system 100 can include other means for indicating or calling the denomination of a no-call denomination currency bill, such as, for example, denomination push-buttons located on a housing (e.g., the housing 190) of the document processing system 100. According to other embodiments, the interface 200a and/or denomination selection elements and/or other selection elements take different forms such as a non-touchscreen display and physical buttons or keys as described in more detail in U.S. Pat. No. 5,790,697, which is hereby incorporated by reference herein in its entirety. Furthermore, the operation of denomination selection elements and devices employing denomination selection elements including the use of denomination selection elements to increment appropriate counters keeping track of the denominations of bills processed and totals of bills processed are also described in more detail in U.S. Pat. No. 5,790,697.

According to some embodiments, the document processing system 100 denominates currency bills by analyzing image data that is reproducible as visually readable images generated by one or more image scanners, such as the image scanner(s) 140a and/or 140b, to attempt to call or determine a denomination for each currency bill being processed. According to some such embodiments, the document processing system compares the image data that is reproducible as a visually readable image 210a or portions thereof or a lower resolution thereof with a set of master denomination patterns and/or master denomination image data. According to some embodiments, a processor or controller, such as the controller 150, calls the denomination of the currency bill according to a denomination associated with one of the master denomination patterns that most closely corresponds to and/or matches the image data that is reproducible as the visually readable image 210a or portion thereof. Thus, according to some embodiments, the controller 150 is configured to denominate currency bills based on the image data generated by the one or more image scanners. According to some such embodiments, the controller 150 calculates or determines a confidence level associated with the denomination call or determination by the processor/controller. According to some embodiments, if the calculated confidence level is less than a predetermined threshold (e.g., about 95% confident, about 85% confident, about 60% confident), the processor/controller disregards the denomination determination and flags the currency bill as a no-call denomination currency bill according to, for example, the run-and-present mode of operation. According to some embodiments, the document processing system denominates bills based on the scanned images of the currency bills in a manner similar to that described in U.S. Pat. No. 5,295,196, which is hereby incorporated herein by reference in its entirety. According to other embodiments, different denominating sensors and techniques known to those skilled in the art may be employed such as those used in commercially available currency bill denominating devices or as described in, for example, U.S. Pat. No. 5,295,196.

According to some embodiments, as described in more detail in U.S. Pat. No. 5,790,697, which is incorporated by reference above, where the document processing system or device does not call the denomination of a currency bill, the document processing system or device may be configured to prompt or suggest a denomination such as by causing one of the plurality of denomination selection elements 230a to be highlighted. For example, as shown in FIG. 9A, the $10 denomination element 231a' is highlighted to indicate to the operator that the document processing system 100 has determined that the visually readable image 210a is most likely a ten dollar currency bill even though the document processing system was not able to determine the denomination of the currency bill with enough confidence to actually call the denomination of the currency bill. According to some embodiments, the operator can review the visually readable image 210a of the flagged currency bill and activate or select the highlighted $10 denomination selection element 231a' as described above.

According to some embodiments, the document processing system 100 includes a denomination accept element and/or button (not shown) that the operator can activate or select when the operator is in agreement with the prompted or suggested denomination. Such a denomination accept element can be positioned on and/or with respect to the document processing system 100 such that the operator can activate the denomination accept element with minimal effort and movement. Thus, the denomination accept element can be displayed as a softkey on the interface 200a, as a push-button positioned within the housing of the document processing device 101, and/or as a push-button or softkey communicatively connected to the document processing system 100. According to some embodiments, the denomination accept element can increase overall document processing efficiency.

As discussed above, according to some embodiments, when the document processing system 100 fails to call or determine the denominations of a plurality of currency bills being processed (no-call denomination currency bills), the document processing system 100 is configured to display a visually readable image of each no-call denomination currency bill—according to the run-and-present and/or the stop-and-present modes of operation—sequentially on the control panel 170 or other display device of the document processing system 100. For example, the visually readable images can be displayed in an order corresponding to the order in which the no call denomination currency bills were transported from the input receptacle 110. In response to an operator making a denomination determination corresponding to a first one of the no-call denomination currency bills via one of the plurality of denomination selection elements 230a, the document processing system 100 is configured to remove the visually readable image of the first one of the no-call denomination currency bills from the interface 200a and to display a visually readable image of a second one of the no-call denomination currency bills on the interface 200a. According to some embodiments, the document processing system 100 is configured to flag no-call denomination currency bills according to a run-and-present mode of operation and in response to an operator calling a denomination of the first one of the no-call denomination currency bills, as described above, the document processing system 100 is configured to flag the second no-call denomination currency bill while simultaneously continuing to transport other currency bills and/or other documents. As described above, according to some embodiments of a run-and-present mode of operation, the display of visually readable images of no-call currency bills or flagged documents does not begin until the document processing system has finished transporting the documents in a batch to one or more output receptacles.

According to some embodiments, when the document processing system 100 fails to call or determine the denomination of currency bills being processed (no-call denomination currency bills), the document processing system 100 is configured to add the records for the corresponding documents to a queue. Then, as described above, the system 100 can display the visually readable image of each no-call denomination currency bill—according to the run-and-present and/or the stop-and-present modes of operation—on the control panel 170 or other display device of the document processing system 100 to permit the operator to enter the denomination of each no call bill. According to some embodiments, the system 100 (1) sequentially displays the visually readable image of each no-call denomination currency bill; (2) receives input from the operator as to the denomination of each bill whose image is displayed; and (3) permits the operator to work through the queue until no more records remain in the queue. According to some embodiments, the operator can move between or scroll through visually readable images of no-call denomination currency bills using a previous element 260a and a next element 260b. According to some embodiments, the system 100 is configured to simultaneously display multiple visually readable images of multiple no-call denomination currency bills and comprises an interface which permits the operator to select one of the displayed images and select a denomination selection element for the selected image thereby associating the denomination corresponding to the selected denomination select element with the record of the selected image.

According to some embodiments, in response to the document processing system 100 failing to call or determine the denomination of a currency bill (no call denomination bill), the document processing system 100 is configured to display a visually readable image of the no-call denomination currency bill according to the stop-and-present mode of operation. That is, the device displays the visually readable image on, for example, the control panel 170 or other display device communicatively connected to the document processing system 100, and stops the transportation of documents such that the no call denomination bill is located at a predetermined position such as the last bill delivered to the output receptacle. According to some embodiments, in response to receiving a denomination input from an operator to call the denomination of the no call denomination bill as described herein, the device is configured to restart and/or resume the transportation of documents.

According to some embodiments, the document processing system 100 includes exactly two output receptacles 130. One of the output receptacles is a reject receptacle for receiving currency bills and/or other documents that satisfy one or more of the flag criteria. According to some embodiments, the document processing system 100 is configured to flag no-call denomination currency bills according to the run-and-present mode of operation and to off-sort or transport the flagged currency bill to the reject receptacle. According to some such embodiments, an operator can review the visually readable image of the flagged currency bill on the control panel 170 and/or review the physical currency bill by viewing the flagged currency bill in the reject receptacle or after removing the flagged document from the reject receptacle. As the reject receptacle may have significantly fewer documents than the primary or other output receptacle 130, finding a no-call denomination currency bill of interest can be more efficient than having to find the no-call denomination currency bill in the primary output receptacle.

According to some embodiments, the interface 200a may include a positional locator 240a, as shown in FIG. 9A. According to some embodiments, the document processing system 100 includes exactly one output receptacle 130 and the positional locator 240a is displayed to the operator to indicate an exact or approximate position of a flagged document or document of interest in the output receptacle 130. According to some embodiments, the positional locator is a sequential number that corresponds to an order in which a flagged document was transported and processed by the document processing system 100 and/or the order in which the flagged document resides in the output receptacle. For example, the positional locator may indicate the location of the flagged document of interest in a stack of documents residing in the output receptacle, such as, for example, the third document from the top of the stack or the twentieth document from the bottom of the stack. Such a feature can aid the operator in physically locating the flagged document or document of interest within the output receptacle 130. For example, the operator may want to review the physical currency bill if the visually readable image of the currency bill is distorted or otherwise unreadable. Various other reasons for reviewing the physical document are contemplated. As shown in FIG. 9A, the positional locator 240a indicates that the flagged currency bill is the 64th document in the output receptacle. Thus, the operator can remove any documents in the output receptacle 130 and manually locate about the 64th document from the bottom of the stack. According to other embodiments, the document processing system 100 includes two or more output receptacles 130 and the positional locator can indicate an output receptacle identifier (e.g., output receptacle #2) and respective position within that output receptacle of the flagged document or document of interest.

According to some embodiments, the interface 200a may include a Find Document element 250a, as shown in FIG. 9A. According to some embodiments, the Find Document element 250a is displayed adjacent to the visually readable image 210a of the flagged currency bill. The Find Document element 250a can be activated or selected by the operator of the document processing system 100, such as, for example, by touching, pushing, and/or choosing the find document element, when the operator desires to physically retrieve the flagged currency bill without having to manually look or count through a stack of processed documents transported to an output receptacle, such as the output receptacle 130' of the document processing device 101'. In response to the operator selecting or activating the Find Document element 250a, a processor or controller, such as controller 150, associates identifying information associated with the displayed flagged currency bill image 210a and/or associates the document associated with the displayed flagged currency bill image 210a with a find document criteria. A document whose image was displayed when the Find Document element 250a was selected or activated is referred to as a Find Document. According to some embodiments, in response to the operator selecting or activating the Find Document element 250a, the controller 150 adds identifying information associated with the displayed flagged currency bill image 210a to a list such as a Find Document list and/or queue in a memory such as memory 160 of the document processing system 100. According to some embodiments, the identifying information can include a serial number of the find document and/or a denomination of the find document. According to some embodiments, the identifying information includes a positional location of the find document in the stack of documents. According to some embodiments, in response to the operator selecting or activating the Find Document element 250a, the controller 150 stores a Find Document instruction in the memory 160. According to some embodiments, in response to the operator selecting or activating the Find Document element 250a, the controller 150 tags a record or data file associated with the displayed flagged currency bill image 210a as described above such as by entering an appropriate indication in the record or data file such as by setting a Find Document bit in a flag code field.

According to some embodiments, after a stack or batch of documents has been initially processed by the document processing system and the Find Document element has been selected or activated in connection with the images of one or more documents in the stack or batch, the stack or batch of documents having one or more Find Documents can be re-run by a document processing system, such as the document processing system 100, or a document processing device, such as the document processing devices 101, 101', 101a,b in a Find Mode. In the Find Mode, the document processing system or device is configured to stop-and-present, off-sort, and/or otherwise separate Find Documents in the stack from other documents in the stack. For example, according to some embodiments, when a batch of documents is processed in Find Mode, the controller is configured to automatically stop the transport mechanism 120 upon detecting each Find Document such that each Find Document is the last document transported to an output receptacle of the document processing system or device. After stopping on a Find Document, the operator can remove the Find Document from the output receptacle. The document processing system or device can be configured to automatically resume operation when the Find Document is removed or all documents are removed from the output receptacle or to resume in response to the selection of a Continuation element as discussed in more detail in the above referenced and incorporated U.S. Pat. No. 5,790,697. Thus, in these embodiments, the document processing system or device actively searches for Find Documents in a subsequent batch of documents and flags the Find Documents according to a stop-and-present mode of operation wherein the flagging criterion is a document being a Find Document. According to some such embodiments, the document processing system or device includes exactly one output receptacle, such as the document processing device 101'. According to some other such embodiments, the document processing device comprises a plurality of output receptacles. According to some embodiments, in response to operating in a Find Mode, the document processing system or device assumes that a find document is in the stack of documents being processed.

According to some embodiments, in response to the document processing device operating in the Find Mode, the device images each currency bill, extracts a serial number from image data associated with each currency bill, denominates each currency bill, and compares the extracted serial numbers and/or associated denominations with the serial numbers and/or denominations of the currency bills in the find document list and/or queue. That is, the device can be configured to locate find document(s) in a batch of currency bills based on a serial number and/or denomination comparison.

According to some alternative embodiments, the device can be configured to locate find document(s) based on the find document's position in a stack of documents being processed. For example, a positional location of a find document is stored in the find document list and/or queue. In such embodiments, in response to re-running the batch to find the find document, the device counts the documents and stops on or off-sorts the document in the stack that corresponds to the positional location of the find document.

When the Find Mode is employed with a document processing system or device according to the present disclosure having a plurality of output receptacles, the document processing system or device can be configured to send or off-sort Find Documents to a first set of one or more output receptacles different or distinct from a second set of one or more output receptacles to which the document processing system or device is configured to send non-Find Documents. According to some such embodiments, the document processing system or device is configured to stop-and-present each detected Find Document in one or more of the output receptacles. Alternatively, according to some such embodiments, the document processing system or device is configured not to halt upon detecting Find Documents.

While the embodiments described above are in reference to the flagged currency bill and the visually readable image 210*a*, it is understood that the same or similar features are contemplated for other types of documents processed by the document processing system or device including checks.

Figure 9B:
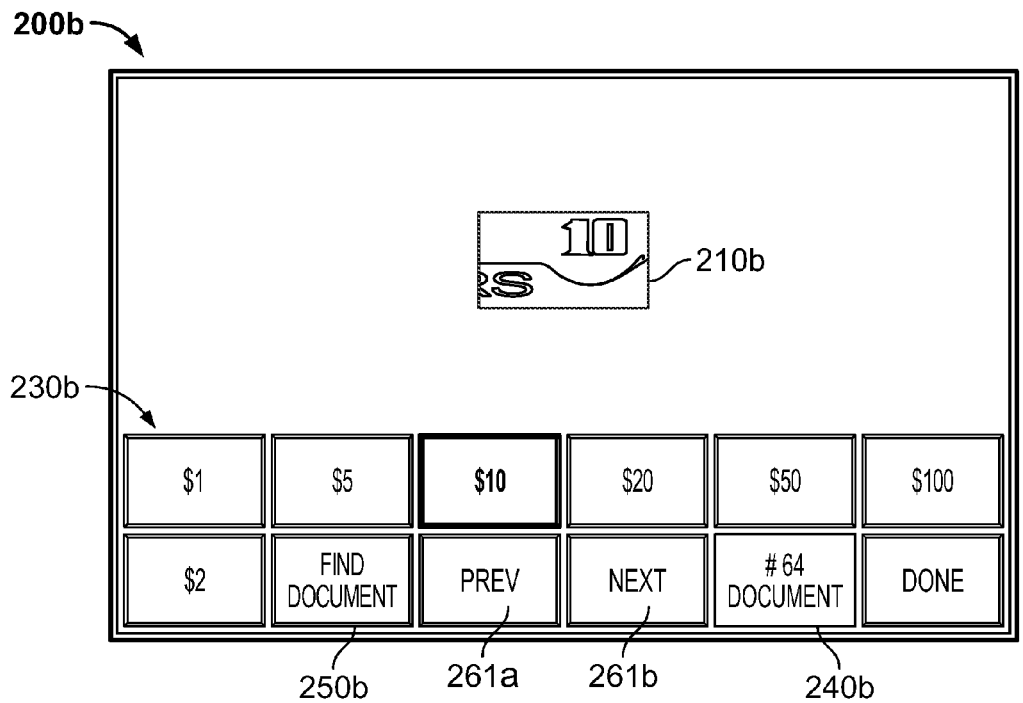
FIG. 9B is a representation of an interface for entering denomination information for a flagged document according to some embodiments of the present disclosure.

Now referring to FIG. 9B, a representation of an interface 200*b* for entering denomination information of a flagged no-call denomination document is shown according to some embodiments. According to some embodiments, the interface 200*b* is the same as the interface 200*a*, but instead of the visually readable image 210*a* being of the entire flagged currency bill, a visually readable denomination snippet image 210*b* is displayed. Thus, according to some embodiments, the interface 200*b* includes a plurality of denomination selection elements 230*b*, a positional locator 240*b*, a Find Document element 250*b*, and previous and next elements 261*a,b*, where each are the same as the plurality of denomination selection elements 230*a*, the positional locator 240*a*, the Find Document element 250*a*, and the previous and next elements 260*a, b*, respectively. According to some embodiments, capturing and displaying the denomination snippet image allows the document processing system 100 to process documents more efficiently due to the overall smaller amount of data being manipulated and/or stored in the memory 160, as compared to the embodiments described above in relation to FIG. 9A.

Figure 9C:
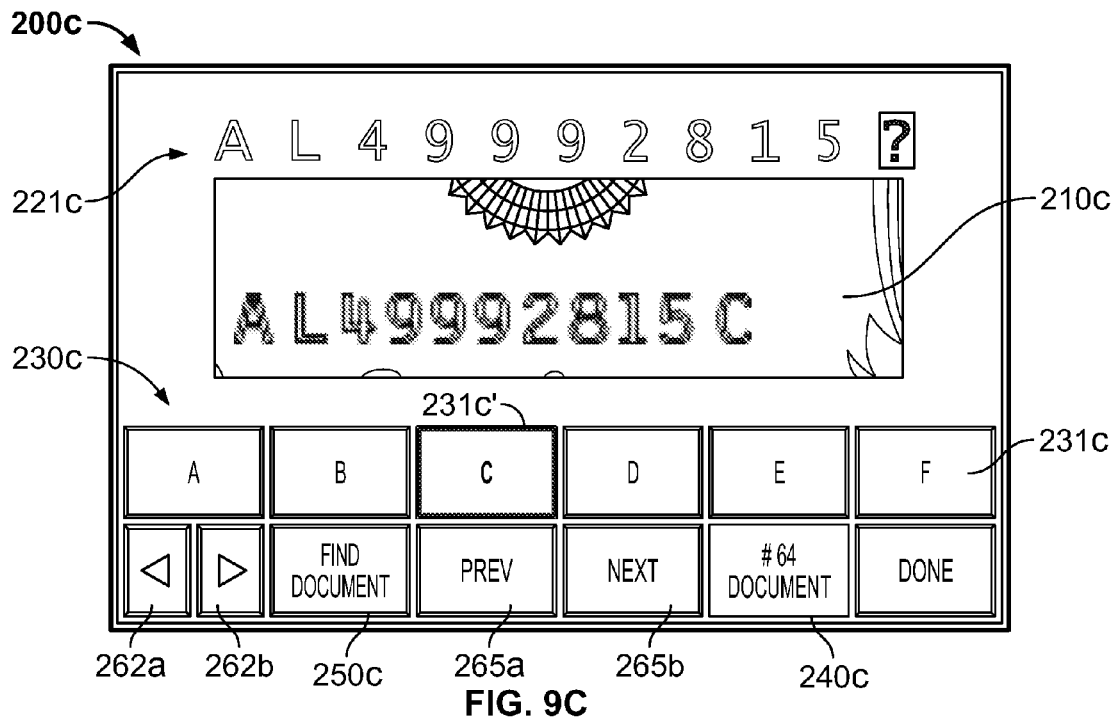
FIG. 9C is a representation of an interface for entering alphanumeric character information for a flagged document according to some embodiments of the present disclosure.

Now referring to FIG. 9C, a representation is shown of an interface 200*c* for entering unextracted identifying information or data for a document flagged because of an error that occurred during the process of extracting information or data from a visually readable image associated with the document. Documents flagged on this basis are referred to as Data Extraction Error Documents. According to some embodiments, the document processing system 100 is configured to use OCR software such as described above in, for example, the Optical Character Recognition Section, and in other sections of the present disclosure, to extract identifying information from image data that is reproducible as visually readable images generated by the image scanner(s) 140*a* and/or 140*b*. According to some such embodiments, in response to the document processing system 100 failing to extract a complete set of the identifying information for a document, such as, for example, extracted characters and/or failing to do so with a predetermined level of confidence, a processor or controller, such as the controller 150, is configured to flag the document as a Data Extraction Error Document by displaying at least a portion of a visually readable image of the Data Extraction Error Document on the interface 200*c*.

According to some embodiments, the Data Extraction Error Document is a currency bill, as shown in FIG. 9C, and a complete set of extracted identifying information is a currency bill serial number. For example, for U.S. currency bills a complete set of an extracted serial number would have ten or eleven characters depending on the series of the currency bill. According to some such embodiments, the at least a portion of the visually readable image of the Data Extraction Error Document displayed on the interface 200*c* is a serial number snippet image 210*c*, a denomination snippet image, a complete visually readable image of one or both sides of the flagged currency bill document, or a combination thereof.

According to some embodiments, a Data Extraction Error Document is a currency bill (as shown in FIG. 9C) that the document processing system 100 fails to completely and/or correctly OCR, that is, a processor or controller such as the controller 150 could not extract or determine one or more of the alphanumeric characters of the serial number of the currency bill. According to some embodiments, the controller 150 is configured to flag the Data Extraction Error Document to an operator of the document processing system 100 according to one of the modes of operation, such as, for example, the run-and-present mode. As described above, according to the run-and-present mode and/or the stop-and-present mode, the document processing system 100 can be configured to display the visually readable image 210*c* of the flagged Data Extraction Error Document on the interface 200*c* to indicate to the operator that the controller 150 could not extract or determine one or more of the alphanumeric characters of the currency bill serial number. According to some embodiments, the interface 200c is the same as, or similar to, the interface 200a.

For some of the embodiments flagging a currency bill as a Data Extraction Error Document, as shown in FIG. 9C, the interface 200c further includes a plurality of alphanumeric character elements 230c that are each associated with a distinct alphanumeric character. For example, an "F" alphanumeric character element 231c is associated with the F alphanumeric character, etc. In the illustrated embodiment, the alphanumeric character elements 230c are touch screen buttons or softkeys configured to be selected or activated by touch or selection of an operator. According to some embodiments, the interface 200c further includes an incomplete set of extracted identifying information 221c. The incomplete set of extracted identifying information 221c includes a plurality of alphanumeric characters extracted from the visually readable image 210c of the flagged Data Extraction Error Document and one or more placeholder characters. According to some embodiments, the placeholder characters can be a question mark "?," a percent symbol, "%," or other symbol to indicate a position of a missing alphanumeric character to be inputted by the operator via activation or selection of one of the plurality of alphanumeric character elements 230c, such as, for example, by touching, pushing, and/or choosing one of the alphanumeric character elements.

According to some embodiments, the operator reviews the visually readable image 210c and the incomplete set of extracted identifying information 221c via the interface 200c and determines the proper alphanumeric character element to activate to complete or fill-in the set of identifying information. The operator can then activate one of the plurality of alphanumeric character elements 230c to cause the controller 150 to associate the distinct alphanumeric character of the activated or selected alphanumeric character element with the visually readable image 210c displayed on the interface 200c and/or the associated set of extracted identifying information. For example, the operator could activate or select the "C" alphanumeric character element 231c' to complete the missing position of the incomplete set of extracted identifying information 221c as a "C." According to some embodiments, such a selection causes the controller 150 to update and/or edit a data file or record associated with the flagged Data Extraction Error Document to indicate that the complete serial number is A49992815C. According to some embodiments, the activation and/or selection of the "C" alphanumeric character element 231c' causes the document processing system 100 to tag the completed set of the identifying information to the visually readable image 210c and to store the tagged visually readable image 210c in the memory 160 and/or a memory communicatively connected to the document processing system 100. According to some alternative embodiments, the document processing system 100 can include other means for indicating the missing alphanumeric characters of a Data Extraction Error Document, such as, for example, an alphanumeric keyboard (e.g., QWERTY keyboard) communicatively connected with the document processing system 100 and/or a display device communicatively connected with the document processing system 100. It is contemplated that according to some embodiments, the display device mirrors the control panel 170 display in a larger format. The display device can be local or remote from the document processing system 100.

According to some embodiments, the document processing system 100 applies an OCR algorithm (e.g., the OCR software described above) for each visually readable image generated by the image scanner(s) 140a and/or 140b to attempt to extract and/or determine a complete set of identifying information for each document being processed. According to some embodiments, the controller 150 calls or determines each character position of the set of identifying information of the document as an alphanumeric character that most closely corresponds to and/or matches the extracted alphanumeric character. According to some such embodiments, the controller 150 calculates or determines a confidence level associated with the alphanumeric character call or determination by the controller 150. According to some embodiments, if the calculated confidence level is less than a predetermined threshold (e.g., about 95% confident, about 85% confident, about 60% confident), the controller 150 disregards the alphanumeric character determination and flags the document as a Data Extraction Error Document according to, for example, the run-and-present mode of operation.

According to some embodiments, the controller 150 determines the most likely identity of a character at a character position in a set of identifying information (e.g., a currency bill serial number) based on the visually readable image; however, the calculated confidence level is below the predetermined threshold. In some such embodiments, the controller 150 can be configured to cause one of the plurality of alphanumeric character elements 230c to be highlighted to indicate a suggested character identity for a character position based on a determination of the controller 150. For example, as shown in FIG. 9C, the "C" character element 231c' is highlighted to indicate to the operator that the document processing system 100 has determined that the missing character is a "C," but the confidence level is below the predetermined threshold. According to some embodiments, the operator can review the visually readable image 210a of the flagged currency bill and activate or select the highlighted "C" character element 231c' as described above. According to some embodiments, each of the plurality of alphanumeric character elements 230c is associated with a distinct alphanumeric character that most closely matches the missing character. For example, as shown in FIG. 9C, the missing character is a C, thus, according to some embodiments, instead of the plurality of alphanumeric character elements 230c being associated with sequential characters A, B, C, D, E and F, the plurality of alphanumeric character elements 230c can be associated C, D, G, and E, which the device determines are most likely to be the missing character. According to some embodiments, if an operator determines that none of the plurality of alphanumeric character elements 230c match the missing character, the operator can scroll to a different set of alphanumeric character elements 230c that is associated with different alpha characters using arrow elements 262a,b.

According to some embodiments, the document processing system 100 includes an alphanumeric character accept element and/or button (not shown) that the operator can activate or select when the operator is in agreement with the suggested character identity determination of the controller 150, as indicated by the highlighted one of the plurality of alphanumeric character elements 230c. According to some embodiments, the alphanumeric character accept element is the same as, or similar to the denomination accept element described above in relation to FIG. 9A.

According to some embodiments, in response to the document processing system 100 failing to extract a complete set of the identifying information for a document, such as, for example, extracted characters and/or failing to do so with a predetermined level of confidence, a processor or controller, such as the controller 150, is configured to flag the document as a Data Extraction Error Document by reprocessing the image data associated with that document with a second more robust OCR algorithm such as described in the Optical Character Recognition Section, and in other sections of the present disclosure. According to some alternative embodiments, the system 100 is configured to transmit or otherwise send image data associated with the Data Extraction Error Document to a different system configured to receive the image data and to reprocess the image data associated with that document with a more robust OCR algorithm described in the Optical Character Recognition Section than the one applied by the system 100. According to some alternative embodiments, only in response to the more robust algorithm failing to extract a complete set of the identifying information for the document, the system 100 is configured to display at least a portion of a visually readable image of the Data Extraction Error Document on the interface 200*c* as described herein.

According to some embodiments, the document processing system 100 fails to extract or determine a plurality of character positions within a plurality of sets of identifying information for a portion of a plurality of documents being processed. In some such embodiments, the document processing system 100 is configured to display a visually readable image of each Data Extraction Error Document—according to the run-and-present and/or the stop-and-present modes of operation—sequentially on the control panel 170 or other local and/or remote display device communicatively connected to the document processing system 100. The visually readable images can be displayed in an order corresponding to the order in which the Data Extraction Error Documents were transported from the input receptacle 110 to the output receptacle(s) 130. In response to an operator making a character selection that completes the set of identifying information of a document corresponding to a first one of the Data Extraction Error Documents via one of the plurality of alphanumeric elements 230*c*, the document processing system 100 is configured to remove the visually readable image of the first one of the Data Extraction Error Documents from the interface 200*c* and to display a visually readable image of a second one of the Data Extraction Error Documents on the interface 200*c*. According to some embodiments, the document processing system 100 is configured to flag Data Extraction Error Documents according to the run-and-present mode of operation and in response to an operator completing the identifying information of the first one of the Data Extraction Error Documents, as described above, the document processing system 100 is configured to flag the second no-call document while continuing to transport other documents simultaneously. According to some embodiments, the operator can move between or scroll through visually readable images of Data Extraction Error Documents using a previous element 265*a* and a next element 265*b*.

According to some embodiments, the interface 200*c* may include a positional locator 240*c*, as shown in FIG. 9C. According to some embodiments, the positional locator 240*c* is the same as, or similar to, the positional locator 240*a* described above in reference to FIG. 9A. According to some embodiments, the interface 200*c* may include a Find Document element 250*c*, as shown in FIG. 9C. According to some embodiments, the Find Document element 250*c* is the same as, or similar to, the Find Document element 250*a* described above in reference to FIG. 9A. While some of the embodiments described above are in reference to the flagged Data Extraction Error Document being a currency bill and the visually readable image 210*c*, it is understood that the same or similar features are contemplated for other types of documents including checks. A Data Extraction Error Document which is a currency bill may also be referred to as a extraction error currency bill. A Data Extraction Error Document which is a check may also be referred to as a extraction error check. A flagging criterion being the encountering of a data extraction error while attempting to extract data or characters from the image of a currency bill may be referred to as an extraction error-currency bill. A flagging criterion being the encountering of a data extraction error while attempting to extract data or characters from the image of a check may be referred to as an extraction error-check.

According to some alternative embodiments, a controller is configured to not flag Data Extraction Error Documents to the operator of a document processing system. For example, the controller can be configured to not flag Data Extraction Error Documents missing, for example, three or less characters, two or less characters, or one or less characters. That is, the controller can be configured to let records of incompletely extracted documents pass onto storage in a memory in response to the records missing, for example, three or less serial number characters for records associated with currency bills. For example, according to some such alternative embodiments, records having the following extracted serial numbers would not be flagged as a Data Extraction Error Document: AL49992815?, A?49992815?, ??49992815?, AL49992815C. Similarly, records having the following extracted serial numbers would still be flagged as Data Extraction Error Documents: AL49992????, A???9992815?, ??499?2815?. It is contemplated that the document processing device 101, 101' and/or system 100 is configured to permit an operator to adjust settings of the device/system to allow such incomplete records to pass to storage without requiring the operator to manually correct and/or complete extracted data, such as, for example, serial numbers and/or MICR lines, to increase an overall efficiency and/or throughput of document processing.

Figure 9D:
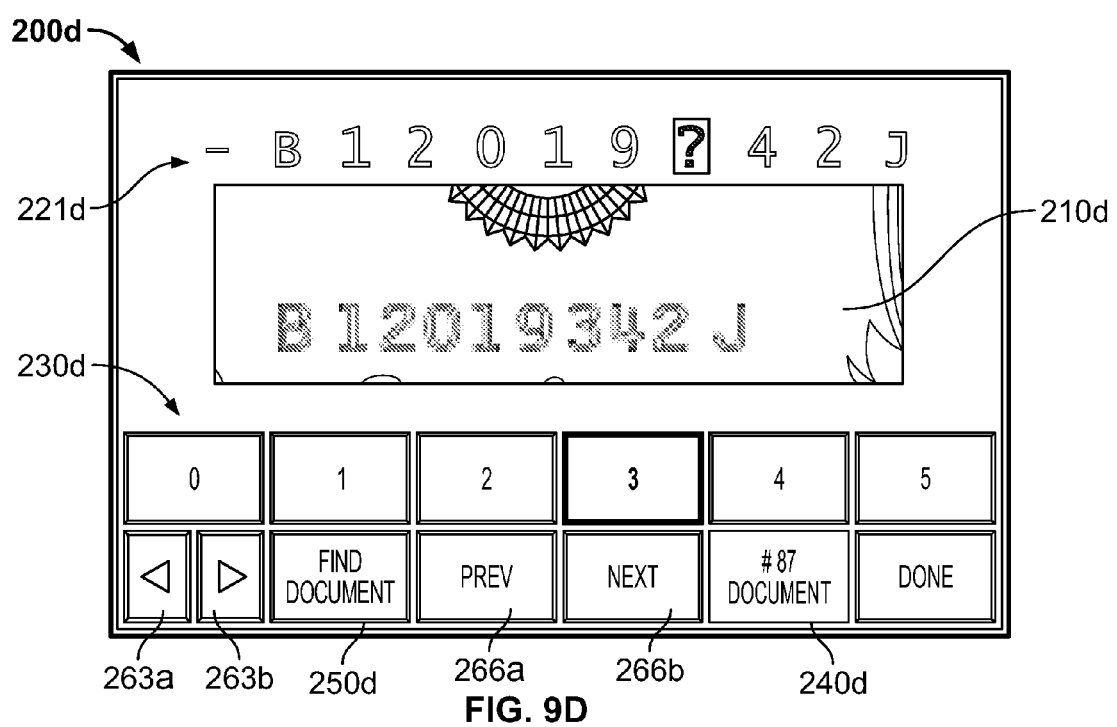
FIG. 9D is a representation of an interface for entering alphanumeric character information for a flagged document according to some embodiments of the present disclosure.

Now referring to FIG. 9D, a representation of an interface 200*d* for entering identifying information of a flagged Data Extraction Error Document, here an extraction error-currency bill, is shown according to some embodiments. According to some embodiments, the interface 200*d* includes an incomplete set of extracted identifying information 221*d*, a visually readable snippet serial number image 210*d*, a plurality of alphanumeric character elements 230*d*, a positional locator 240*d*, a Find Document element 250*d*, arrow elements 263*a,b*, and previous and next elements 266*a,b*. The incomplete set of extracted identifying information 221*d* and the visually readable snippet serial number image 210*d* are similar to the incomplete set of extracted identifying information 221*c* and the visually readable snippet serial number image 210*c* of the interface 200*c*. The positional locator 240*d*, the Find Document element 250*d*, the arrow elements 263*a,b*, and the previous and next elements 266*a,b* are the same as the positional locator 240*a*, the Find Document element 250*a*, the arrow elements 262*a,b*, and the previous and next elements 265*a,b*, respectively. According to some embodiments, the interface 200*d* is the same as the interface 200*c*. As illustrated in FIG. 9D, instead of the flagged Data Extraction Error Document having a missing alpha character (e.g., "C" alpha character), the missing character is a numeric character (e.g., "3" numeric character). According to some embodiments, the document processing system 100 determines the position of the missing character within the set of identifying information and based on that positional determination displays the plurality of alphanumeric character elements 230*c,d* as alpha characters (as shown in FIG. 9C) or numeric characters (as shown in FIG. 9D).

Figure 9E:
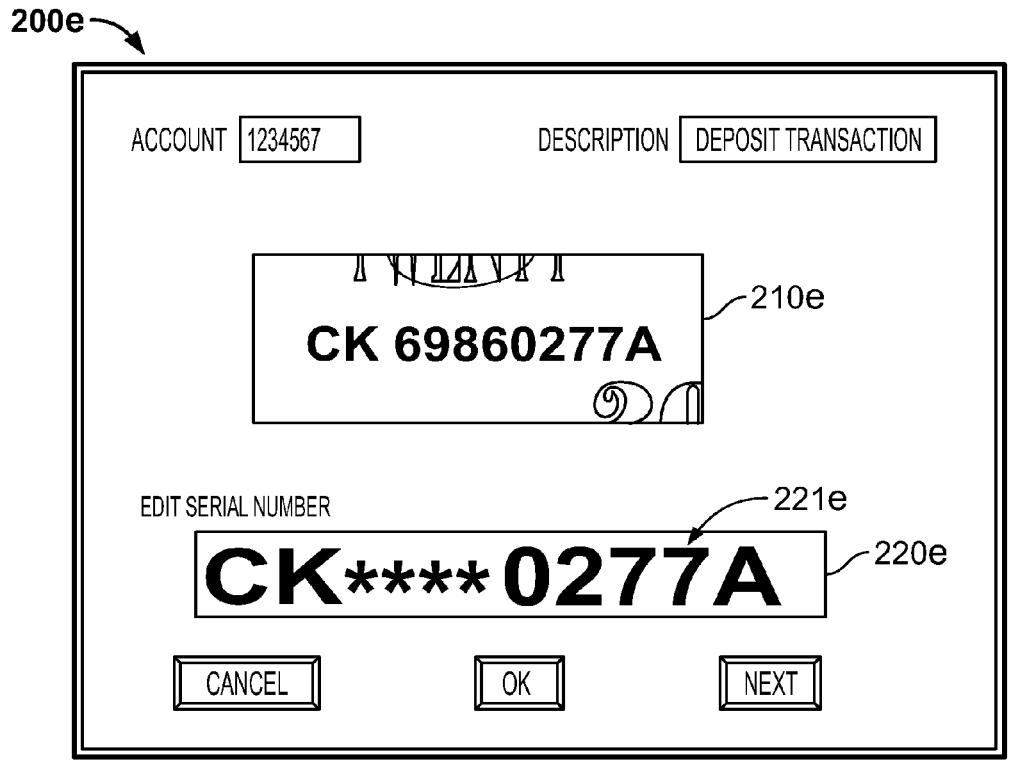
FIG. 9E is a representation of an interface for entering alphanumeric character information for a flagged document according to some embodiments of the present disclosure.

Now referring to FIG. 9E, a representation of an interface 200*e* for entering identifying information of a flagged Data Extraction Error Document, here an extraction error-currency bill, is shown according to some embodiments. According to some embodiments, the interface 200e is similar to the interfaces 200c-d. According to some embodiments, the interface 200e includes an incomplete set of extracted identifying information 221e and a visually readable snippet serial number image 210e. According to some embodiments, the incomplete set of extracted identifying information 221e is corrected via the control panel 170, a mouse, a keyboard, a touchscreen (e.g., softkeys), and/or another input device, such as an input device of the computer 151. While the illustrated example in FIG. 9E is of a currency bill having missing serial number data, it is understood that various other currency bill information can be missing and/or need correction; and it is additionally understood that a similar operation occurs for correcting or entering missing data for checks and other documents processed by the document processing system 100 according to some embodiments.

Figure 9F:
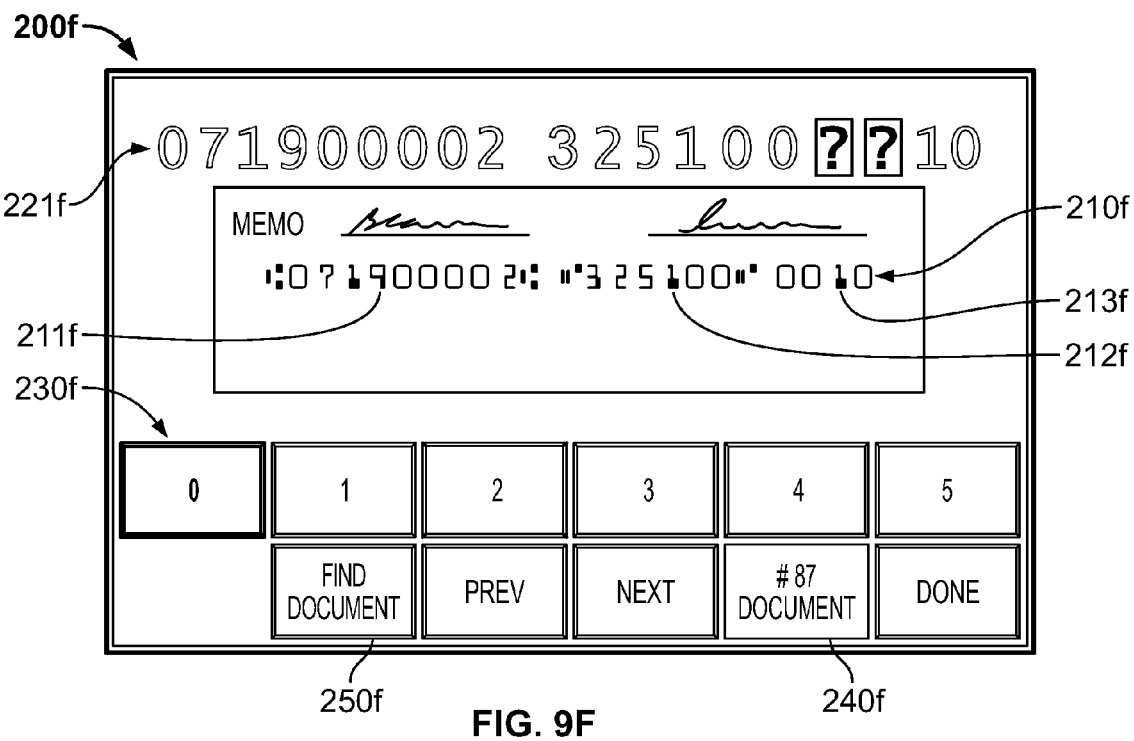
FIG. 9F is a representation of an interface for entering alphanumeric character information for a flagged document according to some embodiments of the present disclosure.

Now referring to FIG. 9F, a representation of an interface 200f for entering identifying information of a flagged Data Extraction Error Document, here an extraction error-check, is shown according to some embodiments. The interface 200f is similar to the interface 200c, except the Data Extraction Error Document in FIG. 9F is a check, whereas the Data Extraction Error Document in FIG. 9C is a currency bill. According to some embodiments, the interface 200f includes an incomplete set of extracted identifying information 221f, a visually readable snippet MICR line image 210f, a plurality of alphanumeric character elements 230f, a positional locator 240f, and a Find Document element 250f. According to some embodiments, the snippet image is of a CAR and/or LAR area and/or an image of the entire check is displayed.

The incomplete set of extracted identifying information 221f and the visually readable snippet MICR line image 210f are similar to the incomplete set of extracted identifying information 221c and the visually readable snippet serial number image 210c of the interface 200c. According to some embodiments, a complete set of the identifying information for a check includes a routing and transit number or an ABA number 211f, a financial account number 212f, a check number 213f, CAR/LAR amounts, or any combination thereof. The positional locator 240f and the Find Document element 250f are the same as the positional locator 240a and the Find Document element 250a, respectively. As illustrated in FIG. 9F, the flagged Data Extraction Error Document is missing two numeric characters (e.g., "0" numeric character). According to some embodiments, an operator can select appropriate ones of the alphanumeric character elements 230f to complete the missing characters.

According to some embodiments, the device 101, 101' is configured to display visually readable images of all checks in a stack of documents on the interface 200f such that an operator of the device 101, 101' can manually review the respective images and enter any missing data. For example, the operator can manually enter via touch keys on the interface 200f or other communicatively connected input device (e.g., keyboard, mouse, etc.) an address and/or name appearing on the check, MICR line data/characters, and/or CAR/LAR amounts. According to some such embodiments, the operator manually enters an amount for each check in the stack of documents being processed such that no CAR/LAR software is needed on-board of the device 101, 101'.

According to some embodiments, the device 101, 101' is configured to execute CAR/LAR software to automatically determine an amount associated with each check in a stack of documents being processed. In some such embodiments, in response to the CAR/LAR software failing to determine the amount of a check within a predetermined confidence level, the device 101, 101' is configured to display a complete visually readable image or select portions thereof on the interface 200f such that the operator can review the image for the amount and manually enter the amount in a similar manner, for example, that denominations are entered as described in reference to FIGS. 9A and 9B and in a similar manner that missing serial number characters are entered in reference to FIGS. 9C-9D.

As described in the Document Processing Speed Section, and in other sections of the present disclosure, according to some embodiments, denominating currency bills includes determining a series of each of the currency bills. In these embodiments, the denomination and/or series information of the bills can be used to determine a coordinate location of one or more serial numbers and/or other bill characteristics (e.g., a back plate number, a check letter and quadrant number, a check letter and face plate number, a Federal Reserve letter/number) in generated image data from which a visually readable image of the currency bill can be reproduced. According to some embodiments, such coordinate location information is desirable because the serial numbers and/or other bill characteristics vary in location by denomination and series. According to some embodiments, a currency bill can be determined to be a suspect bill based on the location of the serial number and/or the location of another bill characteristic satisfying a serial number location flag criterion and/or a bill characteristic flag criterion. That is, according to some embodiments, a currency bill can be determined to be suspect in response to determining that, for example, the serial number of a bill is not located where expected based on the determined denomination and/or series of the bill.

According to some embodiments, a document processing device 101, 101' and/or system 100 determines a denomination and series of a bill as described herein, such as by analyzing one or more patterns taken from the image data, and uses the denomination and/or series information to determine the expected location of one or more of the bill characters (e.g., serial numbers and other bill characters/characteristics). According to some embodiments, in response to the determined expected location of, for example, the bill serial number not corresponding with the actual location of the serial number in the image data, the device is configured to flag the bill as a suspect bill. According to some embodiments, the device maps appropriate image fields onto image data of a bill being processed and attempts to extract corresponding characters and populate corresponding fields in a record for the bill. If a bill does not have a string of numbers or characters in an expected location, the device can flag it as a suspect.

According to some embodiments, in response to the device flagging the bill, the device can be configured to store image data from which a visually readable snippet image of the various image fields can be reproduced. That way, in response to a bill being flagged as a suspect bill, the device can be configured to display the snippet image of the expected location and/or the entire bill with an outline around the expected image field and an operator could verify that the expected information (e.g., serial number, check letter and face plate number) is not located in the expected/proper area of the bill—that is, the bill satisfies a location error-currency bill criterion. Alternatively, the user could determine the expected information is located in the proper area but the device for some reason could not read the data (e.g., pen mark over characters). Furthermore, according to some embodiments, the device can be configured to distinguish between a location error and a data extraction error. As such, the device is configured to take different actions based on the two types of errors, such as, for example, the device can be configured to stop-and-present in response to a location error and to populate corresponding data fields in the bill record with one or more wildcard characters (e.g., "?") in response to a data extraction error.

Figure 10:
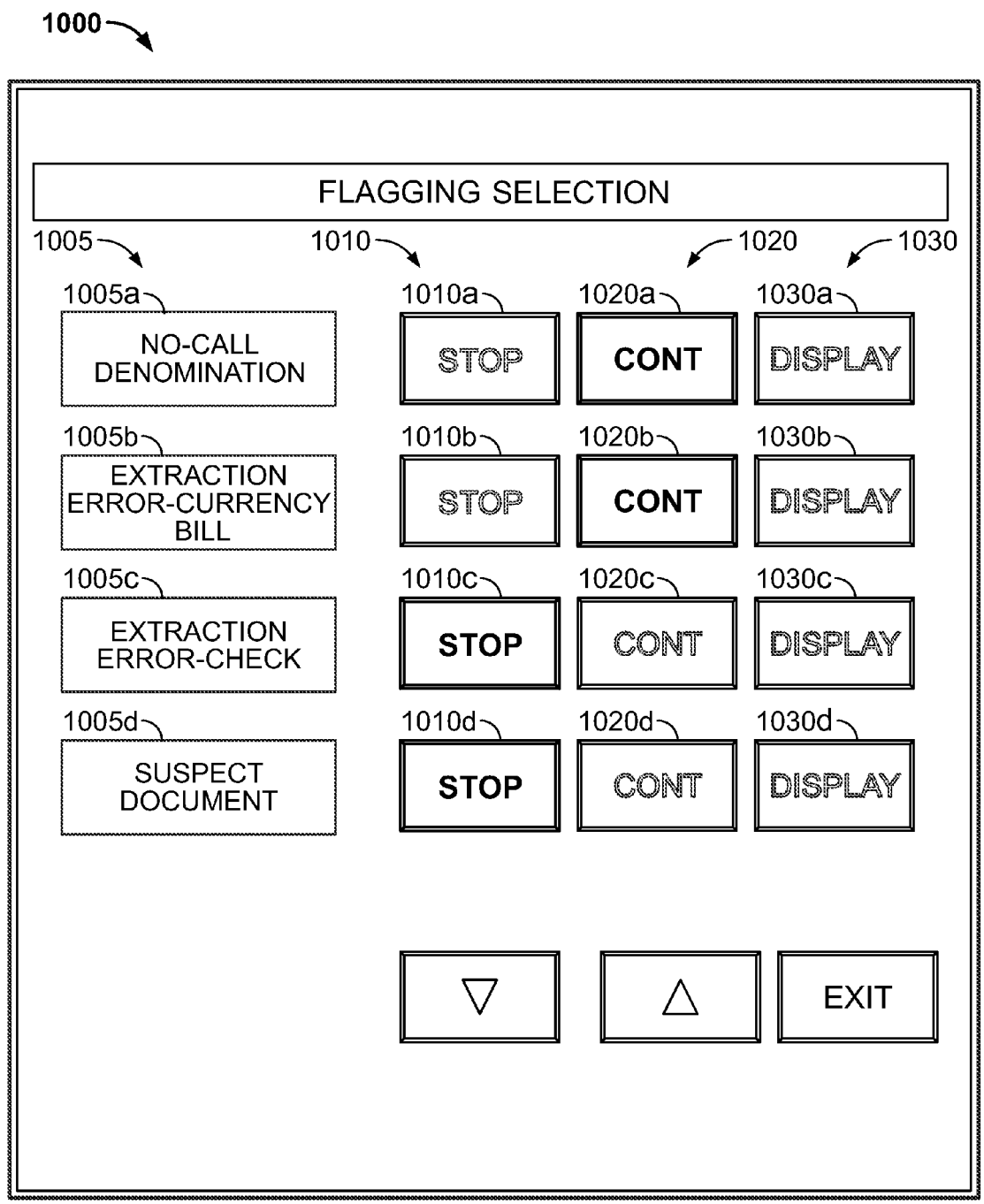
FIG. 10 is a representation of an interface for configuring the operation of a document processing system according to some embodiments of the present disclosure.

Now referring to FIG. 10, a representation of an interface 1000 for configuring one or more of the document processing systems and/or devices of the present disclosure, such as the document processing system 100 and the document processing devices 101, 101', and 101a,b, is shown according to some embodiments. According to some embodiments, the interface 1000 is the control panel 170 and/or one or more display devices (e.g., a touch screen display) communicatively connected to the document processing system 100. FIG. 10 illustrates an example of an operating parameters selection screen. The left-hand column 1005 lists various features and conditions for which the operator may make selections. Columns 1010, 1020, and 1030 lists the available selection choices or options associated with each feature or condition. In the illustrated embodiment, columns 1010 and 1020 provide the operator with two flagging options for each error condition listed in column 1005, namely, stop-and-present a flagged bill (1010), do not stop upon encountering a flagged bill (1020), and display the image of a flagged bill (1030). When a CONT selection element in column 1020 and a DISPLAY selection element in column 1030 are both selected or activated for a particular error condition, a document meeting the associated error condition is handled in a manner called a run-and-present mode. When a STOP selection element in column 1010 (with or without the corresponding DISPLAY selection element being also selected), a document meeting the associated error condition is handled in a manner called a stop-and-present mode. Although not illustrated, alternative or additional columns of selection elements may also be included such as for indicating to which output receptacle a flagged document of a particular type should be delivered and/or where the flagged bill should be located when the transport mechanism stops, for example, the CONT-2, P1, P2, ST options described in U.S. Pat. No. 6,311,819 incorporated by reference above, and/or the TAG only option described below.

According to some embodiments, the interface 1000 is a flagging/routing selection or configuration interface that allows an operator of the document processing system 100 to select a mode of operation for each flag criteria such that a processor and/or controller, such as the controller 150, flags documents and/or visually readable images of the documents according to the selected mode of operation (e.g., a first operator-selectable mode 1010 or a second operator-selectable mode 1020) associated with a satisfied flag criteria. As shown in FIG. 10, the interface 1000 includes a list of flag criteria or error conditions 1005 that includes a no-call denomination criterion 1005a, an extraction error-currency bill criterion 1005b, an extraction error-check criterion 1005c, and a suspect criterion 1005d. It is contemplated that the list of flag criteria 1005 can include more or less criteria, such as, for example, a doubles criterion, a stranger criterion, an overlap criterion, a fitness criterion, and a soil criterion. According to some embodiments, an extraction error-currency bill criterion may correspond to an error in extracting one or more characters of the serial number of a currency bill. According to some embodiments, an extraction error-check criterion may correspond to an error in extracting one or more characters of the MICR line of a check.

According to some embodiments, the interface 1000 includes a first operator-selectable mode 1010 and a second operator-selectable mode 1020. According to some embodiments, the first operator-selectable mode is the stop-and-present mode of operation discussed above and the second operator-selectable mode is the run-and-present mode of operation discussed above. According to some embodiments, selection of a CONT selection element corresponds to selection of a run-and-present mode wherein an image associated with a flag document will be display without having to separately select a corresponding DISPLAY selection element as discussed above. According to some embodiments, the run-and-present mode or run-and-present-image mode of operation is also called a continuous run mode of operation because the transport mechanism 120 does not halt upon detecting a flagged document but continuously runs while the processor and/or controller flags documents by presenting a visually readable image of the flagged document on the control panel 170 or other display device communicatively connected with the document processing system 100. Each of the flag criteria 1005a-d are positioned adjacent to a first operator-selectable mode element 1010a-d and a second operator-selectable mode element 1020a-d. According to some embodiments, the operator of the document processing system 100 activates or selects one of the first and the second operator-selectable mode elements 1010a-d, 1020a-d, respectively, for each of the flag criteria 1005a-d. For example, the run-and-present mode of operation 1020a is activated for the no-call denomination criterion 1005a, thus, the document processing system 100 is configured to flag no-call denomination documents according to the run-and-present mode of operation. For another example, the stop-and-present mode of operation 1010d is activated for the suspect document criterion 1005d, thus, the document processing system 100 is configured to flag suspect documents according to the stop-and-present mode of operation.

According to some embodiments, the document processing system 100 is preconfigured to flag documents according to the run-and-present mode of operation and the stop-and-present mode of operation for particular flag criteria. For example, the document processing system 100 can be preconfigured to flag no-call denomination documents, extraction error-currency bill documents, and extraction error-check documents according to the run-and-present mode of operation, but preconfigured to flag documents satisfying the other flag criteria according to the stop-and-present mode of operation.

According to some embodiments, the operator configures the document processing system 100 to flag documents for each of the flag criteria according to designated mode selections such as those shown in FIG. 10. Thus, in response to a document and/or one of the visually readable images generated by the image scanner(s) 140a and/or 140b satisfying one of the flag criteria, the controller 150 is configured to flag the visually readable image according to the activated operator-selectable mode associated with the satisfied one of the flag criteria. For example, if the visually readable image satisfies the extraction error-currency bill criterion 1005b (e.g., a serial number extraction error), the processor and/or controller will flag the visually readable image according to the run-and-present mode of operation. As another example, if the visually readable image satisfies the extraction error-check criterion 1005c (e.g., a MICR line extraction error), the controller 150 will flag the visually readable image according to the stop-and-present mode of operation. For another example, if the document and/or the visually readable image satisfies the suspect document criterion 1005d, the controller 150 will flag the visually readable image according to the stop-and-present mode of operation.

According to some embodiments, the operator associates a first group of flag criteria with the run-and-present mode of operation and a second group of flag criteria with the stopand-present mode of operation. That is, the operator groups or divides the flag criteria into a run-and-present group and a stop-and-present group. As shown in FIG. 10, the first group of flag criteria includes the no-call denomination criterion 1005a and the extraction error-currency bill criterion 1005b. Similarly, the second group of flag criteria includes the extraction error-check criterion 1005c and the suspect criterion 1005d. According to some such embodiments, the controller 150 is configured to flag a document and/or visually readable image of the document according to the run-and-present mode of operation if the document and/or the visually readable image of the document satisfies one of the flag criteria in the first group of flag criteria. Similarly, according to some such embodiments, the controller 150 is configured to flag a document and/or visually readable image of the document according to the stop-and-present mode of operation if the document and/or the visually readable image of the document satisfies one of the flag criteria in the second group of flag criteria.

According to some embodiments, the interface 1000, additionally or alternatively, comprises other flagging options such as a tag only mode of operation (not shown), which is discussed above. According to some such embodiments, the operator can associate a third group of flag criteria with the tag only mode of operation. That is, the operator groups or divides the flag criteria into a run-and-present group, a stop-and-present group, and/or a tag only group. Likewise, according to some embodiments, the interface 1000 permits an operator to designate that one or more particular types of flagging errors or satisfaction of one or more flag criteria will not trigger the flagging of a currency bill (e.g., the suspect mode may be turned off).

According to some embodiments, the interface 1000 is configured to permit an operator to designate how each of plurality of error conditions are to be handled such as by, for example, associating one or more of the plurality of error conditions with either a run-and-present mode of operation or a stop-and-present mode of operation. As shown in FIG. 10, the flagging errors for which the run-and-present mode has been designated by the selection of a run-and-present selection element 1020a, 1020b includes the no-call denomination criterion 1005a and the extraction error-currency bill criterion 1005b. Similarly, flagging errors for which the stop-and-present mode has been designated by the selection of a stop-and-present selection element 1010c-d includes the extraction error-check 1005c and the suspect criterion 1005d. According to some such embodiments, the controller 150 is configured to flag a document and/or visually readable image of the document according to the run-and-present mode of operation if a run-and-present selection element (a first group selection element) has been selected or activated for the flagging error triggering the document to be flagged. Similarly, according to some such embodiments, the controller 150 is configured to flag a document and/or visually readable image of the document according to the stop-and-present mode of operation if a stop-and-present selection element (a second group selection element) has been selected or activated for the flagging error that causes the document to be flagged.

According to some embodiments, the interface 1000, additionally or alternatively, comprises other mode of operation selection elements such as a third group selection elements associated with the tag only mode of operation (not shown), which is discussed above. Likewise, according to some embodiments, the interface 1000 permit an operator to designate that one or more particular types of flagging errors will not trigger the flagging of a bill, for example, the suspect mode may be turned off.

Additional details about flagging, sorting, flagging interfaces and routing interfaces and additionally modes of operation and error conditions which are employed with the document processing devices 101, 101' and the document processing devices 101a,b according some embodiments can be found in U.S. Pat. No. 6,311,819, which is hereby incorporated by reference herein in its entirety. For example, means such as selection elements may be provided to permit an operator to designate into which of a plurality of output receptacles documents triggering different flagging errors are to be sent.

Modes of Operation—Blacklist

Figure 11A:
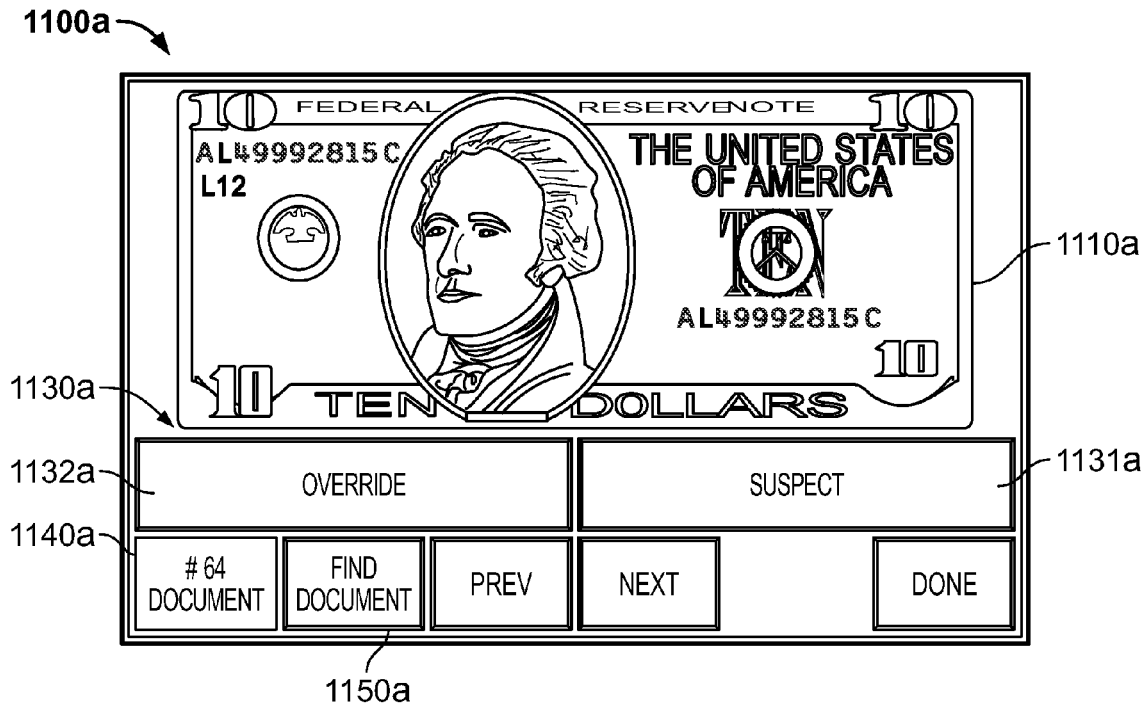
FIG. 11A is a representation of an interface for overriding or accepting an authentication determination according to some embodiments of the present disclosure.
Figure 11B:
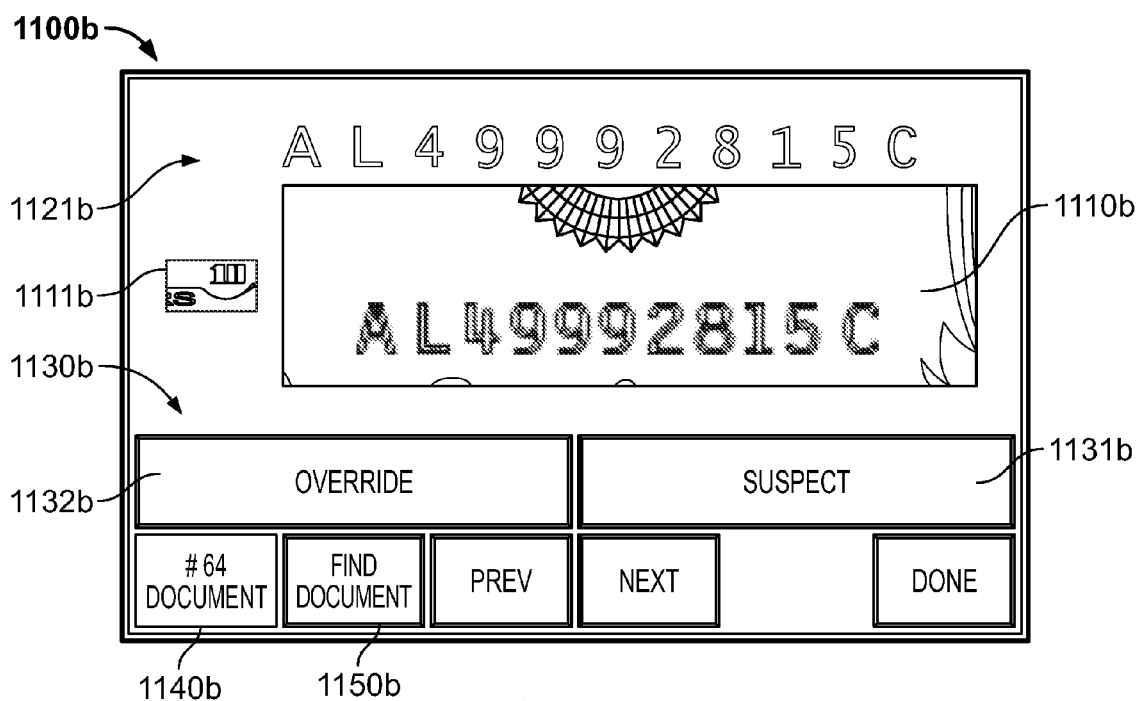
FIG. 11B is a representation of an interface for overriding or accepting an authentication determination according to some embodiments of the present disclosure.

Referring generally to FIGS. 11A and 11B, a representation of an interface 1100a,b for declaring a flagged document as suspect or non-suspect is shown according to some embodiments. While the following description is in reference to the document processing system 100, it is contemplated that the document processing devices 101, 101', 101a,b, 400 can include the same or similar interface as interface 1100a,b. According to some embodiments, as described above, the document processing system 100 is configured to authenticate documents using the authentication sensor 145 and/or by using a database of serial numbers or other currency bill information such as currency bill records each including a serial number, denomination, Federal Reserve Bank number, check letter(s), quadrant letter(s), face plate number and/or back plate number, and/or combinations thereof (e.g., a currency bill blacklist database or a suspect currency bill database) for known or suspected counterfeit currency bills and a database of checking account numbers or other check information such as check records each including MICR data, ABA routing number, account number, check number, amount data, payee data, etc., and/or combinations thereof (e.g., a check blacklist database or a suspect check database) for known or suspected checks associated with fraudulent activity.

The authentication sensor 145 is configured to authenticate the documents based on one or more criteria and/or authentication tests as is known in the art. Authentication by use of a suspect or blacklist database is accomplished by comparing identifying information (e.g., currency bill serial number for currency bills and MICR lines or portions thereof for checks) extracted from the visually readable images generated by the image scanner(s) 140a and/or 140b for each document processed with data or information in the blacklist database. For example, for a currency bill, according to some embodiments, the document processing system 100 compares an extracted serial number from a particular visually readable image of a currency bill (or a combination of denomination and an extracted serial number) with a list or blacklist database of serial numbers (or combinations of denominations and serial numbers) associated with counterfeit or suspected counterfeit currency bills. For another example, for a check, according to some embodiments, the document processing system 100 compares an extracted MICR line (or portions thereof) from a particular visually readable image of a check with a list or blacklist database of MICR lines (or portions thereof) associated with fraudulent or suspected fraudulent checking accounts.

According to some embodiments, the document processing system 100 receives and stores in a memory and/or is coupled to a memory having stored therein a blacklist database of serial numbers and/or MICR lines or a currency bill blacklist database and a check blacklist database as described above or a database including both currency bill blacklist information and check blacklist information. According to some embodiments, the blacklist database of serial numbers can further include information in addition to serial numbers, such as, for example, a reason why a particular currency bill was determined to be suspect and/or counterfeit. For example, the blacklist database can further indicate that a blacklisted currency bill having serial number AL12345678B was blacklisted because of non-conforming magnetics. For another example, the blacklist database can further indicate that a blacklisted currency bill having serial number IF12345678C was blacklisted because of non-conforming paper characteristics. It is contemplated that according to some embodiments, the document processing devices and/or systems of the present disclosure, such as device 101, can include such reasons that bills were determined to be suspect in generated records and/or databases, such as, for example, the records and databases described in the Document Records and Data Files Section and/or the Modes of Operation—Searching/Master Database Section, and in other sections of the present disclosure.

According to some embodiments, the blacklist database can be downloaded, uploaded, transmitted, and/or transferred into the memory 160 of the document processing system 100 and/or another memory communicatively connected to the document processing system 100. For example, the document processing system 100 can be configured to automatically download blacklist databases or updates from a computer system coupled thereto and/or a web site on the Internet according to a predetermined schedule. Alternatively, when an update is prepared by a third party, for example, a bank such as the Federal Reserve Bank, the update can be automatically uploaded to a server that the document processing system 100 is communicatively connected with for downloading automatically or in response to an operator input.

According to some embodiments, the document processing system 100 receives a plurality of documents for processing. The document processing system 100 is configured to determine if any of the documents are suspect documents based on a determination of the authentication sensor 145 and/or based on a comparison of extracted identifying information with information in the blacklist database. Put another way, according to some embodiments, the document processing system 100 is configured to determine if any of the documents satisfy a suspect criterion, as described in reference the Modes of Operation—Flagging Section, and in other sections of the present disclosure. According to some embodiments, the document processing system 100 is configured to flag a document satisfying a suspect criterion by displaying at least a portion of a visually readable image of the document on the interface 1100a (e.g., the control panel 170). For example, as shown in FIG. 11A, a visually readable image 1110a of a flagged currency bill that satisfies a suspect criterion is shown on the interface 1100a. According to some embodiments, the flagged currency bill satisfies a suspect criterion because the suspect currency bill failed one or more of the authentication tests of the authentication unit 145 and/or because the extracted serial number (or serial number, denomination, and/or series combination) corresponds with one of the serial numbers (or serial number, denomination, and/or series combination) included in the blacklist database. It is understood that while the following discussion in reference to FIGS. 11A and 11B regards a suspect currency bill that the same or similar features are contemplated for checks.

According to some embodiments, the interface 1100a includes a plurality of selection elements 1130a. According to some embodiments, the plurality of selection elements 1130a are softkeys displayed on the control panel 170. The plurality of selection elements 1130a can include an override element 1132a and a suspect element 1131a. The plurality of selection elements 1130a are configured to allow an operator of the document processing system 100 to make an authentication determination concerning a document associated with the visually readable image 1110a. For example, the operator may disagree with and/or desire to override the suspect determination of the document processing system 100 for the currency bill shown in the interface 1100a.

According to some such embodiments, the operator may activate or select the override element 1132a to cause the visually readable image 1110a or a data file or record associated with the visually readable image 1110a to be tagged as "reviewed-accepted." Thus, selecting the override element 1132a overrides the suspect determination of the document processing system 100 with respect to the currency bill shown in the interface 1100a. According to some embodiments, the tagged visually readable image 1110a (not shown as tagged) is stored within a data file or record (e.g., records 300a-d, data file 301) in the memory 160 of the document processing system 100 such that the visually readable image 1110a reflects that the operator reviewed the currency bill and manually determined that the currency bill was not a suspect document. According to some embodiments, the data file or record associated with the visually readable image 1110a is modified to reflect that the operator reviewed the currency bill and manually determined that the currency bill was not a suspect document such as by, for example, setting a "reviewed-accepted" bit or field in the data file or record. Various reasons for overriding the suspect determination of the document processing system 100 are contemplated.

According to some embodiments, the document processing system 100 is configured to determine a total value associated with a stack or batch of a plurality of documents placed in the input receptacle 110 that are processed by the document processing system 100. According to some such embodiments, the controller 150 is configured to not include values of documents determined to be suspect by the document processing system 100 in the calculated total value. According to some embodiments, activation or selection of the override element 1132a, such as, for example, by touching, pushing, and/or choosing the override element, overrides the suspect determination of the document processing system 100 with respect to the currency bill shown in the interface 1100a and further causes the value of the currency bill to be included in the calculated total value for the batch of documents. According to some embodiments, the operator may activate or select the suspect element 1131a to cause the visually readable image 1110a to be tagged as "suspect" and/or to leave unchanged any suspect indication existing in the data file or record associated with the displayed image, e.g., if a suspect bit or field was set in the data file or record which in turn caused the displayed image to be displayed, this suspect bit or field is not changed when the suspect element 1131a is selected. Thus, selecting the suspect element 1131a maintains the suspect determination of the document processing system 100 with respect to the currency bill shown in the interface 1100a.

According to some embodiments, the interface 1100a includes a positional locator 1140a and/or a find document element 1150a. The positional locator 1140a and the find document element 1150a are the same as, or similar to, the positional locator 240a and/or the find document element 250a described above and shown in FIG. 9A.

Referring to FIG. 11B, an interface 1100b is shown for declaring a flagged document as suspect or non-suspect according to some embodiments. The interface 1100b is similar to the interface 1100a, except instead of including the visually readable image 1110a of the entire flagged currency bill, the interface 1100*b* includes a visually readable serial number snippet image 1110*b* of the flagged currency bill and a blacklist serial number 1121*b*. The blacklist serial number 1121*b* is a serial number included in the blacklist database that the controller 150 determined to correspond with and/or match an extracted serial number of the flagged currency bill. According to some embodiments, the operator can review the visually readable serial number snippet image 1110*b* and the blacklist serial number 1121*b* to determine if the serial number of the flagged currency bill in fact matches and/or corresponds with the blacklist serial number 1121*b*. According to some embodiments, the serial number of the flagged currency bill will not match the blacklist serial number 1121*b* due to an OCR error made while extracting the serial number from a visually readable image of a bill. It is contemplated that various other factors may cause the serial number of the flagged currency bill to not correspond with the blacklist serial number 1121*b*.

According to some embodiments, the interface 1100*b* can include a denomination snippet image 1111*b* positioned adjacent to the visually readable serial number snippet image 1110*b*. According to some embodiments, the interface 1100*b* includes a plurality of selection elements 1130*b*, a positional locator 1140*b*, and a find document element 1150*b*, which are the same as the plurality of selection elements 1130*a*, the positional locator 1140*a*, and the find document element 1150*a* described above and shown in FIG. 11A.

According to some embodiments, the blacklist database can be divided into a first database and a second database such that a first plurality of identifying information is included in the first database and a second plurality of identifying information is included in the second database. According to some embodiments, the first database is used in a real-time comparison and the second database is used in a post-processing comparison. According to some embodiments, the information contained in the first database is different from the information contained in the second database. For example, the first and the second databases each include a plurality of serial numbers associated with currency bills and the serial numbers in the first database are all different from the serial numbers in the second database. According to some alternative embodiments, at least one of the serial numbers in the first database is the same as one of the serial numbers in the second database. The blacklist databases (e.g., the first and the second databases) can be divided based on a number of factors including, but not limited to, geographical location of the document processing system 100, identifying information associated with stolen documents, identifying information associated with ransom documents, identifying information associated with a customer deposit, etc.

According to some such embodiments, a processor/controller such as the controller 150 is configured to compare in real time document information such as currency denomination information and/or extracted identifying information (e.g., extracted serial numbers, extracted MICR lines) only with the identifying information included in the first database. For example, according to some embodiments, the document processing system 100 is configured to process documents and authenticate the documents by comparing extracted identifying information with information in the first database simultaneously to the transport mechanism 120 transporting the documents from the input receptacle 110 to the output receptacle 130. According to some embodiments, the document processing system 100 is configured to process documents and authenticate the documents by comparing extracted identifying information with information in the first database while the transport mechanism 120 is transporting the documents from the input receptacle 110 to the output receptacle 130 including while transporting documents at the speeds described in the Document Processing Speeds Section, and in other sections of the present disclosure.

Additionally, the document processing system 100 can be configured to further authenticate the same documents in a post-processing operation by comparing the extracted identifying information with information in the second database. That is, according to some embodiments, after the transportation mechanism 120 stops transporting the documents, the document processing system 100 authenticates the documents by comparing the extracted identifying information with information in the second database and/or after the transportation mechanism stops transporting the documents, the document processing system 100 completes authenticating the documents by completing the comparison of the extracted identifying information with information in the second database. According to some embodiments, the comparison with information in the second database may occur after the processed bills have been removed from the output receptacle(s) 130 of the document processing device 101 and/or after another batch of documents has been processed by the document processing device 101. According to some embodiments, the document processing system 100 completes authenticating a batch of documents by completing the comparison of the extracted identifying information with information in the second database before the batch of documents has been removed from the output receptacle(s) 130 of the document processing device 101. According to some embodiments, the document processing system 100 begins to authenticate a batch of documents by comparing the extracted identifying information with information in the second database after a portion of the batch of documents have been transported to the output receptacle(s) 130, but before all of the documents in the batch of documents have been processed and transported to the output receptacle(s) 130.

According to some embodiments, the blacklist database is divided into the first and the second databases and/or the information to be stored in the first database is selected so that the first database has a limited amount of identifying information (e.g., 10 serial numbers [and/or denominations] or MICR lines, 100 serial numbers [and/or denominations] or MICR lines, 1000 serial numbers [and/or denominations] or MICR lines). The amount of information stored in the first database is selected to allow the document processing system 100 to authenticate based on the first blacklist database in real time. According to some embodiments, a computer and/or a second document processing system or device is communicatively connected to the document processing system 100 to compare the extracted identifying information with information in the second database in real time and/or via a post-processing operation. For example, as the identifying information is extracted, the document processing system 100 can transmit records and/or data files including the extracted identifying information to a memory that is accessible by the second document processing system for authentication based on the second database.

According to some embodiments, the first database is stored in a memory in a document processing device 101, 101', 101*a,b* or in a memory comprising part the document processing system 100. According to some such embodiments, the second database is stored in a second memory associated with a computer or server not residing within the document processing device 101, 101', 101*a,b* or forming part of the document processing system 100 but the computer or server associated with second database is communicatively connected to the document processing device 101, 101', 101a,b or the document processing system 100. As the document processing device 101, 101', 101a,b or the document processing system 100 processes documents and collects document images and extracted or determined document information such as serial numbers and denominations of processed currency bills, the document processing device 101, 101', 101a,b or the document processing system 100 is configured to send the collected images and/or extracted or determined document information to the computer or server. The computer or server then compares the received extracted and/or determined document information to information stored in the second database. According to some embodiments, if the computer or server finds a match, it immediately sends a message back to the document processing device 101, 101', 101a,b or the document processing system 100. The document processing device 101, 101', 101a,b or the document processing system 100 is configured to provide an alert to its operator such a by making a noise and/or displaying a message on a display such as control panel 170. According to some embodiments, the system comprising the computer or server and the document processing device 101, 101', 101a,b or the document processing system 100 is configured to perform the comparison of the extracted and/or determined document information associated with a batch of documents to the information stored in the second database, detect any matches for documents in the batch, send an appropriate message(s) back to the document processing device 101, 101', 101a,b or the document processing system 100, and alert the operator of the document processing device 101, 101', 101a,b or the document processing system 100 within minutes of the batch of documents being initially run on the document processing device 101, 101', 101a,b or the document processing system 100. Accordingly, the operator is alerted while the batch of documents are still residing in the document processing device 101, 101', 101a,b or the document processing system 100 or residing in the vicinity of the operator. For example, the operator may be a bank teller and the above system provides an alert to the bank teller that one of the documents within a batch of documents recently processed by the teller had information matching information in the second database. The teller may then locate the batch of documents at his or her teller station and re-run the documents through the document processing device 101, 101', 101a,b or the document processing system 100. When the documents are re-run, the document processing device 101, 101', 101a,b or the document processing system 100 flags the one or more matching documents such as by off-sorting them to a designated output receptacle and/or by stopping the document processing device 101, 101', 101a,b or the document processing system 100 in one of the manners described above in the present disclosure, such as, for example, according to the stop-and-present mode of operation.

According to some such embodiments, the computer or server is communicatively coupled to a plurality of document processing devices 101, 101', 101a,b or the document processing systems 100 and is configured to receive extracted information from the plurality of devices 101, 101', 101a,b or systems 100 and to send appropriate messages back to the appropriate devices or systems. According to some embodiments, the second database is a suspect database including suspect serial numbers, suspect combinations of serial numbers and denominations, and/or other suspect information or attributes associated with currency bills or checks. When the server detects a match, it sends an appropriate message back to the device or system from which the server received extracted information found to match information in the second database and/or it sends an appropriate message or e-mail back to the operator of the device or system from which the server received extracted information found to match information in the second database. For example, in a banking environment comprising a plurality of teller terminal or stations, each with a document processing device or system, the server is communicatively connected to each device or system. When the server detects a match, it sends an appropriate message back to the device or system from which the server received extracted information found to match information in the second database and/or it sends an appropriate message or e-mail back to the teller station having the device or system from which the server received extracted information found to match information in the second database. For example, the teller station may also include a separate bank computer or terminal and the above e-mail may be sent to that separate bank computer or terminal to alert the teller as described above. After receipt of a such an alert, the teller could then locate the batch of documents identified in the message or e-mail and re-run that batch or alternatively, re-run all the documents located within the teller station when the alert is received. When the documents are re-run, the document processing device or system in the teller station off-sorts documents having information found to match information in the second database and/or halts operation in a manner as described above such as stopping with a document having information found to match information in the second database being the last document in an output receptacle of the document processing device or system. According to some embodiments, in response to the server not detecting a match, the server can send an appropriate message, such as a confirmation, back to the device or system from which the server received extracted information found not to match any of the information in the second database and/or it sends an appropriate message or e-mail back to the operator of the device or system from which the server received extracted information found not to match any of the information in the second database. For example, in the banking environment described herein, the message can notify the operator that the extracted information did not match any of the information in the second database. According to some embodiments, receipt of a "no match" notice can be used by a bank teller to release physical batches of documents he or she has processed from his or her teller station such as by selling a tray containing batches of documents for which "no match" notices have been received.

According to some embodiments, a document processing system is configured to display a plurality of database selection elements on a display device, such as, for example, the control panel 170. Each of the database selection elements is associated with a different suspect database. For example, a first database selection element is associated with a first database that includes a first plurality of suspect serial numbers and a second database selection element is associated with a second database that includes a second plurality of suspect serial numbers. For another example, a first database selection element is associated with a first database that includes serial numbers associated with drug purchases, a second database selection element is associated with a second database that includes serial numbers associated with newly discovered counterfeit bills, a third database selection element is associated with a third database that includes serial numbers associated with all known counterfeit bills, a fourth database selection element is associated with a fourth database that includes serial numbers associated with counterfeit bills used to purchase expensive furniture at a specific store, and a fifth database selection element is associated with a fifth database that includes serial numbers associated with counterfeit bills discovered in California.

According to some embodiments, an operator of the system can select and/or activate one or more of the database selection elements to make active and/or turn ON comparisons of data derived for processed documents such as extracted serial numbers of bills with data in the corresponding activated and/or turned ON databases. According to some embodiments, the activated and/or ON databases will be actively used to authenticate documents processed by the system in a real-time comparison mode and/or a post-processing comparison mode. According to some such embodiments, the operator can configure which ones of the databases should be used to authenticate documents on a real-time comparison mode, which ones of the databases should be used to authenticate documents on a post-processing comparison mode, and which ones of the databases should remain OFF.

According to some embodiments, identifying information (e.g., currency bill serial numbers and/or denominations) in a first database is associated with high-priority suspect documents and identifying information in a second and/or third database is associated with low-priority suspect documents. For example, a high-priority suspect document might be one involved in a robbery in past week and a low-priority suspect document might be one involved in a robbery last year.

According to some embodiments, a document processing device is configured to authenticate currency bills using a first database in real-time comparison mode and a second database in a post-processing comparison mode. According to some such embodiments, the first database includes at least about 70 percent fewer serial numbers than the second database. According to some such embodiments, the first database includes at least about 90 percent fewer serial numbers than the second database. According to some such embodiments, the first database includes at least about 99 percent fewer serial numbers than the second database. According to some such embodiments, the first database includes up to about 100 serial numbers and the second database includes at least about 100 serial numbers.

Figure 11C:
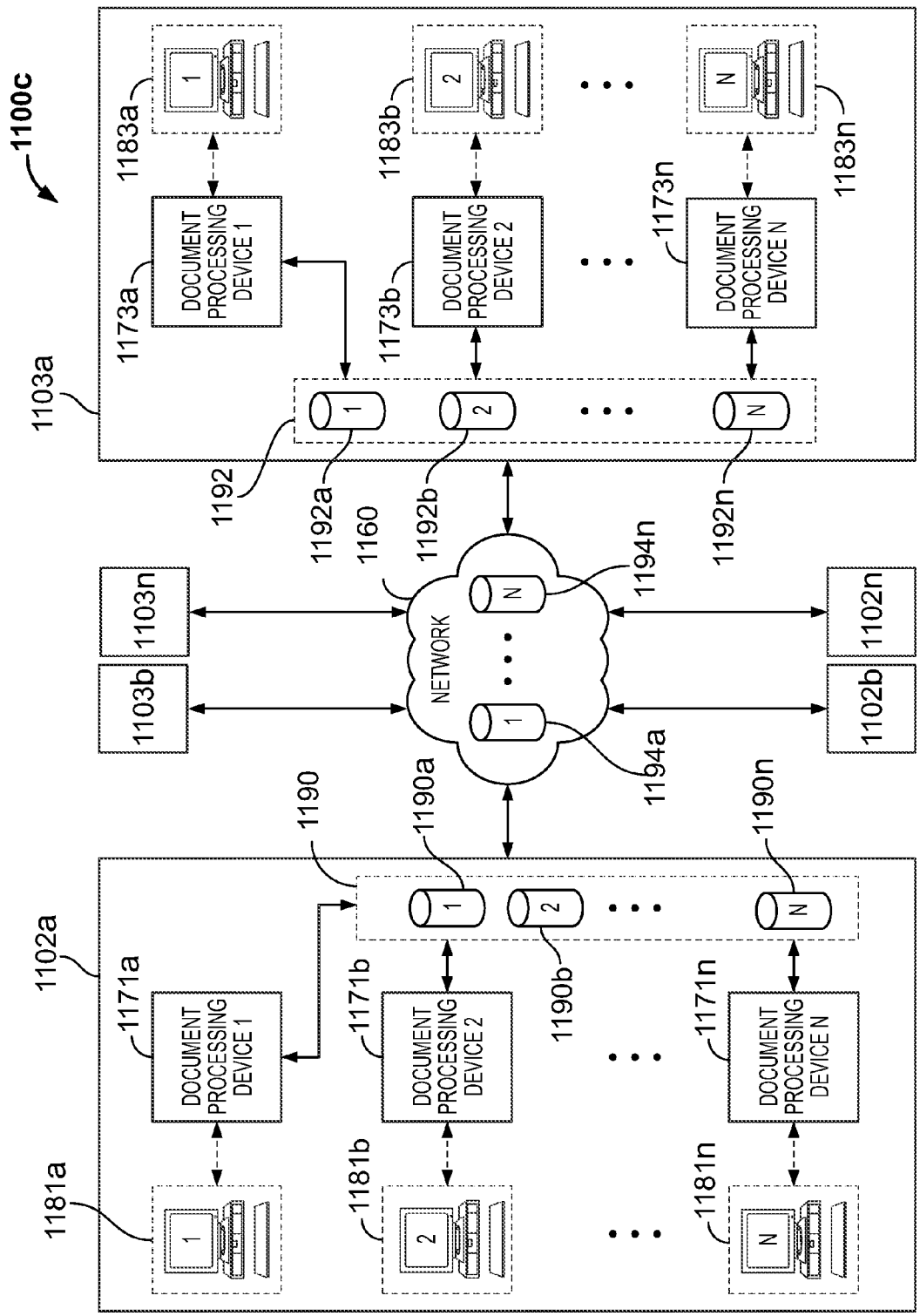
FIG. 11C is a block diagram of a document processing network according to some embodiments of the present disclosure.

Referring to FIG. 11C, a document processing network 1100c is shown according to some embodiments. The document processing network 1100c includes one or more document processing devices and/or systems and one or more databases configured to store a variety of information, such as, for example, suspect or blacklist information including currency bill identifying information (e.g., serial numbers) and/or check identifying information (MICR line data or portions thereof). According to some embodiments, the one or more databases are configured to store data files and/or records, such as the data files and records described in the Document Records and Data Files Section and in connection with FIGS. 3A-3E, and in other sections of the present disclosure.

According to some embodiments, the document processing network 1100c is maintained and configured to provide a backbone for tracking documents, updating databases of records/data files/blacklists, and/or determining if a document is a suspect document. That is, according to some embodiments, the devices, systems, and databases of the document processing network 1100c permit one or more entities, such as, for example, governmental and/or law enforcement and/or stores and/or one or more financial institutions to track and determine if currency bills and/or checks are suspect and/or associated with fraudulent activities.

According to some embodiments, the document processing network 1100c permits one or more entities, such as, for example, governmental and/or law enforcement and/or stores and/or one or more financial institutions to track non-suspect documents, such as, for example, to track genuine currency bills associated with and/or used in crimes as described in the Modes of Operation—Searching/Master Database Section, and in other sections of the present disclosure.

Additionally, according to some embodiments, the devices, systems, and databases of the document processing network 1100c permit one or more entities, such as, for example, governmental and/or law enforcement and/or stores and/or one or more financial institutions to update one or more suspect or blacklist databases with identifying information. For example, a store using a document processing device determines that a bill is a suspect bill based on one or more authentication tests, such as the authentication tests described in the Document Processing Device and System Section, and in other sections of the present disclosure. The store can transmit information associated with the determined suspect bill (e.g., serial number, denomination, series, etc.) to one or more databases storing such information such that other entities like other stores and/or banks can compare similar information associated with other bills with the information associated with the determined suspect bill to make suspect determinations. Thus, according to some embodiments, the document processing network 1100c provides a system for a multitude of stores, banks, law enforcement entities, etc. to share information like serial numbers of determined suspect bills, MICR lines of determined suspect checks, and/or serial numbers of genuine bills to help combat problems associated with counterfeit bills, fraudulent checks, etc.

The document processing network 1100c is shown as including a customer document processing system 1102a and a financial institution document processing system 1103a communicatively connected via a network 1160, although it is contemplated that a multitude of customer document processing systems 1102a,b,n and/or a multitude of financial institution document processing systems 1103a,b,n and/or a multitude of other entities, such as, for example, governmental and/or law enforcement entities can be communicatively connected via the network 1160.

The customer document processing system 1102 includes document processing devices 1171a-n and communicatively connected computers 1181a-n, although it is contemplated that the customer document processing system 1102 can include any number of document processing devices and/or computers. Similarly, the financial institution document processing system 1103 includes document processing devices 1173a-n and communicatively connected computers 1183a-n, although it is contemplated that the financial institution document processing system 1103 can include any number of document processing devices and/or computers. It is contemplated that, according to some embodiments, each of the computers 1181a-n and 1183a-n can be communicatively connected with between one and thirty document processing devices.

The document processing network 1100c includes one or more databases. The database(s) can be stored in one or more memory devices located in one or more computers and/or in one or more document processing devices. As shown, the customer document processing system 1102 includes one or more databases 1190, the financial institution document processing system 1103 includes one or more databases 1192, and the network 1160 includes one or more databases 1194a . . . 1194n. The databases 1190, 1192, 1194 are configured to store records and data files such as the records and data files described in the Document Records and Data Files Section, and in other sections of the present disclosure. Additionally, according to some embodiments, the databases 1190, 1192, 1194 are configured to store image data from which visually readable images can be reproduced and/or serial numbers of bills and MICR lines of checks, or portions thereof. According to some embodiments, the databases 1190, 1192, 1194 include records associated with suspect and/or counterfeit bills and/or checks. According to some embodiments, the databases 1190, 1192, 1194 include records associated with all bills and/or checks processed on one or more specific document processing devices and/or other information such as information provided by law enforcement entities. For example, the database 1190a can be configured to only store records associated with documents processed on the document processing device 1171a. For another example, the database 1190b can be configured to only store records associated with suspect documents.

According to some embodiments, a database (e.g., databases 1190, 1192, 1194a-n, 1440, 1540, 1541, 1640, 1680, 1685, 1690, and 1740) storing records associated with documents processed on one or more specific document processing devices can be used to enable a person or entity with access to the database, such as, for example, a store, a bank, a third party, a bank customer, a store customer, and/or a governmental or law enforcement entity to look up a record in the future for a variety of reasons. For example, a bank can look up one or more records associated with bills returned to the bank from the U.S. Federal Reserve as being counterfeit to aid in determining which customer deposited the bill and should be charged back. For another example, a bank or government entity can track large deposits of currency bills such as for creating cash letters or government required reports for deposits over, for example, $10,000. For another example, such storage of records in a database can be used to help law enforcement agencies in the case of a robbery or theft, such as described in the Modes of Operation—Searching/Master Database Section, and in other sections of the present disclosure. For another example, the storage of records can be used by a financial institution to assist in analyzing cash flow through the financial institution, which can be helpful in making decisions about ordering money from the U.S. Federal Reserve.

According to some embodiments, a database or select portion thereof (e.g., databases 1190, 1192, 1194a-n, 1440, 1540, 1541, 1640, 1680, 1685, 1690, and 1740) storing records associated with documents (bills only, checks only, bills and checks) processed on one or more document processing devices and/or systems can be sorted/arranged to be viewed on one or more communicatively connected or coupled computers and/or display devices and/or printed on one or more communicatively connected or coupled printing devices. For example, the databases containing bill and/or check records can be sorted and/or organized by transaction such that all records associated with a transaction identifier are sorted or grouped together within the database. For another example, the databases containing bill records can be sorted and/or organized by denomination such that all bill records associated each denomination are sorted or grouped together within the database (e.g. all bill records associated with $5 bills are grouped together, all bill records associated with $100 bills are grouped together, etc.). For another example, the databases containing bill records can be sorted and/or organized by denomination as described above and then further sorted and/or grouped sequentially by serial number (lowest to highest or highest to lowest) for bill records. For another example, the databases containing bill records can be sorted and/or organized by Federal Reserve Letter/Number only or by Federal Reserve Letter/Number and the further sorted and/or grouped by denomination as described above and/or separately by serial number as described above. For another example, the databases containing bill records can be sorted and/or organized by the order in which corresponding bills were stacked into a cassette or strapped in a strap of bills (e.g., strap of 100 bills).

According to some embodiments, the databases 1190a-n, 1192a-n in the customer document processing system and the financial institution document processing system, respectfully, are local databases the same as, or similar to, the first database and the databases 1194a,n are remote databases, the same as, or similar to, the second database described herein.

According to some embodiments, the customer document processing system 1102 is configured to download and/or otherwise receive information, such as, for example, suspect serial numbers and/or records associated with suspect documents from the databases 1194a-n in the network 1160 and/or from the databases 1192a-n in the financial institution document processing system 1103. The received information can be stored in a memory device of one or more of the document processing devices 1171a-n, one or more of the customer computers 1181a-n, and/or one or more of the customer databases 1190a-n. That is, according to some embodiments, the customer document processing system 1102 can update its blacklist database with additional information to aid in determining suspect documents. Additionally, according to some embodiments, in a similar fashion to downloading, the customer document processing system 1102 can upload, transfer, and/or otherwise make available information, such as, for example, records, data files, image data, serial numbers, and or MICR lines or portions thereof, to the databases 1194a-n in the network 1160 and/or to the databases 1192a-n in the financial institution document processing system 1103.

Similarly, according to some embodiments, the financial institution document processing system 1103 is configured to download and/or otherwise receive information, such as, for example, suspect serial numbers and/or records associated with suspect documents from the databases 1194a-n in the network 1160 and/or from the databases 1190a-n in the customer document processing system 1102. The received information can be stored in a memory device of one or more of the document processing devices 1173a-n, one or more of the customer computers 1183a-n, and/or one or more of the customer databases 1192a-n. That is, according to some embodiments, the financial institution document processing system 1103 can update its blacklist database with additional information to aid in determining suspect documents. Additionally, according to some embodiments, in a similar fashion to downloading, the financial institution document processing system 1103 can upload, transfer, and/or otherwise make available information, such as, for example, records, data files, image data, serial numbers, and or MICR lines or portions thereof, to the databases 1194a-n in the network 1160 and/or to the databases 1190a-n in the customer document processing system 1102.

According to some embodiments, one or more of the databases 1190 are configured to store records and/or data files associated with documents processed within the customer document processing system 1102 and different ones of the databases 1190 are configured to store blacklist information, such as suspect records, suspect serial numbers, suspect MICR lines or portions thereof. Similarly, according to some embodiments, one or more of the databases 1192 are configured to store records and/or data files associated with documents processed within the financial institution document processing system 1103 and different ones of the databases 1192 are configured to store blacklist information, such as suspect records, suspect serial numbers, suspect MICR lines or portions thereof.

Modes of Operation—Searching/Master Database

Figure 12A:
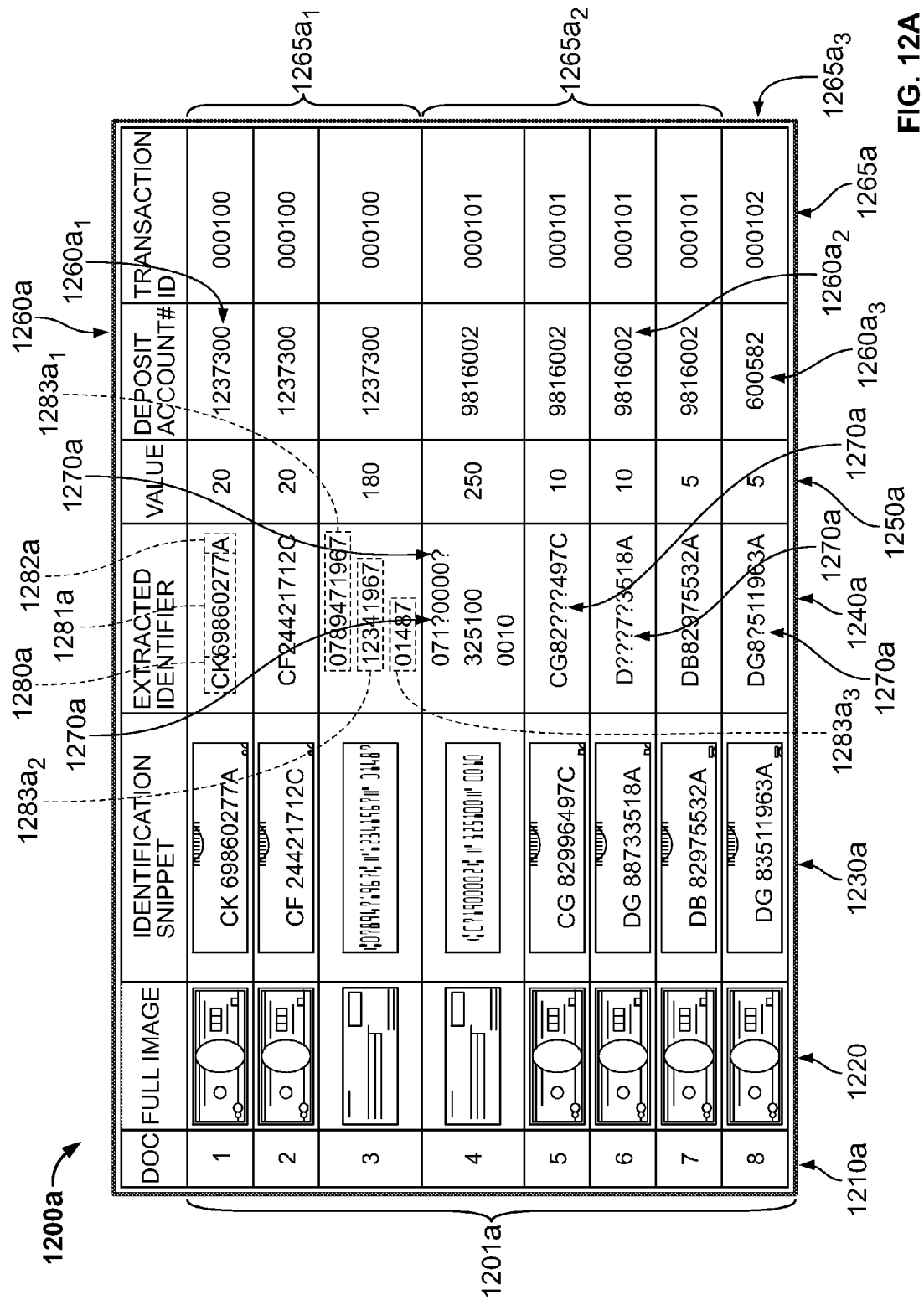
FIG. 12A is a representation of a database of records according to some embodiments of the present disclosure.

FIG. 12A illustrates exemplary records 1201a in a database 1200a created using a document processing device or system, such as, for example, the document processing system 100, the document processing device 101, the document processing device 101', and/or the document processing devices 101a,b. For ease of description, the following disclosure regarding searching and master databases is made in reference to the document processing system 100 and/or a document process system or device; however, it is understood that any of the preceding systems or devices can be used in similar or the same manners as described herein. The database 1200a is also referred to as a master database configured to store records associated with a plurality of documents processed by a document processing system. According to some embodiments, each record is associated with one or more customer account numbers and/or one or more transaction identifiers. The database 1200a can be stored within a memory (e.g., the memory 160) of the document processing system 100 and/or any other storage or memory device communicatively connected with the document processing system 100 (e.g., the memory of the computer 151, shown in FIG. 1). The information in the database 1200a can be displayed on a control panel (e.g., the control panel 170) of the document processing system 100. Alternatively or additionally, the information in the database 1200a can be displayed on any display device communicatively connected with the memory storing the database 1200a or the document processing system 100.

According to some embodiments, the records 1201a in the database 1200a are summary versions of the records 300a-d described above and shown in FIGS. 3A-D. According to some embodiments, selecting or activating a portion of one of the records 1201a causes the document processing system 100 to display the entire record, or additional data fields (e.g., data fields 330a,b; 360a,b, etc.), on the control panel 170 or other display in a similar fashion as shown in FIGS. 3A-D. For example, the operator can touch one of the identification snippet images 1230a to pull-up or display a more complete record for the respective record.

While the database 1200a illustrates records 1201a associated with currency bills and checks, it is contemplated that the database 1200a can solely include records associated with currency bills or checks. It is also contemplated that the database 1200a can include records that are associated with other types of documents, such as, for example, deposit slips. The records 1201a may include a number of data fields and/or image fields, such as the order in which a document was imaged, that is, document number 1210a. Other fields in the records 1201a may include a full image field 1220, an image field of an identification snippet 1230a, an extracted identifier field 1240a obtained using, for example, OCR techniques such as those described in the Optical Character Recognition Section, and in other sections of the present disclosure, a value field 1250a, an account number field 1260a associated with a deposit, and a transaction identifier field 1265a. For currency bills, the identification snippet is a serial number snippet, the extracted identifier is an extracted serial number, and the value is a denomination. For checks, the identification snippet is a MICR line snippet, the extracted identifier is extracted MICR line data or an extracted portion of a MICR line, and the value is a check amount. The exemplary database 1200a is associated with three deposit transactions $1265a_{1-3}$ and three separate deposit account numbers $1260a_{1-3}$ that correspond to respective accounts associated with the respective deposit transactions. It is contemplated that according to some embodiments, the database 1200a can include records associated with any number of financial transactions and/or account numbers, such as, for example, 1, 2, 10, 100, 1,000, 10,000, 1,000,000, etc. It is also contemplated that each record can, according to some embodiments, be associated with more than 1 transaction and/or more than 1 account number. For example, if a particular currency bill is deposited into the same bank three times by three different people with three different account numbers, the record associated with that currency bill can indicate the account numbers and/or transaction identifiers associated with each of those deposits. According to some other embodiments, each time a currency bill or other document is deposited, a new record can be created, which is unique from all other records associated with that same document. Other data associated with each record for a document (e.g., a currency bill or a check) can also be stored in the database 1200a such as data associated with fields 320, 311'-317', 321', 331', 332' and/or 333' described above in connection with FIG. 3A. Similarly, each record for a check may contain data associated with fields 340, 350, 341'-347', 361', 362' and/or 363' described above in connection with FIG. 3B.

According to some embodiments, one or more of the records 1201a in the database 1200a may have incomplete extracted identifier character information 1270a due to, for example, an error in the OCR and/or controller and/or the image of the character information to be extracted being unreadable by the OCR software. In FIG. 12A, individual identifier characters that were not determined during character extraction are indicated by a single wildcard character, such as, for example, a question mark "?" or an underscore "_". For example, in record 4, the routing and transit characters in the fourth and ninth positions of the check were not extracted and are thus represented by a wildcard character. For record 5, the currency bill had an eleven character serial number but the characters in the fifth through seventh character positions were not determined and are thus represented by a wildcard character. Similarly, in record 6, the characters in the second through fourth character positions and the character in the sixth character position were not determined and are thus represented by a wildcard character. In record 8, the fourth character in the serial number was not determined during the serial number extraction process and is replaced with a wildcard character.

According to some embodiments, all records in a database include an extracted identifier that has no more than a threshold number of wildcard characters. That is, according to some embodiments, an extracted identifier must be extracted with a certain degree of accuracy prior to being accepted and/or stored in the database. The threshold number of wildcard characters can be a predefined number, such as, for example, 1, 2, 3, or more. The threshold number can be preset in the software of the document processing system 100 and/or configured by an operator. If the threshold number is set at, for example, 2 wildcard characters, then during processing of documents, a document processing device or system will require operator input to correct and/or complete all extracted identifiers with more than 2 wildcard characters. For example, if a currency bill is imaged and an incomplete identifier (e.g., a serial number) is extracted during processing that results in an extracted serial number of 1234???8901, the system can prompt an operator to review the currency bill or an image of at least a portion of the currency bill to determine the missing characters and manually enter the missing characters into the document processing system 100. According to some embodiments, the operator only has to enter 1 of the 3 missing characters if the threshold number is 2.

According to some alternative embodiments, there is no threshold number of wildcard characters. In such embodiments, a record can be stored in the database with 1, 2, 3, or even all of its characters being wildcard characters. Such a record may be created for a document that has excessive soiling or wear. It is contemplated that some operators may desire to allow the document processing system 100 to continually run and store records in the database, even if an identifier cannot be extracted to increase an overall document processing efficiency. According to some embodiments, the document processing system 100 and/or device 101, 101' is configured to accept without requiring operator intervention all records associated with some denominations (e.g., $1, $2, $5, $10, and $20 or by currency USD, EUR, TKL) with any number of wildcard characters, while the system 100 and/or device 101, 101' is configured to accept records associated with other denominations (e.g., $50 and $100) only if the records contain less than a predetermined number of wildcard characters such as 3 or less wildcard characters for a given field such as a serial number field. For records associated with such other denominations having an extracted set of characters containing 4 or more wildcard characters, the system 100 and/or device 101, 101' is configured to prompt the operator (or other person receiving the records) to input some or all of the missing characters.

According to some embodiments, incomplete extracted identifier character information 1270a is corrected by an operator, such as, for example, by using interface 200c-e an/or the control panel 170 for entering missing data and/or correcting OCR errors such as described above in connection with FIGS. 9C-9E. That is, an operator can correct or enter missing identifier characters during the processing of physical documents with the document processing system 100. According to some embodiments, incomplete extracted identifier character information is not corrected by an operator, but rather, is stored in a database with missing characters. In some such embodiments, the incomplete identifier character information is acceptable because the number of wildcard characters is less than the threshold number for that document type.

According to some embodiments, the extracted identifier field 1240a of the records 1201a associated with U.S. currency bills includes a number of alphanumeric characters including alpha character fields 1280a, 1282a and a numeric field 1281a. For example, according to some embodiments, in the first alpha field 1280a, the first letter can refer to the series of a currency bill (e.g., document 1 from FIG. 12A is a series C currency bill and document 6 from FIG. 12A is a series D currency bill). The second letter in the first alpha field 1280a can refer to one of the twelve U.S. Federal Reserve Banks that ordered the particular currency bill. The second alpha field 1282a can be used to designate the number of times a particular numeric portion of a serial number has been used. A currency bill of a particular denomination may have a unique serial number field based on the alphanumeric characters printed on the currency bill, but it is possible for an authentic currency bill to have the same exact numeric serial number portion 1281a as another authentic currency bill. For example, one $20 currency bill could have the alphanumeric serial number of AA12345678A and another $20 currency bill could have the alphanumeric serial number of AA12345678B. While the numeric portion of the serial number is identical for both $20 currency bills, the alphanumeric serial numbers are unique for each currency bill (e.g., the field 1282a "A" and "B" being different). According to some embodiments, the extracted identifier field 1240c of the records 1201a associated with checks can include one or more of the following: an amount field, an on-us field, a transit and routing field, and/or an auxiliary on-us field. As shown in FIG. 12A, the extracted identifier field 1240c includes a routing and transit number field $1283a_1$, an account number field $1283a_2$, and a check number field $1283a_3$. It is contemplated that according to some embodiments, the extracted identifier field 1240c can include more or less information.

Referring to FIG. 12B, a database 1200b created using a document processing device or system, such as, for example, the document processing system 100, the document processing device 101, the document processing device 101', and/or the document processing devices 101a,b is shown according to some embodiments. The database 1200b is similar to the database 1200a. The database 1200b includes a plurality of exemplary records 1201b associated with currency bills. The records 1201b include a number of data fields and image fields, such as the order in which a currency bill was imaged—here shown as Document ID column or fields 1210b. Other columns or fields include an image field of a serial number snippet 1230b, an extracted serial number field 1240b obtained using, for example, OCR techniques as described above, and a document type field 1285. In the illustrated embodiment, the document type for all the records 1201b is "Currency Bill." According to other embodiments, the document type may also include check, deposit slip, etc. It is contemplated that according to some embodiments, various other fields may be included in the database 1200b, as discussed above in connection with FIGS. 12A and 3A-3D.

Referring generally to FIGS. 12C-12F, according to some embodiments, an operator of a document processing device or system, such as, for example, the document processing system 100, the document processing device 101, the document processing device 101', the document processing devices 101a,b, the customer document processing system 102, and/or the financial institution system 103, can perform a search using a search algorithm to search a database, such as, for example, the database 1200a,b for one or more records 1201a,b (e.g., records 300a-d, 305a-h) associated with one or more documents. According to some embodiments, the operator searches the one or more databases with one or more target identifiers. According to some embodiments, a target identifier only includes alphanumeric characters. According to some other embodiments, a target identifier includes alphanumeric characters and one or more wildcard characters, such as, for example, eight alphanumeric characters and three single wildcard characters (e.g., "?") or seven alphanumeric characters and one multiple wildcard character (e.g., "%"). For another example, the operator can search for currency bill records by entering a complete currency bill serial number, a portion of a currency bill serial number, or a portion of a currency bill serial number and one or more wildcard characters and/or a currency bill denomination into, for example, the control panel 170 of the document processing system 100. For another example, the operator can search for a check record by entering MICR line characters, a portion of a MICR line, or a portion of a MICR line and one or more wildcard characters that can include, for example, an amount, an on-us number, an auxiliary on-us number, a routing and transit number, a customer account number, and/or a check number, into, for example, the control panel 170 of the document processing system 100.

According to some embodiments, the database 1200a,b can be queried and/or searched to find, for example, a record associated with a suspect or known counterfeit currency bill.

According to some embodiments, the database 1200*a,b* can be queried to find a data file including and/or associated with a record. Non-limiting examples of searches are described herein in reference to the document processing system 100 for ease of description; however, it is understood that according to varying embodiments the document processing device 101, the document processing device 101', the document processing devices 101*a,b*, the customer document processing system 102, the financial institution system 103, and/or a computer communicatively connected to the memory storing the database(s) can each be used to perform the same or similar searches.

According to some embodiments, the document processing system 100 includes a memory, such as, for example, the memory 160, and/or is communicatively connected to a memory that stores the database 1200*a,b* including the records 1201*a,b*. According to some embodiments, the database(s) 1200*a, b* (and/or 1440, 1540, 1541, 1640, 1680, 1685, 1690, 1740 of FIGS. 14-17) can be searched for records of currency bills having one or more of the following target identifiers: a target serial number, a target denomination, a target series, a target back plate number, a target check letter and quadrant number, a target check letter and face plate number, a target Federal Reserve letter/number, etc. and/or ranges in the corresponding fields. For example, an operator might search a currency database for records of all bills matching a subgroup of these target identifiers, such as, for example, all records for bills with the Federal Reserve Bank number 11, check letter quadrant number 4, back plate number 5, series 1990, and denomination $100. According to some embodiments, the database can be searched for records of checks having one or more of the following target identifiers: a target account number, a target bank number (routing or transit number), a target check amount, a target check number, a target date of check, etc. and/or ranges in the corresponding fields such as a range of checks amounts and/or dates. As described in more detail below, searches such as for currency bills and/or checks can be performed that require exact matching, matching for digits stored as wildcards, for example, "?", 1-difference matching, etc.

According to some embodiments, the operator enters or otherwise inputs a target identifier, such as a target serial number of a currency bill into the document processing system 100 via the control panel 170. Alternatively, the operator can input the target serial number into an input device communicatively connected to the document processing system 100. According to some embodiments, the operator enters or otherwise inputs a target serial number and a target denomination. That is, the target identifier includes a serial number portion and a denomination portion. According to some such embodiments, a target denomination may be required to distinguish between two currency bills having the same exact serial number. As shown in FIGS. 12C-12F, the target denomination is not limited to a specific denomination or currency, but rather includes all denominations within the selected currency (e.g., USD1, USD2, USD5, USD10, USD20, USD20, USD50, and USD100)—that is, the system 100 will search all records regardless of denomination. As shown in FIG. 12G, the target denomination is limited solely to USD100—that is, the system 100 only searches for a matching record associated with a $100 bill.

According to some embodiments, the target serial number corresponds to the serial number of a currency bill that has been identified as being counterfeit, such as, by the Federal Reserve Bank or Secret Service. According to some embodiments, the target serial number is a serial number of interest. For example, the target serial number can be the serial number of a suspect currency bill or the target serial number can be the serial number of a genuine currency bill, such as, for example, a laundered currency bill (e.g., drug money), a currency bill involved with a crime, a theft, and/or a ransom. According to some embodiments, the target serial number corresponds to a portion of a serial number of a currency bill and one or more wildcard characters. Various other reasons for querying a serial number or a check MICR line are contemplated, such as, for example, law enforcement purposes. For another example, in a Bank setting, an operator of a device, such as, for example, an imaging MPS in a back room or vault of the Bank, might desire to search for a record including a serial number of a currency bill determined to be suspect via the imaging MPS. According to some embodiments, the operator searches the database to determine which teller in the Bank accepted the suspect bill and from which customer. According to some embodiments, the operator can then take responsive action, such as, for example, notifying a bank manager, initiating an investigation, etc.

For another example, many banks include one or more bundles of currency bills with prerecorded serial numbers and/or prerecorded denominations in each teller draw and/or at each teller station. When a bank robber holds up the bank, the tellers are trained to give these bundles of currency bills to the bank robber. Thus, law enforcement agencies can use the prerecorded serial numbers and/or denominations to track the stolen money. For example, the prerecorded serial numbers and/or denominations can be added to a database such as a stolen money database and/or a crime money database, similar to a blacklist database according to the present disclosure. Thus, when banks and/or other entities use one or more document processing systems or devices according to the present disclosure to process currency bills, the serial numbers and/or denominations of the processed currency bills can be extracted and compared to the serial numbers and/or denominations of the currency bills included in the crime money database. When a match occurs, law enforcement agencies can be notified and provided information associated with how a particular entity having a document processing system came to be in possession of currency bills having serial numbers and/or denominations matching those stored in the stolen money database. For example, when a bank receives a deposit including currency bills from a customer, the teller can run the money through a document processing system or device as described in the present disclosure. The document processing system or device images each received bill, denominates each bill, and extracts the serial number of each bill. Data files and/or records are generated for the deposit transaction as described herein. In addition to serial number and denomination information the data file and/or records may include information associating the deposit of each bill with a customer who deposited the currency bills and/or the customer account which was credited for the associated deposit. Thus, a match can help the law enforcement agencies track the stolen money and/or find the bank robber or a bank account associated with the bank robber or provide leads for law enforcement personnel by allowing them to determine into which accounts stolen currency bills were deposits and thus investigate the owner of such accounts and/or question them about how they came into possession of the stolen currency bills.

For another example, law enforcement agencies may desire to track currency bills deposited and/or withdrawn from one or more financial institution accounts, such as, for example, a bank account of a suspected drug dealer, criminal, money launderer, etc. According to some such embodiments, with a proper subpoena, the law enforcement agencies can create or develop a database by denomination and/or serial number for currency bills withdrawn and/or deposited in one or more target bank accounts. Law enforcement agencies can then enter these serial numbers and/or denominations in one or more databases in cooperating banks such that any genuine currency bills deposited at the cooperating banks that match a serial number and/or denomination in the database can be flagged according to one or more of the flagging modes described above in the Modes of Operation—Flagging Section, and in other sections of the present disclosure. Such a flagging operation of the matching-deposited currency bills can help the law enforcement agencies to identify the customer(s) making the deposit(s) or otherwise understand the flow of currency bills among one or more persons involved in or associated with persons involved in criminal activity. According to some such embodiments, the law enforcement can track the serial numbers in the database to identify patterns or flow of the currency between one or more bank accounts to help identify target customer(s) and/or other individuals associated with the target customer(s) and one or more currency bills matching the data in the database.

According to some embodiments, the flagging may simply involve tagging a record or data file associated with a currency bill having parameters matching one or more parameters or specific combinations of parameters in a crime money database. According to some such embodiments, bank personnel such as bank personnel running one or more document processing devices in a bank would not have to be alerted to the occurrence of a match to the information in a crime money database. Rather, the document processing system could be configured to only alert law enforcement or a law enforcement computer system and/or only selected individuals within a bank. According to some embodiments, information related to deposited currency bills such as information in the above described data files or records is simply sent to or provided to law enforcement personnel and/or law enforcement computer systems, and comparison of data to data in a crime money database is performed by law enforcement personnel and/or on law enforcement computer systems.

According to some embodiments, a target serial number of a currency bill has 11 or 10 characters, that is, the serial number includes M characters, where M equals 11 or 10 depending on the series of the currency bill. According to some such embodiments, all of the M characters are alphanumeric characters. According to some other embodiments, one or more of the M characters is a wildcard character. According to some embodiments, the operator can search for currency bills having all M characters or some integer amount less than M characters. For example, the operator can input M or M−X number of characters into the document processing system or device, where M equals 11 or 10 and X can equal 0, 1, 2, 3, 4, etc. Similarly, according to some embodiments, the operator can enter or otherwise input at least a portion of a target MICR line of a check that has between about 25 and 65 alphanumeric characters. That is, the MICR line includes M characters where M can equal any number between about 25 and 65. In some such embodiments, the operator can search for checks having all M characters or some integer amount less than M characters. For example, the operator can input M-X characters, where M-X equals the total number of characters in a routing and transit field of the MICR line (e.g., 9 numeric characters), the on-us field of the MICR line, the amount field in the MICR line, or any combination thereof. According to some embodiments, the operator can input M-X characters into the document processing system, where the M-X characters include one or more wildcard characters. For example, a target serial number can be entered as follows: ?B12345678A, ?B12345678?, %345678A, %12345%.

In response to receiving a target identifier, the document processing system 100 searches or queries one or more databases looking for any records including an extracted identifier (e.g., 1240a) that matches the target identifier. According to some embodiments, the document processing system 100 is configurable to perform one or more types of searches to find one or more stored records associated with one or more documents. It is contemplated that an operator of the document processing system 100 can select the type of search to be performed from, for example, a dropdown window. Alternatively or additionally, the type of search can be preprogrammed into the document processing system 100 as a default search.

According to some embodiments, the document processing system 100 can perform a basic-exact-match search. The basic-exact-match search entails an operator entering a complete target identifier (e.g., 10 character serial number) with no missing characters and no wildcard characters. In response to receiving the complete target identifier, the document processing system 100 searches or queries one or more databases to find a record that includes an extracted serial number with 10 characters that exactly match the target serial number in both value and position. For example, as shown in FIG. 12C, an operator entered a complete 10 character target serial G71154353A 1241c. The document processing system 100 returned a single record result 1201c because the record 1201c was the only record in the queried databases that included a 10 character extracted serial number that exactly matched the target serial number.

According to some embodiments, the document processing system or device is configurable to perform a wildcard-exact-match search. The wildcard-exact-match search entails an operator entering a complete target identifier (e.g., 10 character serial number) with no missing characters and no wildcard characters. In response to receiving the complete target identifier, the document processing system or device searches or queries one or more databases to find one or more matching records that include an extracted serial number having 10 characters, where between 0 and 10 of the characters of the extracted serial number are wildcard characters and the rest of the characters exactly match the target serial number in both value and position. That is, a record including an extracted serial number having wildcard characters will result in a matching record if the non-wildcard characters of the extracted serial number exactly match the target serial number. For example, in a wildcard-exact-match search the following extracted serial numbers will result in a wildcard-exact-match for a target serial number of G12345678A: G12345678A, ?12345678?, ?12345678A, ????????8A, %8A, and G123???78A.

According to some embodiments, a wildcard-exact-match search can result in many records because there is no limit to the number of wildcard characters in matching results. Thus, according to some embodiments, the wildcard-exact-match search can be modified to limit the number of wildcard characters in matching results. Such searches are referred to herein as a 1-wildcard-exact-match search, a 2-wildcard-exact-match search, a 3-wildcard-exact-match search, etc.

A 1-wildcard-exact-match search entails an operator entering a complete target identifier (e.g., 10 character serial number) with no missing characters and no wildcard characters. In response to receiving the complete target identifier, the document processing system or device searches or queries one or more databases to find one or more matching records that include an extracted serial number having 10 characters, where no more than 1 of the characters of the extracted serial number is a wildcard character and the rest of the characters exactly match the target serial number in both value and position. That is, a record including an extracted serial number having one or fewer wildcard characters will result in a matching record if the non-wildcard characters of the extracted serial number exactly match the target serial number in both value and position. For example, in a 1-wildcard-exact-match search the following extracted serial numbers will result in a 1-wildcard-exact-match for a target serial number of G12345678A: G12345678A, ?12345678A, G1234?678A, G1234567?A, G1234567% A. Similarly, the following extracted serial numbers will not result in a 1-wildcard-exact-match for a target serial number of G12345678A: G1234567??, ?12345678?, ??????678A, ??234567?A, C12345678A, C?2345678A.

According to some embodiments, the document processing system 100 is configurable to perform an x-degree-of-freedom search, such as, for example, a 1-degree-of-freedom search, a 2-degree-of-freedom search, 3-degree-of-freedom search, etc. The x-degree-of-freedom search entails an operator entering a complete target identifier (e.g., 11 character serial number) with no missing characters and no wildcard characters. In response to receiving the complete target identifier, the document processing system 100 searches or queries one or more databases to find one or more matching records that includes an extracted serial number that exactly matches the target serial number in all character positions but x, where x is 1, 2, 3, etc. For example, for a 1-degree-of-freedom search (x=1), the document processing system 100 attempts to match 1 (x=1) fewer characters than all of the inputted target identifier characters, that is, a 1 character difference or deviance between the complete target identifier (e.g., target serial number 1241*d*) and an extracted serial number will result in a 1-degree match for a 1-degree-of-freedom search. For another example, in a 1-degree-of-freedom search the following extracted serial numbers will result in a 1-degree match for a target serial number of GA12345678A: CA12345678A, ?A12345678A, and GA123?5678A. For yet another example, in a 3-degree-of-freedom search, the following extracted serial numbers will result in a 3-degree match for a target serial number of GA12345678A: GA12345678A, CA12345678A, ??12345678?, and CB12345678B. Thus, a 3-degree-of-freedom search will produce 1-degree matches, 2-degree matches, and 3-degree matches.

According to some embodiments, an operator does not have a complete target identifier, but rather has a portion of an identifier to search. For example, a law enforcement agency like the secret service might be interested in searching a database for all records including 11 character extracted serial numbers, where the first 8 characters of the serial numbers are GA123456. For another example, a law enforcement agency might be interested in searching a database for all records including 11 character extracted serial numbers, where the first 4 characters of the serial numbers are GA12 and the last 2 characters are 8A. For yet another example, an operator simply might not know or only have a portion of a target serial number, such as, if a portion of the target serial number is unreadable. According to some embodiments, the document processing system or device can perform such searches according to one or more different searching criteria. For example, the document processing system 100 can perform a basic-wildcard-placeholder search or an expanded-wildcard-placeholder search.

A basic-wildcard-placeholder search entails an operator entering a portion of a complete target identifier (e.g., 9 characters of an 11 character serial number) with wildcard characters in place of any non-entered identifier characters (e.g., unknown or missing serial number characters). In response to receiving the portion of the complete target identifier with one or more wildcard placeholders, the document processing system or device searches or queries one or more databases to find one or more matching records that include all extracted serial numbers having 11 characters, where the portion of the complete target serial number exactly matches the non-wildcard characters of the extracted serial number. For example, in a basic-wildcard-placeholder search the following extracted serial numbers will result in a basic-wildcard-placeholder-match for a target serial number of GA123456??? or GA123456%: GA12345678A, GA12345611B, GA12345699?, and GA123456??C. Similarly, the following extracted serial numbers will not result in a basic-wildcard-placeholder-match for a target serial number of GA123456???: GA12995678A, ?A123488878?, ??????178A, ???234887?A, GB12345678A, and ?A12345678A. For another example, in another basic-wildcard-placeholder search the following extracted serial numbers will result in a basic-wildcard-placeholder-match for a target serial number of GA12?????8A: GA12345678A, GA12349978A, GA12555558A, and GA12?????8A. Similarly, the following extracted serial numbers will not result in a basic-wildcard-placeholder-match for a target serial number of GA12?????8A: GA11995678B, ?A88345678?, ??????678B, ???23456799?, and ?A12345678A.

An expanded-wildcard-placeholder search entails an operator entering a portion of a complete target identifier (e.g., 9 characters of an 11 character serial number) with wildcard characters in place of any non-entered identifier characters (e.g., unknown or missing serial number characters). In response to receiving the portion of the complete target identifier with one or more wildcard placeholders, the document processing system or device searches or queries one or more databases to find one or more matching records that include all extracted serial numbers having 11 characters, where any number of the characters of the extracted serial number are wildcard characters and the non-wildcard characters exactly match the portion of the complete target serial number. For example, in an expanded-wildcard-placeholder search the following extracted serial numbers will result in an expand-wildcard-placeholder-match for a target serial number of GA123456??? or GA123456%: GA12345678A, ??12345678A, and GA1234?678?. Similarly, the following extracted serial numbers will not result in an expanded-wildcard-placeholder-match for a target serial number of GA123456??? or GA123456%: GA12995678A, ?A12348878?, ??????178A, ???234887?A.

According to some embodiments, the document processing system or device is configurable to perform an exact-string-match search. An exact-string-match search returns records including extracted identifiers that have an equal number of characters or more characters than the number of inputted characters of the target string of identifier characters. For example, for a target string of 8 identifier characters, all results must have 8 or more identifier characters. The exact-string-match search entails an operator entering a target string of identifier characters (e.g., a string of 8 identifier characters) with no wildcard characters. In response to receiving the target string of identifier characters, the document processing system or device searches or queries one or more databases to find one or more matching records that include an extracted serial number having, for example, 11 characters, where any string of 8 characters within the extracted serial number exactly match the target string of identifier characters. For example, in an exact-string-match search of currency bill serial numbers the following extracted serial numbers will result in an exact-string-match for a target string of identifier characters of GA123456: GA12345678A, GA123456???, ???GA123456, 90GA123456A, and GA12345678. Similarly, the following extracted serial numbers will not result in an exact-string-match for a target string of identifier characters of GA123456: GA12345?78A, GA12345978A, ?B12345678?, 654321AG78A, 654321AG???, GA1234578A, and A123456???.

According to some embodiments, the document processing system or device is configurable to perform a custom search. A custom search entails an operator entering a complete target identifier (e.g., 11 characters of an 11 character serial number) or a portion of a complete target identifier (e.g., 9 characters of an 11 character serial number) with a wildcard character in place of any non-entered identifier characters (e.g., 2 wildcard characters). Additionally, a custom search entails the operator providing customized search rules, including how many individual characters of a target serial number (complete or partial) are to exactly match a character value and a character position of a stored serial number in a database to result in a custom-match. The operator can also specify if a matching serial number must have the same number of characters as the target identifier, or if a serial number with a different number of characters but otherwise matches can result in a custom-match (e.g., 9 characters of a 10 character serial number exactly match 9 characters of an 11 character target serial number). In response to receiving the customized search rules and the target identifier (complete or portion), the document processing system or device searches or queries one or more databases to find one or more records that match the target based on the custom search rules. For example, a target serial number includes 11 characters, GA12345678A, and the customized search rules provide that 9 of the 11 characters have to exactly match in both value and position an 11 character serial number for a record (e.g., record 1201c) from a database to be displayed as a custom-match. In such a custom search the following extracted serial numbers will result in a custom-match for the target serial number of GA12345678A: GA12345678A, ??12345678A, GA1234?678?, ?A12345678B, and CA12345678A. Similarly, the following extracted serial numbers will not result in a custom-match for a target serial number of GA12345678A: GA12999678A, ?A1234567??, ?412345678B, and GA12345678.

Referring back to FIG. 12C, a display or operator interface displaying a search result summary 1200c of a basic-exact-match search is shown according to some embodiments. According to some embodiments, the search result summary 1200c is displayed on control panel 170/170' of the document processing device 101/101' and/or on some other display or monitor such as a monitor communicatively connected to the computer 151. The search result summary 1200c indicates that the operator inputted a 10 character target serial number of G71154353A and the document processing system 100 found an exact match (that is a match for the basic-exact-match search), as evidenced by record 1201c being displayed including an extracted serial number 1240c that exactly matches the target serial number 1241c. The record 1201c can include an image field of a serial number snippet 1230c, an extracted serial number 1240c that exactly matches the target serial number 1241c, a currency bill denomination 1250c, a device identification 1261c, a processing time stamp 1262c, a batch number 1263c, and/or a subbatch number 1264c. The operator can view the serial number snippet 1230c and/or the currency bill denomination 1250c to confirm that the record 1201c in fact corresponds to the target serial number 1241c and a denomination of interest. For example, the record 1201c may include a serial number snippet 1230c that matches the target serial number 1241c, but the record 1201c is for a $2 currency bill and the operator might have been looking for a $10 currency bill. Such a result is possible as serial numbers can be identical for different denominations of U.S. currency bills. According to some such embodiments, the operator can further limit the search to a particular denomination. According to some embodiments, the operator can activate or select a portion of the record 1201c to cause the document processing system to pull up or display a more complete record associated with the target serial number such as that illustrated in FIGS. 3A,C-D.

According to some embodiments, a display such as interface 170, 170' may only display the serial number snippet(s) 1230c and/or extracted serial number(s) 1240c for matching records. According to some embodiments, the displayed records are configured to be selection elements (such as touchscreen keys) the selection of which causes the device 101/101' to pull up or display a more complete record associated with a selected selection element. For example, the display may initially only display serial number snippets of matching records and the operator then touches one of the displayed snippets to see more information about the selected record. In response to the operator touching the screen over a displayed snippet, the device displays a full record associated with the selected snippet, such as, the records shown in FIGS. 3A,C-D.

According to some embodiments, the record 1201c can alternatively or additionally include an account number (e.g., account number 1260$a_{1-3}$ or account number 331' of FIG. 3A) associated with a customer that deposited the currency bill under search and/or the account which was credited for the deposit of the particular currency bill associated with the matching record, here the currency bill bearing serial number G71154353A. According to some such embodiments, the operator can use the account number of the matching record to charge-back the customer's financial account an amount equal to a value of the currency bill bearing the target or suspect serial number.

For example, according to some embodiments, using teller software, the operator can manually access the customer's financial account maintained in, for example, an accounting system (e.g., banking system 460 of FIGS. 4A and 4B) to debit the value of the currency bill (e.g., two dollars as shown in FIG. 12C). According to some such embodiments, the document processing system or the document processing device automatically generates a charge-back instruction including, for example, information from or with which the correct account to be debited can be determined such as the account number from the matching record. According to some embodiments, the charge-back instruction may contain additional information such as the value of the currency bill bearing the matching serial number and/or other data or images associated with the matching record.

For another example, according to some embodiments, the search result summary 1200c includes a charge-back button or element 1295c. For a search result summary, such as the search result summary 1200c, where a single exactly matching record 1201c is displayed for the basic-exact-match search, the operator can select or activate the charge-back button 1295c to automatically charge-back the customer's financial account the amount equal to the value of the currency bill bearing the target or suspect serial number. Alternatively, the operator can select or activate the charge-back button 1295*c* to automatically generate a charge-back instruction as described above in reference to FIGS. 4A-B, 5A-B, and 6.

According to some embodiments, the display or operator interface displays or includes a new search button or element 1294. According to some embodiments, the operator can activate or select the new search button or element 1294 to begin a new search. For example, in the search result summary 1200*d* shown in FIG. 12D, the operator performed a different basic-exact-match search querying a target serial number of C71154353A. As evidenced by the zero number of records being displayed, the inputted or target serial number 1241*d* did not exactly match any serial numbers stored in the database 1200*a,b*. Put another way, each character of the inputted or target serial number—C, 7, 1, 1, 5, 4, 3, 5, 3, A—did not exactly match corresponding characters in like positions of any one of the serial numbers stored in the database 1200*a,b*. That is, none of the serial numbers in the database had the same alphanumeric characters in the same character positions as the target serial number. Such a search result summary as the search result summary 1200*d* may occur due to a variety of reasons. For example, the operator may have inputted the serial number 1241*d* incorrectly. For another example, the serial numbers stored in the database 1200*a,b* may have been OCRed incorrectly or an operator may have incorrectly entered missing data/characters when prompted to correct and/or complete an extracted serial number using the features described above in relation to FIGS. 9C, 9D, and 9E. For another example, the currency bill bearing the matching serial number may have been incompletely OCRed such that a record associated with the target serial number is not displayed as an exact match because one or more wildcard characters appear in the extracted serial number field, which prevents a match in a basic-exact-match search. Alternatively, the currency bill bearing the matching serial number may not have been imaged and had its serial number extracted by the document processing system or device.

Referring to the inputted serial number 1241*d*, the inputted serial number 1241*d* includes ten characters—C, 7, 1, 1, 5, 4, 3, 5, 3, A—and ten distinct character positions, wherein the "C" is in a first position, the "7" is in a second position, etc. Thus, the inputted or target serial number 1241*d* includes ten characters with each of the ten characters located in one of the ten distinct character positions. As described above, the zero number of records shown in FIG. 12D occurred because none of the extracted serial numbers stored in the database 1200*a,b* exactly match the target serial number 1241*d* characters (e.g., "C" "7") in both character value (e.g., "C", "1") and character position (e.g., first, third).

According to some embodiments, the operator can select the new search element 1294 to perform another search, such as, for example, another basic-exact-match search, a wildcard-exact-match search, a basic-wildcard-placeholder search, an expanded-wildcard-placeholder search, and exact-string-match search, or an x-degree-of-freedom search. Alternatively, the operator can activate and/or select an operator-selectable element or character difference button 1290*d*, also called a "1-difference" button, to modify and/or broaden the searching algorithm parameters according to the 1-degree-of-freedom search. Thus, activating or selecting the 1-difference button 1290*d* initializes and/or triggers a new search that causes the searching algorithm to search the serial number database 1200*a,b* under 1-degree-of-freedom search parameters. According to some alternative embodiments, selecting and/or activating the 1-difference button 1290*d* causes the document processing system or device to perform a 1-wildcard-exact-match search. According to some embodiments, the 1-degree-of-freedom search is broader than the 1-wildcard-exact-match search in that the 1-degree-of-freedom search will return extracted identifiers as matches that exactly match the target identifier except for one deviant character, which include a wildcard character or a miscalled character (e.g., an incorrectly extracted character). Whereas, a 1-wildcard-exact-match search will not return an extracted identifier as a match that exactly matches the target identifier except for one miscalled character.

According to some alternative embodiments, a 1-degree-of-freedom search can be automatically performed in response to a basic-exact-match search failing to produce any matching records. Similarly, according to some alternative embodiments, a 2-degree-of-freedom search can be automatically performed in response to a 1-degree-of-freedom search failing to produce any matching records.

Figure 12E:
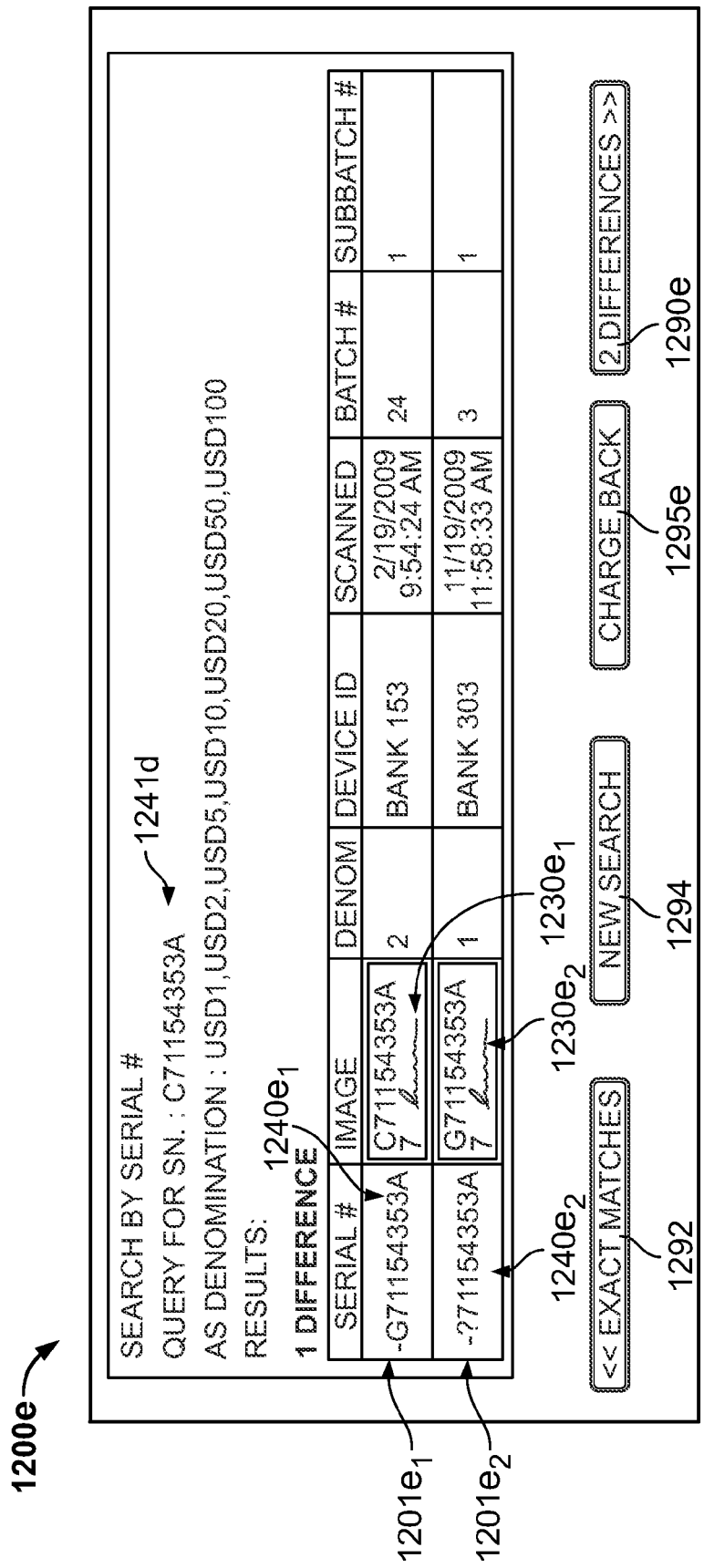
FIG. 12E is a representation of a secondary search of the another search of FIG. 12D according to a modified set of parameters.
Figure 12G:
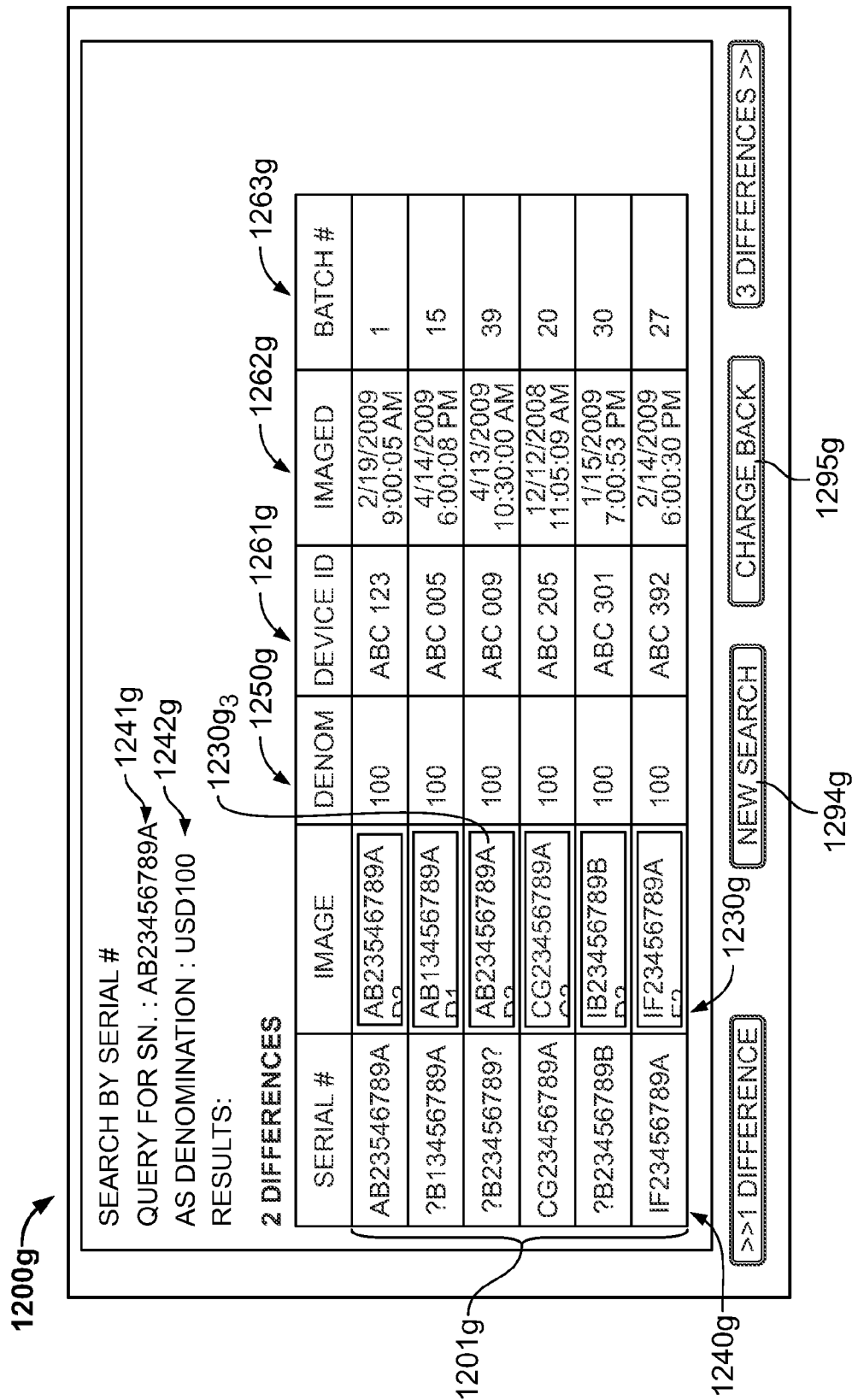
FIG. 12G is a representation of a search result summary of a search according to some embodiments of the present disclosure.

Now referring to FIG. 12E, in response to an operator activating or selecting the difference button 1290*d* (FIG. 12D), the document processing system or device (such as via a searching algorithm) performs a secondary search according to a modified set of parameters. According to some embodiments, the secondary search according to the modified set of parameters is a 1-degree-of-freedom search. Yet, according to other embodiments, the secondary search according to the modified set of parameters is a 1-wildcard-exact-match search. As shown in FIG. 12E, two records 1201*e*$_1$ and 1201*e*$_2$ are shown as 1-degree matches for a 1-degree-of-freedom search. According to some embodiments, the first record 1201*e*$_1$ at least includes a serial number snippet 1230*e*$_1$ and an extracted serial number 1240*e*$_1$. The operator can visually compare the target serial number 1241*d* with the serial number snippet 1230*e*$_1$ and/or the extracted serial number 1240*e*$_1$ to determine if the target serial number 1241*d* in fact matches one or both of the serial number snippet 1230*e*$_1$ and the extracted serial number 1240*e*$_1$ or if a typographical or OCR error might have occurred. As illustrated in the example in FIG. 12E, the extracted serial number 1240*e*$_1$ in the first record 1201*e*$_1$ is identical to the target serial number except for a difference in the value of the character in the first character position—the first character in the target serial number being a "C" and the first character in the extracted serial number field 1240*e*$_1$ being a "G". Thus, first the record 1201*e*$_1$ includes the extracted serial number 1240*e*$_1$ that has one deviant character, which under the 1-degree-of-freedom search results in a 1-degree match.

According to some embodiments, the operator might recognize that the target serial number 1241*d* was inputted into the document processing system or device incorrectly. That is, the operator inputted a target serial number of C71154353A, but really intended to input a target serial number of G71154353A, which exactly matches the first record 1201*e*$_1$. In this scenario, the operator could correctly identify the first record 1201*e*$_1$ as the desired record and proceed with any necessary charge-backs, etc. Alternatively or additionally, the operator might recognize that the extracted serial number 1240*e*$_1$ does not correctly correspond with the serial number snippet 1230*e*$_1$; however, the target serial number 1241*d* does correspond with the serial number appearing in the serial number snippet 1230*e*$_1$. In this example, because the document processing system or device searches the characters stored in the extracted serial number field 1240*e*$_1$ and not the serial number snippet 1230*e*$_1$ directly, the operator could correctly identify the first record 1201*e*$_1$ as the desired record and proceed with any necessary charge-backs and/or cause the document processing system or device to generate a charge-back instruction as described above. Additionally, according to some embodiments, the document processing system or device may be configured to permit the operator to edit the first record $1201e_1$ to correct the error in the extracted serial number field $1240e_1$, changing the "G" to a "C" as reflected in the serial number snippet $1230e_1$.

The second record $1201e_2$ is shown as shown as 1-degree match for the 1-degree-of-freedom search. According to some embodiments, the second record $1201e_2$ at least includes a serial number snippet $1230e_2$ and an extracted serial number $1240e_2$. The operator can visually compare the target serial number $1241d$ with the serial number snippet $1230e_2$ and/or the extracted serial number $1240e_2$ to determine if the target serial number $1241d$ in fact matches one or both of the serial number snippet $1230e_2$ and the extracted serial number $1240e_2$ or if one or more characters are missing or if a typographical or OCR error might have occurred. As illustrated in the example in FIG. 12E, the extracted serial number $1240e_2$ in the second record $1201e_2$ is identical to the target serial number except for the character in the first character position being a wildcard character or a no-call character—the first character in the target serial number being a "C" and the first character in the extracted serial number field $1240e_2$ being a "?". Thus, second the record $1201e_2$ includes the extracted serial number $1240e_2$ that has one deviant character, which under the 1-degree-of-freedom search results in a 1-degree match. According to some embodiments, the operator can inspect the serial number snippet $1230e_2$ to determine that the second record is not an exactly matching record despite having an incomplete extracted serial number $1240e_2$.

According to some embodiments, a search result summary $1200e$, as shown on a display or operator interface (e.g., operator interface 170), displays or contains a charge-back button or element $1295e$, a new search button or element 1294, an exact match button or element 1292, and/or an operator-selectable element or character difference button $1290e$, also called a "2-difference" button. According to some embodiments, after reviewing the record $1201e$, the operator can activate or select the new search button or element 1294, the exact match button or element 1292, or the operator-selectable element or character difference button $1290e$. According to some embodiments, activation of the exact match button 1292 causes the document processing system or device to perform a basic-exact-match search, which displays the results of FIG. 12D. According to some embodiments, selection or activation of the charge-back button $1295e$, such as, for example, by touching, pushing, and/or choosing the charge-back button, automatically charges-back the customer's financial account and/or generates a charge-back instruction as described above in reference to FIG. 12C.

According to some embodiments, activation of the 2-difference button $1290e$ further modifies and/or broadens the searching algorithm parameters. According to some embodiments, in response to selecting or activating the "2 difference" button $1290e$, the document processing system or device performs a third search according to a modified set of parameters. According to some embodiments, the third search according to the modified set of parameters is a 2-degree-of-freedom search. Yet, according to other embodiments, the third search according to the modified set of parameters is a 2-wildcard-exact-match search. A 2-degree-of-freedom search is a search that returns records containing extracted serial numbers which exactly match the target serial number in all character positions but two. Put another way, the 2-degree-of-freedom search returns matching results that contain two or less deviant characters. For example, instead attempting to match one fewer characters than all of the characters of the target serial number as described above in reference to FIGS. 12D and 12E, the document processing system or device attempts to match two fewer characters than all of the inputted characters, that is, two deviant characters or a two character difference between the inputted or target serial number $1241d$ and the stored extracted serial numbers will result in a 2-degree match displayed on the search result summary, as shown in FIG. 12F.

Referring to FIG. 12F, according to some embodiments, in response to the operator activating or selecting the 2-difference button $1290e$ (FIG. 12E), the searching algorithm performs a 2-degree-of-freedom search. As shown in FIG. 12F, two one-difference records $1201f_1$ and seven two-difference records $1201f_2$ are shown as matching results. The records $1201f_1$ are the same as the records $1201e_1$ and $1201e_2$ described above and shown in FIG. 12E. The seven two difference records $1201f_2$ are similar to the one-difference records $1201f_1$, but each includes two deviant and/or wildcard characters as compared with the target serial number $1241d$. For example, the first 2-difference record having extracted serial number G71154351A includes two deviant characters as the first and the ninth characters (G and 1), which do not match the first and the ninth corresponding characters (C and 3) of the target serial number. For another example, the seventh 2-difference record having extracted serial number ?71154354A includes one wildcard character as the first character (?) and one deviant character as the ninth character (4), which do not match the first and the ninth corresponding characters (C and 3) of the target serial number. As described above, the operator can visually compare the target serial number $1241d$ and/or a target denomination with the resultant records $1201f_1$ and $1201f_2$ to determine if the target serial number $1241d$ and/or the target denomination matches or corresponds with one or more of the records $1201f_1$ and $1201f_2$ such as, for example, by comparing the target serial number to the serial numbers appearing in the serial number snippet fields $1230f$ and/or by comparing the target denomination to the denominations appearing in denomination fields $1250f$.

According to some embodiments, a search result summary $1200f$, as shown on a display or operator interface (e.g., the operator interface 170), displays or contains a charge-back button or element $1295f$, a new search button or element 1294, a 1-difference operable-selectable element or button $1290d$, and/or a 3-difference operator-selectable element or character difference button $1290f$. According to some embodiments, after reviewing the records $1201f_1$ and $1201f_2$, the operator can activate or select the new search button or element 1294, the operator-selectable element or character difference button $1290d$, or the operator-selectable element or character difference button $1290f$. According to some embodiments, activation of the character difference button $1290d$ causes the document processing system or device to perform a 1-degree-of-freedom search, which displays the results of FIG. 12E. According to some embodiments, activation of the character difference button $1290f$ further modifies and/or broadens the searching algorithm parameters. According to some embodiments, in response to selecting or activating the "3 difference" button $1290f$, the document processing system or device performs a fourth search according to a modified set of parameters. According to some embodiments, the fourth search according to the modified set of parameters is a 3-degree-of-freedom search. Yet, according to other embodiments, the fourth search according to the modified set of parameters is a 3-wildcard-exact-match search. A 3-degree-of-freedom search is a search that returns records including extracted serial numbers which exactly match the target serial number in all character positions but three. For example, instead of attempting to match one or two fewer characters than all of the inputted characters as described above in reference to FIGS. 12D and 12E, the document processing system or device attempts to match three fewer characters than all of the inputted target characters, that is, three deviant characters or a three character difference between the inputted or target serial number and the stored extracted serial numbers results in a 3-degree match. According to some embodiments, the operator can conclude the search and enter or begin a new search by activating or selecting the new search button 1294.

According to some embodiments, the operator can charge-back a customer financial account associated with one of the records 1201$f_1$, 1201$f_2$ in a similar manner as described above. According to some such embodiments, the operator selects a matching or corresponding one of the records 1201$f_1$, 1201$f_2$ as matching the target serial number. That is, the operator first determines which one of the displayed records is the matching record. The matching record can be highlighted to indicated that it is the record of interest, that is, it is the record that corresponds to the target serial number. According to some embodiments, after selecting the matching record, the operator can select or activate the charge-back button 1295$f$ to automatically charge-back a customer financial account associated with a customer that deposited the currency bill under search and/or the account which was credited for the deposit of the particular currency bill associated with the selected-matching record. Alternatively, selecting and/or activating the charge-back button 1296$f$ generates a charge-back instruction associated with the customer financial account as described above in reference to FIG. 12C.

According to some embodiments, summary results and/or data from matching records is additionally or alternatively communicated by means other than displaying on the display or operator interface, such as, for example, by printing the resulting information and/or records using a printer and/or providing the resulting information electronically (e.g., via e-mail, website, etc.).

Referring to FIG. 12G, a display or operator interface displaying a search result summary 1200$g$ of a 2-degree-of-freedom search is shown according to some embodiments. According to some embodiments, the search result summary 1200$g$ is displayed on control panel 170/170' of the document processing device 101/101' and/or on some other display or monitor such as a monitor communicatively connected to the computer 151. The search result summary 1200$g$ indicates that the operator inputted an 11 character target serial number 1241$g$ of AB23456789A and a target denomination 1242$g$ of $100 and that the document processing system 100 found six 2-degree matches (that is matches for a 2-degree-of-freedom search), as evidenced by the six records 1201$g$ being displayed.

According to some embodiments, the search result summary 1200$g$ is generated in response to an operator selecting a "2-difference" button or element, such as, for example, the 2-difference button 1290$e$. That is, in response to a basic-exact-match search, such as, for example, the basic-exact-match search described above in reference to FIG. 12C, and in response to a 1-degree-of-freedom search, such as, for example, the 1-degree-of-freedom search described above in reference to FIG. 12E, both resulting in zero matches, an operator can activate and/or select a 2-difference button to search and display 2-degree matches, if any. According to some alternative embodiments, the search result summary 1200$g$ is generated automatically in response to an operator inputting a target serial number and/or a target denomination and a document processing device or system finding zero exact matches and zero 1-degree matches. That is, in response to a basic-exact-match search and a 1-degree-of-freedom search both resulting in zero matches, the document processing system 100 can be configured to automatically perform a 2-degree-of-freedom search and to display all matches.

According to some embodiments, as shown in FIG. 12G, the search result summary 1200$g$ includes extracted serial numbers 1240$g$ for each record 1201$g$ that matches the target serial number 1241$g$ according to the 2-degree-of-freedom search parameters described above. That is, each of the records 1201$g$ are 2-degree matches. According to some embodiments, each of the records 1201$g$ can include an image field of a serial number snippet 1230$g$, the extracted serial number 1240$g$ that matches the target serial number 1241$g$ with 2 differences, a currency bill denomination 1250$g$, a device identification 1261$g$, a processing time stamp 1262$g$, a batch number 1263$g$, and/or a subbatch number (not shown).

In a similar fashion as described above in reference to FIGS. 12C-12F, an operator can view the serial number snippets 1230$g$ and/or the currency bill denominations 1250$g$ to determine which one of the records 1201$g$, if any, in fact corresponds exactly to the target serial number 1241$g$ and a denomination of interest. For example, the operator can compare the target serial number 1241$g$ of AB23456789A with the serial number snippet 1230$g$ of the first one of the records 1201$g$, which includes an actual serial number of AB23546789A. Thus, the operator can determine based on the comparison that the first one of the records 1201$g$ is not an exact match, but only appeared as a 2-degree match because the first record differs from the target serial by two characters—the fifth and sixth characters of the target serial number 1241$g$ being the reverse of the fifth and sixth characters of the first one of the records 1201$g$.

Similarly, the operator can compare the target serial number 1241$g$ with the serial number snippets 1230$g$ of each of the other five records 1201$g$ to determine if any of the records 1201$g$ being a 2-degree match in fact include a serial number snippet 1230$g$ that exactly matches the target serial number 1241$g$. As shown in the example of FIG. 12G, the operator could eventually determine that the third one of the records 1201$g$ in fact includes a serial number snippet 1230$g_3$ that exactly matches the target serial number 1241$g$.

A further examination of the third record illustrates that the record was not returned as an exact match in a basic-exact-match search or as a 1-degree match in a 1-degree-of-freedom search because two of the characters of the extracted serial number 1240$g$ in the third record were wildcard characters. Specifically, the first and the eleventh characters of the extracted serial number 1240$g$ in the third record 1201$g$ were not called. Various reasons exist that can lead to a record, such as the third record 1201$g$, with an incompletely extracted serial number, such as those described elsewhere herein like in the Modes of Operation—Flagging Section, and in other sections of the present disclosure.

According to some embodiments, the operator can select or activate the third record to obtain additional information associated with the record. According to some embodiments, the operator can select or activate the charge-back button 1295$g$ to automatically charge-back a customer's financial account an amount equal to the value of the currency bill bearing the target or suspect serial number. Alternatively, the operator can select or activate the charge-back button 1295$g$ to automatically generate a charge-back instruction as described above in reference to FIGS. 4A-$b$, 5A-B, and 6.

According to some embodiments, the display or operator interface displays or includes a new search button or element 1294g. According to some embodiments, the operator can activate or select the new search button or element 1294g to begin a new search in the same or similar manner as described above in reference to FIGS. 12C-12F.

According to some embodiments, a database, such as, for example the database 1200a, only includes a portion of each extracted serial number for currency bills. For example, a database might only store an extracted serial number portion (e.g., serial number portion 1281a) and an extracted second alpha field (e.g., second alpha field 1282a)—that is, according to some embodiments, a database does not include extracted characters for a first alpha field (e.g., first alpha field 1280a). According to some such embodiments, records including such serial number portions can result in a match with a target serial number having the same or more characters. For example, according to some embodiments, a bill has a serial number of AB12345678A, and a database storing a record associated with the bill includes an extracted serial number of 12345678A. It is contemplated that, according to some embodiments, a target serial number of AB12345678A will result in a match with the record having the extracted serial number of 12345678A.

Deposit Transaction Verification

A method of verifying a deposit transaction, a charge-back notice, a credit notice, and/or a suspect determination is described according to some embodiments of the present disclosure. As described above in the Deposit Transaction Section, the Electronic Portion of Deposit Transaction Section, and in other sections of the present disclosure, a customer can send store records associated with a deposit transaction to a bank for a credit to the customer's bank account. The credit can be provisional and/or final. The store then transports physical documents associated with the deposit transaction to the bank for verification and final processing. According to some embodiments, the physical documents can include all of the documents associated with the deposit transaction, just the currency bills associated with the deposit transaction, just the checks associated with the deposit transaction, just the on-us checks, or all the currency bills and on-us checks associated with the deposit transaction.

As described above in the Physical Portion of Deposit Transaction Section, and in other sections of the present disclosure, after the bank receives physical documents associated with the deposit transaction, the bank processes the physical documents in a bank document processing system to generate bank records. The bank records are compared or reconciled against the store records to determine if any expected documents are no-show documents and/or to determine if any unexpected documents are detected. In the case of a no-show document determination, the bank may charge-back the store a value associated with the no-show document and/or transmit a notice to the store indicating the charge-back determination. In the case of an unexpected document determination, the bank may credit the store a value associated with the unexpected document and/or transmit a notice to the store indicating the additional/unexpected credit determination. According to some embodiments, as the bank processes the received physical documents, the bank authenticates the documents to determine if any of the documents are suspect documents. In the case of a suspect determination, the bank may charge-back the store a value associated with the suspect document and/or transmit a notice to the store indicating the suspect determination and/or the charge-back determination.

As described above in the Early Suspect Detection Section, the Suspect Notice Section, and in other sections of the present disclosure, according to some embodiments, the bank can determine if one of the documents associated with the deposit transaction is a suspect document based on the store records alone prior to issuing a credit for the deposit transaction. In some such embodiments, the bank may transmit a notice to the store indicating the suspect document determination and/or that no credit was applied for the determined suspect document.

According to some embodiments, one or more customers of a bank may not use a document processing system when making deposits. For example, they may make a physical deposit including a plurality of currency bills and/or checks using a night deposit box or by giving the physical deposit directly to a bank teller. In such circumstances, the customer may include a deposit slip with the deposit transaction as described above which may include a total deposit amount, a total currency bills amount, a total check amount, etc. When a night deposit box is used to make a deposit, the customer does not get a receipt indicating that the bank acknowledges that is has received everything the customer believes he or she has deposited and/or an agreement as to the total value of checks, currency bills, or both included in a deposit. Nonetheless, according to some embodiments, such deposits are processed by the bank using the document processing systems and devices described above such as by running the documents through a document processing system as described herein and generating visually readable images of all the documents associated with the transaction, extracting data from those images, and/or creating records or data files associated with such deposits.

According to some embodiments, a store or other customer desires to verify information relating to a charge-back notice, a credit notice, a suspect notice, and/or a no-show notice associated with a deposit transaction. According to some embodiments, the document processing system or financial institution system is configured to allow a bank customer and/or authorized bank employees to retrieve and display one or more or all of the documents included in one or more deposit transactions. For example, when a customer is informed that the amount of credit received for a particular night deposit transaction is less than what the customer recorded on the accompanying deposit slip, the customer may wish to view images of all the documents associated with that deposit transaction (and/or see the other data associated with corresponding records, e.g., extracted data) to verify that the amount of credit provided by the bank is correct. As another example, when a customer receives a notice that their account has been debited for the amount of currency bill later discovered to be counterfeit, the customer may desire to see proof that he or she deposited the currency bill in question. According to some embodiments of the present disclosure, the customer may view the images of some or all the documents in the deposit transaction in question (and/or see other associated data, e.g., extracted data) to verify that the currency bill bearing a serial number in question was included in the deposit transaction. According to some embodiments, printed visually readable images of one or more documents in one or more deposit transaction may be provided to the customer. According to some embodiments, visually readable images of one or more documents in one or more deposit transaction may be displayed on a display such as a computer monitor for the customer. According to some embodiments, a customer may gain access to such visually readable images on one of the bank's monitors by visiting a bank branch. The appropriate images may be accessed with the assistance of a bank employee and/or the bank may permit some customers to access the images without the assistance of a bank employee such as by permitting the customer to enter appropriate security information (such as an account number and a password and/or PIN) into a computer system which has accessed to the appropriate images and/or records. According to some embodiments, a financial institution system is configured to permit some customers to access the images remotely over a network such as the Internet such as by permitting the customer to enter appropriate security information (such as an account number and a password and/or PIN) into a computer system which has accessed to the appropriate images and/or records.

According to some such embodiments, the bank stores all records associated with deposit transactions in one or more computer systems such as on a central server. According to some such embodiments, the records are downloaded, uploaded, and/or otherwise made available to the central server for storage at one or more predetermined instances, such as, for example, each night after the bank closes and completes internal processing for the day. The central server may include one or more memory devices. A financial institution system may be configured such that the central server is connected to a plurality of bank branches and may be configured to permit each bank branch to upload and/or store data associated with a plurality of deposit transactions from a plurality of devices 101, 101' on the central server. According to some embodiments, the store or other customer is granted access to data stored on the central server that is associated with all deposit transactions between the store and the bank. The data stored for each respective deposit transaction can include a visually readable image of every document associated with the deposit transaction, such as, currency bills, checks, deposit slip, etc. According to some embodiments, the data associated with the deposit transaction can include, store records, bank records, virtual deposit slips, visually readable images of preprinted deposit slips, bank account information, or a combination thereof. Thus, according to some embodiments, an authorized store employee or personnel can log into the central server and review data associated with one or more deposit transactions between the store and the bank to verify and/or reconcile information included in a notice, such as a charge-back notice, a credit notice, a suspect notice, and/or a no-show notice.

According to some embodiments, access to the data on the central server is limited to bank customers that have a login, such as a bank account number, and/or a password, such as a PIN. According to some embodiments, data associated with a deposit transaction is stored on the central server for a predetermined amount of time, such as, for example, 30 days, 60 days, 90 days, one year, etc. According to some embodiments, the authorized store employee or personnel can search for data associated with a particular deposit transaction based on a transaction identifier associated with the deposit transaction. For example, the authorized store employee or personnel can search based on a transaction identifier on a deposit slip associated with the deposit transaction, a currency bill serial number associated with the deposit transaction, a checking account number associated with the deposit transaction, etc.

Misfeed/Jam Reconcile Feature

Generally referring to the document processing devices 101, 101' as described above in reference to FIGS. 1, 2A-C and 13A-E, a jam/rerun feature is described herein. According to some embodiments, the document processing devices of the present disclosure receive a single stack or batch of currency bills in an input receptacle, transport the currency bills, one at a time, denominate each currency bill, count each currency bill, calculate a total batch value based on the denomination and number of each denomination that was counted and delivered to an output receptacle(s). Thus, at any given moment in time, the document processing device has a current total batch value for all currency bills that have been processed and delivered to the output receptacle(s) that are associated with the batch of currency bills.

However, according to some embodiments, one or more of the currency bills in the batch may become jammed or lodged within a portion of the document processing device and/or other type of misfeed may occur, such as a doubles error condition. For example, a jam may occur within a transport mechanism which may require operator attention to clear. In such circumstances, all of the currency bills in the batch need to be reconciled, including the currency bills that remain in the input receptacle, the currency bills jammed or lodged in the document processing device, the currency bills that remain in the transport path and not delivered to the output receptacle, and the currency bills that were processed and delivered to the output receptacle(s). Rather than removing all of the currency bills in each of these positions (e.g., input receptacle, transport mechanism, output receptacle, etc.) and rerunning the entire batch, the document processing devices and systems of the present disclosure provide a jam/rerun feature to aid an operator in reconciling documents in various positions upon an occurrence of a jam or misfeed without having to rerun documents that were delivered to an output receptacle.

For example, a stack or batch of ten currency bills is placed in an input receptacle of the document processing device. The batch includes the following number of each denomination of currency bills: one $20 dollar currency bill, three $10 dollar currency bills, four $5 dollar currency bills, one $2 dollar currency bill, and one $1 dollar bill. The ten currency bills are positioned in the following order from the bottom or leading end of the stack to the top or trailing end of the stack as placed in the input receptacle: $5, $2, $20, $10, $5, $1, $10, $10, $5, $5. For a document processing device that initially processes this batch of ten currency bills feeding from the bottom or leading end of the stack, a jam may occur due to the third $10 dollar currency bill becoming jammed. Thus, according to some such embodiments, the following currency bills have been processed and delivered to the output receptacle $5, $2, $20, $10, $5, $1, $10, which are the first through seventh documents in the stack. Similarly, the following currency bills are either jammed in the document processing device or remain in the input receptacle to be processed: $10, $5, $5, which are the eighth through tenth documents in the stack.

According to some embodiments, the document processing devices of the present disclosure can recognize that a jam has occurred in the middle of processing a batch of currency bills and suspend the processing of the batch. The suspension of processing may create a temporary batch count file that maintains and/or stores the current count of documents, denomination of each document, and total value of the processed documents associated with the batch of documents. Likewise, any visually readable images, extracted data, and/or records created for the documents sent to the output receptacle may be retained in memory such as in a temporary batch count file. The suspension also allows an operator to clear the jam to rerun the jammed documents and any documents remaining in the input receptacle, but without having to rerun the documents that have already been processed by the device and delivered to the output receptacle. Such a rerunning operation is advantageous because it increases document processing efficiency by reducing the number of documents that must be rerun when a jam or misfeed occurs.

According to some embodiments, the document processing devices of the present disclosure are configured to provide rerun instructions to an operator in the case of a jam or misfeed. For example, following the occurrence of the jam of the eighth document from the bottom of the stack, that is, the third $10 dollar currency bill, described above, the document processing device can instruct, via one or more graphical user interfaces (GUIs, such as, e.g., the control panel 170), the operator to (1) remove the currency bills in the output receptacle, (2) open the transport mechanism to provide access to the jammed documents (such as described in the Latch Mechanism and Associated Precision Transport Gap Section below), (3) remove the jammed documents and replace them in the input receptacle, (4) close the transport mechanism, and (5) initiate a rerun operation via activation of a rerun selection element or button. According to some embodiments, the initiation of the rerun operation instructs the device to access the temporary batch count file and to add the count and/or total of the following remaining documents associated with the same batch of documents to the counts and/or total associated with the documents previously counted and delivered to the output receptacle just prior to the occurrence of the jam or misfeed and/or associate any visually readable images, extracted data, and/or records for the remaining documents with those for the same batch of documents processed prior to the jam or misfeed and/or with the data file associated with such batch. By accessing the temporary batch count file, the device may be configured to avoid counting any document twice by comparing newly created document records with existing records and eliminating any duplicates, for example, records having matching extracted serial numbers and denominations.

According to some embodiments, the document processing devices and/or systems of the present disclosure display a summary associated with a batch of documents that was processed and delivered to the output receptacle. The summary can include a total value associated with the processed documents, a total value associated with processed checks in the stack, a total value associated with processed currency bills in the stack, a total number of processed documents, a total number of processed checks, a total number of processed currency bills, which can be broken down by denomination, and/or visually readable images of all documents in the batch. According to some such embodiments, the operator can compare the values and/or totals provided in the summary against a deposit slip associated with the batch to further verify that the batch of documents was processed correctly and that the jam did not corrupt and/or create an error during the processing.

Latch Mechanism and Associated Precision Transport Gap

Figure 13A:
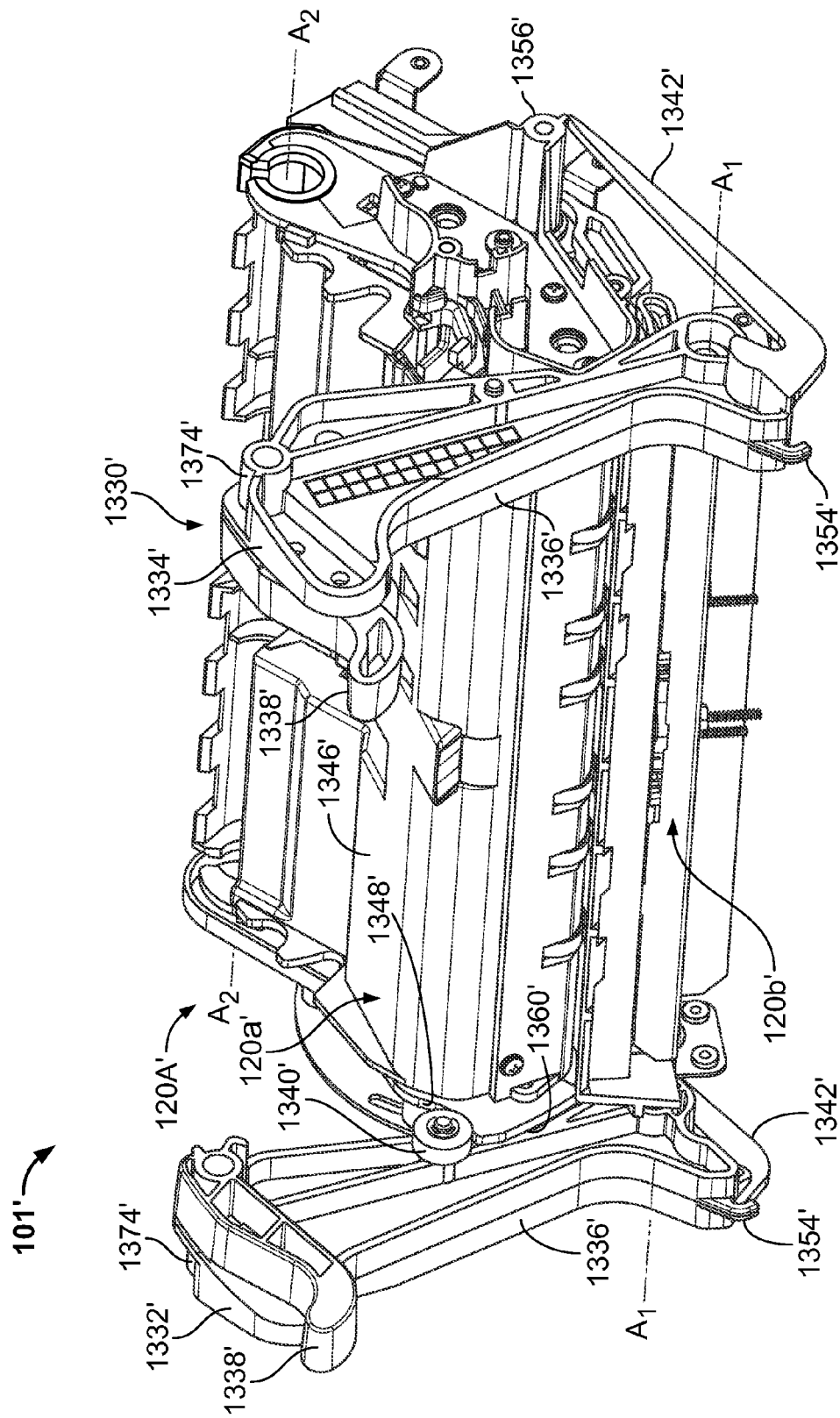
FIG. 13A is a perspective view of the document processing device of FIG. 2A with the housing and other selected components removed to illustrate a transport mechanism in a closed position according to some embodiments.
Figure 13B:
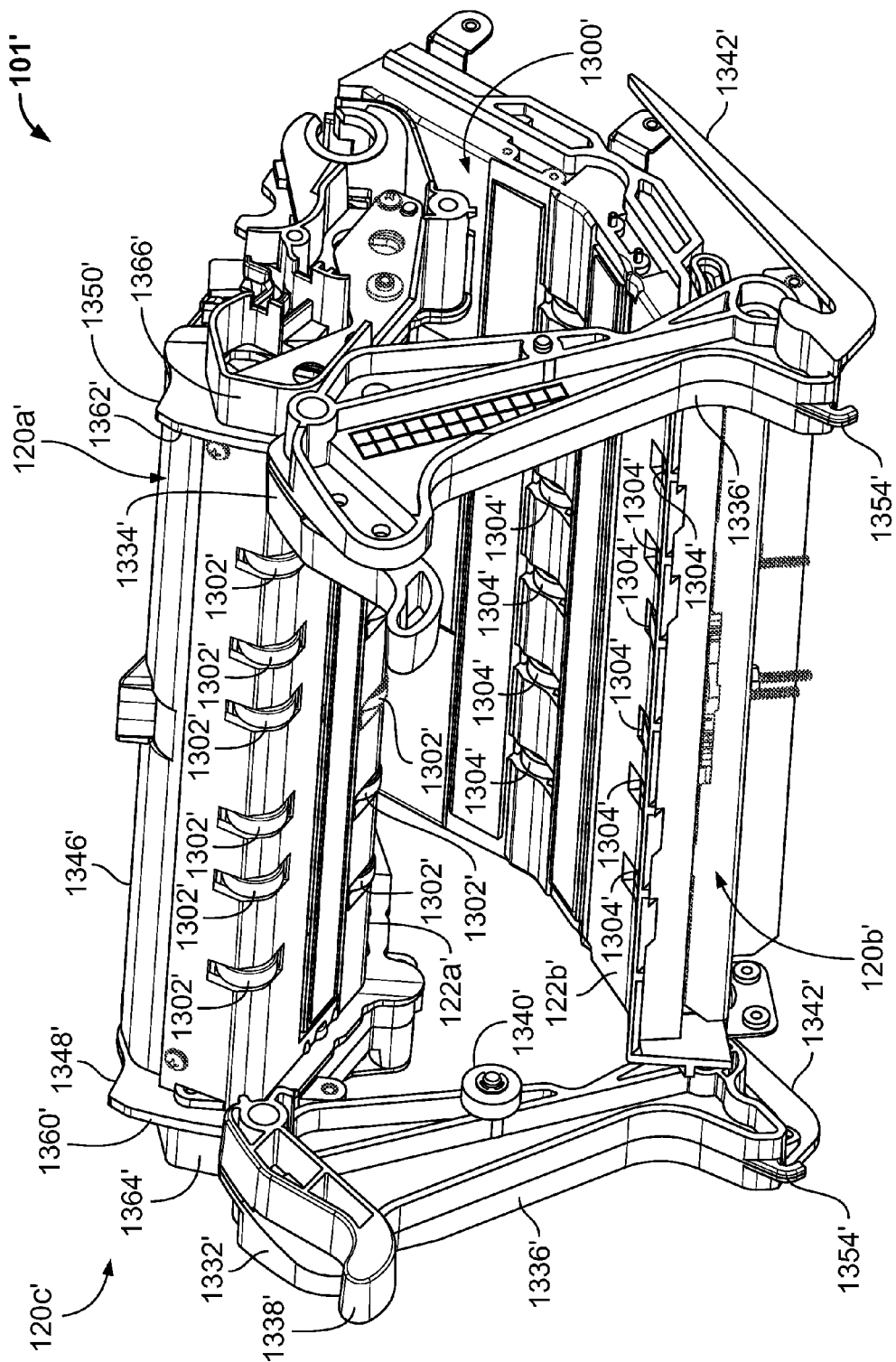
FIG. 13B is a perspective view of the document processing device of FIG. 2A with the housing and other selected components removed to illustrate the transport mechanism in an open position according to some embodiments.
Figure 13D:
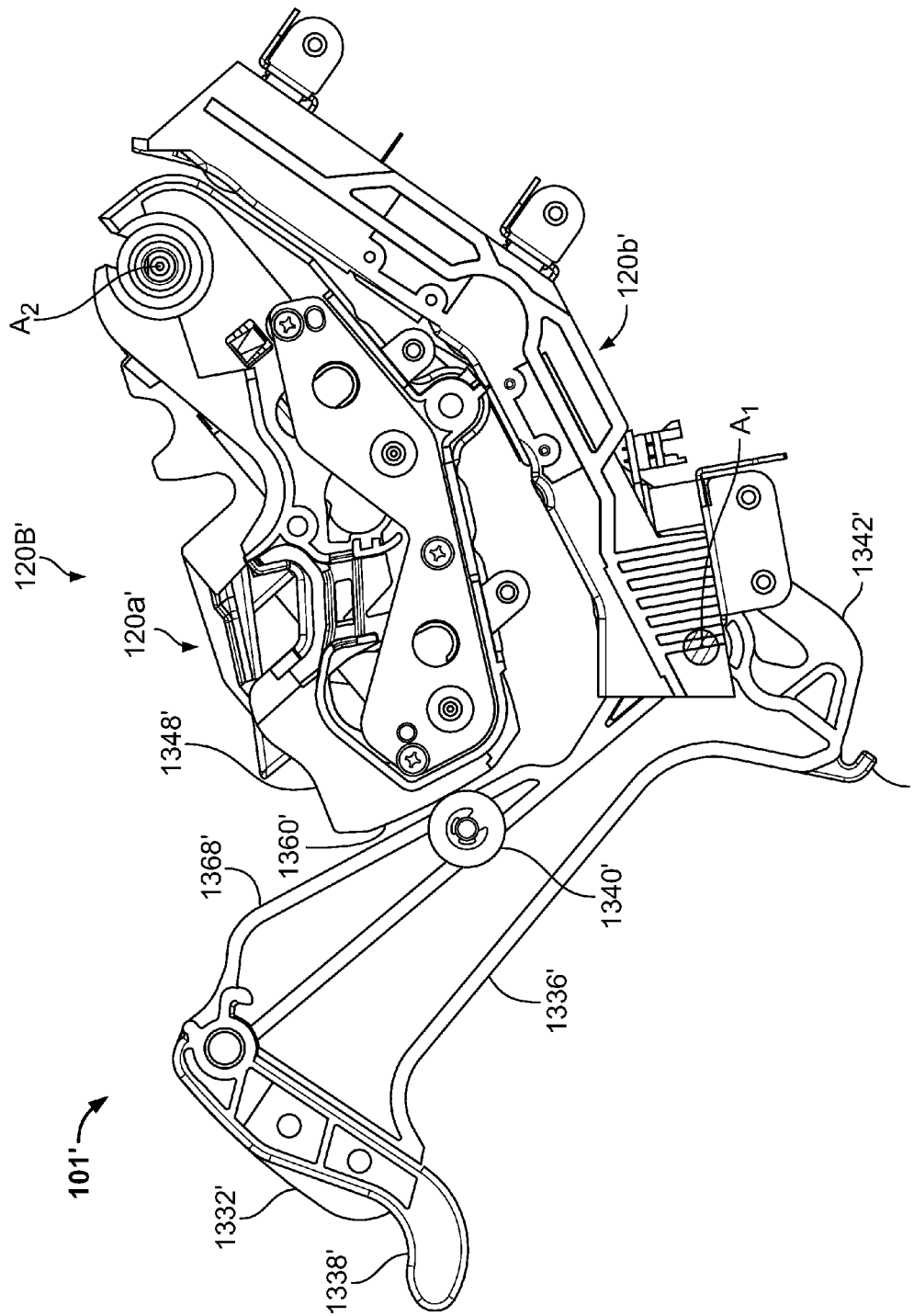
FIG. 13D is a side view of the document processing device of FIG. 2A with the housing and other selected components removed to illustrate the latch mechanism and a movable segment of the transport mechanism in an unlocked, intermediate position according to some embodiments.
Figure 13E:
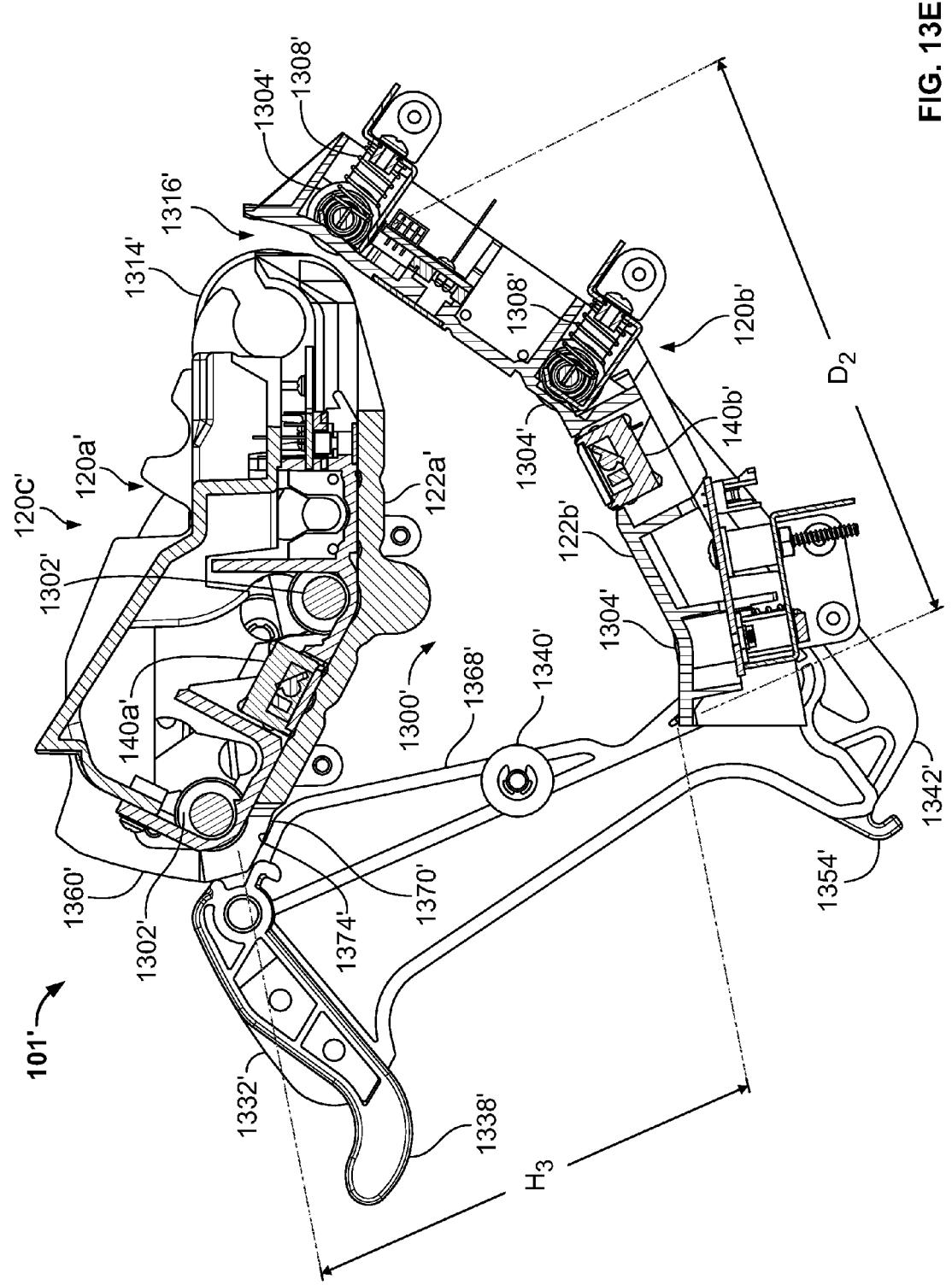
FIG. 13E is a side view of the document processing device of FIG. 2A with the housing and other selected components removed to illustrate the latch mechanism retaining the transport mechanism in the open position according to some embodiments.

Referring to FIGS. 13A-13E, where like reference numbers are used to indicate like components throughout the several views, the document processing device 101' presented in FIGS. 1, 2A-C is illustrated in accordance with some embodiments of the present disclosure. FIGS. 13A and 13B illustrate the document processing device 101' with the housing 190 and other selected components, such as the input receptacle 110', output receptacle 130', and control panel 170', removed to more clearly illustrate the transport mechanism 120' when in a closed position (designated generally as 120A' in FIG. 13A) and an open position (designated generally as 120C' in FIG. 13B). Likewise, FIGS. 13C-13E are side-view illustrations of the document processing device 101' with the housing 190 and certain selected components removed to more clearly depict the transport mechanism 120' in the closed position 120A' (FIG. 13C), in an intermediate position 120B' (FIG. 13D), and in the open position 120C' (FIG. 13E). According to some embodiments, the transport mechanism 120' can be transitioned from the closed position 120A', through the intermediate position 120B', to the open position 120C' to provide generally unobstructed access for servicing the document processing device 101', for cleaning the inside of the document processing device 101', such as the first and second image scanners 140a' and/or 140b' (FIGS. 2B and 2C), to clear document jams, etc., as is described herein.

According to some embodiments, the transport mechanism 120' includes an upper transport-plate assembly 120a', as shown in FIGS. 13A-13E (referred to herein as "movable transport assembly"), and a lower transport-plate assembly 120b', as shown in FIGS. 13A-13E (referred to herein as "stationary transport assembly"). According to some embodiments, each of the transport-plate assemblies 120a', 120b' may operatively house any combination of the following detection elements, without limitation, in one or more alternative embodiments: one or more size detection sensors, a density sensor, a fitness detector, an optical scan head, a contact image sensor, a single or multitude of magnetic sensors, a thread sensor, an infrared sensor, an ultraviolet/fluorescent light scan head, a media detector, or any other sensing means operable to detect characteristic information from a document. These detection elements may be disposed in any order and on either or both transport-plate assemblies 120a', 120b' without departing from the intended scope of the present disclosure. Such detection sensors, and a host of other sensors, elements, and/or detectors, are disclosed in U.S. Pat. No. 6,278,795, to Matthew L. Anderson et al., entitled "Multi-Pocket Currency Discriminator" Processing"; U.S. Pat. No. 7,187,795, to John E. Jones et al., entitled "Document Processing System Using Full Image Scanning"; U.S. Pat. No. 6,241,069, to Richard A. Mazur et al., entitled "Intelligent Currency Handling System"; U.S. Pat. No. 6,256,407, to Douglas U. Mennie et al., entitled "Color Scanhead and Currency Handling System Employing the Same"; U.S. Pat. No. 6,721,442, to Douglas U. Mennie et al., entitled "Color Scanhead and Currency Handling System Employing the Same"; all of which are hereby incorporated by reference herein in their entireties.

As noted above with respect to FIGS. 1 and 2A-C, the plurality of documents 135 (FIG. 1) may be serially driven, typically one at a time, along a transport path 1300' in FIGS. 13B and 13E, through the document processing device 101', past the one or more image scanner(s) 140a' and/or 140b', to one or more output receptacles 130' (as shown in FIGS. 2B-1D). According to some embodiments, the documents 135 may be transported by means of a transport roll arrangement, represented herein, in part, by a plurality of driven/powered rollers 1302' and a plurality of passive/follower rollers 1304'. According to some embodiments, the driven rollers 1302' are drivingly connected to an electric motor 1306', shown in FIG. 2B, via a belt drive system (not shown). According to other embodiments, the driven rollers 1302' may be drivingly connected to and powered by other prime movers, such as a pneumatic or hydraulic motor. Likewise, according to some embodiments, the driven rollers 1302' may be drivingly connected to the prime mover(s) by other power transmission mechanisms, such as, but certainly not limited to, a chain drive, a gear train or other gear system, a driveshaft, etc.

From the input receptacle 110', a stripped document is moved in accordance with the illustrated embodiment of FIGS. 13A-13E from the bottom of the stack, along a curved input path 1316' in FIG. 13E, which receives documents moving downwardly and rearwardly, and changes the direction of travel to a forward and downward direction. According to some embodiments, it is at this point whereat the document enters the transport path 1300'. With continued reference to the embodiments illustrated in FIGS. 13A-13E, the document is then directed along a generally curvilinear path, e.g., via the plurality driven rollers 1302' and passive rollers 1304' as described above, whereat the bills are processed and subsequently stacked in the output receptacle 130'.

Stacking of the documents may be effected in certain arrangements at a forward end of the linear path, that is, at the end of the transport path 1300', where the documents are fed into one or more driven stacking wheels 1318' (as best shown in FIGS. 2B and 2C). According to some embodiments, each stacker wheel 1318' includes a plurality of circumferentially spaced, flexible blades 1320' which operate to receive and then deliver the documents into the output receptacle 130' at the forward end of transport path 1300'. A similar transport arrangement to that described above is disclosed in commonly-owned U.S. Pat. No. 5,687,963, to Douglas U. Mennie, entitled "Method and Apparatus for Discriminating and Counting Documents," which is incorporated by reference herein in its entirety.

As mentioned above, according to some embodiments, the transport mechanism 120' may be opened to facilitate cleaning and maintenance of the document processing device 101'. Referring to FIG. 13A, the transport mechanism 120' is shown in a closed position 120A'. That is, in the embodiment shown, the upper and lower transport-plate assemblies 120a', 120b' are oriented such that the upper and lower transport surface 122a', 122b' are immediately adjacent one another and generally co-planar when the transport mechanism 120' is in the closed position 120A'. In contradistinction, according to some embodiments, the transport mechanism 120' is in the open position 120C' when the upper and lower transport-plate assemblies 120a', 120b' are oriented such that the upper and lower transport surfaces 122a', 122b' are distal from one another, and oblique.

With reference to both FIGS. 13A and 13C, the document processing device 101' includes a latch assembly 1330'. According to some embodiments, the latch assembly 1330' includes at least one, but desirably two latches, namely a first (or left) latch 1332' and a second (or right) latch 1334'. The two latches 1332', 1334' illustrated in FIGS. 13A-13E are distanced from one another, each positioned at a respective laterally outboard side of the upper and lower transport-plate assemblies 120a', 120b' (e.g., at left and right ends with respect to FIGS. 13A and 13B). According to some embodiments, the first latch 1332' is a mirror image of the second latch 1334'; accordingly, the configuration of both latches 1332', 1334' will be described with respect to the left latch 1332'.

According to some embodiments, the latch 1332' includes an elongated body 1336' with an integrally formed release lever 1338' protruding transversely and generally orthogonally in a forward direction from an upper, first end thereof. In addition, as part of another facet of the disclosed embodiment, the latch 1332' includes an integrally formed control arm 1342', which projects transversely and generally orthogonally from a second, lower end of the latch body 1336', distal from and in the opposite direction of the release lever 1338'. According to some embodiments, a cam-roller 1340' is rotatably mounted along an inside face of the latch body 1336', in between the release lever 1338' and control arm 1342'.

According to some embodiments, the latch 1332' is movably mounted to the housing 190. In the illustrated embodiment, for example, the latch 1332' is pivotally mounted to a left side-guard plate (visible in FIGS. 2B and 2C, and shown in phantom at 1344' in FIG. 13C) at the lower, second end of the latch body 1336', which opposes the first end from which the release lever 1338' protrudes. According to some embodiments, the latch 1332' is pivotally mounted to the housing 190 to rotate about a first axis A1 from a first orientation (also referred to herein as "first locking position", and best seen in FIGS. 13A and 13C), to a second orientation (also referred to herein as "unlocked position", and best seen in FIG. 13D), back to the first orientation (also referred to herein as "second locking position", and best seen in FIGS. 13B and 13E).

According to some embodiments, the latch 1332' is biased into the first orientation by a biasing member. In one particular instance, the biasing member may be in the nature of a helical spring 1352', as shown in FIG. 13C, which is fixed at one end to the housing 190, such as the side-guard plate 1344', and attached at a second, opposing end to a hook 1354' that protrudes from the second end of the latch body 1336', adjacent the control arm 1342'. The helical spring 1352' may apply a tensile force to the latch body 1336' via hook 1354', thereby acting to pull, rotate, or otherwise bias the latch 1332', 1334' into the first orientation shown in FIGS. 13A and 13C.

According to some embodiments, at least one of the transport-plate assemblies 120a', 120b' is movably mounted to the housing 190. In the illustrated embodiment, for example, the upper transport-plate assembly 120a' is pivotally mounted at a rearward end thereof to the housing 190. In particular, the upper transport-plate assembly 120a' is hinged on laterally opposing sides thereof to left and right side-guard plates, such as side-guard plate 1344' of FIG. 13C. Further by way of example, and not limitation, the upper transport-plate assembly 120a' is pivotally mounted to the housing 190 to rotate about a second axis A2 (FIG. 13A) from a first, closed position (best seen in FIGS. 13A and 13C), to a second, released position (best seen in FIG. 13D), back to a third, open position (best seen in FIGS. 13B and 13E). According to some embodiments, the movable transport-plate assembly 120a' and the latch 1332' may be configured to rotate about a similar axis. In accordance with the displayed arrangement, however, the first axis A1 is generally parallel to, and offset from the second axis A2. It is contemplated, in accord with other embodiments, that both the upper and lower transport-plate assemblies 120a', 120b' be movably mounted with respect to the housing 190. According to other embodiments, the lower transport-plate assembly 120b' may be movably mounted to the housing 190, while the upper transport-plate assembly 120a' is rigidly mounted and, thus, stationary.

Referring to both FIGS. 13A and 13C, when the transport mechanism 120' is in the closed position 120A', the movable transport-plate assembly 120a' may be locked in the closed position by the first and second latches 1332', 1334'. By way of example, and not limitation, the moveable latch-plate assembly 120a' of FIGS. 13A-13E includes a latch-plate casing 1346' which generally encloses and operatively houses, for example, the rollers and detection means discussed hereinabove. As part of this example, first and second cam surfaces 1348' and 1350' (best seen in FIG. 13B) are integrally formed with the latch-plate casing 1348', projecting generally upwardly from opposing, laterally-outboard ends thereof. When the movable transport-plate assembly 120a' is in the closed position, and the latches 1332', 1334' are in the first locking position (FIG. 13A), each of the cam-rollers 1340' engages with and presses against a respective cam surface 1348', 1350', applying a generally downward force thereto, as shown in FIG. 13C. Only one cam-roller 1340' and cam surface 1348' are visible in FIGS. 13A-13C with respect to the left latch 1332', but an identical cam-roller 1340' and cam surface 1350' interface is present with respect to the right latch 1334' of FIGS. 13A-13C. According to some embodiments, the biasing members 1352', absent any external influence, retain the latches 1332', 1334' in the first locking position, and thus maintain the movable transport-plate assembly 120a' in the closed position.

According to some embodiments, the first and second latches 1332', 1334' may be selectively transitioned into an unlocked position, and the movable upper transport-plate assembly 120a' transitioned to a released position contemporaneously therewith. Referring to FIG. 13D, a downward force may be applied to the release lever 1338' of each latch body 1336', urging the latches 1332', 1334' in a forward and downward motion, rotating about axis A1 in a generally counter-clockwise direction with respect to FIG. 13D. As the latches 1332', 1334' begin to move from the first orientation (FIG. 13C) to the second orientation (FIG. 13D), the cam-rollers 1340' roll, slide, or otherwise disengage the cam surfaces 1348', 1350'. According to some such embodiments, the movable transport-plate assembly 120a' is unlocked, and thus freely movable, when the cam-rollers 1340' are fully disengaged from the cam surfaces 1348', 1350'.

As shown in FIGS. 13A-13D, the latch control arm 1342' operates to push, press, or otherwise urge the unlocked transport-plate assembly 120a' from the closed position, shown in FIG. 13C, to the released position, as shown in FIG. 13D. In particular, as the right latch 1334', for example, begins to rotate, the control arm 1342' rotates along with the remainder of the latch body 1336'—e.g., in a generally counter-clockwise direction with respect to FIG. 13D. In so doing, a distal end of the control arm 1342' engages with and presses against an integrally formed protrusion 1356' (best seen in FIG. 13A), which extends laterally outward from the latch-plate casing 1346', thereby rotating the transport-plate assembly 120a' about axis A2 in a generally clockwise direction with respect to FIG. 13D. According to some embodiments, when the movable transport-plate assembly 120a' is in the second, released position, each of the cam-rollers 1340' sits against a respective forward roller surface 1360', 1362' (FIG. 13D), each of which may be integrally formed with the latch-plate casing 1346' adjacent to a corresponding cam surface 1348', 1350'. As a result of this interplay, the movable transport-plate assembly 120a', when in the released position, retains the two latches 1332', 1334' in the unlocked position, as shown in FIG. 13D.

According to some embodiments, one or more stop features may be incorporated into the document processing device 101' design, selectively oriented and configured to prevent the latches 1332', 1334' from moving or rotating beyond a predetermined point. For example, as shown in FIG. 13C, the head of a bolt 1358', which may protrude from a laterally outboard surface of the side-guard plate 1344', acts to obstruct the path of the latch 1332', and thereby preclude any further travel upon contact therewith. According to some embodiments, the bolt 1358' may also be used to fix the biasing member 1352' to the side-guard plate 1344'.

Referring back to FIGS. 13B and 13E, the movable upper transport-plate assembly 120a' may be selectively transitioned to an open position, such as that illustrated in FIGS. 13B and 13E. By way of example, and not limitation, the application of a generally upward force along an underside portion of the latch-plate casing 1346' (or other section of the assembly 120a') urges or otherwise moves the unlocked transport-plate assembly 120a' from the released position (FIG. 13D) to the open position (FIG. 13E), for example, by rotating the transport-plate assembly 120a' about axis A2 in a generally clockwise direction with respect to FIG. 13E. According to some embodiments, the transport-plate assembly 120a' is moved by hand from the unlocked, released position (FIG. 13D) to the locked, open position (FIG. 13E).

It is also contemplated, according to some embodiments, that the movable transport-plate assembly 120a' be selectively biased or urged into the open position by alternate means, such as, for example, via a spring such as a leaf spring, a compression spring, or a tension spring, a pneumatic cylinder, an electric motor, etc. According to some embodiments, the transport-plate assembly 120a is moved by hand from the unlocked, released position (FIG. 13D) to the open position (FIG. 13E).

According to some embodiments, during this transition, the cam-rollers 1340' disengage the right and left roller surfaces 1360' and 1362', respectively, releasing the latches 1332', 1334' from the unlocked position depicted in FIG. 13D. After being released, the latches 1332', 1334' may be moved or biased back into the first orientation, for example, by the biasing members 1352', as shown in FIG. 13C. However, in some configurations, such as that shown in FIGS. 13A-13E, left and right forward-facing interface surfaces 1364' and 1366', respectively (FIG. 13B), which may be integrally formed with the latch-plate casing 1346', press against and slide along a respective rearward mating surface 1368' (FIGS. 13C-13E) of each latch body 1336', whereby the latches 1332', 1334' are prevented from completing the transition back to the first orientation until the upper transport-plate assembly 120a' reaches its highest point of travel with respect to the housing 190. It is at this point, according to some embodiments, that the transport-plate assembly 120a' is locked into the open position, with right and left downward-facing interface surfaces 1370' and 1372', respectively, sitting on and resting against a complementary upper mating surface 1374'. As part of this exemplary embodiment, when in the second locking position, as shown in FIG. 13E, the latches 1332', 1334' secure the movable transport assembly 120b' in the open position.

According to some embodiments, the document processing device 101' maintains the same footprint (e.g., the surface area of a floor, desk, or tabletop occupied by the document processing device 101') regardless of the position of the transport mechanism 120'. According to some embodiments, the rectangular volume of the document processing device 101' remains unchanged by transitioning the transport mechanism 120' from the closed position 120A' to the open position 120C'. In regard to the examples provided above with respect to FIG. 2A, the system height $H_2$ may be approximately twelve inches, the width W may be approximately fourteen inches, and the depth D may be approximately fifteen inches, providing a rectangular volume of approximately 2,520 in$^3$ (0.04 m$^3$), or less than 1½ ft$^3$. In this example, the rectangular volume of the document processing device 101' would remain approximately 2,520 in$^3$, or less than 1½ ft$^3$, regardless of the position of the transport mechanism 120'. According to some embodiments, the overall volume of the housing 190 of the document processing device 101' remains substantially unchanged by transitioning the transport mechanism 120' from the closed position (FIG. 13A) to the open positions (FIG. 13B).

According to some embodiments, a transport mechanism opening height $H_3$ (FIG. 13E) is at least approximately 4 inches (10. cm). According to some embodiments, the transport mechanism opening height $H_3$ (FIG. 13E) is at least approximately 3 inches (7½ cm). According to some embodiments, a ratio of the housing height to a transport mechanism opening height is less than or equal to approximately 3:1. By way of explanation, and not limitation, in the first example provided above with respect to FIG. 2B, the housing height $H_2$ may be approximately 12 inches (30½ cm) and the transport mechanism opening height $H_3$ (FIG. 13E) may be approximately 4 inches (10 cm), providing a housing height to a transport mechanism opening height ratio $H_2:H_3$ of less than or equal to approximately 3:1. In the second example provided, the housing height $H_1$ may be approximately 9½ inches (24 cm) and the transport mechanism opening height $H_3$ may be approximately 4 inches (10 cm), providing a housing height to a transport mechanism opening height ratio $H_1:H_3$ of less than or equal to approximately 2½:1. In a similar regard, according to some embodiments, a ratio of the transport mechanism opening height $H_3$ to a transport mechanism opening depth $D_2$ (FIG. 13E) may be approximately 4:5—e.g., the opening height $H_3$ is approximately 3¾ inches (9½ cm) and the opening depth D2 is approximately 4¾ inches (12 cm) in the example presented in FIG. 13E.

According to some embodiments, a transport path length between the transport mechanism opening depth $D_2$ is about 5 inches (13 cm). That is, a document being transported along the lower transport-plate assembly 120*b*' will travel about 5 lineal inches between the transport mechanism opening depth $D_2$. According to some embodiments, a transport path length between the transport mechanism opening depth $D_2$ is at least about 5 inches (13 cm). According to some embodiments, the upper transport-plate assembly 120*a*' swings or rotates about pivot point $A_1$ about 55 degrees. That is, from the closed position (FIG. 13C) to the open position (FIG. 13E) the upper transport-plate assembly 120*a*' rotates about 55 degrees. According to some such embodiments, the about 55 degree rotation of the upper transport-plate assembly 120*a*' provides the transport mechanism opening height H3 of about 3¾ inches of the document processing device 101'. According to some embodiments, the upper transport-plate assembly 120*a*' swings or rotates about pivot point $A_1$ at least about 30 degrees.

Referring back to FIG. 13E, it is contemplated that according to some embodiments, the upper transport-plate assembly 120*a*' rotates such that an operator of the document processing device 101' can access at least about 90% of the transport path 1300' from the front of the document processing device 101' when the transport mechanism 120' is in the open position 102C'. The transport path 1300' may be defined, according to some embodiments, as the travel distance from the input receptacle 110' to the output receptacle 130'. The transport path 1300' may be characterized according to other embodiments as the travel distance from the end of the input path 1316' to the output receptacle 130'. According to some embodiments, at least about 75% of the transport path 1300' is accessible from the front of the document processing device 101' when the transport mechanism 120' is in the open position 120C'. Yet, according to other embodiments, 60% or more of the transport path 1300' may be accessible from the front of the document processing device 101' when the transport mechanism 120' is in the open position 120C'. In even yet other embodiments, an operator of the document processing device 101' may access at least a portion of the input path 1316' connecting the transport path 1300' with the input receptacle 110' through the gap created when the transport mechanism 120' is in the open position 120C'. According to some embodiments, this may allow an operator to clear a paper jam at the housing-input (e.g., the input path 1316') from the front of the document processing device 101'.

According to some embodiments, the transport mechanism 120' may also be transitioned from the open position 120C', as shown in FIGS. 13B and 13E, through the released position depicted in FIG. 13D, back to the closed position 120A' as shown in FIGS. 13A and 13C. In general, the steps set forth above to open the transport mechanism 120' may be practiced in reverse order to close the transport mechanism 120'. That is, according to some embodiments, the movable upper transport-plate assembly 120*a*' is first released from the open position as shown in FIGS. 13B and 13D, for example, by pulling or pressing downward on the latch release levers 1338', whereby the upper mating surface 1374' of each latch 1332' is disengaged from a respective downward-facing interface surface 1370', 1372'. The intrinsic weight of the upper transport-plate assembly 120*a*' causes the assembly 120*a*' to move to the second, released position, as shown in FIG. 13D, for example, rotating about axis A2 in a generally counter-clockwise direction with respect to FIGS. 13D and 13E. It is also contemplated, according to other embodiments, that the movable transport-plate assembly 120*a*' is biased or urged into the second position, for instance, via a spring such as a leaf spring, a compression spring, or a tension spring, or a pneumatic cylinder. During this transition, the cam-rollers 1340' reengage the right and left roller surfaces 1360' and 1362', respectively, urging the latches 1332', 1334' into the unlocked position, as shown in FIG. 13D.

According to some embodiments, the movable transport-plate assembly 120*a*' may then be selectively transitioned to the closed position, such as illustrated in FIGS. 13A and 13C. By way of example, and not limitation, the application of a generally downward force (such as by hand, motor, spring, etc.) along an upper portion of the latch-plate casing 1346' (or other section of the assembly 120*b*') urges or otherwise moves the transport-plate assembly 120*a*' from the released position (FIG. 13D) to the closed position (FIG. 13C), for example, by rotating the transport-plate assembly 120*a*' about axis A2 in a generally counter-clockwise direction with respect to FIGS. 13C-13E. According to some embodiments, each casing protrusion 1356' then engages with and presses against the distal end of a respective control arm 1342', thereby forcing the latches 1332', 1334', for example, to rotate in a generally clockwise direction with respect to FIGS. 13C and 13D, to the first locked position. In addition, or as an alternative thereto, each biasing member 1352' may apply a tensile force to the latch body 1336' via hook 1354', thereby acting to pull, rotate, or otherwise bias the latches 1332', 1334' into the first orientation, as shown in FIGS. 13A and 13C.

As noted above, according to some embodiments, when the transport mechanism 120' is moved into the closed position 120A', the movable transport-plate assembly 120*a*' may be locked in the closed position by the first and second latches 1332', 1334'. In the illustrated embodiment, when the movable transport-plate assembly 120*a*' is in the closed position, and the latches 1332', 1334' are moved into the first locking position (FIG. 13A), each of the cam-rollers 1340' engages with and presses against a respective cam surface 1348', 1350', applying a generally downward force thereto, as shown in FIG. 13C. The biasing members 1352' act to retain the latches 1332', 1334' in the first locking position, and thus, maintain the movable transport-plate assembly 120*a*' in the closed position.

According to some embodiments, a precision gap is maintained between the upper transport-plate assembly 120*a*' and the lower transport-plate assembly 120*b*' when the transport mechanism 120' is in the closed position 120A'. Without limitation, the downward force created by the interface between the cam-rollers 1340' and cam surfaces 1348', 1350' acts to engage and maintain a precision interface between an upper transport-plate spacer surface 1376' (most clearly visible in FIG. 13C) and a lower transport-plate spacer surface 1378' (FIG. 13C). According to some aspects, the upper and lower spacer surfaces 1376', 1378' are precision-formed to provide a predetermined, optimal gap between the upper and lower transport-plate assemblies 120a', 120b' when the transport mechanism 120' is in the closed position 120A'.

According to some embodiments, the optimal gap is about 0.030 inches (30 mils). According to some embodiments, the optimal gap is at least about 0.030 inches (30 mils). According to some embodiments, the optimal gap is about 0.035 inches (35 mils). According to some embodiments, the optimal gap is at least about 0.035 inches (35 mils). According to some embodiments, the optimal gap is at least about 0.060 inches (60 mils). According to some embodiments, the optimal gap is at least about 0.090 inches (90 mils). According to some embodiments, the optimal gap is between about 0.030 inches (30 mils) and about 0.040 inches (40 mils). According to some embodiments, the optimal gap is maintained with no more than at least about a five percent deviance along the transport path. That is, for an optimal gap of 30 mils, the gap is no more than five percent greater than 30 mils and no less than five percent less than 30 mils along the transport path. According to some embodiments, the optimal gap is maintained with no more than at least about a ten percent deviance along the transport path.

Any of the methods described herein can include machine readable instructions for execution by: (a) a processor, (b) a controller, and/or (c) any other suitable processing device. It will be readily understood that the document processing system 100, the document processing devices 101, 101', 101a, 101b, 400, the image scanner 140, the controller 150, the computer 151, and/or the first and the second computer 450a,b can include such a suitable processing device. Any algorithm, software, or method disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Document Processing Device Operations in a Financial Institution System

Now referring to FIGS. 14-17, block diagrams of bank and/or financial institution related systems 1400, 1500, 1600, 1700 are shown. Each of the systems 1400, 1500, 1600, and 1700 includes one or more document processing devices 1410a-c, 1510, 1610, 1710 configured to generate image data and/or deposit information associated with documents being deposited into, for example, a financial institution such as a bank.

Figure 14:
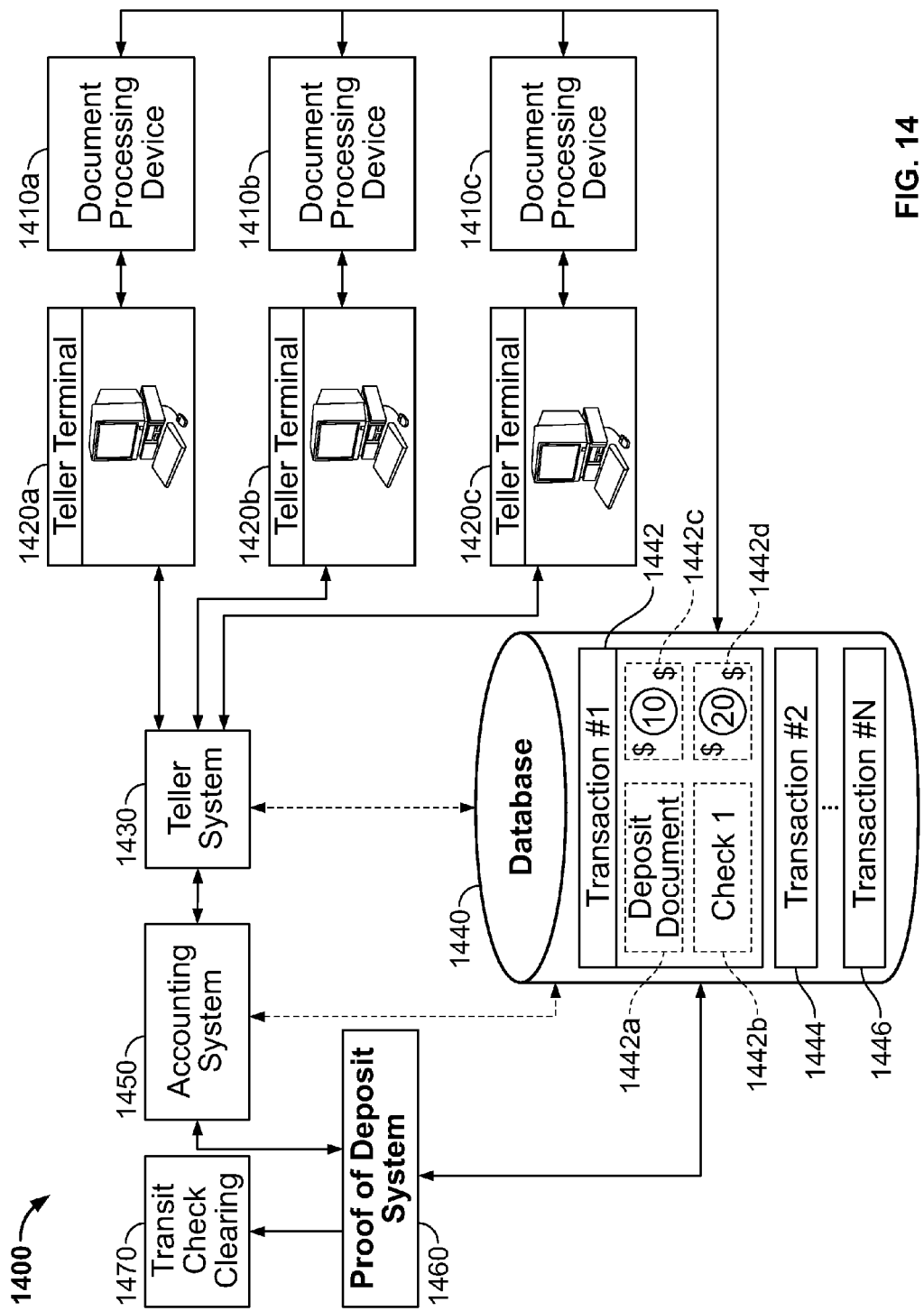
FIGS. 14-17 are block diagrams illustrating banking-related systems including one or more document processing devices according to some embodiments.

Referring to FIG. 14, according to some embodiments, multiple document processing devices 1410a,b,c are communicatively connected or coupled to respective teller terminals 1420a,b,c. The teller terminals 1420a,b,c are in turn communicatively connected with a teller system 1430. As illustrated, a first document processing device 1410a, such as, for example, the document processing device 101, 101' described above in the Document Processing Device and System Section and in connection with FIGS. 1, 2A-2C, and in other sections of the present disclosure, is communicatively connected to a first teller terminal 1420a, which in turn is communicatively connected to the teller system 1430. Other document processing devices, such as, for example, document processing devices 1410b and 1410c, can be similarly communicatively connected or coupled to other respective teller terminals, such as, for example, teller terminals 1420b and 1420c, all within the same financial institution system 1400.

According to some embodiments, each document processing device 1410a,b,c is communicatively connected or coupled to a database 1440 within the financial institution system 1400 that stores information and/or data. According to some embodiments, the database 1440 stores a plurality of data files and/or records associated with a plurality of transactions. The data files and/or records are the same as, or similar to the data files and the records described above in the Document Records and Data Files Section and in connection with FIGS. 3A-3E, and in other sections of the present disclosure.

According to some embodiments, the document processing devices 1410a,b,c are each configured to process batches of documents to generate respective data files, as described, for example, in the Document Processing Device and System Section, in the Optical Character Recognition Section, and in other sections of the present disclosure—each data file being associated with a single transaction. According to some embodiments, each data file includes a record for each document included in the respective batch of documents. Each record can include a variety of information and/or images such as described above in the Document Records and Data Files Section and in connection with FIGS. 3A-3E, and in other sections of the present disclosure.

According to some embodiments, the data files and/or records are stored in and retrievable from the database 1440. As illustrated in the exemplary embodiment of FIG. 14, the 1440 database includes a plurality of data files 1442, 1444, 1446, where each data file is associated with a respective transaction, such as, for example, transaction #1, #2, . . . #N, respectively. Additionally, as shown, according to some embodiments, each data file 1442, 1444, 1446 includes a visually readable image of each document included in the batch of documents associated with the respective transaction. According to some embodiments, each visually readable image is contained in a record included in the respective data file. It is contemplated that according to some embodiments, each record further includes deposit and/or transaction information (not shown) along with the image of the respective document such as described in the Document Records and Data Files Section and in connection with FIGS. 3A-3E, and in other sections of the present disclosure. According to some embodiments, the deposit and/or transaction information is extracted from one or more of the documents in the batch of documents in the same, or similar, manner as described in the Optical Character Recognition Section, and in other sections of the present disclosure. The first data file 1442, that is associated with the first transaction, includes a deposit document record 1442a (e.g., a deposit slip), a check record 1442b, and two currency bill records 1442c,d. Although not illustrated, each of the records 1442a-d can further include deposit and/or transaction information. According to some embodiments, the records 1442a-d also include information obtained from the processed documents, such as, for example, determined denominations of currency bills, extracted serial numbers of currency bills, etc. According to some embodiments, the records 1442a-d include information obtained from the processed documents and/or deposit information and/or transactional information but do not include image data and/or images of the processed documents.

According to some embodiments, the database 1440 can be communicatively connected or coupled in a bi-directional manner with each of the document processing devices 1410*a, b,c*, a proof of deposit system 1460, an accounting system 1450, and/or teller system 1430. Such an architecture allows any of the devices/systems connected to the database 1440 to electronically access and review the data files and/or records contained therein. Additional unidirectional or bidirectional communication can occur through connections between the teller system 1430 and the accounting system 1450, and between the accounting system 1450 and the proof of deposit system 1460.

According to some embodiments, the system 1400 includes a transit check clearing system 1470 that is configured to receive clearing information, such as, for example, check records and/or image data associated with checks, from the proof of deposit system 1460, to clear checks drawn on outside financial institutions. According to some embodiments, the proof of deposit system 1460 is part of an item processing system, such as the item processing system described in the Electronic Portion of Deposit Transaction Section and in connection with FIGS. 4A and 4B, and in other sections of the present disclosure.

Referring generally to FIGS. 14-17, according to some embodiments, the document processing devices illustrated in FIGS. 14-17 can be stand-alone units for each teller terminal, a single device associated with several or all of the teller terminals, or as an all-in-one combined device including teller terminal elements and document processing device components. According to some embodiments, teller systems and associated teller terminals can include a teller window, a vault system, an automatic teller machine (ATM) system, a home banking system, a depositor cash management system, a night teller, and/or a lock box. Additionally, according to some embodiments, the communication connections illustrated in FIGS. 14-17 may be local area networks (LAN), metropolitan area networks (MAN), or wide area network (WAN) or other networks including wired and/or wireless networks such as those known in the art.

In certain embodiments, the document processing devices and systems illustrated in FIGS. 14-17 are part of a vault system. The vault system can include hardware and software which processes the amount and type of currency and/or documents entering or leaving a bank vault. As illustrated in FIGS. 14-17, the document processing devices can also be a part of a teller system which is used to process documents, coin, and currency at a teller window(s) and maintains a record of all types of documents, currency, and coin transactions at the teller window. It is understood that additional or fewer document processing devices and/or teller terminals may be present in any of the systems 1400, 1500, 1600, 1700.

According to some embodiments, the teller systems can be bank branch systems in a bank branch, or a cash vault system in a bank vault. The cash vault system can include a cash management feature that tracks each denomination of currency in the vault, which allows the vault to track how much total currency is present in the vault by denomination. Such a cash management system can be used by the vault to determine a quantity of each denomination of currency bills that can be deposited with, for example, the Federal Reserve Bank, while maintaining enough cash in the vault for servicing the immediate needs of the vault's customers. According to some embodiments, the cash management feature can be used to track currency at an ATM, sometimes called a virtual teller, at a bank vault, at a bank branch, at the Federal Reserve, etc. According to some embodiments, a virtual teller is an ATM that includes imaging capabilities.

Referring back to FIG. 14, according to some embodiments, a bank customer makes a deposit of documents into a bank account maintained or held at the financial institution associated with system 1400. According to some embodiments, the accounting system 1450 maintains detailed physical and/or electronic records of all customer accounts at the financial institution, including, for example, account balances, customer identification information, etc. Additionally, according to some embodiments, records in the accounting system 1450 can be automatically and/or manually updated following clearance of related transactions through the proof of deposit system 1460.

According to some embodiments, a deposit transaction is conducted between a customer and a bank. For example, the customer deposits a check, a $10 bill and a $20 bill. The customer may also give a teller a deposit document, such as a deposit slip, or the teller may create one or more deposit documents for the customer. According to some embodiments, a deposit slip can include information such as a customer account number, a total declared deposit amount, a total number of documents being deposited, a check deposit amount, a number of checks being deposited, a currency bill deposit amount, a number of each denomination of currency bill being deposited, a breakdown of each check and its amount, a cashout amount, or any combination thereof. Thus, a batch of documents is formed that is associated with the deposit transaction and includes a deposit document, a check, a $10 bill, and a $20 bill.

According to some embodiments, the batch of documents is processed by document processing device 1410*a* and a record for each of the documents 1442*a,b,c,d* in the batch of documents that is associated with the transaction between the bank and the customer is generated. According to some such embodiments, each one of the records includes image data that is reproducible as at least a portion of a visually readable image of one of the documents 1442*a,b,c,d*. According to some embodiments, the records are transmitted and stored in the database 1440 as data file 1442 (transaction #1). It is contemplated that according to some embodiments, the data file 1442 includes other deposit and/or transaction information, such as, for example, a date/time of the transaction, the customer's account number, teller information (e.g., a teller identifier of the teller processing the batch of documents with the device 1410*a*), a transaction identifier, etc.

According to some embodiments, customer account numbers of customers transacting financial business (e.g., withdrawing money, depositing currency bills and/or checks) with the financial institution are needed such that the financial institution can track and/or maintain a running record of each customer's account balance in, for example, the accounting system 1450. Customer account numbers can be entered into the systems 1400, 1500, 1600, 1700 in a variety of manners and at a variety of locations using various devices and/or systems contained in the respective systems 1400, 1500, 1600, 1700.

For example, according to some embodiments, a teller operating one of the teller terminals 1420*a,b,c* can enter a customer's account number via an input device (e.g., keyboard, touch screen) at the teller terminal 1420*a,b,c*. According to some embodiments, for example, in response to a teller entering a customer account number at teller terminal 1420*a*, the customer account number is automatically transmitted to document processing device 1410*a*. According to some such embodiments, in response to receiving the customer account number, the device 1410*a* is configured to automatically display a prompt to the teller indicating that the device 1410a is initiated and ready to process documents associated with the inputted customer account number. That is, the device indicated that the teller can insert a batch of documents to be deposited and/or withdrawn from the customer's account.

In response to receiving the batch of documents, the device 1410a generates image data and/or other information as described herein in the Document Processing Device Operations in a Financial Institution System Section, and in other sections of the present disclosure. According to some embodiments, in response to document processing being completed, the customer account number, generated image data, extracted data, and/or other information is transmitted to the database as a data file 1442a containing records 1442a-d for storage therein.

According to some embodiments, a teller operating one of the devices 1410a,b,c inserts a batch of documents into the device and the device, for example, the device 1410a automatically extracts account information (e.g., customer account number) from an image of a deposit slip, automatically transmits the account information to the teller terminal, e.g., 1420a, and populates a customer-account-number field associated with the teller terminal 1420a with the account information. According to some such embodiments, an account number on a deposit slip is MICR encoded, barcoded, or otherwise machine readable encoded and the device 1410a comprises an appropriate sensor(s) to read the account number on the deposit slip such as a MICR reader, a barcode reader etc. According to some such embodiments, the appropriate sensor(s) are positioned adjacent to a document transport path of device 1410a and the device reads the account number from the deposit slip as the deposit slip is being transported through the device. According to some embodiments, the device 1410a is configured to read the account number from the deposit slip using one or more of the OCR algorithms and/or techniques, such as those described in the Optical Character Recognition Section, and in other sections of the present disclosure.

According to some embodiments, a teller operating one of the devices 1410a,b,c enters a customer's account number at one of the devices 1410a,b,c via an input device, such as, for example, a keyboard, a touch screen, a barcode reader/scanner, a magnetic scanner, and/or a MICR reader. According to some embodiments, in response to the customer account number being entered into the document processing device, the account number is automatically associated with documents inputted into an input receptacle of the device for processing. That is, all records generated after receiving the customer account number are tagged with the customer account number until another customer account number is entered. According to some embodiments, the entered customer account number is automatically transmitted to a teller terminal, such as teller terminal 1420a, and populated into a customer-account-number field on the teller terminal 1420a. According to some such embodiments, deposit information, such as a total deposit amount and/or withdrawal amount, is transmitted along with the customer account number to the teller terminal to be forwarded onto the accounting system 1450 to update the customer's account to reflect the transaction.

According to some embodiments, a customer account number and/or customer identifier is received through one or more devices communicatively connected with a teller terminal and/or a document processing device. For example, a biometric reader, a card reader (e.g., ATM card reader), and/or a personal identification number (PIN) input device (e.g., keypad) can be communicatively connected to the teller terminal and/or the device such that in response to a customer, for example, entering a PIN into the PIN input device, the customer's account number is transmitted and/or otherwise communicated to the teller terminal and/or the document processing device. For another example, in response to a customer, for example, placing his/her finger on the biometric reader, the customer's account number is transmitted and/or otherwise communicated to the teller terminal and or device. According to some embodiments, the customer account number can then be associated with one or more data files in the same, or similar, manner described above.

According to some embodiments, a feature of the systems 1400, 1500, 1600, 1700 described herein includes an account number and/or a transaction identifier associated with a transaction that is only entered once by a teller, whether such entry occurs manually, such as, for example, by typing the account number, or automatically, such as, for example, by extracting the account number from a deposit slip or other document associated with the account number or transaction identifier inputted into the document processing device. According to some alternative embodiments, an account number may be entered more than once, for example, a teller may enter an account number via teller terminal 1420a-c as well as device 1410a-c.

According to some embodiments, a teller manually enters deposit information into the teller terminal. In other embodiments, the deposit information is extracted from image data associated with one or more deposit documents and automatically populated into respective fields on the teller terminal. For example, the deposit documents may be placed by the teller into the document processing device which is configured to image and extract deposit information from the documents such as, for example, a total declared check amount and/or a total cash-in amount in the same, or similar, manner as described in the Optical Character Recognition Section, and in other sections of the present disclosure. According to some embodiments, the teller system is configured to send a memo posting or a provisional credit to the accounting system based on the inputted or automatically extracted deposit information.

According to some embodiments, the database 1440 is accessed by an optical character recognition system (OCR system), such as, for example, a CAR/LAR system, that is configured to OCR courtesy amounts (CAR) and/or a legal amounts (LAR) from each check record in the database 1440. It is contemplated that the OCR system is part of a proof of deposit system (POD) that automatically attempts to balance/reconcile data files/transactions stored in the database 1440. According to some embodiments, extracted CAR/LAR information is transmitted to the database 1440 and stored in the appropriate document record.

According to some embodiments, a teller enters an account number via teller terminal 1420a-c and the device 1410a-c determines the account number from a document (e.g., deposit slip) it processes such as by reading machine readable code via an appropriate sensor (e.g., MICR reader, barcode reader) and/or reading extracting the account number from the image of the document such as via OCR. According to such embodiments, the account number determined by the device 1410a-c is included with the data obtained by processing the remainder of the processed documents (e.g., bills and checks). For example, the record for each document processed can be tagged with the account number determined by the device 1410a-c (e.g., each record and/or the transaction data file can have an account number field that is populated with the determined account number). According to some embodiments, the teller terminal 1420a-c and/or the device 1410a-c compare the account number entered by the teller and the account number determined by the device to verify that the account numbers are the same and generate an error signal when they are not.

According to some embodiments, in processing a deposit transaction, a teller enters the appropriate customer account number into a teller terminal 1420a-c. The teller then processes the documents associated with the deposit transaction using one of the document processing devices 1410a-c and the device 1410a-c images the documents, extracts information from the images such as currency bill serial numbers, and generates corresponding records. The device 1410a-c also generates and/or associates a unique ID number, such as a transaction identifier, for the deposit transaction and sends the unique ID number to the teller terminal 1420a-c/teller system 1430. The teller system 1430 and/or accounting system 1450 then associates the unique ID number with the customer account number entered into the teller terminal 1420a-c and stores this association in a memory in or communicatively coupled to the teller system 1430 and/or accounting system 1450. The device 1410a-c associates the generated images and records with the unique ID number and stores them where they can be accessed by the teller system 1430 and/or accounting system 1450 such as in database 1440. In such an embodiment, the customer account number need not be entered into the device 1410a-c and/or shared with the device 1410a-c and/or the computer systems (e.g., databases) which can be accessed by or through the devices 1410a-c. Nonetheless, a deposited document can still be traced back to a particular account at a later time.

For example, if it is later discovered that a bill that is in or was in the bank's possession is a counterfeit bill, a search based on the serial number of such a counterfeit bill could be performed as described above. If the search is performed via the teller system 1430 or accounting system 1450, such system could access the appropriate database such as database 1440, find the record having the matching serial number, retrieve the unique ID number associated with that record, and then determine the appropriate customer account number by accessing the memory which stores the associations between unique ID numbers and customer account numbers. If the search is performed via one of the devices 1410a-c, such a device 1410a-c could access the appropriate database such as database 1440, find the record having the matching serial number, retrieve the unique ID number associated with that record, and then provide or report the unique ID number such as by displaying the unique ID number via interface 170/170' and/or providing the unique ID number electronically to the system (e.g., teller terminal 1420a-c) initiating the search. A search for the corresponding customer account number could then be performed via the teller system 1430 or accounting system 1450 by inputting the unique ID number into such a system, accessing the memory which stores the associations between unique ID numbers and customer account numbers, and retrieving the corresponding customer account number. The corresponding customer account could then be debited for the amount of the counterfeit bill and/or a charge-back signal or instruction could be generated.

According to some embodiments, a teller inserts a batch of documents associated with a deposit transaction into the input receptacle of one of the document processing devices 1410a-c. The batch of documents comprises a deposit slip, a plurality of checks, and a plurality of currency bills. The device 1410a-c processes the documents and generates an electronic cash-in ticket reflecting information relating to the plurality of currency bills deposited such as a total cash-in amount and/or a breakdown by denomination of the number of each denomination of bill deposited. According to some embodiments, the electronic cash-in ticket is then printed by a printer communicatively coupled to the device 1410a-c. According to some embodiments, the printed cash-in ticket is then stored in the teller's drawer along with the deposited currency bills. According to some embodiments, the electronic cash-in ticket is not printed. According to some embodiments, the electronic cash-in ticket is associated with the electronic record(s) of the deposit transaction such as being included as a cash-in record in the data file associated with the deposit transaction.

Figure 15:
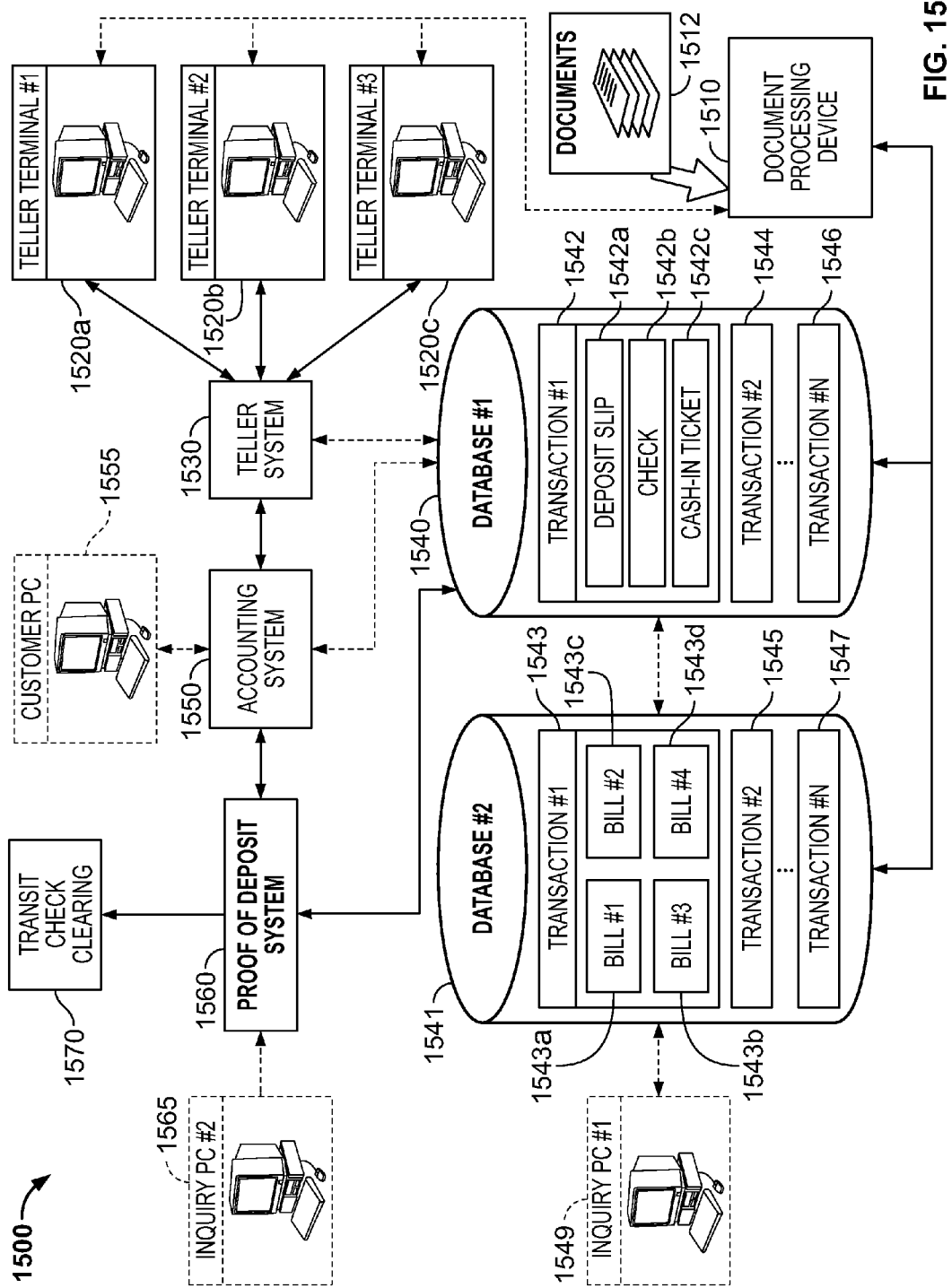

Referring to FIG. 15, an embodiment similar to FIG. 14 is shown with several modifications. Similar to FIG. 14 system 1500 includes multiple teller terminals 1520a,b,c communicatively connected or coupled to a teller system 1530. Furthermore, system 1500 includes an accounting system 1550, a proof of deposit system 1560, and a transit check clearing system 1570. However, instead of having a document processing device at each teller terminal, FIG. 15 has a common document processing device 1510 configured to accept documents 1512 from any teller operating one of the teller terminals 1520a-c. The document processing device 1510 may or may not be communicatively connected or coupled to the teller terminals 1520a,b,c. Furthermore, the document processing device 1510 can be communicatively connected or coupled to one or more databases, such as database #1 1540 and/or database #2 1541.

In addition, system 1500 also includes various personal computer and/or other computer terminal connections, such as customer PC 1555, inquiry PC #1 1549, and inquiry PC #2 1565, which are communicatively connected and configured to gain access to information contained in the accounting system 1550, database #1 1540, database #2 1541, and proof of deposit system 1560, respectively, or otherwise. According to some embodiments, such communication connections permit, for example, a customer to access their account information and/or deposit transactions or a law enforcement agency to access currency bill information for suspect bill tracking purposes.

According to some embodiments, database #1 1540 is configured to store and allow retrieval of records including information or data and/or images of deposit transaction related documents including, for example, a deposit slip record 1542a, a check record 1542b, and a cash-in ticket record 1542c. According to some embodiments, a second database, database #2 1541, separately stores records including images of currency bills deposited and/or withdrawn for a transaction, including a transaction that included a check deposit. For example, as illustrated, data file 1542 associated with transaction #1 includes both a check record 1542b and cash with associated currency bill records 1543a, b, c, d. According to some embodiments, the databases 1540, 1541 are communicatively connected and may be maintained by the same or separate entities, such as a bank, law enforcement agency, or a third-party.

Figure 16:
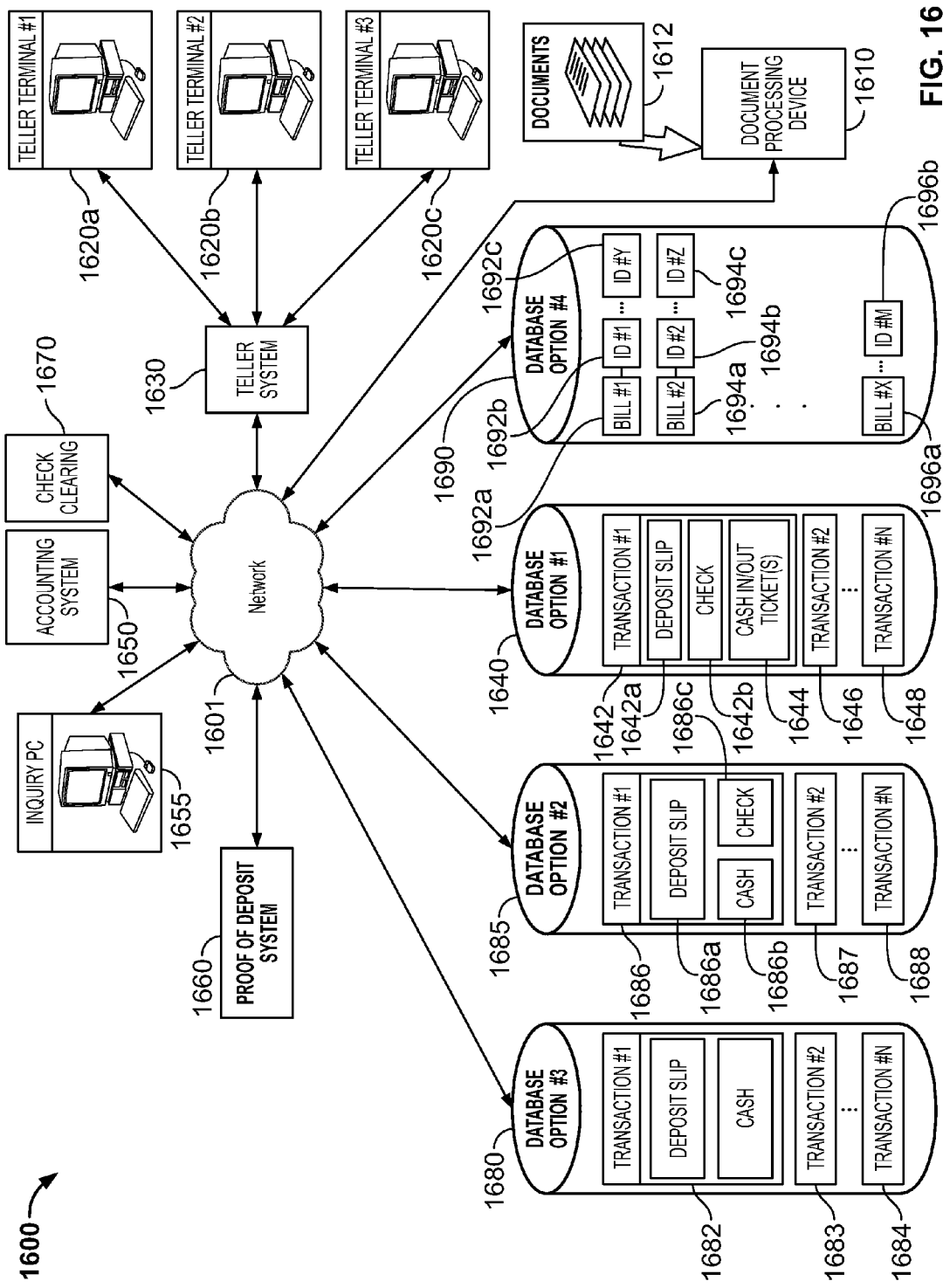

Referring to FIG. 16, an embodiment similar to FIG. 15 is shown with several differences. In FIG. 16 the elements of the financial institution transaction system 1600 are all configured for communications through a network 1601 that may comprise a local area network, a wide area network, or combinations thereof, including the Internet and/or intranet-based systems. Furthermore, records and data files, such as, for example, the records and data files disclosed in the Document Records and Data Files Section and in FIGS. 3A-3E, and in other sections of the present disclosure, received via one or more document processing device(s) 1610 for transaction-related documents 1612 can be stored and retrieved via various configurations of database options 1640, 1680, 1685, 1690. Similar to FIG. 15, the system 1600 includes a teller system 1630 with teller terminals 1620*a,b,c*, an accounting system 1650, a proof of deposit system 1660, a check clearing system 1670, and an inquiry terminal 1655. The various database options 1640, 1680, 1685, 1690 provide exemplary configurations for storing data such as records associated with imaged documents.

For example, database option #1 1640 illustrates a database similar to database #1 1540 from system 1500 with multiple data files including data file 1642 associated with transaction #1 through data file 1648 associated with transaction #N in which each data file includes a deposit slip record 1642*a*, check records 1642*b*, and/or cash in/out ticket record(s) 1644 associated with a transaction. In certain embodiments, a configuration similar to database option #2 1685 can be used in which deposit slip records 1686*a*, cash records 1686*b*, and check records 1686*c* are stored together for a transaction 1686. In yet other embodiments, such as database option #3 1680, cash or currency bill records 1682 are stored separately from check records. It is also contemplated that in certain embodiments, such as database option #4 1690, it may be desirable to store records having images and information for each imaged currency bill, such as images 1692*a*, 1694*a*, 1696*a* and then tag or associate transaction identification information 1692*b*, 1692*c*, 1694*b*, 1694*c*, 1696*b* with each bill record as it is imaged by document processing device(s) 1610 communicatively connected to network 1601 and located at various financial institution or retail locations.

Figure 17:
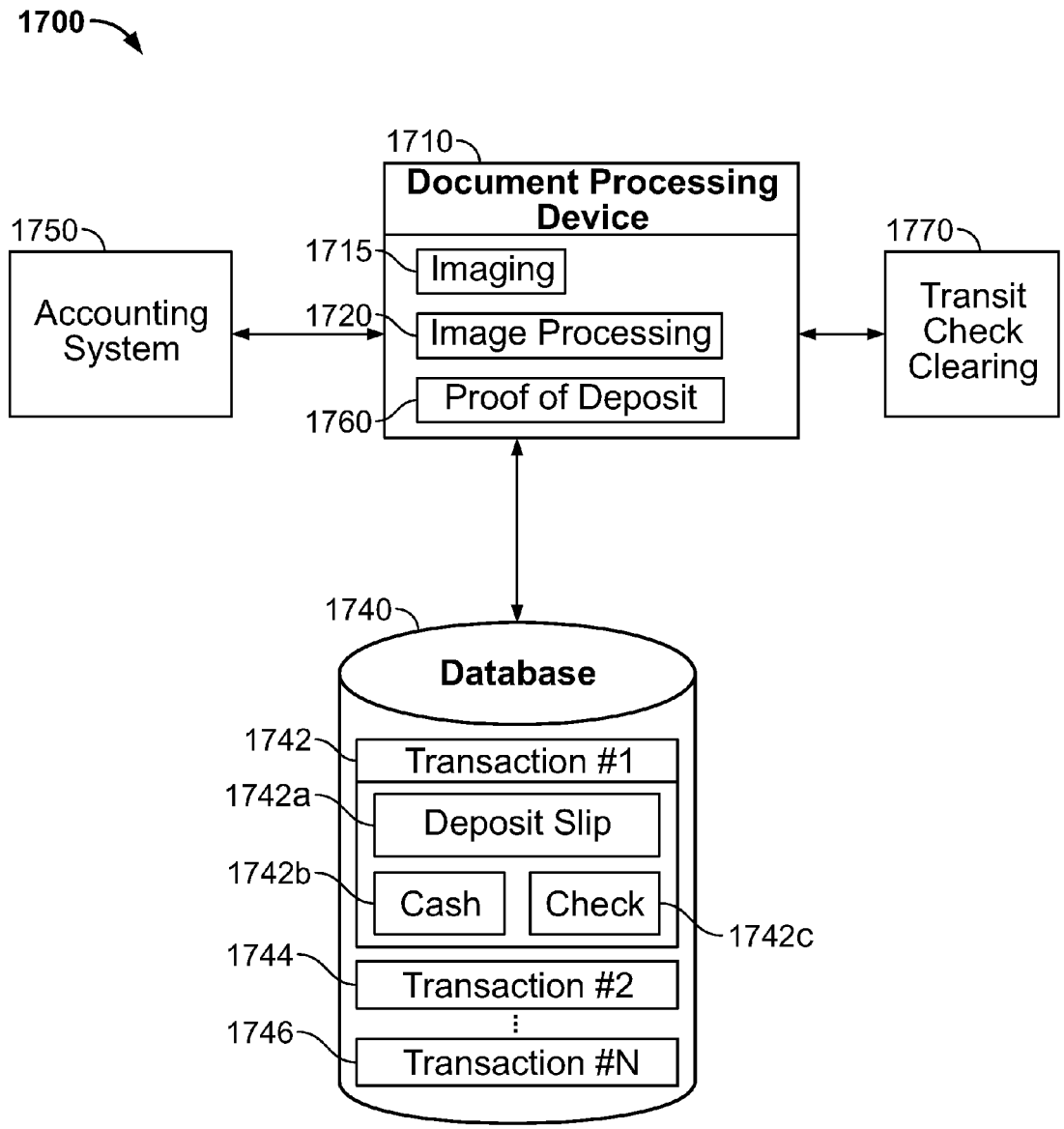

Referring to FIG. 17, a further modified version of the embodiments illustrated in FIGS. 14-16 is shown. System 1700 in FIG. 17 may be desirable because the operations and/or processes of a teller system with teller terminals and a proof of deposit system are consolidated into a single document processing device 1710, which is communicatively connected to a database 1740, an accounting system 1750, and a transit check clearing system 1770.

According to some embodiments, a teller or other user places a plurality of documents including, for example, one or more deposit documents, checks, and/or currency bills, into document processing device 1710 which images the documents 1715 to generate image data, processes the image data 1720 to extract desired information from the documents for the transaction along with determining various transaction specific information such as a transaction identifier and generates records for each document processed. According to some embodiments, the document processing device performs proof of deposit operations 1760 including various CAR/LAR operations for transactions involving checks. The proof of deposit 1760 operation is similar to the operations performed by the proof of deposit system 1460, 1560, 1660 in FIGS. 14-16.

The database 1740 shown in system 1700 is configured to store and retrieve transaction-related information such as data files 1742, 1744, 1746. As shown in the data file 1742 associated with transaction #1, the data file includes a deposit slip record 1742*a*, a cash record 1742*b*, and a check record 1742*c*. It is contemplated that in certain embodiments, other database configurations are included in the system 1700 such as illustrated for or discussed in connection with systems 1400, 1500, or 1600.

According to some embodiments, the systems 1400, 1500, 1600, 1700 can be configured as described below. According to some embodiments, the document processing devices 1410, 1510, 1610 can populate forms and/or fields existing on the teller terminal with information and/or image data related to a transaction, the information including, for example, a customer account number and/or extracted data and records including images of processed documents and/or portions of images of the documents (e.g., snippet images of serial number, back plate number, etc.). It is also contemplated that the customer account number associated with the transaction may also be entered via an interface on the document processing device 1410, 1510, 1610 or via the teller terminals 1420, 1520, 1620 or via teller system 1430, 1530, 1630. The transaction documents may then be imaged, the deposit information/records generated, and the account number associated with the data file. The deposit information/records or data file may then be transmitted to the teller system 1430, 1530, 1630. In the embodiment of system 1700, all these operations may occur directly on the document processing device 1710. In certain embodiments, the teller terminal 1420, 1520, 1620 may be configured to transmit the account number information associated with a transaction to the document processing device 1410, 1510, 1610. In other embodiments, the account number information associated with a specific transaction may be extracted from a deposit slip processed by the document processing device 1410, 1510, 1610, 1710. The extracted account number may then be transmitted to the teller terminal 1410, 1510, 1610 and teller system 1430, 1530, 1630. In certain embodiments, such as in system 1700, the deposit may be proofed directly on the document processing device 1710 with a final credit transmitted to the accounting system 1750, or if the deposit does not balance, to a display associated with the document processing device 1710. It is contemplated that in each of the embodiments described herein that transaction-related documents such as deposit slips, checks, cash, other financial instruments, or combinations thereof may be processed on the document processing device 1410, 1510, 1610, 1710. It is further contemplated that non-cash related document data (e.g., check images) can be transmitted to the proof of deposit systems 1460, 1560, 1660 for balancing and that cash records are transmitted to one or more databases for storage and subsequent retrieval.

It is contemplated that in certain embodiments either the teller terminals 1420, 1520, 1620 or the document processing devices 1410, 1510, 1610, 1710 may display or otherwise signal a system user with a prompt for inserting various documents or information into the document processing device. For example, a separate prompt may be provided for inserting a deposit slip, cash, checks, or combinations thereof. As another example, a prompt may be provided for inserting a deposit slip with a second prompt for inserting a sorted batch of documents or an intermingled batch of documents including, for example, currency bills and checks. In another example, a single prompt may be provided for inserting a stack of documents including a deposit slip, currency bills, checks, or any combination thereof. It is contemplated that a user may need to provide an input to the system following the prompt for the document processing device to proceed. In other embodiments, the document processing device may proceed automatically once the requested or prompted documents are placed into an input receptacle of the document processing device.

Further exemplary embodiments of systems 1400, 1500, 1600, or 1700, include manually entering an account number for a transaction or transmitting or directly entering an account number to the document processing device via an input device. An account number for a transaction can also be entered into a teller-based system via, for example, a teller terminal which then transmits the account number to the document processing device. Records generated from documents received in the document processing device can then be tagged or otherwise associated with the account number for a particular transaction. In another embodiment, a deposit slip may be encoded or imprinted with an account number using a MICR line, bar code, or other machine readable code. Such a deposit slip can be imaged and processed by the document processing device as yet another way of obtaining an account number for a transaction, for example, extracting the account number from the image of the deposit slip. Alternatively, other input devices communicatively connected or coupled to and forming part of a teller terminal and/or document processing device such as MICR readers and barcode readers can be employed to read the account number on a document such as a deposit slip.

According to some embodiments, it is contemplated that a document processing device is configured to process different documents at different document processing speeds. For example, the document processing device may image and extract account information from image data associated with a deposit slip. The account information may be in the form of an image of the MICR line traditionally found on checks or checking account deposit slips. The imaging and processing of the deposit slip may occur at a slower speed than the imaging and processing of currency bills and/or checks associated with the deposit. Thus, a user of the system 1400, 1500, 1600, 1700 may first be prompted to insert the deposit slips which will be imaged and processed at a first processing speed (e.g., 100 documents per minute, 150 documents per minute, 300 documents per minute, 600 documents per minute). Once the deposit slip is imaged and processed the user can then be prompted to insert subsequent transaction documents such as currency bills such as U.S. currency bills which may be imaged and processed at higher speeds (e.g., 800 documents per minute, 1000 documents per minute, 1200 documents per minutes, 2400 documents per minute). According to some embodiments, the document processing device prompts the operator to select or depress a key (e.g., a CONT key) after the currency bills have been inserted into the document processing device and the document processing device begins processing the currency bills at the higher rate of speed (e.g., 1000 bills per minute) when such a key has been selected or depressed. According to some embodiments, the document processing device is configured to detect when a stack of documents is inserted into its input receptacle and automatically begins to operate upon detecting that documents (e.g., a stack of currency bills) have been inserted into its input receptacle. The user may also be prompted to insert checks which may be imaged and processed at yet another speed (e.g., 200 documents per minute, 300 documents per minute, 600 documents per minute). It is also contemplated that in certain embodiments that the document processing device can sense the type of document that is received in an input receptacle and may automatically adjust imaging and processing speeds according to the document type.

It is contemplated that in certain embodiments, the document processing device(s) of systems 1400, 1500, 1600, is (are) the same as, or similar to, the document processing device(s) 101, 101' described in FIGS. 1 and 2A-2C and elsewhere in the present disclosure.

As illustrated in FIG. 14, each teller terminal 1420a,b,c is communicatively connected or coupled to a teller system, which can be configured to allow access to the database 1440. The teller system 1430 is also configured to connect with the accounting system 1450 associated with a financial institution system 1400.

By "accounting system," it is meant to include the hardware and software associated with accessing, maintaining, tracking, and updating savings accounts, checking accounts, credit card accounts, business and commercial loans, consumer payments, and/or all other similar accounts at locations remotely located or located within the network of the document processing device. The term "accounting system" includes three broad types of systems: systems where deposits are made; systems where withdrawals are made; and systems where both deposits and withdrawals are made. Although the accounting system described herein is described as being employed at a financial institution such as a bank, it is understood that any business, public or private institution, or individual can employ an accounting system to process transactions.

After a customer makes a deposit with a teller, such as the deposit illustrated through the data file 1442 associated with transaction #1 in the database 1440, the teller system 1430 may transmit a temporary entry to the accounting system 1450 to update the customers account balance to reflect the deposit. In addition, a proof of deposit system 1460 is configured to proof the deposit transactions stored in the database 1440 and to transmit or make available information associated with transit checks for clearing to the transit check clearing system 1470. The proof of deposit system can have bi-directional communication with the accounting system 1450 and will eventually clear the temporary entry or provisional credit in the accounting system upon the proof of an associated deposit. As illustrated in FIG. 14, the system 1400 can be configured such that the teller system 1430 and the accounting system 1450 has unidirectional or bi-directional communication with the database 1440.

A proof of deposit system (e.g., 1460, 1560, 1660, 1760) is a software and/or hardware unit for proof-of-deposit ("POD") processing. POD processing ensures that for a given transaction, debits equal credits. POD processing can also include courtesy amount recognition ("CAR") and legal amount recognition ("LAR") processing. Such CAR/LAR processing can be performed within the POD system or POD operations. It is also contemplated that the CAR/LAR operations on checks and/or deposit slips can also be performed external to the POD system, such as on a separate system or within the document processing device. For example, CAR/LAR operations and/or POD operations can be performed internally to or externally from the document processing device.

It is contemplated that in certain embodiments, that the document processing device and teller terminal operations/features may be a part of an automated teller machine system. It is also contemplated that in certain embodiments that the proof of deposit may be included in the document processing device, such as, for example, as shown in FIG. 17 as elements 1710, 1760.

It is contemplated that in certain embodiments of the systems 1400, 1500, 1600, 1700, that a transaction identification number or code is tagged or associated with each record and/or data file associated with a particular deposit or withdrawal transaction. This transaction identifier can be useful in various exemplary situations. For example, to match up a transaction when a group of checks and a separate group of currency bills are processed according to a sorted-group mode of operation in a document processing device as described herein in the Definitions Section, and in other sections of the present disclosure. It can also be useful when checks, other financial documents, and currency bills are stored and/or retrieved from separate databases, such as, for example, as shown in FIGS. 15 and 16. The transaction identifier associated with record and/or data file can then be used to associate all of the documents associated with the particular deposit or withdrawal transaction. The transaction identifier or code can be assigned by the document processing device or it can be received through input into the document processing device, or combinations thereof. The transaction identifier or code can be a number or code different from an account number. According to some embodiments, the transaction identifier is physically applied directly to a document by the document processing device or by a separate marking device. For example, a document processing device can be configured to print a document identifier and/or transaction identifier on a back side of all checks processed therein.

Document Processing Vault Systems

Referring to FIG. 18A, a block diagram of a document processing vault system 1801 is shown according to some embodiments of the present disclosure. The document processing vault system 1801 can include one or more of the document processing devices and/or systems described herein in combination with one or more vaults or safes. As shown in FIG. 18A, the document processing vault system 1801 includes a document processing device 1803, an outer vault 1805, and an inner bill vault or compartment 1807*a*. The document processing device 1803 is similar to, and can perform the same or similar operations as, the document processing device 101, 101', 101*a* shown in, for example, FIGS. 1, 2A-2C, 4A and described herein in the Document Processing Device and System Section, in the Deposit Transaction Section, and in other sections of the present disclosure.

According to some embodiments, an operator inserts a stack of documents including checks and currency bills into an input receptacle of the document processing device 1803. The stack of documents can include one or more sorted batches of documents and/or one or more intermingled batches of documents. According to some alternative embodiments, the operator inserts a single document at a time into the input receptacle for processing. According to such embodiments, the operator can insert one bill or one check into the input receptacle for processing. According to some embodiments, the document processing vault system 1801 processes all of the documents and transports the checks to one or more output receptacles 1803*a* that are accessible by the operator and transports the currency bills into the bill vault 1807*a*, which can be a secure storage compartment or cassette within the outer vault 1805. In some such embodiments, the operator cannot retrieve the currency bills stored in the bill vault 1807*a*. In other embodiments, the operator can retrieve some or all of the currency bills by using a key or by entering a code, or the like. Yet in other embodiments, only a third party can retrieve the currency bills stored in the secured storage compartment, such as, for example, a bank employee or armored carrier employee.

According to some embodiments, the outer vault 1805 includes one secured storage compartment or cassette for securely storing each type of denomination of currency bill processed by the document processing vault system. That is, according to some embodiments, the document processing vault system 1801 can be configured to sort currency bills by denomination. For U.S. currency bills, according to some embodiments, the document processing vault system includes at least seven compartments or cassettes, one for each of the denominations, $1, $2, $5, $10, $20, $50, and $100. According to some alternative embodiments, the outer vault 1805 includes a single secured storage compartment or cassette for securely storing each denomination of currency bill processed by the document processing vault system 1801, such that the stored currency bills having a plurality of denominations are intermingled within the single compartment. According to some embodiments, the document processing vault system 1801 further includes at least one check vault 1807*b*, such as, for example, a secure storage compartment for receiving and storing checks. According to some embodiments, the document processing vault system 1801 includes a single inner vault (not shown), such as, for example, a secure storage compartment for receiving and storing currency bills and checks. According to some embodiments, the document processing vault system 1801 includes a shredder 1813 or document destruction device for receiving and destroying checks after being imaged and/or otherwise processed by the document processing vault system 1801.

According to some embodiments, the outer vault 1805 includes a suspect vault 1807*c* for receiving and securely storing suspect bills determined to be suspect by the document processing device 1803. According to some embodiments, the document processing vault system 1801 is physically and/or communicatively connected to a coin processing device 1811*a* and an outer coin vault 1811*b*. The outer coin vault 1811*b* can include one or more inner coin vaults 1811*c* for securely storing coins processed by the coin processing device 1811*a*.

According to some embodiments, the document processing vault system 1801 is communicatively connected to one or more financial institutions 1809 via one or more networks. It is contemplated that, according to some embodiments, the document processing vault system 1801 can be configured to make a data file available to the financial institution 1809 to receive a provisional and/or final credit for some or all of the documents and/or coins processed and/or stored in the document processing vault system 1801, in the same, or similar, manner that the customer document processing system 102 obtains credit from the financial institution system 103 described in connection with FIGS. 4A and 4B. According to some embodiments, the document processing vault system 1801 can be configured to automatically transmit a data file that is similar to, for example, the data file 301 described above in reference to FIG. 3E in the Document Records and Data Files Section, and in other sections of the present disclosure, to the financial institution 1809. According to some such embodiments, the financial institution 1809 can credit a financial institution account based on the value of documents and/or coins stored in the document processing vault system 1801 and/or processed by the document processing vault system 1801 in the same, or similar, fashion as described herein, such as, for example, as described in reference to FIGS. 4A and 7A-B.

According to some embodiments, one or more financial institution accounts associated with deposited documents and/or coins stored in the document processing vault system 1801 can receive interest based on a value of the deposited documents and/or coins in the document processing vault system 1801. According to some such embodiments, interest can begin to accrue in response to documents and/or coins being deposited and processed by the document processing vault system 1801 and stored in the vaults 1807*a-c* and 1811*c*.

Referring to FIG. 18B, a perspective view of a document processing vault system 1821 is shown according to some embodiments of the present disclosure. The document processing vault system 1821 is similar to the document processing vault system 1801 described above in reference to FIG. 18A. The document processing vault system 1821 includes a document processing device 1823 coupled with an outer vault 1825. The outer vault 1825 can include one or more inner bill vaults, inner check vaults, and/or inner suspect vaults.

According to some alternative embodiments, the document processing vault system 1821 is coupled with a coin processing device 1827, which is coupled with an outer coin vault 1829. The coin processing device 1827 is configured to receive, process, and store coins in the outer coin vault 1829. According to some embodiments, the coin processing device 1827 is configured to denominate coins, count coins, sort coins, authenticate coins, or any combination thereof. The outer coin vault 1829 can include one or more inner coin vaults, which can be, for example, metal bins, plastic bins, and/or coin bags. Additional details regarding coin processing devices and methods for processing coins are described in U.S. Patent Publication No. 2009/0236200, entitled "Apparatus, System and Method For Coin Exchange," filed Dec. 30, 2008, which is hereby incorporated by reference herein in its entirety.

Referring to FIG. 18C, a partial cross-sectional perspective view of the document processing vault system 1821 of FIG. 18B is shown according to some embodiments of the present disclosure. FIG. 18C illustrates a transport path of documents from an input receptacle 1823*a* (FIG. 18B) of the document processing device 1823 to one or more of the inner vaults, such as, for example, an inner vault 1831. The inner vault 1831 is shown outside of its operational position, which is shown in dotted lines as 1831*a*, for illustrative purposes.

According to some embodiments, documents are processed by the document processing device 1823 and are stacked on top of a moveable gate 1833. According to some embodiments, in response to a predetermined amount of documents being stacked and/or in response to all of the documents in the input receptacle 1823*a* being processed and stacked on the moveable gate 1833, the moveable gate 1833 is moved in the direction of arrow A, and a plunger assembly 1835 forces the stacked documents in the direction of arrow B into the inner vault 1831.

According to some embodiments, the inner vault 1831 can be removed from the outer vault 1825 for transportation of the entire inner vault 1831 to, for example, a bank or armored carrier. Additional details of inner vaults and/or cassettes are described in U.S. Pat. No. 6,601,687, entitled "Currency Handling System Having Multiple Output Receptacles".

Figure 18D:
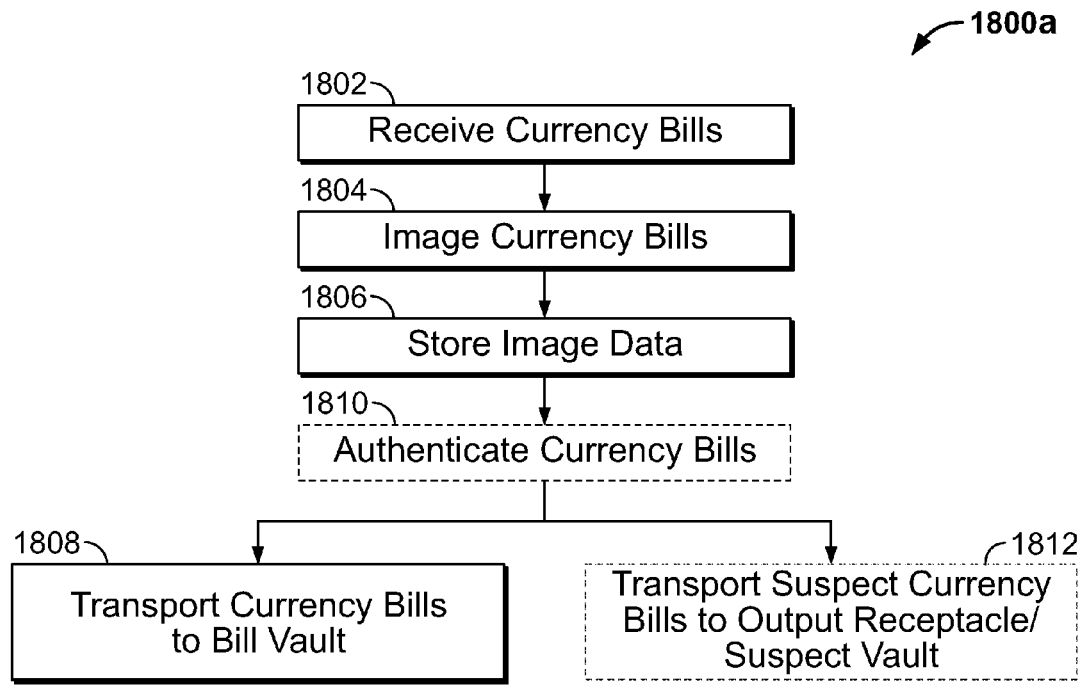
FIG. 18D is a flowchart of a method of processing currency bills in a document processing vault system according to some embodiments of the present disclosure.

Referring to FIG. 18D, a method 1800*a* of processing currency bills in a document processing vault system, such as the document processing vault system 1801, is shown according to some embodiments. At act 1802, a document processing vault system receives currency bills in one or more input receptacles. At act 1804, the currency bills are transported from the one or more input receptacles past one or more image scanners which image each of the currency bills as described elsewhere herein, such as, for example, in the Document Processing Device and System Section, and in other sections of the present disclosure. The imaging of the currency bills generates image data that is reproducible as a visually readable image of at least a portion of each of the imaged currency bills.

At act 1806, the image data is stored in a memory device. The memory device can be within the document processing vault system or external thereto, such as, for example, the memory device can be located in a server networked with the document processing vault system. According to some embodiments, the memory device is a long-term storage device, such as, for example, a magnetic storage device like a hard-drive. According to some alternative embodiments, the memory device is a short-term storage device, such as, for example, a semiconductor storage device like random-access memory (RAM). According to some embodiments, the memory device can include a hard-drive, a mobile phone, a smart pad, an electronic wallet, a USB storage device, a stored value card, or any combination thereof.

After act 1804, the currency bills are transported to a bill vault, such as, the bill vault 1807*a*, at act 1808, for securely storing the currency bills therein. According to some embodiments, the currency bills are stored in a single cassette or location having all denominations of currency bills intermingled therein. According to other embodiments, the document processing vault system is further configured to sort the currency bills by denomination and to transport each denomination to a separate storage cassette or location within the bill vault, at act 1808.

According to some alternative embodiments, the method 1800*a* of processing currency bills further includes authenticating each currency bill, at act 1810, followed by act 1808, transporting the currency bills to the bill vault. In such alternative embodiments, the document processing vault system determines if each currency bill is a suspect bill based on one or more authentication tests, such as those described herein, for example, in the Document Processing Device and System Section, and in other sections of the present disclosure. In response to a currency bill being flagged or determined to be a suspect bill, at act 1812, the document processing vault system can transport the suspect bill to one or more operator accessible output receptacles of the document processing vault system or to a suspect vault within the document processing vault system instead of transporting the currency bill to the bill vault.

According to some embodiments, the document processing vault system indicates to an operator that the currency bills transported to the output receptacle or the suspect vault are suspect bills. According to some embodiments, the operator can physically access the suspect bills in the output receptacle for further processing of these suspect bills. According to some embodiments, the document processing vault system is configured to print or make a report available to the operator that includes information regarding each determined suspect bill. The information in the report can include a serial number of each determined suspect bill.

While the acts 1802, 1804, 1806, 1808, 1810, and 1812 are illustrated and described in a particular sequence, it is contemplated that the method 1800*a* can be performed in a variety of different orders and/or with one or more acts occurring simultaneously. For example, for a stack of documents, the device can be configured to receive (1802), image (1804), store (1806), authenticate (1810), and/or transport (1808, 1812) different ones of the respective documents simultaneously.

Figure 18E:
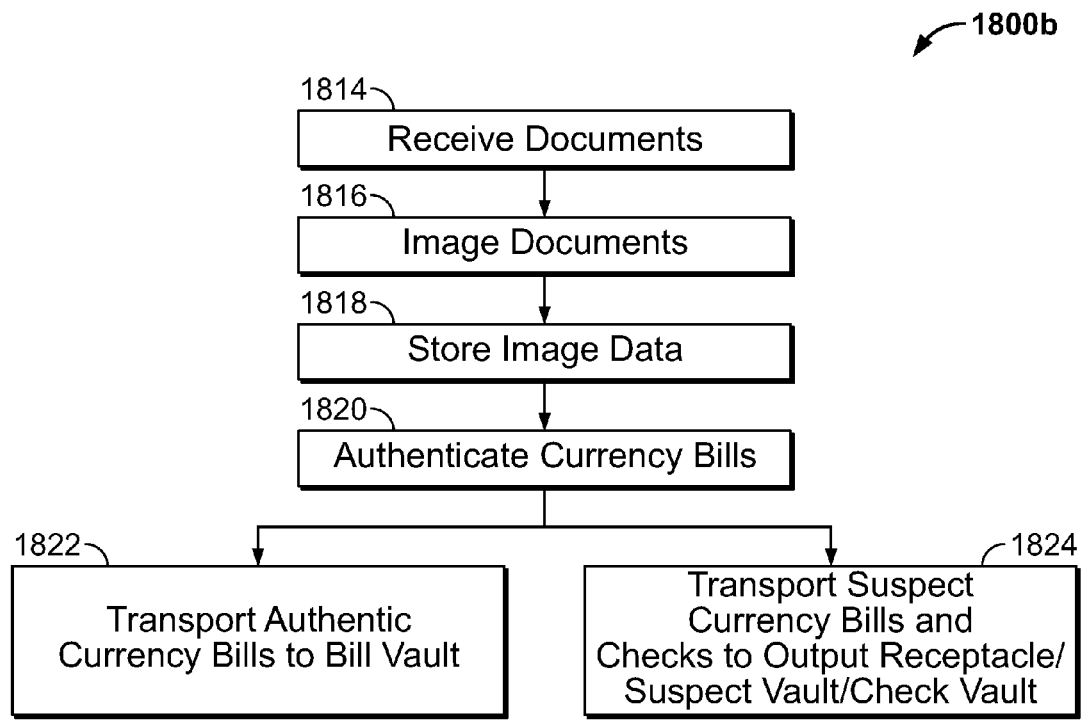
FIG. 18E is a flowchart of a method of processing documents in a document processing vault system according to some embodiments of the present disclosure.

Referring to FIG. 18E, a method of processing documents 1800*b* in a document processing vault system, such as the document processing vault system 1801, is shown according to some embodiments. At act 1814, a document processing vault system receives a stack of documents in one or more input receptacles of the document processing vault system. The stack of documents can include one or more sorted batches of documents and/or one or more intermingled batches of documents including, for example, currency bills and checks. At act 1816, the documents are transported from the one or more input receptacles past one or more image scanners to image each of the documents as described elsewhere herein, such as, for example, as described in the Document Processing Device and System Section, and in other sections of the present disclosure. The imaging of the documents generates image data that is reproducible as a visually readable image of at least a portion of each of the imaged documents. At act 1818, the image data is stored in a memory device in a similar fashion as described above in relation to FIG. 18D.

Either before or after act 1816, each currency bill is authenticated at act 1820. At act 1822, the document processing vault system is configured to transport non-suspect currency bills to a bill vault in a similar manner as described above in reference to act 1808, which is shown in FIG. 18D. Additionally, at act 1824, the document processing vault system is configured to transport suspect bills to one or more output receptacles of the document processing vault system in a similar manner as described above in reference to FIG. 18D. According to some embodiments, at act 1824, the document processing vault system is configured to transport checks to one or more of the output receptacles of the document processing vault system. It is contemplated that after checks are processed and/or imaged by the document processing vault system, the checks can be shredded or otherwise destroyed. According to some embodiments, the document processing vault system further includes a shredding device or document destruction device coupled therewith for receiving and destroying the checks after being processed. According to some alternative embodiments, after checks are processed and/or imaged by the document processing vault system, the checks can be stored in a check vault, such as the check vault 1807c, described above in reference to FIG. 18A. According to some alternative embodiments, suspect bills are transported to and stored in a suspect vault, such as, for example, suspect vault 1807c, described above in reference to FIG. 18A.

While the acts 1814, 1816, 1818, 1820, 1822, and 1824 are illustrated and described in a particular sequence, it is contemplated that the method 1800b can be performed in a variety of different orders and/or with one or more acts occurring simultaneously. For example, for a stack of documents, the device can be configured to receive (1814), image (1816), store (1818), authenticate (1820), and/or transport (1822, 1824) different ones of the respective documents simultaneously.

Figure 18F:
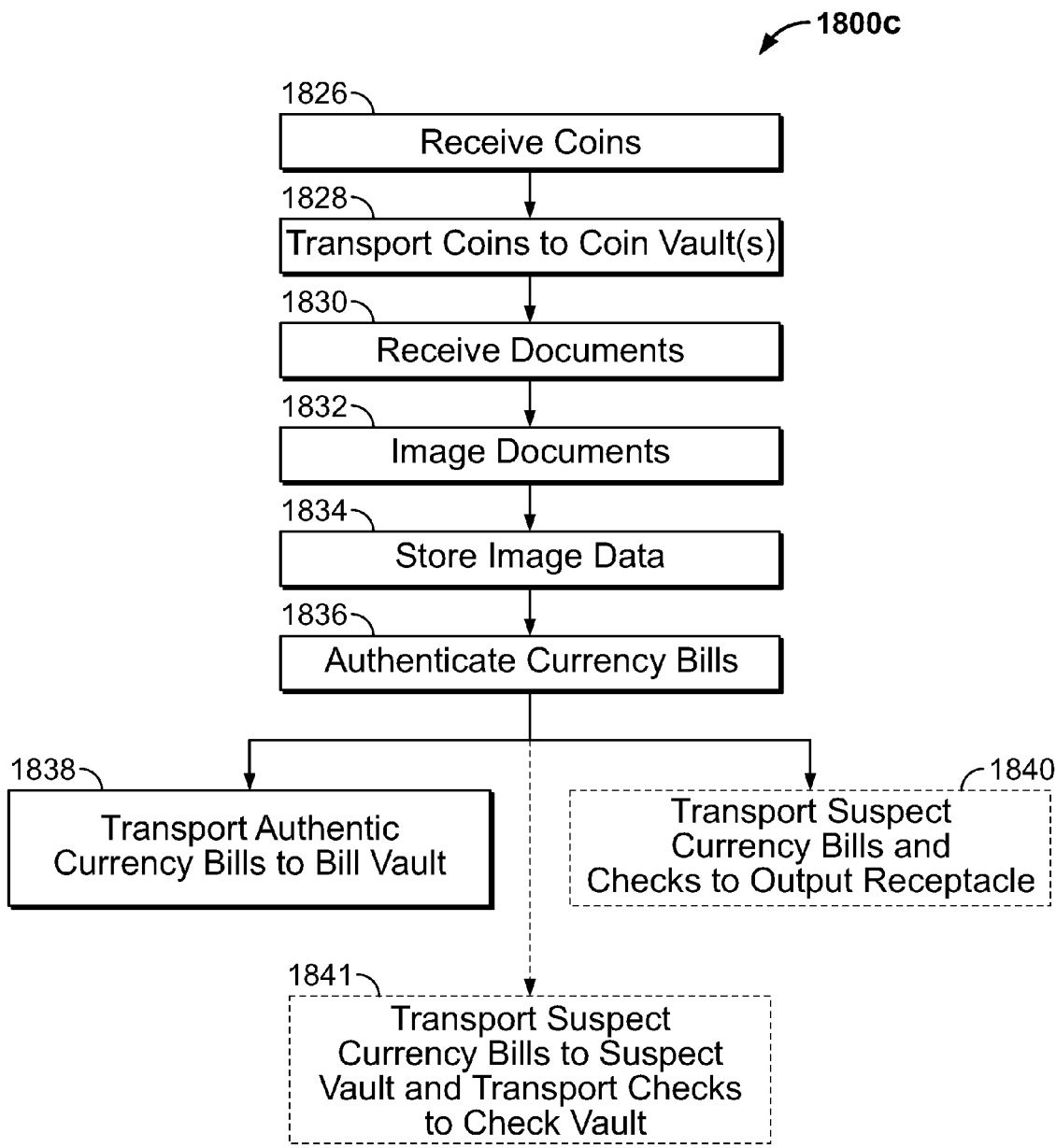
FIG. 18F is a flowchart of a method of processing documents and coins in a document processing vault system according to some embodiments of the present disclosure.

Referring to FIG. 18F, a method of processing documents and coins 1800c in a document processing vault system, such as the document processing vault system 1801, is shown according to some embodiments. At act 1826, a document processing vault system receives coins in one or more coin input receptacles. According to some embodiments, the coins are counted, denominated, and/or authenticated. At act 1828, the coins are transported via a coin transport mechanism to one or more coin vaults. According to some embodiments, the coins are securely stored in one or more coin bins by denomination. According to some embodiments, coins are mixed and securely stored in one or more coin vaults, bins, and/or bags. According to some embodiments, coins failing one or more coin authentication tests are flagged as suspect coins. According to some embodiments, suspect coins are transported to a reject coin bin rather than the coin vault. It is contemplated that according to some embodiments, an operator can manually retrieve the suspect coins in the reject coin bin.

At act 1830, the document processing vault system receives a stack of documents in one or more input receptacles of the document processing vault system. The stack of documents can include one or more sorted batches of documents and/or one or more intermingled batches of documents including, for example, currency bills and checks. It is contemplated that, according to some embodiments, at act 1830, the documents can be received after the coins are received at act 1826, before the coins are received at act 1826, and/or at the same time the coins are received at act 1826. At act 1832, the documents are transported from the one or more input receptacles past one or more image scanners to image each of the documents as described elsewhere herein, such as, for example, as described in the Document Processing Device and System Section, and in other sections of the present disclosure. The imaging of the documents generates image data that is reproducible as a visually readable image of at least a portion of each of the imaged documents. At act 1834, the image data is stored in a memory device in a similar fashion as described above in relation to FIG. 18D.

Either before or after act 1832, each currency bill is authenticated at act 1836. At act 1838, the document processing vault system is configured to transport non-suspect currency bills to a bill vault in a similar manner as described above in reference to FIG. 18D. Additionally, according to some alternative embodiments, at act 1840, the document processing vault system is configured to transport suspect bills to one or more output receptacles of the document processing vault system in a similar manner as described above in reference to FIG. 18D. According to some embodiments, at act 1840, the document processing vault system is configured to transport checks to the one or more output receptacles of the document processing vault system in a similar manner as described above in reference to FIG. 18E.

According to some alternative embodiments, after checks are processed and/or imaged by the document processing vault system, the checks can be stored in a check vault, at act 1841, such as the check vault 1807b, described above in reference to FIG. 18A. According to some alternative embodiments, in response to a currency bill being flagged or determined to be a suspect bill, at act 1836, the document processing vault system can, at act 1841, transport the suspect bill to a suspect vault, such as, for example, the suspect vault 1807c. According to some alternative embodiments, the checks and currency bills can be stored in the same vault. According to some such alternative embodiments, the checks and currency bills can be stored in the same vault along with additional documents, such as, for example, header/trailer cards.

While the acts 1826, 1828, 1830, 1832, 1834, 1836, 1838, 1840, and 1841 are illustrated and described in a particular sequence, it is contemplated that the method 1800c can be performed in a variety of different orders and/or with one or more acts occurring simultaneously. For example, it is contemplated that according to some embodiments, the documents are received (1830) prior to receiving the coins (1826). For another example, for a stack of documents, the device can be configured to receive coins (1826), transport coins (1828), receive documents (1830), image (1832), store (1834), authenticate (1836), and transport (1838, 1840, 1841) different ones of the respective documents simultaneously.

Figure 18G:
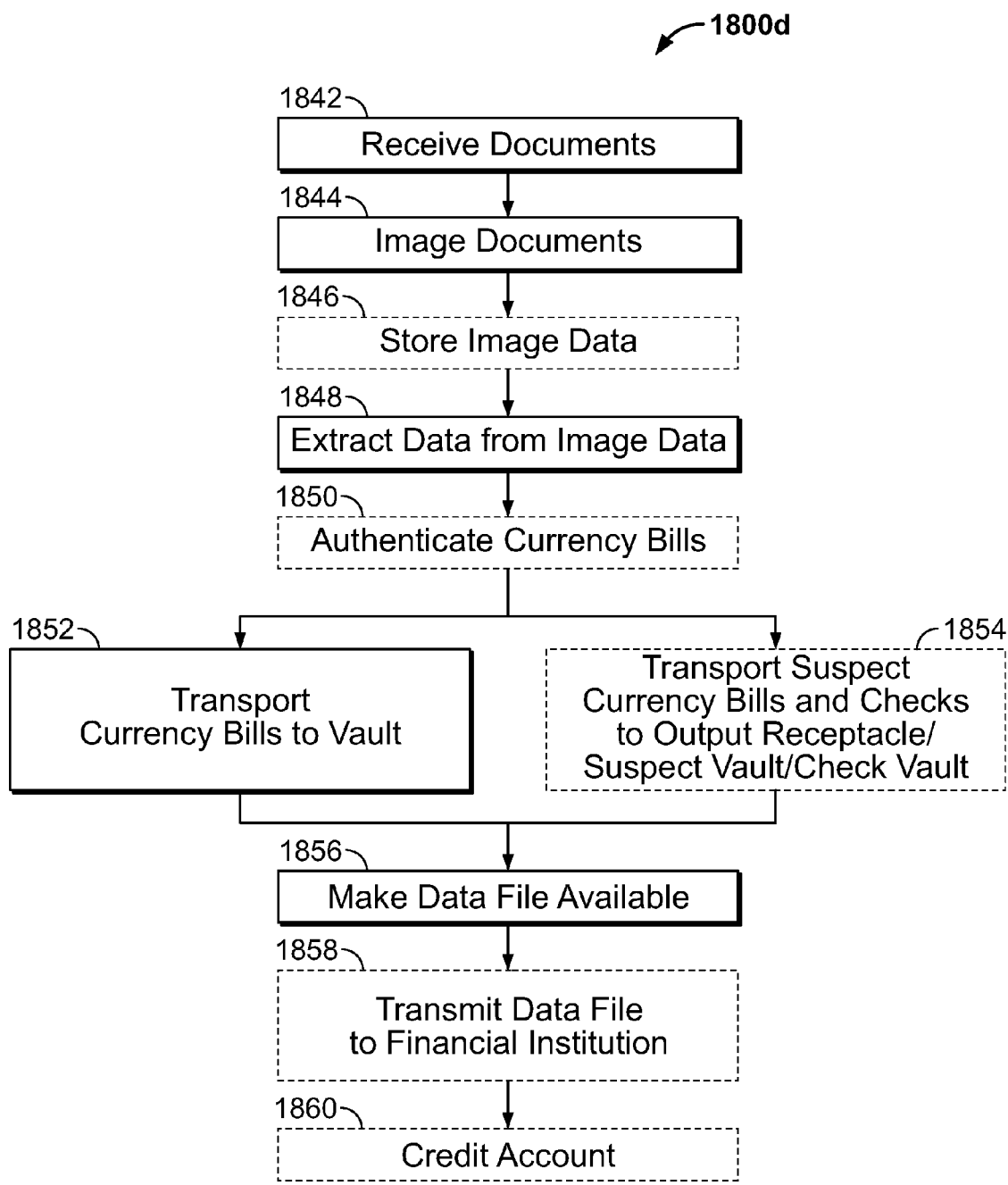
FIG. 18G is a flowchart of a method of processing documents in a document processing vault system according to some embodiments of the present disclosure.

Referring to FIG. 18G, a method of processing documents 1800d in a document processing vault system is shown according to some embodiments. At act 1842, a document processing vault system receives a stack of documents in one or more input receptacles of the document processing vault system. The stack of documents can include one or more sorted batches of documents and/or one or more intermingled batches of documents including, for example, currency bills and checks. At act 1844, the documents are transported from the one or more input receptacles past one or more image scanners to image each of the documents as described elsewhere herein, such as, for example, as described in the Document Processing Device and System Section, and in other sections of the present disclosure. The imaging of the documents generates image data that is reproducible as a visually readable image of at least a portion of each of the imaged documents. According to some embodiments, at act 1846, the image data can be stored in a memory device in a similar fashion as described above in relation to FIG. 18D.

At act 1848, the document processing vault system is configured to extract data from the image data in the same, or similar manner, as described herein, such as, for example, as described in the Optical Character Recognition Section, and in other sections of the present disclosure. For image data reproducible as a visually readable image of a currency bill, according to some embodiments, the document processing vault system is configured to extract a serial number from the image data. For image data reproducible as a visually readable image of a check, according to some embodiments, the document processing vault system is configured to extract at least a portion of a MICR line from the image data. According to some embodiments, other information is extracted from the image data, such as, for example, signatures, plate numbers, etc.

According to some embodiments, either before or after act 1844, each currency bill can be authenticated at act 1850. At act 1852, the document processing vault system is configured to transport non-suspect currency bills to a vault in a similar manner as described above in reference to FIG. 18D. Additionally, according to some alternative embodiments, at act 1854, the document processing vault system is configured to transport suspect bills to one or more output receptacles of the document processing vault system in a similar manner as described above in reference to FIG. 18D. According to some embodiments, at act 1854, the document processing vault system is configured to transport checks to the one or more output receptacles of the document processing vault system in a similar manner as described above in reference to FIG. 18E. According to some alternative embodiments, after checks are processed and/or imaged by the document processing vault system, the checks can be stored in a check vault, such as the check vault 1807b, described above in reference to FIG. 18A. According to some alternative embodiments, suspect bills are transported to and stored in a suspect vault, such as, for example, suspect vault 1807c, described above in reference to FIG. 18A.

At act 1856, the document processing vault system is configured to make a data file, that is similar to, for example, the data file 301 described above in reference to FIG. 3E in the Document Records and Data Files Section, and in other sections of the present disclosure, available. According to some embodiments, the data file includes at least a portion of the generated image data and/or at least a portion of the extracted data. According to some embodiments, the data file includes a record for each imaged document. The records can be the same as, or similar to, the records described herein, such as, for example, the records described in the Document Records and Data Files Section and such as described in connection with FIGS. 3A-3D, and in other sections of the present disclosure. The data file can be downloaded or uploaded by a financial institution in a similar manner as described elsewhere herein, such as, for example, in connection with FIGS. 3E and 4A and in the Document Processing Device and System Section, and in other sections of the present disclosure. According to some alternative embodiments, at act 1858, the document processing vault system is configured to transmit the data file to a financial institution. According to some alternative embodiments, at act 1860, the financial institution that receives or otherwise obtains the data file and is configured to credit a financial institution account based on the data file, as described elsewhere herein, such as, for example, as described in connection with FIGS. 4A, 5A, 6, 7B, and 8A-B.

It is contemplated that the document processing vault system can be owned, operated, and/or controlled by a financial institution and located in a store, such as a retail store, or financial institution customer's office or building. Such an arrangement allows, for example, a bank customer, such as a retail store, to make secured deposits in its own store using the document processing vault system. Because the bank receives a data file containing a variety of information (e.g., images of bills and checks, amounts of each check, serial number for a bill, etc.) regarding deposits made into the document processing vault system and/or those documents transported into and stored in the secured vault, the bank may issue a provisional and/or a final credit for all of or a portion of deposits made into the document processing vault system. According to some embodiments, checks deposited into the vault system are not stored therein, but rather are returned to the depositor (store). According to some embodiments, a bank or armored carrier service owns the document processing vault system and controls access to the vault(s) therein. According to some such embodiments, store personnel can operate the vault system to make deposits but cannot otherwise gain access to documents stored in the vault(s) therein. According to some embodiments, a store and the owner of the vault system (e.g., bank or armored carrier service) can enter into an agreement whereby depositing document(s) within the vault system transfers ownership of the document(s) from the store to the vault system owner. According to some such embodiments, the owner is a bank that gives the store a credit for the deposit at the time of the deposit, even if an armored carrier does not pickup the documents until a later time or even on a different day, etc.

According to some embodiments, an armored carrier service can make routine and/or periodic stops either at the request of the store, bank, or otherwise, at the store to remove one or more cassettes or transportable document storage devices from the vault system for further processing. For example, the armored carrier service can pickup physical documents from the vault system for further processing in the same, or similar, manner as described above in the Deposit Transaction Section, the Physical Portion of Deposit Transaction Section, in reference to FIGS. 4A and 4B, and in other sections of the present disclosure. According to some embodiments, the documents picked up by the armored carrier service can include checks for further physical processing by the armored carrier service and/or a financial institution. Alternatively, any checks deposited into the vault system can be returned to the store automatically as described above or by the armored carrier service to remain at the store indefinitely such that the store can save the checks for future reference or destroy the checks, such as, for example, as described in the Deposit Transaction Section, the Physical Portion of Deposit Transaction Section, in reference to FIGS. 4A and 4B, and in other sections of the present disclosure.

While the acts 1842, 1844, 1846, 1848, 1850, 1852, 1854, 1856, 1858, and 1860 are illustrated and described in a particular sequence, it is contemplated that the method 1800d can be performed in a variety of different orders and/or with one or more acts occurring simultaneously. For example, for a stack of documents, the device can be configured to receive (1842), image (1844), store (1846), extract (1848), authenticate (1850), and transport (1852, 1854) different ones of the respective documents simultaneously.

According to some embodiments, the cassettes referred to herein are intelligent cassettes including a memory device for electronically storing records therein. According to some embodiments, each cassette memory stores a record associated with each document expected to be located in the cassette. According to some embodiments, the records are the same as, or similar to, the records 300a-d described in the Document Records and Data Files Section and in connection with FIGS. 3A-3D, and in other sections of the present disclosure. According to some embodiments, the intelligent cassettes are communicatively connected to the document processing device and/or system such that, in response to documents being transported into the intelligent cassette, the device/system also transmits the records of the associated documents. For example, an imaging MPS includes a plurality of intelligent cassettes, where each cassette is configured to receive a single U.S. denomination of currency. In response to an operator processing a stack of documents including U.S. currency bills including all seven denominations, the imaging MPS is configured to transport each denomination to a respective one of the intelligent cassettes and to transmit a corresponding record to the corresponding cassette memory.

According to some embodiments, the document processing devices and/or systems of the present disclosure can be configured to receive one or more intelligent cassettes in a input receptacle. According to some such embodiments, the device and/or system is configured to receive and/or retrieve documents stored therein and process the documents as described herein. According to some embodiments, the device and/or system is configured to electronically couple to the intelligent cassette and read a data file included in a memory of the intelligent cassette(s). According to some embodiments, the device and/or system is configured to compare the data in the memory of the intelligent cassette with generated information to determine if any documents that are suppose to be the intelligent cassette are missing and/or to determine if there are any additional documents in the intelligent cassette that were unexpected.

According to some embodiments, the intelligent cassettes include respective barcodes instead of or in addition to memory devices. It is contemplated that according to some embodiments, the barcodes on intelligent cassettes are inputted into a document processing system such as the imaging MPS via, for example, a barcode reader. According to some such embodiments, in response to a document being transported to a specific cassette, the imaging MPS is configured to tag the corresponding barcode (decoded barcode indicia) to a record associated with the document stored in a database, such as the databases described herein, such as, for example, database 1200a described in connection with FIG. 12A. That is, a coded number or identifier associated with a barcode indicia on an intelligent cassette can be tagged to records associated with documents expected to be stored in that cassette. It is contemplated that, according to some embodiments, an operator of a computer or other system communicatively connected to the database storing the records can scan the barcode on an intelligent cassette to pull up a list of the records on a display device.

Document Processing Recycler Systems

Figure 19A:
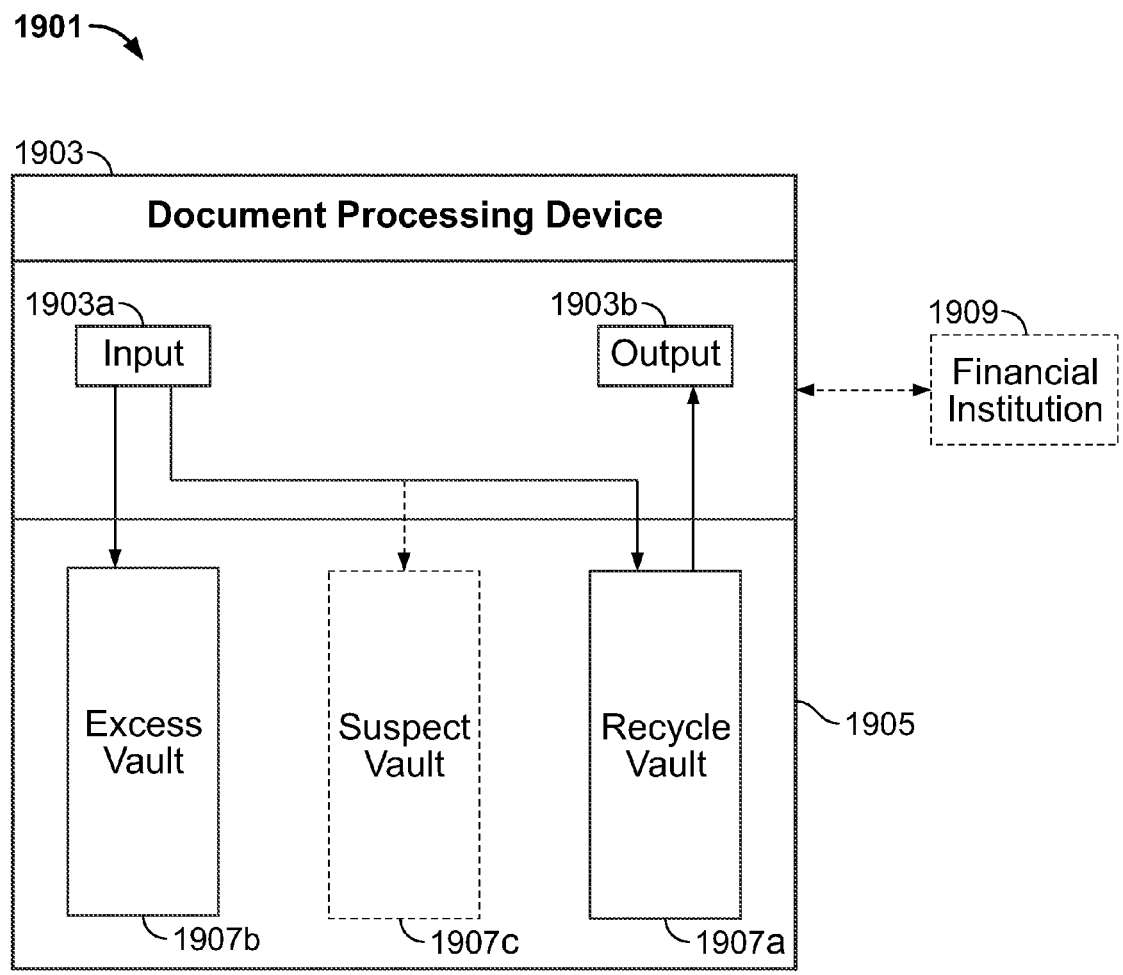
FIG. 19A is a block diagram of a document processing recycler system according to some embodiments of the present disclosure.

Now referring to FIG. 19A, a block diagram of a document processing recycler system 1901 is shown according to some embodiments of the present disclosure. The recycler system 1901 can include one or more of the document processing devices and/or systems described herein in combination with one or more recycling vaults or recycling safes and one or more excess vaults or excess safes. As shown in FIG. 19A, the document processing recycler system 1901 includes a document processing device 1903, an outer vault 1905, an inner recycle vault or compartment 1907a, and an inner excess vault or compartment 1907b. The document processing device 1903 is similar to, and can perform the same or similar operations as, the document processing device 101, 101', 101a shown in FIGS. 1, 2A-2C, 4A and described herein in the Document Processing Device and System Section and in the Deposit Transaction Section, and in other sections of the present disclosure.

According to some embodiments, an operator inserts a stack of currency bills into one or more input receptacles 1903a of the document processing device 1903. According to some alternative embodiments, the operator inserts a single document at a time into the one or more input receptacles for processing. According to such embodiments, the operator can insert one bill or one check into the input receptacle for processing. According to some embodiments, the recycler system 1901 processes all of the currency bills and transports the currency bills into the recycle vault 1907a or the excess vault 1907b, which can be secure storage compartments or cassettes within the outer vault 1905. According to some embodiments, the operator can retrieve some or all of the currency bills in the recycle vault 1907a, such as, for example, by instructing the document processing recycler system 1901 to dispense currency bills to one or more operator accessible output receptacles 1903b, as described herein in reference to FIG. 19B. According to some embodiments, the operator cannot retrieve the currency bills stored in the excess vault 1907b. According to some embodiments, the operator can retrieve some or all of the currency bills from the recycle vault 1907a and/or the excess vault 1907b by using a key or by entering a code, or the like. Yet in other embodiments, only a third party can retrieve the currency bills stored in the excess vault 1907b, such as, for example, a bank employee or armored carrier employee.

According to some alternative embodiments, the document processing recycler system 1901 is configured to receive a stack of documents that includes one or more sorted batches of documents and/or one or more intermingled batches of documents including currency bills and checks. In some such embodiments, the document processing recycler system 1901 further includes a check vault for receiving and storing checks. Alternatively, the document processing recycler system 1901 can be configured to return checks to an operator via one of the output receptacles 1903b after the checks are processed. Alternatively, the document processing recycler system 1901 can destroy processed checks using a document destruction device in a similar manner as described herein in reference to FIG. 18A.

According to some embodiments, the recycle vault 1907a and/or the excess vault 1907b each can include one secured storage compartment or cassette for securely storing each type of denomination of currency bill processed by the document processing recycler system 1901. That is, according to some embodiments, the document processing recycler system 1901 can be configured to sort currency bills by denomination. According to some alternative embodiments, the recycle vault 1907a and/or the excess vault 1907b each includes a single secured storage compartment or cassette for securely storing each denomination of currency bill processed by the document processing recycler system 1901, such that the stored currency bills are intermingled within the single compartment.

According to some embodiments, the outer vault 1905 can further include a suspect vault 1907c for receiving and securely storing suspect bills determined to be suspect by the document processing device 1903. According to some embodiments, the document processing recycler system 1901 is physically and/or communicatively connected to a coin processing device and an outer coin vault in a similar manner as described herein in the Document Processing Vault System Section and as shown in FIGS. 18A and 18B, and in other sections of the present disclosure.

According to some embodiments, the document processing recycler system 1901 is communicatively connected to one or more financial institutions 1909 via one or more networks. It is contemplated that, according to some embodiments, the document processing recycler system 1901 can be configured to make a data file available to the financial institution 1909 so that a depositor such as a store on whose premises the system 1901 is located can receive a provisional and/or final credit for some or all of the documents processed and/or stored in the document processing recycler system 1901, in the same, or similar, manner that the customer document processing system 102 obtains credit from the financial institution system 103 described in connection with FIGS. 4A and 4B. According to some embodiments, the document processing recycler system 1901 can be configured to automatically transmit a data file that is similar to, for example, the data file 301 described above in reference to FIG. 3E in the Document Records and Data Files Section, and in other sections of the present disclosure, to the financial institution 1909. According to some such embodiments, the financial institution 1909 can credit a financial institution account based on the value of documents stored in the document processing recycler system 1901 and/or processed by the document processing recycler system 1901 in a similar fashion as described herein, such as, for example, as described in reference to FIGS. 4A and 7A-B. According to some embodiments, the financial institution 1909 is configured to only credit a financial institution account based on the value of currency bills stored in the excess vault 1907b. Yet in other embodiments, the financial institution 1909 is configured to credit a financial institution account based on a value of currency bills stored in the excess vault 1907b and currency bills stored in the recycle vault 1907a. According to some embodiments, one or more financial institution accounts associated with deposited documents stored in the document processing recycler system 1901 can receive interest based on a value of the deposited documents in the document processing recycler system 1901. According to some such embodiments, interest can begin to accrue in response to documents being deposited and stored in the vault(s) 1907a and/or 1907b of the document processing recycler system 1901.

Figure 19B:
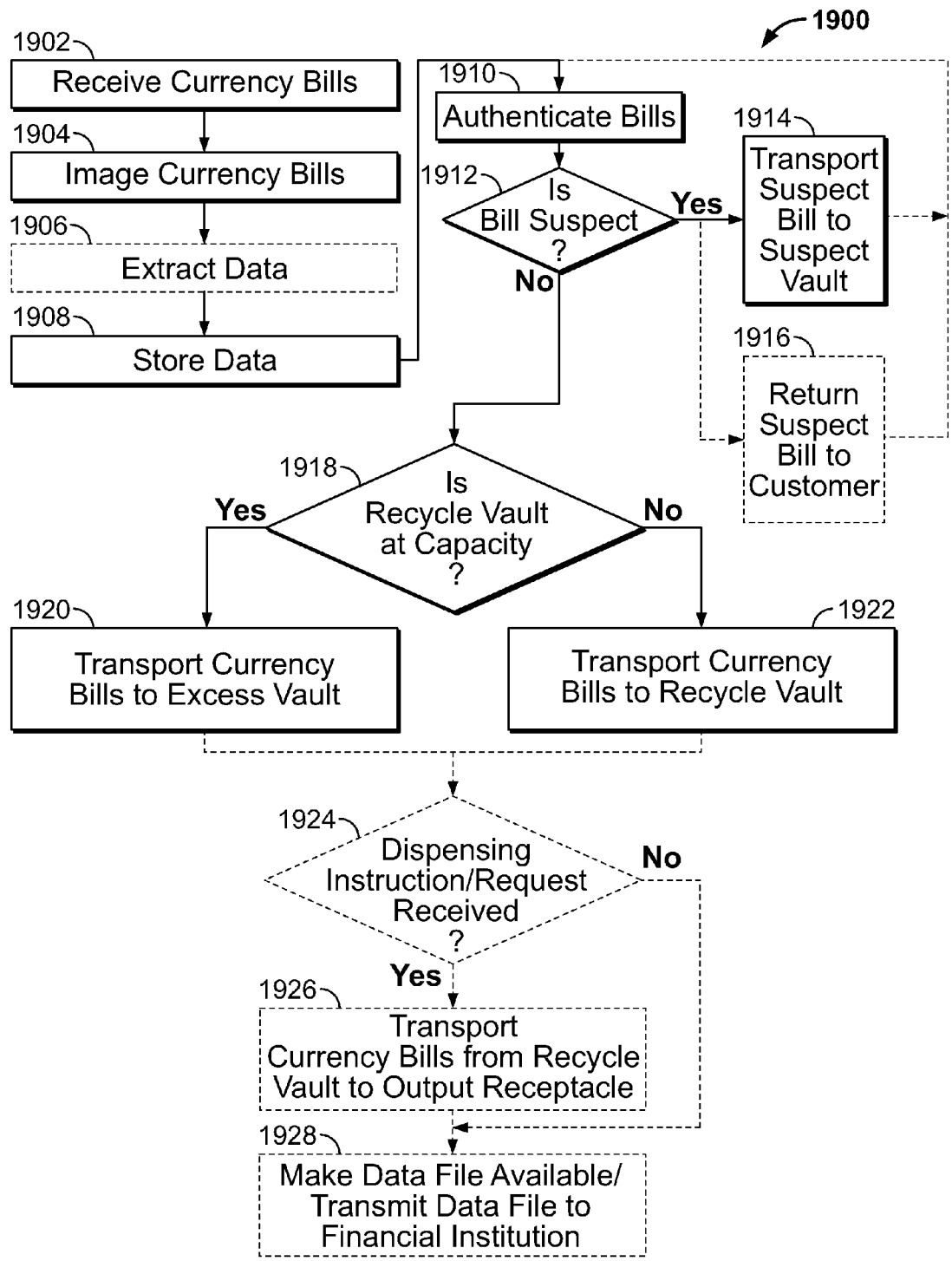
FIG. 19B is a flowchart of a method for processing documents in the document processing recycler system of FIG. 19A.

Now referring to FIG. 19B, a method for processing documents in a document processing recycler system 1900, such as the document processing recycler system 1901, is shown according to some embodiments. The document processing recycler system can also be referred to as a currency bill recycler system or a recycler system. At act 1902, the document processing recycler system receives currency bills in one or more input receptacles, such as, for example, the input receptacles 1903a. At act 1904, the currency bills are transported from the one or more input receptacles past one or more image scanners that image each of the currency bills as described elsewhere herein, such as, for example, in the Document Processing Device and System Section, and in other sections of the present disclosure. The imaging of the currency bills generates image data that is reproducible as a visually readable image of at least a portion of each of the imaged currency bills. According to some alternative embodiments, at act 1906, data is extracted from the image data as described elsewhere herein, such as, for example, in the Optical Character Recognition Section, and in other sections of the present disclosure. In some such embodiments, the extracted data includes serial numbers, denominations, series information, etc.

At act 1908, the image data is stored in a memory device. The memory device can be within the document processing recycler system or external thereto, such as, for example, the memory device can be located in a server networked with the document processing recycler system. According to some embodiments, the memory device is a long-term storage device, such as, for example, a magnetic storage device like a hard-drive. According to some alternative embodiments, the memory device is a short-term storage device, such as, for example, a semiconductor storage device like random-access memory (RAM).

At act 1910, the document processing recycler system authenticates the bills using one or more authentication tests, such as, for example, those described herein in the Document Processing Device and System Section, and in other sections of the present disclosure. In response to a currency bill being flagged or determined to be a suspect bill, at act 1912, the document processing recycler system can, at act 1914, transport the suspect bill to a suspect vault, such as, for example, the suspect vault 1907c. According to some alternative embodiments, in response to a currency bill being flagged or determined to be a suspect bill, at act 1912, the document processing recycler system can, at act 1916, transport the suspect bill to one or more output receptacles to return the suspect bill to an operator.

According to some embodiments, the document processing recycler system indicates to an operator that the currency bills transported to the suspect vault and/or to the one or more output receptacles are suspect. According to some embodiments, the operator can physically access the suspect bills in the output receptacle for further processing of these suspect bills. According to some embodiments, the document processing recycler system is configured to print or make a report available to the operator that includes information regarding each determined suspect bill. The information in the report can include a serial number of each determined suspect bill.

In response to the document processing recycler system determining at act 1912 that a bill is not suspect, the document processing recycler system determines if the contents of the recycle vault has reached a capacity at act 1918. According to some embodiments, the recycle vault has a predetermined capacity of currency bills, a predetermined capacity for each denomination of currency bills, or both. That is, according to some embodiments, the number of each denomination of currency bills that can be stored in the recycle vault is predetermined or preset. It is contemplated that an operator can adjust the predetermined number of currency bills that the document processing recycler system will store in one or more cassettes or compartments of the recycle vault. For example, an operator can adjust the capacity of the recycle vault to store enough of each denomination of U.S. currency bills to fill one or more teller tills or to satisfy the anticipated needs of an operator, such as, for example, a retail store teller, for some period of time, such as, for example, an amount of currency bills anticipated to be needed for a next shift or business day.

In response to the document processing recycle system determining that the recycle vault is at capacity and/or at capacity for a particular denomination of currency bill, at act 1918, according to some embodiments, the document processing recycler system transports excess currency bills to the excess vault, at act 1920, for securely storing the excess currency bills therein. In response to the document processing recycle system determining that the recycle vault is not at capacity and/or not at capacity for a particular denomination of currency bill, at act 1918, according to some embodiments, the document processing recycler system transports the currency bills to the recycle vault and/or particular cassettes or compartments therein, at act 1922, for securely storing the currency bills therein. According to some embodiments, for the excess vault and/or the recycle vault, the currency bills can be stored in a single cassette or compartment having all denominations of currency bills intermingled therein. According to other embodiments, the document processing recycle system is configured to sort the currency bills by denomination and to transport each denomination to a separate storage cassette or compartment within the excess vault and/or the recycle vault.

According to some embodiments, an operator of the document processing recycler system can request or instruct the recycle system to dispense currency bills. For example, the operator can instruct the document processing recycler system to dispense $100. The instruction can be specific to an exact number of one or more denominations of currency bills (e.g., dispense five $20), or the instruction can just be for a total amount of currency (e.g., dispense $300). According to some embodiments, the document processing recycler system is configured to dispense a preset or predetermined blend of denominations of currency bills. For example, in response to receiving a request to dispense currency bills for a cash or teller till, the document processing recycler system can be configured to automatically dispense twenty $1's, ten $5's, five $10's, and four $20's. The document processing recycler system can be configured to have hotkeys and/or preprogrammed instructions that are configurable such that an operator can press or select a "dispense-cash-till button" or a "dispense-cash-till element" such as on a touchscreen display and the document processing recycler system is configured to automatically dispense a preprogrammed blend of currency bills. According to some alternative embodiments, the document processing recycler system can further be configured to receive and/or dispense coins in a similar manner as currency bills. Additional details about dispensing coins can be found in U.S. Pat. No. 6,637,576, which is hereby incorporated herein by reference in its entirety.

According to some embodiments, the document processing recycler system can be configured to directly fill a cash till with a predetermined amount of currency bills and/or coins. According to some embodiments, the document processing recycler system can be configured to receive an empty cash till such that the document processing recycler system automatically dispenses a preset or preprogrammed number of particular denominations of currency bill and/or coins into respective compartments within the cash till. For example, the document processing recycler system can be configured to dispense twenty $1's into a first compartment, ten $5's into a second compartment, five $10's into a third compartment, and four $20's into a fourth compartment.

According to some alternative embodiments, at act 1924, the document processing recycler system determines if a dispensing instruction or request has been received. It is contemplated that an operator can use one or more input devices to make such a request, such as, for example, using a control panel similar to the control panel 170 described herein in reference to FIG. 1A. If a dispensing request is detected at act 1924, the document processing recycler system transports a corresponding blend of currency bills from the recycle vault to one or more output receptacles of the document processing recycler system at act 1926, such as, the one or more output receptacles 1903*b* shown in FIG. 19A. According to some alternative embodiments, the document processing recycler system is further configured to dispense coins to a coin output receptacle in response to receiving a dispensing request associated with coins.

According to some alternative embodiments, at act 1928, the document processing recycler system is configured to make a data file, that is similar to, for example, the data file 301 described above in reference to FIG. 3E in the Document Records and Data Files Section, and in other sections of the present disclosure, available and/or to transmit the data file to a financial institution. According to some embodiments, the data file includes at least a portion of the generated image data and/or at least a portion of the data extracted in act 1906.

According to some embodiments, the data file includes a record for each imaged document. The records can be the same as, or similar to, the records described herein, such as, for example, the records described in the Document Records and Data Files Section and in other sections of the present disclosure, and such as described in connection with FIGS. 3A-3D. The data file can be downloaded or uploaded by a financial institution in a similar manner as described elsewhere herein, such as, for example, in connection with FIGS. 3E and 4A and in the Document Processing Device and System Section, and in other sections of the present disclosure. According to some embodiments, a financial institution that receives or otherwise obtains the data file is configured to credit a financial institution account based on the data file, as described elsewhere herein, such as, for example, as described in connection with FIGS. 4A, 5A, 6, 7B, and 8A-B.

It is contemplated that the document processing recycler system can be owned, operated, and/or controlled by a financial institution and located in a store, such as a retail store, or financial institution customer's office or building. Such an arrangement allows, for example, a bank customer, such as a retail store, to make secured deposits and/or withdrawals in its own store using the document processing recycler system. Because the bank receives a data file containing a variety of information (e.g., images of bills and checks, amounts of each check, serial number for a bill, etc.) regarding deposits and withdrawals made into and from the document processing recycler system and/or those documents transported into and stored in the excess and recycle vaults, the bank may issue a provisional and/or a final credit for all of or a portion of deposits made into the document processing recycler system. According to some embodiments, a bank or armored carrier service owns the document processing recycler system and controls access to at least one of the vault(s) therein, such as, for example, the excess vault 1907*b* and/or the suspect vault 1907*c*. According to some embodiments, store personnel can operate the recycler system to make deposits and withdrawals, but can only withdraw documents contained in the recycle vault 1907*a* and not in the excess vault 1907*b* or in the suspect vault 1907*c*. According to some embodiments, a store and the owner of the recycler system (e.g., bank or armored carrier service) can enter into an agreement whereby depositing document(s) within the recycler system transfers ownership of the document(s) from the store to the recycler system owner. According to some such embodiments, the owner is a bank that gives the store a credit for the deposit at the time of the deposit, even if an armored carrier does not pickup the documents until a later time or even on a different day, etc.

According to some embodiments, an armored carrier service can make routine and/or periodic stops either at the request of the store, bank, or otherwise, at the store to remove documents, one or more cassettes or transportable document storage devices from the recycler system for further processing. For example, the armored carrier service can pickup physical documents from the recycler system for further processing in the same, or similar, manner as described above in the Deposit Transaction Section, the Physical Portion of Deposit Transaction Section, in reference to FIGS. 4A and 4B, and in other sections of the present disclosure. According to some embodiments, the document processing recycler system 1901 is configured to receive and process checks in the same, or similar, manner as described in the Document Processing Vault System Section and in connection with FIGS. 18A-18G, and in other sections of the present disclosure. According to some embodiments, the documents picked up by the armored carrier service can include checks for further physical processing by the armored carrier service and/or a financial institution. Alternatively, any checks deposited into the recycler system can be returned to the store automatically as described above or by the armored carrier service to remain at the store indefinitely such that the store can save the checks for future reference or destroy the checks, such as, for example, as described in the Deposit Transaction Section, the Physical Portion of Deposit Transaction Section, in reference to FIGS. 4A and 4B, and in other sections of the present disclosure.

While the acts 1902, 1904, 1906, 1908, 1910, 1912, 1914, 1916, 1918, 1920, 1922, 1924, 1926, and 1928 are illustrated and described in a particular sequence, it is contemplated that the method 1900 can be performed in a variety of different orders and/or with one or more acts occurring simultaneously. For example, for a stack of documents, the device can be configured to receive (1902), image (1904), extract (1906), store (1908), authenticate (1910), and/or transport/return (1914, 1916, 1920, 1922) different ones of the respective documents simultaneously.

Serial Number Batch Headers and Trailers

Figure 20A:
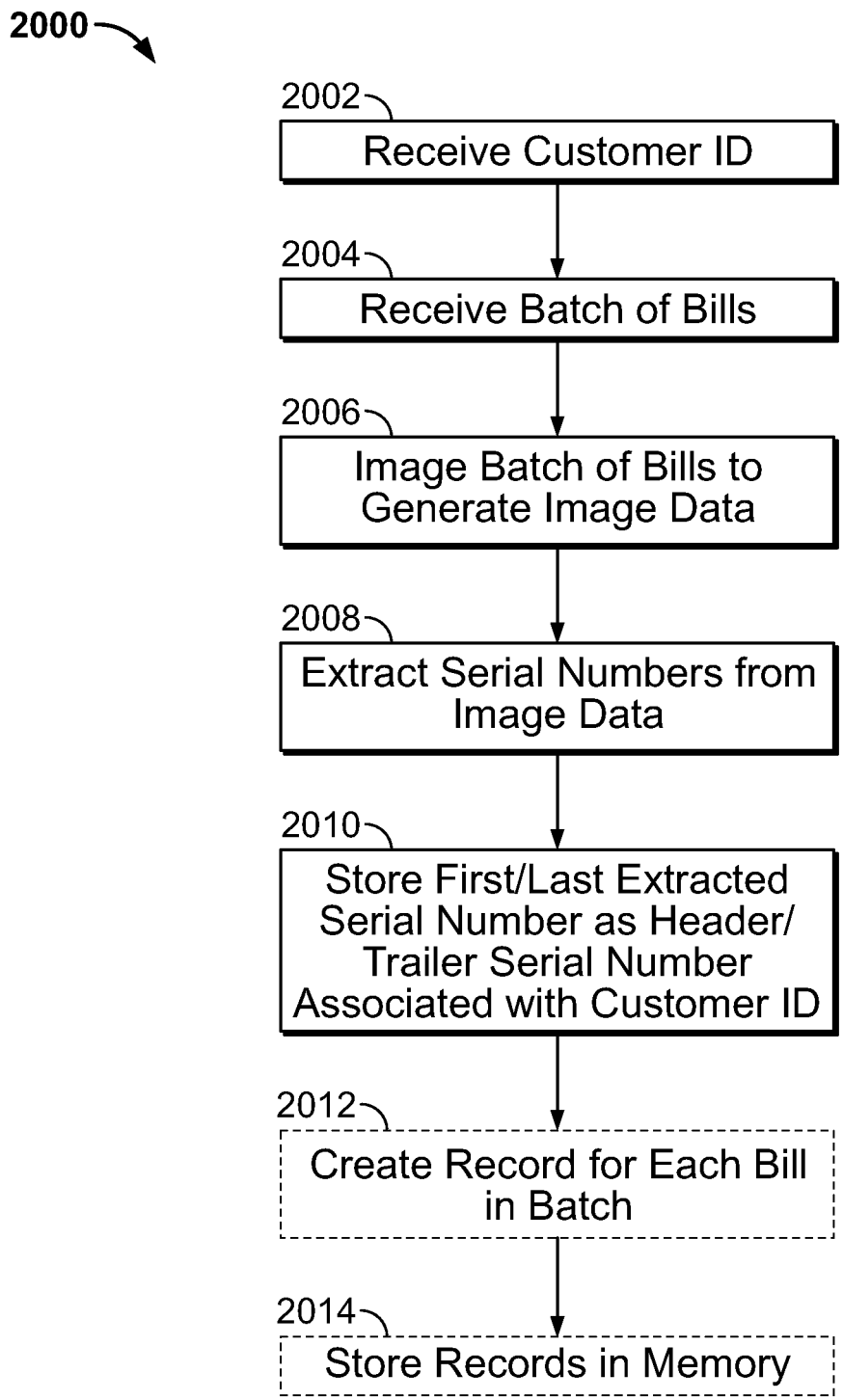
FIG. 20A is a flowchart of a method for processing currency bills in a document processing system using header bills and/or trailer bills according to some embodiments of the present disclosure.

Referring to FIG. 20A, a flowchart describing a method 2000 for processing currency bills in a document processing device and/or system using header bills and/or trailer bills is shown according to some embodiments of the present disclosure. For ease of description, the document processing device and/or system will be referred to herein in the Serial Number Batch Headers and Trailers Section as a document processing device or the device. The device is the same as, or similar to, and can perform the same or similar operations as, the document processing device 101, 101', 101a,b and/or the document processing system 100, shown in FIGS. 1, 2A-2C, 4A, and described herein in, for example, the Document Processing Device and System Section, in the Deposit Transaction Section, and in other sections of the present disclosure.

According to some embodiments, use of header bills and/or trailer bills as described herein eliminates the need for standard header/trailer cards that are typically used to physically separate batches of documents during document processing in, for example, a bank vault. That is, header bills and/or trailer bills can replace header/trailer cards. It is contemplated that according to some embodiments, the elimination of header/trailer cards can increase document processing efficiency and reduce costs associated with processing documents as operators will not have to bother with inserting the cards between batches or bother with scanning the cards during processing to associate customer information with documents.

According to some embodiments, a document processing device is configured to extract and store one or more header serial number(s) and/or trailer serial number(s). A header serial number is a serial number of a first currency bill in a batch of currency bills, also referred to herein as a header bill. A trailer serial number is a serial number of a last currency bill in a batch of currency bills, also referred to herein as a trailer bill. For example, in a batch of one hundred bills, where each bill has a different serial number, the serial number of the first bill, or header bill, can be used as a header serial number and the serial number of the one hundredth bill, or trailer bill, can be used as a trailer serial number. According to some embodiments, one or more header bills and/or trailer bills can be used to associate bills, such as, for example, suspect bills, in one or more batches of bills to one or more customers, such as, for example, financial institution customers, like a retail store.

While header and/or trailer serial numbers are described herein as being serial numbers of one respective bill, it is contemplated that according to some embodiments, a header serial number and/or trailer serial number can include two or more serial numbers. For example, a header serial number can include a serial number of a first bill and a second bill in a batch of bills. Similarly, a trailer serial number can include a serial number of a last bill and a second-to-last bill in a batch of bills. According to some embodiments, such additional serial numbers in the header/trailer serial numbers aid in distinguishing batches of bills that might otherwise include a currency bill with the same serial number as the serial number of the header bill or the trailer bill.

According to some alternative embodiments, a header/trailer serial number can include one or more denominations. For example, a header serial number can include a serial number and a denomination of a first currency bill in a batch of currency bills. Similarly, a trailer serial number can include a serial number and a denomination of a last currency bill in a batch of currency bills.

At act 2002, a customer identifier, such as, for example, a customer account number, is received in a document processing device. According to some embodiments, the customer identifier can be manually entered into an input device by an operator, such as, for example, a control panel, like the control panel 170 described herein in reference to FIG. 1. According to some other embodiments, the customer identifier can be received in the device in the same, or similar, manners described in the Document Processing Device Operations in a Financial Institution System Section, and in other sections of the present disclosure, and in connection with FIGS. 14-17, such as, for example, via OCR of a deposit slip, barcode reader, MICR reader. At act 2004, a batch of bills is received in an input receptacle of the device. The batch of bills has a customer identifier associated therewith. For example, the batch of bills can be a deposit of bills of a financial institution customer. At act 2006, the device images the batch of bills to generate image data that is reproducible as a visually readable image of at least a portion of each bill in the batch of bills as described elsewhere herein, such as, for example, in the Document Processing Device and System Section, and in other sections of the present disclosure. At act 2008, the device extracts serial numbers from the generated image data in the same, or similar, manner as described herein, such as, for example, as described in the Optical Character Recognition Section, and in other sections of the present disclosure. According to some embodiments, the device extracts one serial number from the image data for each of bills in the batch of bills.

According to some embodiments, at act 2010, the device (1) stores the extracted serial number of the first bill in the batch of bills, the header bill, in a memory and (2) associates the extracted serial number as a header serial number of the batch of bills in the memory with the received customer identifier. That is, the device associates the first extracted serial number with the customer identifier and stores that associated information in a memory. According to some embodiments, the header serial number and associated customer identifier can be stored locally in a memory of the device and/or remotely, such as, for example, in a memory of a server. Alternatively or in addition to storing a header serial number, at act 2010, the device can be configured to (1) store the extracted serial number of the last bill in the batch of bills, the trailer bill, in the memory and (2) associate the extracted serial number as a trailer serial number of the batch of bills in the memory with the received customer identifier. That is, according to some embodiments, the device associates the last extracted serial number with the customer identifier and stores that associated information in the memory. As described below, an imaging MPS can access and/or electronically search the memory for one or more header/trailer serial numbers to determine the customer identifier associated with the searched header/trailer serial number(s).

According to some alternative embodiments, at act 2012, a record is created for each bill in the batch of bills including the header bill and the trailer bill. The created records can be stored in a memory of the device and/or a memory of a server at act 2014. The records can be the same as, or similar to, the records described herein, such as, for example, the records described in the Document Records and Data Files Section, and in other sections of the present disclosure. Alternatively or additionally, the records can be saved or stored in a searchable database, such as, for example, the database 1200*a,b* described in the Modes of Operation—Searching/Master Database Section, and in other sections of the present disclosure.

According to some embodiments, the records associated with header bills and trailer bills include a header/trailer field for indicating that the associated bill is a header bill or a trailer bill. For example, the record 300*a* in FIG. 3A, can be modified to include a header/trailer field that indicates that the $1 bill associated with the record 300*a* having serial number G3468700A is a header bill. According to some embodiments, the records include one or more header/trailer-serial-number fields. For example, each bill in the batch of bills is associated with a respective record that includes a header/trailer-serial-number field for including header serial number(s) and/or trailer serial number(s). That is, each record associated with a bill in the batch of bills is tagged with the serial number and/or a denomination of a header bill and/or the serial number and/or a denomination of a trailer bill. For example, referring to the database 1200*b* in FIG. 12B, each of the records 1201*b* can be modified to further include a header/trailer-serial-number field that includes a header serial number and/or trailer serial number.

According to some embodiments, for a batch of five bills only including the five bills in the database 1200*b*, the first bill having document ID 9493 is the header bill such that the serial number G489763041 is a header serial number. Similarly, the last bill having document ID 9497 is the trailer bill such that the serial number G092613921 is a trailer serial number. The first record associated with the document ID 9493 can be modified to include a header field that indicates that the associated bill is a header bill. Similarly, the last record associated with the document ID 9497 can be modified to include a trailer field that indicates that the associated bill is a trailer bill. The records associated with the bills between the header bill and the trailer bill can be modified to include a header-serial-number field and/or a trailer-serial-number field to include the header serial number and the trailer serial number respectively. Additionally or alternatively, each record can include a header-serial-number field and/or a trailer-serial-number field and in the case of the record being associated with document 9493 (i.e., the header bill), the associated record includes serial number G489763041 and/or serial number G092613921 in the header-serial-number field and/or the trailer-serial-number field, respectively.

Figure 20B:
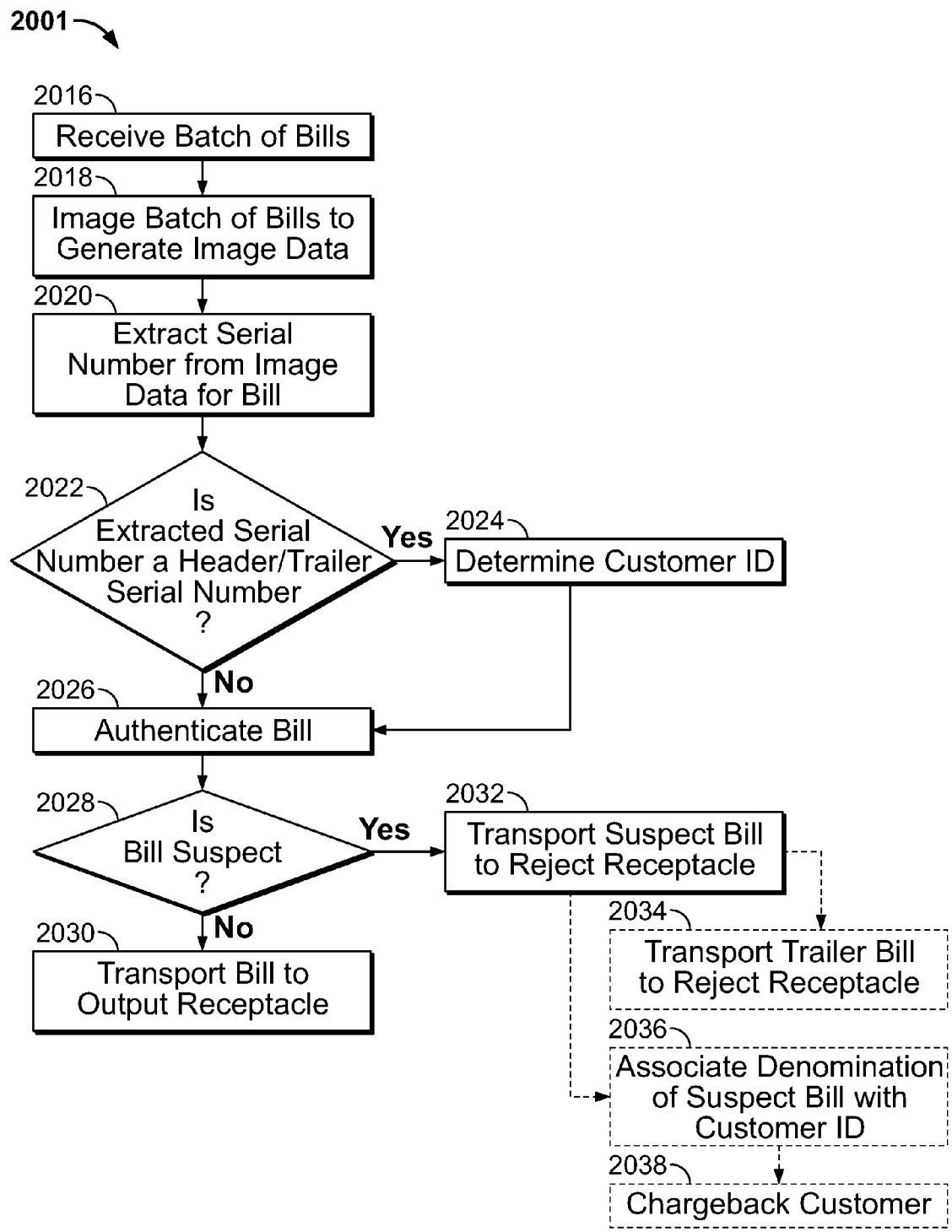
FIG. 20B is a flowchart of a method for processing currency bills in a multiple pocket document processing system using the header bills and/or the trailer bills of FIG. 20A.

It is contemplated that according to some embodiments, including a header/trailer field and/or a header/trailer serial number in one or more header/trailer-serial-number fields in the records can assist in tracking and/or identifying customer identifiers associated with specific bills, such as, for example, suspect bills, included in a specific batch of bills, as described, for example, in reference to FIG. 20B.

While the acts 2002, 2004, 2006, 2008, 2010, 2012, and 2014 are illustrated and described in a particular sequence, it is contemplated that the method 2000 can be performed in a variety of different orders and/or with one or more acts occurring simultaneously. For example, it is contemplated that according to some embodiments, the batch of bills is received prior to receiving the customer identifier. For another example, for a stack of documents, the device is configured to image (2006), extract (2008), store/associate (2010), create records (2012), and/or store records (2014) for different ones of the respective documents simultaneously.

Referring to FIG. 20B, a flowchart describing a method 2001 for processing currency bills in an imaging multiple pocket document processing device and/or system using the header bills and/or the trailer bills of FIG. 20A is shown according to some embodiments. For ease of description, the imaging multiple pocket document processing device and/or system will be referred to herein in the Serial Number Batch Headers and Trailers Section as an imaging MPS. The imaging MPS is the same as, or similar to, and can perform the same or similar operations as, the document processing device 101, the document processing system 100, and/or the imaging multiple pocket document processing device 400, shown in FIGS. 1, 4A, and 4B, and described herein in the Document Processing Device and System Section, in the Deposit Transaction Section, and in other sections of the present disclosure.

According to some embodiments, in response to the completion of the method 2000, an operator of the device ("initial device"), described above in reference to FIG. 20A, physically transports a batch of bills from the initial device to the imaging MPS for further processing. It is contemplated that the operator transports the batch of bills along with a plurality of additional batches of bills associated with one or more customer identifiers. For example, the operator can transport the batches of bills in a tray commonly used in bank vaults. According to some embodiments, the batches of bills are only separated via one or more header bills and/or trailer bills. That is, the operator maintains batch integrity of the batches of bills by positioning the batches in the tray such that each batch is flanked or boarded by at least one header bill and/or at least one trailer bill. According to some embodiments, the operator maintains batch integrity of the batches of bills by positioning the batches in the tray such that each batch is transported in substantially the same order as initially processed by the initial device.

At act 2016, a batch of bills is received in an input receptacle of the imaging MPS. The received batch of bills is one of the batches of bills previously processed by an operator of the initial device described above in reference to FIG. 20A. At act 2018, the imaging MPS images the batch of bills to generate image data that is reproducible as a visually readable image of at least a portion of each bill in the batch of bills as described elsewhere herein, such as, for example, in the Document Processing Device and System Section, and in other sections of the present disclosure. At act 2020, the imaging MPS extracts or determines serial numbers and/or other data, such as denominations, from the generated image data in the same, or similar, manner as described herein, such as, for example, as described in the Optical Character Recognition Section, and in other sections of the present disclosure. According to some embodiments, the imaging MPS extracts one serial number from the image data for each of bills in the batch of bills. It is contemplated that according to some embodiments, for a stack of documents, the acts 2018 and 2020 can be performed for different ones of the respective documents simultaneously.

According to some embodiments, the imaging MPS accesses and/or electronically searches the memory for one or more header/trailer serial numbers to determine the customer identifier associated with the searched header/trailer serial number(s). At act 2022, the imaging MPS determines if each one of the extracted serial numbers is a header serial number or a trailer serial number. That is, the imaging MPS searches a memory storing header/trailer serial numbers associated with the customer identifiers for a serial number that matches one of the extracted serial numbers—a matching serial number being a header or trailer serial number. In response to determining that an extracted serial number is a header or trailer serial number, at act 2024, the imaging MPS reads or otherwise determines the associated customer identifier from the memory. According to some embodiments, the imaging MPS is communicatively connected to the memory storing the header/trailer serial numbers, discussed above in reference to method 2000, such that the imaging MPS can read or determine the customer identifier associated with each header/trailer serial number. That is, the imaging MPS can automatically determine the customer identifier that is associated with each batch of bills from the memory.

In response to the imaging MPS (1) determining that an extracted serial number is not a header/trailer serial number at act 2022, or (2) determining the customer identifier at act 2024, the imaging MPS authenticates the bill associated with the extracted serial number at act 2026. That is, the imaging MPS authenticates each bill in the batch of bills as act 2026. The imaging MPS can be configured to authenticate the bills using one or more authentication sensors, such as, for example, the authentication sensor 145 described above in the Document Processing Device and System Section, and in other sections of the present disclosure. The one or more authentication sensors can be configured to authenticate the bills based on one or more criteria and/or authentication tests, such as, for example, those described herein in the Document Processing Device and System Section, and in other sections of the present disclosure.

At act 2028, the imaging MPS determines if the bill is a suspect bill based on the one or more authentication tests. In response to the imaging MPS determining that a bill is not suspect, the bill is transported to an output receptacle at act 2030. In response to the imaging MPS determining that a bill is a suspect bill, the suspect bill is transported to a suspect or reject receptacle at act 2032. That is, according to some embodiments, the imaging MPS is configured to off-sort suspect bills, at act 2032, for an operator to further process the suspect bills. According to some alternative embodiments, the imaging MPS is configured to generate, transmit, and/or print a report including information regarding any determined suspect bill, which may include the customer ID associated with the suspect bill.

According to some alternative embodiments, the imaging MPS is configured to transport a trailer bill to the reject receptacle at act 2034. For example, the imaging MPS determines that one or more bills in a batch are suspect bills and transports such bills to the reject receptacle. As the imaging MPS continues to authenticate bills in the same batch of bills, the imaging MPS further looks for the trailer bill by comparing the extracted serial numbers with stored trailer serial numbers in a memory as discussed above. In response to finding a trailer bill, the imaging MPS off-sorts the trailer bill to the same receptacle containing the off-sorted suspect bill(s), if any. According to some embodiments, if a batch of bills contains no suspect bills, the imaging MPS is configured to transport the trailer bill to the output receptacle configured to receive the rest of the bills in the batch. After the imaging MPS completely processes the batches of bills, according to some alternative embodiments, an operator can remove the suspect bill(s) and the trailer bill(s) from the reject receptacle and manually lookup a customer identifier associated with the suspect bill and/or the trailer bill. For example, the operator can search a database of records for a record including a serial number matching the serial number of the suspect bill and/or the trailer bill in the same or similar fashion as described herein in the Modes of Operation—Searching/Master Database Section, and in other sections of the present disclosure, and in connection with FIGS. 12C-12G. According to some such embodiments, the operator can chargeback a customer determined to have deposited the suspect bill based on the manual lookup. Such a chargeback process is advantageous for situations in which the database includes multiple records for different bills having the same serial number. That is, off-sorting a trailer bill along with the suspect bill aids the operator in charging-back the correct customer for the suspect bill, as the trailer bill includes the trailer serial number that was associated with the customer identifier to be charged-back in the act 2010 of the method 2000.

According to some alternative embodiments, the imaging MPS can be configured to associate a denomination of a determined suspect bill with a customer identifier at act 2036. That is, the imaging MPS can tally or total a value of all determined suspect bills for a batch of bills being processed and to associate the total value of suspect bills with the customer identifier associated with the header/trailer serial number of the batch of bills being processed. Put another way, the imaging MPS can track and tag suspect bill values to a customer identifier. At act 2038, the imaging MPS can be configured to transmit a chargeback instruction and/or signal. According to some embodiments, the chargeback instruction and/or signal includes information such as the customer identifier and totaled value of suspect bills deposited by a customer associated with the customer identifier. It is contemplated that, according to some embodiments, a bank employee receives the chargeback instruction and can issue a chargeback to a customer based on the information in the chargeback instruction in the same, or similar, manner as described herein, such as, for example, as described in the Document Processing Device and System Section and in the Document Transaction Section, and in other sections of the present disclosure, and in connection with FIGS. 5A, 5B, and 6.

While the acts 2016, 2018, 2020, 2022, 2024, 2026, 2028, 2030, 2032, 2034, 2036, and 2038 are illustrated and described in a particular sequence, it is contemplated that the method 2001 can be performed in a variety of different orders and/or with one or more acts occurring simultaneously. For example, for a stack of documents, the device can be configured to receive (2016), image (2018), extract (2020), authenticate (2026), determine IDs (2024), transport (2030, 2032, 2034), Associate (2036) and/or chargeback (2038) for different ones of the respective documents simultaneously.

Figure 20C:
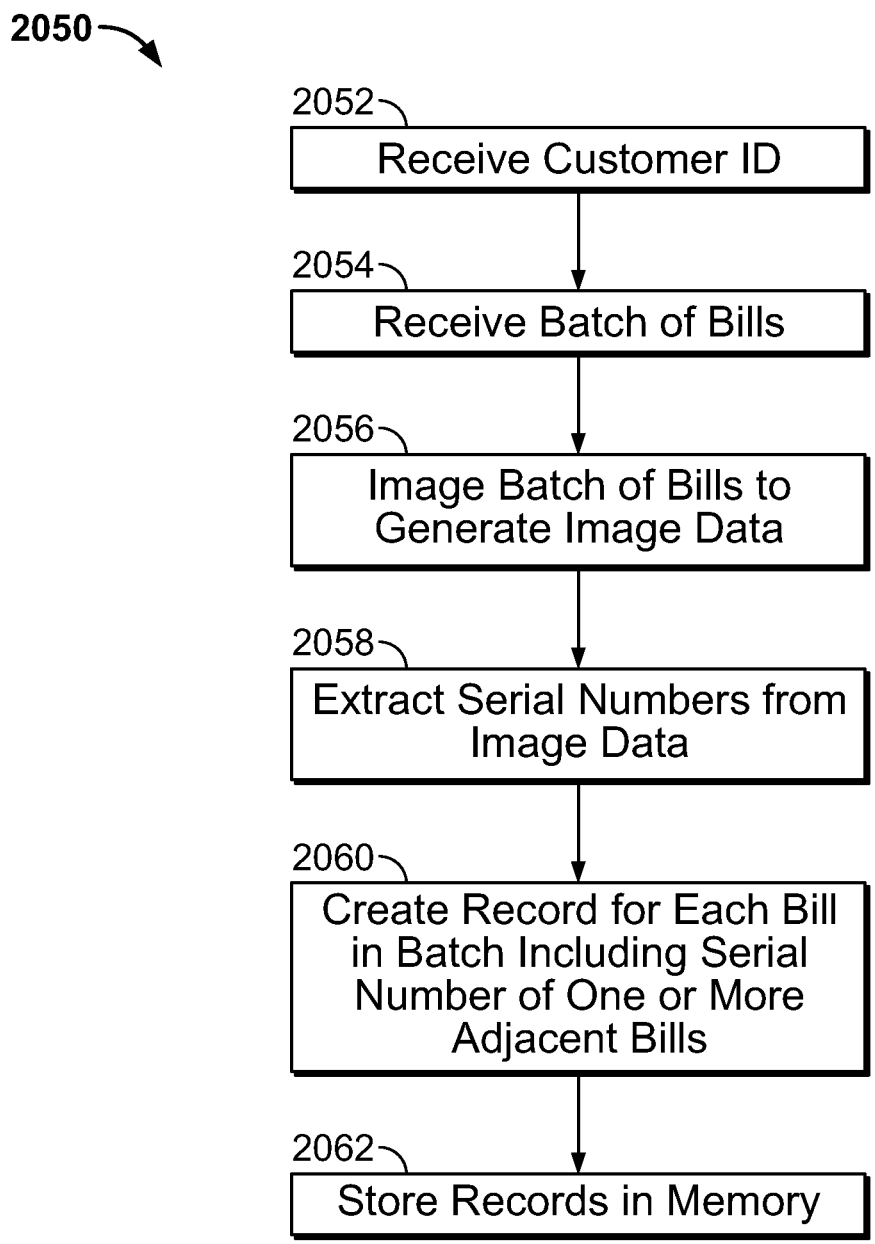
FIG. 20C is a flowchart of a method for processing currency bills in a document processing system including creating a record according to some embodiments of the present disclosure.

Referring to FIG. 20C, a flowchart describing a method 2050 for processing currency bills in a document processing device and/or system using adjacent bills is shown according to some embodiments of the present disclosure. The method 2050 is similar to the method 2000, but rather than using header bills and/or trailer bills, the method 2050 uses adjacent bills. According to some embodiments, an adjacent bill is bill that flanks or boarders another bill. For example, in a batch of one hundred bills, the fifth bill in the batch is flanked by the fourth bill and the sixth bill in the batch. Thus, the fourth and sixth bills are adjacent bills with respect to the fifth bill. According to some other embodiments, the third, the fourth, the sixth, and the seventh bills in the batch are adjacent bills with respect to the fifth bill in the batch.

At act 2052, a customer identifier is received in a document processing device. At act 2054, a batch of bills is received in an input receptacle of the device. At act 2056, the device images the batch of bills to generate image data that is reproducible as a visually readable image of at least a portion of each bill in the batch of bills as described elsewhere herein, such as, for example, in the Document Processing Device and System Section, and in other sections of the present disclosure. At act 2058, the device extracts serial numbers from the generated image data in the same, or similar, manner as described herein, such as, for example, as described in the Optical Character Recognition Section, and in other sections of the present disclosure.

According to some embodiments, at act 2060, a record is created for each bill in the batch of bills. The created records can be stored in a memory of the device and/or a memory of a server at act 2062. The records can be the same as, or similar to, the records described herein, such as, for example, the records described in the Document Records and Data Files Section, and in other sections of the present disclosure. Alternatively or additionally, the records can be saved or stored in a searchable database, such as, for example, the database 1200a,b described in the Modes of Operation—Searching/Master Database Section, and in other sections of the present disclosure.

According to some embodiments, the records include one or more adjacent-serial-number fields. For example, each bill in the batch of bills is associated with a record that includes one or more adjacent-serial-number fields for including one or more serial numbers of one or more adjacent bills. That is, each record associated with a bill in the batch of bills is tagged with the serial number of one or more adjacent bills in the batch of bills. It is contemplated that according to some embodiments, including adjacent serial numbers in one or more adjacent-serial-number fields in the records can assist in tracking and/or identifying customer identifiers associated with specific bills, such as, for example, suspect bills, included in a specific batch of bills, as described, for example, in reference to FIG. 20D.

While the acts 2052, 2054, 2056, 2058, 2060, and 2062 are illustrated and described in a particular sequence, it is contemplated that the method 2050 can be performed in a variety of different orders and/or with one or more acts occurring simultaneously. For example, it is contemplated that according to some embodiments, the batch of bills is received prior to receiving the customer identifier. For another example, for a stack of documents, the device is configured to image (2056), extract (2058), create records (2060), and/or store records (2062) for different ones of the respective documents simultaneously.

Figure 20D:
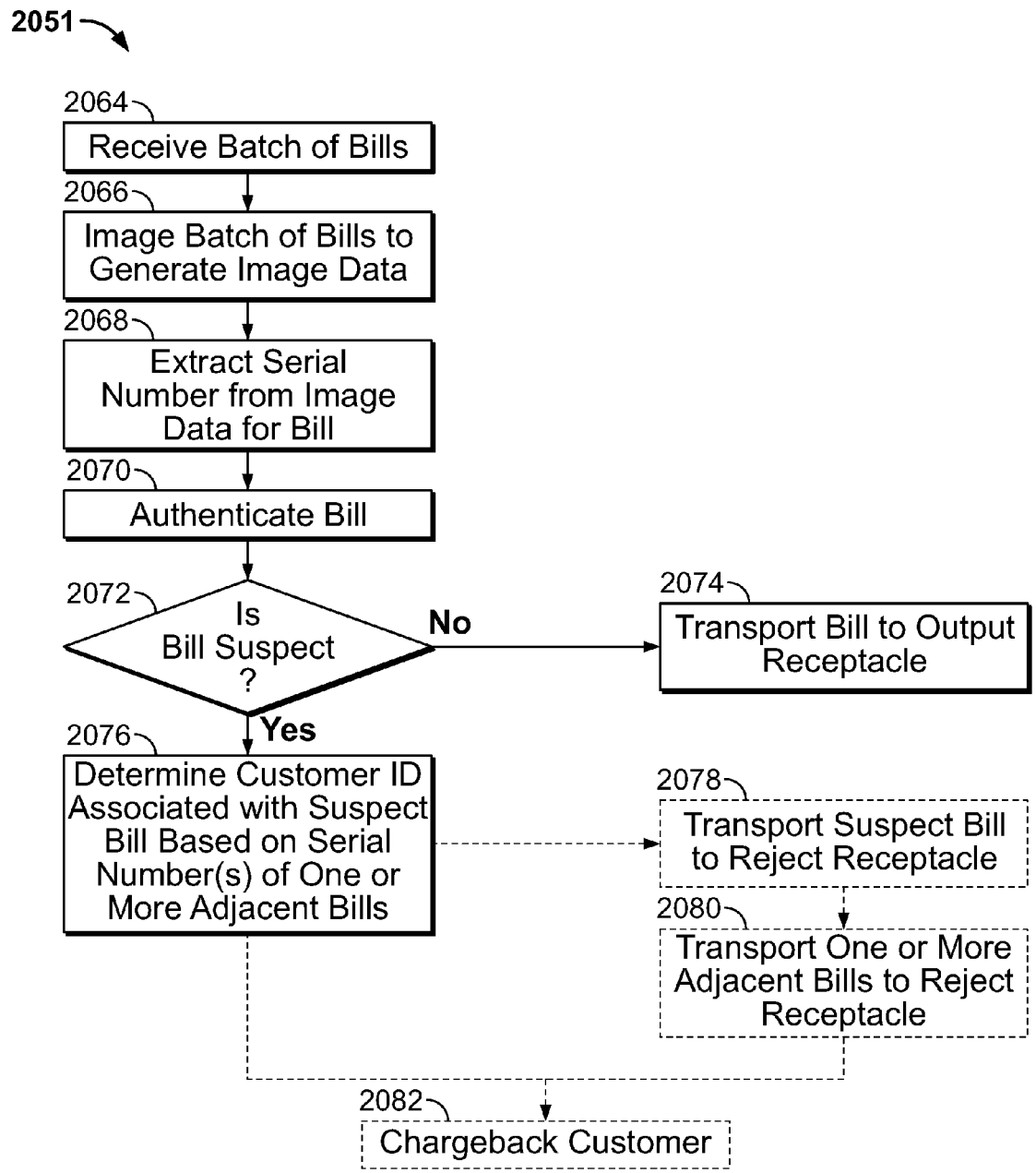
FIG. 20D is a flowchart of a method for processing currency bills in a multiple pocket document processing system including the record of FIG. 20C.

Referring to FIG. 20D, a flowchart describing a method 2051 for processing currency bills in an imaging multiple pocket document processing device and/or system using the adjacent bills of FIG. 20C is shown according to some embodiments. According to some embodiments, in response to the completion of the method 2050, an operator of the device ("initial device"), described above in reference to FIG. 20C, physically transports a batch of bills from the initial device to an imaging MPS for further processing. It is contemplated that the operator transports the batch of bills along with a plurality of additional batches of bills associated with one or more customer identifiers. For example, the operator can transport the batches of bills in a tray commonly used in bank vaults. According to some embodiments, the operator maintains batch integrity of the batches of bills by positioning the batches in the tray such that each batch is transported in substantially the same order as initially processed by the device. According to some alternative embodiments, the operator maintains batch integrity of the batches of bills by positioning the batches in the tray such that each batch is flanked or boarded by at least one header bill and/or at least one trailer bill.

At act 2064, a batch of bills (e.g., five bills) is received in an input receptacle of an imaging MPS. The received batch of bills is one of the batches of bills previously processed by an operator of the initial device described above in reference to FIG. 20C. As such, each of the five bills in the batch of bills is associated with a record in a database. At act 2066, the imaging MPS images the batch of bills to generate image data that is reproducible as a visually readable image of at least a portion of each bill in the batch of bills as described elsewhere herein, such as, for example, in the Document Processing Device and System Section, and in other sections of the present disclosure. At act 2068, the imaging MPS extracts serial numbers from the generated image data in the same, or similar, manner as described herein, such as, for example, as described in the Optical Character Recognition Section, and in other sections of the present disclosure. According to some embodiments, the imaging MPS extracts one serial number from the image data for each of bills in the batch of bills. According to some embodiments, the extracted serial numbers of the bills are temporarily stored in a memory of the imaging MPS. For example, for an exemplary batch of five bills, the following is a list of extracted serial numbers stored in the order that the bills were processed: CK98765432G, AB12345678A, DG56789123C, IF12345678B, and DG54321098C.

At act 2070, the imaging MPS authenticates the each bill in the batch of bills. The imaging MPS can be configured to authenticate the bills using one or more authentication sensors, such as, for example, the authentication sensor 145 described above in the Document Processing Device and System Section, and in other sections of the present disclosure. The one or more authentication sensors can be configured to authenticate the bills based on one or more criteria and/or authentication tests, such as, for example, those described herein in the Document Processing Device and System Section, and in other sections of the present disclosure. It is contemplated that according to some embodiments, for a stack of documents, the acts 2066, 2068, and 2070 can be performed for different ones of the respective documents simultaneously.

At act 2072, the imaging MPS determines if a bill is a suspect bill based on the one or more authentication tests. In response to the imaging MPS determining that a bill is not suspect, the bill is transported to an output receptacle at act 2074.

In response to the imaging MPS determining that a bill is a suspect bill, the imaging MPS automatically determines the customer identifier associated with the suspect bill at act 2076. For example, the imaging MPS determines that the second bill having serial number AB12345678A is a suspect bill based on, for example, one or more authentication tests. According to some embodiments, the imaging MPS is communicatively connected to the memory storing the database and/or records, discussed above in reference to method 2050, such that the imaging MPS can determine the customer identifier associated with each extracted serial number (AB12345678A) and/or denomination of the suspect bill. According to some embodiments, the imaging MPS is configured to automatically search or query a database for records including the serial number (AB12345678A) and/or denomination of the suspect bill. In some such embodiments, the imaging MPS determines that a single record exists with a serial number (and/or denomination) matching the suspect serial number (and/or denomination). In some such embodiments, the imaging MPS determines or otherwise reads the customer ID tagged to the matching record and can transmit a chargeback signal or instruction at act 2082 to chargeback a customer that deposited the suspect bill associated with the customer ID and/or record having the serial number (and/or denomination) that matches the suspect serial number (and/or denomination).

According to some embodiments, the imaging MPS determines that two or more records exist with a serial number (and/or denomination) matching the suspect serial number (AB12345678A) (and/or denomination). For example, the imaging MPS determines that the second bill having serial number AB12345678A is a suspect bill. In response to being determined to be suspect, the imaging MPS determines that two records in the database include the same serial number (AB12345678A) (and/or denomination). In some such embodiments, the imaging MPS is configured to automatically determine which one of the two records is associated with and/or corresponds with the suspect bill. As each of the two records includes an extracted serial number that matches the serial number of the suspect bill, the imaging MPS is configured to compare extracted serial numbers (and/or denomination) of adjacent bills with respect to the suspect bill with serial numbers (and/or denomination) in one or more of the adjacent-serial-number fields of the two records. That is, the imaging MPS determines which one of the two records corresponds with the suspect bill based on the serial numbers of one or more adjacent bills with respect to the suspect bill. For example, a first one of the records includes a first adjacent-serial-number field that contains the serial number: CK98765432G and a second adjacent-serial-number field that contains the serial number: DG56789123C. Similarly, a second one of the records includes a first adjacent-serial-number field that contains the serial number: AL45678901C and a second adjacent-serial-number field that contains the serial number: BD98765432A. The imaging MPS is configured to compare the two respective adjacent serial numbers in the first and the second records with the list of extracted serial numbers that includes the adjacent serial numbers of the suspect bill to determine which one of the two records is associated with the suspect bill. That is, the imaging MPS compares the adjacent serial numbers (CK98765432G and DG56789123C) of the first record and the adjacent serial numbers (AL45678901C and BD98765432A) of the second record with the list of extracted serial numbers for the batch of bills being processed (CK98765432G, AB12345678A, DG56789123C, IF12345678B, and DG54321098C). In such example, a comparison of the adjacent serial numbers from the first and the second records with the list indicates that the adjacent serial numbers of the second bill (the suspect bill) in the list match the adjacent serial numbers in the adjacent-serial-number fields of the first record. As such, the imaging MPS determines that the first record matches and the second record, while including a matching serial number, does not match—that is, the second record is not associated with the suspect bill.

In response to determining which one of the two or more records corresponds with the suspect bill, the imaging MPS determines a customer identifier associated with the suspect bill as the matching record includes the customer identifier received in the act of 2052 of the method 2050.

According to some alternative embodiments, in response to the imaging MPS determining that a bill is a suspect bill at act 2072 and determining a customer identifier associated therewith at act 2076, the suspect bill can be transported to a suspect or reject receptacle at act 2078. That is, according to some embodiments, the imaging MPS is configured to off-sort suspect bills, at act 2078, for an operator to further process the suspect bills. According to some alternative embodiments, the imaging MPS is configured to generate, transmit, and/or print a report including information regarding any determined suspect bill, including, for example, the serial number of the suspect bill, its denomination, and the associated customer ID.

According to some alternative embodiments, the imaging MPS can be configured to further transport one or more adjacent bills to the reject receptacle at act 2080. That is, according to some embodiments, the imaging MPS determines that a bill is a suspect bill and off-sorts the suspect bill and one or more adjacent bills with respect to the suspect bill to the same receptacle containing the off-sorted suspect bill. After the imaging MPS completely processes the batches of bills, according to some alternative embodiments, an operator can remove the suspect bill(s) and the one or more adjacent bills from the reject receptacle and manually lookup customer identifiers associated with the suspect bill(s) and/or the one or more adjacent bills. For example, the operator can search a database of records for a record including a serial number matching the serial number of the suspect bill and/or the one or more adjacent bills in the same or similar fashion as described herein in the Modes of Operation—Searching/Master Database Section, and in other sections of the present disclosure, and in connection with FIGS. 12C-12F. According to some such embodiments, the operator can chargeback a customer determined to have deposited the suspect bill based on the manual lookup. Such a chargeback process is advantageous for situations in which the database includes multiple records for different bills having the same serial number. That is, off-sorting one or more adjacent bills along with the suspect bill aids the operator in charging-back the correct customer for the suspect bill, as the records were created to include an extracted serial number of one or more adjacent bills in the act 2060 of the method 2050, which are all associated with other records that are associated with and/or tagged with the customer identifier to be charged-back.

While the acts 2064, 2066, 2068, 2070, 2072, 2074, 2076, 2078, 2080, and 2082 are illustrated and described in a particular sequence, it is contemplated that the method 2051 can be performed in a variety of different orders and/or with one or more acts occurring simultaneously. For example, for a stack of documents, the device can be configured to receive (2064), image (2066), extract (2068), authenticate (2070), determine IDs (2076), transport (2074, 2078, 2080), and/or chargeback (2082) for different ones of the respective documents simultaneously.

Document Auditing and Tracking

According to some embodiments, a document processing device and/or system of the present disclosure, such as system 100, devices 101, 101', 101*a,b*, 1410*a-c*, 1510, 1610, 1710 can be used to track physical locations of documents, such as, for example, currency bills and/or checks, received in and/or removed from one or more document storage receptacles, such as a teller drawer and/or a cash till. That is, a document processing device can be used in combination with a teller drawer, in for example a bank, to track documents being stored in and being removed from the teller drawer throughout a work shift and/or workday. To track currency bill locations, a device or system of the present disclosure can be configured to operate according to one or more of the following document tracking modes: receive mode, deposit mode, sell mode, and/or audit mode. Such bill tracking can be useful for internal auditing purposes in a bank, retail store, etc. For example, the tracking of the physical locations of bills throughout a work shift can allow an operator to automatically reconcile his or her teller drawer at the end of the shift. To reconcile the operator's drawer, the operator re-runs all of the bills in the drawer in the audit mode of the device, which is further described below in reference to FIG. 21C. The device operating in audit mode is configured to generate a balance signal and/or indication to indicate to a teller that the teller's drawer is properly balanced, and/or is configured to generate a variance report to indicate to the teller and/or someone else (e.g., the teller's manager) that one or more documents are missing and/or are unexpectedly present in the teller's drawer. According to some embodiments, the variance report includes a serial number and denomination of any no-show currency bill and any unexpected currency bill. According to some alternative embodiments, the variance report includes one or more images, such as, for example, a full image of one or both sides of a bill and/or one or more snippet images of a portion(s) of a bill.

While the following description is in reference to a document processing device or the document processing device 101, it is contemplated that the document processing devices 101, 101', the document processing devices 101a,b, the document processing devices 1410a-c, 1510, 1610, 1710, and/or the document processing system 100 can be configured to perform the same, or similar, methods and/or operations as described in reference to FIGS. 21A-D.

Figure 21A:
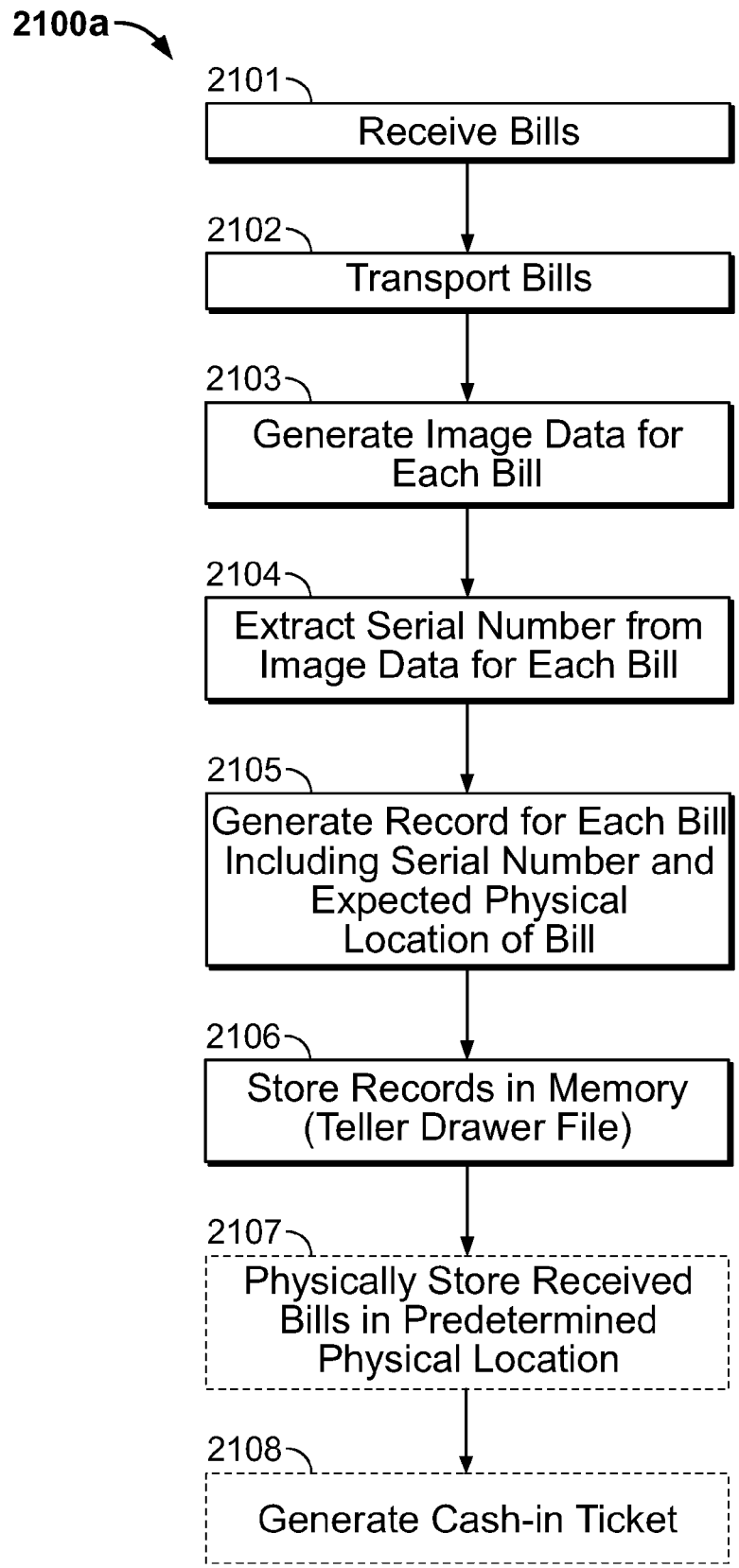
FIG. 21A is a flowchart of a method of recording an expected location of a currency bill using a document processing system according to some embodiments of the present disclosure.

Referring to FIG. 21A, a method 2100a of recording an expected location of a currency bill using a document processing device, such as the document processing device 101 operating in a receive mode and/or a deposit mode, is illustrated according to some embodiments of the present disclosure. According to some embodiments, the receive mode and/or the deposit mode can be selected and/or activated by an operator of the document processing device 101, via control panel 170. According to some embodiments, such modes can be selected or activated prior to receiving documents such as currency bills in the device 101.

According to some embodiments, after the device processes the received documents, the documents are physically stored in a first predetermined physical location, such as, for example, a teller drawer of the operator. According to some embodiments, the first predetermined physical location can be preprogrammed and/or manually programmed into the device by the operator. According to some embodiments, the operator can select and/or activate, through one or more electronic menus, the first predetermined physical location (e.g., a first document storage receptacle) prior to, during, and/or subsequent to processing bills.

At act 2101, the device receives a plurality of currency bills. The bills are received in an input receptacle of the device, such as, for example, the input receptacle 110, 110', described above in reference to FIGS. 1 and 2A-2C. According to some embodiments, in the deposit mode and/or the receive mode, bills can be received for deposit by a bank customer into a financial institution for a credit. Additionally, according to some embodiments, in the receive mode only, bills can be received from a backroom or vault of a bank to stock a teller's drawer and/or till for use throughout a work shift. Similarly, according to some embodiments, in the receive mode only, bills can be received from a vault or safe in a retail store to stock or refill a clerk's cash till for use throughout a work shift.

According to some embodiments, at act 2102, the bills are transported along a transport path, one at a time, in a non-overlapping serial manner past an image scanner to one or more output receptacles in the same, or similar, manner as described elsewhere herein, such as in reference to FIG. 1. At act 2103, image data is generated for each one of the bills, in the same, or similar, manner as described elsewhere herein, such as, for example, in the Optical Character Recognition Section, and in other sections of the present disclosure, and in reference to FIG. 1. The image data associated with a respective bill is reproducible as a visually readable image of at least a portion of the respective bill. At act 2104, a denomination is determined and/or a serial number is extracted from the image data for each of the bills as described above, for example, in the Optical Character Recognition Section, and in other sections of the present disclosure.

At act 2105, a record is generated for each of the bills. According to some embodiments, each record includes a plurality of data fields for storing information, such as, for example, currency bill identifying information and/or bill tracking information. At least some of the data fields can be the same as, or similar to, the data fields described above in reference to FIGS. 3A-3D. According to some embodiments, the data fields include a serial number field, an image field, a physical bill location field, and a denomination field. According to some embodiments, the device is configured to populate each of the data fields with corresponding information. For example, the device can be configured to populate the serial number field with a respective one of the extracted serial numbers and the image field with at least a portion of an image of a respective one of the bills, such as, for example, as shown in FIGS. 3A-3D.

According to some embodiments, the physical bill location field indicates that a respective bill is expected to be physically located in the predetermined physical location, which can be preprogrammed and/or selected to be, for example, a first document storage receptacle, a specific teller drawer, a specific teller till, a teller tray, a clerk till, a cash till, a vault, a safe, etc. That is, according to some embodiments, upon generating a record in the receive mode and/or the deposit mode, the device 101 automatically assumes that the received documents will be removed from the output receptacle(s) of the device and physically located in the first predetermined physical location. Thus, the device 101 populates the physical bill location field of all generated records for the stack of bills being processed with the first predetermined physical location.

For example, in a bank, an operator can program or enter the first predetermined physical location to be the operator's teller drawer. In such an example, all bills received and processed by the operator in the deposit mode and/or the receive mode will result in respective records being generated that each indicate that the expected physical location of each respective bill is the teller drawer of the operator. According to some embodiments, the device is configured to receive an indication of the identity of the operator of the device (such as by the entry of a teller identifier, an operator number, and/or password) and the device sets the physical location field to be a location associated with the operator, such as, for example, the operator's teller drawer. According to some embodiments, the device assumes that the first predetermined location is the operator's teller drawer until the operator enters or programs a different location, such as, for example, a tray.

For another example, in a bank, an operator can program or enter the first predetermined physical location to be a first tray of the operator. In such an example, all bills received and processed by the operator in the deposit mode and/or the receive mode will result in respective records being generated that each indicate that the expected physical location of each respective bill is the first tray of the operator. According to some embodiments, the first tray receives large cash deposits that are not needed as inventory in the operator's teller drawer.

According to some embodiments, in response to the first tray being full of currency bills or otherwise, the operator can program or enter the first predetermined physical location to be a second tray of the operator.

The physical bill location field indicates a physical location of where a bill is expected to be physically located and not where the bill is actually physically located. Such is the case because after processing received bills and generating the records as described above, an operator or someone else may purposefully and/or accidentally tamper with or change a bill's physical location, such as, for example, by moving bills into and/or out-of the teller drawer without otherwise updating the physical bill location field in the affected records. Such tampering or movement can result in an incorrect expected physical location indication in the physical bill location fields of the records associated with tampered bills. As will be explained below in reference to FIG. 21C, such a discrepancy can result in the generation of a variance report in response to auditing the contents of the teller drawer. According to some embodiments, the variance report includes a serial number and denomination of any no-show currency bill and any unexpected currency bill.

According to some embodiments, at act 2106, the records are stored in one or more memory devices integral with and/or remote from the document processing device 101. The memory device can include a data file, such as, for example, a teller drawer file, that is configured to store and/or organize all of the generated records in a searchable and/or accessible database, such as, for example, the database 1200a,b described in the Modes of Operation—Searching/Master Database Section, and in other sections of the present disclosure. According to some embodiments, the database can be automatically accessible by the device 101 and/or manually searchable by an operator. It is contemplated that according to some embodiments, the records can include any combination of information illustrated in one or more of the bill records 300a, 300c, and 300d, shown in FIGS. 3A, 3C, and 3D and described above in the Document Records and Data Files Section, and in other sections of the present disclosure.

According to some alternative embodiments, at act 2107, the received bills are stored in the first predetermined physical location, such as, for example, the teller's drawer. That is, according to some embodiments, for example, (1) each of the generated records in act 2105 that is associated with a respective bill to be deposited for a credit to a customer's account is populated to indicate that the respective bill is expected to be located in the teller drawer of the operator, and (2) the operator physically stores the bills in the teller drawer after processing the bills in the receive mode or in the deposit mode.

According to some alternative embodiments, at act 2108, the device generates a cash-in ticket. According to some embodiments, the cash-in ticket is a record and/or receipt of documents/currency bills. The cash-in ticket can be an electronic cash-in ticket record that is stored in the memory along with the data file and/or the cash-in ticket can be printed and physically stored in the first predetermined physical location (e.g., the teller drawer) along with the received bills. According to some embodiments, a cash-in ticket is generated each time an operator receives currency bills, such as, for example, each time an operator receives and processes a deposit of documents including currency bills from a bank customer. The cash-in tickets can include a variety of information including a total cash-in amount, a transaction identifier, a customer account number, a teller identifier, a cash-in time, etc. As described below in reference to FIG. 21C, the cash-in tickets can be used to reconcile the contents of the first predetermined physical location (e.g., the teller drawer) based on a comparison of an initial value of bills in, for example, the teller drawer, plus the value of bills added to the teller drawer, minus the value of bills removed from the teller drawer with a calculated total value of bills actually in the teller drawer at the time of reconciliation.

While the acts 2101, 2102, 2103, 2104, 2105, and 2106 are illustrated and described in a particular sequence, it is contemplated that the method 2100a can be performed in a variety of different orders and/or with one or more acts occurring simultaneously. For example, for a stack of documents, the device can be configured to receive (2101), transport (2102), generate image data (2103), extract (2104), generate records (2105), and/or store records (2106) for different ones of the respective documents simultaneously. Similarly, while the acts 2107 and 2108 are illustrated and described in a particular sequence, it is contemplated that the method 2100a can be performed in a variety of different orders. For example, the cash-in ticket can be generated (2108) prior to storing (2107) the received bills.

Figure 21B:
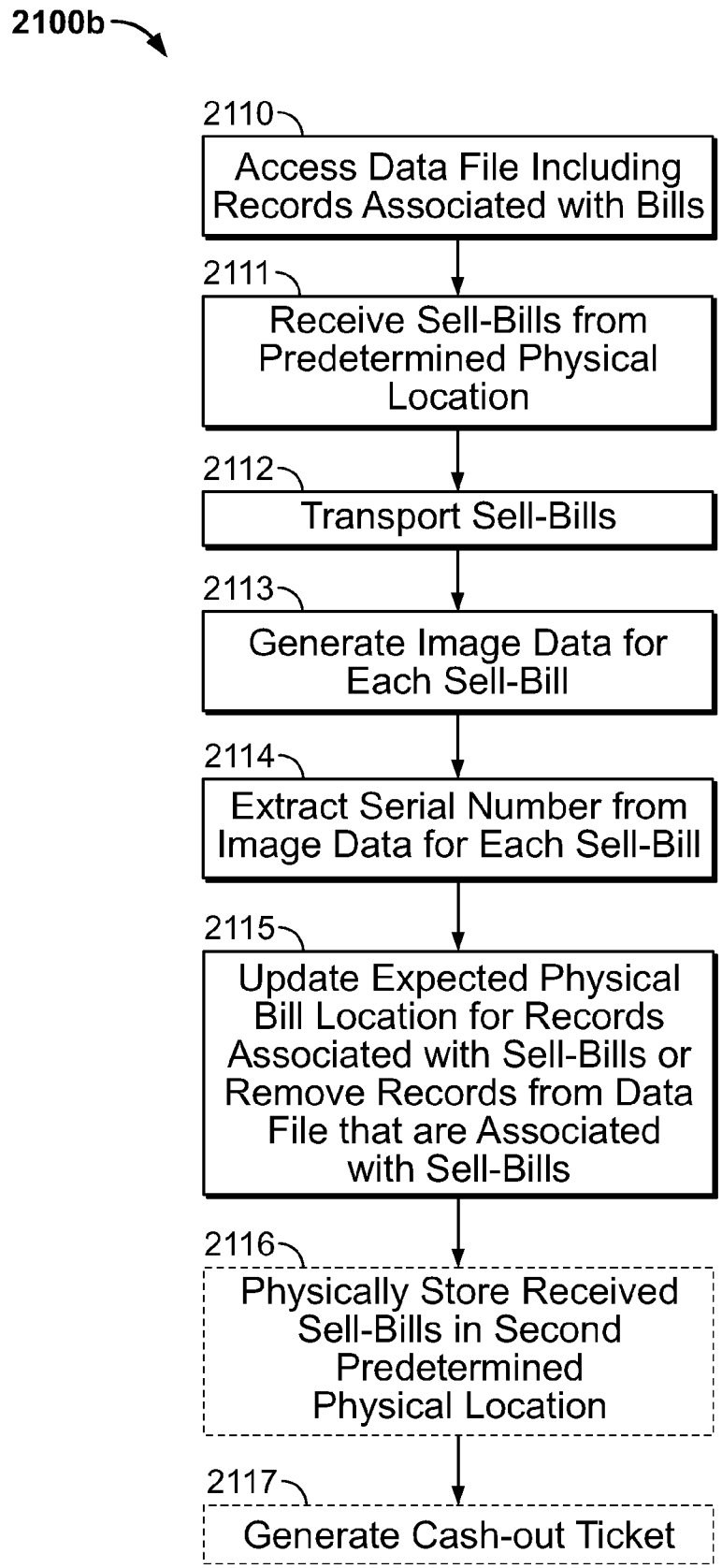
FIG. 21B is a flowchart of a method of updating an expected location of a currency bill using a document processing system according to some embodiments of the present disclosure.

Referring to FIG. 21B, a flowchart describing a method 2100b of updating an expected physical location of a currency bill, in a sell mode, from a first predetermined physical location to a second predetermined physical location, using a document processing device, such as the document processing device 101, is illustrated according to some embodiments of the present disclosure. According to some embodiments, the sell mode can be selected and/or activated by an operator of the document processing device 101, via control panel 170. According to some embodiments, an operator of the device selects or activates the sell mode prior to receiving documents removed from the first predetermined physical location that are to be physically moved and stored in the second predetermined physical location, such as, a bank customer's possession, a vault, a backroom, a second document storage receptacle, etc.

According to some embodiments, the second predetermined physical location can be preprogrammed and/or manually programmed or entered into the device by the operator. According to some embodiments, the operator can select or activate, through one or more electronic menus, the second predetermined physical location (e.g., a second document storage receptacle) prior to, during, and/or subsequent to processing sell-bills.

According to some embodiments, at act 2110, the device 101 electrically accesses a data file, such as, for example, the teller drawer file described above in reference to FIG. 21A. It is contemplated that, according to some embodiments, the device 101 can be configured to selectively access the teller drawer file to write, read, and/or modify records contained therein. For example, the device can update and/or change the indication in the physical bill location field for one or more records from the first predetermined physical location (e.g., teller drawer) to the second predetermined physical location (e.g., customer, vault, backroom, second document storage receptacle, other, etc.).

At act 2111, the device receives a plurality of sell-bills. According to some embodiments, sell-bills are currency bills that are removed from a first predetermined physical location that are to be physically stored in a second predetermined physical location. The sell-bills are received in an input receptacle of the device, such as, for example, the input receptacle 110, 110', described above in reference to FIGS. 1 and 2A-2C. According to some embodiments, in the sell mode, the sell-bills can be bills that are received from an operator's teller drawer to be withdrawn by a bank customer. Alternatively, the sell-bills can be excess bills in a teller drawer and/or tray to be sold to a backroom and/or vault of a bank. Similarly, the sell-bills can be from a retail clerk's cash till to be securely stored in a vault and/or safe in a retail store.

According to some embodiments, at act 2112, the sell-bills are transported along a transport path, one at a time, past an image scanner to one or more output receptacles in the same, or similar, manner as described elsewhere herein, such as in reference to FIG. 1. At act 2113, image data is generated for each one of the sell-bills, in the same, or similar, manner as described elsewhere herein, such as, for example, in the Optical Character Recognition Section, and in other sections of the present disclosure, and in reference to FIG. 1. The image data associated with a respective sell-bill is reproducible as a visually readable image of at least a portion of the respective sell-bill. At act 2114, a denomination is determined and/or a serial number is extracted from the image data from each of the sell-bills as described above, for example, in the Optical Character Recognition Section, and in other sections of the present disclosure.

According to some embodiments, at act 2115, the physical bill location field of each record in the data file that is associated with one of the sell-bills is updated to indicate that the respective sell-bill is no longer expected to be physically located in the first predetermined physical location. That is, upon receiving and processing sell-bills in the sell mode, the device 101 automatically assumes that the received sell-bills will be removed from the first predetermined physical location and moved to a second predetermined physical location. Thus, according to some embodiments, the device accesses the data file and overwrites or updates the physical bill location fields of all records associated with sell-bills with the second predetermined physical location. According to some alternative embodiments, rather than overwriting the physical bill location, the device updates the respective records to indicate that the expected physical bill location changed from the first predetermined physical location to the second predetermined physical location. That is, for example, an operator viewing the record on a display device can view a history of expected locations of the respective bill. For example, the operator can see that the bill was initially expected to be in the first predetermined physical location, but is expected to be in the second predetermined physical location.

For example, in a bank, an operator can program the second predetermined physical location to be a customer's possession, such that all sell-bills received and processed by the operator in the sell mode result in respective records being updated to indicate that the expected physical location of each of the sell-bills is the customer's possession. It is contemplated that the customer possession indication can be generic to all customers or specific to a unique customer identifier. For example, for a customer having an account number 003659123, the device can automatically access and change the physical bill location fields to indicate that each sell-bill is now expected to be located with the customer having account number 003659123. For another example, in a bank, an operator can program the second predetermined physical location to be a teller tray of the operator, such that all sell-bills received and processed by the operator in the sell mode result in respective records being updated to indicate that the expected physical location of each of the sell-bills is the teller tray of the operator. It is contemplated that the teller tray indication can be specific to a particular tray having a unique tray identifier.

According to some alternative embodiments, at act 2115, in lieu of updating records as described above, all records in the data file associated with sell-bills can be deleted and/or otherwise electronically removed from the data file, such that the data file only includes records associated with bills expected to be physically located in the first predetermined physical location (e.g., the teller drawer). That is, upon receiving and processing sell-bills in the sell mode, the device 101 automatically assumes that the received sell-bills will be removed from the first predetermined physical location and moved to the second predetermined physical location. Thus, in response to receiving the sell-bills in the sell mode, according to some embodiments, the device removes all records associated with the sell-bills from the data file associated with the first predetermined physical location.

According to some embodiments, prior to updating or removing the records in act 2115, the device 101 compares the sell-bills and/or information extracted/derived therefrom with the records in the corresponding data file to determine, which, if any, of the records correspond with each of the sell-bills. According to some embodiments, for each sell-bill the device compares the extracted serial number and/or determined denomination of the sell-bill with serial numbers and/or denominations included in the records to determine which record corresponds with the sell-bill. That is, the device accesses the records in the data file to find a record having a serial number and/or denomination that matches the extracted serial number and denomination of the sell-bill to determine which record should be updated or removed to indicate that the sell-bill was removed from the first predetermined physical location.

The accessed records in act 2110 are associated with bills expected to be in the first predetermined physical location, such as a teller drawer. Thus, any sell-bills removed from the teller drawer should have a corresponding record in the data file. However, as discussed above, it is contemplated that an operator or someone else may purposefully and/or accidentally tamper with or change a bill's physical location. Such tampering or movement can result in an incorrect expected physical location indication in the physical bill location fields of the records associated with tampered bills. Similarly, such tampering or movement can result in a sell-bill not having a corresponding record in the data file, which would indicate that the sell-bill was not expected to be in the teller drawer. It is contemplated that such discrepancies can result in one or more error messages during the processing of the sell-bills. The error messages can indicate to an operator or another entity, for example, that a sell-bill was not expected to be physically located in the teller drawer. Such a scenario is possible in response to an operator putting bills in the teller drawer without first processing the bills with the device 101 in the receive mode or the deposit mode according to the methods described herein in reference to FIG. 21A. It is contemplated that the error message(s) can be automatically transmitted to a third party, such as a manager.

According to some alternative embodiments, at act 2116, the sell-bills are stored in the second predetermined physical location, such as a customer's possession. That is, according to some embodiments, for example, (1) each of the records that is associated with a sell-bill is updated to indicate that the respective sell-bill is expected to be located in a customer's possession and not the teller drawer, and (2) the operator physically transfers the sell-bills to the customer's possession after processing the sell-bills in the sell mode.

According to some alternative embodiments, at act 2117, the device generates a cash-out ticket. According to some embodiments, the cash-out ticket is a record and/or receipt of documents. The cash-out ticket can be an electronic cash-out ticket record stored in the memory along with the data file and/or the cash-out ticket can be printed and stored in the first predetermined physical location (e.g., the teller drawer) along with the bills therein. According to some embodiments, a cash-out ticket is generated each time an operator sells and/or removes bills from, for example, the teller drawer. The cash-out tickets can include a variety of information including a total cash-out amount, a transaction identifier, a customer account number, a teller identifier, a cash-out time, etc. As described below in reference to FIG. 21C, the cash-out tickets can be used to reconcile the contents of the first predetermined physical location (e.g., the teller drawer) based on a comparison of an initial value of bills in, for example, the teller drawer, plus the value of bills added to the teller drawer, minus the value of bills removed from the teller drawer with a calculated total value of bills actually in the teller drawer at the time of reconciliation.

According to some embodiments, a device configured to operate in a sell mode is embodied in an automated teller machine (ATM). According to such embodiments, in response to a customer withdrawing currency bills, the ATM images each currency bill and creates a record for each currency bill and/or updates a record in memory associated with the currency bills being withdrawn to indicate a new expected location of the currency bill(s). The records can include an extracted serial number, image data, or a variety of other information, such as the information described in the Document Records and Data Files Section, and in other sections of the present disclosure, and in connection with FIGS. 3A-3F. The records can be stored in a database, such as, for example, the databases described in the Modes of Operation—Searching/Master Database Section in connection with FIGS. 12A and 12B, in the Document Processing Device Operations in a Financial Institution System Section in connection with FIGS. 14-17, and in other sections of the present disclosure. According to some embodiments, such a sell mode in an ATM allows a financial institution that owns, operates, and/or controls the ATM to track currency bills dispensed to customers. For example, a customer enters a bank stating a $20 bill he received from the bank's ATM is counterfeit and that he wants a non-counterfeit $20 bill instead. According to some embodiments, a bank employee can verify the customer's assertion by searching a database of records, such as described in the Modes of Operation—Searching/Master Data Base Section, and in other sections of the present disclosure, and in connection with FIGS. 12A-12G, to determine if the supposed counterfeit was in fact dispensed by the bank's ATM to the customer. That is, according to some embodiments, the bank employee searches a database of records for a record including a serial number that matches the counterfeit's serial number. In response to a determining a matching record, the bank employee can determine if that currency was in fact dispensed to the customer based on a review of customer related information tagged to and/or contained within the matching record (e.g., customer account number).

While the acts 2110, 2111, 2112, 2113, 2114, and 2115 are illustrated and described in a particular sequence, it is contemplated that the method 2100b can be performed in a variety of different orders and/or with one or more acts occurring simultaneously. For example, for a stack of documents, the device can be configured to access (2110), receive (2111), transport (2112), generate image data (2113), extract (2114), and/or update or remove (2115) for different ones of the respective documents simultaneously.

Figure 21C:
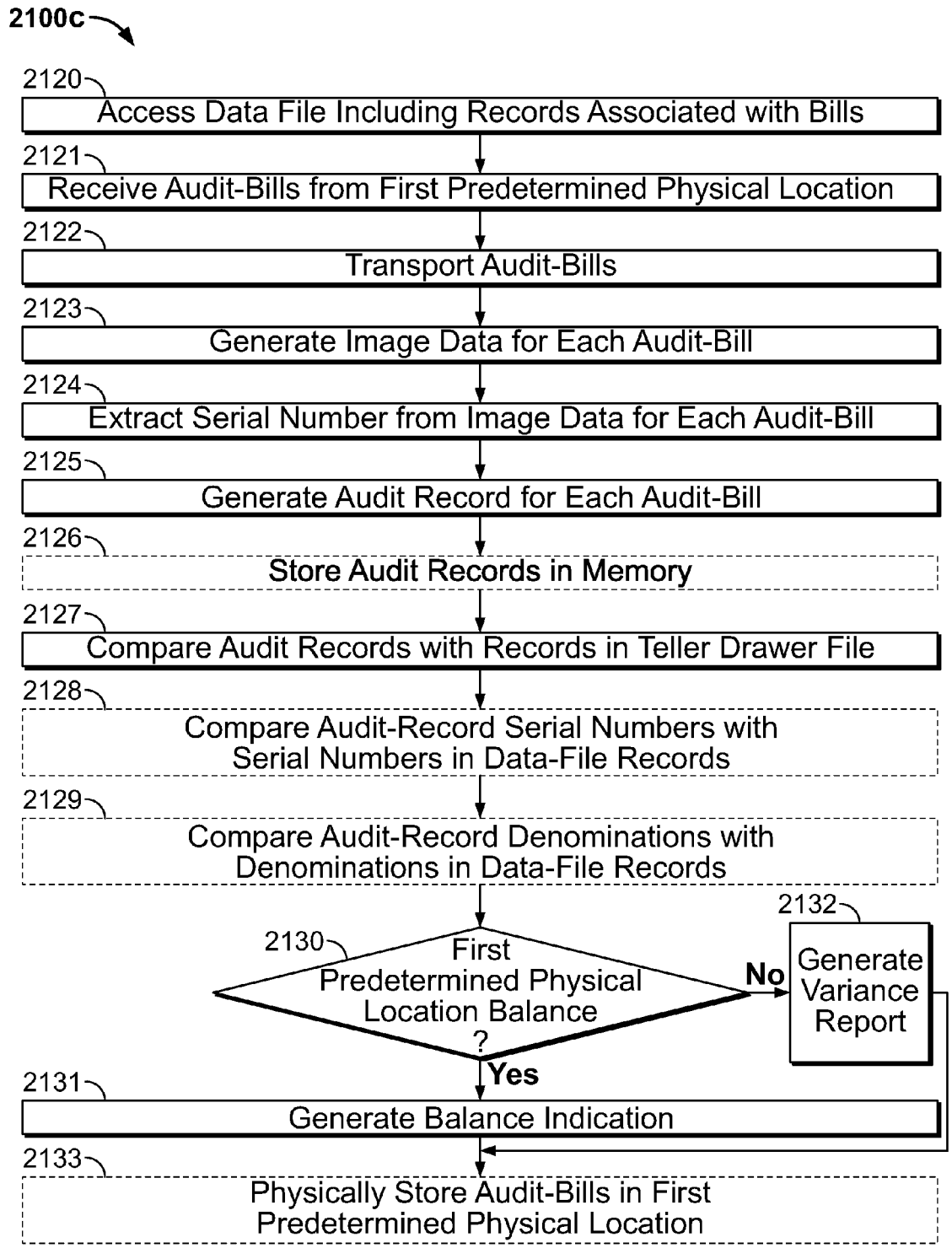
FIG. 21C is a flowchart of a method of reconciling currency bills using a document processing system according to some embodiments of the present disclosure.

Referring to FIG. 21C, a flowchart describing a method 2100c of reconciling currency bills, in an audit mode, using a document processing device, such as the document processing device 101, is illustrated according to some embodiments of the present disclosure. According to some embodiments, the Audit mode can be selected and/or activated to run by an operator of the document processing device 101, via control panel 170. According to some embodiments, an operator of the device selects or activates the audit mode prior to receiving documents, such as currency bills, removed from the first predetermined physical location (e.g., the teller drawer) that are to be reconciled.

According to some embodiments, at act 2120, the device 101 electrically accesses a data file, such as, for example, the teller drawer file, in the same, or similar manner as described above in reference to FIGS. 21A and 21B. For example, the device can access and/or look-up the respective indications in the physical bill location fields for the records in the data file to determine the expected physical location for each bill associated with a record in the data file.

At act 2121, the device receives a plurality of audit-bills. According to some embodiments, audit-bills include all of the currency bills that are stored in a first predetermined physical location, such as the teller drawer as described above in reference to FIGS. 21A and 21B. The audit-bills are received in an input receptacle of the device, such as, for example, the input receptacle 110, 110', described above in reference to FIGS. 1 and 2A-2C. According to some embodiments, in the audit mode, the audit-bills can be the bills that are received from an operator's teller drawer to be reconciled to determine if the teller drawer balances.

According to some embodiments, at act 2122, the audit-bills are transported along a transport path, one at a time, past an image scanner to one or more output receptacles in the same, or similar, manner as described elsewhere herein, such as in reference to FIG. 1. At act 2123, image data is generated for each one of the audit-bills, in the same, or similar, manner as described elsewhere herein, such as, for example, in the Optical Character Recognition Section, and in other sections of the present disclosure, and in reference to FIG. 1. The image data associated with a respective audit-bill is reproducible as a visually readable image of at least a portion of the respective audit-bill. At act 2124, a denomination is determined and/or a serial number is extracted from the image data from each of the audit-bills as described above, for example, in the Optical Character Recognition Section, and in other sections of the present disclosure.

At act 2125, an audit record is generated for each of the audit-bills. According to some embodiments, the audit records are the same as, or similar to the generated records discussed above in reference to FIG. 21A. According to some embodiments, each audit record includes a plurality of data fields for storing information, such as, for example, currency bill identifying information and/or bill tracking information. At least some of the data fields can be the same as, or similar to, the data fields described above in reference to FIGS. 3A-3D. According to some embodiments, the data fields include a serial number field and a denomination field. According to some embodiments, the device is configured to populate each of the data fields with corresponding information. For example, the device can be configured to populate the serial number field with a respective one of the extracted serial numbers and the denomination field with a respective denomination of a respective one of the audit-bills.

According to some embodiments, the device is configured to calculate a total value of the audit-bills based on the denominations of the audit-bills. It is contemplated that according to some embodiments, the calculated total value of audit-bills can be compared with, for example, a running teller drawer total to reconcile the contents of the teller drawer. According to some embodiments, the running teller drawer total is an up-to-date running total value of all bills expected to be in the teller drawer at that point of time. For example, at the beginning of a shift a teller's drawer is empty, which corresponds with a running teller drawer total of $0.00. After receiving a $500 deposit from a bank customer, for example, the running teller drawer total is $500. According to some embodiments, the device 101 is configured to automatically calculate and update the running teller drawer total in response to documents being removed from and/or deposited into the teller drawer.

According to some alternative embodiments, at act 2126, the audit records are stored in one or more memory devices integral with and/or remote from the document processing device 101. According to some embodiments, the audit records can be stored in the same and/or different memory device that stores the corresponding data file. It is contemplated that the audit records can be temporarily stored for a sufficient amount of time to reconcile the audit bills or for a longer, more permanent, period of time such that, even after the audit mode reconciles the audit-bills, the audit records remain in memory storage.

According to some embodiments, it is contemplated that the first predetermined physical location (e.g., the teller drawer) balances in response to each audit-bill and/or audit record corresponding with a record in the data file that is associated with a bill expected to be in the first predetermined physical location. According to some embodiments, at act 2127, the device 101 compares the audit records and/or information contained therein with the records in the data file to reconcile the documents contained in the first predetermined physical location (e.g., the teller drawer). That is, for example, the device determines if each one of the audit-bills removed from the teller drawer corresponds with a record in the data file having a physical bill location field that indicates the respective-associated bill is expected to be in the teller drawer.

According to some alternative embodiments, at acts 2128 and 2129, for each audit-bill and/or audit record, the device compares the extracted serial number and/or determined denomination of the audit-bill with serial numbers and/or denominations included in the records of the data file—including a physical bill location field indicating the teller drawer to be the expected location of the respective bill—to determine which record in the data file corresponds with the audit-bill. That is, the device accesses the records in the data file to find a record having a serial number and/or denomination that matches the extracted serial number and determined denomination of the audit-bill to determine which record, if any, corresponds with the audit-bill and/or the audit record.

At act 2130, according to some embodiments, the device determines if the first predetermined physical location (e.g., the teller drawer) balances based on the comparison from acts 2127 and/or acts 2128, 2129. According to some embodiments, a record indicating that its associated bill is expected to be in the first predetermined physical location (e.g., the teller drawer), should correspond with one of the audit-bills. That is, assuming no tampering or accidental movement has occurred with bills that were supposed to be included and/or removed from the teller drawer, all of the audit bills should match up with a respective record in the data file. According to some embodiments, an audit bill matches up with or corresponds with a record in the data file in response to a serial number and/or a denomination of the audit bill being the same as the determined and/or extracted denomination and/or serial number in the record.

According to some embodiments, if the first predetermined physical location is determined to balance, at act 2131, a balance indication is generated. The balance indication can be an electronic signal, and/or a visual and/or an audible indication, which can indicate to a teller that the teller's drawer is properly balanced. For example, the control panel 170 can visually display a "BALANCE" symbol to indicate to the operator, for example, that the contents of the teller drawer is balanced and/or reconciled. According to some embodiments, the device 101 or the system 100 is configured to generate a balance report in response to the generation of a balance indication. According to some embodiments, the device or system is configured to send a balance indication and/or report to bank manager when a teller's drawer balances. According to such embodiments, the bank manager can monitor when a balance indication and/or report is received for all tellers working a particular shift to determine when the drawers of all tellers are balanced.

According to some alternative embodiments, at act 2130, the device determines if the first predetermined physical location (e.g., the teller drawer) balances based on a comparison of the total calculated value of the audit-bills with a running teller drawer total. According to some embodiments, the running teller drawer total can be calculated as the initial value of bills in the teller drawer, plus a total of all cash-in amounts, minus a total of all cash-out amounts. According to some such embodiments, it is contemplated that the first predetermined physical location balances in response to the calculated total value of the audit-bills equaling a total initial value of bills expected to be in the first predetermined physical location, plus a total value of bills received in the first predetermined physical location, minus a total value of bills removed from the first predetermined physical location. That is, if the initial value of bills in, for example, the teller drawer, plus the value of bills added to the teller drawer, minus the value of bills removed from the teller drawer equals the calculated total value of the audit-bills, then, at act 2131, the balance indication is generated.

According to some embodiments, it is contemplated that the device only generates the balance indication in response to (1) the device determining that the first predetermined physical location (e.g., the teller drawer) balances based on the comparison from acts 2127 and/or acts 2128, 2129 and (2) the device determining that the first predetermined physical location balances based on the comparison of the total calculated value of the audit-bills with the running teller drawer total.

According to some embodiments, in response to a teller's drawer balancing and/or a balance indication being generated, an end-of-shift data file or an end-of-day data file is generated. According to some such embodiments, an end-of-shift data file includes a record for every document processed by a specific teller or by a group of tellers (e.g., every teller in a specific branch of a bank) operating in a bank during a specific shift and an end-of-day data file includes a record for every document processed by a specific teller or by a group of tellers (e.g., every teller in a specific branch of a bank) operating in a bank during a specific workday. According to some embodiments, the end-of-day data file includes a total value of documents remaining in tellers' drawers at the end of the workday. Thus, the bank has an electronic record of documents that the bank will have for the tellers to start the next workday. According to some embodiments, at the start of the next workday, the tellers rerun the documents in their respective teller drawers in the audit mode of operation to verify that all expected documents are still in the teller's drawer.

According to some embodiments, if at act 2130 the first predetermined physical location (e.g., the teller drawer) is determined not to balance, then a variance report is generated at act 2132. According to some embodiments, the variance report includes a serial number and denomination of any no-show currency bill and any unexpected currency bill. According to some embodiments, one or more error messages can be displayed to an operator in response to a variance report being generated. The error messages can be displayed on the control panel of the device or another communicatively connected display. It is contemplated that according to some embodiments, the error message is displayed on a touch screen display that further includes one or more selection keys. The selection keys can include a "Print" key, an "E-Mail" key, an "Override" key, etc. The respective selection keys can be configured to be selectively activated by the operator to cause the variance report to print on a communicatively connected printer (Print key), to electronically transmit the variance report to one or more electronic accounts, such as e-mail accounts (E-Mail key), and/or to ignore or override the non-balance determination (Override key). It is contemplated that in response to an operator activating the override element, a message can be automatically transmitted to one or more electronic accounts, such as, for example, the operator's supervisor's e-mail account.

According to some embodiments, the first predetermined physical location can fail to balance due to one or more bills missing from the first predetermined physical location. Similarly, according to some embodiments, the first predetermined physical location can fail to balance due to one or more unexpected bills being included in the first predetermined physical location. According to some embodiments, a missing bill expected to be physically located in the first predetermined physical location is called a no-show bill.

It is contemplated that according to some embodiments, the variance report can indicate to the teller and/or someone else (e.g., the teller's manager) that one or more documents are missing and/or unexpectedly present in the first predetermined physical location (e.g., the teller drawer). In response to receiving a variance report, an operator and/or teller can then proceed to try and determine why the first predetermined physical location (e.g., the teller drawer) did not balance. According to some alternative embodiments, at act 2133, the audit-bills are returned to be physically stored in the first predetermined physical location, such as, for example, the teller drawer.

According to some embodiments, a bank operates with a multitude of tellers receiving deposits and dispensing currency bills into and from respective teller drawers. According to some embodiments, each teller processes deposits and withdrawals according to the methods described herein in the Document Auditing and Tracking Section, and in other sections of the present disclosure, and in connection with FIGS. 21A-21C with a document processing device. It is contemplated that each teller can operate a respective document processing device or all tellers can share one or more devices and/or systems. According to some embodiments, at the end of a bank shift, all of the tellers rerun the documents in their respective drawers to reconcile their drawers as described above. According to some embodiments, the devices are communicatively connected such that in response all teller drawers balancing except for a first teller's drawer missing a bill (no-show document) having a specific denomination and specific serial number and a second teller's drawer including an unexpected bill having the same specific denomination and the same specific serial number, one or more of the devices and/or systems, such as the device 101 and/or system 100, is configured to generate a bank balance indication. According to some embodiments, the one or more devices and/or systems is configured to generate a bank balance report in response to the generation of a bank balance indication.

According to some embodiments, the one or more devices and/or systems is configured to send a bank balance indication and/or report to a bank manager when all teller drawers balance collectively. For example, where reconciling all of the teller drawers as described above indicates that one teller drawer is missing a $100 bill having serial number AB12345678B and that a second teller draw unexpectedly includes a $100 bill having serial number AB12345678B, one or more of the devices and/or systems is configured to indicate that the bank collectively balances at the shift end.

According to some embodiments, if a bank manager is suspicious that a particular teller is committing theft, the bank manager can arrive at any time of day and shut down that teller's window and run a complete reconciliation of the documents in the teller's drawer in the audit mode of operation. It is contemplated that such an ability (audit mode) will improve the accuracy of a bank's auditing/reconciliation ability and increase the bank's ability to find employees committing theft.

According to some embodiments, a document processing device and/or system configured to operate in a receive/deposit mode, a sell mode, and an audit mode can be used in a retail store location in a similar manner as described above in reference to the devices and/or systems in financial institutions/banks to increase security and/or reduce theft in the retail store. According to some such embodiments, at the end of a shift or workday, a store clerk removes all documents in the clerk's drawer (clerk batch of documents) and processes the documents in the device to generate a record for each document. Each clerk follows the same procedure, such that, the store obtains a data file with a record for all documents in the clerks' drawers (store batch of documents) at closing and/or shift end. According to some embodiments, the clerk's name and/or other clerk identifier is tagged to each record associated with a document processed by the clerk.

According to some such embodiments, in addition to processing the store batch of documents, a clerk manually, or the device automatically, determines and separates excess currency bills from the store batch of documents to be deposited at a bank for a credit. That is, the currency bills in the store batch of documents are counted and totaled and an excess amount of the bills (bills not needed to start the next shift) is removed such that the store is left with a sufficient amount of currency bills to start the next shift or workday. According to some embodiments, the remaining currency bills are put into the various clerk drawers and locked until the next shift or workday. According to some embodiments, the excess bills are processed by the device in the sell mode such that the device updates the data file to reflect that some of the documents were excess and therefore not expected to be in one of the clerk's drawers the following workday or shift in the same, or similar, manner as described above in reference to the sell mode of operation.

According to some embodiments, the device is configured to transmit the updated data file of records associated with the excess batch of bills to a financial institution for a credit in the same, or similar, manner as described in the Deposit Transaction Section, the Electronic Portion of Deposit Transaction Section, in connection with FIGS. 4A and 4B, and in other sections of the present disclosure.

According to some embodiments, in response to the bank receiving the physical bills, the bank can process the received bills and compare the received bills with the data file received from the store to determine if any of the expected documents are no-show documents and to determine if any unexpected documents were included in the same, or similar, manner as described above in the Physical Portion of Deposit Transaction Section, and in other sections of the present disclosure, and in connection with FIGS. 4A and 4B. According to some embodiments, in response to the bank determining a discrepancy, an exception report can be generated including a serial number and denomination (or other identifying information) of each missing document and/or each unexpected document. According to some embodiments, the missing documents can be traced back to the appropriate store and appropriate store clerk and clerk drawer from which the missing bill was suppose to have been received based on information (e.g., clerk's name, clerk identifier, etc.) included in the record associated with the missing bill. For example, a variance report is generated that indicates a $10 bill having serial number 123 is missing from the store's deposit. The bank can notify the store as to the denomination and serial number of the missing bill. The store can access a database of records and/or the data file sent to the bank for a credit and search for the record having the serial number of the missing bill in the same, or similar, manner described in the Modes of Operation—Searching/Master Database Section, and in other sections of the present disclosure. In response to finding the corresponding record, a store manager can determine which store employee is associated with the shortage by reviewing the clerk identifier in the corresponding record. According to some such embodiments, the store manager can speak with the store employee associated with the shortage to try to determine what happened to the $10 bill and why it ultimately was not deposited at the bank.

According to some embodiments, a store can further enhance security by requiring each clerk to process every sale transaction in the same, or similar, manner as described above in reference to the bank processing deposit and withdrawal transactions with a device in the receive/deposit mode and the sell mode. That is, a store can require each clerk to operate a document processing device, such as device 101, 101' at the point of sale. According to some embodiments, each clerk processes every document placed into and removed from the clerk's drawer during a work shift. For example, the clerk processes all documents to be placed into the clerk's drawer (e.g., currency bills received from a customer as payment for an item) in the deposit/receive mode of operation and processes all documents to be removed from the clerk's drawer (e.g., currency bills to be used as change) in the sell mode of operation. According to some embodiments, clerks process all excess documents to be sold from their drawer to a central store vault during their shift in the sell mode of operation. According to some embodiments, the processing of all documents as described herein provides the store with a complete electronic record (database) of all transactions throughout a workday or shift.

According to some embodiments, a document processing device such as device 101, 101' is configured to operate in an employee audit mode of operation. According to some such embodiments, the employee audit mode can be used to compare currency bills in a bank employee's personal possession, such as, for example, the employee's wallet, with one or more teller drawer files to determine if any of the employee's bills are expected to be located in one of the bank's teller drawers (e.g., the drawer associated with the employee or a drawer of a different employee). According to some embodiments, in response to the device determining that one of the employee's bills is expected to be in a teller drawer, the device is configured to generate an alert, such as, for example, automatically transmitting an e-mail to a bank manager or supervisor indicating the discrepancy or potential theft. According to some embodiments, a bank can require all employees to process their personal bills at the beginning and/or at the end of a shift in a device operating in the employee audit mode. According to some embodiments, the device generates and/or updates respective records and/or data files for each employee to track each employee's personal currency throughout the employee's employment at the bank.

While the acts 2120, 2121, 2122, 2123, 2124, 2125, 2126, 2127, 2128, and 2129 are illustrated and described in a particular sequence, it is contemplated that the method 2100c can be performed in a variety of different orders and/or with one or more acts occurring simultaneously. For example, for a stack of documents, the device can be configured to access (2120), receive (2121), transport (2122), generate image data (2123), extract (2124), generate records (2125), store records (2126), and/or compare (2127, 2128, 2129) for different ones of the respective documents simultaneously.

Figure 21D:
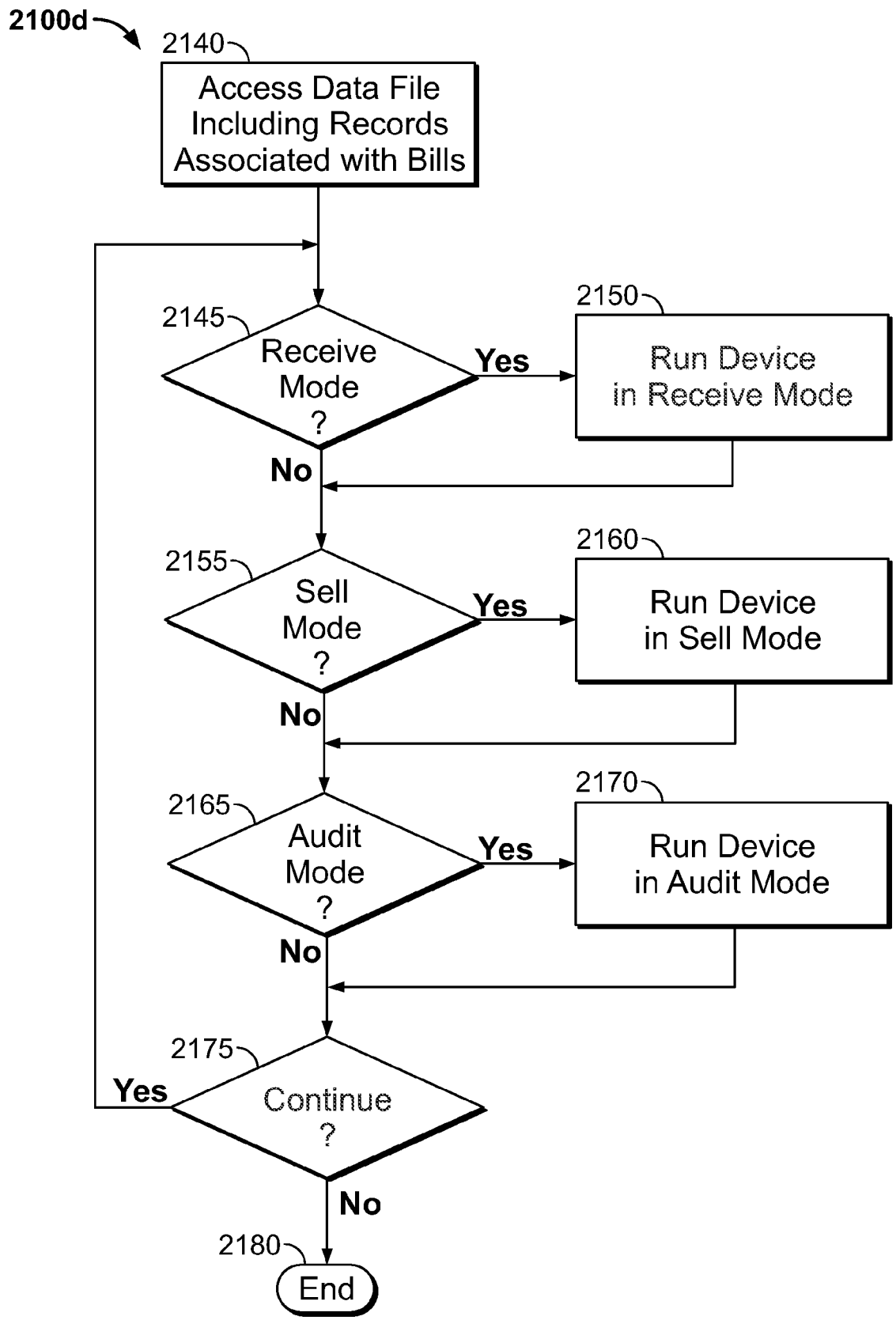
FIG. 21D is a flowchart of a method of monitoring and reconciling currency bills using a document processing system according to some embodiments of the present disclosure.

Referring to FIG. 21D, a flowchart describing a method of monitoring and reconciling currency bills 2100d using a document processing device, such as the document processing device 101, is illustrated according to some embodiments of the present disclosure. The method 2100d can be implemented throughout a work shift and/or a workday using the device 101 to monitor and/or track bills being stored in and being removed from a first predetermined physical location, such as, for example, a teller drawer, and to audit the bills remaining therein at the end of the work shift and/or workday.

According to some embodiments, at act 2140, the device 101 electrically accesses a data file, such as, for example, the teller drawer file described above in reference to FIGS. 21A-C. It is contemplated that, according to some embodiments, the device 101 can be configured to selectively access the teller drawer file to write, read, and/or modify records contained therein in the same, or similar, manner as described above in reference to FIGS. 21B and 21C while running in a receive and/or deposit mode, a sell mode, and/or an audit mode.

At act 2145, the device prompts an operator to enter into a receive mode of operation and/or determines whether the device is operating in the receive mode. Alternatively, the operator can navigate through one or more electronic menus on a control panel (e.g. control panel 170) of the device to select and/or activate the receive mode. In response to the operator entering and/or selecting the receive mode, at act 2150, the device runs in the receive mode in the same, or similar, manner as the receive mode and/or the deposit mode described above in reference to FIG. 21A.

After processing received documents in the device running the receive mode at act 2150, or in response to the operator not entering the receive mode at act 2145, the device prompts an operator to enter into a sell mode of operation and/or determines whether the device is operating in the sell mode at act 2155. Alternatively, the operator can navigate through one or more electronic menus on the control panel of the device to select and/or activate the sell mode. In response to the operator entering and/or selecting the sell mode, at act 2160, the device runs in the sell mode in the same, or similar, manner as the sell mode described above in reference to FIG. 21B.

After processing sell documents in the device running the sell mode at act 2160, or in response to the operator not entering the sell mode at act 2155, the device prompts an operator to enter into an audit mode of operation and/or determines whether the device is operating in the audit mode at act 2165. Alternatively, the operator can navigate through one or more electronic menus on the control panel of the device to select and/or activate the audit mode. In response to the operator entering and/or selecting the audit mode, at act 2170, the device runs in the audit mode in the same, or similar, manner as the audit mode described above in reference to FIG. 21C.

After processing audit documents in the device running the audit mode at act 2170, or in response to the operator not entering the audit mode at act 2165, at act 2175 the device prompts an operator to continue and/or automatically proceeds to act 2145. In response to the operator continuing, at act 2175, the device can prompt the operator to enter any one or more of the receive mode, the sell mode, and/or the audit mode as described above. In response to the operator not continuing at act 2175, the method 2100d ends at act 2180.

According to some embodiments, a teller accumulates excess currency in the teller's drawer that the teller sells to a back room or vault. According to some such embodiments, the teller processes an excess batch of bills using a document processing device in a sell mode, as described above. According to some embodiments, the processing of the excess batch of bills updates records associated with each bill in the excess batch of bills to indicate that the excess bills are expected to be located in the vault and not in the teller's drawer. According to some embodiments, the records associated with the excess bills are tagged with an excess-batch number or identifier that uniquely identifies the group of bills being sold to the vault in the same, or similar, manner that a transaction identifier uniquely identifies a batch of documents deposited by a customer in a bank.

According to some embodiments, the records are stored in a database accessible by the teller via one or more devices and/or systems and by a vault employee operating one or more document processing devices and/or systems, such as, for example, document processing device 101, 101' and/or imaging MPS 400. According to some embodiments, the excess-batch identifier is transmitted or otherwise sent to a device or system in the vault such that the vault operator is made aware of the incoming excess batch of bills. According to some alternative embodiments, the records associated with the teller batch number are grouped as a data file and transmitted or otherwise made available to one or more document processing devices and/or systems in the vault. According to some embodiments, the data file is stored in a memory device integral with a tray used to physically move the bills being sold such that an operator in the vault can scan or otherwise access the data file in the memory of the tray.

According to some embodiments, in response to the physical excess batch of bills being delivered to the vault, the vault operator can access the records associated with the excess batch of bills. It is contemplated that the vault operator can determine from the accessed records a total number of expected excess bills, a total expected value of excess bills, a teller identifier of the teller that sold the excess bills to the vault, among a variety of other information, such as the information in the records and data files described in the Document Records and Data Files Section, and in other sections of the present disclosure, and in connection with FIGS. 3A-3E.

According to some embodiments, the vault operator processes the excess batch of bills in a one or two output receptacle document processing device, such as, for example, document processing device 101, 101', to generate vault records and then moves the excess batch of bills to a non-imaging MPS for sorting. According to some alternative embodiments, the vault operator processes the excess batch of bills in an imaging MPS, to generate vault records, which eliminates the need for first processing the excess batch of bills in a one or two output receptacle processing device. According to some embodiments, the document processing device or the imaging MPS or a communicatively connected computer is configured to compare the vault records with the records associated with the excess batch of bills to determine if any of the excess bills expected to be in the excess batch are no show bills or if any bills not expected are present in the excess batch of bills (unexpected bills).

According to some embodiments, in response to the vault records all matching and/or otherwise corresponding with the records associated with the excess batch of bills, the imaging MPS is configured to generate a balance indication or signal. According to some embodiments, in response to one or more of the vault records not matching and/or otherwise corresponding with a record associated with the excess batch of bills, the imaging MPS is configured to generate a variance indication or report (e.g., indicating the existence of one or more unexpected documents). Similarly, according to some embodiments, in response to one or more of the records associated with the excess batch of bills not matching and/or otherwise corresponding with a vault record, the imaging MPS is configured to generate a variance indication or report (e.g., indicating the existence of one or more no-show documents). According to some embodiments, tracking excess batches of bills as described herein provides a financial institution, such as the bank in the above example, immediate visibility of shortages/overages as well as the teller from which the shortage/overages originated.

According to some embodiments, continually operating document processing devices and/or systems in a financial institution according to the receive/deposit mode of operation and the sell mode of operation generates records for each document processed at the financial institution as described above. Thus, according to some such embodiments, at the end of a shift or banking workday, for example, a variety of reports and/or information can be generated and/or otherwise prepared for review by one or more financial institution employees. For example, a report including a total amount of currency withdrawn by customers by denomination and/or serial number can be generated. For another example, a sub-report by bank customer can be generated, which includes denominations and serial numbers of each bill withdrawn for the respective bank customers. For another example, a report including all of the currency bills deposited at a specific teller window by customer including serial number and denomination can be generated. For yet another example, a report including a summary of all excess currency bills by denomination and serial number sold to the central vault (or sold to a head teller) can be generated. For another example, a report including a net amount of currency bills by denominations and/or serial numbers remaining in one or more teller drawers at the end of the day or shift can be generated.

According to some embodiments, a recycling system, such as the recycling systems described in the Document Processing Recycling System Section and in connection with FIGS. 19A and 19B, is configured to operate in a receive mode, a sell mode, and an audit mode. Accordingly, the recycling system can operate in a receive mode when receiving documents to be stored in one of the vaults 1907a,b,c and operate in the sell mode when dispensing documents from the recycle vault 1907a. According to some embodiments, such a recycling system is used in a bank by a teller to receive customer deposits and to dispense currency bills to customers. For example, in response to a bank customer requesting a withdrawal of $100, an operator of the recycling system enters a withdrawal amount of $100 into an input device (e.g., similar to the control panel 170) of the recycling system. The recycling system is configured to dispense $100 of currency bills from the recycle vault 1907a and to update a recycle drawer file, similar to the teller drawer file discussed above, to indi-

Identifying Counterfeit Attributes of Suspect Documents

According to some embodiments, a document processing device and/or system, such as, for example, the document processing device 101, 101', 101a, and/or system 100 can be used to identify and/or track counterfeit attributes of documents such as suspect currency bills. The document processing device may identify a currency bill or document as suspect based on any of a number of attributes, including character information extracted from the document, such as, for example, a serial number or a MICR line, non-conforming magnetic properties, non-conforming infrared characteristics, non-conforming UV characteristics, non-conforming iridescence characteristics, non-conforming thread characteristics, non-conforming watermark characteristics, non-conforming paper characteristics, and other types of security characteristics known in the art. The attribute(s) that trigger the document, such as, for example, a currency bill, being identified as a suspect document by the document processing device can be identified, associated, and/or tagged to the suspect document and stored, along with image data that is reproducible as a visually readable image of at least a portion of the suspect document, in a database, a record, and/or a data file, such as, in the databases, records, and/or data files described elsewhere herein including, for example, the databases, the records, and the data files described above in the Document Records and Data Files Section, and in other sections of the present disclosure, and in reference to FIGS. 3A-3E, 12A-12B and 14-17. According to some embodiments, a serial number of an identified suspect bill can also be extracted and stored in the database. Such information is stored so that it can be easily retrieved at some later point in time for comparison with, for example, any other currency bills that appear having the same serial number.

According to some embodiments, the record, data file, and/or database including the identification of the reason why a document was flagged as suspect can be stored in a memory in the device 101, 101'. According to some embodiments, the record, data file, and/or database including the identification of the reason why a document was flagged as suspect can be stored in a memory located outside of the device 101, 101', such as in computer 151 (FIG. 1), and/or in or more of the databases in FIGS. 14-17.

It is contemplated that in some embodiments, a user of a document processing device can provide an input as to whether to record the value of the suspect document in the total of a transaction in the same, or similar, manner as described in the Modes of Operation—Blacklist Section, and in other sections of the present disclosure, and in reference to FIGS. 11A-11B. For example, a document processing device may allow a user to either reject a suspect document or to accept the document as genuine. The document processing device may, for example, include a "SUSPECT TRACKING" option that can be toggled on and off based on a selection received from an operator. It may be desirable, as a further example, for a document processing device to include a set-up menu that allows a user to customize the processing of suspect documents. The set-up menu can include a setting that allows the user to select a "REJECT" key, or similar selection element such as suspect element 1131a, during document processing operations. Selection of the "REJECT" selection element can either deduct the value of the suspect document from any accumulated totals, if the value was previously added, or the selection can keep the value of the suspect document from being added to the accumulated total.

According to some embodiments, selection of the "REJECT" selection element causes the suspect document information to be recorded in a memory or other storage device such as in a database that enables the suspect document information to be retrieved at a later time. The non-conforming information that triggered the document to be identified as suspect may be recorded to the database and associated with the suspect document. The recorded information can also include at least a portion of the document image, such as a currency bill image. The document processing device can further include an "ACCEPT" key, or similar selection element such as override element 1132a, the selection of which causes the value of the suspect document to be added to an accumulated total or which causes no change to be made to the accumulated total, if the document value was previously included in a running total for a particular set of documents being processed. The selection of the "ACCEPT" selection element can also cause the non-conforming information that triggered the document to be identified as suspect to be recorded into the database and associated with the suspect document.

According to some embodiments, additional information can also be recorded upon the selection of the "ACCEPT" and "REJECT" selection elements of a document processing device, including operator information and document processing device information. Such information may be desirable when suspect documents are subsequently assessed, such as in the back room of financial institution or by the U.S. Federal Reserve, and determined to be counterfeit. The recorded information can then be used to track operator and document processing device effectiveness in screening for suspect documents.

Automatic Report Generation

According to some embodiments, a document processing device and/or system of the present disclosure, such as, for example, one of the document processing devices 101, 101', 101a,b, 400, and/or the document processing system 100, is configured to generate a counterfeit or suspect instruction and/or signal in response to one of the document processing devices determining that one or more currency bills being processed by the device is a suspect currency bill. According to some embodiments, the device (e.g., device 101) automatically transmits a counterfeit instruction and/or signal to another device, such as, for example, another device 101 designated as a counterfeit report generating device that is integral with and/or communicatively coupled to a printing device. The counterfeit instruction and/or signal can include a variety of information related to the determined suspect bill. According to some embodiments, the counterfeit instruction and/or signal includes information, such as, for example, a serial number, a denomination, a deposit transaction identifier, a suspect reason code, a customer identifier, a customer account number, a teller identifier, a document processing device identifier, a processing time, a batch identifier, a sub-batch identifier, or any combinations thereof. According to some embodiments, the counterfeit instruction and/or signal further includes additional identifying character information, such as, for example, a series, a back plate number, a check letter and quadrant number, a check letter and face plate number, a Federal Reserve letter/number. According to some embodiments, the counterfeit instruction and/or signal further includes image data that is reproducible as one or more visually readable images. According to some embodiments, the counterfeit instruction includes a record or information in the record associated with the suspect document such as the records discussed in the Document Records and Data Files Section, and in other sections of the present disclosure, and in connection with FIGS. 3A-3E.

According to some embodiments, in response to receiving the counterfeit instruction and/or signal, the counterfeit report generating device automatically populates data fields in a form with at least a portion of the information and/or data included in the counterfeit instruction and/or signal. For example, the counterfeit report generating device can automatically populate respective data fields with all of or a portion of the following information: a serial number, a denomination, a series, a back plate number, a check letter and quadrant number, a check letter and face plate number, and a Federal Reserve letter/number and/or one or more images, such as, for example, a serial number snippet, a denomination snippet, a Federal Reserve letter/number snippet, a check letter and quadrant number snippet, a check letter and face plate snippet, a back plate number snippet, a series snippet, and/or a first or second bill side image. According to some embodiments, the form is a counterfeit note report, such as, for example, a modified version of U.S. Secret Service Form SSF1604.

According to some embodiments, the counterfeit report generating device automatically prints a hardcopy of the populated form. According to some embodiments, the counterfeit report generating device automatically e-mails and/or otherwise electronically transmits or makes available an electronic copy of the automatically populated form. For example, the counterfeit report generating device is configured to send e-mails to bank managers including the populated forms. For another example, the populated forms can be made available on a website for third party downloading, such as, for example, by the U.S. Secret Service and/or by the U.S. Federal Reserve.

According to some embodiments, the counterfeit instruction and/or signal is stored in a suspect queue memory in a format similar to that of a record associated with a suspect document, the record being similar to the records described above in the Document Records and Data File Section, and in other sections of the present disclosure. The memory storing the suspect queue can be integral with or communicatively coupled to the counterfeit report generating device and/or the document processing device. That is, according to some embodiments, the counterfeit report generating device receives counterfeit instructions and arranges the counterfeit instructions in a queue for subsequent viewing and/or processing by an operator of the counterfeit report generating device. It is contemplated that the counterfeit report generating device can be configured to receive counterfeit instructions from a plurality of communicatively connected document processing devices such as document processing device 101, 101'. According to some embodiments, the records in the suspect queue are grouped by teller that initially processed the suspect bills. It is contemplated that such a grouping by teller can aid a user in matching the records in the suspect queue with the physical suspect bills retrieved from the various tellers.

According to some alternative embodiments, the counterfeit report generating device is a document processing device such as document processing device 101, 101'. That is, the document processing device 101 can be configured to automatically populate and print the forms directly to a printing device integral with and/or communicatively coupled to the device 101. According to some embodiments, the counterfeit report generating device is the same as, or similar to, the document processing device 101, which is configured to image documents at resolutions of at least about, for example, 200 DPI×400 DPI, 400 DPI×200 DPI, 300 DPI×300 DPI, 400 DPI×400 DPI.

For example, according to some embodiments, a bank includes a plurality of document processing devices, such as, for example, document processing devices 101, 101', 101a,b, 400, 1410a-c, 1510, 1610, or 1710 to process currency bills. Each of the devices is operated by a respective bank teller. In response to one of the document processing devices determining that a currency bill being processed thereon is a suspect bill, the respective device automatically transmits a counterfeit instruction to a suspect queue memory. The counterfeit instruction stored in the suspect queue can include, for example, the following information: a serial number, a denomination, a customer identifier, a teller identifier, a rejection code (e.g., RJ), or any combination thereof.

In response to a device (e.g., 101, 101', 101a,b) detecting a suspect bill, the respective operator removes the suspect bill from the device and puts the bill in a separate location such as off to the side for subsequent processing. According to some embodiments, a bank supervisor (user/operator) collects all of the suspect bills from the various bank tellers for further processing, such as to confirm the suspect bills' suspect/rejected status and/or to generate a counterfeit report/form for each determined suspect bill. According to some embodiments, the supervisor processes the suspect bills in a counterfeit report generating device such as a document processing device 101, 101', 101a,b. According to some embodiments, the counterfeit report generating device accesses the suspect queue and/or the supervisor accesses the suspect queue via the counterfeit report generating device and/or a separate computer coupled to the memory storing the suspect queue.

According to some embodiments, the supervisor confirms the suspect/rejected status of each suspect bill manually and/or by processing the suspect bills in the counterfeit report generating device, which can include more advanced counterfeit detection sensors and/or equipment than the devices used initially by the tellers. In response to the supervisor determining that a bill was wrongly classified as and/or determined to be a suspect bill, the supervisor can remove the record associated with the bill from the suspect queue by, for example, activating a delete element adjacent to and/or corresponding with the record. According to some such embodiments, deleting a record from the suspect queue tags the suspect bill or a record associated therewith a new status that indicates that the record is associated with a bill that was initially determined to be suspect, but later accepted as being genuine or not suspect. For example, a status of "Accepted Corrected" or ACC can be used for such purposes.

According to some embodiments, in response to a record being deleted from the suspect queue, a credit report is automatically generated. The credit report can be printed and or electronically transmitted. According to some embodiments, the credit report is printed and a teller receives the report. The report can include instructions for the teller to credit an account of a customer that originally deposited the bill. According to some embodiments, in response to a record being deleted from the suspect queue, a credit signal and/or instruction is automatically generated and transmitted to an accounting system and/or teller system for crediting an account. According to some embodiments, the credit can occur automatically without any input from an operator or teller. Alternatively, input from a teller is needed to complete the credit.

According to some embodiments, in response to a record being deleted from the suspect queue, the record is automatically deleted from any blacklist databases. For example, in response to a bill being determined to be suspect initially, the serial number and/or the denomination of the bill is added to a blacklist database. In response to the bill later being determined to not be suspect, the serial number and/or the denomination can be removed from the blacklist database. According to some embodiments, the serial number and/or the denomination is only removed from the blacklist database after a predetermined waiting period, such as, for example, 1 day, 1 week, 1 month, etc.

According to some embodiments, in response to an operator of the counterfeit report generating device confirming that a bill is a suspect bill, the operator then processes the suspect bill to generate a counterfeit report/form. According to some embodiments, the operator generates/completes the counterfeit report/form using a report generation wizard, such as described below in reference to FIG. 22. The operator can repeat the same process for each record in the suspect queue. According to some alternative embodiments, at least a portion of each report is automatically completed/populated with information, data, and/or images included in the counterfeit instruction and/or signal. According to some embodiments, an operator prints partially automatically populated reports/forms and manually fills in any missing information. It is contemplated that some information may not be automatically populated due to an extraction error and/or due to the device being unable to extract certain data above a target confidence level. According to some such embodiments, the document processing device and/or system is configured to populate the report/form with a snippet image of an area of a bill which is suppose to contain the unextracted information/data that was supposed to be populated into the report/form. According to some embodiments, in response to the document processing device and/or system failing to automatically populate information due to an extraction error and/or due to the device/system being unable to extract certain data above a target confidence level, the document processing device is configured to attempt to auto-correct the extraction error, such as, for example, by applying a second OCR routine/algorithm and/or by applying the same OCR algorithm a second time. According to some embodiments, the document processing device and/or system is configured to populate the report/form with a snippet image of an area of a bill which is suppose to contain the unextracted information/data that was supposed to be populated into the report/form only after the device/system fails to properly extract the information during the auto-correction routine.

According to some embodiments, a counterfeit report is automatically generated and populated for each record in the suspect queue in response to an operator processing each of the suspect bills in the counterfeit report generating device. According to some embodiments, the counterfeit report generating device is configured to image currency bills and extract and/or otherwise determine the following information: a serial number, a denomination, a series, a back plate number, a check letter and quadrant number, a check letter and face plate number, a Federal Reserve letter/number. According to some embodiments, the counterfeit report generating device is configured to automatically populate corresponding data fields and/or portions in a report and/or form with the extracted data and/or with an associated snippet image. For example, an extracted serial number can be populated into the serial number field in the form and/or a serial number snippet image of the serial number can be populated into the serial number field in the form. For another example, a determined denomination can be populated into the denomination field in the form with or without a denomination snippet image. Similarly, an extracted face plate number can be populated into the face plate number field in the form with or without a face plate snippet image, an extracted check letter and quadrant number can be populated into the check letter and quadrant number field in the form with or without a check letter and quadrant number snippet image, etc. for each record in the suspect queue. After a report is generated/populated, the operator can verify the information in the report by looking at the physical bill and comparing the physical bill with the populated information, which can be shown on a display device integral with and/or communicatively connected with the counterfeit report generating device. If the report is acceptable, the operator can then instruct or command the counterfeit report generating device to print and/or electronically transfer the completed form(s) to one or more locations, such as, for example, a computer system or website associated with the United States Secret Service, the United States Federal Reserve, a bank manager, etc.

According to some embodiments, the operator can process a plurality of suspect bills at once by inserting the plurality of the suspect bills as a stack into an input receptacle of the counterfeit report generating device. In such embodiments, the counterfeit report generating device is configured to image each bill thereby generating image data for each bill and extracting the necessary information from each suspect bill and/or the image data associated with each suspect bill and to populate a plurality of forms, one for each suspect bill. For example, the counterfeit report generating device may denominate each bill using the image data associated with each bill and/or the device may denominate the bill without using the image data. Furthermore, the counterfeit report generating device may extract alphanumeric characters from the image data associated with a suspect bill, for example, the alphanumeric characters in the serial number, series, back plate number, etc. According to some embodiments, the counterfeit report generating device is configured to use the determined and/or extracted information to populate appropriate fields in an electronic version of an appropriate report and/or form, such as, for example, a U.S. Secret Service Form SSF1604, or a modified/updated version thereof. The populated reports/forms can be physically printed out on paper and/or electronically sent to another location such as via the Internet or other computer network.

According to some embodiments, a document processing device and/or system of the present disclosure is configured to image currency bills to produce image data, extract information and/or data from the image data for each of the bills, generate a record for each of the bills including at least a portion of the extracted information and/or image data, and to automatically populate a counterfeit note report/form, such as, for example, the U.S. Secret Service Form SSF1604 with at least some of the extracted information and/or image data at a rate of at least about 100 currency bills per minute.

According to some embodiments, a document processing device and/or system of the present disclosure is configured to image currency bills to produce image data, extract information and/or data from the image data for each of the bills, generate a record for each of the bills including at least a portion of the extracted information and/or image data, and to automatically populate a counterfeit note report/form, such as, for example, the U.S. Secret Service Form SSF1604 with at least some of the extracted information and/or image data at a rate of at least about 200 currency bills per minute.

According to some embodiments, a document processing device and/or system of the present disclosure is configured to image currency bills to produce image data, extract information and/or data from the image data for each of the bills, generate a record for each of the bills including at least a portion of the extracted information and/or image data, and to automatically populate a counterfeit note report/form, such as, for example, the U.S. Secret Service Form SSF1604 with at least some of the extracted information and/or image data at a rate of at least about 300 currency bills per minute.

According to some embodiments, a document processing device and/or system of the present disclosure is configured to image currency bills to produce image data, extract information and/or data from the image data for each of the bills, generate a record for each of the bills including at least a portion of the extracted information and/or image data, and to automatically populate a counterfeit note report/form, such as, for example, the U.S. Secret Service Form SSF1604 with at least some of the extracted information and/or image data at a rate of at least about 500 currency bills per minute.

According to some embodiments, a document processing device and/or system of the present disclosure is configured to image currency bills to produce image data, extract information and/or data from the image data for each of the bills, generate a record for each of the bills including at least a portion of the extracted information and/or image data, and to automatically populate a counterfeit note report/form, such as, for example, the U.S. Secret Service Form SSF1604 with at least some of the extracted information and/or image data at a rate of at least about 1000 currency bills per minute.

According to some embodiments, a document processing device and/or system of the present disclosure is configured to image currency bills to produce image data, extract information and/or data from the image data for each of the bills, generate a record for each of the bills including at least a portion of the extracted information and/or image data, and to automatically populate a counterfeit note report/form, such as, for example, the U.S. Secret Service Form SSF1604 with at least some of the extracted information and/or image data at a rate of at least about 2000 currency bills per minute.

According to some embodiments, a document processing device and/or system of the present disclosure is configured to image currency bills to produce image data, extract information and/or data from the image data for each of the bills, generate a record for each of the bills including at least a portion of the extracted information and/or image data, and to automatically populate a counterfeit note report/form, such as, for example, the U.S. Secret Service Form SSF1604 with at least some of the extracted information and/or image data at a rate of at least about 3000 currency bills per minute.

According to some embodiments, a printing device that is coupled to a document processing device and/or system of the present disclosure is configured to receive report data from the document processing device and/or system and to print the report data as a counterfeit note report that includes populated information, such as, for example, extracted information and/or snippet images, at a rate of at least about 5 reports per minute. According to some embodiments, a printing device that is coupled to a document processing device and/or system of the present disclosure is configured to receive report data from the document processing device and/or system and to print the report data as a counterfeit note report that includes populated information, such as, for example, extracted information and/or snippet images, at a rate between about 5 and about 50 reports per minute.

According to some embodiments, a document processing device and/or system of the present disclosure is configured to generate populated counterfeit report data and to transmit the populated counterfeit report data as an electronic counterfeit note report that includes populated information, such as, for example, extracted information and/or snippet images, at a rate of at least about 5 reports per minute. According to some embodiments, a document processing device and/or system of the present disclosure is configured to generate populated counterfeit report data and to transmit the populated counterfeit report data as an electronic counterfeit note report that includes populated information, such as, for example, extracted information and/or snippet images, at a rate of at least about 50 reports per minute. According to some embodiments, a document processing device and/or system of the present disclosure is configured to generate populated counterfeit report data and to transmit the populated counterfeit report data as an electronic counterfeit note report that includes populated information, such as, for example, extracted information and/or snippet images, at a rate between about 5 and about 50 reports per minute. According to some embodiments, a document processing device and/or system of the present disclosure is configured to generate populated counterfeit report data and to transmit the populated counterfeit report data as an electronic counterfeit note report that includes populated information, such as, for example, extracted information and/or snippet images, at a rate between about 50 and about 500 reports per minute.

Figure 23A:
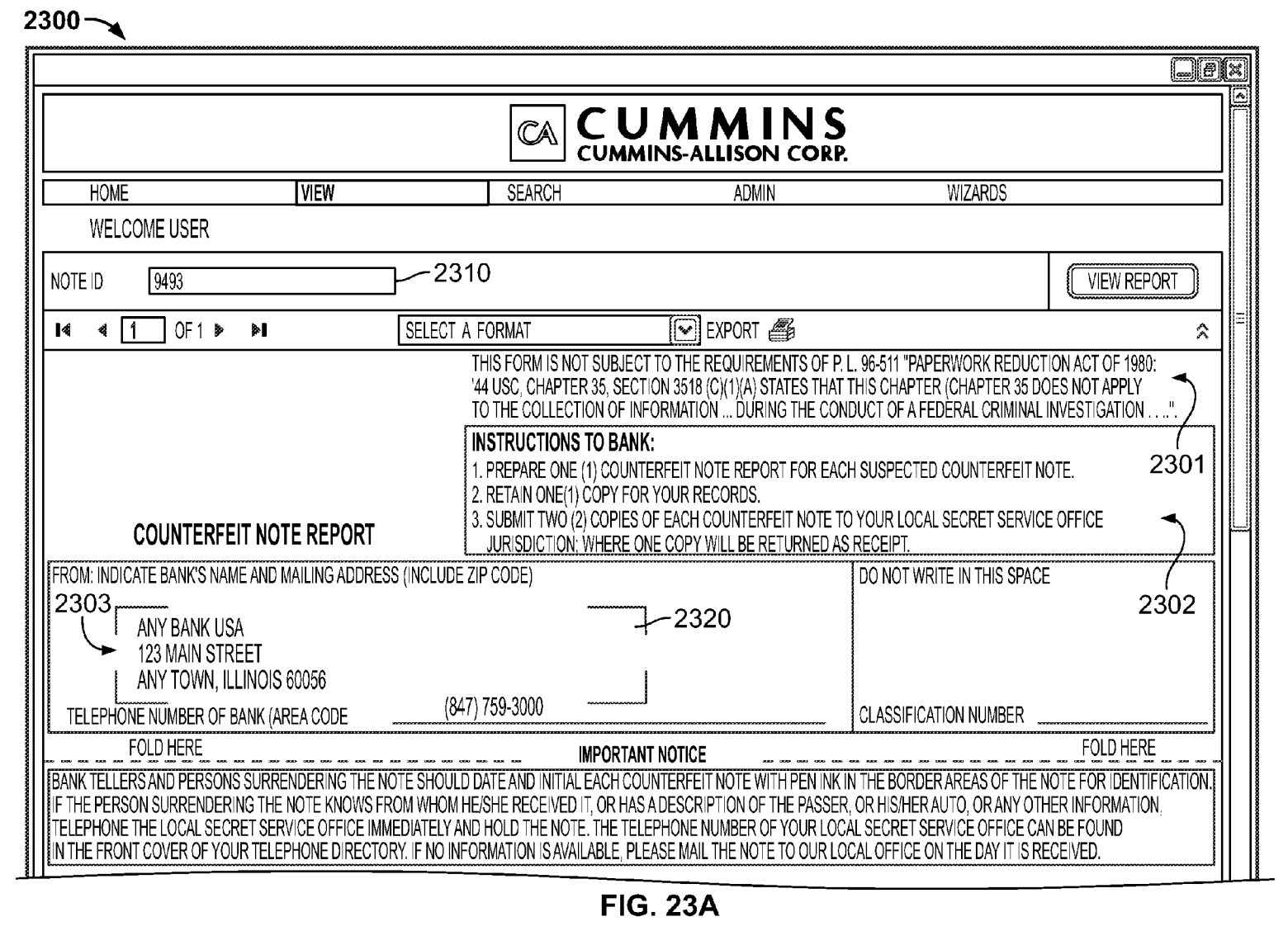
Figure 23B:
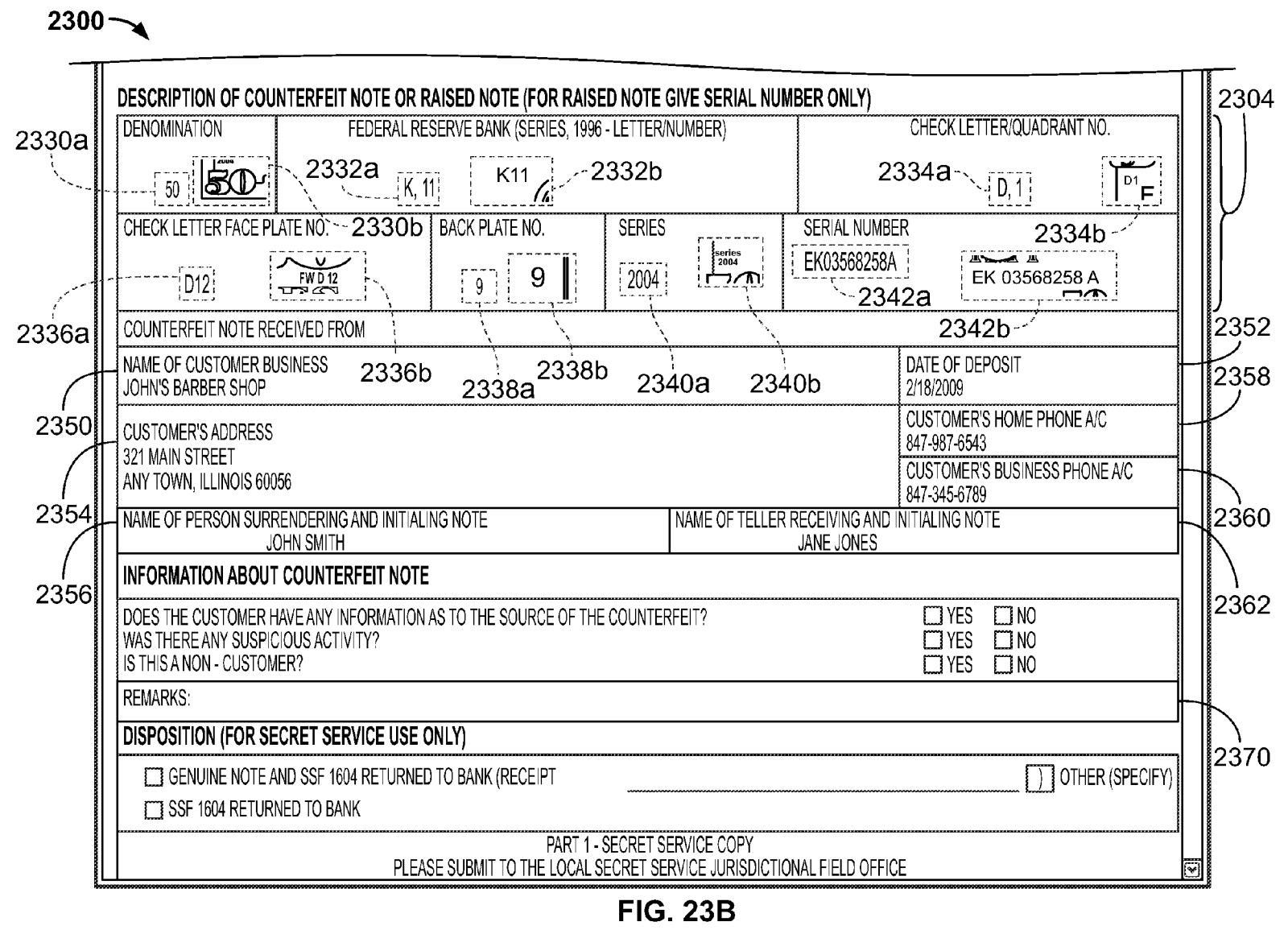

Referring to FIGS. 23A-B, an example of the counterfeit report/form described above is shown as a counterfeit note report or report 2300. According to some embodiments, the report 2300 includes various types of informational fields, such as, for example, one or more predetermined text fields, one or more predetermined instruction fields, one or more predetermined financial institution/entity fields, and one or more predetermined currency bill data fields. Various other types of predetermined fields are contemplated such as a predetermined customer identifying information field.

According to some embodiments, each of the predetermined fields included in the report has a predetermined location within the report. That is, each field has a predetermined or preset location on the report with respect to the borders of the report/form. For example, in one type of report such as the report 2300, a predetermined text field 2301 is positioned near a top of the form 2300, a predetermined instruction field 2302 is positioned below the predetermined text field 2301, a predetermined financial institution/entity field 2303 is positioned below the predetermined instruction field 2302, and a plurality of predetermined currency bill data fields 2304 are positioned below the predetermined financial institution/entity field 2303.

According to some embodiments, while the location of the predetermined fields 2301, 2302, 2303, 2304 in the form are known/predetermined, the information contained within one or more of the respective predetermined fields 2301, 2302, 2303, 2304 is not predetermined. For example, the information included in the predetermined currency bill fields 2304 is not predetermined as the information is extracted from image data associated with a suspect bill and/or otherwise determined for a suspect bill. The extracted/determined information is then automatically populated into the respective fields by the device or system, whereas the information included in the predetermined text field 2301 is predetermined, for example, as the information therein is generic to the form 2300.

According to some embodiments, a document processing device and/or system of the present disclosure is configured to extract data and/or information from image data associated with a bill determined to be suspect and/or counterfeit and to automatically populate at least a portion of the extracted data and/or information and/or images into respective fields or sections of a report, such as, for example, report 2300.

According to some embodiments, additional information can be populated into respective fields or sections of the report, such as, for example, customer identifying information can be populated into the predetermined financial institution/entity field 2303. According to some embodiments, the populated information may include a currency note ID 2310, contact information 2320 for the bank or financial institution preparing the counterfeit note report and information on the customer (e.g., a business, a person) from whom the counterfeit note was received. The customer information may be obtain from electronic financial institution records that are connected through a financial institution network to the document processing device. Customer information may also be extracted from image data associated with a header slip or deposit slip containing customer and other transaction information. The customer information can include the business name 2350, address 2354, telephone numbers 2358, 2360, and the name of the person surrendering the note to the financial institution 2356. The report 2300 may also include the name of the teller that received the counterfeit note 2362 from the customer, which can be automatically populated into the report by a document processing device and/or system.

Various fields, such as, for example, the plurality of predetermined currency bill data fields 2304, in the report 2300 are automatically populated by a device and/or system with information or data extracted and/or determined from image data associated with a suspect/counterfeit note and/or from the suspect/counterfeit note itself such as, for example, a denomination 2330*a*, a Federal Reserve letter/number 2332*a*, a check letter and/or quadrant number 2334*a*, a check letter and face plate number 2336*a*, a back plate number 2338*a*, a series letter and/or year 2340*a*, and/or a serial number 2342*a*.

According to some embodiments, the document processing device and/or system is configured to automatically populate one or more fields in the report 2300 with a full or partial image of the front of the currency bill (not shown), a full or partial image of the back of the currency bill (not shown), a currency bill denomination snippet image 2330*b*, a currency bill federal reserve letter/number snippet image 2332*b*, a currency bill check letter and quadrant number snippet image 2334*b*, a currency bill check letter and face plate number snippet image 2336*b*, a currency bill back plate number snippet image 2338*b*, a currency bill series snippet image 2340*b*, and/or a currency bill serial number snippet image 2342*b*.

According to some embodiments, extracted data and a corresponding snippet image are both populated into a corresponding field in a report/form. For example, according to some embodiments, an extracted serial number 2342*a* and a currency bill serial number snippet image 2342*b* are both populated into a corresponding one of the plurality of predetermined currency bill data fields 2304.

Yet, according to other embodiments, only one of extracted data and a corresponding snippet image is populated into a corresponding field in a report/form. For example, according to some such embodiments, only a currency bill serial number snippet image 2342*b* is populated into a corresponding one of the plurality of predetermined currency bill data fields 2304 and an extracted serial number 2342*a* is not populated therein.

It is contemplated that according to some embodiments, a snippet image will be populated instead of and without corresponding extracted data being populated when the document processing device and/or system is unable to extract the corresponding data above an predetermined confidence level. That is, according to some embodiments, if a device cannot extract a serial number, the device will populate a corresponding serial number field with a snippet image of the serial number instead of the extracted serial number itself. According to some embodiments, a snippet image will be populated instead of and without corresponding extracted data being populated as a system default. That is, according to some embodiments, the report can populated with snippet images only and without information extracted from image data associated with currency bills.

According to some embodiments, the device and/or system is configured to populate a portion of the extracted data and a corresponding snippet image. For example, if a device can extract 10 of the 11 serial number characters, the device can be configured to populate the extracted 10 characters of the serial number plus a wildcard character and a corresponding serial number snippet image into the form.

It is contemplated that in certain embodiments, the data in the various sections or fields of the report 2300 may be linked or networked with a database that includes corresponding extracted currency bill information or a customer information database.

The report illustrated in FIGS. 23A-B is similar to U.S. Secret Service Form SSF1604, Counterfeit Note Report, that U.S. financial institutions are required to submit to the U.S. Secret Service for every counterfeit note that a financial institution receives. Similar counterfeit note reports can be prepared for suspect foreign currency bills. In an alternate embodiment, other currency-related government reports can be automatically generated and populated such as U.S. Department of Treasury Form 104, Currency Transaction Report. The Currency Transaction Report may be modified to include and the document processing device and/or system can be configured to populate, for example, information related to the individual currency bills associated the currency transaction such as serial numbers, secondary currency bill characteristic information (e.g., Federal Reserve letter/number, series, plate numbers), and/or images (e.g., full or partial) of the currency bills. Additional details of automatic report generation for currency bill processing device and systems are described in U.S. Patent Application Publication No. 2004/0153408 A1, entitled "Financial Document Processing System,", which is hereby incorporated by reference herein in its entirety.

As described above, it is contemplated that in certain embodiments, the document processing device and/or system can be configured to populate one or more snippet images of a suspect currency bill in corresponding fields in a report where OCR algorithms for extracting information from the image data associated with the currency bill are unsuccessful. If the OCR algorithm is unsuccessful in extracting desired information from the bill, the document processing device and/or system can be configured to populate the snippet image in a field in the automatically generated report. According to some embodiments, the document processing device and/or system can be configured to display the snippet image on a display screen so that an operator of the document processing device and/or system may manually input the non-extractable information in the appropriate field of the report. As one non-limiting example, a suspect currency bill may have been printed using an incorrect font for the face plate number resulting in the extraction algorithm being unsuccessful in extracting the bill face plate number. A snippet of the bill image (e.g., a portion of the image of the bill) that includes the face plate number could then be placed or populated into the record or report at the location that the extracted face plate number is normally placed by the device and/or system.

In certain embodiments, the document processing system may have a communication port for connecting to a network and transmitting in real-time some or all of the information in report 2300, including images of currency bills, to a receiving node at the U.S. Secret Service, other government agency or law enforcement group, or other entity tracking counterfeit currency bills. In some embodiments, the information in report 2300 is transmitted over the network at predetermined time intervals (e.g., every hour, daily, once a week). In certain embodiments, the document processing system may electronically transmit the report 2300 or the information contained in report 2300 (e.g., records or data files) to a central database that contains information for other counterfeit currency bills. It is further contemplated that in certain embodiments the document processing system may include or can be communicatively connected to a printing device. For example, the document processing system may generate a report similar to report 2300 or a data file containing a plurality of records or reports. The data file can be stored locally within the document processing system or within a local area network associated with the document processing system. As the document processing system processes a stack of currency bills and the associated imaging components image the currency bills, selected data are subsequently extracted from the image data. Upon detection or determination that a bill is suspect (e.g., counterfeit), the report 2300 may be generated by the document processing system. Once the report 2300 is created with data populating the sections or fields of report 2300, the report 2300 can automatically be printed out in hard copy form or report 2300 can be stored in a queue for later printing, such as at the end of the day or the end of the week, and transmittal (e.g., physical transfer) to the U.S. Secret Service or other law enforcement agency. In certain embodiments, numerous copies of report 2300 can be generated and/or consolidated for transmittal together at a predetermined time. In certain embodiments, the document processing system can be operated in business environments other than a financial institution, such as a store or merchant. It is contemplated that the document processing system can operate within the networks or computing environments that may be expected with stores or merchants such as franchises, department stores, or smaller brick-and-mortar operations.

Referring back to FIG. 3C, it may be desirable in certain embodiments to have a quick and efficient method for handling an identified suspect currency bill. In the illustration provided in FIG. 3C, the currency bill may be determined to be suspect based on the various counterfeit detection techniques described in the current section and in sections elsewhere in the present disclosure. A user interface may display a record 300 to a document processing system operator. In certain embodiments, the document processing system may also off-sort or stop and present the suspect currency bill for physical inspection by the operator. After the operator has determined that the currency bill is suspect (e.g., based on physical inspection, review of a full or partial image 370, or comparison of the serial number and cross-reference information) the operator may select a charge back option 396 (see related discussions in sections elsewhere in the present disclosure for additional details), which may initiate one or several operations. For example, the charge back option may result in a customer account being charged back the value of the currency bill in the case where the customer account already received credit for the deposit of the currency bill. Such a procedure requires that the customer account information be first associated with the currency bill image. The chargeback option 396 may also trigger the preparation of a counterfeit note report or other reports, as discussed, for example, in this section and elsewhere. Examples of other types of reports may include a statement to the customer explaining the chargeback can also be initiated upon an operator selecting the chargeback option 396. Alternatively, a document processing system may automatically generate a report for any identified suspect currency bills, including a report summarizing all identified suspects notes.

It is contemplated that in certain embodiments, a second report may be populated and automatically generated by the document processing system for an identified counterfeit currency note. This second report can be in addition to, for example, the exemplary report illustrated in FIGS. 23A-B. The second report can be created or generated in an electronic form that may be saved in a memory and/or displayed on a display. In certain embodiments, the second report may be printed on a printing device associated with the document processing system. As discussed above, preparation of the second report can be a desirable feature because in addition to preparing a government-required report, such as, for example, Secret Service Form 1604 (or modified versions thereof), a financial institution may also want to generate a chargeback report and/or notification to the customer that deposited the suspect note. The charge-back report can include information, such as the date the note was deposited, the account number to be charged back, teller information, other transaction information, and/or at least a partial image of the note. The charge-back report can be printed out and sent to the customer or the charge-back report can be an electronic report that is sent to the financial institution customer by email or other known electronic methods for communications with customers. The charge-back report can be generated at a time different from the generation of the counterfeit note report or it can be generated substantially contemporaneously with the generation of the counterfeit note report. The charge-back report and counterfeit note report can be transmitted electronically as illustrated, for example, in FIG. 24 and/or as discussed in sections elsewhere in the present disclosure.

In certain embodiments, it is contemplated that some or all of the information in report 2300 can be collected for genuine currency bills. For example, a financial institution or law enforcement agency may want to track the movements of currency dispensed or received in large deposits or withdrawals. As another example, financial institutions and/or law enforcement agencies may also want to track money associated with criminal activity such as stolen money (e.g., money a teller gave a bank robber, a bundle of $100 bills with pre-recorded serial numbers), laundered money, drug money (e.g., bills where serial number and/or other identifying information is pre-recorded prior to or after an illicit drug transaction), or ransom money. It is further contemplated that it may be desirable to track currency bills by denomination and serial number for certain financial institution customers including businesses and individuals (e.g., inflow and outflow of currency bills from a certain account). According to some embodiments, it may be desirable for financial institutions or law enforcement agencies to track serial numbers and/or other characteristics of currency bills such as the Federal Reserve Bank designation. As another non-limiting example, in exercising subpoenas, law enforcement may desire to track the circulation of select currency bills by tracking the denomination and serial number of currency bills issued to select customer(s) of a designated financial institution. It is contemplated that in some embodiments the document processing system allows tracking of genuine currency bills by initially imaging the currency bill at either the intake or shortly thereafter (e.g., a deposit) or just prior to a withdrawal and storing in a database the image, transaction identifying information, and character information extracted from the currency bill. It is also contemplated that in some embodiments serial number information and transaction identifying information may be stored in a data base. In certain embodiments various unique characteristics associated with a currency bill may be stored in a database. As the currency bills are later circulated and processed by other document processing systems, the later images and/or related extracted information and transaction identifying information can also be stored in a database and appended with data stored in the database containing the prior circulation and/or transaction information involving the same currency bill.

It is contemplated that in certain embodiments, a document processing system may also be able to extract a "Rapid Print" number that is printed onto an identified counterfeit currency bill. "Rapid Print" numbers are printed by the U.S. Secret Service onto counterfeit bills and include a field to help identify where the counterfeit note was received, the year in which the "Rapid Print" number was printed onto the counterfeit note, and a unique identifying number for the note. It is further contemplated that in certain embodiments, once a currency bill is determined to be counterfeit or suspect, the document processing system can print a "Rapid Print" number on the actual counterfeit bill. In certain embodiments, it may also be desirable to further associate the "Rapid Print" number printed on a counterfeit bill with an electronic image of the suspect currency bill. For example, the document processing system may electronically tag or associate a "Rapid Print" number with an image of a suspect currency bill and substantially concurrently physically print the same "Rapid Print" number on the actual suspect currency bill as the device is processing a stack of currency bills. In some embodiments, a suspect currency bill may initially be run through the document processing system, and then, data associated with the suspect currency bill may be entered and associated with the bill, such as transaction information associated with the receipt of the bill including the place the bill was received and the date/time of the receipt. Other transaction related information may be received, as well, and furthermore, the transaction-related information may already be stored in a memory for recall during the processing of the suspect currency bill in the document processing system. The transaction-related information may also be electronically tagged or associated with the image of the suspect currency bill. In certain embodiments, an electronic signal may be transmitted from or within the document processing system to a printer that prints the "Rapid Print" number onto the counterfeit currency bill. The "Rapid Print" number may be assigned via data entry to a touch-panel display or a keyboard communicatively connected with the document processing device or within the document processing system (e.g., connected remotely).

It is contemplated that in certain embodiments, the document processing system (e.g., 100, 101') can operate within a counterfeit reconciliation system or as a standalone system for reconciliation of currency bills. The counterfeit reconciliation system can include high-resolution imaging (e.g., 400 DPI×200 DPI, 300 DPI×300 DPI, 400 DPI×400 DPI) of the currency bills to obtain image data that is reproducible as a visually readable image. High-resolution imaging allows for the extraction of various characteristics of the currency bills from the image data including not only unique identifying characteristics such as the serial number, but also secondary bill characteristics or additional character information such as the check letter and quadrant number, Federal Reserve letter/number, the series, the check letter and face plate number, the back plate number, the Secretary of the Treasury signature, the Treasurer signature, or other secondary currency bill characteristics. High-resolution imaging may be desirable of both the front and back of the currency bills.

The counterfeit reconciliation system can be particularly useful in a cash vault, such as, at a private or Federal Reserve bank and/or a vault associated with U.S. Secret Service operations. In an exemplary embodiment, one or more document processing systems, such as the devices illustrated in FIGS. 1 and 2A-2C, are used to process currency bills within the cash vault. According to some embodiments, the device and/or system is configured to extract the serial numbers and/or secondary characteristics of the currency bills from image data and to store the extracted information in a database. According to some embodiments, the device and/or system associates the extracted currency bill information with customer information, a customer account, or other currency-handler (e.g., teller, custodian) identifying information. According to some embodiments, the device and/or system is configured to associate and store currency bill images, or portions thereof, with the extracted bill information and/or handler identifying information.

It is contemplated that in certain embodiments currency bills may be processed using relatively lower resolution (e.g., 200 DPI×100 DPI, 200 DPI×200 DPI, 150 DPI×150 DPI) images. For U.S. currency bills, such lower resolutions are typically satisfactory for extracting the serial number from the currency bill using optical character recognition methods. The currency bill serial numbers can then be stored in a database along with information identifying the source of the currency bill (e.g., customer, custodian). In certain embodiments, the currency bill image or a portion thereof may be stored or associated with the serial number and bill source identification information. After a batch or stack of currency bills is processed, the currency bills may then be placed in a tray and moved to a separate currency processing device. For example, it may be desirable to sort the currency bills by denomination and strap the bills using a device such as the JetScan™ MPS line of multi-pocket currency sorters manufactured by Cummins-Allison Corp. of Mt. Prospect, Ill. In other embodiments, a batch or stack of currency bills may be processed after the currency bills are first sorted. For example, currency bills may first be sorted using multi-pocket currency sorter such as the JetScan™ MPS line of products. The multi-pocket currency sorter can include a counterfeit detection system for authenticating the currency bills where suspect or counterfeit bills are off-sorted to a separate output receptacle of the multi-pocket sorter. After the counterfeit currency bills are identified, those bills may then be placed in a device that is configured to image the documents at relatively higher resolutions (e.g., 400 DPI×200 DPI, 300 DPI× 300 DPI, 400 DPI×400 DPI). The document processing system can then extract primary (e.g., serial number, denomination) and secondary (e.g., check letter and quadrant number, Federal Reserve letter/number, series, check letter and face plate number, back plate number) characteristic information from the image data obtained for each bill as described in the current section and in sections elsewhere herein. The document processing system then takes the extracted information for the counterfeit note and populates that information into selected fields in an electronic report in a process similar to that discussed for FIGS. 23A-B and elsewhere herein. Furthermore, the document processing system may communicate with, for example, an internal or external server that contains a database linking the serial number for the counterfeit note with a customer account or certain customer information (e.g., name, address). The customer information is then downloaded and also populated into other selected field of the electronic report. The electronic report may then be exported via a communication port to the Secret Service or other federal agency with interests in tracking counterfeit currency.

It is contemplated that in certain embodiments, the federal agency tracking counterfeit notes (e.g., U.S. Secret Service) may assign larger banks or armored carriers a batch number associated with the large bank or carrier and allow these entities to report counterfeit notes in a batch reporting process, such as, for example, via the U.S. Secret Service U.S. Dollar website available at www.usdollars.usss.gov. It would be desirable for such a batch reporting process to be automated, particularly since larger banks and armored carriers are likely to process a significant number of counterfeit notes. As the bank or carrier processes the counterfeit notes, it may mark a batch number on the counterfeit note along with a unique identifying number or code. For example, across each currency note identified as counterfeit the bank may print a batch number or code associated with the bank, such as "12345" or "A1234". The bank may also assign its own unique number or code to the counterfeit currency note at a different location on the bill or immediately after the batch number, such as "12345-1" or "A1234-1" or "12345-A", where right-hand character (e.g., number "1" or letter "A") is the bank's unique identifier for the note in the batch. Subsequent counterfeit currency notes within the same batch may then be, for example, consecutively or sequentially numbered or characterized with the number "2" or letter "B". In certain embodiments, it is contemplated that the batch number and associated unique batch identifier is affixed to the counterfeit currency notes along a generally white, outside edge of the currency note. It is particularly desirable that the number is printed in an area other than the typically printed portions of currency notes. As the large bank or armored carrier then processes the counterfeit notes using a document processing system, such as those described elsewhere herein, selected fields are extracted from the image data of the counterfeit currency notes and that information is used to populate a counterfeit note batch report that lists the extracted data along with related handler information in a format similar to Table 1 below:

first column includes the note number that can be printed on the bill after the batch number or elsewhere. It is also contemplated that the document processing system may print the batch number and note number on each counterfeit currency note during the processing stage that generates the batch report. The second column may include the note denomination. The third column may include the Federal Reserve letter and/or number. The fourth column may include the counterfeit note serial number. The fifth column may include check letter and quadrant number. The sixth and seventh columns may include face plate and back plate numbers. The eight column may include the series letter and/or year for the currency note. The ninth column may include customer information, if it is known to the bank. For example, Table 1 identifies that Note No. 1 is associated with In-n-Out located in Centralia, Calif. along with the listed customer address. The customer information may be populated into the batch report by cross-referencing the serial number of the counterfeit currency note with a particular transaction when the note was received by the bank, and thus, tie the counterfeit note to a particular bank customer and account associated with the transaction. Other formats for the batch report are contemplated that may include different column headers and extracted information. More or fewer columns may be included in the batch report as required by the financial institution or the government agency requiring the report (e.g., U.S. Secret Service). It is contemplated that the batch report may include anywhere from two counterfeit currency notes to as many as allowed by the relevant government agency (e.g., up to fifty counterfeit currency notes). With the batch number and note number being included in the batch report, the government agency (e.g., U.S. Secret Service) would have available to it the information needed to follow up on the reported notes once the counterfeit notes are received from the currency handler (e.g., bank, carrier).

It is also contemplated that in certain embodiments, the batch report may include an image or partial image of the front and/or back of the counterfeit currency note. The image may be included in a separate column in the batch report or may be accessible via a link in the report. As discussed else-

TABLE 1

FROM:
    Any Bank USA
    129 Seventh St, Lincoln, CA
    (987) 765-4321
    Batch #12345—Jun. 30, 2009

| NOTE NO. | DENOMINATION | FEDERAL RESERVE LETTER/ NUMBER | SERIAL NUMBER | CHECK LETTER AND QUADRANT NUMBER | FACE PLATE NUMBER | BACK PLATE | SERIES | BANK CUSTOMER |
|---|---|---|---|---|---|---|---|---|
| 1 | $10 | A, 1 | GA123456789 | D, 4 | 12 | 9 | G, 2004 | In-n-Out 123 Main St Centralia, CA |
| 2 | $100 | C, 3 | AC987654321 | F, 6 | 11 | 5 | A, 1996 | Bob's Nursery 456 First St Lincoln, CA |

As shown in Table 1, each counterfeit note is listed in the batch report with each of the fields in the table being populated as or after the counterfeit currency notes are processed in the document processing device. The batch report may be created and stored as an electronic report. It is also contemplated that the electronic report may be transmitted over a network, or printed out, for submittal to a government agency such as the U.S. Secret Service. In the example of Table 1, the where, an exemplary document processing system may first process each of the counterfeit currency notes and then automatically populate a record with all the information needed to create the batch report. For example, once a batch number is assigned for an institution, all the counterfeit notes can be processed in the document processing systems discussed herein and any needed reports can be automatically generated with the extracted information associated with the notes populating fields of a report, in a manner similar to the example of Table 1. It is contemplated that any counterfeit note specific identifiers (e.g., Note No. 1, Note No. 2, Note A, Note B) can be either printed on the note before processing in the document processing system or the identifier can be printed directly on the note during the processing operation. It is contemplated that in certain embodiments, the batch number and identifier, if placed on the counterfeit note before processing, are also extracted from the image data of the counterfeit currency note and populated into the record for the report.

Once the counterfeit currency notes are processed and the batch report is generated an electronic version of the report may be exported to a third party, such as the U.S. Secret Service or an entity associated with the U.S. Secret Service that maintains a database of counterfeit bill information (e.g., the USDollars Note Search Site at www.usdollars.usss.gov) Physical copies of the reports and counterfeit currency notes may be sent, as well.

Figure 24:
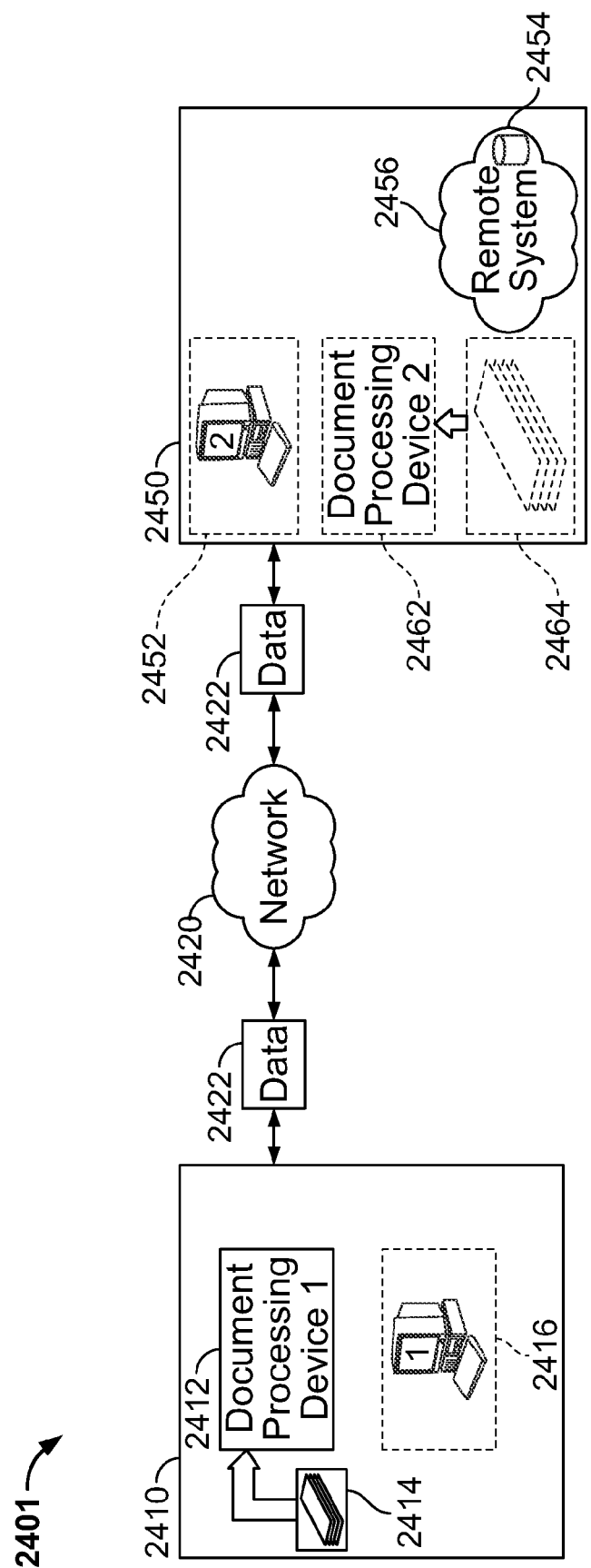
FIG. 24 is a block diagram of a financial transaction system according to certain embodiments of the present disclosure.

Turning now to FIG. 24, a block diagram of a document processing system 2401 configured to communicate over a network is described according to some embodiments of the present disclosure. The system includes a document processing node 2410, a network 2420, and a remote reporting node 2450, such as a law enforcement agency server, third party server, or other remote network communications system. Additional exemplary embodiments of document processing systems, document processing devices, and document processing systems communicating over a network are described elsewhere herein.

The document processing node 2410 includes a document processing device 2412. According to some embodiments, the document processing system 2410 includes a first computer 2416 communicatively connected to the document processing device 2412, such as by through a wired connection (e.g., electrical, optic, other direct connection) or a wireless connection. According to some embodiments, the first computer 2416 can be a server configured to be communicatively connected with a plurality of document processing devices 2412 (e.g., ten, twenty, thirty). According to some embodiments, the document processing device 2412 and the first computer 2416 share a single housing.

The remote reporting node 2450 may include a second computer 2452 and a remote storage system 2456. The second computer 2452 may be communicatively connected to the remote storage system 2456, such as by through a wired connection (e.g., electrical, optic, other direct connection) or a wireless connection. According to some embodiments, the second computer 2452 can be a server. In some embodiments, the second computer 2452 and the remote storage system 2456 share a single housing. According to some embodiments, the remote reporting node 2450 may be a server. It is contemplated that in certain embodiments, the remote reporting node 2450 may also include or have associated therewith a second document processing device 2462. It is contemplated that in certain scenarios, a law enforcement agency or other entity may service the remote reporting node 2450. The remote reporting node 2450 would then receive data 2422 over the network 2420 from the document processing node 2410. It is contemplated that in certain embodiments the entity servicing the remote reporting node 2450 (e.g., U.S. Secret Service) may also have the need to process physical documents in its possession (e.g., a law enforcement agency may desire to rapidly process currency bills associated with drug bust or other criminal-related activity). Thus, processing of physical document at the remote reporting node 2450 may also be completed by placing a second physical stack of currency bills into an input receptacle 2464 of the second document processing device 2462 so that the notes can be processed according to the embodiments described herein directly within the remote processing node. The law enforcement entity may desire to process the currency bills by recording images and extracting selected bill information as quickly and accurately as possible for likely later use as evidence (e.g., currency bill image, serial number, and other identifying characteristics) in criminal proceedings. Alternatively, an entity such as the U.S. Secret Service may maintain a central repository or server that acts as the remote reporting node 2450 and have each of its individual satellite offices act as one document processing node 2410 out of multiple document processing nodes connected to the remote reporting node 2450.

It is contemplated that in certain embodiments, a document processing entity, such as a financial institution or law enforcement entity, may process currency bills as the servicer of the document processing node 2410 and may later send the processed suspect currency bills, or currency bills that are otherwise of interest, to either a law enforcement entity or to a central repository (e.g., entities operating a remote reporting node). Thus, even when financial institutions send the images and associated data of suspect documents in advance over the data network 2420, the financial institutions may still send the physical suspect currency to the law enforcement agency (e.g., U.S. Secret Service). Upon receiving the suspect currency bills, the law enforcement agency may decide they want to rerun the currency bills received through their own document processing device (e.g., second document processing device 2462). Such situation may occur where the law enforcement agency intends to further process the suspect currency bill (e.g., Rapid Print) once the suspect currency bill is received. It is further contemplated that it may be desirable to the operator of the remote reporting node 2450 to process the received physical suspect currency bills (e.g., counterfeit currency bills, target genuine currency bills, currency bills of interest) to confirm that a physical currency bill has been received for every record or data file received over the network. Therefore, the unique identifying information extracted from each physical currency bill received and processed by the second document processing device may be compared with the records or data files stored in the remote system 2456 so that each received currency bill can be accounted for.

While there are numerous possible combinations and positions for the various systems, devices, and computers of the document processing system, FIG. 24 illustrates one non-limiting example suitable for describing the imaging, extraction, and processing of documents at one location and transmitting the imaged and extracted information over a network to a second location. Processing of documents at the document processing node can generate a plurality of data files or records 2422 that may include image data, data extracted from images, and transaction identification information. According to some embodiments, the data files or records 2422 contain a visually readable image of one or both sides of a currency bill or other documents. According to some embodiments, the data files or records 2422 include a visually readable image of both sides of a document, identifying information (e.g., currency bill serial number, denomination, other extracted information) and transactional information (e.g., bank account number, depositor contact information). According to other embodiments, the data records 2422 only include identifying information and transaction information without any images. According to some embodiments, a partial image of the currency bill e.g. serial number snippet is included in the data file or record 2422.

According to some embodiments, in response to generating the data records 2422, an operator at node 2410 or 2450 can initiate the electric transmission of the generated data files 2422 over the network 2420 to the remote reporting node 2450. According to some embodiments, the document processing device 2412 is configured to electrically transmit the generated data files 2422 over the network 2420 to the remote reporting node 2450. In some of these embodiments, the second computer 2452 can be configured to receive the data files 2422 either through a wired (e.g., electrical, optic, other direct connection) or wireless connection, the remote storage system 2456, and/or another network system. Alternatively, in response to generating the data files 2422, the document processing node 2410 automatically transmits the data files 2422 over the network 2420 to the remote reporting node 2450 as an electronic transmission without further input from document processing node 2410.

According to some embodiments, the remote storage system 2456 includes a database 2454 that maintains and/or stores information or reports related to counterfeit currency bills. The database 2454 can also include information or reports related to other suspect currency bills or genuine currency bills (e.g., laundered money, drug-bust money, stolen money, ransom money, money associated with other instances of criminal activity where images, serial numbers, and/or additional characteristics are recorded for currency bills). The database 2454 can be located within the remote storage system 2456, within the remote reporting node 2450, or external to one or both. According to some embodiments, the database 2454 is stored on a plurality of different memory devices, which can be physically located in a plurality of different locations (e.g., different computers with the same or different law enforcement agency or third parties). According to some embodiments, the database 2454 has one or more memory back-ups located in a plurality of locations (e.g., online server back-up).

In certain embodiments, a stack of currency bills is received in an input receptacle 2414, 2464 of a document processing device 2412, 2462. The stack of currency bills may be associated with a unique deposit identifier that associates the currency bills with a particular transaction, account, and/or customer. Within the document processing device, a visually readable image of one or more portions of at least one side of the currency bills in the stack can be obtained. Furthermore, a serial number and additional predetermined character fields (e.g., plate numbers, series information) can be extracted from the images of currency bills. Serial number information and corresponding additional character information may be received into a memory either directly or remotely associated with the document processing system. The serial number and corresponding additional character information can be associated with currency bills of interest, such as genuine currency bills or counterfeit currency bills. A processor in the document processing device 2412, 2462 or a computer 2416, 2452 can then compare the extracted serial number and corresponding predetermined character field information with the serial number information and corresponding additional character information received from the memory. A record for a currency bill can then be flagged if there are any matches between the data extracted from the currency bill image (e.g., serial number and/or additional character fields) and the currency bill data in the memory.

In certain embodiments, an electronic data file may be received over a network that is associated with a document processing device 2462. The electronic data file may include image data that is reproducible as visually readable images that correspond to a first group of currency bills processed on a another document processing device 2412. The data file can include a currency bill image with the extracted currency bill serial number and other identifying character information tagged to the currency bill image. A stack of a second group of currency bills may be received in an input receptacle 2464 associated with the document processing device 2462. The second group of currency bills may then be transported from the input receptacle, past an image scanner(s), and into an output receptacle, all associated with the document processing device 2462. The second group of currency bills are imaged via the image scanner to produce image data reproducible as visually readable images of each of the second group of currency bills. Furthermore, a currency bill serial number and other identifying character information may be extracted from the images of each of the second group of currency bills. The serial number and other identifying information from the extracted second group of currency bills may then be compared with the received electronic data file to determine if the extracted information matches the information in the electronic data file. In some embodiments, a determination may be made of the authenticity of each of the second group of currency bills using the extracted currency bill serial number and comparing the extracted serial number and the extracted additional identifying character information with serial numbers and corresponding additional identifying character information stored in a memory.

According to some embodiments, the document processing node 2410 may receive counterfeit currency bill serial number and other currency bill information from database 2454 or remote reporting node 2450. It is also contemplated that document processing node 2410 may receive serial number information and additional identifying character information for genuine currency bill documents from database 2454 or reporting node 2450.

Figure 25:
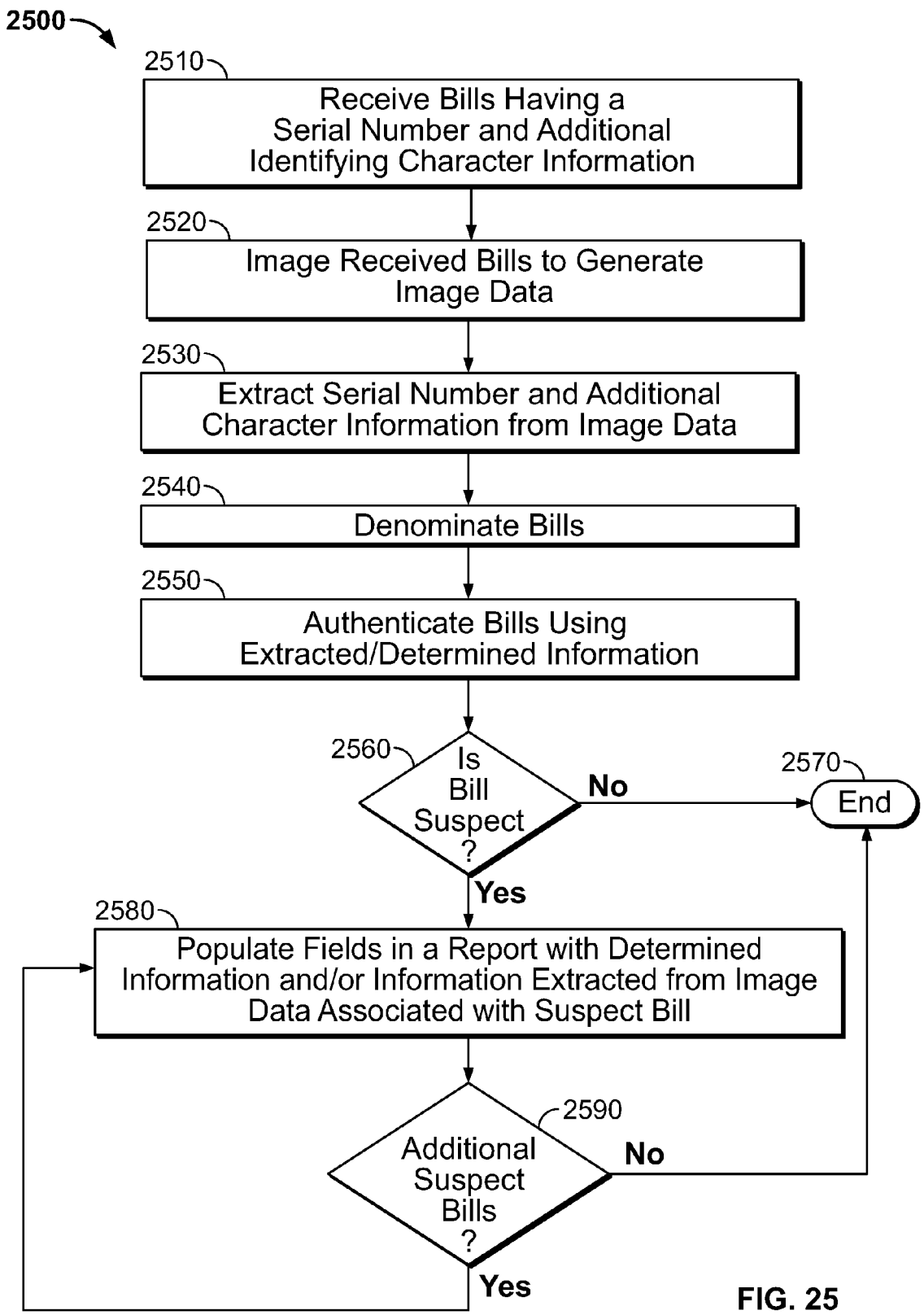
FIG. 25 is a flowchart describing a currency bill processing method for handling suspect currency bills according to certain embodiments of the present disclosure.

Referring now to FIG. 25, a flow chart 2500 for an embodiment of the present disclosure is presented. In step 2510, a stack of currency bills or notes is received. The notes have information uniquely identifying the documents, such as a serial number or a serial number in combination with additional identifying character information. The additional identifying character information may or may not be unique to a particular note but may be unique to a certain group of notes or currency bills (e.g., back plate number, series, Federal Reserve Letter/Number). The received notes are then imaged in step 2520 to produce data reproducible as visually readable images of each note. At step 2530, the serial number is extracted from each note along with additional character information such as a type of note, a Federal Reserve letter/number, a series, a check letter and quadrant number, a check letter and face plate number, a back plate number, or combinations thereof. In step 2540, the received notes are denominated. Denomination of the notes can be completed using the images of the notes and/or techniques described elsewhere herein. In step 2550, the notes are then authenticated using the extracted serial number and/or other information. Authentication may further be completed using the techniques described for FIG. 26, and in particular steps 2650 and 2660. If a note is determined to be suspect in step 2560, a report is automatically generated in step 2580. Otherwise the process ends 2570 or proceeds to another routine. The automatic generation of the report in step 2580 includes populating fields of the report with information extracted and/or determined from the suspect note along with information that may be associated with a customer who deposited the currency bill with a financial institution. The population of fields may include transmitting over a network the information extracted and/or determined from the suspect note to a remote location. At step 2590, a determination is made whether additional suspect notes were identified in the authentication step 2550. If additional suspect notes were identified, additional reports are populated for any additional suspect notes.

Flagging Based on Multiple Extracted Bill Characteristics

Verifying the genuineness of currency bills by cross-referencing information extracted and/or determined from a currency bill, with information from currency bills known to be genuine, can be a beneficial way to check for suspect bills. For example, counterfeiters typically will change unique identifying characteristics of a counterfeit bill such as the serial number. However, counterfeiters often find it difficult to change other information such as signatories, series information, check letter and quadrant number, check letter and face plate number, or back plate number, particularly on U.S. currency bills, because the printed characters that include the non-serial number characteristics are printed much smaller and of different styles than the serial number. Therefore, except for a serial number, other numeric and/or alphanumeric characters are typically not changed during the preparation of counterfeit bills. Thus, in addition to extracting serial numbers from currency bill images, the extraction and processing of non-serial number character information from currency bill images (e.g., from image data that is reproducible as a visually readable image of a currency bill) can also be beneficial to identify and track counterfeit currency bills. Extracted non-serial number information is cross-referenced with the extracted currency bill serial number and compared with known serial number and known corresponding cross-reference information associated with genuine notes. It is also contemplated that cross-referencing of information extracted from a currency bill with information from currency bills known to be counterfeit can also be a beneficial way to check for suspect bills. Additional information on identifying and tracking suspect currency bills can be found, for example, in U.S. patent application Ser. No. 10/638,231, entitled "Currency Bill Tracking System" and U.S. Pat. No. 7,187,795, entitled "Document Processing System Using Full Image Scanning," which are both hereby incorporated by reference herein in their entireties.

It is further contemplated that from time to time a financial institution or law enforcement agency, such as, for example, the U.S. Secret Service, may want to perform searches of a database for currency bills known or suspected to be associated with criminal activity. In certain embodiments, a list of serial numbers associated with a certain transaction or activity may be pre-loaded or stored into a database used to track currency bills and the database may be later accessed by, or be a part of, a document processing system. During subsequent document processing operations of currency bills that match a pre-loaded serial number and/or other information, a record including extracted and/or determined information that matches one of the pre-loaded serial numbers and/or other information can be flagged or otherwise updated to include additional information regarding the circulation patterns of the currency bill. It is contemplated that in certain embodiments, various databases may be established that are associated with (e.g., networked to) the document processing system. The databases can include a counterfeit database, a stolen money database, a money-laundering database, etc. It is further contemplated that associated transaction information may be stored with the currency bill image data in respective records and/or tagged thereto. The transaction information can allow a specific currency bill to be tracked to a specific financial institution or store customer. Again, it should be noted that the document processing systems described herein can be used for U.S. currency, as well as, foreign currency.

In certain embodiments it may be desirable for data, such as the information contained in the records described in the Documents Records and Data Files Section and in sections elsewhere in the present disclosure, from a predetermined number of genuine currency bills to be preloaded or stored as records on a database associated with a document processing device. The records may include such information as the currency bill serial number and additional characteristics such as the denomination, the series of the note, Federal Reserve letter/number, back plate number, etc. As the currency bill is then circulated the currency bill may be processed at a later time in a document processing system having access to the information originally stored on the database. If there is a serial number match, the record associated with the currency bill may be flagged. Furthermore, in certain embodiments comparisons in addition to the serial number comparison may be made. For example, after serial number data extracted from a processed currency bill is matched with a record in the database, additional extracted character information obtained from an image of the currency bill or otherwise may be further matched or compared with the information in the database. If the serial number and the additional information, such as, for example, the additional extracted character information match, then law enforcement can be fairly certain that the circulated currency bill of interest is in fact the same currency bill associated with the record from the predetermined number of genuine currency bill records preloaded onto the database. If the serial number and the additional information, such as, for example, additional extracted character information does not match, then there is a strong likelihood that the circulated currency bill is a counterfeit currency bill and not the currency bill for which data was preloaded into the database. The circulated suspect currency bill can then be flagged or otherwise highlighted as a currency bill of interest that warrants further tracking or investigation. In the above example of the serial number and additional information not matching, it may be desirable to add the image of the bill and extracted and/or determined information to a database, such as one set up to track suspect currency bills.

Referring back to FIG. 3A, it is contemplated that in certain embodiments it may be desirable to extract signatory information 312 such as a Treasurer's signature and a signature of the Secretary of Treasury. Likewise, in some embodiments, dollar amount information 313*a*, 313*b*, series information 314, and Federal Reserve Bank designators such as the number 317*a* and letter 317*b*, and plate number 321 on the backside of the currency bill, may be extracted. All of the extracted data may be used for cross-referencing the extracted serial number with the additional identifying character information for the currency bill if the currency bill is a suspect bill. For example, the serial number of the currency bill may be related to the series. If the series for a currency bill does not match the known series within the serial number range (e.g., no match), then the bill is a suspect bill. Also, for certain series of U.S. currency bills, the Federal Reserve Bank number 317*a* may be in different locations on the currency bill. For example, in some series, the letter portion 317*b* is in a seal. In other series, the number portion 317*a* is immediately next to the letter portion 317*b*, with neither being in the seal. The signatory information 312, dollar amount information 313*a*, 313*b*, series information 314, check letter and quadrant number 315, check letter and face plate number 316, Federal Reserve letter/number 317*a*, 317*b*, and back plate number 321 may all be extracted and inserted into the appropriate fields 312', 313', 314', 315', 316', 317', 321', respectively, in the record and/or data file. According to some embodiments, software operated on the document processing system, such as system 100, can be updated to handle changes in any fields that change over time. Additional information on counterfeit detection systems and methods can be found, for example, in U.S. patent application Ser. No. 10/638,231, entitled "Currency Bill Tracking System" and U.S. Pat. No. 7,187,795, entitled "Document Processing System Using Full Image Scanning," which have already been incorporated by reference in their entireties.

According to some embodiments, it is contemplated that other fields on a currency bill may contain data useful for processing a bill and identifying suspect characteristics, such as data relating to the issuing bank or the country of origin (if multiple country currencies are accepted), and others. It is also contemplated that foreign currency may have other useful information on the bill, such as, other security measures which it may be useful to extract from the image of the bill or otherwise be determined. One example would be the size of the currency document. In many foreign countries, the size of the currency bill varies with denomination. As a preliminary measure, the size of the currency bill may be measured to ensure that the bill is the appropriate size.

It is contemplated that in some embodiments, the locations of certain identifying information for currency bills varies and can also be analyzed for identifying suspect currency bills. For example, in later U.S. currency series, a picture may be larger and/or off-center than in earlier series notes. Also, some of the identifying character information may be located in a different positions for different series bills and bills of different denominations.

Figure 22:
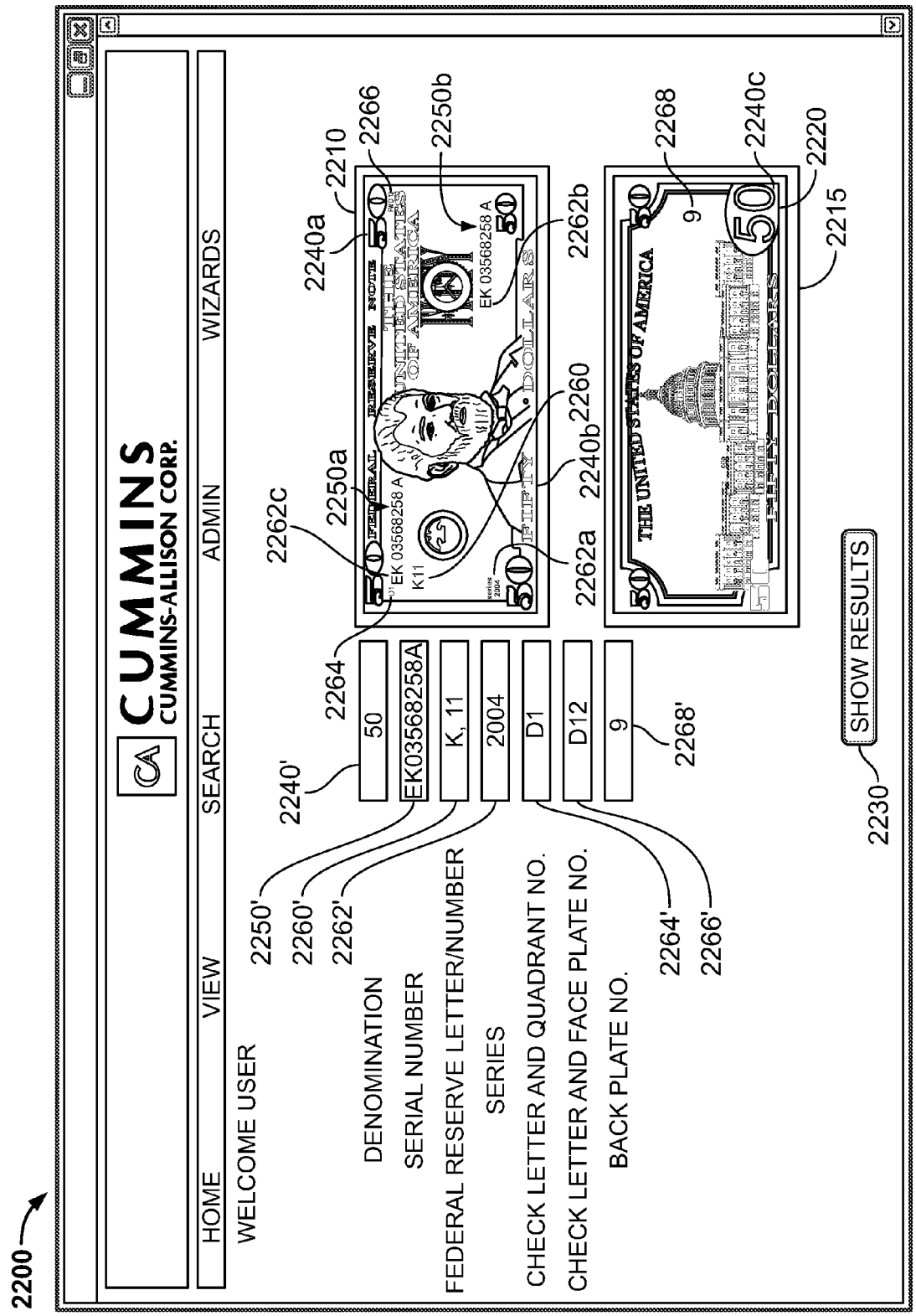
FIG. 22 is a representation of another record with selected information extracted from a currency bill according to certain embodiments of the present disclosure.

Referring to FIG. 22, an identifying information Wizard 2200 is shown. According to some embodiments, the Wizard 2200 can be used to aid an operator in identifying/locating identifying information on a specific currency bill being processed in a document processing device and/or on a sample currency bill having information located in corresponding locations. That is, according to some embodiments, the images 2210 and 2215 of the currency bill can be images of a bill that is processed by the document processing device and according to other embodiments, the images 2210 and 2215 are images of a sample currency bill.

According to some embodiments, the Wizard walks an operator through the various identifying information fields, one at a time, pointing the operator to a specific location on the images where identifying information is located or should be located and asks the operator read the identifying information from the image(s) and to type the identifying information into a corresponding one of the fields 2240', 2250', 2260', 2262', 2264', 2266', and 2268'. According to some embodiments, the Wizard highlights a particular area of one or both of the images 2210, 2215 containing identifying information using one or more different types of shapes and/or colors.

For example, to aid the operator in filling in the denomination field 2240', the Wizard can put a blue circle (not shown) around the number 50 on the first image 2210 and prompt the operator to enter the number in the blue circle into the denomination field 2240'. For another example, to aid the operator in filling in the check letter and quadrant number field 2264', the Wizard can put a green triangle (not shown) around the "D1" on the upper left side of the first image 2210 adjacent the serial number and prompt the operator to enter the letter and number in the green triangle into the check letter and quadrant number field 2264'. For yet another example, to aid the operator in filling in the back plate number field 2268', the Wizard can put a red square (not shown) around the number 9 on the right side of the second image 2215 and prompt the operator to enter the number in the red square into the back plate field 2268'.

A similar procedure is contemplated for aiding the operator in locating and entering the rest of the identifying information into the Wizard fields. According to some embodiments, the various pieces of identifying information are highlighted with different shapes of the same color. According to some embodiments, the various pieces of identifying information are highlighted with the same or similar shapes of all different colors.

According to some embodiments, one or more of the fields are automatically populated with values from extracted data associated with the currency bill being processed. In such embodiments, the Wizard walks the operator through the missing fields and asks the operator to confirm that the automatically populated fields are correct by looking at the first and/or second images 2210, 2215 of the currency bill and/or by looking at the physical bill. According to some embodiments, in response to the operator completing the Wizard, a record including the information entered into and visible in the Wizard 2200 is created in a similar fashion as described in connection with FIG. 3A and as described in other sections elsewhere herein.

It is contemplated that in certain embodiments a document processing device and/or system for processing currency bills, such as the devices and/or systems described herein (e.g., devices 101, 101', 101*a,b*, 400 and system 100), can process currency bills using the Wizard 2200. According to some embodiments, one or both of images 2210, 2215 can be obtained using one or more image scanners such as the image scanners 140*a* and/or 140*b* described in connection with FIG. 1. The images 2210, 2215 may also include various combinations of exemplary information extracted and/or determined from the currency bill, such as denomination 2240*a*, 2240*b* (e.g., $1, $2, $5, $10, $20, $50, $100, € 500, £100, ¥100); serial number 2250*a*, 2250*b* (e.g., DE72820924A; EK03568258A; GG49809927A; G34638700A, G489163041); Federal Reserve letter/number 2260 (e.g., A and 1; B and 2; G and 7; K and 11); series year 2262*a* (e.g., Series 1996; Series 2004; Series 2004A; Series 2006); serial number series letter 2262*b* (e.g., "A" for 1996 series, "D" for 2003; "E" for 2004 series; "G" for 2004A series; "I" for 2006 series); check letter and quadrant number 2264 (e.g., C and 3; D and 1; D and 4; E and 2; E and 4; G and 2); check letter and face plate number 2266 (e.g., A and 3; C and 5; D and 12; D and 68; E and 58; G and 63); and/or back plate number 2268 (e.g., 9, 25, 69).

According to some embodiments, it may be desirable for an operator of document processing system 100 to view the Wizard 2200 on a display, such as, for example, the control panel 170 or other communicatively connected display device. For example, a bill may be flagged as a suspect document as described elsewhere herein such as in the Modes of Operation—Flagging Section and in connection with FIGS. 9A-9F, and in other sections of the present disclosure. The currency bill may be flagged because all the desired information may not have been properly extracted from the front image or the back image of a currency bill (e.g., Data Extraction Error Document). By displaying one or both of the images 2210, 2215 on a display, the operator can then enter the information manually or check the extracted information with the image(s) 2210, 2215 to verify that the information was correctly extracted from the bill image(s) as described herein in reference to the Wizard 2200. It is also contemplated that a currency bill may be flagged as suspect, such as, if a currency bill fails certain authentication tests, such as those authentication tests described in the Document Processing Device and System Section and in other sections of the present disclosure. It may be beneficial in such situations for an operator to review image(s) of the currency bill and the associated extracted information to verify that information was correctly extracted.

In certain embodiments, a document processing system (e.g., 100) may include override features to complete, verify, and/or correct errors in the extraction of identifying character information from a currency bill image. For example, to correct an extraction error of Federal Reserve Letter/Number, an operator may manually enter the information into Federal Reserve Letter/Number data field 2260'. The operator may for example be prompted to enter the letter and/or number (e.g., K, 11) or to correct or verify that the correct information has been extracted from the currency bill image data from which the images 2210, 2215 are reproduced. As illustrated in FIG. 22, the currency bill image can be displayed adjacent to the various data fields to allow manual entry of corrections. The operator may also be prompted to correct or verify the currency bill series. For example, in the series data field 2262', the operator may be prompted to enter, verify, or correct the four-digit series year and/or the associated series letters for a displayed currency bill image 2210, 2215. Similarly, it is also contemplated that in certain embodiments an operator may be prompted to complete, correct, or verify data extracted from image data in a denomination data field 2240', a serial number data field 2250', a check letter/quadrant number data field 2264', a check letter face plate number data field 2266', or a back plate number data field 2268', such as described above in connection with the Wizard 2200.

As discussed elsewhere, the extracted denomination, serial number, Federal Reserve Letter/Number, Series, check letter and quadrant number, check letter and face plate number, and/or back plate number data fields may be used for cross-referencing purposes to determine if a currency bill is a suspect bill. For example, the serial number of a currency bill may be related to the series. If the series information known to be associated with a currency bill's serial number does not match for a particular bill, then the bill is a deemed a suspect bill. Therefore, it is contemplated that in certain embodiments a memory stores known serial number information for genuine currency bills along with the proper additional currency bill data field information (e.g., denomination, Federal Reserves Letter/Number, series, check letter and face plate number) that should be associated with the genuine currency bills. For example, a group of currency bills of the same denomination and printed during the same run on a given date are expected to have the same Check Letter and Quadrant Number. It is contemplated that a central bank or a government entity would maintain a database with the denomination and serial numbers of currency bills along with each currency bills associated additional information. For example, the Bureau of Engraving or other government entity may maintain a database indicating that the $50 US Federal Reserve Notes printed for the Federal Reserve Bank of Dallas with serial numbers ranging from EK03500000A to EK03600000A are Series 2004 and were printed using Check Letter and Quadrant Number D1 and back plate number nine. Such information may be stored in a memory of a document processing device and/or system or may be accessed by the document processing device and/or system (e.g., devices 100, 101', 101a,b, 400, 1171a-n, 1173a-n) over a network. In certain embodiments information about the relationships between currency bill series letters, series year, Federal Reserve Letter/Number, and the serial number may also be stored in a memory or may be accessed by a document processing device and/or system. One or more processors and/or controllers in the document processing device and/or system can then compare serial numbers extracted from image data associated with currency bills to see if their respective serial numbers have been identified as a suspect serial number, such as by being placed on a blacklist database described in the Modes of Operation—Blacklists Section and in connection with FIG. 11C**, and in other sections of the present disclosure. The processor can further cross-reference the additional identifying character information extracted from the images of the currency bills with the extracted serial number and compare the cross-referenced extracted information with the stored information on the relationships of serial numbers and additional information for genuine currency bills.

According to some embodiments, it is contemplated that it may be desirable to track currency bills by both serial number and non-serial number character information printed on the front and/or back of a currency bill. Numerous identifying characteristics may be extracted from image data from which a visually readable image of a currency bill and/or otherwise be obtained from a currency bill can be reproduced. These identifying characteristics may be associated with the currency bill image (front and/or back), and the characteristics may include without limitation serial number, Federal Reserve Letter/Number, check letter and quadrant number, check letter and face plate number, back plate number, series, denomination, and other pertinent information. The identifying characteristics described herein are typically associated with U.S. currency, however, foreign currency bills have similar identifying characteristic information that can be used to identify suspect bills.

In attempting to identify counterfeit or suspect currency bills by cross-referencing non-serial number character information with the serial number of a currency bill, it is contemplated that in certain embodiments multiple types of non-serial number character information may be extracted from the front and/or back images of a currency bill and/or otherwise be obtained from a currency bill. For example, in certain embodiments a document processing device and/or system may be configured with a supervisor mode that allows an operator to select just one non-serial number characteristic to cross-reference with the currency bill serial number. It is also contemplated that the operator may select one, two, or more than two non-serial number identifying characteristics to cross-reference with the currency bill serial number. Either way, a database with serial number information and the non-serial number identifying character information associated with genuine serial numbers is downloaded into a memory or stored in a memory accessible to the document processing device and/or system. As currency bills are processed and imaged to obtain image data and/or other data, the character information and attributes identified by the operator can be extracted from the currency bill and compared with the database of information for known characteristic information associated with genuine currency bills. It is contemplated in certain embodiments an operator may identify that the serial number and two or more identifying non-serial number characteristics (e.g., back plate number, check letter and quadrant number, and check letter and face plate number) are to be extracted and cross-referenced for determining whether a currency bill is genuine. However, in certain embodiments, some of the non-serial number identifying characteristics are cross-referenced with the serial number. For example, in some embodiments, if three non-serial number attributes are selected, then a match with known counterfeit information of two out of the three or one out of the three of the characteristics by the document processing system can flag the currency bill as suspect (e.g., non-authentic or possibly counterfeit).

It is contemplated that in certain embodiments various logical acts may be applied to determine if a currency bill is a suspect bill. For example, a decision-tree may be applied by first comparing the extracted serial number with a list of known counterfeit and/or blacklist serial numbers. If there is no match after the first logic step, the currency bill is deemed to not be suspect. If there is a match, then further comparison may be done, for example, of the back plate number associated with the known counterfeit and the back plate number extracted from the image data associated with the currency bill. If there is no match, the currency bill is deemed to not be suspect. If there is a match, there may, for example, be an additional comparison of another characteristic such as the series to see if there is a match with the known counterfeit. If there is a match, then the currency bill is flagged as suspect. It is also contemplated that after the comparison of the extracted serial number with the list of known counterfeit serial numbers, a different database of information associated with genuine currency bills may be utilized. For example, the different database may contain information on genuine serial number ranges and associated non-serial number characteristic information that should be printed on bills within the range of serial numbers. Thus, if the initial serial number comparison does not show a currency bill to be on the list of known counterfeit serial numbers, the currency bill can be further evaluated to look for other suspect characteristics such as improper corresponding back plate number or series. Such comparison techniques may be particularly beneficial in identifying suspect currency bills before their associated serial numbers are even placed on a list of known counterfeits. That is, such a technique could help with the early identification of counterfeit currency bills.

Figure 26:
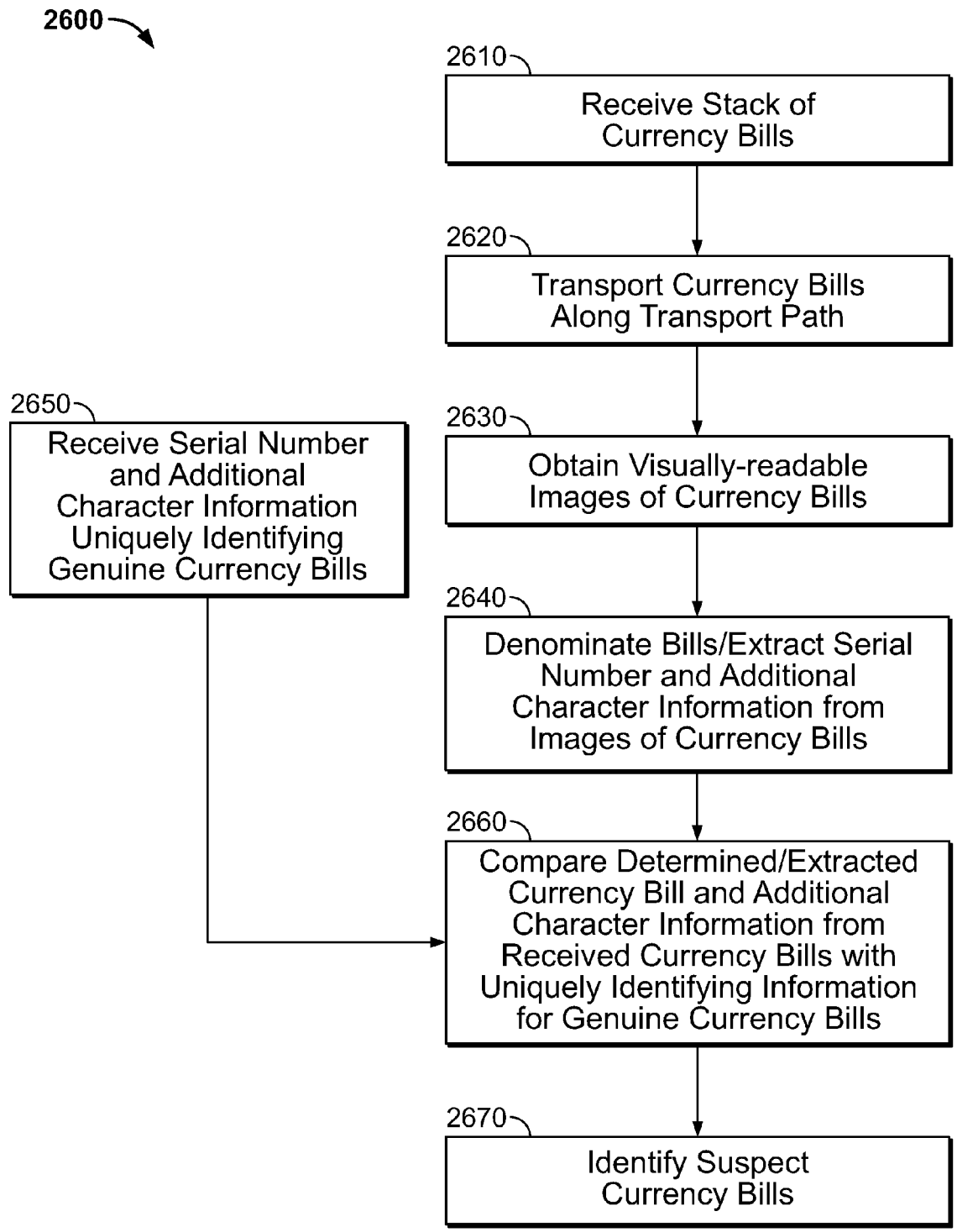
FIG. 26 is a flowchart describing a currency bill processing method for identifying suspect bills according to certain embodiments of the present disclosure.

Referring to FIG. 26, a method 2600 of an embodiment of the present disclosure is presented. In act 2610, a stack of currency bills can be received in one or more input receptacles of a document processing device and/or system, such as, for example, document processing device 101, 101' and/or document processing system 100. The input receptacles may or may not be in the same location. That is, the input receptacles may be associated with document processing devices located remotely from each other. In act 2620, the currency bills are transported along a transport path at their respective locations which is followed by obtaining image data from which a visually readable image of each of the currency bills can be reproduced in act 2630. The image data may be obtained using one or more image scanners and/or image scanning system configured to reproduce images of sufficient resolution to allow visual reading of the displayed visually readable images (e.g., at least 50 DPI×50 DPI; at least 150 DPI×150 DPI; at least 200 DPI×400 DPI; at least 300 DPI×300 DPI; at least 400 DPI×400 DPI; at least 400 DPI×200 DPI). As explained elsewhere within the related sections of the present disclosure, the images may be full or partial images of one or both sides of a currency bill. At act 2640, serial number and additional character information is extracted from the image data associated with the currency bills obtained in act 2630 and/or data is otherwise determined from a bill, such as, for example, the bill is otherwise denominated and/or authenticated. At act 2650, serial number and additional character information uniquely identifying genuine currency bills may be received and stored in a memory associated with one or more processors and/or one or more controller of a computer.

At act 2660, a comparison of the uniquely identifying information for the genuine currency bills may be made with the extracted currency bill serial number and the extracted additional character information and/or the otherwise determined bill information. This comparison may reveal that one or more currency bills are suspect. For example, a genuine currency bill may have certain unique identifying character information associated with a certain range of serial numbers. If the received currency bill does not have the same unique identifying character information that should be associated with its serial number, the currency bill will be flagged as suspect according to, for example, one of the flagging modes described in the Modes of Operation—Flagging Section and in connection with FIGS. 9A-9E, and as described in sections elsewhere in the present disclosure. Alternatively, a comparison of extracted serial number information may also be made from received serial number information associated with known counterfeit currency bills. The known counterfeit bills may also have additional unique identifying character information printed thereon that is associated in a database with the counterfeit currency bill serial number. If the extracted information from the received currency bill matches the information for the counterfeit currency bills, the received currency bill will be flagged as suspect.

It is contemplated that the instructions from the flow chart for FIG. 26 on flagging suspect currency bills, along with other flowcharts illustrated elsewhere in this disclosure, can be implemented on a processor having an associated memory or a plurality of connected processors having associated memories.

It is contemplated that in certain embodiments of the methods described for FIGS. 25 and/or 26 that the document processing system (e.g., 100) is configured to allow matching of more than two attributes in qualifying a bill as genuine. For example, a database may contain serial number and associated information for multiple secondary characteristics (e.g., Federal Reserve Number/Letter, check letter and quadrant number, back plate number, series) of a currency bill. To authenticate the bill, the document processing system may extract three or more bill characteristics and compare those characteristics with information in a database for genuine or suspect bills to determine the authenticity of the currency bill. For example, if a processed bill does not have more than two proper matching attributes (e.g., serial number, check letter and quadrant number, back plate number), then the bill would be deemed suspect. It is contemplated that in certain embodiments, for a bill to be deemed authentic, two out three of the extracted bill characteristics need to match the information in the database. It is also contemplated that a document processing device can have a supervisor or administrator mode that allows the number of bill characteristics to be changed based on the criteria established to deem a bill authentic.

In certain embodiments, a process for evaluating currency bill authenticity may include extracting a serial number from a bill and comparing the extracted serial number to a database of known counterfeit serial numbers to determine if there is a match. If the extracted serial number does not match, the currency bill is deemed to be not suspect. If the extracted serial number does match, a second extracted characteristic (e.g., back plate number, series) is compared with the database for a match. If there is no match, again, the bill is deemed to be not suspect. If there is a match, then a third extracted characteristic is compared with the database for a match. If there is no match, then the bill is deemed not suspect. If there is a match, then the currency bill is flagged as being suspect. Other variations of this process for determining if a bill is suspect are contemplated including comparing additional extracted characteristics with data stored in a database of known suspect bills. In addition, it is contemplated that extracted currency bill information may be compared with a database of known genuine currency bills where if a bill of a certain serial number does not have the proper series, back plate number, and/or Federal Reserve Letter/Number, it will be deemed suspect.

It is contemplated that in certain embodiments various secondary currency bill characteristics may be compared to determine authenticity or to simply flag a currency bill as being of interest. For example, the Federal Reserve Letter/ Number may be cross-referenced with the check letter and quadrant number and/or back plate number to flag a currency bill as being of interest. In another example, comparison of extracted bill characteristics may be made to a database or to criteria that requires all bills of a certain denomination (e.g., $100) to be flagged that have a certain check letter and quadrant number (e.g., D1) or back plate number (e.g., 9) or a certain combination of check letter and quadrant number and back plate number (e.g., D1, 9) and Federal Reserve Letter/ Number (e.g., A, 1, Boston; E, 5, Richmond). That is, in addition to, or as an alternate to, comparing extracted serial numbers with a database, cross-referencing or flagging may be based on extracted secondary bill characteristics such as check letter and face plate numbers, back plate numbers, series, and/or Federal Reserve Letter/Numbers. The described method may be desirable for flagging suspect bills that are known to have the same denomination, series, check letter and face plate number, back plate number, and/or Federal Reserve Letter/Number.

Numerous references are made herein to document processing system embodiments and document processing device embodiments, for example, in FIGS. 1, 2A-C, 4A-8B, and 13A-E, and in the various other documents incorporated herein by reference. Those skilled in the art will recognize that many changes may be made to the described embodiments without departing from the spirit and scope of the present disclosure. Furthermore, those skilled in the art will also recognize that certain embodiments described for one device or system can be readily, or with slight modification, be included in the embodiments described for another device or system, without departing from the spirit and scope of the present disclosure.

What is claimed is:

1. A system for processing currency bills, the system comprising:
   an input receptacle configured to receive a stack of currency bills;
   an image scanning system configured to obtain image data that is reproducible as a visually-readable image of one or more portions of at least one side of each currency bill, the image scanning system configured to extract a serial number and at least one or more additional characters from the image data for the currency bill;
   a transport mechanism that transports each of the currency bills in the stack, one at a time, from the at input receptacle, past the image scanning system, to at least one output receptacle;
   a memory that stores serial number information and corresponding additional character information associated with serial numbers of genuine currency bills, the serial number information and corresponding additional character information uniquely identifying a genuine currency bill;
   a processor configured to compare the extracted serial number and corresponding extracted one or more additional characters with the stored serial number information and the corresponding additional character information associated with serial numbers of genuine currency bills, the processor, or another processor, further configured to identify as a suspect currency bill any currency bill from the stack with extracted serial numbers that do not have one or more extracted additional characters matching the serial number information and corresponding additional character information stored in the memory; and
   a display configured to display an image of at least a portion of the image data associated with the suspect currency bill and one or more of the extracted serial number, additional characters, or any combination thereof.

2. The system of claim 1, wherein the additional characters and the serial number extracted from the image data include alphanumeric characters.

3. The system of claim 1, wherein the additional characters extracted from the image data include characters having different font sizes.

4. The system of claim 1, wherein the extracted additional characters represent a back plate number, a check letter and quadrant number, a check letter and face plate number, or combinations thereof.

5. The system of claim 1, wherein the extracted additional characters represent one or more Federal Reserve Bank designations.

6. The system of claim 1, wherein the extracted additional characters represent a signature of the Treasurer of the United States or the signature of the Secretary of the Treasury.

7. The system of claim 1, wherein the extracted additional characters represent a currency bill series.

8. The system of claim 1, wherein the extracted additional characters represent at least two of the following: a back plate number, check letter and quadrant number, a check letter and face plate number, a Federal Reserve Bank designation, a signature of the Treasurer of the United States, a signature of the Secretary of the Treasury, or a currency bill series.

9. The system of claim 1, wherein the serial number information and corresponding additional character information associated with serial numbers of genuine currency bills are received over a connection to a network associated with the system.

10. The system of claim 1, wherein the memory is located remote from the image scanning system.

11. The system of claim 1, wherein the processor or another processor is located remote from the image scanning system.

12. The system of claim 1, wherein the image scanning system obtains image data from currency bills at a resolution of at least 200 dots per inch by 400 dots per inch.

13. The system of claim 12, wherein the system transports and processes the currency bills at a rate of at least 200 currency bills per minute.

14. The system of claim 4, wherein the image scanning system obtains image data from currency bills at a resolution of at least 200 dots per inch by 400 dots per inch and processes the currency bills at a rate of at least 400 currency bills per minute.

15. The system of claim 1, wherein upon the identification of a suspect currency bill, the transport mechanism stops and presents the suspect currency bill to a system operator.

16. The system of claim 1, wherein each suspect currency bill is flagged, and wherein a data file including the image data of the suspect currency bill and a suspect flag is stored in a memory.

17. The system of claim 1, further including a storage device for storing the obtained image data, wherein the image data for each currency bill is tagged with the respective serial number and one or more additional characters extracted from the image data for the currency bill.

18. The system of claim 1, wherein each currency bill has a wide edge, the transport mechanism configured to transport each of the currency bills with the wide edge leading.

19. The system of claim 18, wherein the system is configured to process currency bills that are U.S. dollar currency bills.

20. The system of claim 18, wherein the system is configured to process currency bills associated with multiple countries including two or more of the following currencies: U.S. dollar, euro, Australian dollar, Canadian dollar, Japanese yen, and pound sterling.

21. The system of claim 1, wherein the system is embodied within a housing, the housing having a footprint of less than about two square feet, the system having a weight of less than about thirty-five pounds.

22. A method of processing currency bills, the method comprising:
receiving a stack of currency bills in an input receptacle of a document processing device;
transporting the currency bills from the input receptacle, past an image scanner, and to an output receptacle;
obtaining image data reproducible as a visually readable image of one or more portions of at least one side of each currency bill in the stack via the image scanner;
extracting a serial number and at least one or more additional characters from the image data for each currency bill;
comparing, via a processor, the extracted serial number and corresponding extracted one or more additional characters with stored serial number information and corresponding stored additional character information associated with the serial number information of genuine currency bills, the stored serial number information and corresponding stored additional character information stored in a memory, the stored serial number information and corresponding stored additional character information uniquely identifying a genuine currency bill; and
flagging any currency bill that does not have the extracted serial number and corresponding one or more extracted additional characters matching the stored serial number information and corresponding stored additional character information.

23. The method of claim 22, wherein the additional characters and the serial number extracted from the image data include alphanumeric characters.

24. The method of claim 22, wherein the extracted additional characters represent a plate serial number, plate position letters and numbers, or both.

25. The method of claim 22, wherein the extracted additional characters represent one or more Federal Reserve Bank designations.

26. The method of claim 22, wherein the extracted additional characters represent a currency bill series.

27. The method of claim 22, further comprising receiving the stored serial number information and corresponding stored additional character information into the memory over a connection to a network.

28. The method of claim 22, wherein the obtained image data from the currency bills are at resolutions of at least 200 dots per inch by 400 dots per inch, and the steps of obtaining, extracting, and comparing occur at a rate of at least 200 currency bills per minute.

29. The method of claim 22, wherein the obtained image data from the currency bills are at resolutions of at least 200 dots per inch by 400 dots per inch, and the steps of obtaining, extracting, and comparing occur at a rate of at least 400 currency bills per minute.

30. The method of claim 22, wherein flagging comprises stopping and presenting the suspect currency bill to a system operator.

31. The method of claim 22, further including storing the obtained image data on a storage device, wherein the image data for each currency bill is tagged and stored with the corresponding extracted serial numbers and one or more additional characters.

32. The method of claim 22, wherein each currency bill has a wide edge, the transport mechanism configured to transport each of the currency bills with the wide edge leading.

33. The method of claim 32, wherein the currency bills are U.S. dollar currency bills.

34. The method of claim 32, wherein the currency bills are associated with multiple countries including two or more of the following currencies: U.S. dollar, euro, Australian dollar, Canadian dollar, Japanese yen, and pound sterling.

35. A method of processing currency bills, the method comprising:
receiving a stack of currency bills in an input receptacle of a document processing device;
obtaining image data reproducible as a visually readable image of one or more portions of at least one side of each of a plurality of currency bills;
extracting a serial number and additional character information from a predetermined field of the image data for each currency bill;
comparing, via a processor, the extracted serial number and corresponding additional character information with master serial number information for genuine currency bills and master corresponding additional character information associated with the master serial number information, the master serial number information and master corresponding additional character information uniquely identifying a genuine currency bill; and
flagging any currency bill that does not have an extracted serial number and extracted additional character information matching the master serial number information and master corresponding additional character information.

36. The method of claim 35, wherein the additional character information and the serial number extracted from the image data include alphanumeric characters.

37. The method of claim 35, wherein the extracted additional character information represents a back plate number, a check letter and quadrant number, a check letter and face plate number, or combinations thereof.

38. The method of claim 35, further comprising receiving into a memory the master serial number information and master corresponding additional character information over a connection to a network.

39. The method of claim 35, wherein the obtained image data for the currency bills are at resolutions of at least 200 dots per inch by 400 dots per inch, and the steps of obtaining, extracting, and comparing occur at a rate of at least 400 currency bills per minute.

40. The method of claim 35, wherein flagging comprises stopping and presenting the suspect currency bill to a system operator.

41. The method of claim 35, further comprising:
extracting second additional character information from a second predetermined field of the image data for each currency bill;

comparing, via a processor, the extracted serial number and corresponding second additional character information with the master serial number information and the master corresponding additional character information associated with the master serial number information; and flagging any currency bill that does not have an extracted serial number and corresponding second additional character information matching the master serial number information and master corresponding additional character information.

42. The method of claim 35, further comprising:

extracting second additional character information and third additional character information from respective second and third predetermined fields of the image data for each currency bill;

comparing, via a processor, the extracted serial number and corresponding second and third extracted additional character information with stored serial number information for genuine currency bills and corresponding stored additional character information associated with the stored serial number information; and flagging any currency bill that does not have an extracted serial number and corresponding second and third additional character information at least partially matching the stored serial number information and corresponding stored additional character information.

43. The method of claim 35, wherein the comparing act comprises first comparing the extracted serial number with the stored serial number information associated with genuine currency bills, and if the extracted serial number and stored serial number information match, the comparing act next comparing the extracted corresponding additional character information with the stored corresponding additional character information associated with the stored serial number information for genuine currency bills.

44. A system for processing currency bills, the system comprising:

an input receptacle configured to receive a stack of currency bills;

an image scanning system configured to obtain image data that is reproducible as a visually readable image of one or more portions of at least one side of each currency bill, the image scanning system configured to extract a serial number and at least one or more additional characters from the image data for the currency bill;

a transport mechanism that transports each of the currency bills in the stack, one at a time, from the input receptacle, past the image scanning system, to at least one output receptacle;

a memory that stores serial number information and corresponding additional character information associated with serial numbers for currency bills of interest, the serial number information and corresponding additional character information uniquely identifying a currency bill of interest;

a processor configured to compare the extracted serial number and corresponding extracted one or more additional characters with the stored serial number information and the corresponding stored additional character information associated with serial numbers of currency bills of interest, the processor, or another processor, further configured to identify as target currency bills any currency bill from the stack with extracted serial numbers that match the serial number information and corresponding additional character information stored in the memory; and a display configured to display an image associated with at least a portion of the image data obtained from a target currency bill.

45. The system of claim 44, wherein a transaction identifier is associated with the stack of currency bills, the display further configured to display the transaction identifier.

46. The system of claim 44, wherein the system is embodied within a housing, the housing having a footprint of less than about two square feet, the system having a weight of less than about thirty-five pounds.

47. A method of processing currency bills, the method comprising:

receiving a stack of currency bills in an input receptacle of a document processing device, the stack of currency bills having an associated depositor identifier;

obtaining image data reproducible as a visually readable image of one or more portions of at least one side of each of a plurality of currency bills;

extracting a serial number and additional characters from respective predetermined fields from the image data for each currency bill;

comparing, via a processor, the extracted serial number and corresponding additional characters from the predetermined fields with stored serial number information and corresponding stored additional character information of the currency bills of interest, the stored additional character information associated with the stored serial number information of currency bills of interest, the stored serial number information and corresponding stored additional character information uniquely identifying a currency bill of interest; and flagging any currency bill that has an extracted serial number and extracted additional predetermined character field matching the serial number information and corresponding additional character information received into the memory.

48. The method of claim 47, further comprising receiving into a memory the stored serial number information and the corresponding stored additional character information over a connection to a network.

49. The method of claim 47, wherein flagging comprises stopping and presenting the flagged currency bill to a system operator.

50. The method of claim 47, wherein flagging comprises displaying an image associated with at least a portion of the image data for with the flagged currency bill on a display associated with the document processing device.

* * * * *

UNITED STATES PATENT AND TRADEMARK OFFICE
CERTIFICATE OF CORRECTION

PATENT NO.       : 8,437,530 B1
APPLICATION NO.  : 12/758968
DATED            : May 7, 2013
INVENTOR(S)      : Mennie et al.

It is certified that error appears in the above-identified patent and that said Letters Patent is hereby corrected as shown below:

In the Claims

In column 241, line 56 (Claim 1, line 12), please delete the second instance of the word "at".

Signed and Sealed this
Thirty-first Day of December, 2013

Margaret A. Focarino
*Commissioner for Patents of the United States Patent and Trademark Office*